US006912201B1

(12) United States Patent
Yoshida et al.

(10) Patent No.: US 6,912,201 B1
(45) Date of Patent: Jun. 28, 2005

(54) POINTER PROCESSING APPARATUS, POH TERMINATING PROCESS APPARATUS, METHOD OF POH TERMINATING PROCESS AND POINTER/POH TERMINATING PROCESS APPARATUS IN SDH TRANSMISSION SYSTEM

(75) Inventors: Hiroshi Yoshida, Kawasaki (JP); Masanobu Edasawa, Osaka (JP)

(73) Assignee: Fujitsu Limited, Kawasaki (JP)

( * ) Notice: Subject to any disclaimer, the term of this patent is extended or adjusted under 35 U.S.C. 154(b) by 1199 days.

(21) Appl. No.: 09/590,022

(22) Filed: Jun. 8, 2000

Related U.S. Application Data

(62) Division of application No. 08/852,841, filed on May 7, 1997, now Pat. No. 6,157,658.

(30) Foreign Application Priority Data

Jul. 12, 1996 (JP) ........................................ 8-183870

(51) Int. Cl.[7] ........................................ H04L 12/28

(52) U.S. Cl. ........................ 370/248; 370/539; 370/907

(58) Field of Search ................................ 370/217, 218, 370/221, 225, 532, 535, 534, 541, 907, 516–517, 539, 503, 505, 248

(56) References Cited

U.S. PATENT DOCUMENTS

| | | | | | |
|---|---|---|---|---|---|
| 5,155,741 | A | | 10/1992 | Waters et al. | |
| 5,471,476 | A | | 11/1995 | Hiramoto | |
| 5,535,219 | A | | 7/1996 | Freitas | |
| 5,572,515 | A | | 11/1996 | Williamson et al. | |
| 5,600,648 | A | * | 2/1997 | Furuta et al. | 370/248 |
| 5,623,357 | A | * | 4/1997 | Kight et al. | 370/907 |
| 5,644,567 | A | | 7/1997 | Ikeda | |
| 5,673,043 | A | | 9/1997 | Hayashi et al. | |
| 5,675,580 | A | * | 10/1997 | Lyon et al. | 370/503 |
| 5,717,693 | A | | 2/1998 | Baydar et al. | |
| 5,737,310 | A | * | 4/1998 | Goto | 370/222 |
| 5,751,720 | A | * | 5/1998 | Uematsu et al. | 370/503 |

* cited by examiner

*Primary Examiner*—Chau Nguyen
*Assistant Examiner*—Andy Lee
(74) *Attorney, Agent, or Firm*—Katten Muchin Zavis Rosenman

(57) ABSTRACT

A pointer processing apparatus in an SDH transmission system used to serially conducting a pointer process on inputted multiplex data has an address generating unit for allocating an address to each channel of the multiplex data, a RAM for holding an information group obtained by a pointer extracting process and a pointer process, and RAM controlling unit for controlling a sequence of an operation to write-in/read-out the RAM to serially conduct the pointer process on the received multiplex data, thereby largely decreasing the circuit scale, the power consumption, the number of distributions and the like. A POH terminating operation process is conducted in a POH terminating operation process unit, and an obtained result of the POH terminating operation is stored in a storage area for a corresponding channel of a storage unit, whereby the POH terminating operation process can be conducted without separating a multiplex signal into channels. By conducting the POH terminating operation process on the multiplex signal without separating the multiplex signal into channels, a scale and a power consumption of an apparatus can be largely decreased.

24 Claims, 162 Drawing Sheets

FIG. 7

| ADDRESS No. | TUG 3 | TUG 2 | TU 12 | CNT (BEFORE CONVERSION) TUG3 | TUG2 | TU12 | ADDRESS (AFTER CONVERSION: HEX) |
|---|---|---|---|---|---|---|---|
| 0 | 1 | 1 | 1 | 0 0 | 0 0 0 | 0 0 | 0 0 |
| 1 | 2 | | | 0 1 | | | 0 1 |
| 2 | 3 | | | 1 0 | | | 0 2 |
| 3 | 1 | 2 | | 0 0 | 0 0 1 | | 0 3 |
| 4 | 2 | | | 0 1 | | | 0 4 |
| 5 | 3 | | | 1 0 | | | 0 5 |
| 6 | 1 | 3 | | 0 0 | 0 1 0 | | 0 6 |
| 7 | 2 | | | 0 1 | | | 0 7 |
| 8 | 3 | | | 1 0 | | | 0 8 |
| 9 | 1 | 4 | | 0 0 | 0 1 1 | | 0 9 |
| 1 0 | 2 | | | 0 1 | | | 0 A |
| 1 1 | 3 | | | 1 0 | | | 0 B |
| 1 2 | 1 | 5 | | 0 0 | 1 0 0 | | 0 C |
| 1 3 | 2 | | | 0 1 | | | 0 D |
| 1 4 | 3 | | | 1 0 | | | 0 E |
| 1 5 | 1 | 6 | | 0 0 | 1 0 1 | | 0 F |
| 1 6 | 2 | | | 0 1 | | | 1 0 |
| 1 7 | 3 | | | 1 0 | | | 1 1 |
| 1 8 | 1 | 7 | | 0 0 | 1 1 0 | | 1 2 |
| 1 9 | 2 | | | 0 1 | | | 1 3 |
| 2 0 | 3 | | | 1 0 | | | 1 4 |
| 2 1 | 1 | 1 | 2 | 0 0 | 0 0 0 | 0 1 | 1 5 |
| 2 2 | 2 | | | 0 1 | | | 1 6 |
| 2 3 | 3 | | | 1 0 | | | 1 7 |
| 2 4 | 1 | 2 | | 0 0 | 0 0 1 | | 1 8 |
| 2 5 | 2 | | | 0 1 | | | 1 9 |
| 2 6 | 3 | | | 1 0 | | | 1 A |
| 2 7 | 1 | 3 | | 0 0 | 0 1 0 | | 1 B |
| 2 8 | 2 | | | 0 1 | | | 1 C |
| 2 9 | 3 | | | 1 0 | | | 1 D |
| 3 0 | 1 | 4 | | 0 0 | 0 1 1 | | 1 E |
| 3 1 | 2 | | | 0 1 | | | 1 F |
| 3 2 | 3 | | | 1 0 | | | 2 0 |
| 3 3 | 1 | 5 | | 0 0 | 1 0 0 | | 2 1 |
| 3 4 | 2 | | | 0 1 | | | 2 2 |
| 3 5 | 3 | | | 1 0 | | | 2 3 |
| 3 6 | 1 | 6 | | 0 0 | 1 0 1 | | 2 4 |
| 3 7 | 2 | | | 0 1 | | | 2 5 |
| 3 8 | 3 | | | 1 0 | | | 2 6 |
| 3 9 | 1 | 7 | | 0 0 | 1 1 0 | | 2 7 |
| 4 0 | 2 | | | 0 1 | | | 2 8 |
| 4 1 | 3 | | | 1 0 | | | 2 9 |
| 4 2 | 1 | 1 | | 0 0 | 0 0 0 | 1 0 | 2 A |
| 4 3 | 2 | | | 0 1 | | | 2 B |
| 4 4 | 3 | | | 1 0 | | | 2 C |
| 4 5 | 1 | 2 | 3 | 0 0 | 0 0 1 | | 2 D |
| 4 6 | 2 | | | 0 1 | | | 2 E |
| 4 7 | 3 | | | 1 0 | | | 2 F |
| 4 8 | 1 | 3 | | 0 0 | 0 1 0 | | 3 0 |
| 4 9 | 2 | | | 0 1 | | | 3 1 |
| 5 0 | 3 | | | 1 0 | | | 3 2 |
| 5 1 | 1 | 4 | | 0 0 | 0 1 1 | | 3 3 |
| 5 2 | 2 | | | 0 1 | | | 3 4 |
| 5 3 | 3 | | | 1 0 | | | 3 5 |
| 5 4 | 1 | 5 | | 0 0 | 1 0 0 | | 3 6 |
| 5 5 | 2 | | | 0 1 | | | 3 7 |
| 5 6 | 3 | | | 1 0 | | | 3 8 |
| 5 7 | 1 | 6 | | 0 0 | 1 0 1 | | 3 9 |
| 5 8 | 2 | | | 0 1 | | | 3 A |
| 5 9 | 3 | | | 1 0 | | | 3 B |
| 6 0 | 1 | 7 | | 0 0 | 1 1 0 | | 3 C |
| 6 1 | 2 | | | 0 1 | | | 3 D |
| 6 2 | 3 | | | 1 0 | | | 3 E |

FIG. 10

| DEC | HEX | IDLE SPACE |
|---|---|---|
| 62 | 3E | |
| 61 | 3D | |
| 60 | 3C | |
| 59 | 3B | |
| 58 | 3A | |
| 57 | 39 | |
| 56 | 38 | |
| 55 | 37 | |
| 54 | 36 | |
| 53 | 35 | |
| 52 | 34 | |
| 51 | 33 | |
| 50 | 32 | |
| 49 | 31 | |
| 48 | 30 | |
| 47 | 2F | |
| 46 | 2E | |
| 45 | 2D | |
| 44 | 2C | |
| 43 | 2B | |
| 42 | 2A | |
| 41 | 29 | |
| 40 | 28 | |
| 39 | 27 | |
| 38 | 26 | |
| 37 | 25 | |
| 36 | 24 | |
| 35 | 23 | |
| 34 | 22 | |
| 33 | 21 | |
| 32 | 20 | |
| 31 | 1F | |
| 30 | 1E | |
| 29 | 1D | |
| 28 | 1C | |
| 27 | 1B | |
| 26 | 1A | |
| 25 | 19 | |
| 24 | 18 | |
| 23 | 17 | |
| 22 | 16 | |
| 21 | 15 | |
| 20 | 14 | |
| 19 | 13 | |
| 18 | 12 | |
| 17 | 11 | |
| 16 | 10 | |
| 15 | 0F | |
| 14 | 0E | |
| 13 | 0D | |
| 12 | 0C | |
| 11 | 0B | |
| 10 | 0A | |
| 9 | 09 | |
| 8 | 08 | |
| 7 | 07 | |
| 6 | 06 | |
| 5 | 05 | |
| 4 | 04 | |
| 3 | 03 | |
| 2 | 02 | |
| 1 | 01 | |
| 0 | 00 | |

FIG. 12

| RAM BIT NUMBER | DATA CONTENTS |
|---|---|
| 0 | RECEIVED POINTER VALUE (2ND BIT) |
| 1 | RECEIVED POINTER VALUE MSB (1ST BIT) |
| 2 | NDF-EN SIGNAL |
| 3 | INV-V1 SIGNAL |
| 4 | AIS-V1 SIGNAL |

FIG. 23

| RAM BIT NUMBER | DATA CONTENTS |
|---|---|
| 0 | RECEIVED POINTER VALUE LSB (10TH BIT) |
| 1 | RECEIVED POINTER VALUE (9TH BIT) |
| 2 | RECEIVED POINTER VALUE (8TH BIT) |
| 3 | RECEIVED POINTER VALUE (7TH BIT) |
| 4 | RECEIVED POINTER VALUE (6TH BIT) |
| 5 | RECEIVED POINTER VALUE (5TH BIT) |
| 6 | RECEIVED POINTER VALUE (4TH BIT) |
| 7 | RECEIVED POINTER VALUE (3RD BIT) |
| 8 | RECEIVED POINTER VALUE (2ND BIT) |
| 9 | SIGNAL INDICATING RECEIVED SAME NORMAL POINTER VALUE TO POINTER VALUE IN PRECEDING FLAME |
| 10 | LOP DETECTION PROTECTIVE COUNTER (LSB) |
| 11 | LOP DETECTION PROTECTIVE COUNTER |
| 12 | LOP DETECTION PROTECTIVE COUNTER (MSB) |
| 13 | NDF DETECTION SIGNAL |
| 14 | 3-FRAME INHIBIT COUNTER (LSB) |
| 15 | 3-FRAME INHIBIT COUNTER (MSB) |
| 16 | AIS DETECTION PROTECTIVE COUNTER (LSB) |
| 17 | AIS DETECTION PROTECTIVE COUNTER (MSB) |
| 18 | INC DETECTION SIGNAL |

FIG. 33

| RAM BIT NUMBER | DATA CONTENTS |
|---|---|
| 0 | VC-n DATA LSB |
| 1 | VC-n DATA |
| 2 | VC-n DATA |
| 3 | VC-n DATA |
| 4 | VC-n DATA |
| 5 | VC-n DATA |
| 6 | VC-n DATA |
| 7 | VC-n DATA MSB |
| 8 | J1/V5 BYTE INDICATE SIGNAL |

(n = 2, 3, 4, 12)

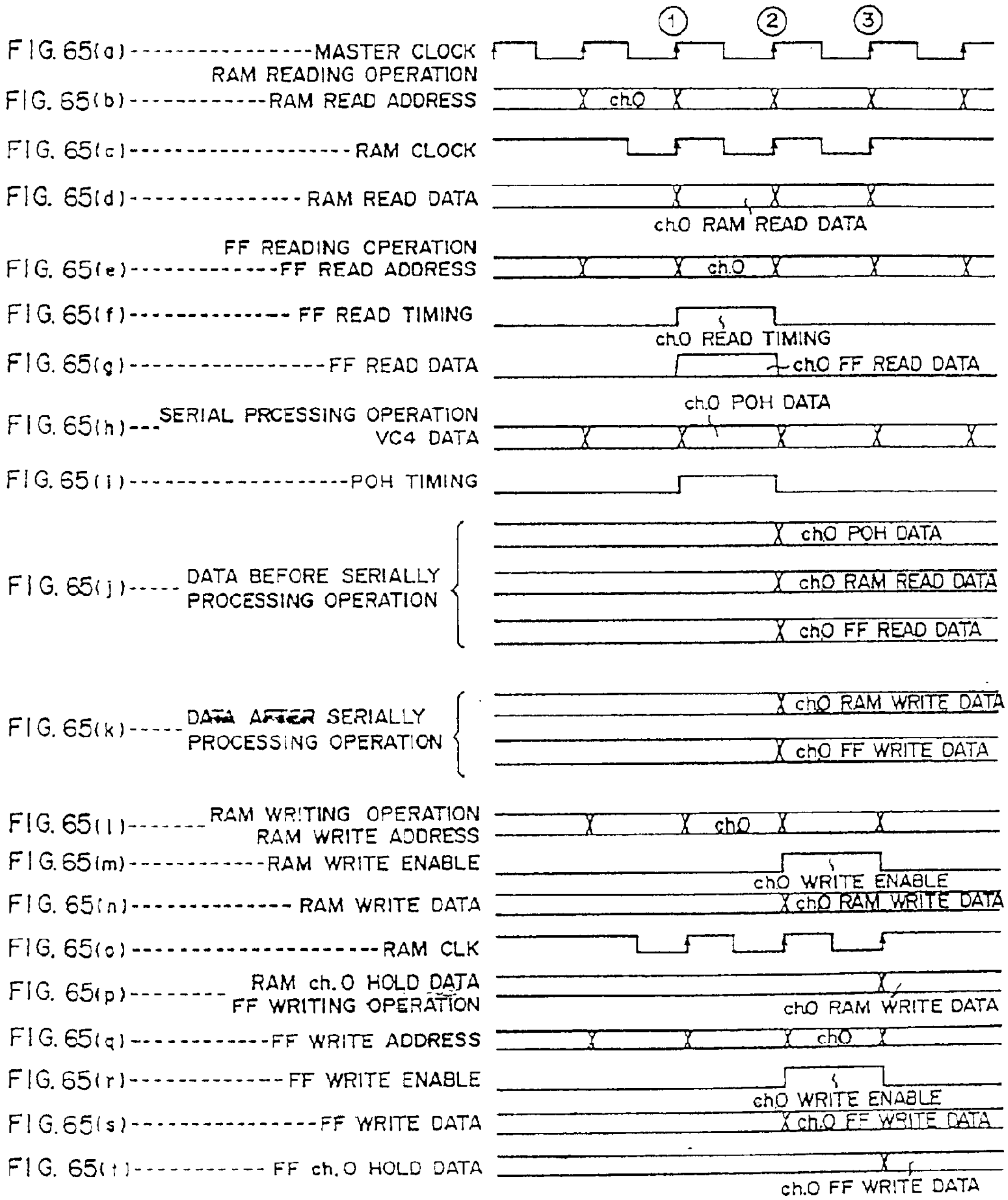
FIG. 65(a) MASTER CLOCK
RAM READING OPERATION
FIG. 65(b) RAM READ ADDRESS
FIG. 65(c) RAM CLOCK
FIG. 65(d) RAM READ DATA
ch.O RAM READ DATA
FF READING OPERATION
FIG. 65(e) FF READ ADDRESS
FIG. 65(f) FF READ TIMING
ch.O READ TIMING
FIG. 65(g) FF READ DATA
chO FF READ DATA
ch.O POH DATA
FIG. 65(h) SERIAL PRCESSING OPERATION VC4 DATA
FIG. 65(i) POH TIMING
FIG. 65(j) DATA BEFORE SERIALLY PROCESSING OPERATION
chO POH DATA
chO RAM READ DATA
chO FF READ DATA
FIG. 65(k) DATA AFTER SERIALLY PROCESSING OPERATION
chO RAM WRITE DATA
chO FF WRITE DATA
RAM WRITING OPERATION
FIG. 65(l) RAM WRITE ADDRESS
FIG. 65(m) RAM WRITE ENABLE
chO WRITE ENABLE
FIG. 65(n) RAM WRITE DATA
chO RAM WRITE DATA
FIG. 65(o) RAM CLK
FIG. 65(p) RAM ch.O HOLD DATA
chO RAM WRITE DATA
FF WRITING OPERATION
FIG. 65(q) FF WRITE ADDRESS
FIG. 65(r) FF WRITE ENABLE
chO WRITE ENABLE
FIG. 65(s) FF WRITE DATA
ch.O FF WRITE DATA
FIG. 65(t) FF ch.O HOLD DATA
ch.O FF WRITE DATA FIG. 67(a) MASTER CLOCK
FIG. 67(b) FIG. 66-⑨
Read Address
FIG. 67(c) FIG. 66-⑩
Read Data
FIG. 67(d) FIG. 66-⑪
Read Data
FIG. 67(e) FIG. 66-⑥
FIG. 67(f) FIG. 66-⑧
FIG. 67(g) FIG. 66-⑫
FIG. 67(h) FIG. 66-⑦
FIG. 67(i) FIG. 66-⑬
FIG. 67(j) FIG. 66-㉞
Read Address
FIG. 67(k) FIG. 66-㉟
FIG. 67(l) FIG. 66-㉛
Read Address
FIG. 67(m) FIG. 66-㉜
Read Address
FIG. 67(n) FIG. 66-㉒, ㉔, ㉕, ㉗, ㉙
FIG. 67(o) FIG. 66-㉓, ㉖, ㉘, ㉚, ㊱
FIG. 67(p) FIG. 66-⑲~㉑, ㉝
FIG. 67(q) FIG. 66-⑭~⑱

FIG.81(a) PHASE
FIG.81(b) MASTER CLOCK
FIG.81(c) TUDT
FIG.81(d) TUAD
FIG.81(e) SPEEN
FIG.81(f) J1V5TP
FIG.81(g) VC3TUG
FIG.81(h) VC2 VC12
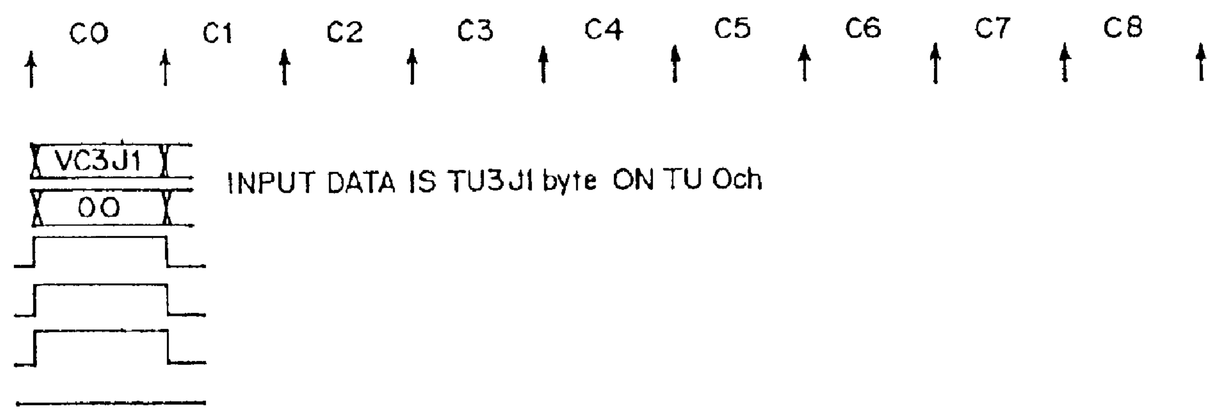

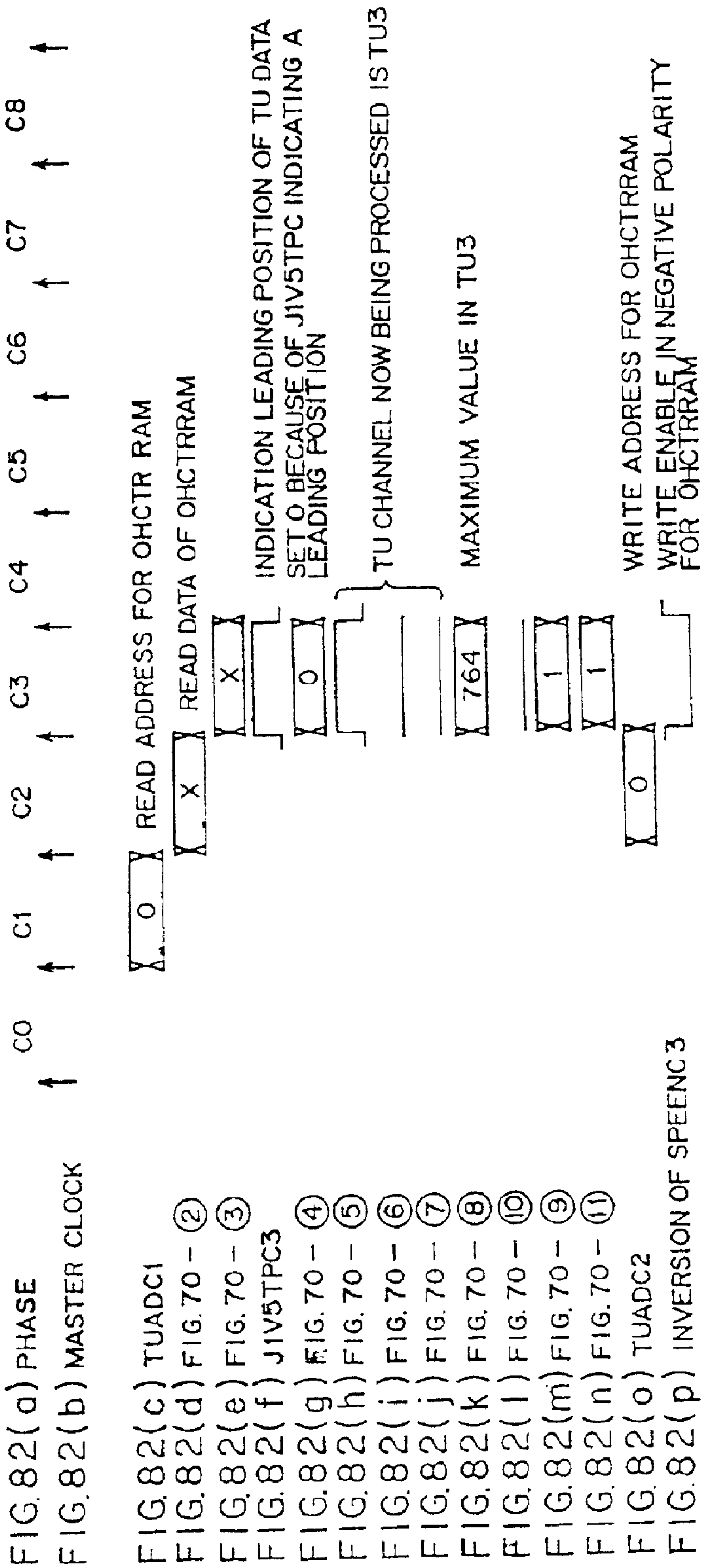
FIG. 82(a) PHASE
FIG. 82(b) MASTER CLOCK
FIG. 82(c) TUADC1
FIG. 82(d) FIG. 70 – ②
FIG. 82(e) FIG. 70 – ③
FIG. 82(f) J1V5TPC3
FIG. 82(g) FIG. 70 – ④
FIG. 82(h) FIG. 70 – ⑤
FIG. 82(i) FIG. 70 – ⑥
FIG. 82(j) FIG. 70 – ⑦
FIG. 82(k) FIG. 70 – ⑧
FIG. 82(l) FIG. 70 – ⑩
FIG. 82(m) FIG. 70 – ⑨
FIG. 82(n) FIG. 70 – ⑪
FIG. 82(o) TUADC2
FIG. 82(p) INVERSION OF SPEENC3
C0
C1
C2
C3
C4
C5
C6
C7
C8
0
READ ADDRESS FOR OHCTR RAM
X
READ DATA OF OHCTRRAM
X
INDICATION LEADING POSITION OF TU DATA
0
SET 0 BECAUSE OF J1V5TPC INDICATING A LEADING POSITION
TU CHANNEL NOW BEING PROCESSED IS TU3
764
MAXIMUM VALUE IN TU3
1
1
0
WRITE ADDRESS FOR OHCTRRAM
WRITE ENABLE IN NEGATIVE POLARITY FOR OHCTRRAM

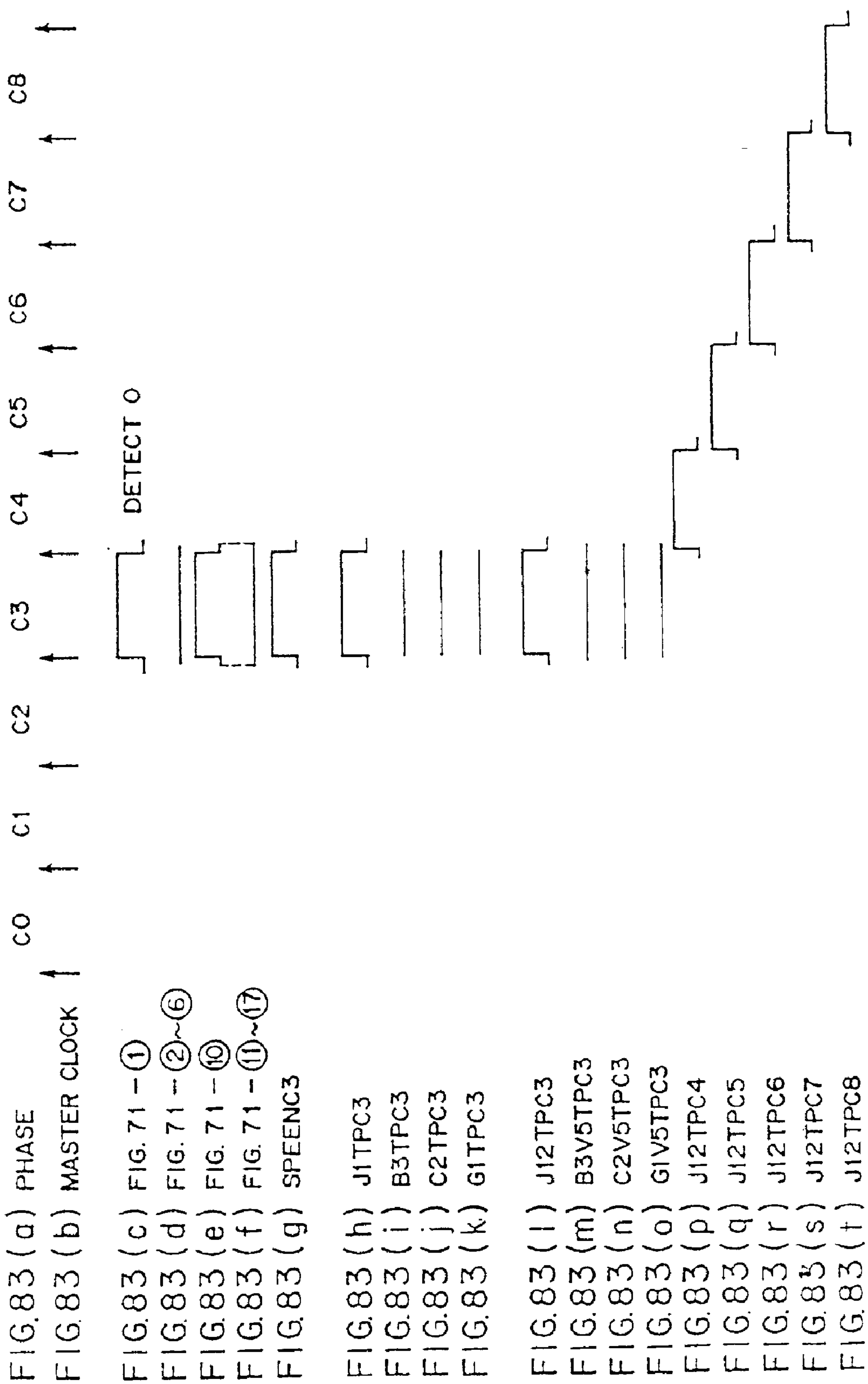
C0
C1
C2
C3
C4
C5
C6
C7
C8
DETECT 0
FIG.83 (a) PHASE
FIG.83 (b) MASTER CLOCK
FIG.83 (c) FIG. 71 — ①
FIG.83 (d) FIG. 71 — ②~⑥
FIG.83 (e) FIG. 71 — ⑩
FIG.83 (f) FIG. 71 — ⑪~⑰
FIG.83 (g) SPEENC3
FIG.83 (h) J1TPC3
FIG.83 (i) B3TPC3
FIG.83 (j) C2TPC3
FIG.83 (k) G1TPC3
FIG.83 (l) J12TPC3
FIG.83 (m) B3V5TPC3
FIG.83 (n) C2V5TPC3
FIG.83 (o) G1V5TPC3
FIG.83 (p) J12TPC4
FIG.83 (q) J12TPC5
FIG.83 (r) J12TPC6
FIG.83 (s) J12TPC7
FIG.83 (t) J12TPC8

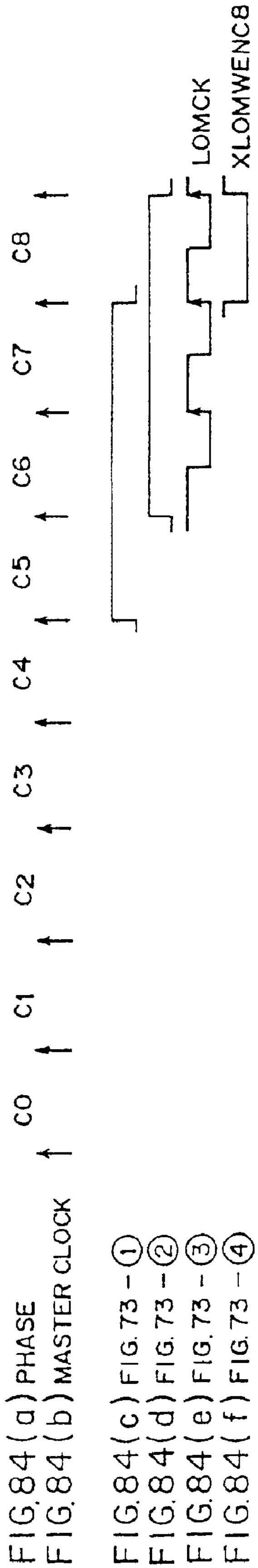
FIG.84(a) PHASE
FIG.84(b) MASTER CLOCK
FIG.84(c) FIG.73 - ①
FIG.84(d) FIG.73 - ②
FIG.84(e) FIG.73 - ③
FIG.84(f) FIG.73 - ④
C0
C1
C2
C3
C4
C5
C6
C7
C8
LOMCK
XLOMWENC8

| OPERATION | TIMING | CONTENTS OF OPERATION |
|---|---|---|
| READ | TU-3 J1<br>TU-2 J2<br>TU-12 J2 | READ WHICH POSITION J1/J2 BYTE THAT SHOULD BE PROCESSED IS IN |
| WRITE | TU-3 J1<br>TU-2 J2<br>TU-12 J2 | WRITE WHICH POSITION THE NEXT J1/J2 BYTE IS IN |

FIG.90

| RAM 3~0bit | Frame No. |
|---|---|
| 0000 | 0 (CRC-byte) |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | 14 |
| 1111 | 15 |

DATA CONTENTS OF RAM

↕

CORRESPONDING TO PATH TRACE DATA

| OPERATION | TIMING | |
|---|---|---|
| READ | TU-3 J1, C2<br>TU-2 J2, V5<br>TU-12 J2, V5<br>μ-COM READ | READ SL, TRC RECEPTION EXPECTED VALUES<br>READ μ-COM SETTING OF SL, TRC RECEPTION EXPECTED VALUES |
| WRITE | μ-COM WRITE | WRITE μ-COM SETTING OF SL, TRC RECEPTION EXPECTED VALUES |

FIG. 100

RELATION AMONG RAM ADDRESS, FRAME No. AND TU CHANNEL

| RAM ADDRESS FRAME No. ADDRESS | RAM ADDRESS TU ADDRESS | RELATION BETWEEN FRAME No. AND TU CHANNEL |
|---|---|---|
| 0000 + | 00 0000 | RECEPTION EXPECTED VALUE OF SIGNAL LABEL ON TU 1CH |
| 0000 + | 00 0001 | RECEPTION EXPECTED VALUE OF SIGNAL LABEL ON TU 2CH |
| ⋮ | | ⋮ |
| 0000 + | 11 1110 | RECEPTION EXPECTED VALUE OF SIGNAL LABEL ON TU 63CH |
| 0000 + | 11 1111 | IDLE ADDRESS (03FH) |
| 0000 + | 00 0000 | RECEPTION EXPECTED VALUE OF J1/J2 BYTE ON TU 0CH OF FRAME NO.1 |
| ⋮ | | ⋮ |
| 0111 + | 11 1110 | RECEPTION EXPECTED VALUE OF J1/J2 BYTE ON TU 62CH OF FRAME NO.8 |
| 0111 + | 11 1111 | IDLE ADDRESS (1FFH) |
| 1000 + | 00 0000 | RECEPTION EXPECTED VALUE OF J1/J2 BYTE ON TU 0CH OF FRAME NO.9 |
| ⋮ | | ⋮ |
| 1111 + | 11 1110 | RECEPTION EXPECTED VALUE OF J1/J2 BYTE ON TU 62CH OF FRAME NO.15 |
| 1111 + | 11 1111 | IDLE ADDRESS (3FFH) |

FIG. 103(a) PHASE
FIG. 103(b) MASTER CLOCK
FIG. 103(c) TUDT
FIG. 103(d) TUAD
FIG. 103(e) SPEEN
FIG. 103(f) J1V5TP
FIG. 103(g) VC3TUG
FIG. 103(h) V2VC12

FIG.104(a) PHASE
FIG.104(b) MASTER CLOCK
FIG.104(c) TUADC6
FIG.104(d) RLOMDTC7
FIG.104(e) TUDTC7
FIG.104(f) J12TPC7
FIG.104(g) FIG.91-①, FIG.8?-①, FIG.86-①, FIG.92-①, FIG.94-①
FIG.104(h) FIG.91-②, FIG.86-②, FIG.92-②, FIG.94-②
FIG.104(i) WLOMDTC7
FIG.104(j) TUADC7
FIG.104(k) XLOMWENC8
FIG.104(l) LOMCK
C0
C1
C2
C3
C4
C5
C6
C7
C8
C9
0
RDT
VC3 J1
LOMRAM READ DATA
HELD DATA
WDT
SERIALLY PROCESSED DATA
LOMRAM WRITE ADDRESS
LOMRAM WRITE ENABLE
LOMCK

FIG. 105(a) PHASE
FIG. 105(b) MASTER CLOCK
FIG. 105(c) TUADC4
FIG. 105(d) FRNODTC5
FIG. 105(e) J12TPC5
FIG. 105(f) FIG. 91-②
FIG. 105(g) FIG. 91-③
FIG. 105(h) FIG. 91-④
FIG. 105(i) FIG. 91-⑤
FIG. 105(j) FIG. 91-⑥
FIG. 105(k) FIG. 91-⑦
FIG. 105(l) TUADC7
FIG. 105(m) XFRNOWENC8
FIG. 105(n) FRNOCK
C0
C1
C2
C3
C4
C5
C6
C7
C8
C9
0
RDT
FRNO RAM READ ADDRESS
READ DATA
RDT
RDT
RDT
WDT
'H' WHEN RDT = 0
'H' WHEN RDT = 15
0
FRNO RAM WRITE ADDRESS
FRNO RAM WRITE ENABLE

FIG.106(a) PHASE
FIG.106(b) MASTER CLOCK
FIG.106(c) FRNŌDTC5
FIG.106(d) TUADC5
FIG.106(e) C2V5TPC5
FIG.106(f) REXPADC5
FIG.106(g) FIG.95-⑨
FIG.106(h) REXPDTC7
FIG.106(i) J12TPC7
FIG.106(j) FIG.94-③
FIG.106(k) EXP 1/2CK
C0
C1
C2
C3
C4
C5
C6
C7
C8
C9
m
o
m+o
m+o
EXP 1/2 RAM READ ADDRESS
EXP J1
READ DATA
(RECEPTION EXPECTED VALUE)
EXP J1

FIG. 107(a) PHASE
FIG. 107(b) MASTER CLOCK
FIG. 107(c) TUDTC7
FIG. 107(d) J12TPC7
FIG. 107(e) Och READ SELECT
FIG. 107(f) 1–62ch READ SELECT
FIG. 107(g) Och ALARM BIT HOLDING FF
FIG. 107(h) FIG.102-⑧~⑩
FIG. 107(i) J12TPC7
FIG. 107(j) FIG. 86-③, FIG.91-②, FIG.92-③, FIG.94-④
FIG. 107(k) WLOMC8, WCRCC8, WTIMC8
FIG. 107(l) TUADC8
FIG. 107(m) J12TPC8
FIG. 107(n) Och WRITE ENABLE

| OPERATION | TIMING | |
|---|---|---|
| READ | TU-3 B3<br>TU-2 V5<br>TU-12 V5<br>μ-COM Read | READ COUNT VALUE OF BIP-2/8 PM<br>NOTIFY BIP-2/8 TO μ-COM |
| WRITE | TU-3 B3<br>TU-2 V5<br>TU-12 V5 | WRITE COUNT UPDATED VALUE OF BIP-2/8 PM |

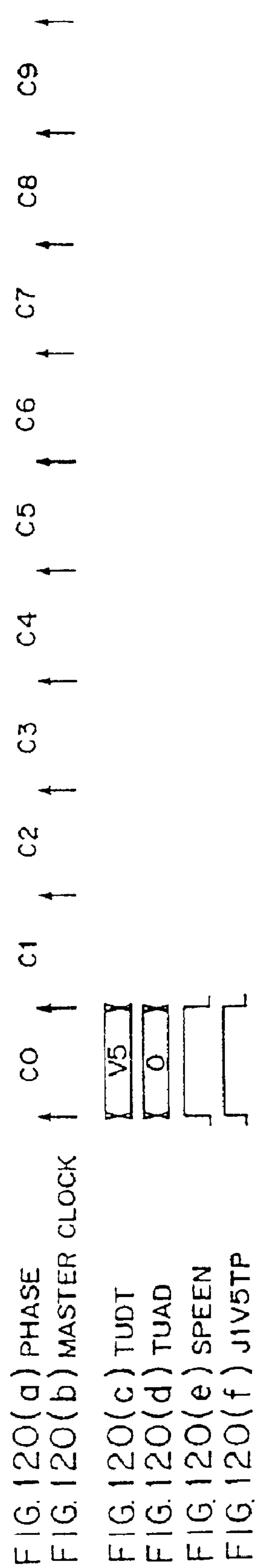
FIG.120(a) PHASE
FIG.120(b) MASTER CLOCK
FIG.120(c) TUDT
FIG.120(d) TUAD
FIG.120(e) SPEEN
FIG.120(f) J1V5TP

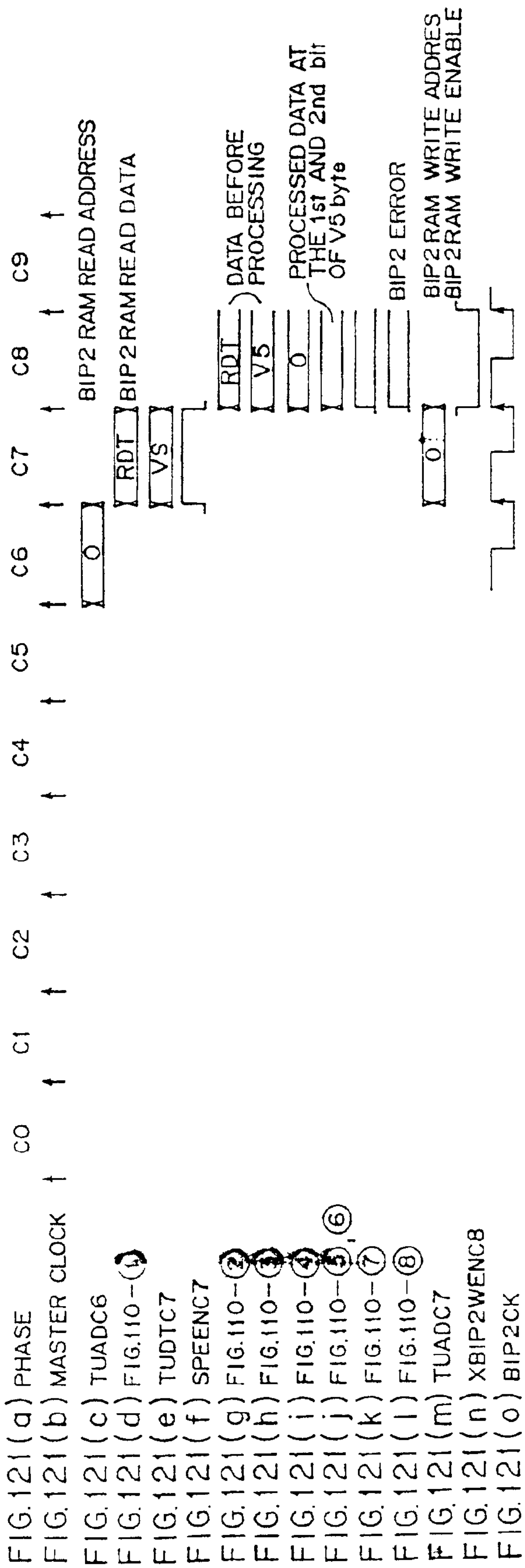
FIG.121(a) PHASE
FIG.121(b) MASTER CLOCK
FIG.121(c) TUADC6
FIG.121(d) FIG.110-(1)
FIG.121(e) TUDTC7
FIG.121(f) SPEENC7
FIG.121(g) FIG.110-(2)
FIG.121(h) FIG.110-(3)
FIG.121(i) FIG.110-(4)
FIG.121(j) FIG.110-(5),(6)
FIG.121(k) FIG.110-(7)
FIG.121(l) FIG.110-(8)
FIG.121(m) TUADC7
FIG.121(n) XBIP2WENC8
FIG.121(o) BIP2CK
C0
C1
C2
C3
C4
C5
C6
C7
C8
C9
BIP2 RAM READ ADDRESS
BIP2 RAM READ DATA
DATA BEFORE PROCESSING
PROCESSED DATA AT THE 1st AND 2nd bit OF V5 byte
BIP2 ERROR
BIP2RAM WRITE ADDRES
BIP2RAM WRITE ENABLE
RDT
V5
0

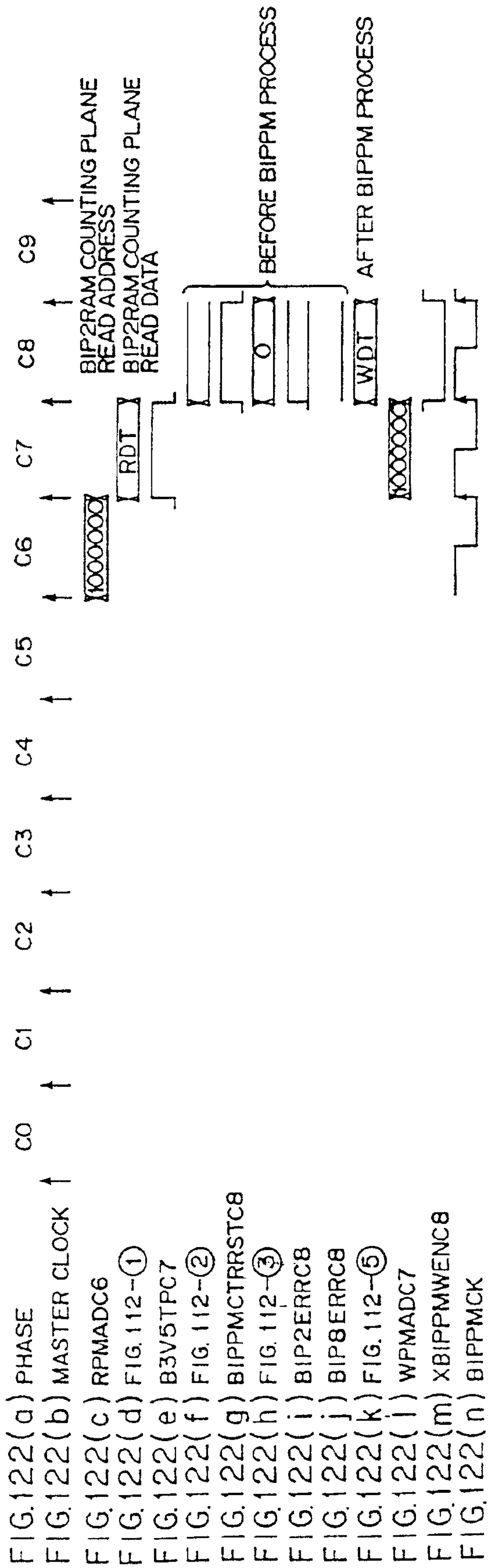
FIG.122(a) PHASE
FIG.122(b) MASTER CLOCK
FIG.122(c) RPMADC6
FIG.122(d) FIG.112-①
FIG.122(e) B3V5TPC7
FIG.122(f) FIG.112-②
FIG.122(g) BIPPMCTRRSTC8
FIG.122(h) FIG.112-③
FIG.122(i) BIP2ERRC8
FIG.122(j) BIP8ERRC8
FIG.122(k) FIG.112-⑤
FIG.122(l) WPMADC7
FIG.122(m) XBIPPMWENC8
FIG.122(n) BIPPMCK
C0
C1
C2
C3
C4
C5
C6
C7
C8
C9
1000000
RDT
0
WDT
BIP2RAM COUNTING PLANE READ ADDRESS
BIP2RAM COUNTING PLANE READ DATA
BEFORE BIPPM PROCESS
AFTER BIPPM PROCESS

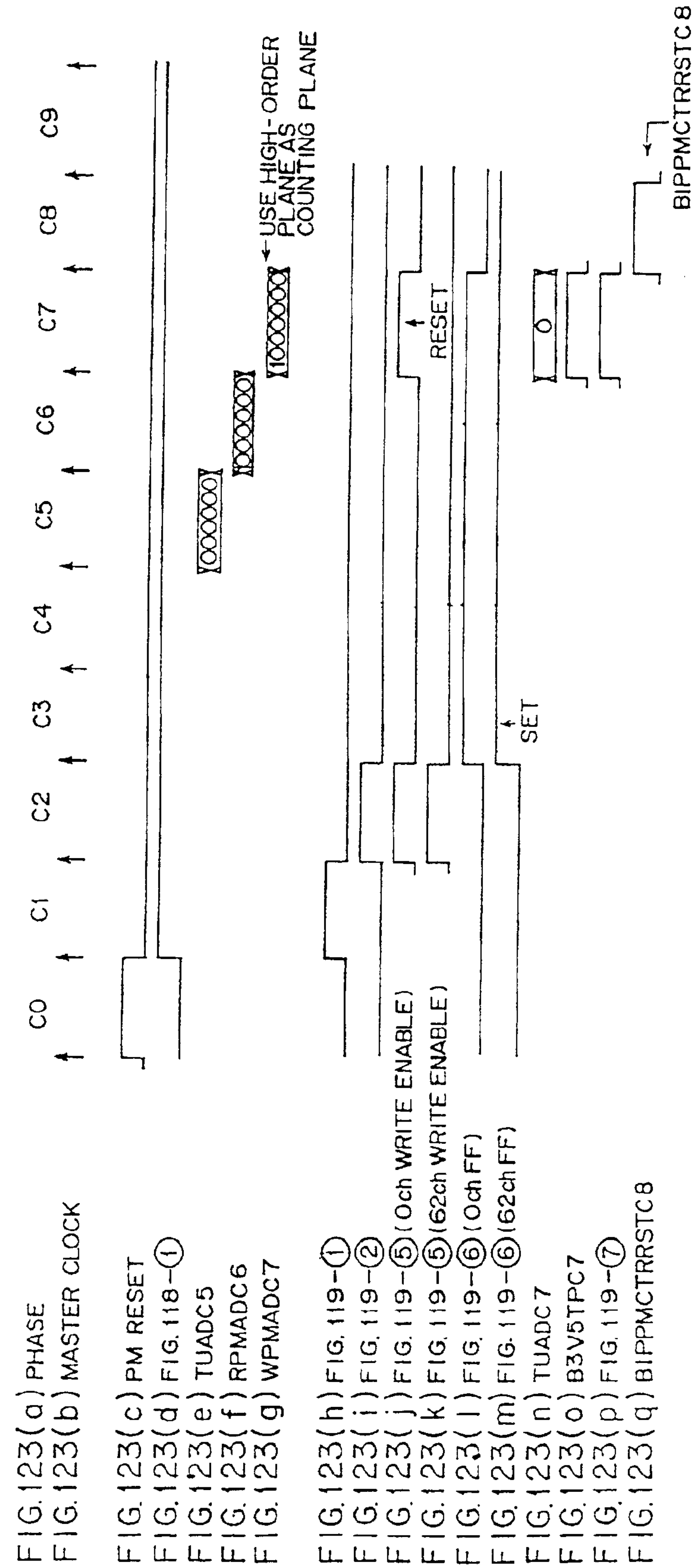
FIG.123(a) PHASE
FIG.123(b) MASTER CLOCK
FIG.123(c) PM RESET
FIG.123(d) FIG.118-①
FIG.123(e) TUADC5
FIG.123(f) RPMADC6
FIG.123(g) WPMADC7
FIG.123(h) FIG.119-①
FIG.123(i) FIG.119-②
FIG.123(j) FIG.119-⑤ (0ch WRITE ENABLE)
FIG.123(k) FIG.119-⑤ (62ch WRITE ENABLE)
FIG.123(l) FIG.119-⑥ (0ch FF)
FIG.123(m) FIG.119-⑥ (62ch FF)
FIG.123(n) TUADC7
FIG.123(o) B3V5TPC7
FIG.123(p) FIG.119-⑦
FIG.123(q) BIPPMCTRRSTC8
C0
C1
C2
C3
C4
C5
C6
C7
C8
C9
000000
000000
1000000
USE HIGH-ORDER PLANE AS COUNTING PLANE
RESET
SET
0
BIPPMCTRRSTC8

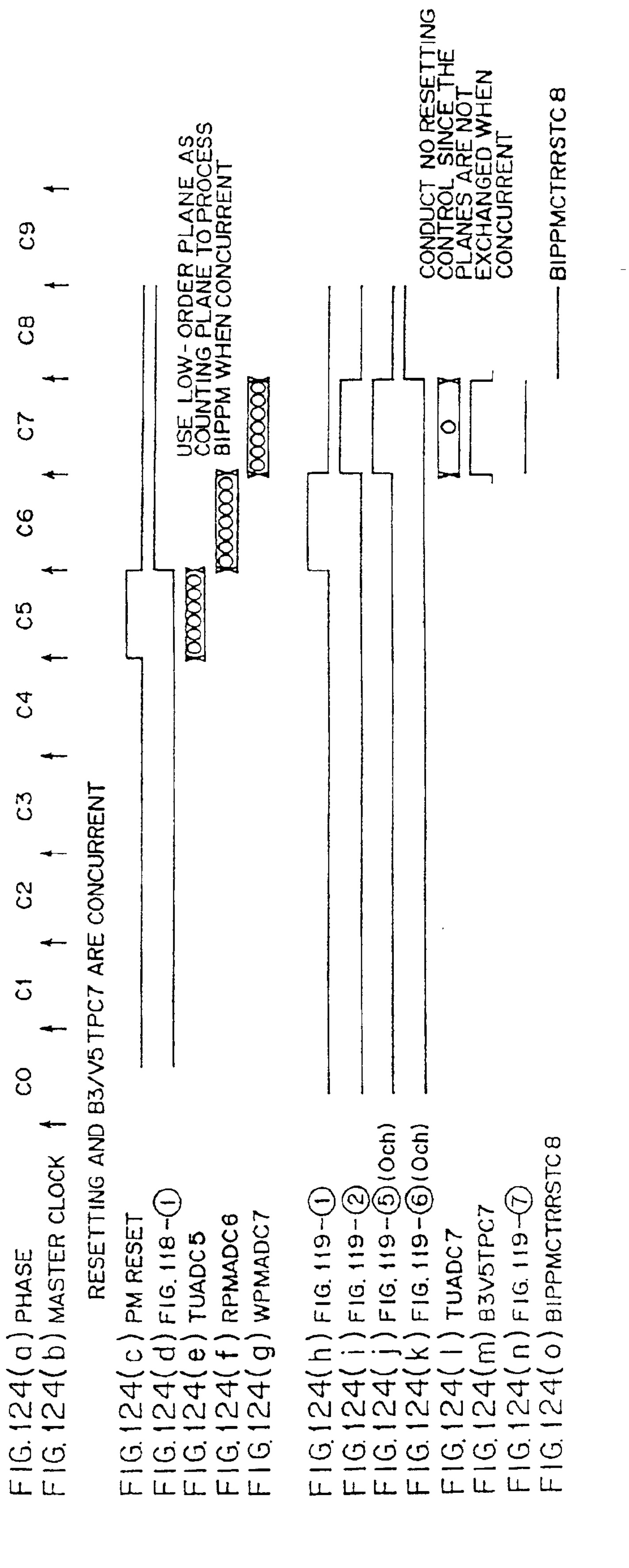
FIG.124(a) PHASE
FIG.124(b) MASTER CLOCK
C0 C1 C2 C3 C4 C5 C6 C7 C8 C9
RESETTING AND B3/V5 TPC7 ARE CONCURRENT
FIG.124(c) PM RESET
FIG.124(d) FIG.118-①
FIG.124(e) TUADC5
FIG.124(f) RPMADC6
FIG.124(g) WPMADC7
USE LOW-ORDER PLANE AS COUNTING PLANE TO PROCESS BIPPM WHEN CONCURRENT
FIG.124(h) FIG.119-①
FIG.124(i) FIG.119-②
FIG.124(j) FIG.119-⑤(Och)
FIG.124(k) FIG.119-⑥(Och)
FIG.124(l) TUADC7
FIG.124(m) B3V5TPC7
FIG.124(n) FIG.119-⑦
FIG.124(o) BIPPMCTRRSTC8
0
CONDUCT NO RESETTING CONTROL SINCE THE PLANES ARE NOT EXCHANGED WHEN CONCURRENT
BIPPMCTRRSTC8

FIG. 132 (a) PHASE
FIG. 132 (b) MASTER CLOCK
FIG. 132 (c) TUDT
FIG. 132 (d) TUAD
FIG. 132 (e) SPEEN
FIG. 132 (f) J1V5TP
FIG. 132 (g) TUADC6
FIG. 132 (h) RSLDTC7
FIG. 132 (i) TUADC7
FIG. 132 (j) RUNEQC7, RSLDTC7
FIG. 132 (k) C2V5TPC7
FIG. 132 (l) FIG. 129-②, FIG. 130-②
FIG. 132 (m) FIG. 129-③, FIG. 130-③
FIG. 132 (n) FIG. 129-④, FIG. 130-④
FIG. 132 (o) WSLDTC8
FIG. 132 (p) WUNEQC8, WSLMC8
FIG. 132 (q) TUADC7
FIG. 132 (r) XSLWENC8
FIG. 132 (s) SLCK
FIG. 132 (t) FRNODTC5
FIG. 132 (u) C2V5TPC5
FIG. 132 (v) FIG. 95-⑧
FIG. 132 (w) TUADC5
FIG. 132 (x) FIG. 95-⑨
FIG. 132 (y) REXPSLC7
FIG. 132 (z) C2V5TPC7
FIG. 132 (α) FIG. 130-⑤
C0
C1
C2
C3
C4
C5
C6
C7
C8
C9
C2
0
SL RAM READ ADDRESS
SL RAM READ DATA
RDT
ALARM BIT BEFORE PROCESSING
DATA BEFORE PROCESSING
PROCESSED DATA
PROCESSED ALARM BIT
SL RAM WRITE ADDRESS
SL RAM WRITE ENABLE
m
EXP 1/2 READ ADDRESS
EXP 1/2 READ DATA
SLEXPDT

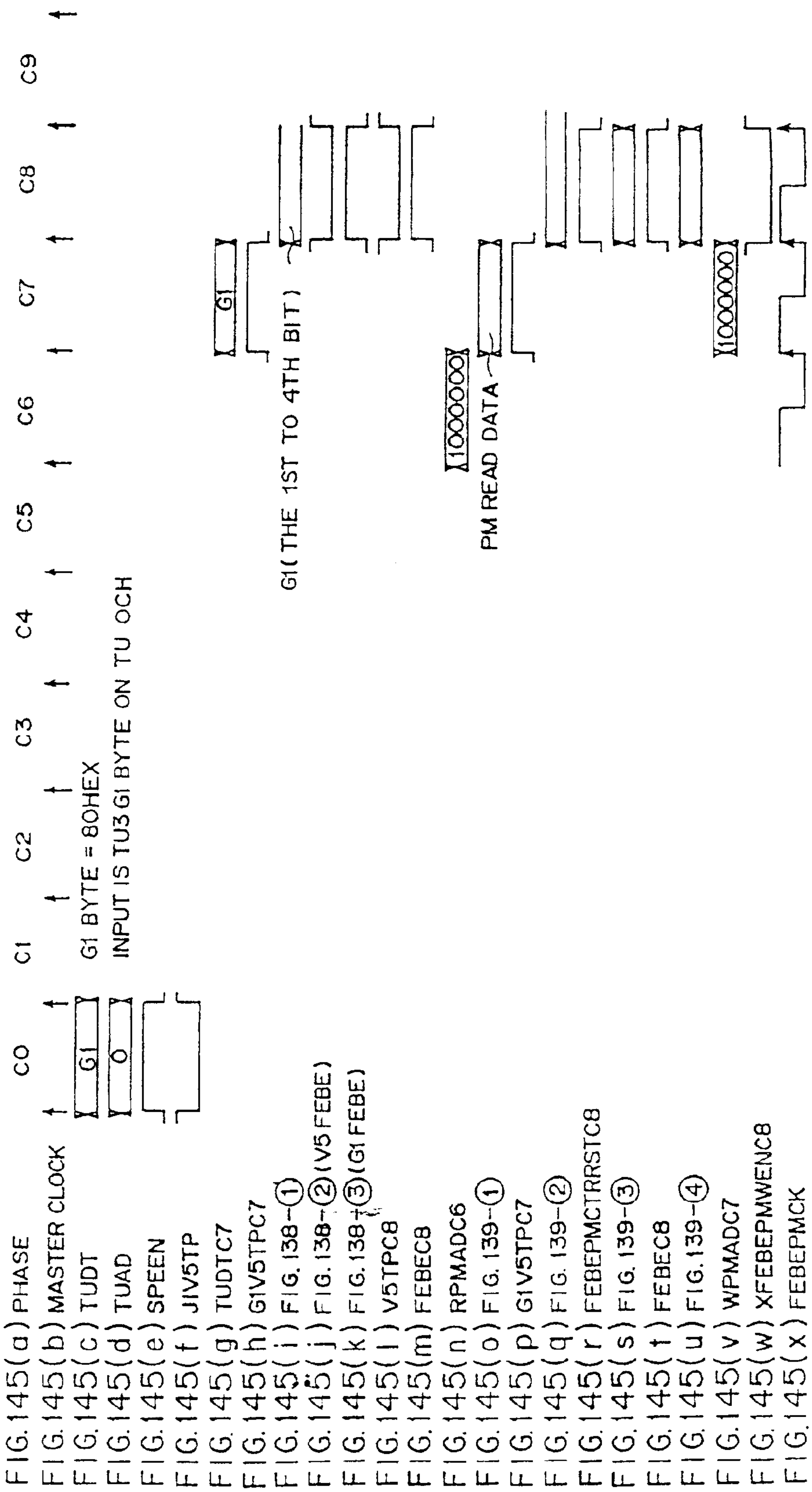
FIG.145(a) PHASE
FIG.145(b) MASTER CLOCK
FIG.145(c) TUDT
FIG.145(d) TUAD
FIG.145(e) SPEEN
FIG.145(f) JIV5TP
FIG.145(g) TUDTC7
FIG.145(h) G1V5TPC7
FIG.145(i) FIG.138-①
FIG.145(j) FIG.138-② (V5 FEBE)
FIG.145(k) FIG.138-③ (G1 FEBE)
FIG.145(l) V5TPC8
FIG.145(m) FEBEC8
FIG.145(n) RPMADC6
FIG.145(o) FIG.139-①
FIG.145(p) G1V5TPC7
FIG.145(q) FIG.139-②
FIG.145(r) FEBEPMCTRRSTC8
FIG.145(s) FIG.139-③
FIG.145(t) FEBEC8
FIG.145(u) FIG.139-④
FIG.145(v) WPMADC7
FIG.145(w) XFEBEPMWENC8
FIG.145(x) FEBEPMCK
C0
C1
C2
C3
C4
C5
C6
C7
C8
C9
G1
0
G1 BYTE = 80HEX
INPUT IS TU3 G1 BYTE ON TU OCH
G1
G1( THE 1ST TO 4TH BIT )
1000000
PM READ DATA
1000000

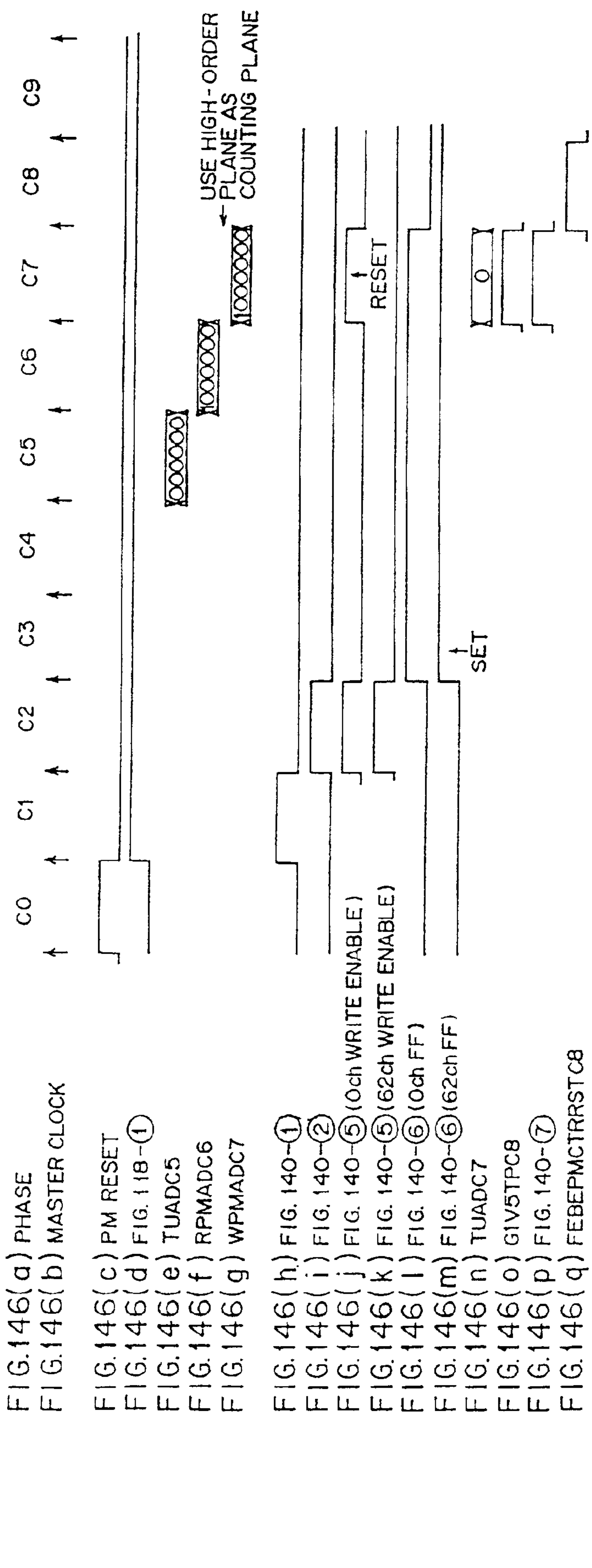
FIG.146(a) PHASE
FIG.146(b) MASTER CLOCK
FIG.146(c) PM RESET
FIG.146(d) FIG.118-①
FIG.146(e) TUADC5
FIG.146(f) RPMADC6
FIG.146(g) WPMADC7
FIG.146(h) FIG.140-①
FIG.146(i) FIG.140-②
FIG.146(j) FIG.140-⑤(0ch WRITE ENABLE)
FIG.146(k) FIG.140-⑤(62ch WRITE ENABLE)
FIG.146(l) FIG.140-⑥(0ch FF)
FIG.146(m) FIG.140-⑥(62ch FF)
FIG.146(n) TUADC7
FIG.146(o) G1V5TPC8
FIG.146(p) FIG.140-⑦
FIG.146(q) FEBEPMCTRRSTC8
C0
C1
C2
C3
C4
C5
C6
C7
C8
C9
000000
1000000
1000000
USE HIGH-ORDER PLANE AS COUNTING PLANE
RESET
SET
0

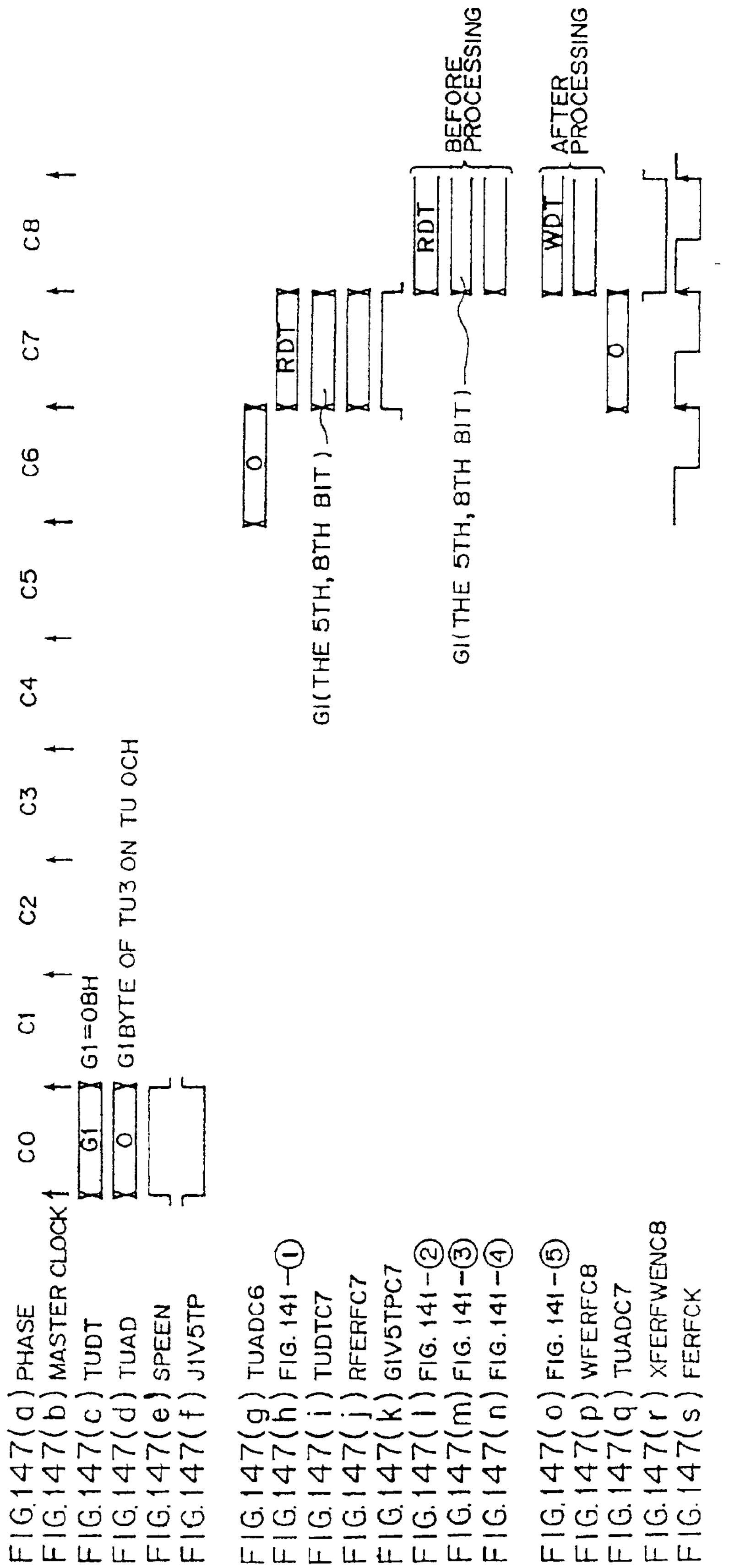
FIG.147(a) PHASE
FIG.147(b) MASTER CLOCK
FIG.147(c) TUDT
FIG.147(d) TUAD
FIG.147(e) SPEEN
FIG.147(f) J1V5TP
FIG.147(g) TUADC6
FIG.147(h) FIG. 141 —①
FIG.147(i) TUDTC7
FIG.147(j) RFERFC7
FIG.147(k) G1V5TPC7
FIG.147(l) FIG. 141 —②
FIG.147(m) FIG. 141 —③
FIG.147(n) FIG. 141 —④
FIG.147(o) FIG. 141 —⑤
FIG.147(p) WFERFC8
FIG.147(q) TUADC7
FIG.147(r) XFERFWENC8
FIG.147(s) FERFCK
C0
C1
C2
C3
C4
C5
C6
C7
C8
G1
G1=0BH
0
G1BYTE OF TU3 ON TU OCH
0
RDT
G1( THE 5TH, 8TH BIT )
RDT
G1( THE 5TH, 8TH BIT )
BEFORE PROCESSING
WDT
AFTER PROCESSING
0

F I G. 154
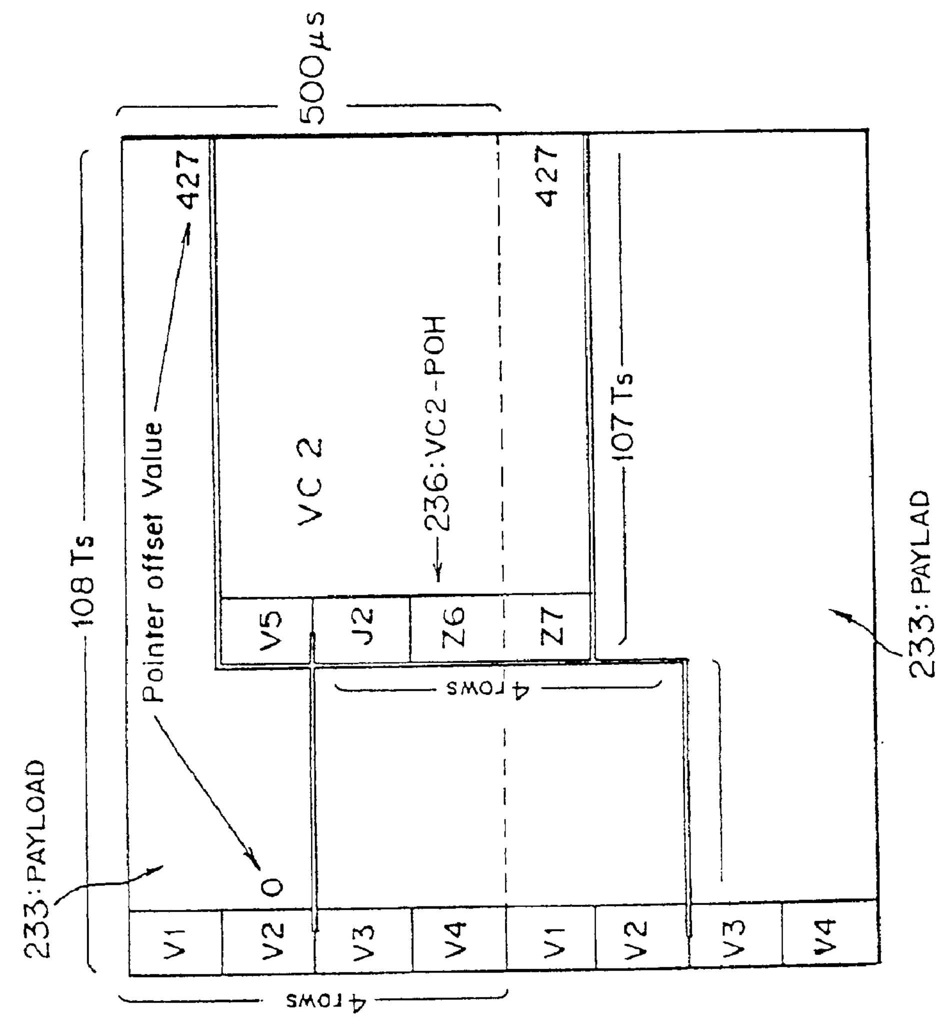

FIG.162

| Frame No. | | Path trace DATA | | | | | | |
|---|---|---|---|---|---|---|---|---|
| | MSB | 2 | 3 | 4 | 5 | 6 | 7 | LSB |
| 0 | 1 | C | C | C | C | C | C | C |
| 1 | 0 | X | X | X | X | X | X | X |
| 2 | 0 | X | X | X | X | X | X | X |
| ⁝ | ⁝ | ⁝ | ⁝ | ⁝ | ⁝ | ⁝ | ⁝ | ⁝ |
| 13 | 0 | X | X | X | X | X | X | X |
| 14 | 0 | X | X | X | X | X | X | X |
| 15 | 0 | X | X | X | X | X | X | X |

C: CRC-7 PARITY BIT

X: ASCII DATA BIT

BIT 1: MULTIFRAME INDICATOR
(1000000000000000)

| Frame No. | | Path trace DATA | | | | | | |
|---|---|---|---|---|---|---|---|---|
| | MSB | 2 | 3 | 4 | 5 | 6 | 7 | LSB |
| 0 | 1 | C | C | C | C | C | C | C |
| 1 | 0 | X | X | X | X | X | X | X |
| 2 | 0 | X | X | X | X | X | X | X |
| ∫ | ∫ | ∫ | ∫ | ∫ | ∫ | ∫ | ∫ | ∫ |
| 13 | 0 | X | X | X | X | X | X | X |
| 14 | 0 | X | X | X | X | X | X | X |
| 15 | 0 | X | X | X | X | X | X | X |
| 0 | 1 | C | C | C | C | C | C | C |
| 1 | 0 | X | X | X | X | X | X | X |
| ⋮ | | | | ⋮ | | | | ⋮ |

※CRC OPERATION

CRC-7 GENERATING POLYNOMIAL : $X^7+X^3+1$

C:CRC-7 PARITY BIT

※CONDUCT CRC ARITHMETIC WITH RECEIVED DATA OF FRAME No.O AS BO(HEX)

| C2 byte | | | | | | | | Hex Code (HEX) | Composition |
|---|---|---|---|---|---|---|---|---|---|
| B1 | B2 | B3 | B4 | B5 | B6 | B7 | B8 | | |
| 0 | 0 | 0 | 0 | 0 | 0 | 0 | 0 | 0 0 | Unequipped |
| 0 | 0 | 0 | 0 | 0 | 0 | 0 | 1 | 0 1 | equipped-non-specific |
| 0 | 0 | 0 | 0 | 0 | 0 | 1 | 0 | 0 2 | TUG structure |
| 0 | 0 | 0 | 0 | 0 | 0 | 1 | 1 | 0 3 | locked TU |
| 0 | 0 | 0 | 0 | 0 | 1 | 0 | 0 | 0 4 | Asynchronous mapping of 34.368 and 44.736 kbit/s into the Container-3 |
| 0 | 0 | 0 | 1 | 0 | 0 | 1 | 0 | 1 2 | Asynchronous mapping of 139.264 kbit/s into the Container-4 |
| 0 | 0 | 0 | 1 | 0 | 0 | 1 | 1 | 1 3 | ATM mapping |
| 0 | 0 | 0 | 1 | 0 | 1 | 0 | 0 | 1 4 | MAN (Dual Queue Dual Bus) mapping |
| 0 | 0 | 0 | 1 | 0 | 1 | 0 | 1 | 1 5 | Fiber Distributed Data Interface mapping |
| 1 | 1 | 1 | 1 | 1 | 1 | 1 | 0 | F E | 0.181 test signal (TSS1 to TSS3) mapping |
| 1 | 1 | 1 | 1 | 1 | 1 | 1 | 1 | F F | VC-AIS |

| NUMBER OF DETECTED ERROR(S) IN B3 BYTE (ON TRANSMITTING SIDE) | G1 (1～4) | | | | NUMBER OF DETECTED ERROR(S) AS FEBE (ON RECEIVING SIDE) |
|---|---|---|---|---|---|
| | MSB | 2 | 3 | 4 | |
| 0 | 0 | 0 | 0 | 0 | 0 |
| 1 | 0 | 0 | 0 | 1 | 1 |
| 2 | 0 | 0 | 1 | 0 | 2 |
| 3 | 0 | 0 | 1 | 1 | 3 |
| 4 | 0 | 1 | 0 | 0 | 4 |
| 5 | 0 | 1 | 0 | 1 | 5 |
| 6 | 0 | 1 | 1 | 0 | 6 |
| 7 | 0 | 1 | 1 | 1 | 7 |
| 8 | 1 | 0 | 0 | 0 | 8 |
| NOT OUTPUT | 1<br>1 | 0<br>1 | 0<br>~<br>1 | 1<br>1 | 0 |

FIG.174

| NUMBER OF DETECTED ERROR(S) IN V5 BYTE (TRANSMITTING SIDE) | V5(3) | NUMBER OF DETECTED ERROR(S) AS FEBE (RECEIVING SIDE) |
|---|---|---|
| 0 | 0 | 0 |
| 1 | 1 | 1 |
| 2 | 1 | 1 |

FIG.175

| V5 byte | | | Hex Code (HEX) | Composition |
|---|---|---|---|---|
| B5 | B6 | B7 | | |
| 0 | 0 | 0 | 0 | Unequipped |
| 0 | 0 | 1 | 1 | equipped-non-specific |
| 0 | 1 | 0 | 2 | Asynchronous |
| 0 | 1 | 1 | 3 | Bit synchronous |
| 1 | 0 | 0 | 4 | Byte synchronous |
| 1 | 0 | 1 | 5 | Reserved |
| 1 | 1 | 0 | 6 | 0.181 test signal |
| 1 | 1 | 1 | 7 | VC-AIS |

FIG.176(a) BIP ERROR
FIG.176(b) P.M COUNTER
FIG.176(c) INV OCCURRENCE CONDITION
FIG.176(d) P.M RESET
FIG.176(e) P.M LATCH
FIG.176(f) P.M INV

FIG.177(a) FEBE
FIG.177(b) P.M COUNTER
FIG.177(c) FERF
FIG.177(d) FERF INVSET
FIG.177(e) P.M RESET
FIG.177(f) P.M LATCH
FIG.177(g) P.M INV

POINTER PROCESSING APPARATUS, POH TERMINATING PROCESS APPARATUS, METHOD OF POH TERMINATING PROCESS AND POINTER/POH TERMINATING PROCESS APPARATUS IN SDH TRANSMISSION SYSTEM

This application is a division of application Ser. No. 08/852,841 now U.S. Pat. No. 6,157,658 filed on May 7, 1997.

BACKGROUND OF THE INVENTION (1) Field of the Invention

The present invention relates to a pointer processing apparatus, a POH terminating process apparatus, a method of POH terminating process and a pointer/POH terminating process apparatus in an SDH transmission system suitable for use in a pointer process and a Path-Overhead (POH) terminating process at the time of information transmission in a synchronous terminal network based on synchronous digital hierarchy (SDH) standardized by ITU-T (International Telecommunication Union-Telecommunication Sector).

With high-integrated and low power-consuming LSIs (large-scale integrated circuits) of these days, the development in a technique of semiconductor devices has been realizing various system levels of functions in one chip of an LSI. It is strongly demanded these years to decrease a size and a power consumption of a system (an SDH transmission apparatus) by inventing and configuring a hardware structure such that a scale of the hardware or a power consumption is decreased as much as possible and by equipping more functions on one chip of an LSI so as to configure the system (the SDH transmission system) with a small number of LSIs.

(2) Description of the Related Art (A) Description of an outline of the SDH transmission system SDH has been specified and standardized in order to unify interfaces for effectively multiplexing high-speed services and existing low-speed services in various countries in the world, as well known. In SDH, all transfer rates (bit rates) of data that should be transferred are unified to data transfer rates (155 Mbps×n: wherein n=1, 4, 16, 64) whose basic rate (multiplexing unit) is 155 Mbps (155.52 Mbps, to be exact) and the data is multiplexed, whereby various data including existing low-speed data (lower digital stage information) can be multiplexed. SDH can thereby flexibly cope with new services in the future.

In concrete, SDH employs a system in which a virtual "box" called a virtual container (VC) is defined, some pieces of lower digital stage information are accommodated in the "box" to be made higher digital stage information, and these "boxes" are collected and accommodated in a larger "box", whereby various pieces of information having different transmission rates are finally accommodated in one large "box" and transmitted.

As shown in FIG. 148, for example, a basic multiplexing unit in SDH is called an STM-1 (Synchronous Transfer Mode Level 1) frame. The STM-1 frame accommodates one AU-4 to which an administrative unit pointer (AU (Administrative Unit) pointer) used to indicate an accommodation position of VC-4 described later and synchronize the frequency is added. Further, a frame of VC-4 accommodates 1 channel of data of 138 Mbps series called C (Container)-4 or 3 channels of TUG (Tributary Unit Group)-3.

Still further, in the frame of TUG-3, 1 channel of TU (Triburary Unit)-3 (34 Mbps series) or 7 channels of TUG-2 (6 Mbps series) are multiplexed, and in TUG-2, 1 channel of TU-2 or 3 channels of TU-12 are multiplexed. The above TU-3 is a frame formed in such a manner that a path overhead (POH: transfer destination information) is added to a frame of 34 Mbps series called C-3 to form VC-3 and a TU pointer used to indicate an accommodation position and synchronize the frequency is added to the VC-3.

TU-2 is a frame in which a POH is added to a frame of C-2 (6 Mbps series) to form VC-2 and a TU pointer is further added to the VC-2. TU-12 is a frame in which a POH is added to C-12 (2 Mbps series) to form VC-12 and a TU pointer is further added to the VC-12.

In one frame of an STM-1 signal, a maximum of 3 channels of TU-3, a maximum of 21 channels of TU-2 or a maximum of 63 channels of TU-12 can be multiplexed.

Now, a frame format of each of the above STM-1, TU-3, TU-3 and TU-12 will be described. Incidentally, the above TU-3, TU-2, TU-12 and the like will be hereinafter described simply as TU3, TU2, TU12 and so on.

(A-1) STM-1 Frame Format

FIG. 149 is a diagram showing a frame format of above STM-1. As shown in FIG. 149, an STM-1 frame has a two-dimensional byte array in 9 rows by 270 columns (bytes). Leading 9 rows by 9 columns consist of a section overhead (SOH) 231 and an AU (AU4) pointer 232. The following 9 rows by 261 columns are called a payload (SPE: Synchronous Payload Envelope) 233 used to accommodate multiplexed information.

The section overhead 231 consists of various operation maintenance information such as A1 and A2 bytes indicating a frame synchronization pattern of the STM-1 frame, B1 byte used to supervise a code error, etc. The AU4 pointer 232 consists of H1 bytes (H1#1–H1#3 bytes), H2 bytes (H2#1–H2#3 bytes) and H3 bytes (H3#1–H3#3 bytes) indicating an accommodation position (a leading address) of VC (VC4: refer to FIG. 150) in the payload 232.

Generally, an actual AU4 pointer value is stored in the above H1 bytes (H1#1 byte) and H2 bytes (H2#1 byte), and a fixed value is stored as concatenation pointer (CI: Concatenation Indication) in H2#2 byte, H2#2 byte, H2#2 byte and H2#2 byte.

As shown in FIG. 149, an offset pointer value indicating an address of a leading byte of VC4 is such defined that the 0th address starts after the H2#2 byte and the 782nd address ends before the H1#1 byte, for example. Accordingly, if the AU4 pointer value is "0", it means that a frame phase of STM-1 coincides with that of VC4 so that the VC4 is continuously accommodated immediately after the H3 bytes (H2#2 byte).

If the AU4 pointer value is a value other than "0", it means that a frame phase of STM-1 does not coincide with that of VC4 so that the VC4 is accommodated such that a leading byte (J1 byte) of the VC4 positions at an address shifted from the 0th address by a deviation of the phase as shown in FIG. 150, for example. Meanwhile, since an offset pointer value of AU4 is generally defined every three bytes, a frame phase of VC4 changes by 3 bytes if the pointer value changes by one.

The above H3 bytes (H3#1-H2#2 bytes) and 3 bytes following the H3 bytes are frequency adjusting bytes called negative stuff bytes and positive stuff bytes, respectively. If a minute difference exists between a clock frequency of the transmission frame (STM-1) and a clock frequency of the multiplexed information (VC4), these positive/negative stuff bytes are used (i.e., a stuff control is conducted) to adjust the frequency so as to absorb a difference in the clock frequency or a fluctuation in the phase of the transmission frame, thereby preventing lack of transferred information.

(A-2) TU3 Frame Format

FIG. 151 is a diagram showing a frame format of the above TU3. As shown in FIG. 151, a TU3 frame is expressed by a two-dimensional byte array in 9 rows by 86 columns (bytes). H1 bytes and H2 bytes in the leading 9 rows by 1 column are a TU (TU3) pointer used to indicate an accommodation position and synchronize a frequency of VC (VC3: refer to FIG. 152) in the payload 233. H3 bytes and 1 byte (an offset pointer value "0") following the H3 bytes are negative stuff bytes and positive stuff bytes, respectively, used to adjust the frequency (frame phase). Meanwhile, a remaining part of 6 rows by 1 column other than the H1 through H3 bytes in the leading 9 rows by 1 column is fixed stuff bytes (Fixed Stuff).

As shown in FIG. 151, an offset pointer value showing an address of a leading byte of VC3 is such defined that the 0th address starts after the H3 byte and the 764th address ends before the H3 bytes.

Accordingly, if a TU3 pointer value is "0", it means that a frame phase of TU3 coincides with that of VC3 so that the VC3 is continuously accommodated immediately after (the 0th address) the H3 bytes.

If the TU3 pointer value is a value other than "0", it means that a frame phase of TU3 does not coincide with that of VC3 so that VC3 is successively accommodated such that a leading byte (J1 byte) of VC3 is positioned at an address shifted from the 0th address by a deviation of the phase as shown in FIG. 152, for example.

In FIG. 152, a part of 9 rows by 1 line including J1 byte indicated by a reference numeral 235 is called a path overhead of VC3 (VC3-POH), which is given at a point where a path and a defined VC3 path are assembled (multiplexing process), and retained up to a dimultiplexing point (dimultiplexing process) after information is transmitted. A state of code errors and the like in the transmitted information can be monitored end-to-end by monitoring the VC3-POH.

For this, the VC3-POH 235 has a format including, in addition to the above J1 byte, B3 byte, C2 byte, G1 byte, F2 byte, H4 byte and Z3 to Z5 bytes. A function of each of the above bytes is as below:

(1) J1 byte: called a path trace signal, used (monitored) to confirm on the receiving side whether a connection with a transmitting side normally continues or not (confirming connection of a path) by repeatedly transmitting a signal in a fixed pattern;

(2) B3 byte; used to monitor an error in a path, an operation result obtained through an operating process called BIP(Bip)8, which will be described later, being inserted as B3 byte of the next frame;

(3) C2 byte: a byte (a signal label) used to represent mapping configuration of VC3, at which various information such as UNEQ indication indicating that VC3 does not accommodate a payload, etc. is set, as will be described later;

(4) G1 byte: a byte used to show a status of a path, used for a function (FEBE) to send back a received result of monitoring an error in a path to the transmitting side of VC3 and a function of far end received failure (FERF) to send back a state of termination of the path to the transmitting side;

(5) F2 byte; a byte which can be freely used by a network operator in the case of a user channel;

(6) Z3 to Z5 bytes: bytes internationally reserved as spares;

According to an embodiment of this invention, J1 byte, B3 byte, C2 byte and G1 byte among the above bytes are monitored (terminated) in a POH terminating process which will be described later.

(A-3) TU2 Frame Format

FIG. 153 is a diagram showing a frame format of the above TU2. As shown in FIG. 153, a TU2 frame has a two-dimensional byte array in 4 rows by 108 columns (bytes). V1 byte and V2 byte in the leading 4 rows by 1 column are a TU (TU2) pointer used to indicate an accommodation position and synchronize a frequency of VC2 (refer to FIG. 154). V3 byte and 1 byte following the V3 byte (to the right on the sheet) are a negative stuff byte and a positive stuff byte, respectively, used to adjust the frequency (frame phase). Incidentally, V4 byte is a byte internationally reserved to be used in the future.

As shown in FIG. 153, an offset pointer value showing an address of a leading byte of VC2 is such defined that the 0th address starts after V2 byte and the 427th address ends before V2 byte. Accordingly, if a TU2 pointer value is "0", it means that a frame phase of TU2 coincides with that of the VC2 so that VC2 is continuously accommodated immediately after V2 byte (the 0th address), as well.

If the TU2 pointer value is a value other than "0", it means that a frame phase of TU2 does not coincide with that of VC2 so that VC2 is accommodated such that a leading byte (V5 byte) of VC2 is positioned at an address shifted from the 0th address by a deviation of the phase as shown in FIG. 154, for example.

In FIG. 154, a part of 4 rows by 1 column including V5 byte indicated by a reference numeral 236 is called a path overhead of VC2 (VC2-POH). By monitoring the VC2-POH 236, it is possible to monitor a state of a code error, etc. of transmitted information of VC2 end-to-end.

For this, the VC2-POH 236 has a format including, in addition to the above-mentioned V5 byte, J2 byte, Z6 byte and Z7 byte. A function of each of the above bytes will be described later where a TU12 frame format is described since a path overhead of VC12 has the same format as the VC2-POH 236.

(A-4) TU12 Frame Format

FIG. 155 is a diagram showing a frame format of the above TU12. As shown in FIG. 155, a TU12 frame is expressed by a two-dimensional byte array in 4 rows by 36 columns (bytes). V1 byte and V2 byte in the leading 4 rows by 1 column are a TU (TU12) pointer used to indicate an accommodation position and synchronize a frequency of VC12 (refer to FIG. 156), similarly to the above TU2 frame format. V3 byte and 1 byte following the V3 byte are a negative stuff byte and a positive stuff byte, respectively, used to adjust the frequency (frame phase). Incidentally, V4 byte in TU12 is a spare byte internationally reserved to be used in the future.

As shown in FIG. 155, an offset pointer value showing an address of the leading byte of VC12 is such defined that the 0th address starts after V2 byte and the 139th address ends before V2 byte. Accordingly, if the TU12 pointer value is "0", it means that a frame phase of TU12 coincides with that of VC12 so that the VC12 is continuously accommodated immediately after (the 0th address) V2 byte.

If the TU12 pointer value is a value other than "0", it means that a frame phase of TU12 does not coincide with that of VC12 so that VC12 is accommodated such that a leading byte (V5 byte) of VC12 is positioned at an address shifted from the 0th address by a deviation of the phase as shown in FIG. 156, for example.

In FIG. 156, a part of 4 rows by 1 line (column) including V5 byte indicated by a reference numeral 237 is called a path overhead (VC12-POH) of VC12, which has a format including, similarly to VC2-POH 236, J2 byte, Z6 byte and Z7 byte, in addition to the above-mentioned V5 byte. A function of each of the above bytes is as below:

(1) V5 byte: a byte used for path-error monitoring on VC2 or VC12 through an operating process called BIP2, which will be described later, for FEBE used to send back to the transmitting side a notification as to whether there is received an error obtained through BIP2, for mapping configuration representation of VC2/VC12 by a signal label and for a far end received failure (FERF) of a path of VC2/VC12; namely, functions of B3, C2 and G1 bytes included in the above-mentioned VC3-POH 235 being assigned in one byte (8 bits) of V5 byte;

(2) J2 byte: a byte used as a path trace signal similarly to J1 byte included in the above-mentioned VC3-POH 235, used to confirm connection of a path;

(3) Z6 an Z7 bytes: spare bytes.

In the embodiment of this invention, V5 byte and J2 byte among the above bytes are monitored (terminated) in the POH terminating process, which will be described later.

(A-5) AU4/TU3/TU2/TU12 Pointer Format

Pointer bytes of the above pointers (AU4/TU3/TU2/TU12 pointers) have the same format as shown in FIG. 157, which consists of NDF (New Data Flag) bits (N) of 4 bits, SS bits of 2 bits, a pointer value of 10 bits and a negative stuff byte.

Next, functions of the above DNF (New Data Flag) bits (N), the SS bits of 2 bits and the 10-bit pointer value will be described.

(1) NDF bits: showing two states below.

NDF enable ("1001")

This bit signal is used to immediately change an operation pointer value (an active pointer value) to a new pointer value. The NDF enable is detected when 3 bits or more of received pointer value coincide with the NDF bits "1001". However, if the SS bits described later are not an appropriate value, the NDF enable is not detected, which leads to an invalid pointer.

NDF disable ("0110")

This bit signal is used to transfer a normal pointer value, which also includes increment/decrement (I/D) indication described later. If the SS bits are not an appropriate value, the pointer is made to be an invalid pointer.

If the NDF bits are in a state other than the above cases (neither NDF enable nor NDF disable), the pointer is made be an invalid pointer.

(2) SS bits: this bit signal shows a size of VC in AU/TU as shown in TABLE 1 below.

TABLE 1 correspondence between signal size and SS bit value

| signal size | SS bit value |
|---|---|
| AU4 | 10 |
| TU3 | 10 |
| TU2 | 00 |
| TU12 | 10 |

(3) 10 bit pointer value: this signal shows a leading position (an offset pointer value) of VC in AU/TU as a binary code. This value consists of increment (I) bits and decrement (D) bits each of which is of 5 bits. A valid range of the pointer value is determined according to each signal size as shown in TABLE 2 below.

TABLE 2 correspondence between signal size and valid pointer value

| signal size | SS bit value |
|---|---|
| AU4 | 0–782 |
| TU3 | 0–764 |
| TU2 | 0–427 |
| TU12 | 0–139 |

The increment indication is valid when the operation pointer value and an inversion of the I bits are 3 bits or more and an inversion of the D bits is 2 bits or less. When the increment indication is effective, data in the positive stuff byte region (immediately after the H3/V3 byte) is not read. On the other hand, the decrement indication is valid when the operation pointer value and an inversion of the D bits are 3 bits or more and an inversion of the I bits is 2 bit or less. When the decrement indication is valid, data in the negative stuff byte region (the H3/V3 byte) is read.

When H1 and H2 bytes or V1 and V2 bytes are all "1", the indication becomes PAIS (Path Alarm Indication Signal) indication.

FIG. 158 is a diagram for illustrating state transition of the pointer. As shown in FIG. 158, the pointer transits three states, i.e., a normal state (NORM), an abnormal state (LOP) and an alarm detection state (PAIS). In FIG. 158, "NDF" represents NDF enable detection, "NORx3" represents normal pointer value 3-frame consecutive coincidence detection, "INC/DEC" represents increment/decrement indication detection, "INVxN" represents N-frame consecutive invalid pointer detection, "NDFxN" represents N-frame consecutive NDF-enable detection, and "AISx3" represents 3-frame consecutive PAIS-indication detection.

If a normal pointer is consecutively detected three times (over three frames), the INC/DEC indication is detected or an NDF enable signal is detected once in the normal state, a state of the pointer remains in the normal state, as shown in FIG. 158. If an invalid pointer (INV) or an NDF enable signal is consecutively detected predetermined times, the state of the pointer becomes the LOP state. If AIS is received three times consecutively, the state of the pointer becomes the alarm detection (PAIS) state.

If AIS is consecutively detected three times in the LOP state, the state of the pointer transits to the alarm state. If the invalid pointer is consecutively detected predetermined times in the alarm state, the state of the pointer transits to the LOP state. In order to make the pointer transit from the LOP state to the normal state, it is only necessary to consecutively detect the normal pointer three times. In order to make the pointer transit from the alarm state to the normal state, it is only necessary to detect the normal pointer three times successively or detect the NDF enable signal once.

(B) Description of an SDH Transmission Network

FIG. 159 is a block diagram showing an example of an SDH transmission network. In FIG. 159, reference numeral 301 denotes a subscriber terminal, 302 denotes a network terminating apparatus (NT), 303 and 306 denotes a line terminating apparatus (LT), 304 denotes a switching apparatus (SW), 305 denotes a multiplexing apparatus (MUX) and 307 denotes a relay transmission line.

In the SDH network shown in FIG. 159, data from plural subscriber terminals 301 (or a repeater) is assembled into an STM-n frame (where n=1, 4, 16, 64) by the multiplexing apparatus 305, undergone an overhead (SOH, POH) terminating/changing process and an AU/TU pointer terminating/changing process, etc. by the line terminating apparatus 306, then transmitted to an opposite side subscriber terminal 301 over the relay transmission line 307.

For this, the above line terminating apparatus 306 generally has an AU4 pointer processing unit 244' and a TU pointer processing unit 245' as a pointer processing apparatus 243 if paying an attention to a pointer processing part as shown in FIG. 160, for example. When considering the STM-1 frame as received multiplex data, a maximum of 3 channels in the case of TU3, a maximum of 21 channels in the case of TU2, or a maximum of 63 channels in the case of TU12 are multiplexed in the STM-1 frame as described before with reference to FIG. 148. Therefore, the TU pointer processing unit 245' is, in general, provided with pointer detecting units 246, elastic store (ES) memory 247 for changing the TU pointer and pointer processing (inserting) units 248 equal in number to at least frames (channels) (a maximum of 63 channels) in the TU level accommodated in the STM-1 frame.

In the TU4 pointer processing unit 244', reference numeral 244 denotes an AU4 pointer detecting unit and 245 denotes a serial/parallel (S/P) converting unit. Reference numeral 249 denotes a parallel/serial (P/S) converting unit.

The AU pointer detecting unit 244 detects (extracts) an AU4 pointer of received multiplex data (AU4 frame in which SOH of the STM-1 has been terminated) to conduct a terminating process on the AU4 pointer. The S/P converting unit 245 separates a VC4 signal in which the AU4 pointer has been terminated into frames (channels) in the TU level (TU3/TU2/TU12).

In the TU pointer processing unit 245', each of the pointer detecting units 246 analyzes the received TU pointer and detects a state of the received TU pointer. Each of the ES memory 247 transfers the data clocks from a clock on the transmission line's side to a clock on the apparatus's side. Each of the pointer processing units 248 conducts a process to calculate a pointer, insert the pointer and the like on data read out from the corresponding ES memory 247. The P/S converting unit 249 multiplexes separated data of each channel.

With the above structure, the above pointer processing apparatus 243 conducts a process on frames in the TU level multiplexed in the STM-1 frame (VC4 frame) for each channel. Namely, the S/P converting unit 245 conducts S/P conversion on data in the TU level multiplexed in the STM-1 frame to separate the data into channels, then the corresponding pointer detecting unit 246 detects (extracts) a TU pointer from each of the separated data.

The extracted data (TU pointer) on each channel is temporarily written in the corresponding ES memory 247 according to a clock on the transmission line's side, then read out according to a clock on the apparatus's side so as to transfer the clocks. After that, each data is undergone a pointer process according to a clock on the apparatus's side in the corresponding pointer processing unit 248, undergone P/S conversion by the P/S converting unit 249 to be multiplexed, then outputted as transmit multiplex data.

The pointer process conducted in each of the pointer processing units 248 signifies a process such as to analyze a received pointer, detect an alarm, update an operation pointer (an active pointer), change (transmit) a pointer, etc.

(C) Description of an Outline of the POH Terminating Process

In the SDH transmission system, there are generally set two lines, i.e., a working line and a stand-by line, between two line terminating apparatus 306. The receiving side confirms a quality of communicating lines, i.e., a working line and a stand-by line, to appropriately switch from the working line to the stand-by line according to a degree of degradation of the quality of the working line.

To this end, the line terminating apparatus 306 confirms a quality of the line on the basis of a frame format of a multiplex signal (assuming here an STM-1 frame) in the SDH transmission system and TU format signals of TU3, TU2, TU12 and the like multiplexed (mapped) in the STM-1 frame.

In concrete, the line terminating apparatus 306 conducts various POH terminating processes such as BIP (Bit Interleaved Parity) operation, etc. to monitor an error in the path on a POH in a signal of TU3, TU2 or TU12 multiplexed in the received STM-1 frame so as to detect degradation of the quality of the line, and generates a control signal used to switch a line for each of the formats of TU3, TU2 and TU12.

However, there are mapped a maximum of 3 channels in the case of TU3, a maximum of 21 channels in the case of TU2 or a maximum of 63 channels in the case of TU12 in an STM-1 frame as described above. It is therefore necessary to conduct the above POH terminating process a number of times equal to the number of channels corresponding to signal sizes of TU format signals, separately (in parallel).

For this, the line terminating apparatus 306, in general, detects a leading position of a VC-4 format from a pointer value in H1 and H2 bytes of the STM-1 frame, separates the TU format signals multiplexed in VC-4 on the basis of the detected leading position and multiplex setting information (mapping setting information) of TU3, TU2 and TU12, and conducts the POH terminating process in different circuits for respective TU channels, separately.

When signals multiplexed in a STM-1 frame are all TU12, it is necessary to conduct the POH terminating process 63 times for 63 channels in TU12. As a result, a maximum of 63 circuits for conducting the POH terminating process on 63 channels become necessary.

Next, an outline of the POH terminating process will be described.

(C1) J1 and J2 Byte Terminating Process

It is possible, as described above, to confirm connection of a path by monitoring J1 byte included in the VC3-POH 235, and J2 byte included in the VC2/VC12-POHs 236 and 237.

As shown in FIG. 161, for example, if POH ("A") is added in an apparatus on the transmitting side "#1" and POH ("B") is added as a correct line setting in an apparatus on the transmitting side "#2", an apparatus on the receiving side "#3" terminates received POHs ("A" and "B") so as to monitor J1 byte and J2 byte.

In concrete, each of the above J1 and J2 bytes (path trace signal) is a signal obtained by adding a trace signal (name of a path) consisting of 15 ASCII characters to a path signal of VC3/VC2/VC12, which has a format shown in FIG. 162, for example, and is able to transfer 15 ASCII characters (ASCII data bit "X") in a multiframe of 16 bytes.

So long as checking whether a received value (name of a receiving path) coincides with a reception expected value (name of a path that should be received) or not, the apparatus on the receiving side "#3" can confirm whether a received signal is connected to a proper apparatus or not. If not coincide, TIM (Trace Indicator Mismatch) representing that the received value does not coincide with the reception expected value is detected so that a mismatch alarm is generated.

In the frame format of a path trace signal shown in FIG. 162, the MSBs (the most significant bits) of 16 frames (totaling 16 bits) are called a multiframe indicator. By detecting the multiframe indicator ("1000 0000 0000 0000"), a path trace signal is detected. The multiframe indicator is used to detect out-of-synchronization (LOM: Loss Of Multiframe). Detection of out-of-synchronization in seven stages forward and three stages backward is conducted under conditions below:

frame disagreement detection condition: a frame indicate pattern of 16 bits in a received signal is not "1000 0000 0000 0000" when the 16th byte of the multiframe is processed;

frame agreement detection condition: the frame indicate pattern of 16 bits in a received signal is "1000 0000 0000 0000" when the 16th byte of the multiframe is processed.

In FIG. 162, bits "C" excepting the MSB in a frame numbered "0" are called CRC (Cyclic Redundancy Check)-7 parity bits, which is used in a CRC-7 operation using a generating polynomial $X^7+X^3+1$.

As shown in FIG. 163, for example, the receiving side conducts the CRC-7 operation on received data of "0", to "15" (bit 1 to 8) with received data in a frame numbered "0" (path trace data) as 80 (HEX), compares a result of the operation with received CRC bits in a frame numbered "0" of the next multiframe to detect a CRC error. Incidentally, CRC error detection is conducted in three stages forward and in three stages backward, here.

(C2) B3 Byte Terminating Process

It is possible to detect an error (code error) in a path of VC3 signals by terminating B3 byte (as to its format, refer to FIG. 164) included in the VC3-POH 235 using an error parity system called BIP8 (Bit Interleaved Parity-8) operation. In this case, even parity is applied as the error parity system.

In concrete, BIP8 operation is a technique in which parity calculation is carried out on every 8 bits of counted data (in units of byte) to count parity of the same digits of one byte as a unit as shown in FIG. 165(*a*), for example, and a result of the counting is indicated at the same digit of BIP8 as shown in FIG. 165(*b*).

For instance, the receiving side carries out the parity calculation on each byte (8 bits) of data of 1 frame (85 bytes×9=765 bytes) of a VC3 signal, compares a result of the calculation with B3 byte extracted from the next frame to detect a parity error in each of bits from the MSB to the LSB (the least significant bit), as shown in FIG. 168. When a parity error is detected in a frame, 1 alarm is generated.

(C3) C2 Byte Terminating Process

It is possible to recognize a mapping configuration of a VC signal by terminating (monitoring a signal label) C2 byte (refer to FIG. 167) included in the VC3-POH 235 so that disagreement (mismatch) of a signal label (SLM) or UNEQ (representing that a VC3 signal does not accommodate a payload).

As C2 byte (signal label), a value (a mapping code of 8 bits) set according to a mapping configuration of a VC3 signal is defined as shown in FIG. 168, for example. When the VC3 signal does not accommodate a payload, ALL "0" which represents UNEQ is set.

The receiving side monitors C2 byte. When consecutively detecting C2 byte indicating UNEQ (ALL "0") over 4 frames, the receiving side generates a UNEQ detection alarm. When detecting C2 byte with indication excepting UNEQ over 6 frames, the receiving side cancels the UNEQ detection alarm.

At this time, the receiving side compares a reception expected value of C2 byte set by a supervisor (maintenance engineer) with an actually received value of C2 byte to detect SLM. For instance, when disagreement between a received value and a reception expected value is consecutively detected 7 times, an SLM detection alarm is generated. When agreement is consecutively detected three times, the SLM detection alarm is cancelled.

(C4) G1 Byte Terminating Process

It is possible to recognize a state of a path of a VC3 signal by terminating G1 byte included in the VC3-POH 235. G1 byte has a format shown in FIG. 169, for example. High-order 4 bits of G1 byte (8 bits) are assigned as FEBE (Far End Block Error) bits [refer to ① in FIG. 169], and the following 1 bit is assigned as an FERF (Far End Receive Failure) bit [refer to ② in FIG. 169]. Incidentally, the remaining 3 bits [refer to ③ in FIG. 169] are not presently used.

FEBE bits are used to return the number of parity error bits to the opposite apparatus (transmitting side) when a B3 (B1P8) parity error is detected in a received VC3 signal. As shown in FIG. 170, for example, the number of times of error detection obtained in the B3 byte terminating process is set as an EFBE error detection number. As shown in FIG. 170, states of 8 kinds are presently defined out of states (of 16 kinds) which can be indicated with 4 bits.

FERF bit is used to notify that a failure occurs in an apparatus on the receiving side which terminates the VC3 signal to an opposite apparatus, in which "0" represents a normal state, whereas "1" represents "VC3 Far End Receive Failure" notification state.

The receiving side monitors G1 byte to detect the number of errors in the opposite apparatus when a received code of the high-order 4 bits (FEBE bits) are other than "0000", and counts them as 1 alarm. When the FERF bit is "1" is detected, the receiving side recognizes it as an FERF alarm. In this case, when the FERF bit is "1" is consecutively detected over 10 frames, an FERF alarm is generated. When the FERF bit of "0" is consecutively detected over 10 frames, the RERF alarm is cancelled.

(C5) V5 Byte Terminating Process

V5 byte included in the VC2-POH 236 or the VC12-POH 237 has a format shown in FIG. 171, for example. In V5 byte, high-order 2 bits are assigned as BIP2 bits ([refer to ① in FIG. 171], the following 1 bit is assigned as an FEBE bit [refer to ② in FIG. 171], the further following 1 bit is assigned as an RFI bit [refer to ③ in FIG. 171] of V5 byte used to notify to a microcomputer, the still further following 3 bits are assigned as a signal label [refer to ④ in FIG. 171] and the LSB 1 bit is assigned as an FERF bit [refer to ⑤ in FIG. 171].

Therefore, the receiving side can detect an error (code error) on a path of a VC2/VC12 signal through BIP2 operation, a mapping configuration of the VC2/VC12 signal from a signal label, a status of the path of the VC2/VC12 signal from FERF bit, etc. by terminating V5 byte.

In the above BIP2 operation, even parity is applied in the error parity system similarly to the BIP8 operation on B3 byte described before. The BIP2 operation employs a technique in which parity calculation is carried out every other bit of counted data (of each byte) as shown in FIG. 172(*a*), for example. For this, parity is counted in even bits and odd bits in one byte, and a result of the counting is indicated at the high-order 2 bits of V5 byte as shown in FIG. 172(*b*).

The receiving side carries out parity calculation on every 2 bits in a region of the counted data of one multiframe of the VC2/VC12 signal as shown by a meshed region in FIG.

173, compares a result of the calculation with BIP2 bits of V5 byte extracted from the next multiframe to detect a parity error with both bits of the MSB and LSB. When a parity error (a maximum of 2 bits) is detected in 1 multiframe, 1 alarm is generated.

When the receiving side detects a V5 (BIP2) parity error of received VC2/VC12, the number of parity error bits (the number of detected errors in V5 byte) is set as FEBE as shown in FIG. 174, and return to an opposite apparatus. FEBE bit of V5 byte can represent two kinds of states with one bit at present so that it is defined that "1" is always set when the number of detected errors in V5 byte is "2" or more. As a signal label of the above-mentioned V5 byte, a value [mapping codes of 3 bits (bit number B5 to B7)] set according to a mapping configuration of the VC2/VC12 signal is defined as shown in FIG. 175, for example. As a signal label, ALL "0" representing UNEQ is set when the VC2/VC12 signal does not accommodate a payload, similarly to C2 byte included in the VC3-POH 235.

The receiving side monitors the signal label. When consecutively detecting V5 byte in which the signal label indicates UNEQ (ALL "0") over 4 frames, for example, the receiving side generates a UNEQ detection alarm. When consecutively detecting V5 byte in which the signal label is other than UNEQ over 5 frames, the receiving side cancels the UNEQ detection alarm.

At this time, the receiving side compares a reception expected value of a signal label set by a supervisor with an actually received value of the signal label. When consecutively detecting disagreement of the signal label seven times, the receiving side generates a mismatch (SLM) detection alarm. When consecutively detecting agreement of the signal label three times, the receiving side cancels the SLM detection alarm.

The FERF bit is used to notify that a failure occurs in an apparatus on the receiving side which terminates a VC2/VC12 signal to an opposite apparatus, in which "0" represents a normal state, whereas "1" represents a "VC2/VC12 Far End Receive Failure notification state.

The receiving side monitors the FERF bit of V5 byte. When the FERF bit is "1" is detected, the receiving side recognizes FERF alarm. In this case, when consecutively detected FERF bit is "1" over 10 frames, the receiving side generates an RERF alarm. When consecutively detected FERF bit is "0" over 10 frames, the receiving side cancels the FERF alarm.

(C6) Performance Monitor (PM) Function

Performance monitor function is a function used for a line quality monitoring and maintenance of a transmission line in service. The number of detected parity errors (BIP8 and BIP2) and FEBE errors is counted in a cycle of a PM reset pulse fed from a microcomputer, and a result of the counting is notified to the microcomputer, as will be described later.

FIGS. 176(*a*) through 176(*f*) show an example of a performance monitoring operation on BIP errors. FIGS. 2177(*a*) through 177(*g*) show an example of the performance monitoring operation on FEBE errors.

The above pointer processing apparatus 243, however, conducts in parallel the pointer process for each channel (for each of different signal sizes accommodated in the STM-1 frame) on the STM-1 frame (multiplexed data). For this, the pointer processing apparatus 243 has the pointer detecting units 246, the ES memory 247, the pointer processing units 248, etc. equal in number to a maximum of 63 channels. This causes a large increase of a circuit scale, a power consumption, the number of circuits (wirings), etc. of the apparatus.

In the above pointer processing apparatus 243, the data clock is transferred from a clock on the transmission line's side to a clock on the apparatus's side in each of the ES memory 247 for changing the TU pointer. This causes a demand for a larger number of stages of the ES memory 247 in order to absorb affections of jitter and wander of the clock on the transmission line's side and the clock on the apparatus's side, which also leads to a large increase of a circuit scale, power consumption, the number of distributions, etc. in the apparatus.

Further, in the above pointer processing apparatus 243, a process on the AU4 pointer (a pointer changing process, in concrete) and a process on the TU pointer are separately conducted by different hardware. When a signal in the VC4 level and a signal in the VC3/VC2/VC12 level are cross-connected, it is necessary to provide different hardware such as a cross-connecting unit 224 for cross-connecting (TSI: Time Slot Interchange) each signal in the VC4 level and a cross-connect unit 225 for cross-connecting each signal in the VC3/VC2/VC12 level, which also leads to an increase of a scale of the line terminating apparatus 306.

Still further, the above SDH transmission technique, a TU format signal is separated from an STM-1 frame, and the POH terminating process is conducted on each of the TU format signal in parallel. For this, it is necessary to provide a maximum of 63 POH terminating process apparatus having the same structure corresponding to 63 channels in the line terminating apparatus 306, which also causes a large increase of a scale and a power consumption of the apparatus.

SUMMARY OF THE INVENTION

In the light of the above problems, an object of the present invention is to provide a pointer processing apparatus used in the SDH transmission system which serially conducts the (TU) pointer process on an STM-1 frame so as to largely decrease a circuit scale, a power consumption, the number of distributions, etc. thereof.

Another object of the present invention is to provide a pointer processing apparatus used in the SDH transmission system in which a storage necessary to transfer data clocks from a clock on the transmission line side to a clock on the apparatus side is minimized so as to largely decrease a circuit scale, a power consumption, the number of distributions, etc. thereof, and which can be used with a common cross-connecting apparatus when frames in different signal sizes are cross-connected.

Still another object of the present invention is to provide a POH terminating process apparatus, a method of POH terminating process and a pointer/POH terminating process apparatus, wherein a POH terminating process is serially conducted on a multiplex signal transmitted in the SDH transmission system without separating the multiplex signal into channels so that a scale and a power consumption of the apparatus can be largely decreased.

The present invention therefore provides a pointer processing apparatus in an SDH transmission system comprising an address generating unit for allocating an address to each channel of inputted multiplex data, a pointer extracting unit for extracting pointer bytes including at least H1/V1 byte and H2/V2 byte, a pointer processing unit for conducting a required pointer process, a RAM for holding an information group represented by the pointer bytes of each channel extracted from the multiplex data, an information group necessary to commence a pointer action by the received pointer bytes and an information group obtained as a result of commencement of the pointer action, obtained by the pointer extracting unit or the pointer processing unit, in a region indicated by an address generated by the address generating unit for each channel and a RAM controlling unit for controlling a sequence of operation to write-in/read-out the RAM, thereby conducting serially the pointer process on the multiplex data.

According to this invention, the pointer processing apparatus in the SDH transmission system serially holds various information groups necessary for the pointer processing obtained from the multiplex data in the RAM for each channel so as to serially conduct the pointer process without separating the multiplex data into channels. Therefore, it becomes unnecessary to provide circuits equal in number to plural channels used to conduct the pointer process so that a scale of the apparatus (circuit), a power consumption, the number of distributions between function blocks (circuits), etc. may be largely decreased.

The present invention also provides a POH terminating process apparatus in an SDH transmission system for conducting a POH terminating process on a multiplex signal in which information on a plurality of channels is multiplexed transmitted in the SDH transmission system comprising a POH terminating operation processing unit common to all channels for conducting a POH terminating operation process on the multiplex signal, and a storage unit flexibly readable and writable for storing a result of an operation conducted in the POH terminating operation processing unit for each channel, the POH terminating process apparatus conducting the POH terminating operation process in the POH terminating operation processing unit using stored information about a corresponding channel stored in the storage unit when conducting the POH terminating operation process on the multiplex signal, and storing an obtained result of the POH terminating operation in a storage area for the corresponding channel of the storage unit so as to conduct the POH terminating operation process on the multiplex signal without separating the multiplex signal into channels.

The present invention also provides a POH terminating process method used in an SDH transmission system comprising the steps of conducting a POH terminating operation process in a POH terminating operation process unit common to all channels using stored information about a result of the POH terminating process operation with respect to a corresponding channel stored in a storage unit flexibly readable and writable when a POH terminating process is conducted on a signal in which information on a plurality of channels is multiplexed transmitted in the SDH transmission system, and storing an obtained result of the POH terminating operation in a storage area for the corresponding channel, thereby conducting the POH terminating operation process without separating the multiplex signal into channels.

According to the POH terminating process apparatus and the method of POH terminating process of this invention, it is possible to conduct the POH terminating operation process on the multiplex signal transmitted in the SDH transmission system in the POH terminating operation process unit in common to all channels without separating the multiplex signal into channels. It therefore becomes unnecessary to equip circuits for the POH terminating operation process equal in number to channels multiplexed in the multiplex signal, which can largely decrease a (circuit) scale, a power consumption, etc. of the POH terminating process apparatus.

The present invention also provides a POH terminating process apparatus in an SDH transmission system for conducting a POH terminating process on a multiplex signal in which information on a plurality of channels is multiplexed transmitted in the SDH transmission system comprising a POH terminating operation processing unit common to all channels for conducting a POH terminating operation process on the multiplex signal, and a storage unit flexibly readable and writable for storing a result of an operation conducted in the POH terminating operation processing unit, wherein the POH terminating operation process unit comprises a J1/J2 byte serially terminating process unit for serially conducting a terminating process on J1 byte and J2 byte included in the multiplex signal, a B3/V5 byte serially terminating process unit for serially conducting a terminating process on BIP of B1 byte and V5 byte included in the multiplex signal and a terminating process on BIPPM of the B1 byte and V5 byte, a UNEQ/SLM serially terminating process unit for serially conducting a terminating process on UNEQ of C2 byte and V5 byte included in the multiplex signal and serially conducting a terminating process on SLM of the C2 byte and V5 byte, and an FEBE/FERF serially terminating process unit for serially conducting a terminating process on FEBE of G1 byte and V5 byte included in the multiplex signal and serially conducting a terminating process on FEBEPM of the G1 byte and V5 byte besides serially conducting a terminating process on FERF on the G1 byte and V5 byte, and wherein the storage unit stores result of operations conducted in the J1/J2 byte serially terminating process unit, the B3/V5 byte serially terminating process unit, the UNEQ/SLM serially terminating process unit and the FEBE/FERF serially terminating process unit for each channel, besides supplying stored information to the J1/J2 byte serially terminating process unit, the B3/V5 byte serially terminating process unit, the UNEQ/SLM serially terminating process unit and the FEBE/FERF serially terminating process unit.

According to the POH terminating process apparatus in the SDH transmission system of this invention, it is possible to serially conduct the terminating process on J1 and/or J2 byte to detect a multiframe pattern of the multiplex signal, the terminating process on B3 and/or V5 byte to obtain BIP (BIPPM) from the multiplex signal, the terminating process on C2 and/or V5 byte to obtain UNEQ and SLM, the terminating process on G1 and/or V5 byte to obtain FEBE (FEBEPM) and the terminating process on G1 and/or V5 byte to obtain FERF in common to all channels. Therefore, it becomes unnecessary to quip circuits for the above processes equal in number to corresponding channels, which can largely decrease a scale and a power consumption of the apparatus.

The present invention also provides a pointer/POH terminating process apparatus in an SDH transmission system for conducting a pointer process and a POH terminating process on a signal in which information on a plurality of channels is multiplexed transmitted in the SDH transmission system comprising a serial pointer processing unit for serially conducting the pointer process on a multiplex signal without separating the multiplex signal into channels, and a serial POH terminating process unit for serially conducting the POH terminating process on the multiplex signal without separating the multiplex signal into channels.

According to the pointer/POH terminating process apparatus in the SDH transmission system of this invention, it is possible to serially conduct the pointer process and the POH terminating process on the multiplex signal transmitted in the SDH transmission system without separating the multiplex signal into channels so that the apparatus can be realized in a minimum scale and with a minimum power consumption.

BRIEF DESCRIPTION OF THE DRAWINGS

FIG. 7 is a diagram showing an example of an address converting table used to illustrate an operation of the address generating unit according to the embodiment;

FIG. 10 is a diagram for illustrating an operation of the address converting unit according to the embodiment;

FIG. 12 is a diagram showing an example of contents of data retained in a RAM according to the embodiment;

FIG. 23 is a diagram showing an example of contents of data held in the RAM according to the embodiment;

FIG. 33 is a diagram showing an example of contents of data held in a RAM for changing a pointer in the modification;

FIGS. 65(*a*) through 65(*t*) are timing charts for illustrating fundamental operations of the terminating process units according to the embodiment;

FIGS. 81(*a*) through 81(*h*) are timing charts for illustrating an operation of the timing generating unit according to the embodiment;

FIGS. 82(*a*) through 82(*p*), 83(*a*) through 83(*t*) and 84(*a*) through 84(*f*) are timing charts for illustrating the operation of the timing generating unit according to the embodiment;

FIG. 90 is a diagram showing an example of a relation between information in the FRNO holding RAM and a frame number according to the embodiment;

FIG. 100 is a diagram showing an example of a relation among an address of the EXP1/EXP2 holding RAM, a frame number and a TU channel according to the embodiment;

Figure 108:
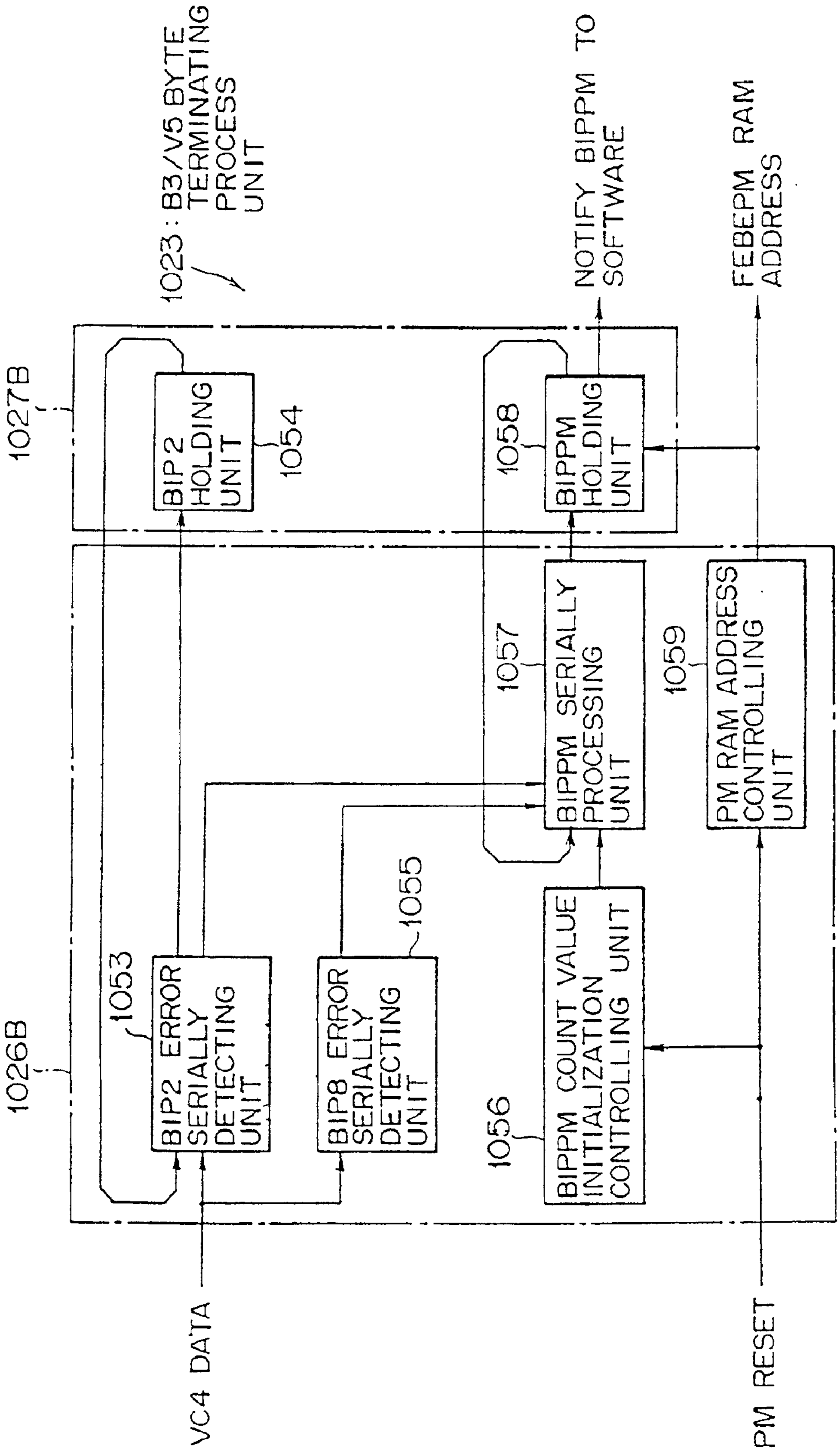
Figure 109:
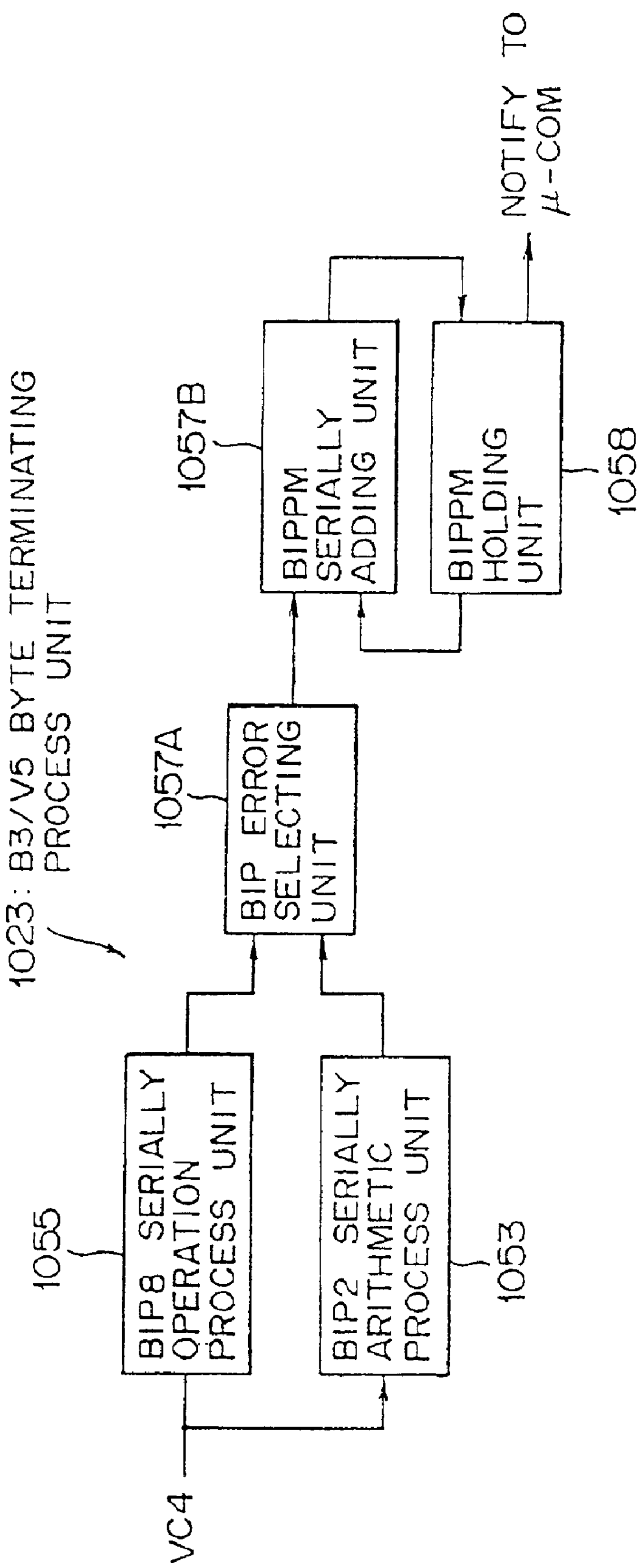
Figure 110:
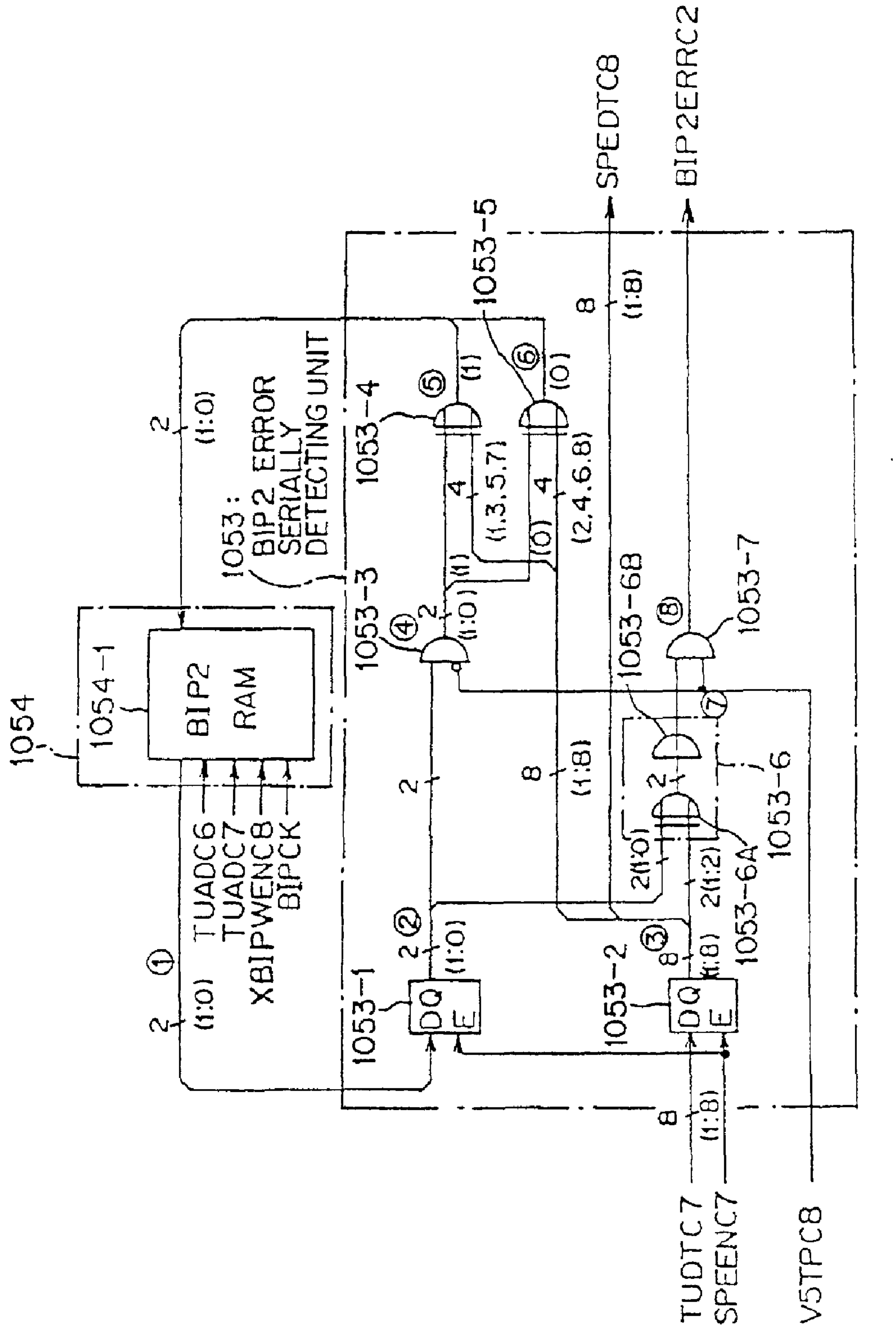
Figure 111:
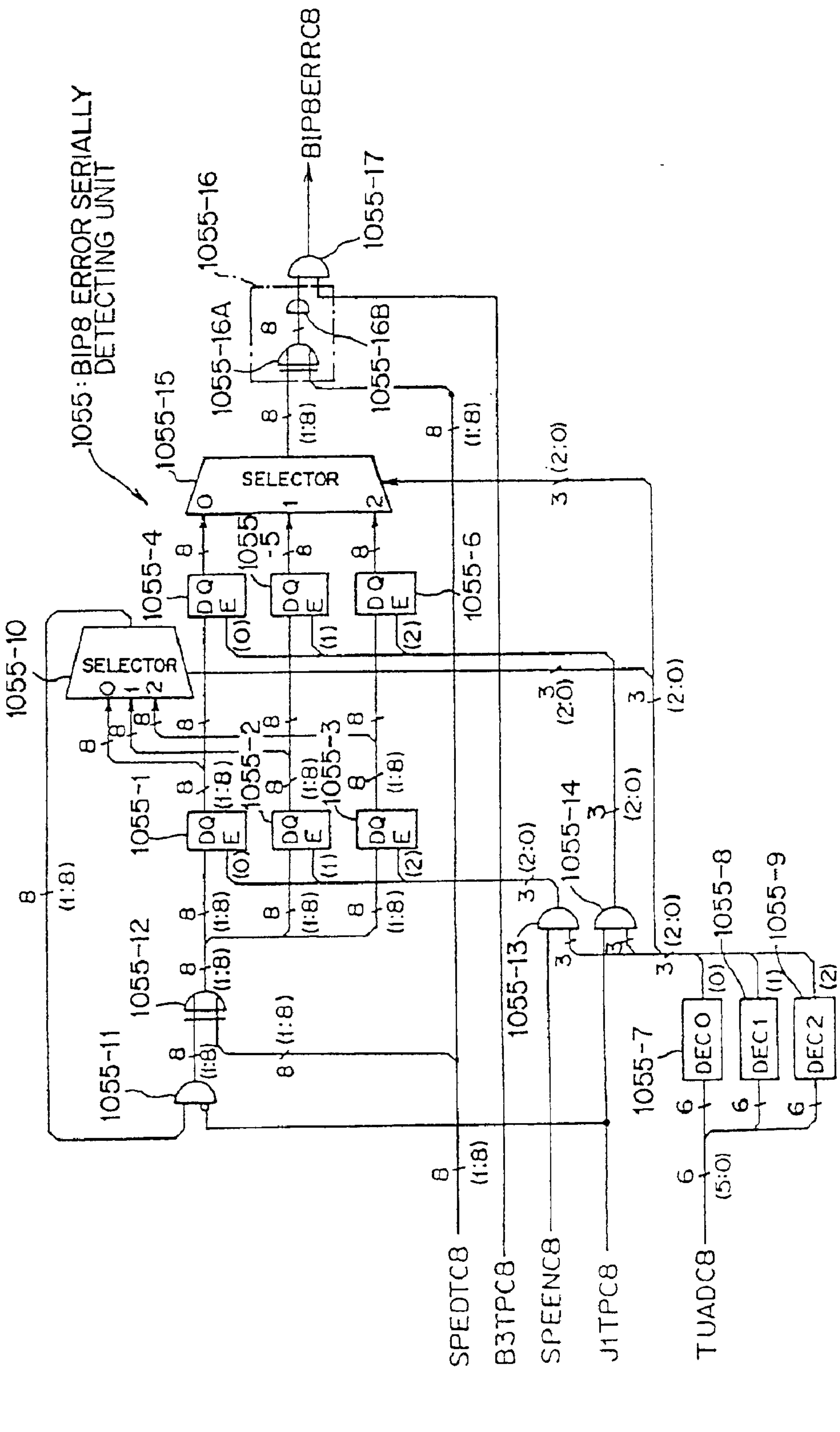
Figure 112:
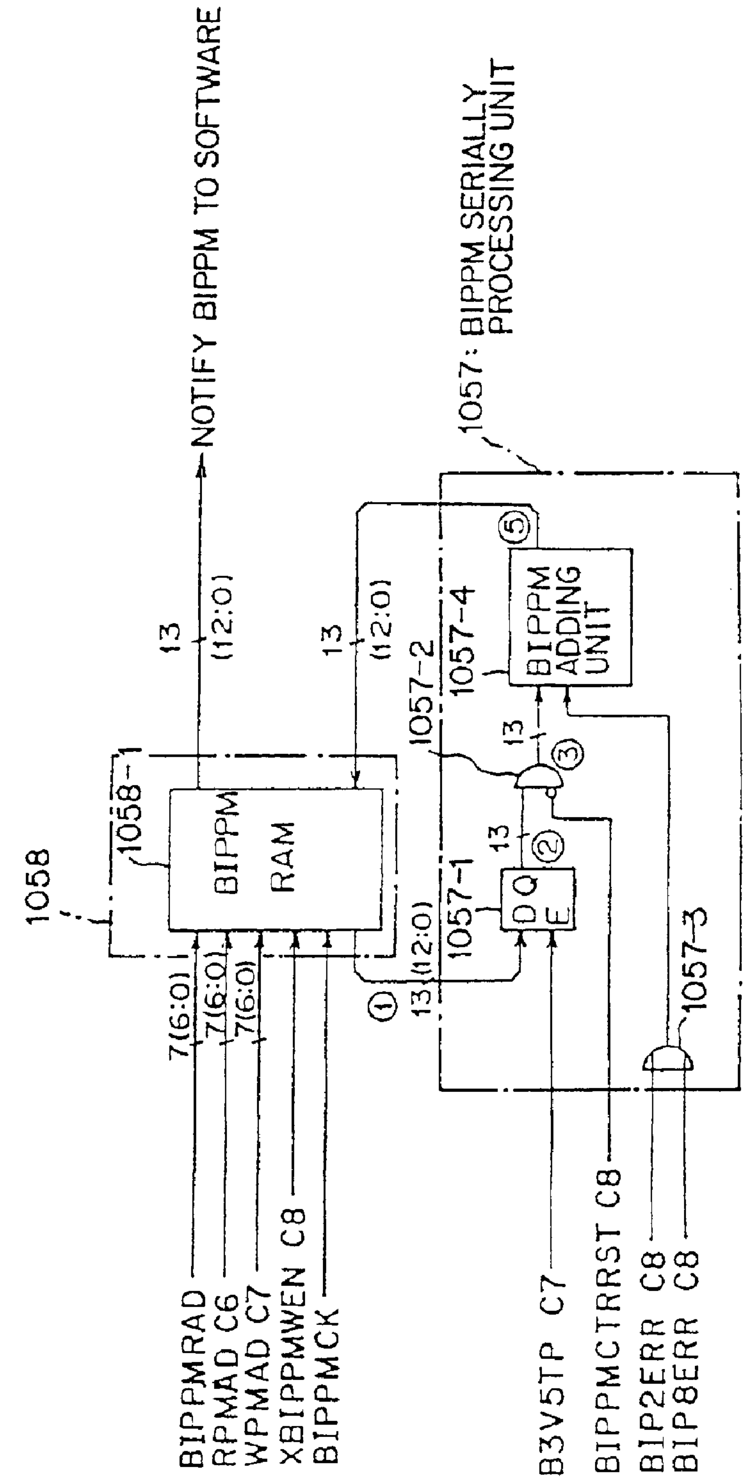
Figures 113, 114:
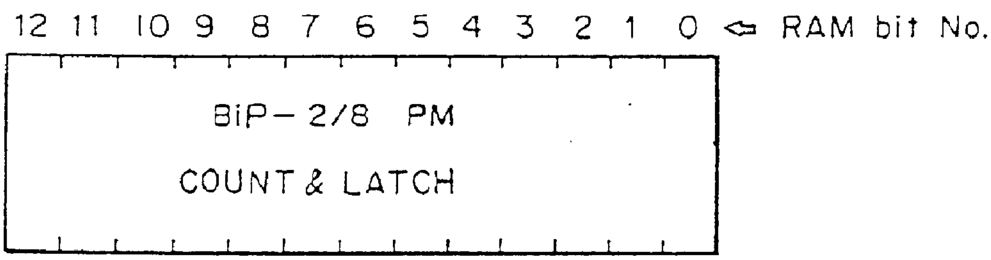
Figure 115:
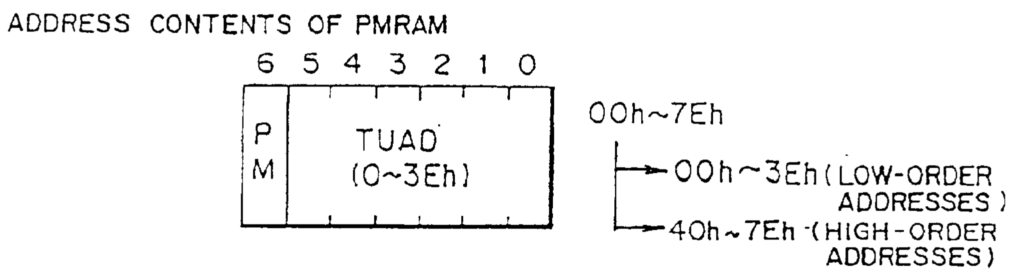
Figure 116:
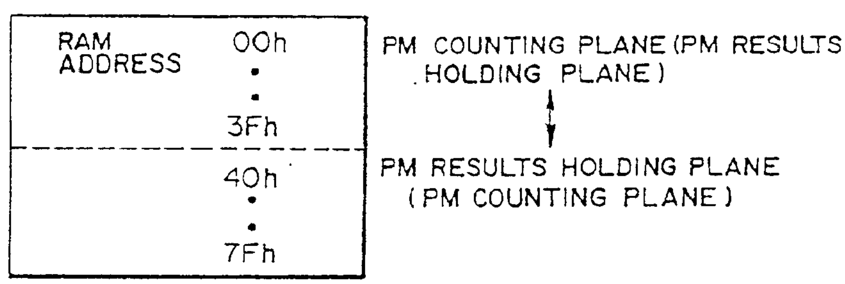
Figure 117:
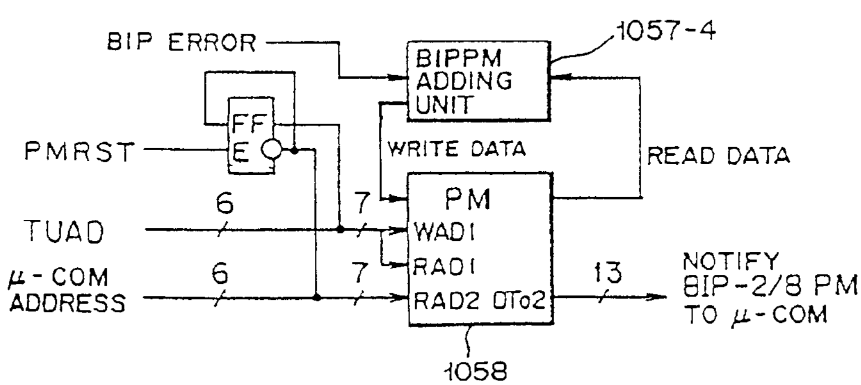
Figure 118:
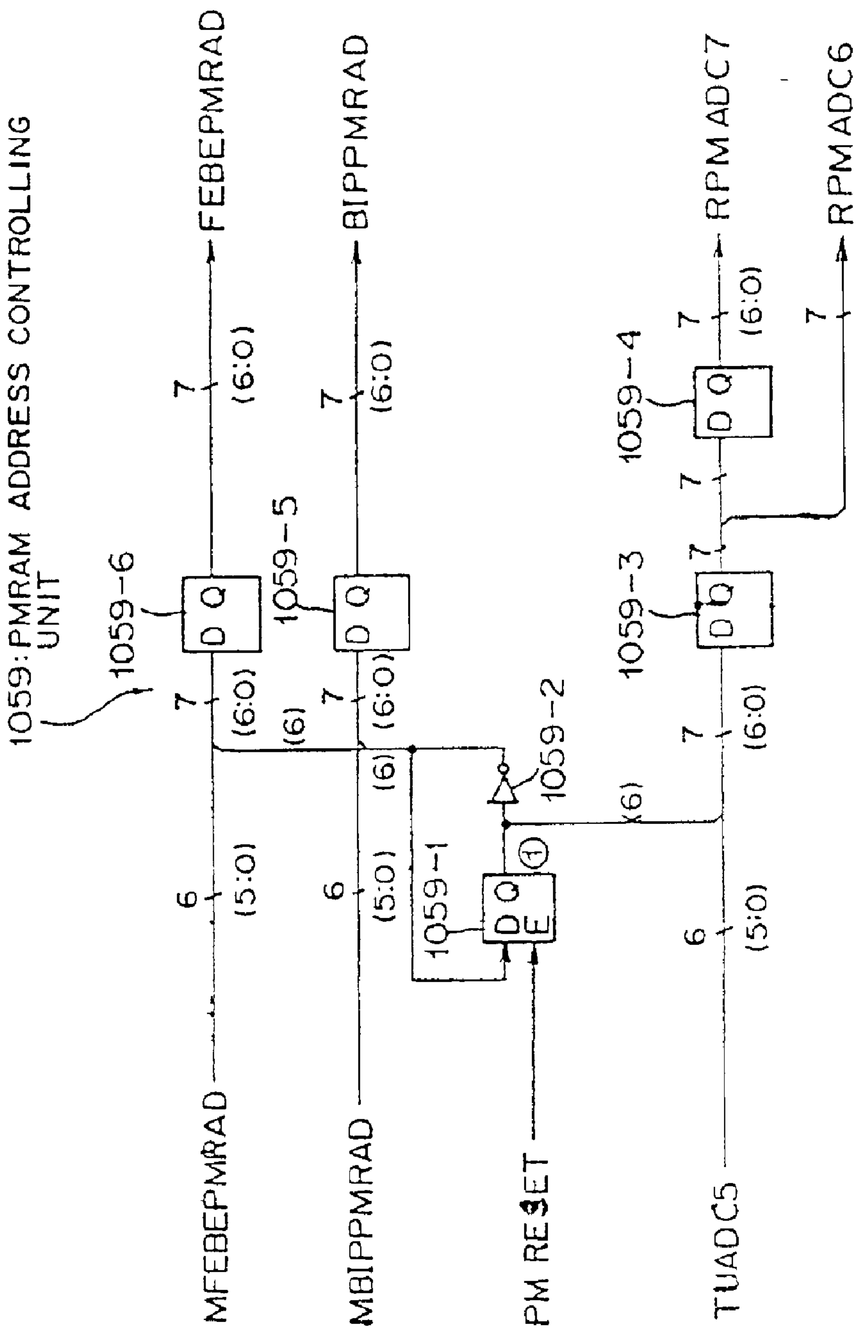
Figure 119:
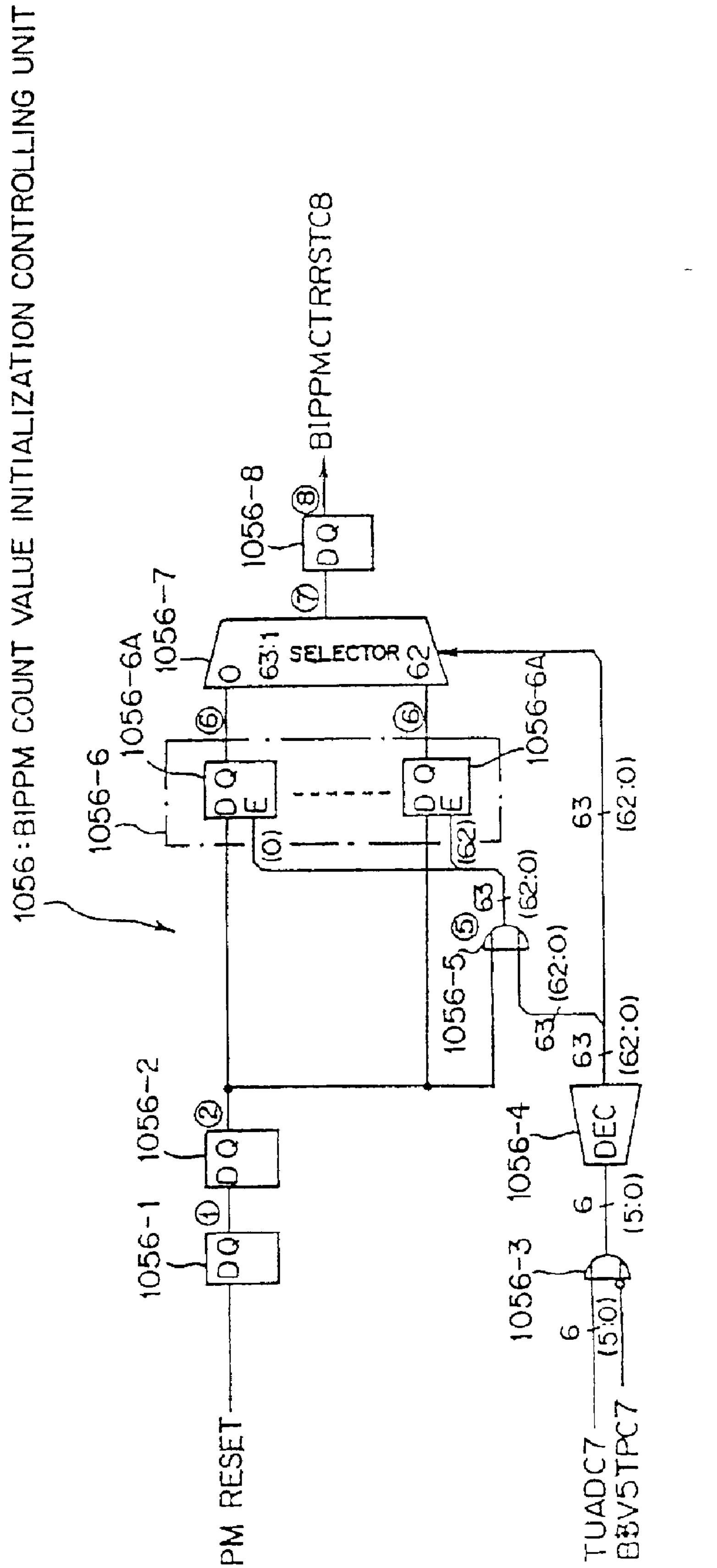
Figure 129:
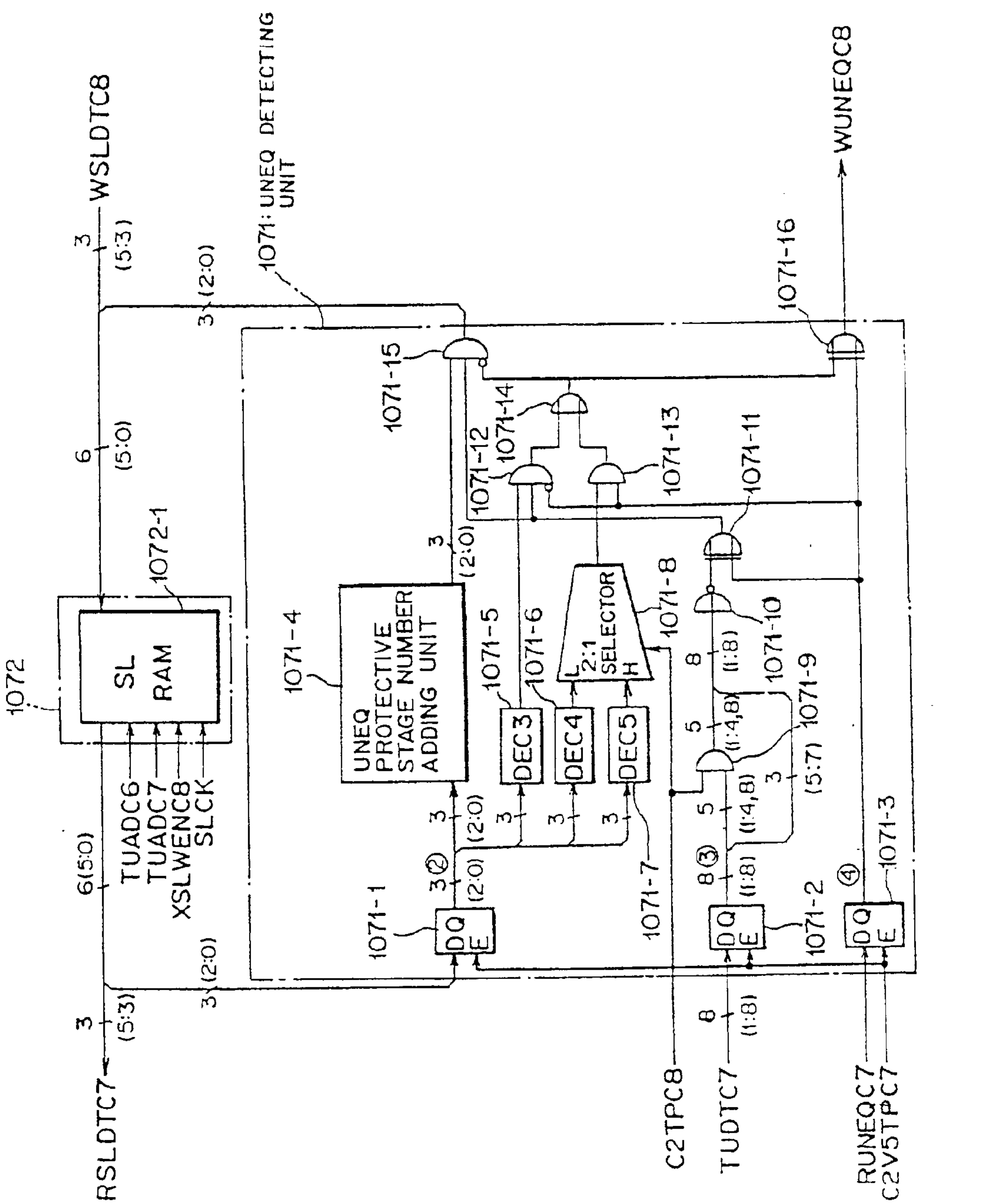
Figure 130:
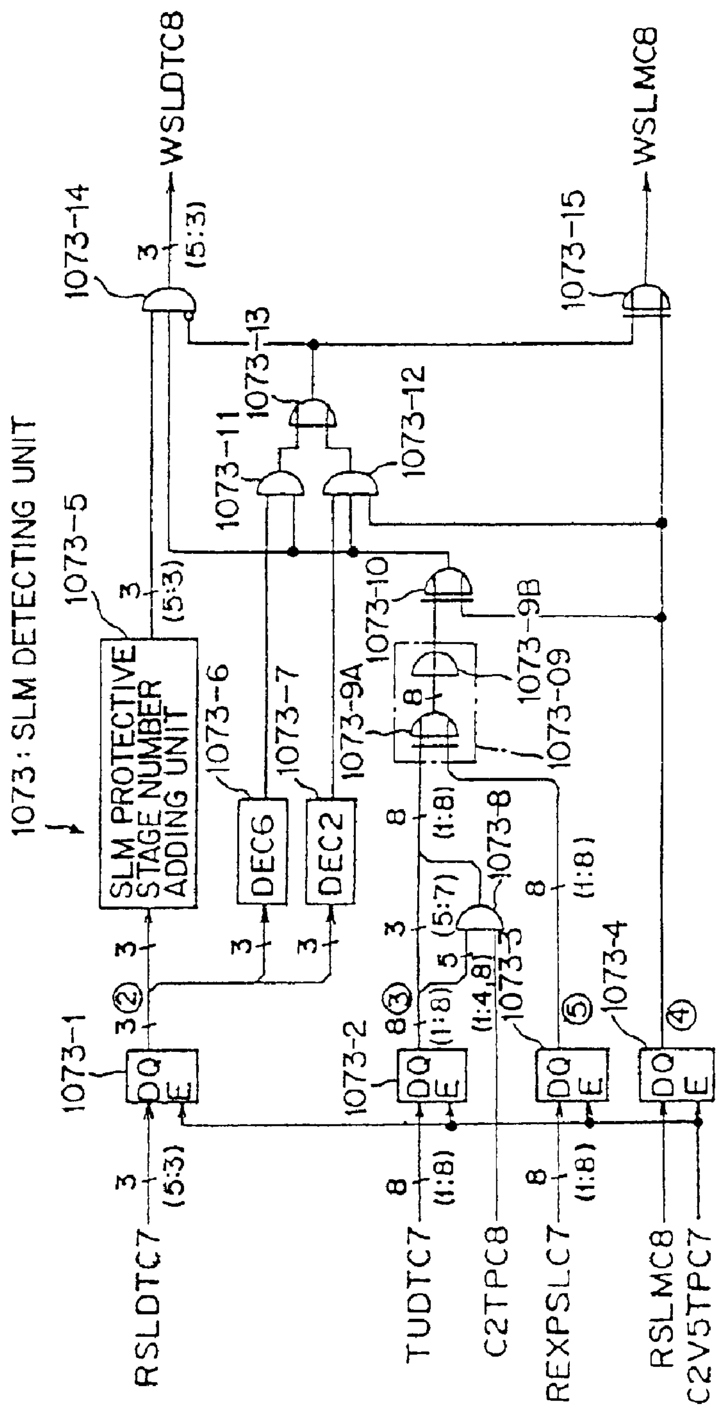
Figure 131:
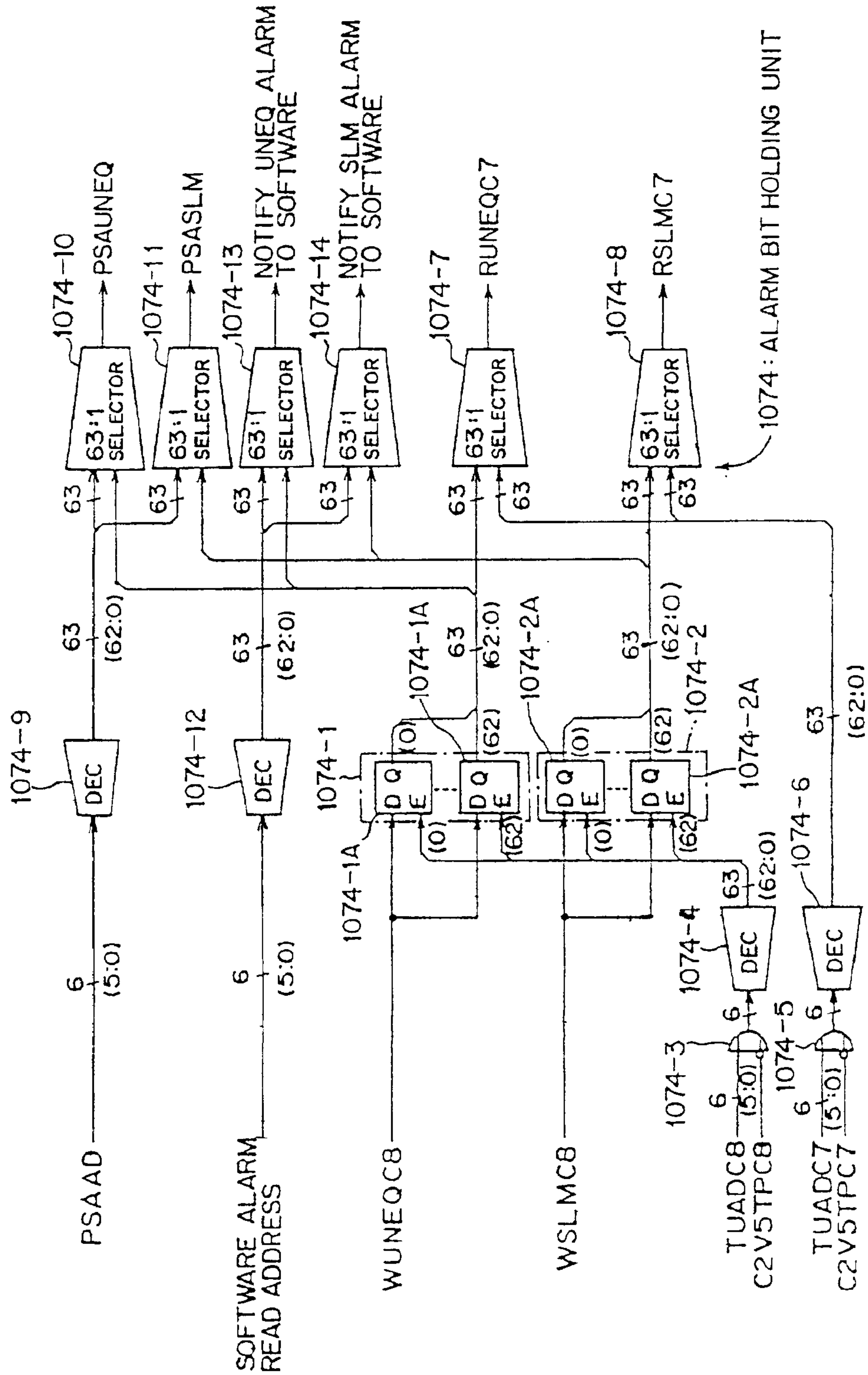
Figure 133:
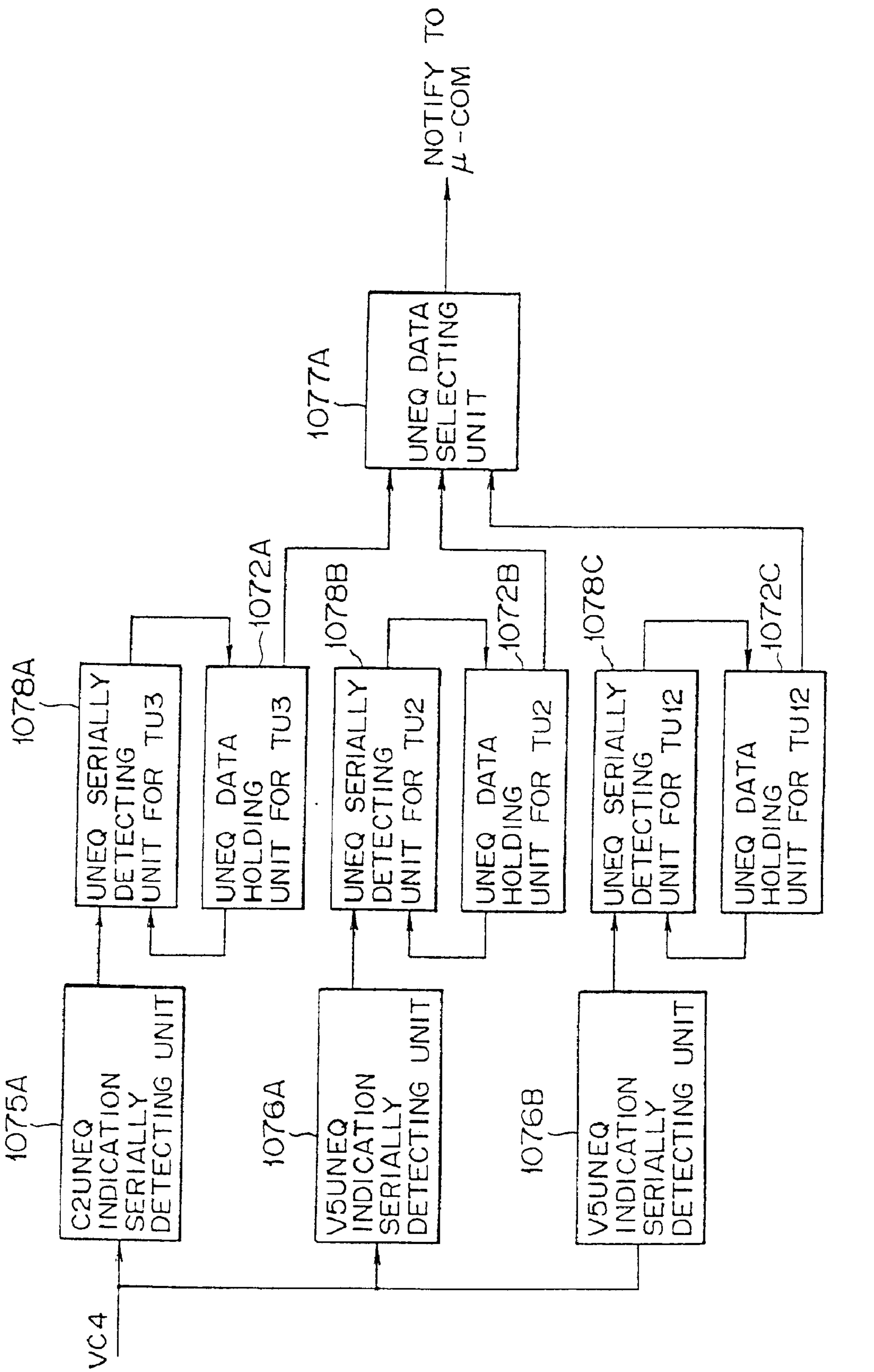
Figure 134:
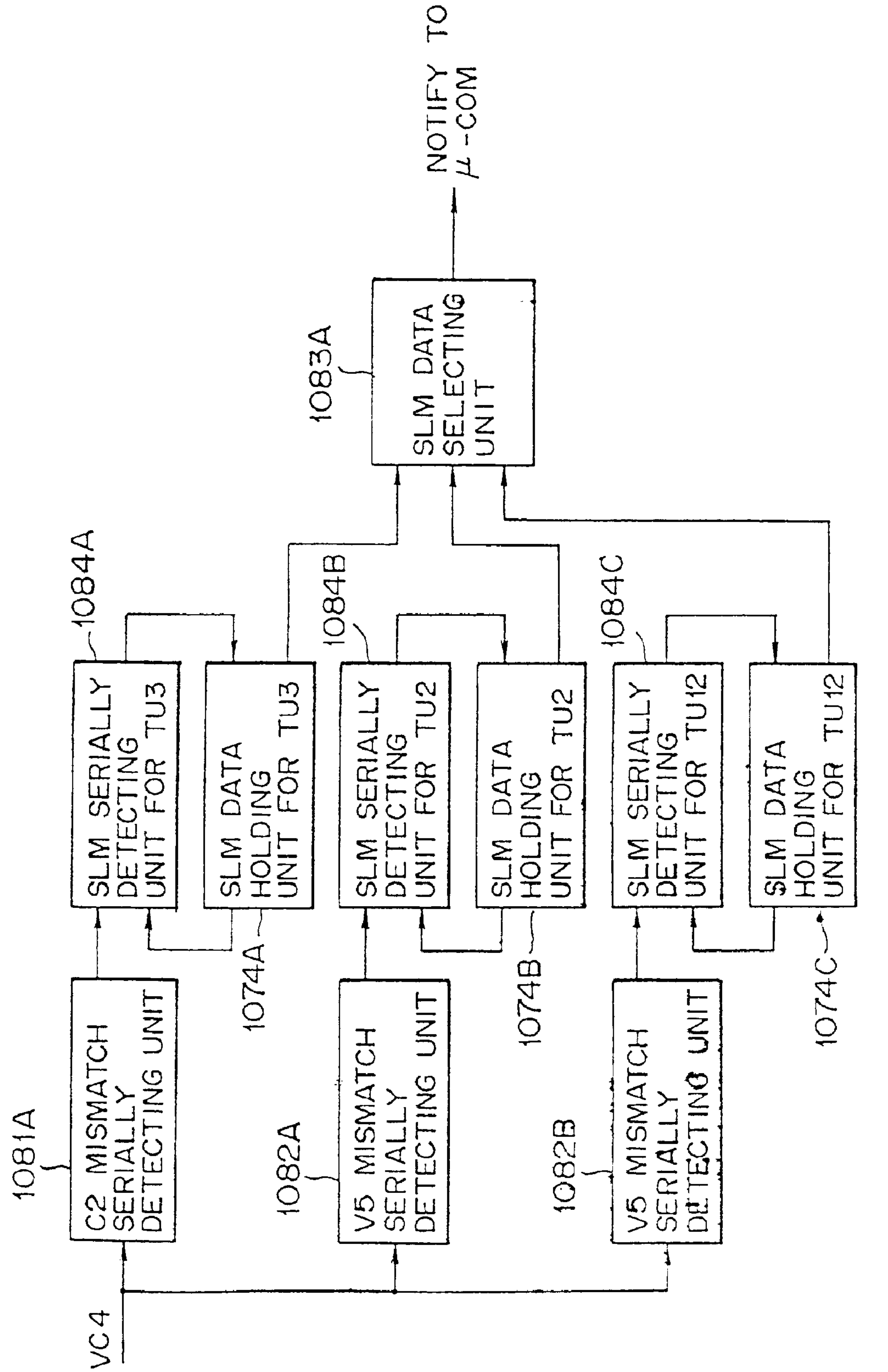
Figure 135:
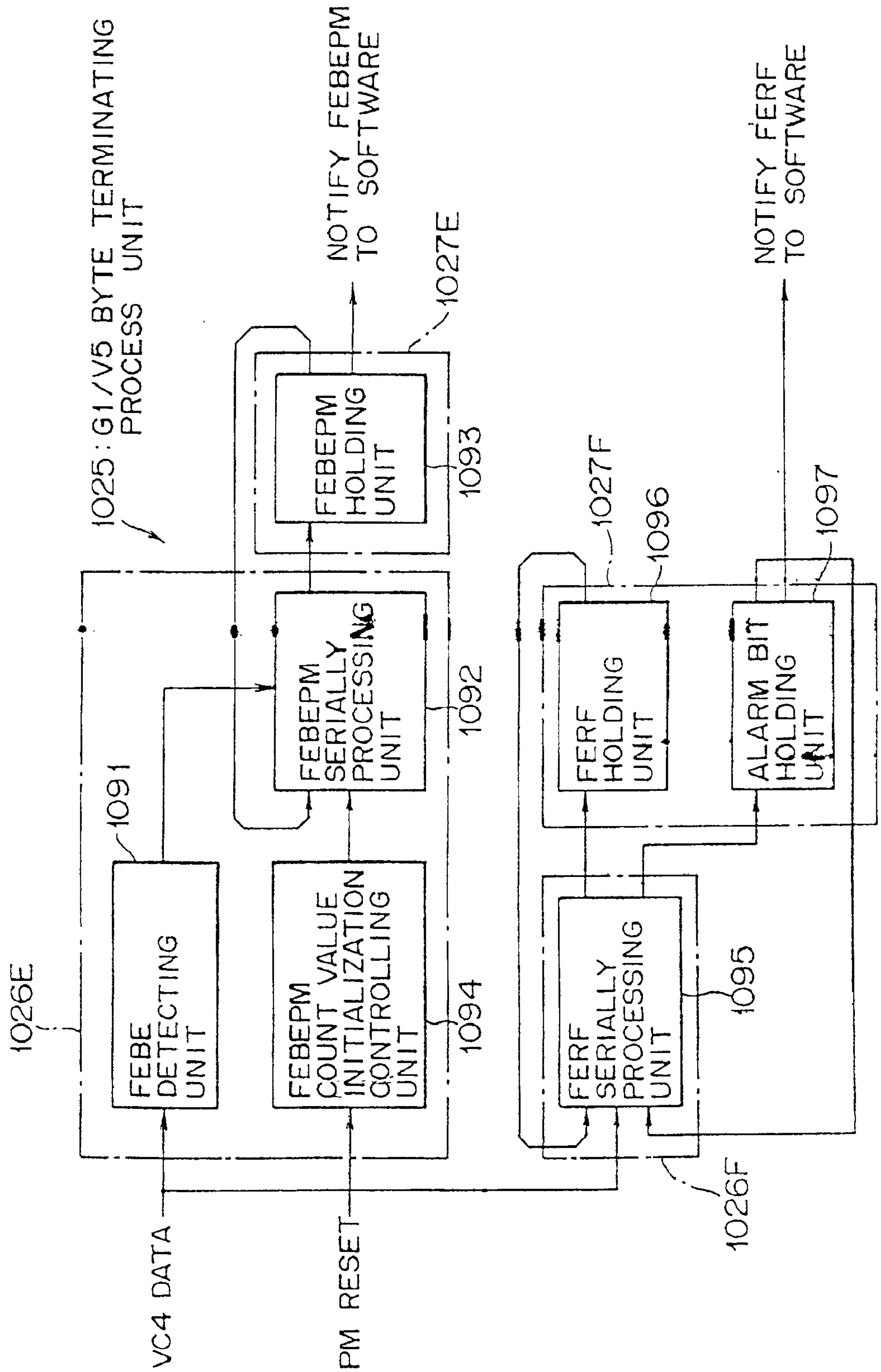
Figure 136:
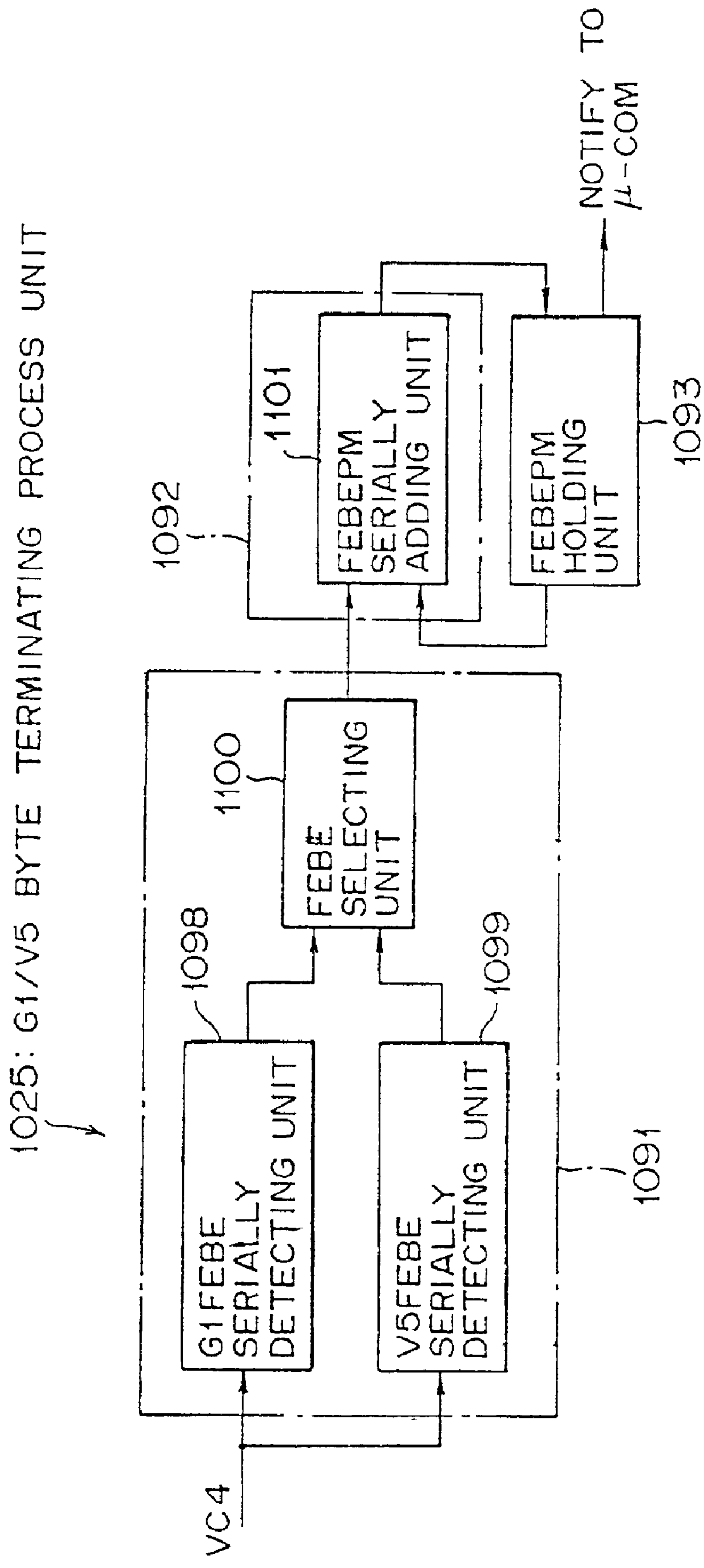
Figure 137:
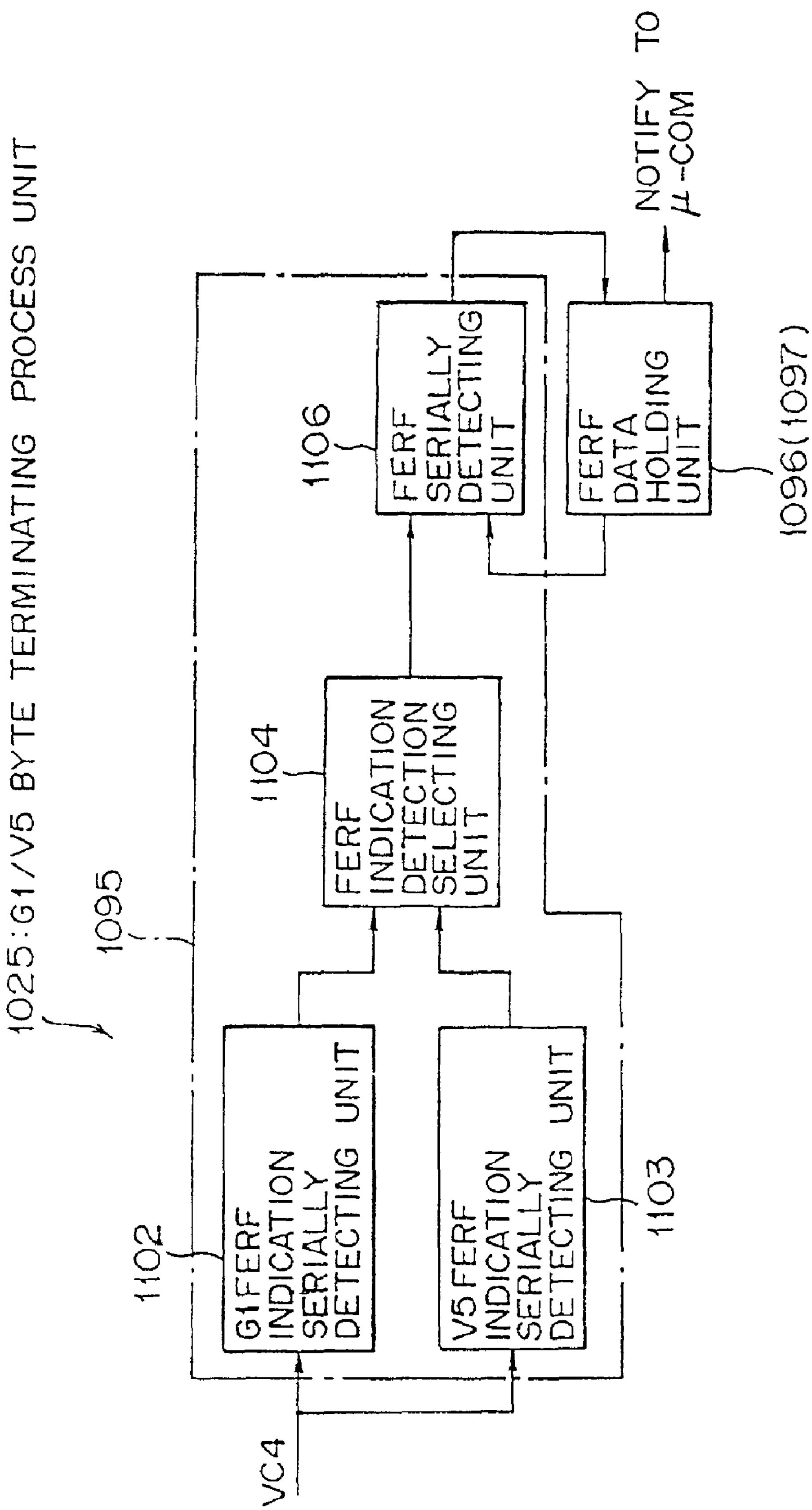
Figure 138:
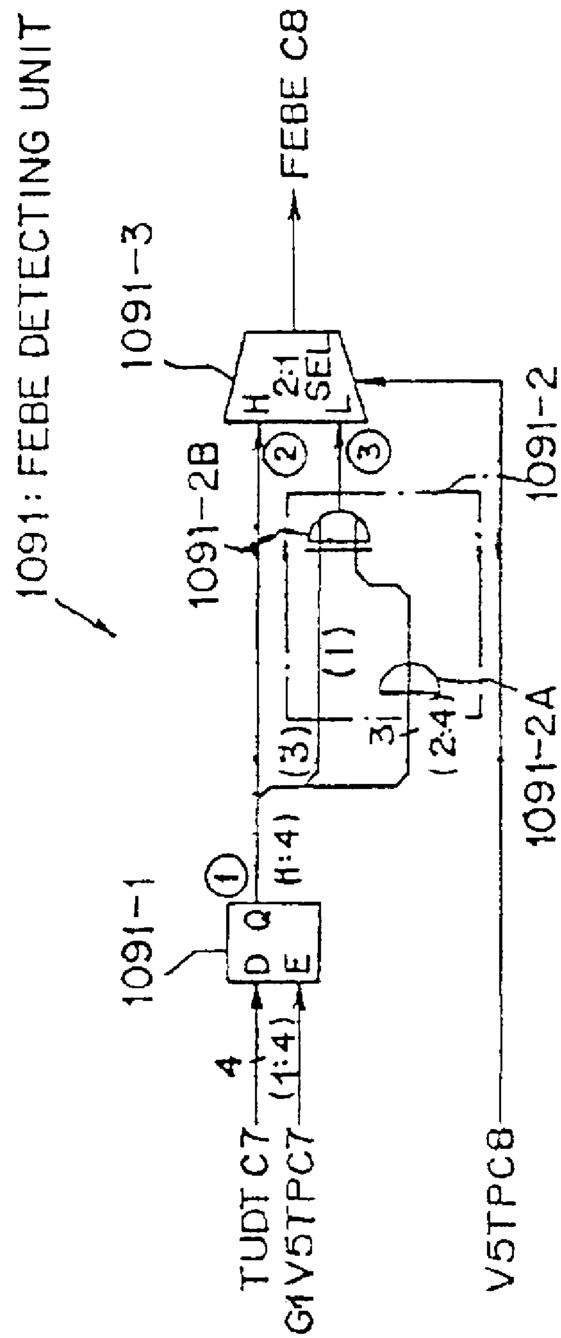
Figure 139:
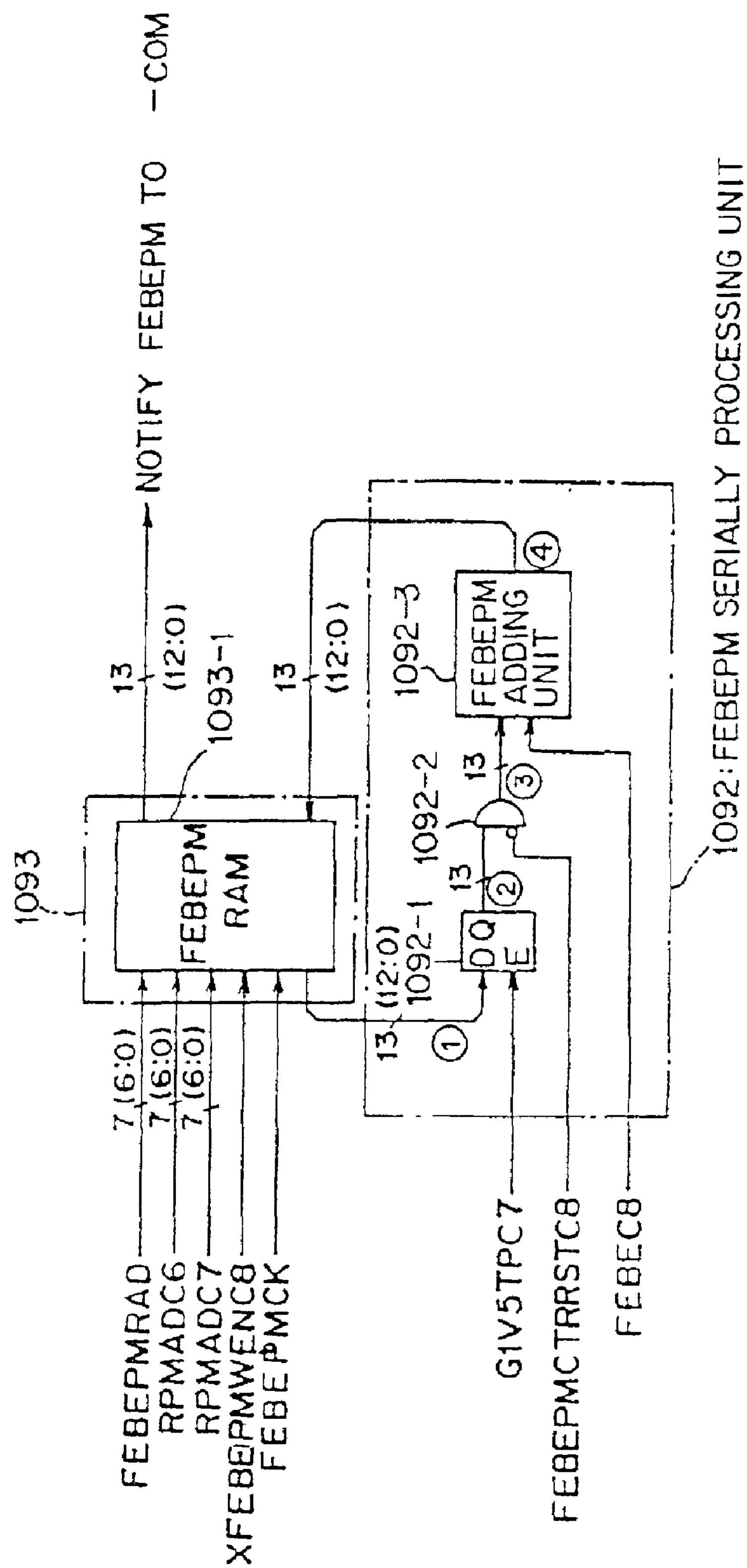
Figure 140:
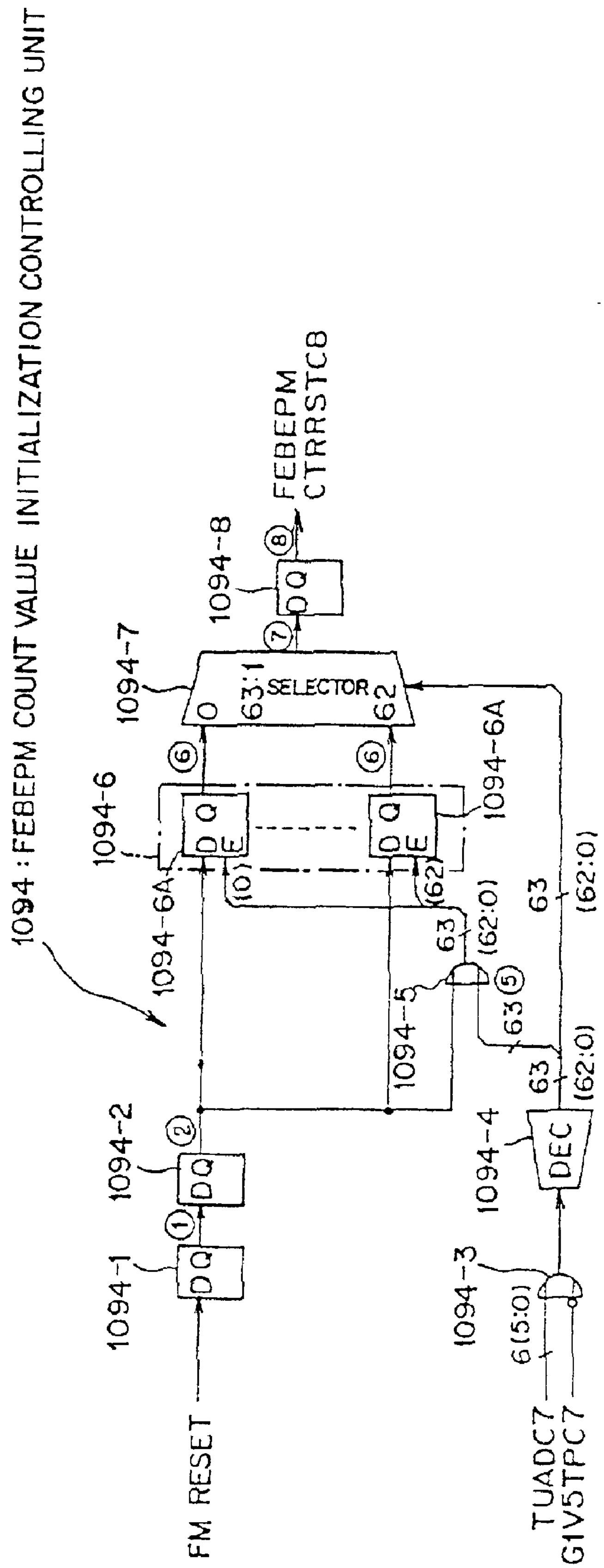
Figure 141:
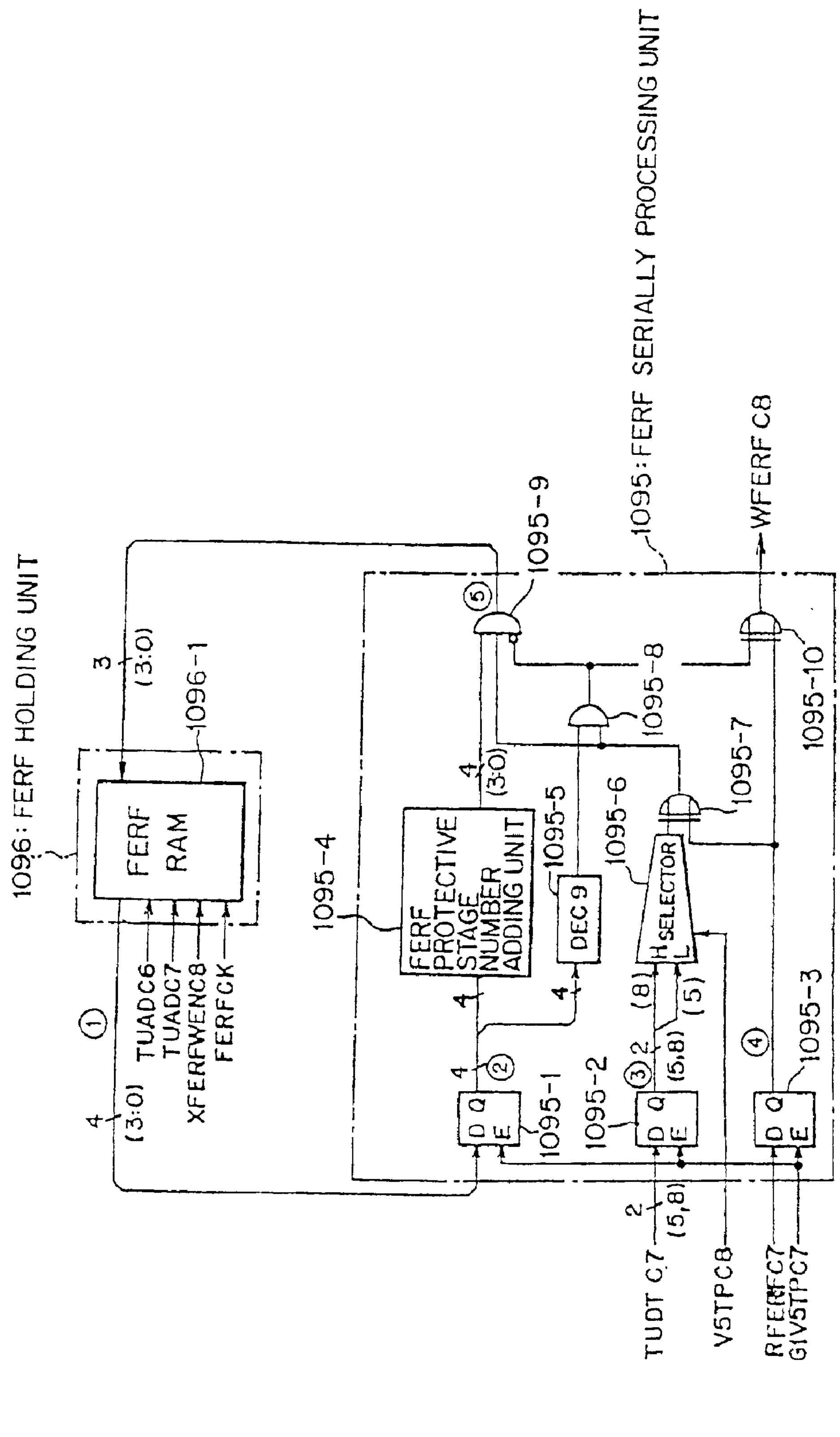
Figure 142:
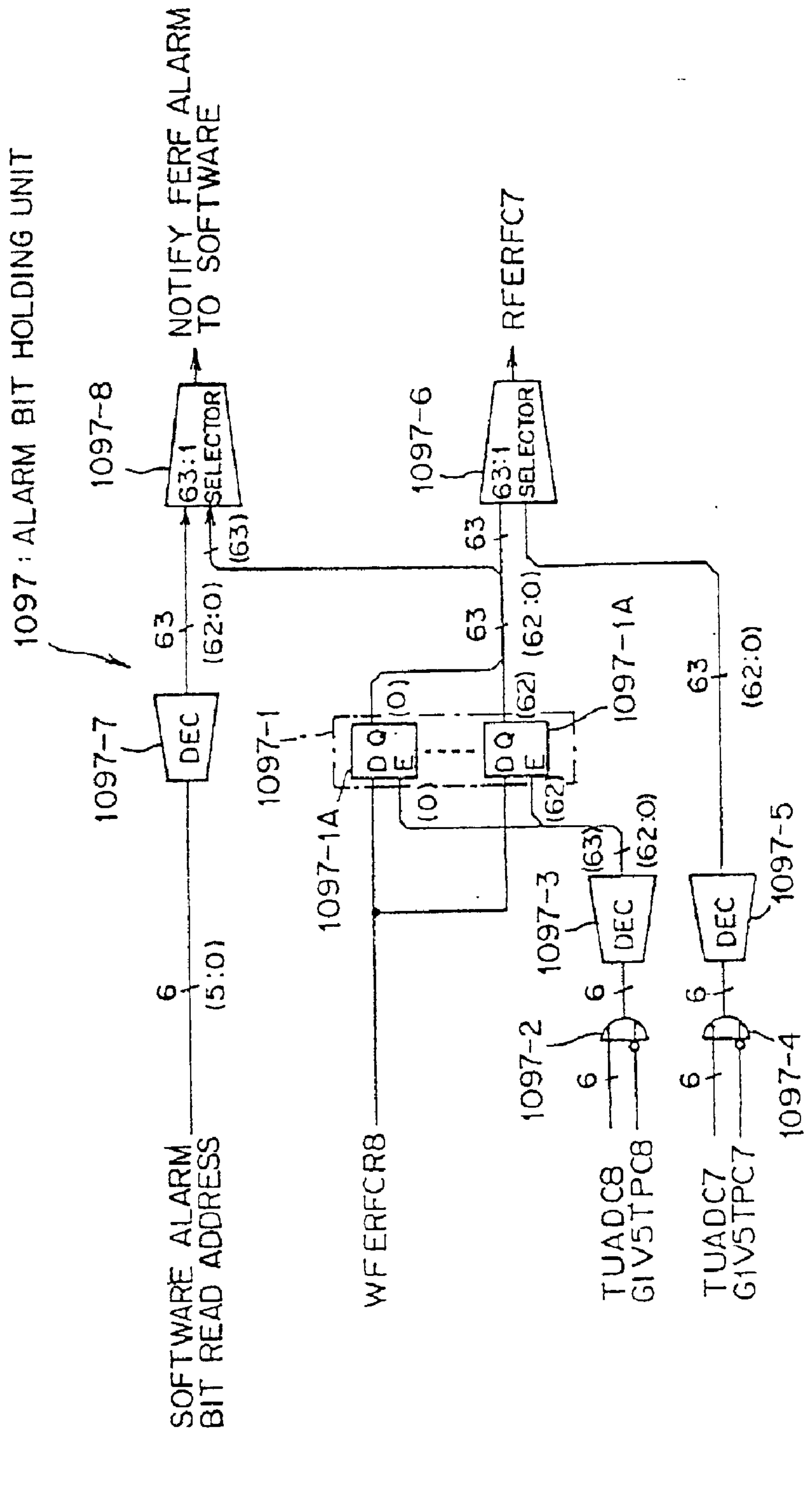
Figure 143:
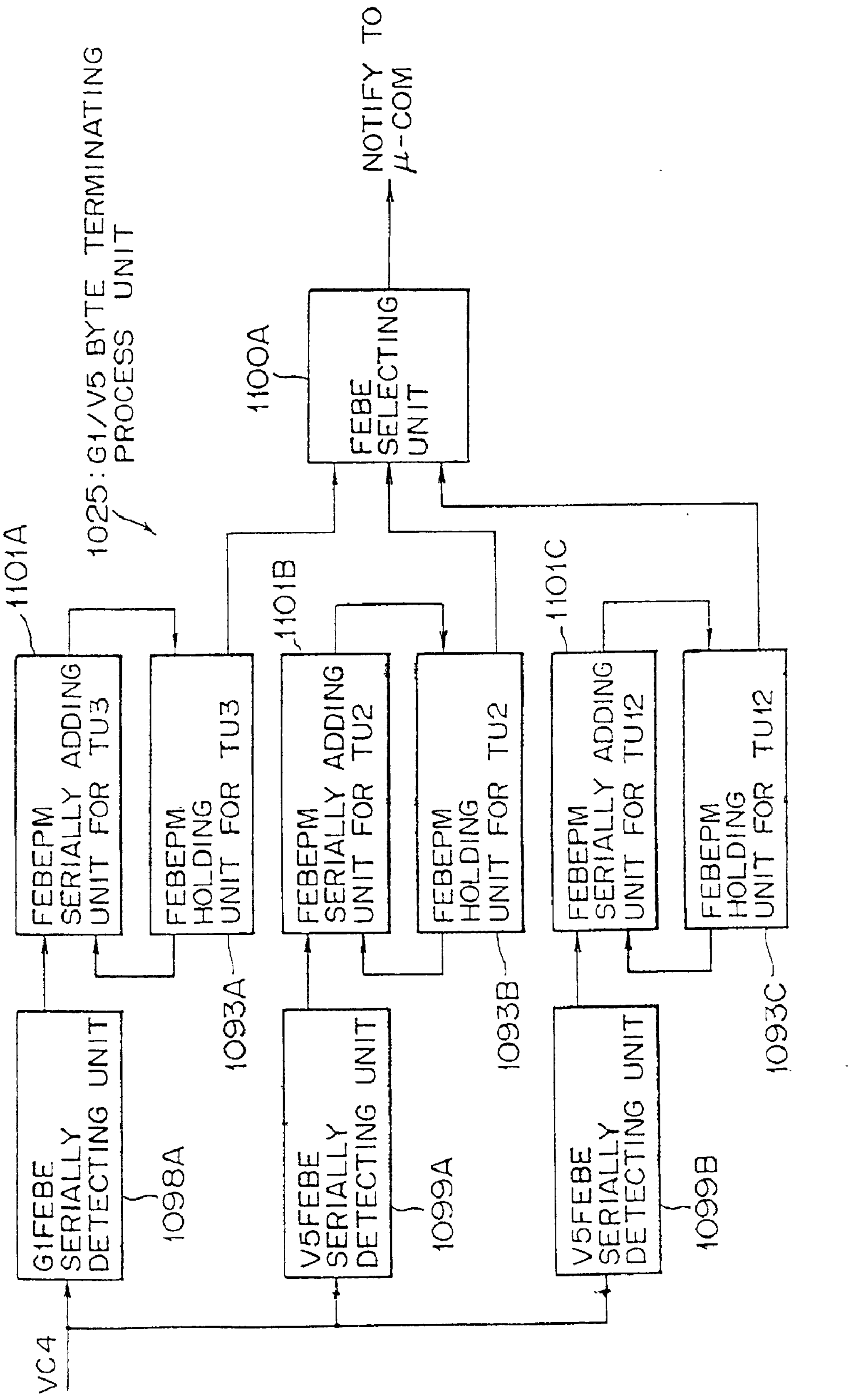
Figure 144:
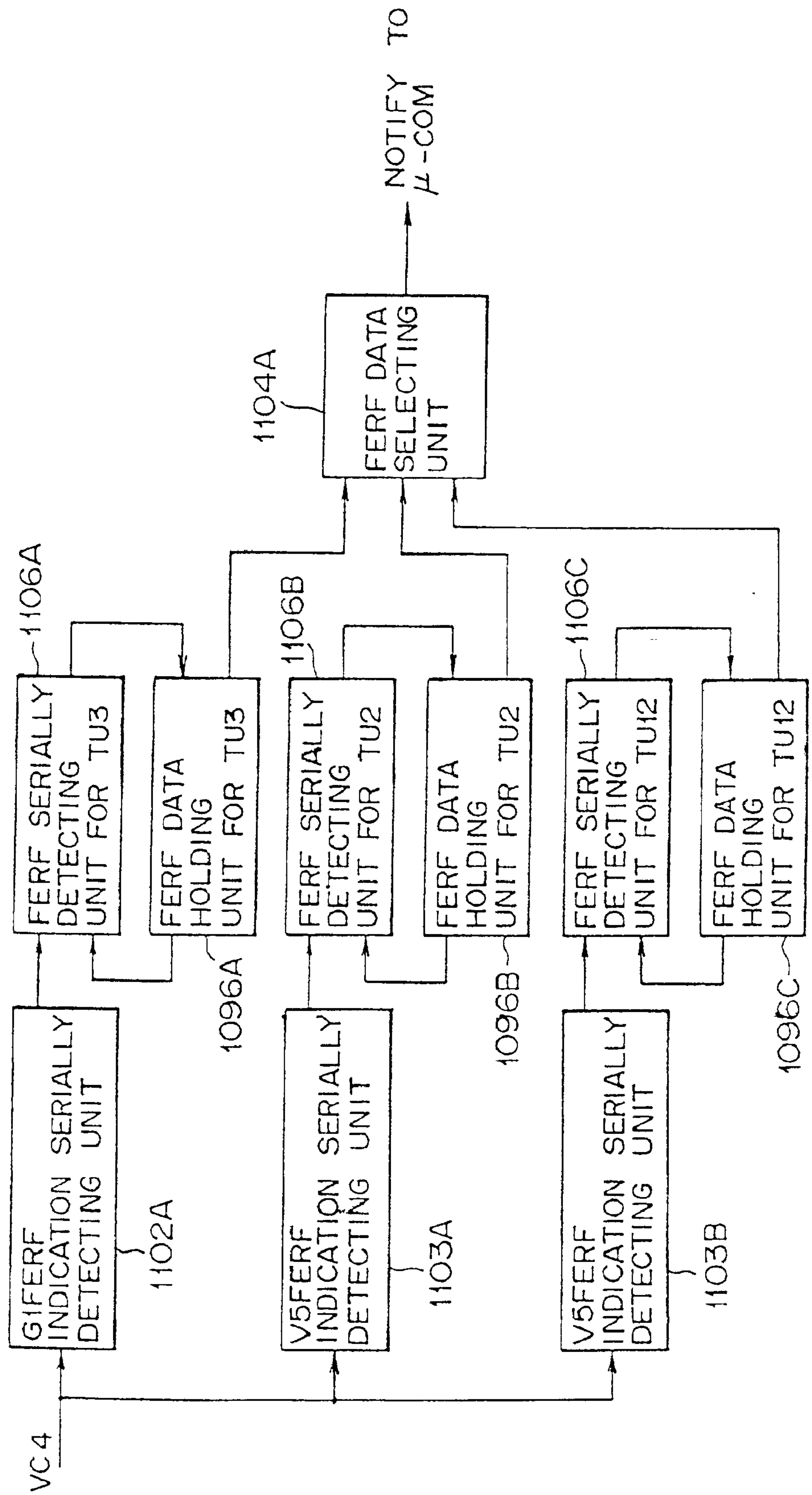
Figure 148:
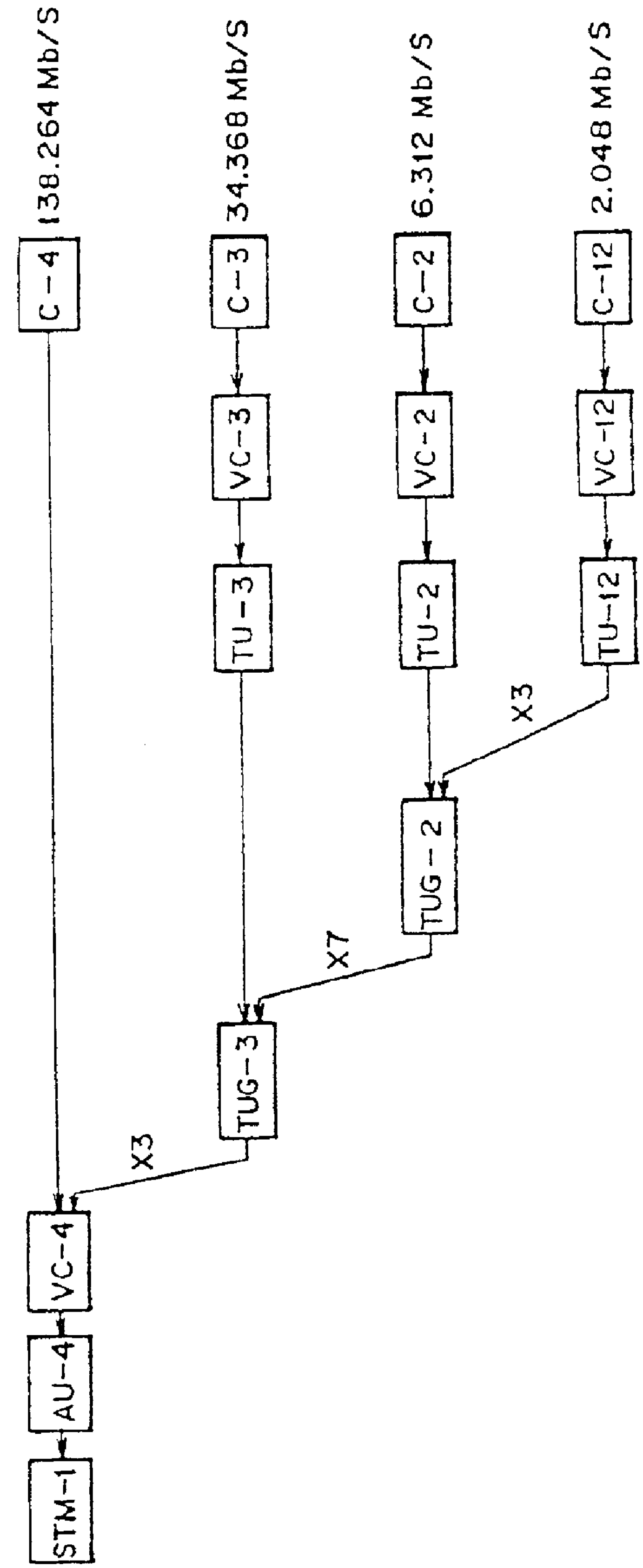
Figure 149:
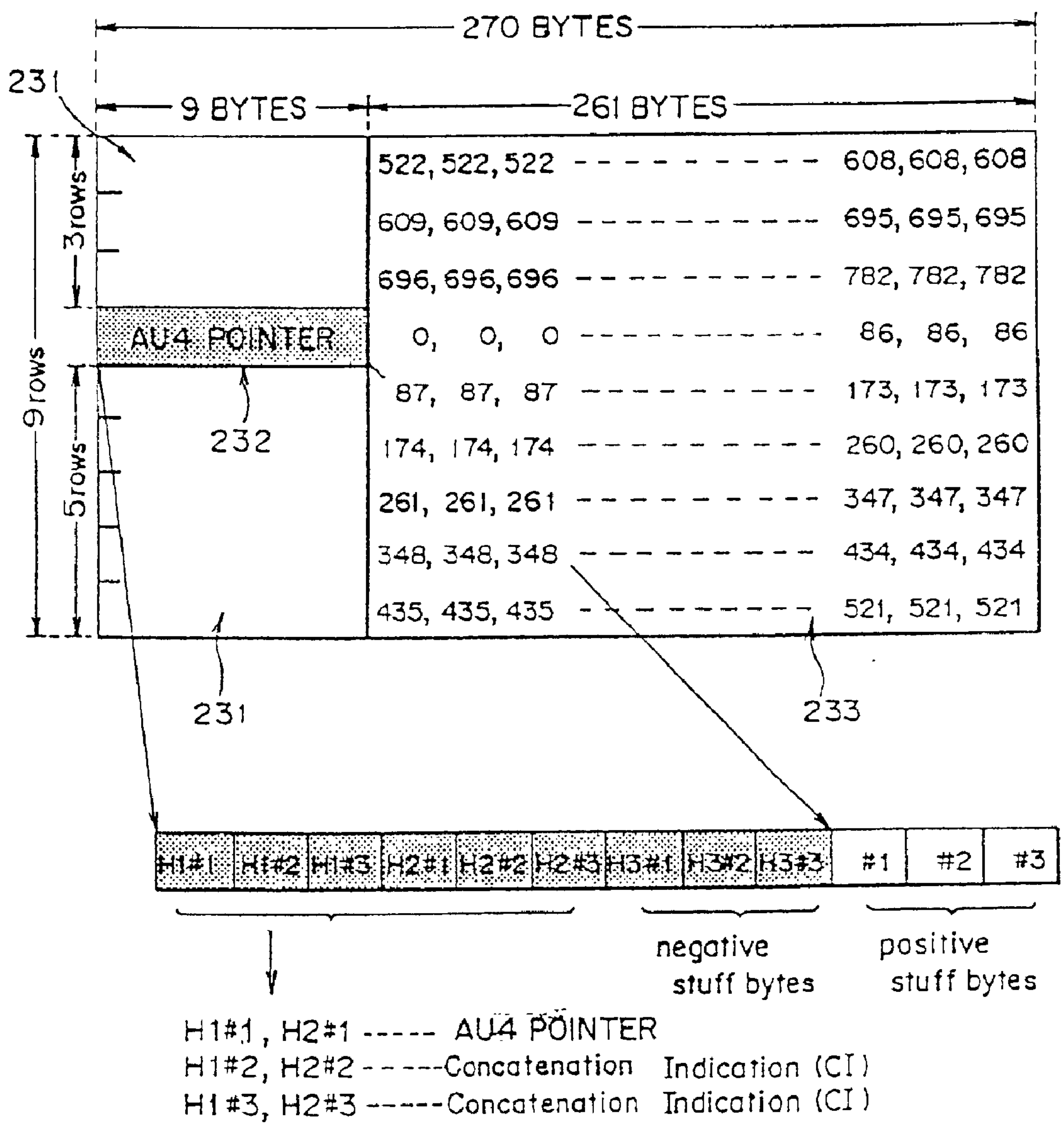
Figure 150:
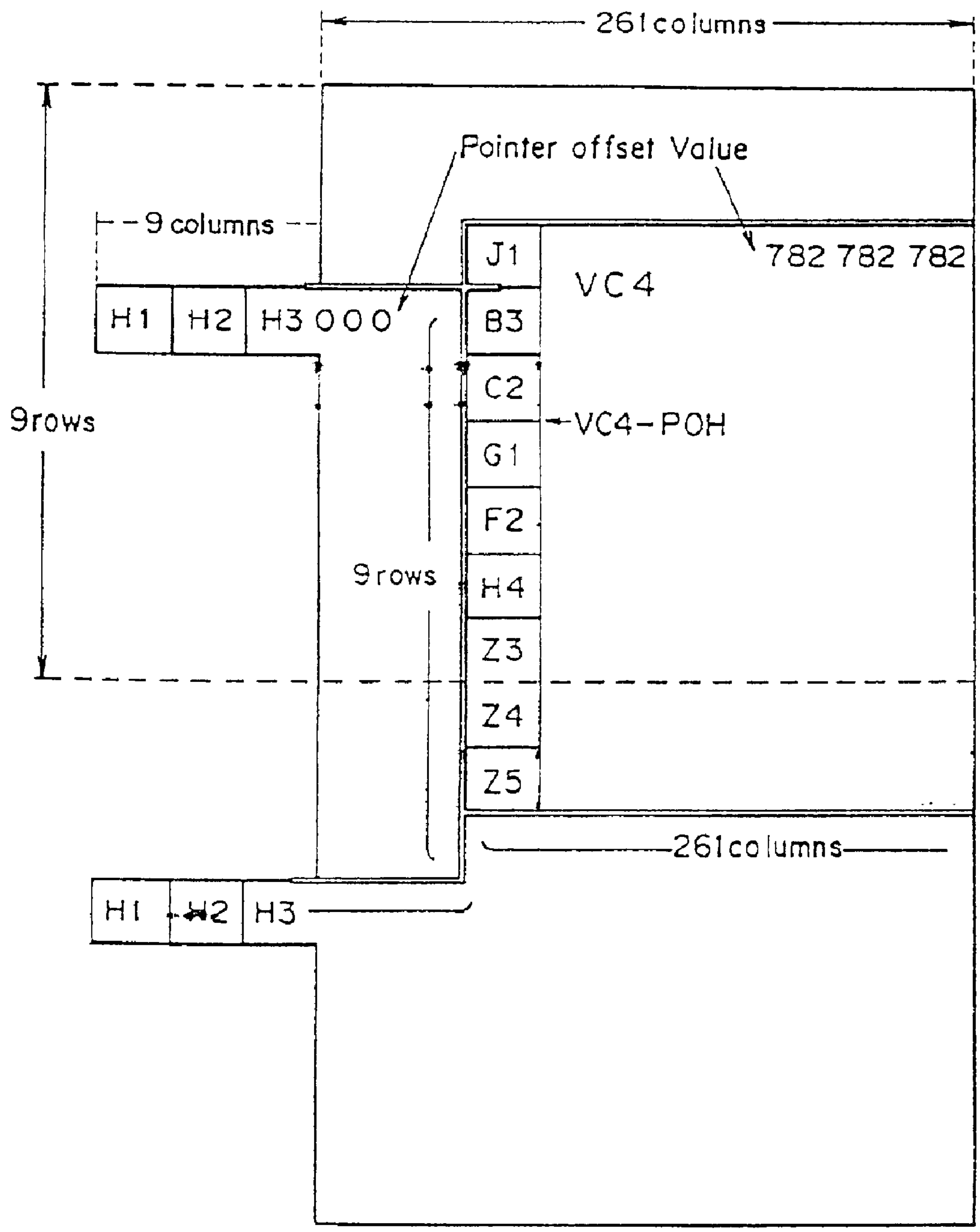
Figure 151:
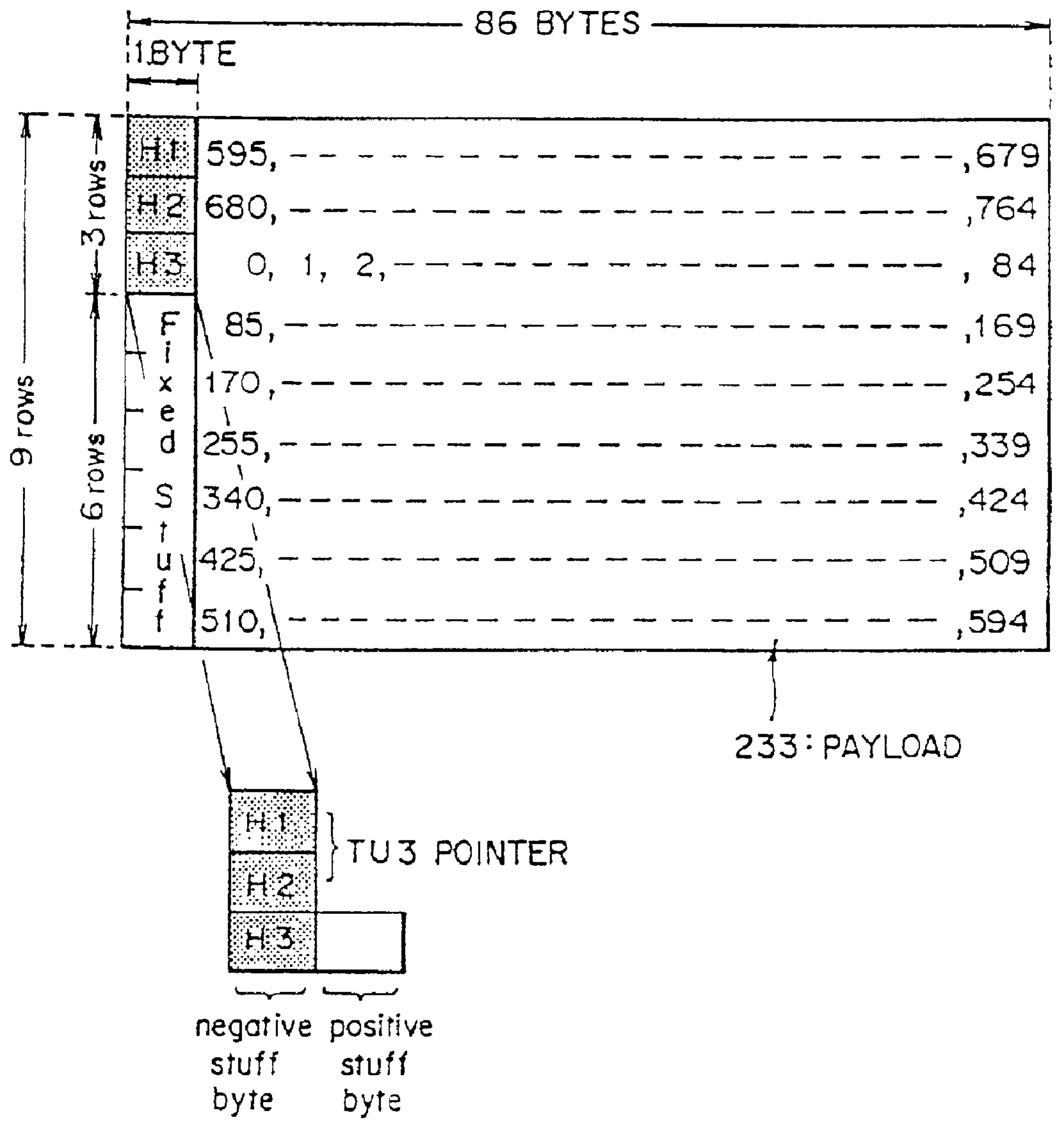
Figure 152:
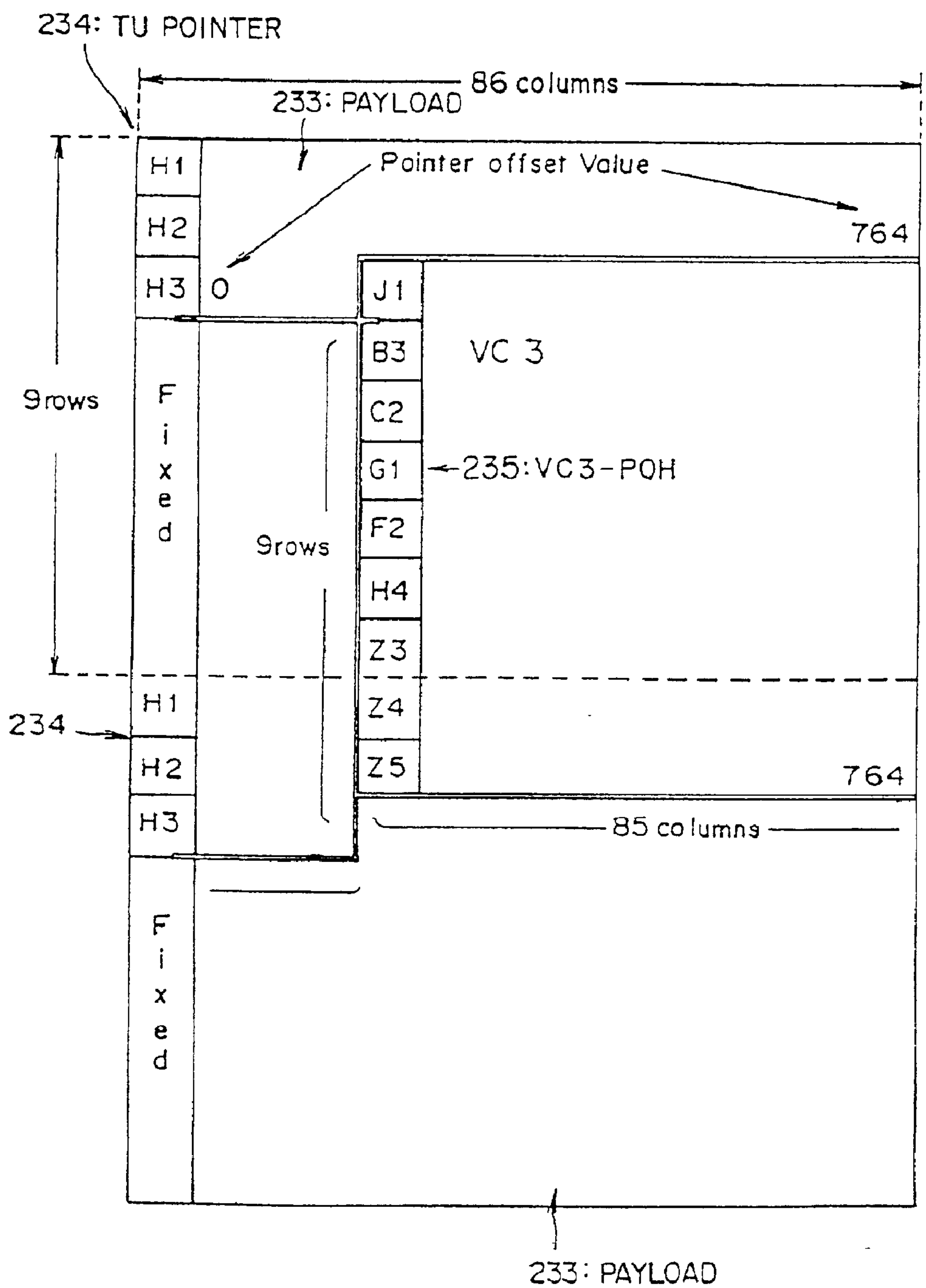
Figure 153:
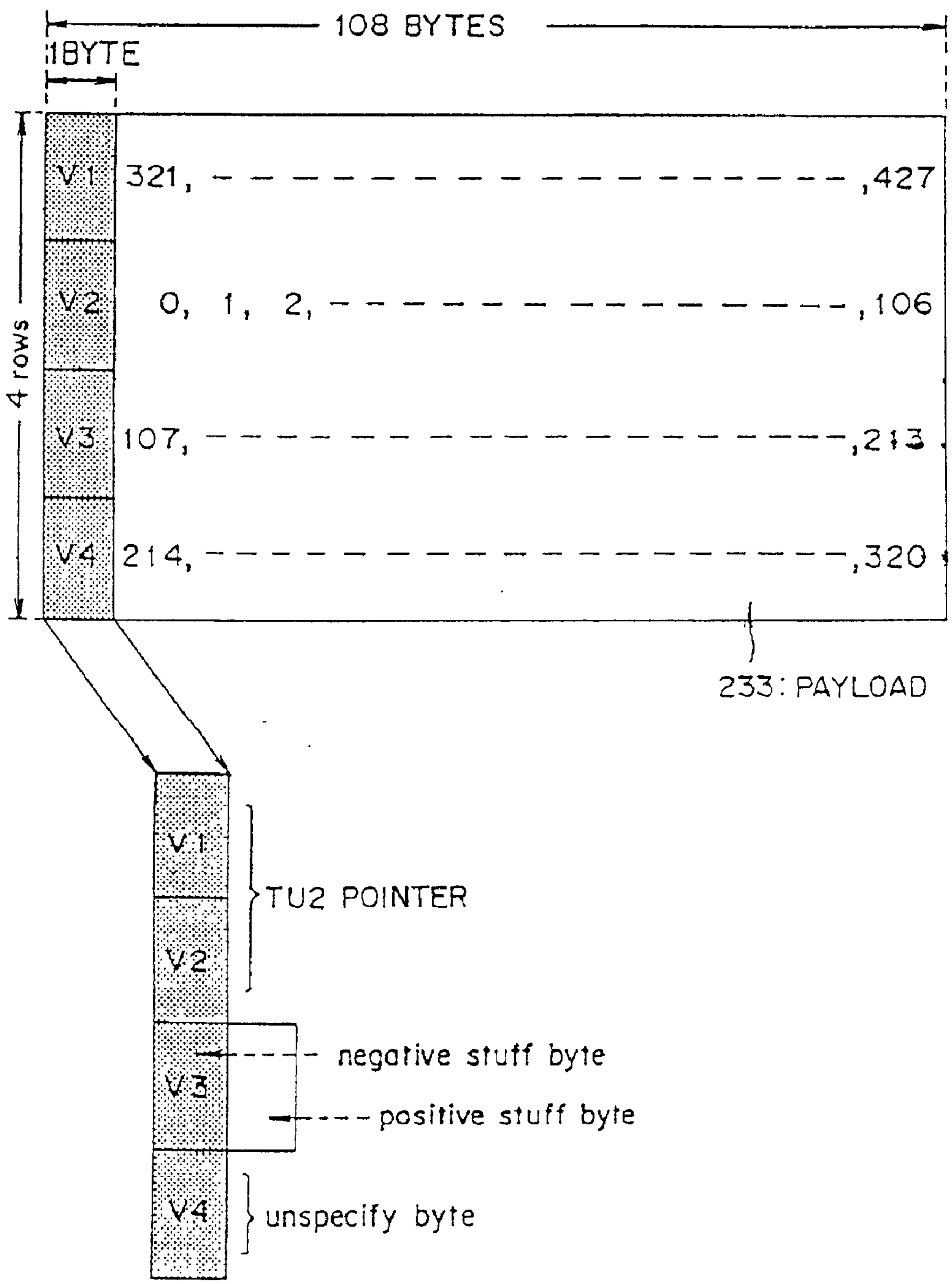
Figure 155:
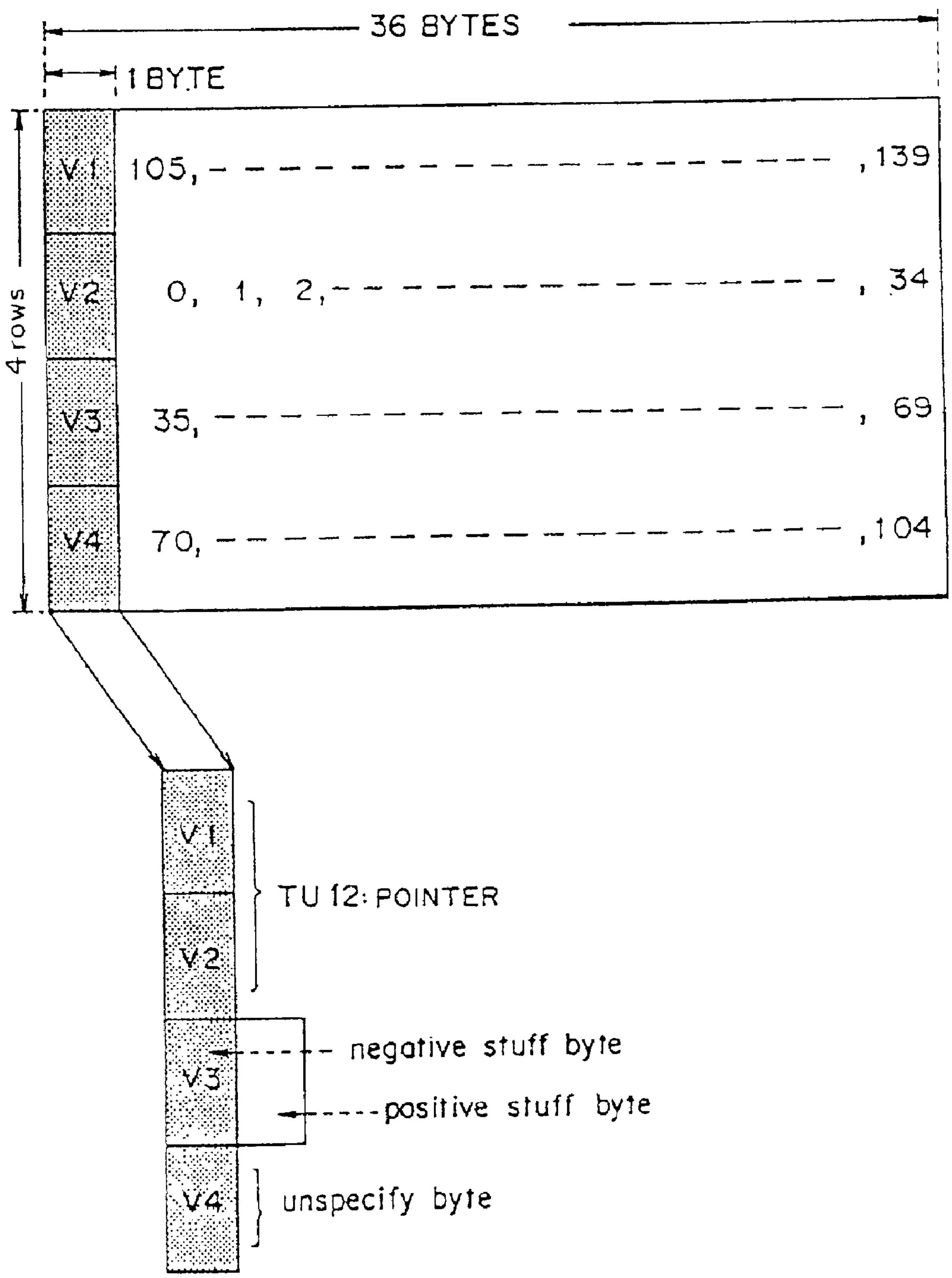
Figure 156:
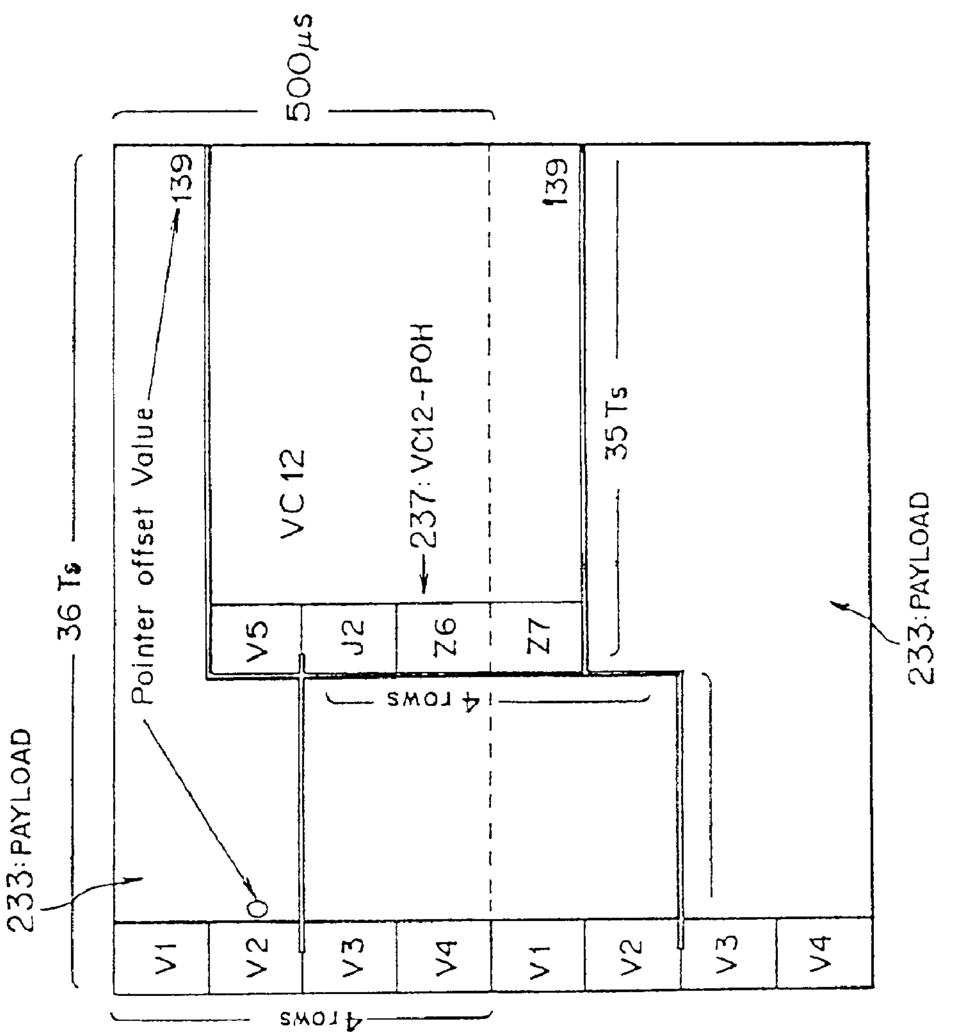
Figure 157:
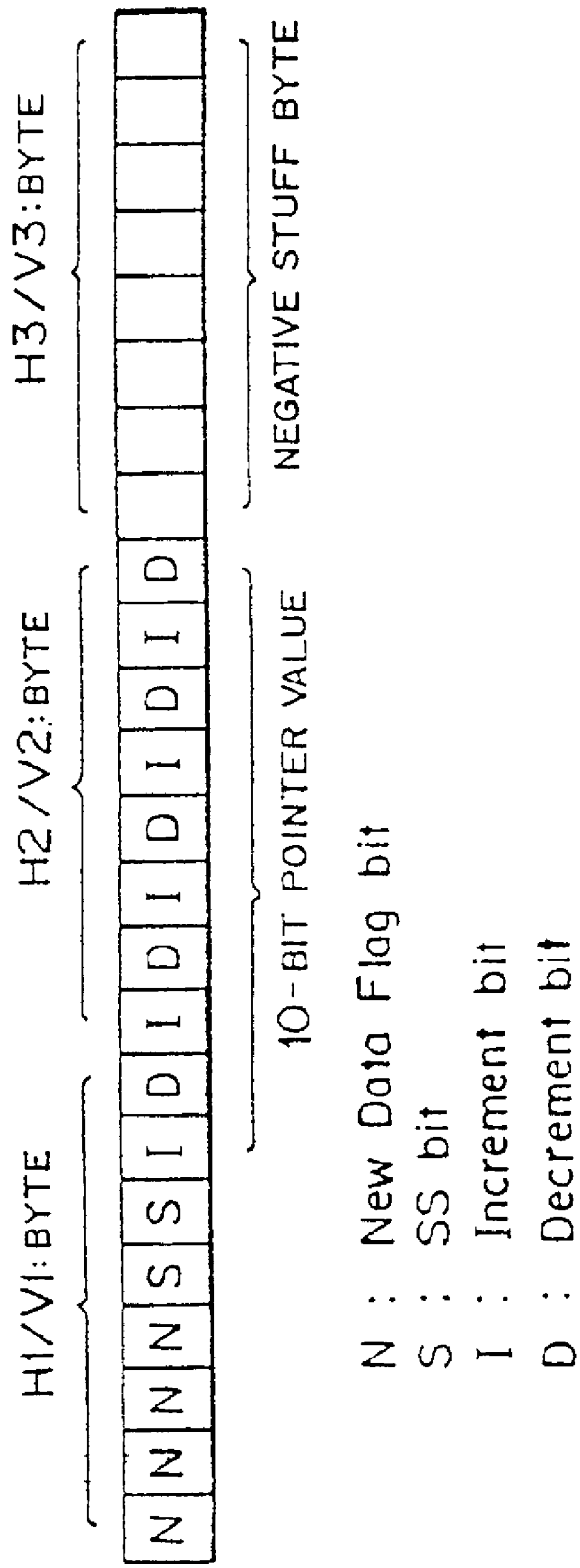
Figure 158:
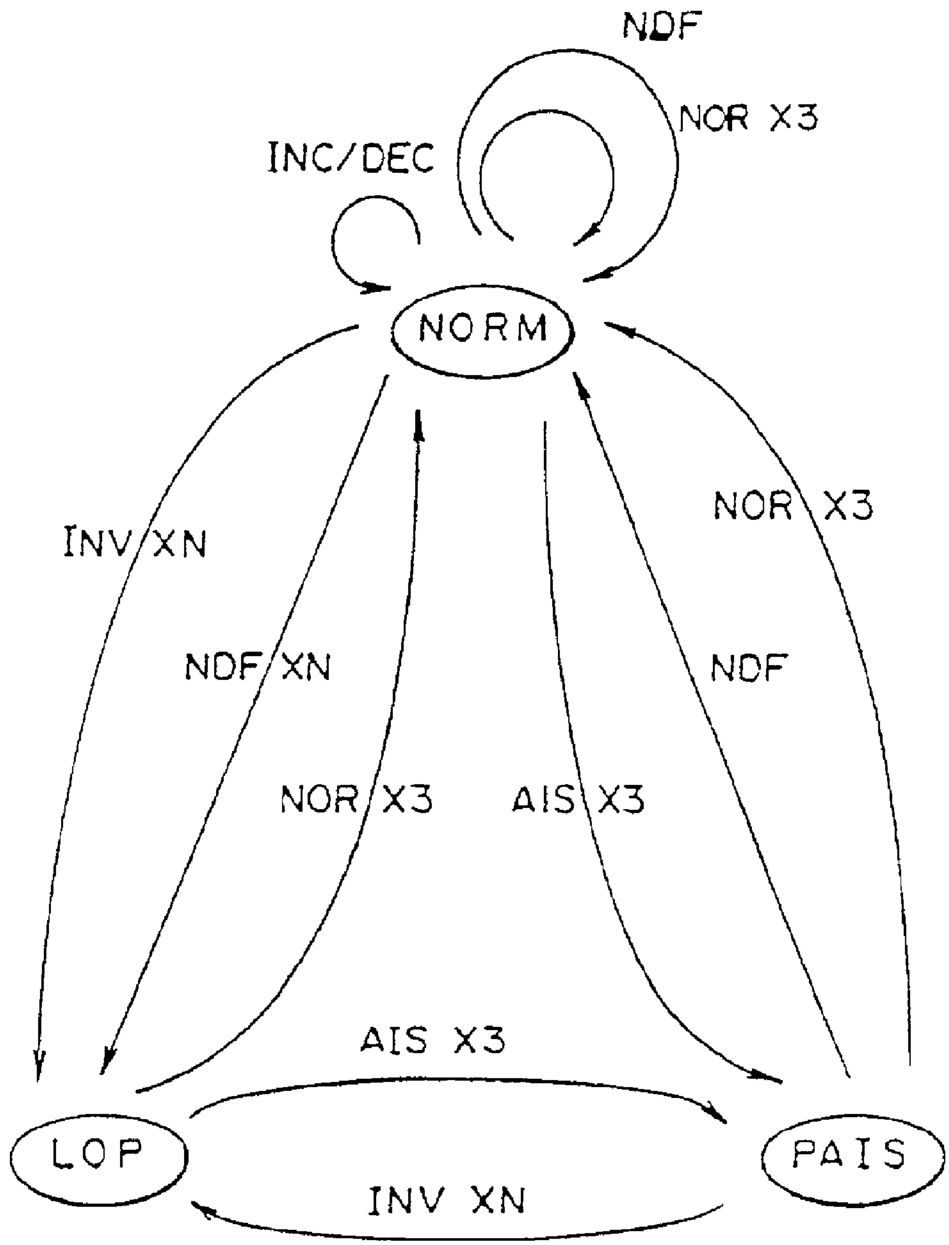
Figure 159:
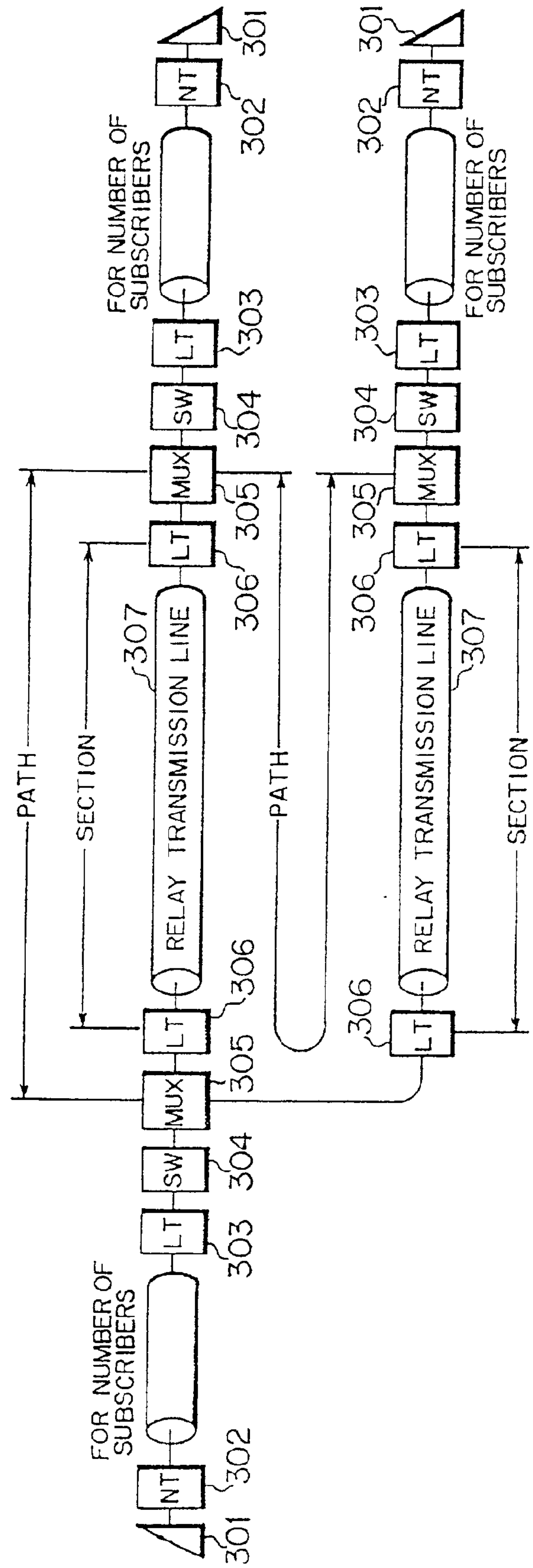
Figure 160:
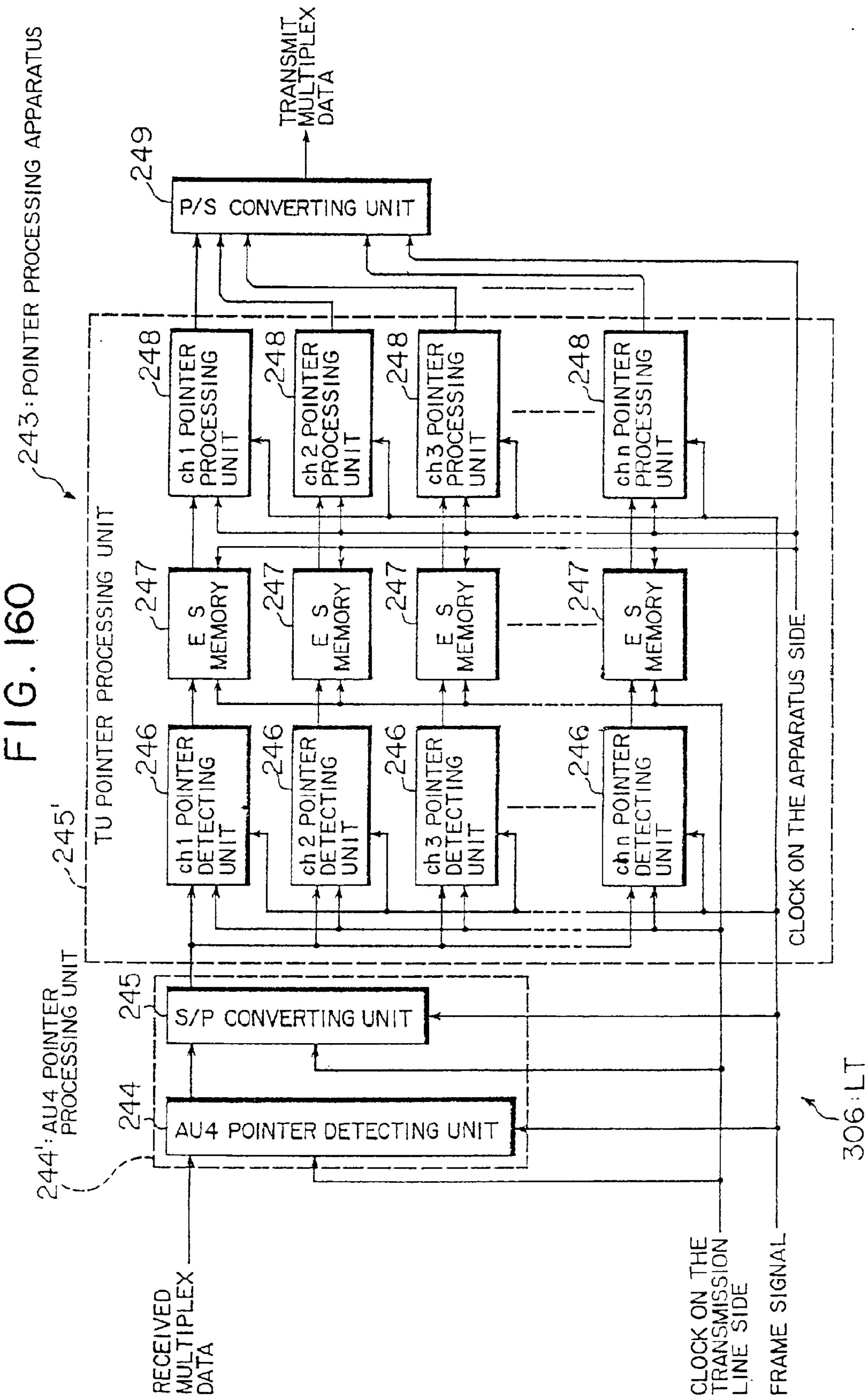
Figure 161:
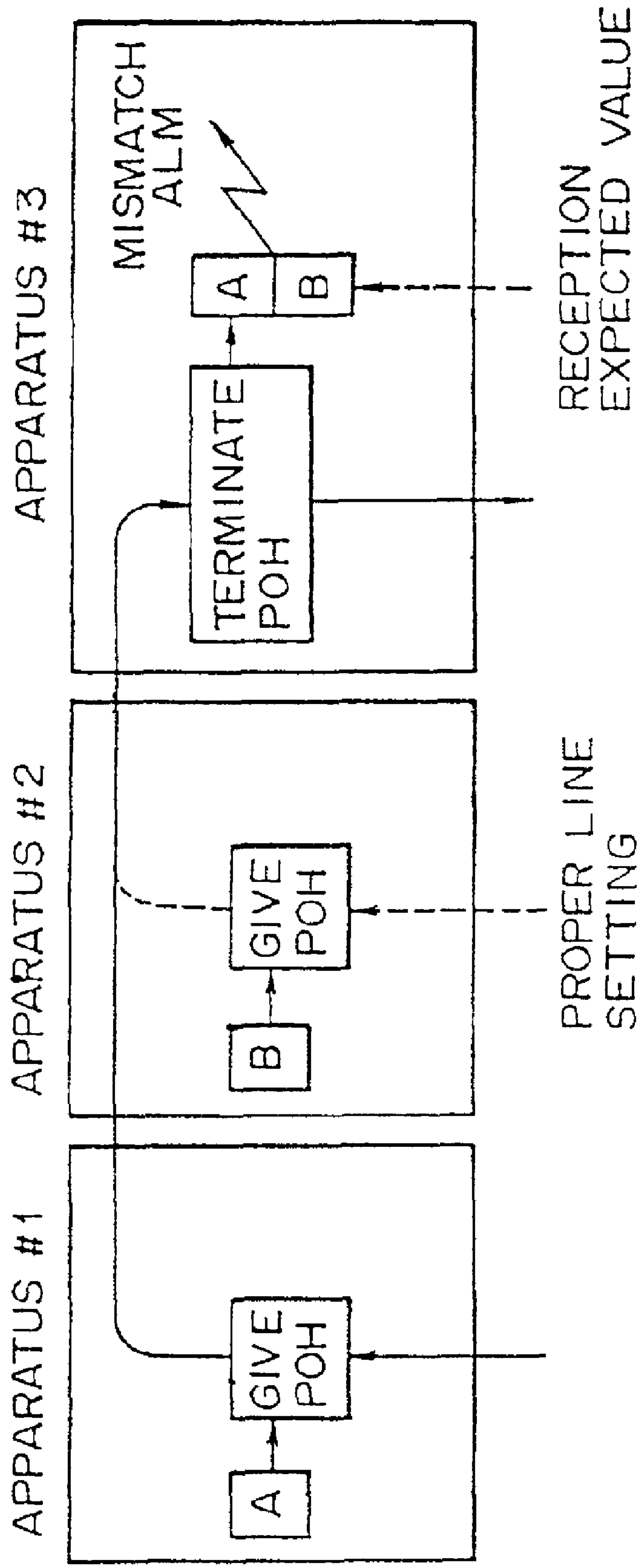
Figure 163:
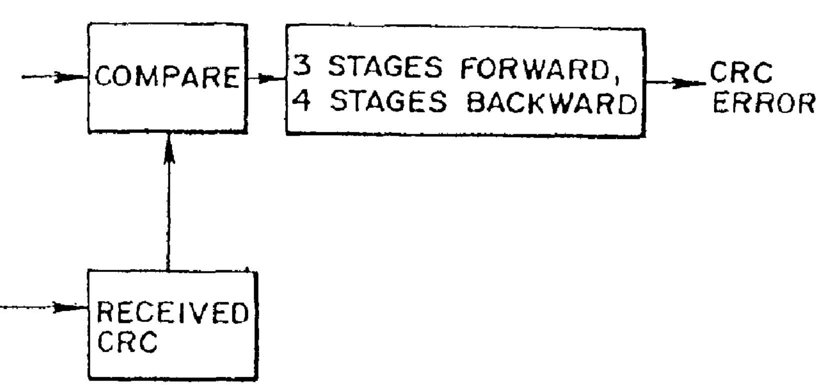
Figure 164:
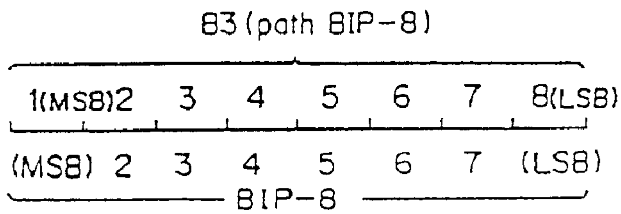
Figures 165A, 165B:
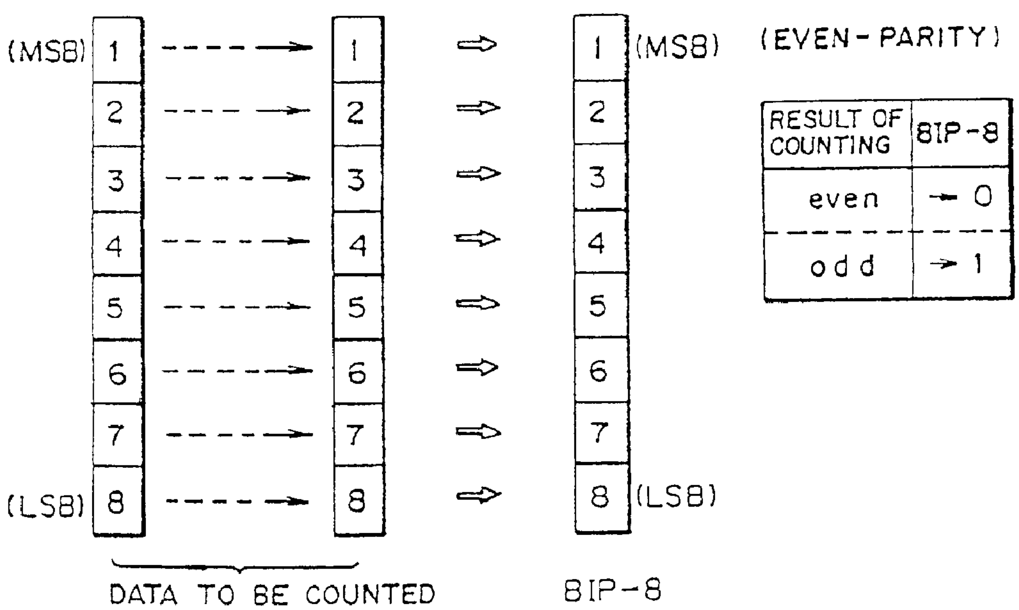
Figure 166:
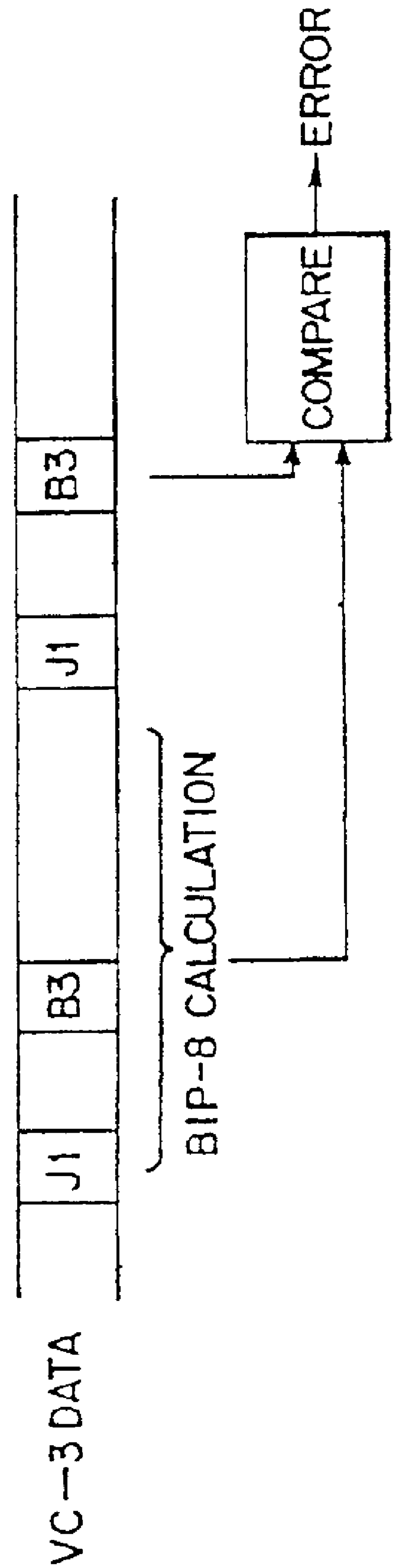
Figures 167, 168:
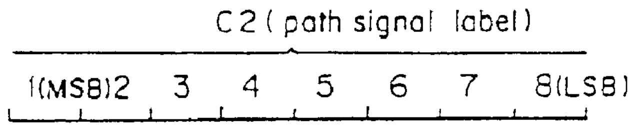
Figures 169, 170:
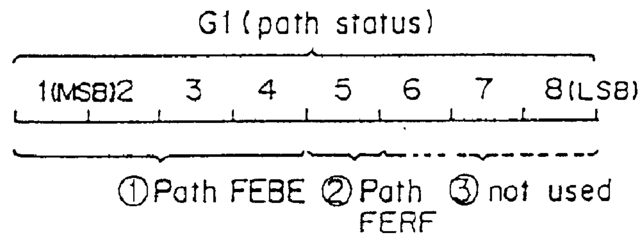
Figure 171:
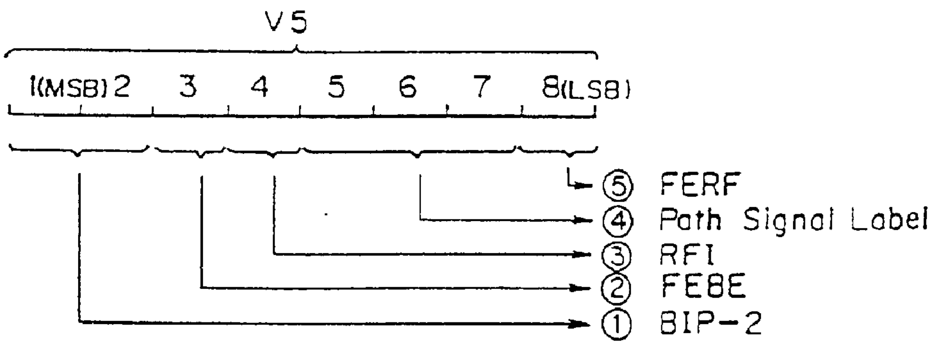
Figures 172A, 172B:
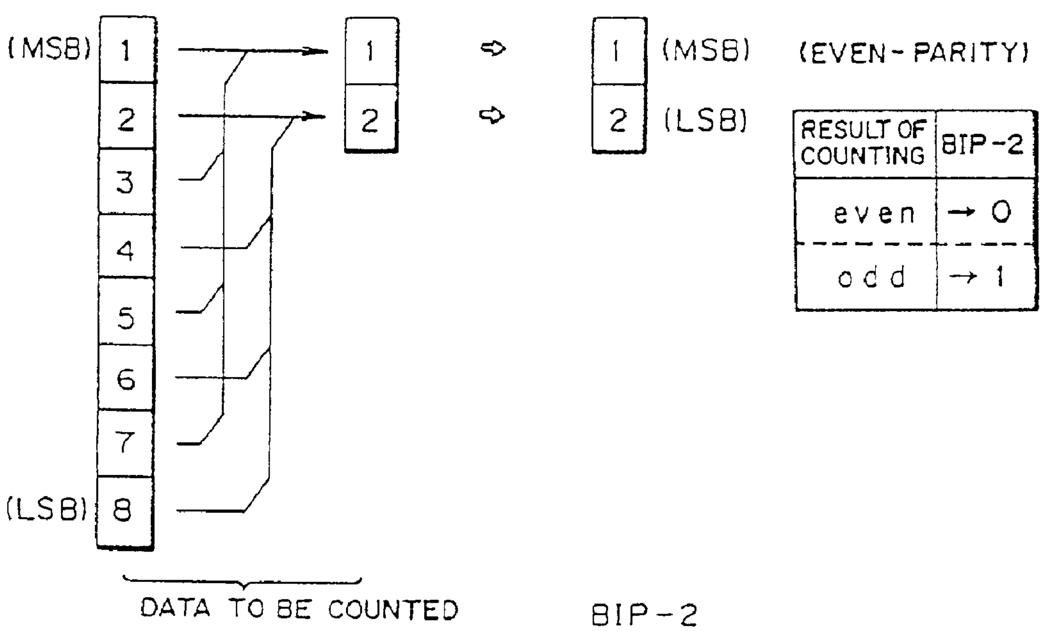
Figure 173:
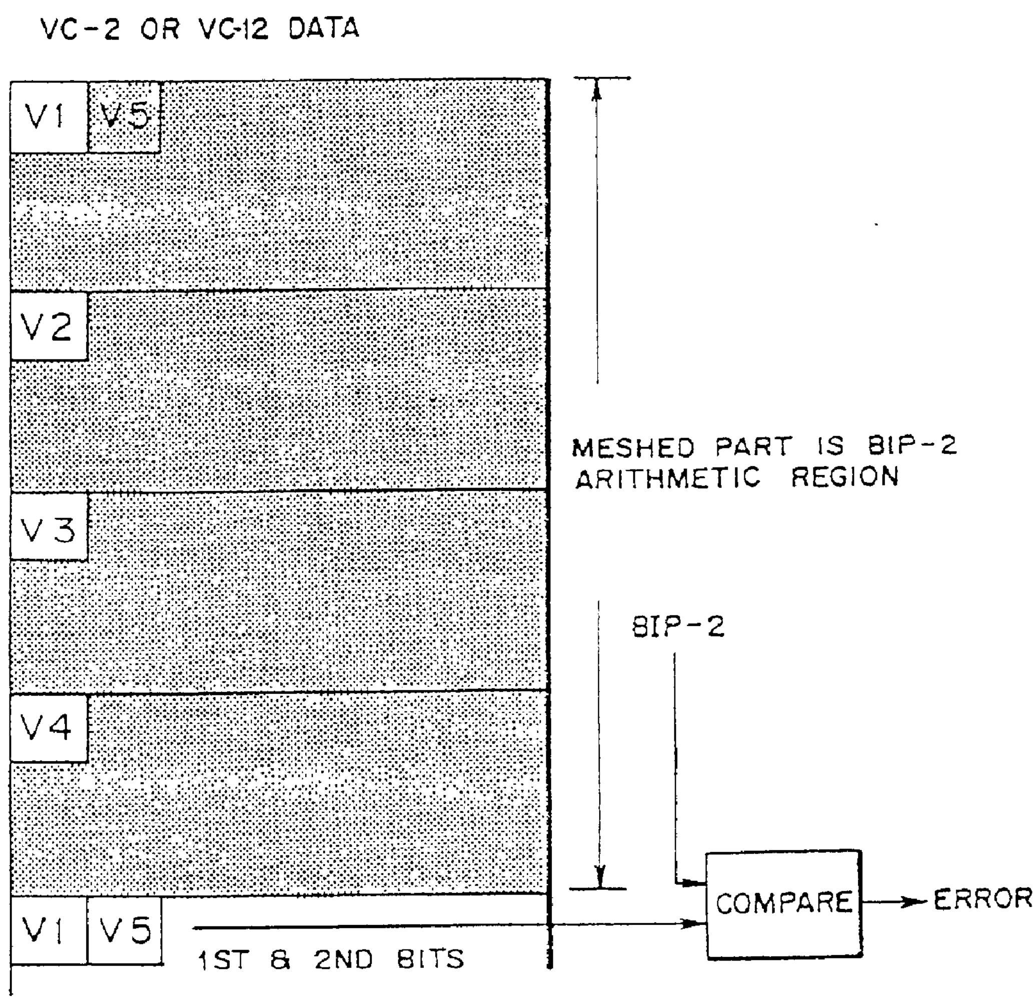
Figure 176:
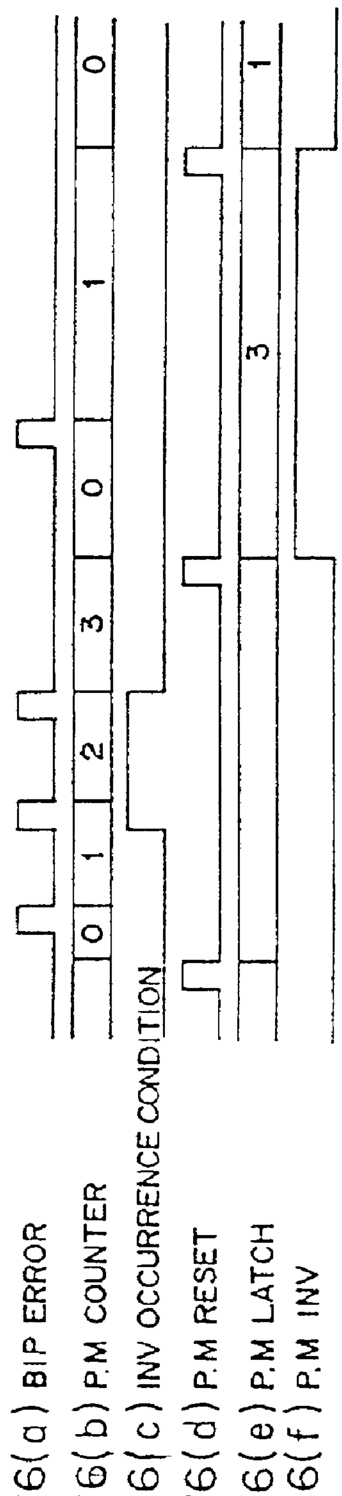
Figure 177:
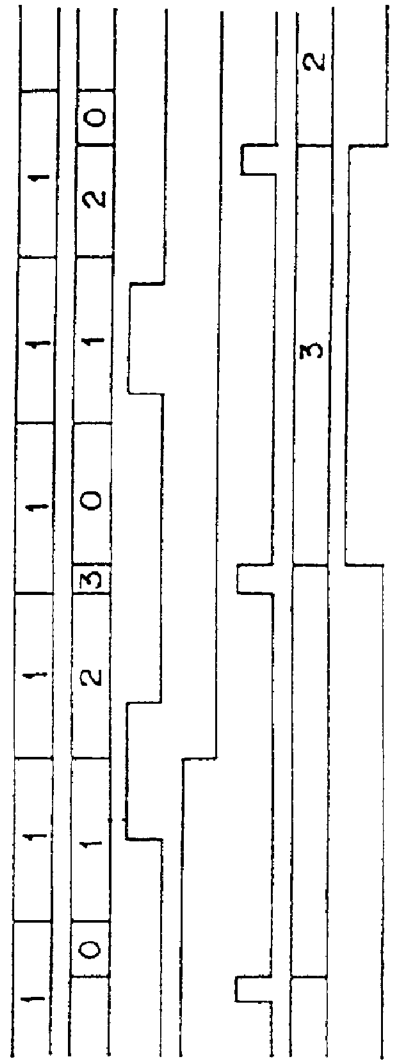
Figure 178:
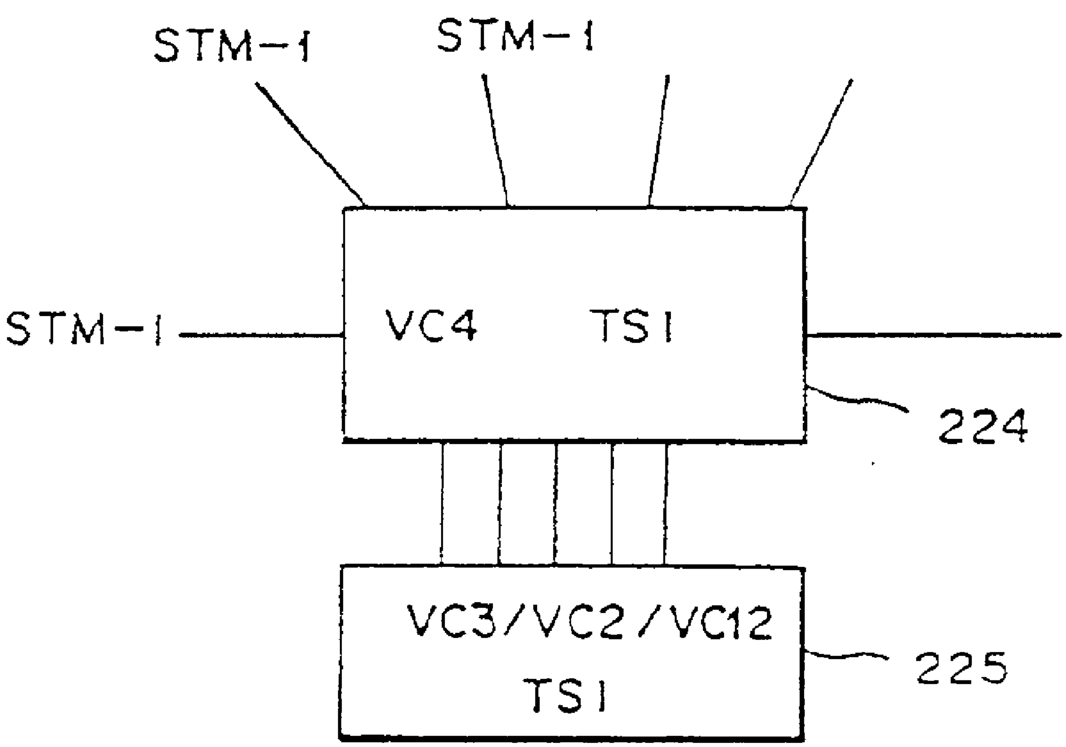

through 107($n$) are timing charts for illustrating an operation of the J1/J2 byte terminating process unit according to the embodiment;

FIGS. 108 and 109 are block diagrams showing a structure of a B3/V5 byte terminating process unit according to the embodiment;

FIG. 110 is a block diagram showing detailed structures of a BIP error serially detecting unit and a BIP2 holding unit according to the embodiment;

FIG. 111 is a block diagram showing a detailed structure of a BIP8 error serially detecting unit according to the embodiment;

FIG. 112 is a block diagram showing detailed structures of a BIPPM serially processing unit and a BIPPM holding unit according to the embodiment;

FIG. 113 is a diagram showing an example of a data format of a BIPPM holding RAM according to the embodiment;

FIG. 114 is a diagram for illustrating operation timings of the BIPPM holding RAM according to the embodiment;

FIG. 115 is a diagram showing an example of address contents of the BIPPM holding RAM according to the embodiment;

FIGS. 116 and 117 are diagrams for illustrating a switching control for the EXP1 and EXP2 holding RAMs according to the embodiment;

FIG. 118 is a block diagram showing a detailed structure of a PMRAM address controlling unit according to the embodiment;

FIG. 119 is a block diagram showing a detailed structure of a BIPPM count value initialization controlling unit according to the embodiment;

FIGS. 120($a$) through 120($f$), 121($a$) through 121($o$), 122($a$) through 122($n$), 123($a$) through 123($q$) and 124($a$) through 124($o$) are timing charts for illustrating an operation of the B3/V5 byte terminating process unit according to the embodiment;

FIGS. 125 through 128 are block diagrams showing another structures of the B3/V5 byte terminating process unit according to the embodiment;

FIG. 129 is a block diagram showing a detailed structure of a UNEQ serially detecting unit according to the embodiment;

FIG. 130 is a block diagram showing a detailed structure of an SLM serially detecting unit according to the embodiment;

FIG. 131 is a block diagram showing a detailed structure of the alarm bit holding unit according to the embodiment;

FIGS. 132($a$) through 132($z$) and 132($a$) are timing charts for illustrating an operation of a C2/V5 byte terminating process unit according to the embodiment;

FIGS. 133 and 134 are block diagrams showing another structures of the C2/V5 byte terminating process unit according to the embodiment;

FIGS. 135 through 137 are block diagrams showing a structure of a G1/V5 byte terminating process unit according to the embodiment;

FIG. 138 is a block diagram showing a detailed structure of an FEBE detecting unit according to the embodiment;

FIG. 139 is a block diagram showing detailed structures of an FEBEPM serially processing unit and an FEBEPM holding unit according to the embodiment;

FIG. 140 is a block diagram showing a detailed structure of a FEBEPM count value initialization controlling unit according to the embodiment;

FIG. 141 is a block diagram showing detailed structures of an FERF serially processing unit and an FERF holding unit according to the embodiment;

FIG. 142 is a block diagram showing a detailed structure of an FERF alarm bit holding unit according to the embodiment;

FIGS. 143 and 144 are block diagrams showing another structures of the G1/V5 byte terminating process unit according to the embodiment;

FIGS. 145($a$) through 145($x$), 146($a$) through 146($q$) and 147($a$) through 147($s$) are timing charts for illustrating an operation of the G1/V5 byte terminating process unit according to the embodiment;

FIG. 148 is a diagram for illustrating a hierarchy structure in an SDH transmission system;

FIG. 149 is a diagram showing a frame format of STM-1 in the SDH transmission system;

FIG. 150 is a diagram for illustrating a position at which VC4 is accommodated in a STM-1 frame;

FIG. 151 is a diagram showing a frame format of TU3 in the SDH transmission system;

FIG. 152 is a diagram for illustrating a position at which VC3 is accommodated in a TU3 frame;

FIG. 153 is a diagram showing a frame format of TU2 in the SDH transmission system;

FIG. 154 is a diagram for illustrating a position at which VC2 is accommodated in a TU2 frame;

FIG. 155 is a diagram showing a frame format of TU12 in the SDH transmission system;

FIG. 156 is a diagram for illustrating a position at which VC12 is accommodated in a TU12 frame;

FIG. 157 is a diagram showing a format of pointer bytes in the SDH transmission system;

FIG. 158 is a diagram for illustrating state transition of a pointer value in the SDH transmission system;

FIG. 159 is a block diagram showing an example of an SDH transmission network;

FIG. 160 is a block diagram showing an example of a pointer processing apparatus;

FIG. 161 is a diagram for illustrating a method of detecting a mismatch alarm in the SDH transmission system;

FIG. 162 is a diagram showing a format of a J1/J2 byte (path trace signal) in the SDH transmission system;

FIG. 163 is a diagram for illustrating a CRC operation process in the SDH transmission system;

FIG. 164 is a diagram showing a format of a B3 byte in the SDH transmission system;

FIGS. 165($a$), 165($b$) and 166 are diagrams for illustrating a BIP8 operation in the SDH transmission system;

FIG. 167 is a diagram showing a format of C2 byte in the SDH transmission system;

FIG. 168 is a diagram for illustrating a value (mapping code) set in a C2 byte in the SDH transmission system;

FIG. 169 is a diagram showing a format of G1 byte in the SDH transmission system;

FIG. 170 is a diagram for illustrating a value (FEBE code) set in a G1 byte in the SDH transmission system;

FIG. 171 is a diagram showing a format of a V5 byte in the SDH transmission system;

FIGS. 172($a$) and 172($b$) are diagrams for illustrating a BIP2 operation process in the SDH transmission system;

FIG. 173 is a diagram for illustrating the BIP2 operation process in the SDH transmission system;

FIG. 174 is a diagram for illustrating a value (FEBE code) set in a V5 byte in the SDH transmission system;

FIG. 175 is a diagram for illustrating a value (mapping code) set in a V5 byte in the SDH transmission system;

FIGS. 176(*a*) through 176(*f*) are timing charts for illustrating a performance monitor (BIPPM) process in the SDH transmission system;

FIGS. 177(*a*) through 177(*g*) are timing charts for illustrating a performance monitor (FEBEPM) process in the SDH transmission system; and FIG. 178 is a block diagram showing an example of a cross-connecting apparatus.

DESCRIPTION OF THE PREFERRED EMBODIMENTS (a) Description of Aspects of the Invention Now, description will be made of aspects of the present invention referring to the drawings.

Figure 1:
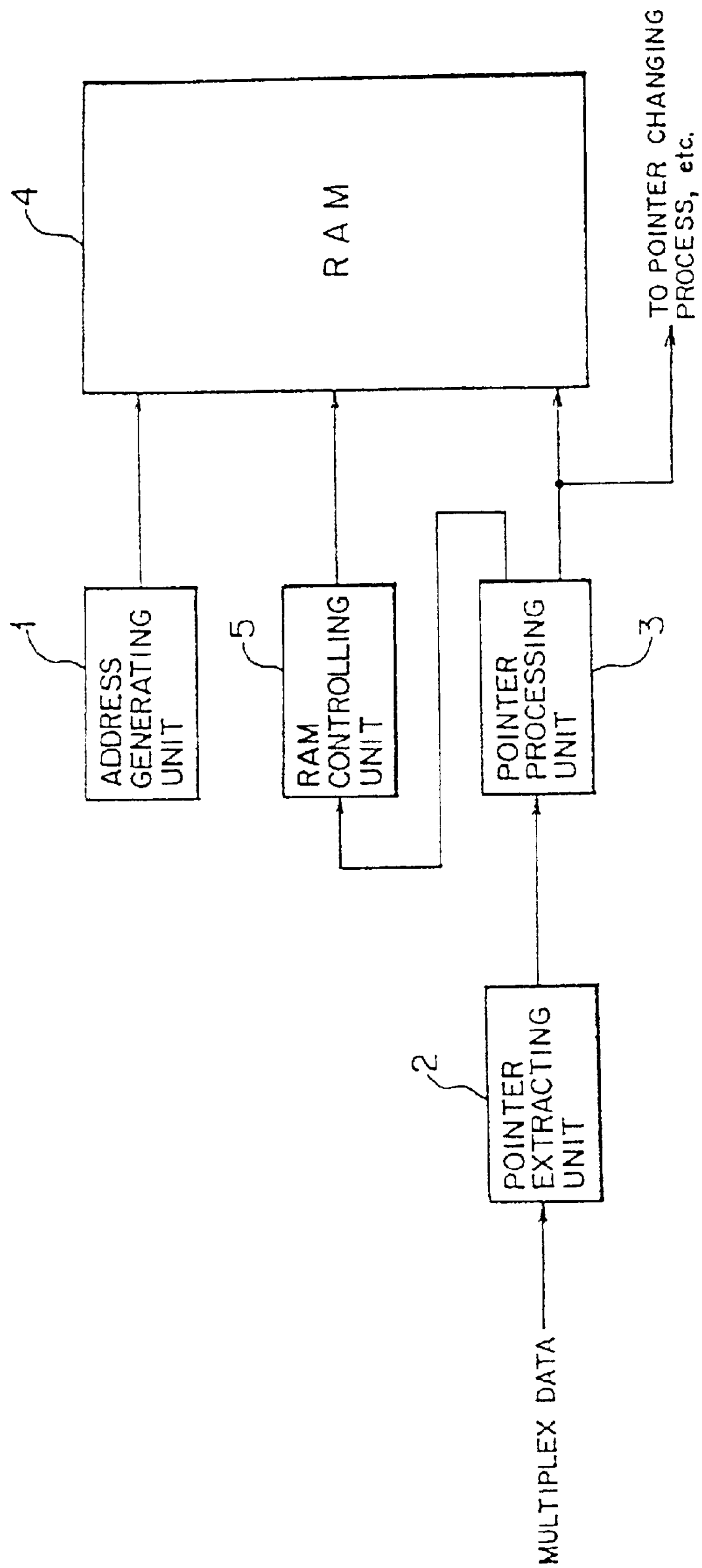
FIGS. 1 and 2 are block diagrams showing aspects of this invention.

FIG. 1 is a block diagram showing an aspect of this invention. A pointer processing apparatus in the SDH transmission system shown in FIG. 1 has an address generating unit 1, a pointer extracting unit 2, a pointer processing unit 3, a RAM (random access memory) 4 and a RAM controlling unit 5 in order to serially process pointers of inputted multiplex data.

The address generating unit 1 allocates an address to each channel of the inputted multiplex data. The pointer extracting unit 2 extracts pointer bytes including at least H1 byte or V1 byte (H1/V1 byte), and H2 byte or V2 byte (H2/V2 byte). The pointer processing unit 3 conducts a necessary pointer process.

The RAM 4 holds an information group represented by pointer bytes of each channel extracted from the multiplex data, an information group necessary to commence a pointer action by the received pointer bytes and an information group as a result of commencement of the pointer action, obtained by the above pointer extracting unit 2 and the pointer processing unit 3, in a region indicated by an address generated by the address generating unit 1 for each channel. The RAM controlling unit 5 controls a sequence of operation to write-in/read-out the RAM 4.

The pointer processing apparatus according to this invention with the above structure holds the above various information groups obtained from the multiplex data by the pointer extracting unit 2 and the pointer processing unit 3 into the RAM 4 for each channel according to an address generated by the address generating unit 1 so as to serially conduct the pointer process on the inputted multiplex data without separating the multiplex data into data on each channel (without converting the multiplex data into parallel data).

According to the above pointer processing apparatus, it is unnecessary to provide circuits used for the pointer process equal in number to plural channels so as to largely decrease the apparatus (circuit) scale, the power consumption, the number of distributions between function (circuit) blocks and the like.

The above RAM 4 may be divided into a first RAM and a second RAM. In which case, the first RAM holds the information group represented by the H1/V1 byte of the above received pointer bytes, whereas the second RAM holds the information group represented by the H2/V2 byte of the above received pointer bytes, the information group necessary to commence the above pointer action and the information group as a result of commencement of the pointer action.

The pointer processing apparatus of this invention writes the above information group in the first RAM according to a timing of the H1/V1 byte, while reading that information group according to a timing of the H2/V2 byte. On the other hand, the pointer processing apparatus can write and read the above various information groups in and from the second RAM according to a timing of the H2/V2 byte. This can decrease the number of time of accesses (H1/V1 timing) to the above second RAM. As a result, a power consumption of the RAM 4 may be further decreased.

In concrete, the above pointer processing unit 3 may have a first pointer translating unit for compressing the number of bits of the received H1/V1 byte to hold the information whose number of bits has been compressed into the RAM 4, whereby the number of bits of the information groups that should be held into the RAM 4 may be decreased. As a result, the number of bits necessary for the RAM 4 may be decreased so that a size of the RAM 4 in use may be also decreased.

The pointer processing unit 3 may have, in addition to the above first pointer translating unit, a second pointer translating unit for generating a pointer process control signal and a pointer process result at a timing of extracting the H2/V2 byte from the multiplex data on the basis of the multiplex data, the bit number compressed information generated by the first pointer translating unit, the information group represented by the H2/V2 byte of the above received pointer bytes, the information group necessary to commence the pointer action and the information group as a result of commencement of the pointer action, and holding these information groups into the RAM 4. It is therefore possible to generate various pointer process control signals necessary for the pointer process for each channel or conduct the pointer process in common in one pointer processing unit 3. This may largely decrease the apparatus scale, the power consumption, the number of distributions between function blocks and the like.

The pointer processing apparatus shown in FIG. 1 may extract an information signal indicating a pointer value of each channel from the multiplex data and hold low-order bits excepting the MSB (the most significant bit) of the information signal into the RAM 4, besides having a latch circuit for holding one bit of the MSB of the information signal obtained when a signal size of each channel of the multiplex data is TU3. In this case, a signal obtained by decoding an address value allocated to the channel of the above TU3 is used as a control signal to write-in and read-out the above latch circuit.

The pointer processing apparatus of this invention holds only low-order bits excepting the MSB into the RAM 4 so that the number of bits necessary to the RAM 4 is further decreased.

As a result, it is possible to further decrease a size of the RAM 4. When a signal size is TU3, the above MSB might be a value different from a value obtained at the time of TU3. In such case, one bit of the MSB is held in the latch circuit so that information necessary for the pointer processing may be always ensured to certainly conduct the process.

The above pointer processing apparatus 3 may have a coincidence detecting unit for detecting coincidence between a received pointer value and a received pointer value of the preceding frame to hold a result of the coincidence detection as a one-bit information into the RAM 4, a pointer value out-of-range converting unit for converting the pointer value held in the RAM 4 into a certain value out of a pointer value range when receiving a pointer byte representing invalid information and holding this converted information in the RAM 4, and a normal pointer value three consecutive coincidental reception detecting unit for detecting normal pointer value three consecutive coincidental reception by a logical product of a signal representing a result of the coincidence detection stored in the RAM 4 and a result of detection of coincidence between the preceding pointer value and a value of received pointer bytes.

The pointer processing unit 3 detects normal pointer value three consecutive coincidental reception by a logical product of a signal (one-bit information) representing a coincidence detection result stored in the RAM 4 and a result of coincidence detection on the received pointer value and a value of a received pointer bytes. It is therefore possible to normally conduct normal pointer value three consecutive coincidental reception detection serially on each channel only by holding a coincidence detection result of one-bit information into the RAM 4 without providing exclusive circuits each for counting how many times a normal pointer value is received or exclusive circuits each for holding a result of the counting equal in number to plural channels.

Therefore, it is possible to decrease a size of the RAM 4, besides largely decreasing the apparatus size, the power consumption, the number of distributions between function blocks and the like, as well.

The above pointer processing unit 3 may have an LOP detecting unit for detecting an LOP (Loss Of Pointer) state. The LOP detecting unit may have a count controlling unit for counting the number of times of NDF enable consecutive reception or the number of times of invalid pointer consecutive reception according to a predetermined truth table on the basis of NDF enable reception, invalid pointer reception, information of NDF enable reception of the receding frame and a count value of the preceding frame.

The pointer processing unit 3 may detect the LOP state only by counting the number of times of NDF enable consecutive reception-or invalid consecutive reception. As a result, it is possible to serially detect the LOP state of each channel without providing exclusive circuits each for counting the number of times of NDF enable consecutive reception or exclusive circuits each for counting the number of times of invalid pointer consecutive reception equal in number to plural channels.

In this case, the apparatus scale, the power consumption, the number of distributions between function blocks and the like may be largely decreased.

The above pointer processing unit 3 may have an INC/DEC reception result recognizing unit for recognizing an INC/DEC (increment/decrement) reception result in addition to the above LOP detecting unit. The INC/DEC reception result recognizing unit may have an INC/DEC detecting unit for detecting INC or DEC from received pointer bytes, and a stuff control suppressing unit having an n-ary counting unit for suppressing a stuff control by the INC/DEC reception during n (n is a natural number) frames after reception of NDF enable and INC/DEC so as to prevent memory slip caused by INC/DEC consecutive reception. With this arrangement, the pointer processing unit 3 holds a result of the counting by the n-ary counting unit and a result of reception of either INC or DEC into a RAM for recognizing an INC/DEC reception result to recognize an INC/DEC reception result using the reception result of INC/DEC held in the RAM, the count value of the n-ary counting unit and the result of NDF enable reception obtained by the above LOP detecting unit.

The above pointer processing unit 3 may recognize a result of INC/DEC reception only by holding a result of reception of either INC or DEC into the RAM for recognizing an INC/DEC reception result so that it is unnecessary to hold both of the INC reception result and the DEC reception result in the RAM for recognizing an INC/DEC reception result. This can decrease the number of bits necessary for the RAM.

It is therefore possible to further decrease a size of the RAM for receiving an INC/DEC reception result, besides decreasing a power consumption of the RAM.

The above pointer processing unit 3 may have an alarm state transition protecting unit. The alarm state transition protecting unit has, as a protecting circuit in m (m is a natural number) stages for conducting alarm state transition, a count controlling unit having a counting function and a RAM for protecting alarm state transition which stores a count value of the count controlling unit. The pointer processing unit 3 thereby counts up in the count controlling unit when receiving an alarm state transition object signal, resets a count of the count controlling unit if not receiving the alarm state transition object signal, transits to an alarm state when a count value of the count controlling unit reaches a maximum value, holds a count value of the count controlling unit as it was the maximum value in the RAM 4 until receiving an alarm cancel condition so as to judge whether a relevant channel is in the alarm state or not from whether a count value obtained when the count value is read out from the RAM 4 reaches the maximum value or not.

The above pointer processing unit 3 holds only a count value corresponding to the number of times of reception of the alarm state transition object signal at a corresponding channel address in the RAM 4 by the count controlling unit so as to serially recognize the alarm state of plural channels while suppressing the number of bits necessary to the RAM 4 to the minimum.

In this case, it is unnecessary to provide circuits each for recognizing the alarm state equal in number to the plural channels so that the apparatus scale, the power consumption, the number of distributions between function blocks and the like may be largely decreased.

The above pointer processing unit 3 may have an active pointer value holding unit for holding an active pointer value for each channel at which hardware are actually operating aside from a received pointer value.

The active pointer value holding unit holds low-order bits excepting the MSB of the above active pointer value into a RAM for holding an active pointer value, besides having a latch circuit for latching one bit of the MSB when a signal size of each channel of the multiplex data is TU3, in which a signal obtained by decoding an address value allocated to a channel of TU3 is used as a control signal used to write-in and read-out the latch circuit.

The pointer processing unit 3 may generate an active pointer value necessary for the pointer process for each channel without holding all bits of the active pointer value in the RAM for holding an active pointer value so that the number of bits necessary for the RAM for holding an active pointer value may be decreased.

It is therefore possible to decrease the number of bits necessary to the RAM for holding an active pointer value so as to contribute to reduction of a size and a power consumption of the RAM.

The above pointer processing unit 3 may have an SPE leading byte recognizing unit for recognizing a J1 byte or a V5 byte as a leading byte of SPE (synchronous Payload Envelope) in addition to the above active pointer value holding unit. The SPE leading byte recognizing unit has an offset counting unit for retrieving a leading byte of SPE, reads out an active pointer value from the above active pointer value holding unit to recognize a position of the leading byte of SPE by a logical product of an SPE enable signal and a result of detection of coincidence between an offset count value and the active pointer value.

The pointer processing unit 3 serially reads out an active pointer value from the active pointer value holding unit to recognize a position of a leading byte of SPE by a logical product of the SPE enable signal and a result of detection of coincidence between an offset count value and the active pointer value. It is therefore possible to serially recognize a leading byte of SPE of each channel without providing circuits each for holding an active pointer value or circuits each for counting an offset value equal in number to plural channels.

In consequence, the apparatus scale, the power consumption, the number of distributions between function blocks and the like may be largely decreased.

The pointer processing apparatus shown in FIG. 1 may have a mapping setting register group for setting which signal size among TU3/TU2/TU12 each channel of the multiplex data is mapped in, and a signal size selecting circuit for selecting a signal size of a relevant channel from the above mapping setting register group on the basis of an address allocated to each channel by the address generating unit 1. The pointer processing apparatus recognizes a signal size of each channel of the multiplex data by the above mapping setting register group and the signal size selecting circuit to conduct pointer extraction and the pointer process in a common circuit according to a signal size by giving information about the signal size to the pointer extracting unit 2, the pointer processing unit 3 and the RAM controlling unit 5.

The pointer processing apparatus of this invention may always recognize which signal size among TU3/TU2/TU12 each channel of the multiplex data is mapped in so as to conduct the pointer extraction and the pointer process in a common circuit without having the pointer extracting units 2, the pointer processing units 3 and the like equal in number to channels in different signal sizes even if channels in different signal sizes mixedly exist in the multiplex data.

It is therefore possible to largely decrease the apparatus scale, the power consumption, the number of distributions between function blocks and the like. In concrete, the above pointer processing apparatus has three TU3/TUG3 setting registers and seven TU2/TUG2 setting registers for each of the TU3/TUG3 setting register totaling. The pointer processing apparatus further has a signal size recognizing unit for judging whether a relevant channel is mapped in TU3 or not by the above TU3/TUG3 setting registers, and judging whether the channel is mapped in TU2 or TU12 by the above TU2/TUG2 setting registers if the channel is not mapped in TU3, thereby recognizing a signal size of the channel.

The pointer processing apparatus of this invention may conduct the pointer process on all channels with only 24 setting registers without necessity of having setting registers equal in number to all channels, that is, setting registers for TU3 for 3 signal sizes, setting registers for TU2 for 21 channels and setting registers for TU12 for 63 channels, for example.

Namely, it is possible to conduct the pointer process on all channels with setting registers reduced in number to about a one-third (24 in total) without necessity of providing setting registers (for 87 channels) which can comply with all signal sizes. In consequence, the apparatus scale, the power consumption, the number of distributions between function blocks and the like may be largely decreased.

The pointer processing apparatus shown in FIG. 1 which conducts the pointer extraction and the pointer process in a common circuit according to a signal size as above may be equipped with offset counters for respective signal sizes, select a count value of each of the offset counters according to mapping set information fed from the mapping setting register group to recognize a position of a leading byte of SPE.

The pointer processing apparatus of this invention may conduct the process to recognize a position of a leading byte of SPE for each of all channels in a common circuit even if channels in different signal sizes mixedly exist in the multiplex data.

The above pointer processing unit 3 has a RAM for changing a pointer having an ES (elastic) storage function, writes SPE data and information bits representing a leading byte of SPE obtained from the inputted multiplex data in the RAM, reads the data written in the RAM at a timing on the reading side to recognize a leading position of the SPE from a value of information bits representing the read SPE leading byte.

The pointer processing unit 3 may thereby serially recognize leading positions of SPEs for all channels using the common RAM for changing a pointer to change pointers.

Namely, it is possible to recognize a leading byte position of SPE and change a pointer for each of all channels in a common circuit even if channels in different signal sizes mixedly exit in the multiplex data so that the apparatus scale, the power consumption, the number of distributions between function blocks and the like may be largely decreased.

The above pointer processing apparatus may have a write/read number counter for controlling the above RAM for changing a pointer, and a decoding circuit for TU3 and a decoding circuit for TU2 for decoding a count value for TU3 and a count value for TU2, respectively, in order to switch a count number between an occasion of setting of TU3 mapping and an occasion of setting of TU2 mapping, selects an output signal of either one of the decoding circuits according to a signal size to use it as a load signal for the above counter, thereby using the above write/read number counter of the RAM as a common counter at the time of TU3 mapping and at the time of TU3 mapping.

The pointer processing apparatus of this invention selects an output signal of either one of the decoding circuits to switch a count number between an occasion of setting of TU3 mapping and an occasion of setting of TU2 mapping so as to count the number of write/read rows in a common counter even if channels in different signal sizes such as TU3 and TU2 fixedly exist in the multiplex data.

It is thereby possible to decrease the number of the write/read number counters to the number necessary for one channel although the write/read number counters for 3 channels for TU3 and 21 channels for TU2 are heretofore required so that the apparatus scale, the power consumption, the number of distributions between function blocks and the like may be largely decreased.

The above pointer processing apparatus may have a write/read number counter for controlling the above RAM for changing a pointer, and a decoding circuit for TU3, a decoding circuit for TU2 and a decoding circuit for TU12 for decoding a count value for TU3, a count value for TU2 and a count value for TU 12, respectively, in order to switch a count number among an occasion of setting of TU3 mapping, an occasion of setting of TU2 mapping and an occasion of setting of TU12 mapping, in which an output signal of any one of the decoding circuits is selected according to a signal size to be used as a load signal for the counter, whereby the above write/read number counter of the RAM is used as a common counter upon TU3/TU2/TU12 mapping.

The pointer processing apparatus of this invention selects an output signal of any one of the decoding circuits to switch a count number among an occasion of setting TU3 mapping, an occasion of setting of TU2 mapping and an occasion of setting of TU12 mapping, thereby counting the write/read row number by a common counter even if channels in different signal sizes such as TU3, TU2 and TU12 mixedly exist in the multiplex data.

It is therefore possible to largely decrease the apparatus scale, the power consumption, the number of distributions between function blocks, further.

Figure 2:
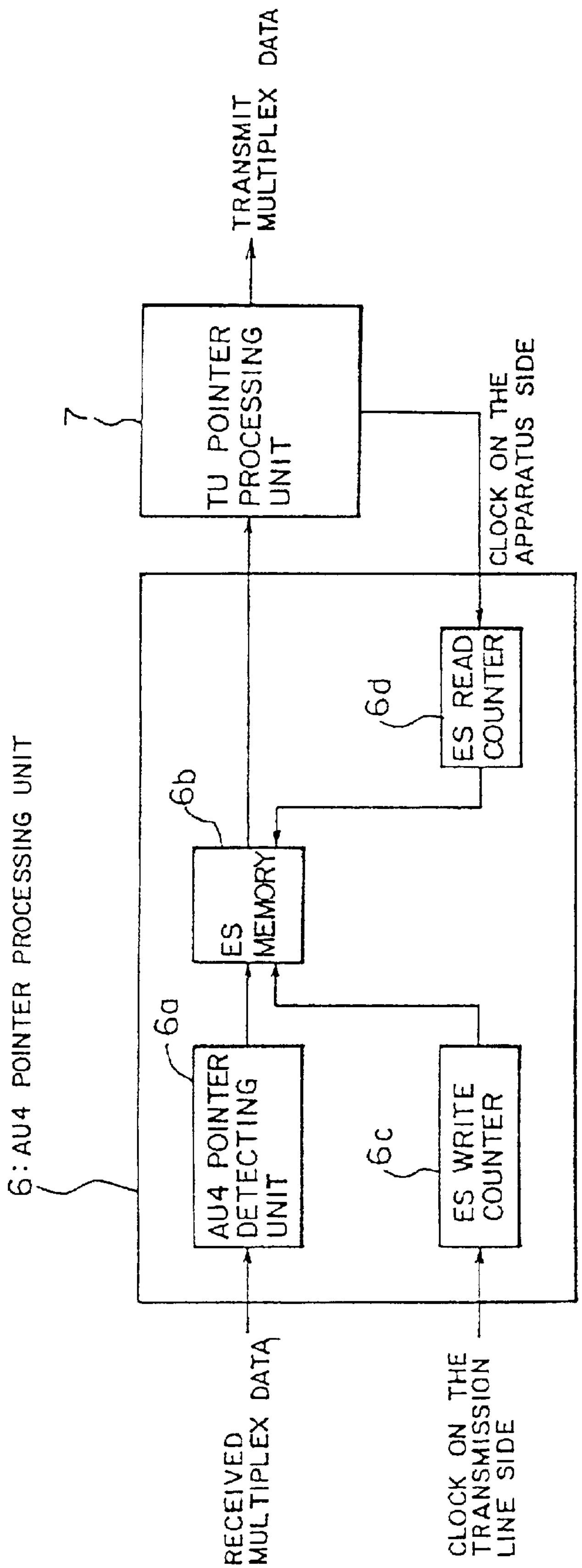

FIG. 2 is a block diagram showing another aspect of this invention. A pointer processing apparatus in the SDH transmission system shown in FIG. 2 has an AU4 pointer processing unit 6 for conducting a process on an AU4 pointer, and a TU pointer processing unit 7 for conducting a process on a TU pointer after the process by the TU4 pointer processing unit 6. The AU4 pointer processing unit 6 has an AU4 pointer detecting unit 6*a*, an ES memory for transferring a clock 6*b*, an ES write counter 6*c* and an ES read counter 6*d*.

The AU4 pointer detecting unit 6*a* translates an AU4 pointer, generates a VC4 enable signal and a signal representing a J1 byte position of VC4POH (path overhead) with a clock on the transmission line's side. The ES memory 6*a* is used to transfer a signal obtained after the AU4 pointer has been detected by the AU4 pointer detecting unit 6*a* from a clock on the transmission line's side to a clock on the apparatus's side.

The ES write counter 6*c* controls write-in process for the ES memory 6*b* with a clock on the transmission line's side. The ES read counter 6*d* controls read-out process for the ES memory 6*b* with a clock on the apparatus's side.

In the pointer processing apparatus of this invention with the above structure, the ES write counter 6*c* is operated with a clock on the transmission line's side, while the ES read counter 6*d* is operated with a clock on the apparatus's side, a phase difference in count value between the ES write counter 6*c* and the ES read counter 6*d* is detected to conduct a stuff control, whereby a signal is transferred from a clock on the transmission line's side to a clock on the apparatus's side in the AU4 pointer processing unit 6.

The TU pointer processing unit 7 may conduct a TU pointer process on the multiplex data obtained after transferred the clock so that it becomes unnecessary to provide ES stages used to absorb an effect such as clock fluctuations occurring upon transferring the clock equal in number to all channels.

According to the above pointer processing apparatus is effective to a reduction of a size, a power consumption and the like of this apparatus.

The above AU4 pointer processing unit 6 may have an AU4 pointer calculating/inserting unit for calculating an AU4 pointer on the basis of a transmit frame signal and inserting it, and gives data into which the AU4 pointer has been inserted by the AU4 pointer calculating/inserting unit to the TU pointer processing unit 7. The pointer processing apparatus of this invention may grasp a state of the process (the stuff control and the like) in the ES memory 6*b* from the data into which the AU4 pointer has been inserted by the AU4 pointer calculating/inserting unit.

It is therefore possible to readily verify a state of the operation of the ES memory 6*b*. If any problem arises in the pointer process, for example, it is possible to quickly specify whether the problem is on the AU4 pointer processing's side or the TU pointer processing's side to cope with the problem.

The above pointer processing apparatus may have a selecting circuit for selecting a signal in which the AU4 pointer has been changed by the AU4 pointer processing unit 6 having the above AU4 pointer calculating/inserting unit or a signal in which the TU pointer has been changed in the TU pointer processing unit, and transmitting the selected signal. The pointer processing apparatus of this invention may selectively output a signal in which the AU4 pointer has been changed or a signal in which the TU pointer has been changed so that the apparatus in the rear stage (a cross-connecting apparatus, for instance) may comply with both signals with one apparatus. This can decrease even a size of the apparatus in the rear stage.

The above TU pointer processing unit 7 may have the address generating unit 1, the pointer extracting unit 2, the pointer processing unit 3, the RAM 4 and the RAM controlling unit 5 shown in FIG. 1. The TU pointer processing unit 7 shown in FIG. 2 may thereby serially conduct the pointer process (the TU pointer process) on the inputted multiplex data without separating the multiplex data into data on each channel (without converting the multiplex data into parallel data) as described before with reference to FIG. 1. This largely contribute to a decrease of a size and a power consumption of this apparatus.

Figure 55:
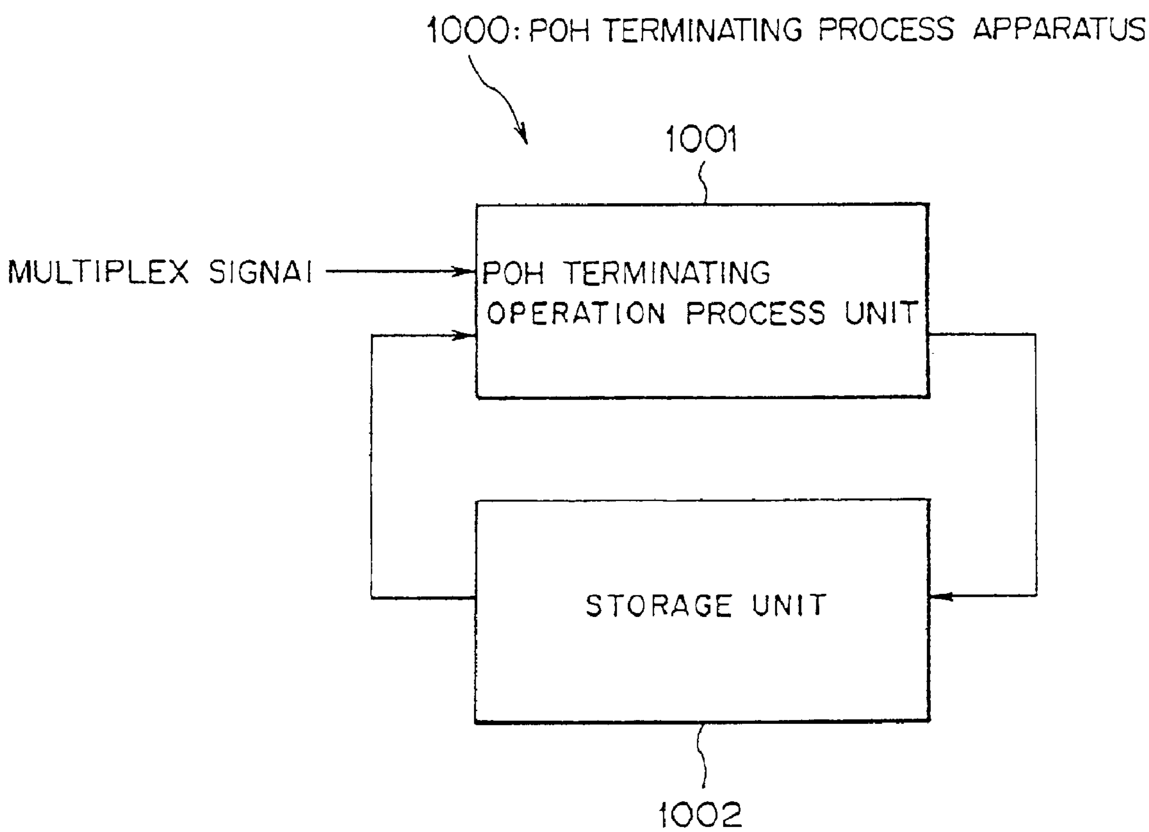
FIG. 55 is a block diagram showing still another aspect of this invention.

FIG. 55 is a block diagram showing still another aspect of this invention. A POH terminating process apparatus 1000 shown in FIG. 55 conducts a POH terminating process on a multiplex signal in which information on a plurality of channels are multiplexed transmitted in the SDH transmission system. The POH terminating process apparatus 1000 has a POH terminating operation processing unit 1001 in common to all channels for conducting a POH termination operation process on the multiplex signal and a storage unit 1002 flexibly readable and writable for storing a result of an operation conducted in the POH terminating process unit 1001 for each channel.

The POH terminating process apparatus 1000 shown in FIG. 55 uses stored information about a corresponding channel stored in the storage unit 1002 when conducting the POH terminating operation process on a multiplex signal to conduct the POH terminating operation process in the POH terminating operation process unit 1001, stores an obtained result of the POH terminating operation process in a storage area for the corresponding channel, thereby serially conducting the POH terminating operation process on the multiplex signal without separating the multiplex signal into channels.

The above POH terminating operation process apparatus 1000 can serially conduct the POH terminating operation process on the multiplex signal without separating the multiplex signal into channels. Therefore, it becomes unnecessary to equip circuits for the POH terminating operation process equal in number to channels in the multiplex signal.

According to this invention, it is possible to largely decrease a (circuit) scale and a power consumption of the POH terminating process apparatus 1000.

The above POH terminating process apparatus 1000 may have a latching unit for temporarily storing stored information about a corresponding channel read out from the storage unit 1002 and POH byte data in the multiplex signal that should be processed when conducting the POH terminating operation process by the POH terminating operation process unit 1001, make the latching unit latch the stored information held in the storage unit 100 and the POH byte data in the multiplex signal that should be processed at a detecting timing of POH, thereby supplying the stored information necessary for the POH terminating operation process to the POH terminating operation process unit 1001 at a desired timing. The POH terminating operation process unit 1001 can thereby be operated only when necessary.

The above POH terminating process apparatus 1000 supplies stored information for each corresponding channel and POH byte data in the multiplex signal that should be processed necessary for the POH terminating operation process to the POH terminating operation process unit 1001 at a desired timing, thereby operating the POH terminating operation process unit 1001 only when necessary. This can further largely decrease a power consumption of the POH terminating process apparatus 1000.

The above POH terminating operation process unit 1001 may be configured as a J1/J2 byte serially terminating process unit for serially conducting a terminating process on J1 byte and J2 byte included in the multiplex signal, for example. In which case, the storage unit 1002 stores a result of an operation conducted in the J1/J2 byte serially terminating process unit for each channel, besides supplying stored information to the J1/J2 byte serially terminating unit.

The POH terminating process apparatus can serially conduct the terminating process on J1 byte [included in VC (Virtual Container)-3 if the multiplex signal is an STM-1 frame] and a terminating process on J2 byte included in POH of the multiplex signal having a signal size in a lower digital stage different from a signal size of the multiplex signal including J1 byte, by the J1/J2 byte serially terminating process unit in common to all channels.

Therefore, it is unnecessary to equip circuits each for terminating J1 byte and circuits each for terminating J2 byte equal in number to corresponding channels in the POH terminating process apparatus 1000. In consequence, a scale and a power consumption of the POH terminating process apparatus 100 can be largely decreased.

In concrete, the above J1/J2 byte serially terminating process unit has units described below, for example:

- a multiframe pattern serially detecting unit for serially detecting a multiframe pattern of J1 byte and J2 byte;
- a multiframe pattern number serially controlling unit for serially controlling the number of multiframes of J1 byte and J2 byte;
- an LOM serially detecting unit for serially detecting LOM (Loss Of Multiframe) of J1 byte and J2 byte;
- a CRC serially detecting unit for serially detecting CRC (Cyclic Redundancy Check) of J1 byte and J2 byte; and
- a TIM serially detecting unit for serially detecting TIM (Trace Indicator Mismatch) of J1 byte and J2 byte.

In this case, the above storage unit 1002 stores result of operations conducted in the multiframe pattern serially detecting unit, the multiframe pattern number serially controlling unit, the LOM serially detecting unit, the CRC serially detecting unit and the TIM serially detecting unit mentioned above for each channel, besides supplying stored information to the multiframe pattern serially detecting unit, the multiframe pattern number serially controlling unit, the LOM serially detecting unit, the CRC serially detecting unit and the TIM serially detecting unit.

Whereby, the POH terminating process apparatus 1000 can serially obtain various alarm information such as LOM, CRC, TIM and the like by the J1/J2 byte serially terminating process unit in common to all channels.

Therefore, it becomes unnecessary to equip a circuit for detecting LOM, a circuit for detecting CRC, a circuit for detecting TIM and the like separately to the POH terminating operation processing unit 1000, which can further decrease a scale and a power consumption of the apparatus.

The POH terminating operation process unit 1001 shown in FIG. 55 may be configured as a B3/V5 byte serially terminating process unit for conducting a terminating process on BIP (Bit Interleaved Parity) of B3 byte and V5 byte included in the multiplex signal and a terminating process on BIPPM (BIP performance Monitor) of the B3 byte and V5 byte mentioned above. In which case, the storage unit 1002 stores a result of an operation conducted in the B3/V5 byte serially terminating process unit for each channel, besides supplying stored information to the B3/V5 byte serially terminating process unit.

Whereby, the POH terminating process unit 1000 can serially conduct a BIP terminating (operating) process on B3 byte (included in POH of VC-3 if the multiplex signal is an STM-1 frame) and a BIP terminating process on the V5 byte included in POH of the multiplex signal having a signal size in a lower digital stage different from a signal size of the multiplex signal including B3 byte, by the B3/V5 byte serially terminating process unit in common to all channels.

Therefore, it becomes unnecessary to equip circuits for the BIP terminating process on B3 byte and V5 byte equal in number to corresponding channels so that a scale and a power consumption of the apparatus can be further decreased.

In concrete, the B3/V5 byte serially terminating process unit has, for example, the following units:

- a BIP-8 operation serially processing unit for serially conducting a BIP8 (Bit Interleaved Parity-8) operation on the multiplex signal;
- a BIP2 operation serially processing unit for serially conducting a BIP2 (Bit Interleaved Parity-2) operation on the multiplex signal;
- a BIP error-selecting unit for selecting a BIP error signal outputted from the BIP8 operation serially processing unit or the BIP2 operation serially processing unit; and
- a BIPPM serially adding unit for serially conducting an adding operation on BIPPM on the basis of the BIP error signal selected by the BIP error selecting unit.

In this case, the above storage unit 1002 stores a result of the operation conducted in the above BIPPM serially adding unit for each channel, besides supplying stored information to the BIPPM serially adding unit.

Whereby, the POH terminating process apparatus 1000 can serially detect a BIP error, which should be detected through the POH terminating process for each of channels generally having different signal sizes, by the B3/V5 serially terminating process unit in common to all channels.

It therefore becomes unnecessary to equip circuits each for detecting a BIP8 error and circuits each for detecting a BIP2 error equal in number to corresponding channels, which can largely decrease a scale and a power consumption of the apparatus.

The B3/V5 byte serially terminating process unit may have the following units:

- a BIP8 operation serially processing unit for serially conducting the BIP8 operation on the multiplex signal;
- a first BIPPM serially adding unit for serially conducting the addition operation on BIPPM on the basis of a BIP error signal fed from the BIP8 operation serially processing unit;

- a BIP2 operation serially processing unit for serially conducting the BIP2 operation on the multiplex signal; and
- a second BIPPM serially adding unit for serially conducting the adding operation on BIPPM on the basis of a BIP error signal fed from the BIP2 operation serially processing unit.

In which case, the above storage unit 1002 has a first storage unit for storing a result of each operation conducted in the above first BIPPM serially adding unit besides supplying stored information to the first BIPPM serially adding unit, and a second storage unit for storing a result of each operation conducted in the above second BIPPM serially adding unit besides supplying stored information to the second BIPPM serially adding unit.

Namely, the above B3/V5 byte serially terminating process unit obtains BIP error signals (BIPPMs) one by one through the BIP8 serially terminating process and the BIP2 serially terminating process, after that, selectively outputs one of the BIPPMs. It is therefore possible to serially obtain BIPPMs in a simple structure. If there is particularly no need to use the storage unit 1002 holding BIPMs in common to all channels, the above structure is very effectively.

This largely contributes to flexibility and versatility in configuring the apparatus.

The POH terminating operation processing unit 1001 shown in FIG. 55 may be configured as a UNEQ serially terminating process unit for serially conducting a terminating process on UNEQ (Unequipped) of C2 byte and V5 byte included in the multiplex signal. In which case, the storage unit 1002 stores a result of an operation conducted in the UNEQ serially processing unit for each channel, besides supplying stored information to the UNEQ serially terminating process unit.

The POH terminating process apparatus 1000 can serially conduct a UNEQ terminating process on C2 byte (included in POH of VC-3 if the multiplex signal is an STM-1 frame), and the UNEQ terminating process on V5 byte included in POH of the multiplex signal having a signal size in a lower digital stage different from that of the multiplex signal including C2 byte, by the UNEQ serially terminating process unit in common to all channels.

Therefore, it becomes unnecessary to equip circuits for the UNEQ terminating process on C2 byte and V5 byte equal in number to corresponding channels, which can largely decrease a scale and a power consumption of the apparatus.

In concrete, the above UNEQ serially terminating process unit has, for example, units below:

- a C2UNEQ indication serially detecting unit for serially detecting whether C2 byte indicates UNEQ or not;
- a V5UNEQ indication serially detecting unit for serially detecting whether V5 byte indicates UNEQ or not;
- a UNEQ indication selecting unit for selecting a UNEQ indication detect signal outputted from the C2UNEQ indication serially detecting unit or the V5UNEQ indication serially detecting unit; and
- a UNEQ serially detecting unit for serially indicating UNEQ of C2 byte and V5 byte on the basis of the UNEQ indication detect signal selected by the UNEQ indication selecting unit.

In this case, the above storage unit 1002 stores a result of detection conducted in the UNEQ serially detecting unit for each channel, besides supplying stored information to the UNEQ serially detecting unit.

The POH terminating process apparatus 1000 can serially indicate UNEQ, which should be done in the POH terminating process for each of channels generally having different signal sizes, by the UNEQ serially terminating process unit in common to all channels.

Therefore, it becomes unnecessary to equip circuits each for indicating UNEQ equal in number to corresponding channels, which can largely decrease a scale and a power consumption of the apparatus.

Incidentally, the UNEQ serially terminating process unit may have units below:

- a C2UNEQ indication serially detecting unit for serially detecting whether C2 byte indicates UNEQ or not;
- a first UNEQ serially detecting unit for serially indicating UNEQ of C2 byte on the basis of a UNEQ indication detect signal fed from the above C2UNEQ indication serially detecting unit;
- a V5UNEQ indication serially detecting unit for serially detecting whether V5 byte indicates UNEQ or not;
- a second UNEQ serially detecting unit for serially indicating UNEQ of V5 byte on the basis of a UNEQ indication detect signal fed from the above V5 UNEQ indication serially detecting unit; and
- a UNEQ indication selecting unit for selecting UNEQ indication outputted from the above first UNEQ serially detecting unit or the second UNEQ serially detecting unit.

In which case, the storage unit 1002 shown in FIG. 55 has a first storage unit for storing a result of detection conducted is the first UNEQ serially detecting unit for each channel besides supplying stored information to the first UNEQ serially detecting unit, and a second storage unit for storing a result of detection conducted in the second UNEQ serially detecting unit for each channel besides supplying stored information to the second UNEQ serially detecting unit.

Namely, the above UNEQ serially terminating process unit serially conducts the UNEQ indicating process on C2 byte and the UNEQ indicating process on V5 byte, one by one, after that, selectively outputs one of the UNEQ indications. It is therefore possible to serially indicate UNEQ in a simple structure. This is very effective if there is particularly no need to use the storage unit 1002 holding UNEQ indication in common to all signal sizes.

Accordingly, this invention largely contributes to flexibility and versatility in configuring the apparatus.

The POH terminating operation processing unit 1001 shown in FIG. 55 may be configured as an SLM serially terminating process unit for serially conducting a terminating process on SLM (Signal Label Mismatch) of V5 byte and C2 byte included in the multiplex signal. In which case, the storage unit 1002 stores a result of an operation conducted in the SLM serially terminating unit for each channel, besides supplying stored information to the SLM serially terminating process unit.

The POH terminating process apparatus 1000 can serially conduct an SLM terminating process on C2 byte and the SLM terminating process on V5 byte in the SLM terminating process unit in common to all channels.

Therefore, it is possible to further decrease a scale and a power consumption of the apparatus.

In concrete, the above SLM serially terminating process unit has, for example, units below:

- a C2 mismatch serially detecting unit for serially detecting that mismatch is detected in C2 byte;
- a V5 mismatch serially detecting unit for serially detecting that mismatch is detected in V5 byte;
- a mismatch detection selecting unit for selecting a mismatch detect signal outputted from the C2 mismatch serially detecting unit or the V5 mismatch serially detecting unit; and an SLM serially detecting unit for serially detecting SLM of C2 byte and V5 byte on the basis of the mismatch detect signal selected by the above mismatch detection select signal.

In this case, the storage unit 1002 stores a result of detection conducted in the SLM serially detecting unit for each channel, besides supplying stored information to the SLM serially detecting unit.

Whereby, the POH terminating process apparatus 1000 can serially detect SLM, which should be done in the POH terminating process for each of channels generally having different signal sizes, by the SLM serially terminating process unit in common to all channels.

Therefore, it becomes unnecessary to equip circuits each for detecting SLM equal in number to corresponding channels, which largely decreases a scale and a power consumption of the apparatus.

Incidentally, the SLM serially terminating process unit may have units below:

a C2 mismatch serially detecting unit for serially detecting that mismatch is detected in C2 byte;

a first SLM serially detecting unit for serially detecting SLM of C2 byte on the basis of a mismatch detect signal fed from the above C2 mismatch serially detecting unit;

a V5 mismatch serially detecting unit for serially detecting that mismatch is detected in V5 byte;

a second SLM serially detecting unit for serially detecting SLM of V5 byte on the basis of a mismatch detect signal fed from the above V5 mismatch serially detecting unit; and an SLM selecting unit for selecting SLM outputted from the first SLM serially detecting unit or the second SLM serially detecting unit.

In this case, the storage unit 1002 has a first storage unit for storing a result of detection conducted in the first SLM serially detecting unit for each channel, besides supplying stored information to the first SLM serially detecting unit, and a second storage unit for storing a result of detection conducted in the second SLM serially detecting unit for each channel, besides supplying stored information to the second SLM serially detecting unit.

Namely, the above SLM serially terminating process unit serially conducts an SLM detecting process on C2 byte and the SLM detecting process on V5 byte, one by one, after that, selectively outputs one of the SLMs, thereby serially detecting SLM in a simple structure. This is very effective if there is particularly no need to use the storage unit 1002 for holding SLM in common to all signal sizes.

Accordingly, this invention largely contributes to flexibility and versatility in configuring the apparatus.

Further, the POH terminating operation process unit 1001 shown in FIG. 55 may be configured as an FEBE serially terminating process unit for serially conducting a terminating process on FEBE (Far End Block Error) of G1 byte and V5 byte included in the multiplex signal and a terminating process on FEBEPM (FEBE Performance Monitor) of G1 byte and V5 byte mentioned above. In which case, the storage unit 1002 stores a result of an operation conducted in the FEBE serially terminating process unit for each channel, besides supplying stored information to the FEBE serially terminating process unit.

Whereby, the POH terminating process apparatus 1000 can serially conduct the terminating process on FEBE and FEBEPM of G1 byte (included in POH of VC-3 if the multiplex signal is an STM-1 frame) and a terminating process on FEBE and FEBEPM of V5 byte included in POH of the multiplex signal having a different signal size in a lower digital stage different from that of the multiplex signal including G1 byte by the FEBE serially terminating process unit in common to all channels.

In this case, it is possible to further decrease a scale and a power consumption of the apparatus.

In concrete, the above FEBE serially terminating process unit has, for example parts below:

a G1FEBE serially detecting unit for serially detecting FEBE of G1 byte;

a V5FEBE serially detecting unit for serially detecting FEBE of V5 byte;

an FEBE selecting unit for selecting an FEBE detect signal outputted from the G1 FEBE serially detecting unit or V5FEBE serially detecting unit; and an FEBEPM serially adding unit for serially conducting an adding operation on FEBEPM on the basis of the FEBE detect signal selected by the above FEBE selecting unit.

In which case, the storage unit 1002 stores a result of addition conducted by the FEBEPM serially adding unit for each channel, besides supplying stored information to the FEBEPM serially adding unit.

Whereby, the POH terminating process apparatus 1000 can serially conduct the terminating process on FEBE and FEBEPM, which should be done in the POH terminating process for each of channels generally having different signal sizes, by the FEBE serially terminating process unit in common to all channels.

Therefore, it becomes unnecessary to equip circuits each for conducting the terminating process on FEBE and FEBEPM equal in number to corresponding channels. This can largely decrease a scale and a power consumption of the apparatus.

Incidentally, the FEBE serially terminating process unit may have parts below:

a G1FEBE serially detecting unit for serially detecting FEBE of G1 byte;

a first FEBEPM serially adding unit for serially conducting an adding operation on FEBEPM on the basis of an FEBE detect signal supplied from the above G1FEBE serially detecting unit;

a V5FEBE serially detecting unit for serially detecting FEBE of V5 byte;

a second FEBEPM serially adding unit for serially conducting an adding operation on FEBEPM on the basis of an FEBE detect signal supplied from the above V5FEBE serially detecting unit; and an FEBEPM selecting unit for selecting FEBEPM outputted from the first FEBEPM serially adding unit or the second FEBEPM serially adding unit.

In which case, the storage unit 1002 stores a result of addition conducted in the FEBEPM serially adding unit for each channel, besides supplying stored information to the FEBEPM serially adding unit.

Namely, the above FEBE serially terminating process unit serially conducts the detection of FEBE and the adding operation on FEBEPM of G1 byte, and detection of FEBE and the adding operation on FEBEPM of V5 byte, one by one after that, selectively outputs one of the FEBEPMs. It is thereby possible to serially detect FEBE and FEBEPM in a simple structure. The above structure is very effective if there is particularly no need to use the storage unit 1002 holding FEBEPM in common to all signal sizes.

This invention, thus, largely contributes to flexibility and versatility in configuring the apparatus.

Further, the POH terminating operation process unit 1001 shown in FIG. 55 may be configured as an FERF serially terminating process unit for serially conducting a terminating process on FERF (Far End Receive Failure) of G1 byte and V5 byte included in the multiplex signal. In which case, the storage unit 1002 stores a result of an operation conducted in the FERF serially terminating process unit for each channel, besides supplying stored information to the FERF serially terminating process unit.

Whereby, the POH terminating process apparatus can serially conduct a terminating process on FERF of G1 byte and a terminating process on FERF of V5 byte by the FERF serially terminating process unit in common to all channels.

Therefore, it is possible to further decrease a scale and a power consumption of the apparatus.

In concrete, the above FERF serially terminating process unit has, for example, units below:

a G1FERF indication serially detecting unit for serially detecting that G1 byte indicates FERF; a V5FERF indication serially detecting unit for serially detecting that V5 byte indicates FERF;

an FERF indication detection selecting unit for selecting an FERF indication detect signal outputted from the G1 FERF indication serially detecting unit or the V5FERF indication serially detecting unit; and an FERF serially detecting unit for serially detecting FERF of G1 byte and V5 byte on the basis of the FERF indication detect signal selected by the above FERF indication detection selecting unit.

In which case, the storage unit 1002 stores a result of detection conducted in the FERF serially detecting unit for each channel, besides supplying stored information to the FERF serially detecting unit.

Whereby, the POH terminating process apparatus 1000 can serially conduct a terminating process on FERF, which should be done in the POH terminating process each of channels generally having different signal sizes, by the FERF serially terminating process unit in common to all channels.

Therefore, it becomes unnecessary to equip circuits each for the FERF terminating process equal in number to corresponding channels. This can further largely decrease a scale and a power consumption of the apparatus.

The FERF serially terminating process unit may have units below:

a G1FERF indication serially detecting unit for serially detecting that G1 byte indicates FERF;

a first FERF serially detecting unit for serially detecting FERF of the above G1 byte on the basis of an FERF indication detect signal fed from the G1FERF indication serially detecting unit;

a V5FERF indication serially detecting unit for serially detecting that V5 byte indicates FERF;

a second FERF serially detecting unit for serially detecting FERF of the above V5 byte on the basis of an FERF indication detect signal fed from the V5FERF indication serially detecting unit; and an FERF indication selecting unit for selecting FERF indication outputted from the first FERF serially detecting unit or the second FERF serially detecting unit.

In which case, the storage unit 1002 has a first storage unit for storing a result of detection conducted in the first FERF serially detecting unit for each channel besides supplying stored information to the first FERF serially detecting unit, and a second storage unit for storing a result of detection conducted in the second FERF serially detecting unit for each channel besides supplying stored information to the second FERF serially detecting unit.

Namely, the above FEBE serially terminating process unit serially conducts detection of and an indicating process on FERF of G1 byte and detection of and indicating process on FERF of V5 byte, one by one, after that, selectively outputs one of the FERFs. It is therefore possible to indicate FERF in a simple structure. This is very effective if there is particularly no need to use the storage unit 1002 holding FERF in common to all signal sizes.

This invention, thus, largely contributes to flexibility and versatility in configuring the apparatus.

Further, the POH terminating process apparatus 1000 shown in FIG. 55 may have a POH timing signal serially generating unit for serially generating a POH timing signal used for a process conducted in the POH terminating operation process unit 1001 on the basis of a timing signal indicating positions of J1 byte and V5 byte in the multiplex signal and type information of the multiplex signal, thereby serially generating the POH timing signal necessary for the POH terminating operation process unit 1001 in common to all channels.

Therefore, it becomes unnecessary to equip circuits each for generating the POH timing signal equal in number to corresponding channels. This can further largely decrease a scale and a power consumption of the apparatus.

In concrete, the above POH timing signal serially generating unit has, for example units below;

a count value initializing unit for initialize an SPE (Synchronous Payload Envelope) count value by receiving a timing signal indicating positions of J1 byte and V5 byte in the multiplex signal;

a count value addition controlling unit for conducting an addition control on the SPE count value on the basis of a signal fed from the above count value initializing unit;

a storage unit flexibly readable and writable for holding an SPE count added value obtained in the above count value addition controlling unit for each channel, and supplying held data for each channel to the count value initializing unit; and a POH timing signal generating unit for generating a POH timing signal used for a process conducted in the POH terminating operation process unit 1001 on the basis of a signal fed from the above count value initializing unit and type information of the multiplex signal.

In the POH terminating process apparatus 1000 with the above structure, the POH timing signal serially generating unit successively initializes, adds and updates information about leading positions (J1 byte and V5 byte) of SPEs in the multiplex signal while holding the information in the storage unit for each channel, thereby serially generating various POH timing signals necessary for processes conducted in the POH terminating operation process unit 1001 by the POH timing signal serially generating unit in common to all channels.

It is therefore possible to realize the above POH timing signal generating process in a quite simple structure.

The POH terminating process apparatus 1000 shown in FIG. 55 is provided with an address generating unit for generating address information used to discriminate each channel of the multiplex signal, thereby generating the address information for the storage unit 1002 in the address making unit in common to all channels. Therefore, it becomes unnecessary to equip circuits each for generating the address information for the storage unit 1002 equal in number to corresponding channels, and to conduct a special process to discriminate each channel in the POH terminating operation processing unit 1001.

According to the POH terminating process apparatus 1000 of this invention, it is possible to further largely decrease a scale and a power consumption of the apparatus.

The POH terminating process apparatus 1000 shown in FIG. 55 may have the following units as the POH terminating operation process unit 1001:

a J1/J2 byte serially terminating process unit for serially conducting a terminating process on J1 byte and J2 byte included in the multiplex signal;

a B3/V5 byte serially terminating process unit for serially conducting a terminating process on BIP of B3 byte and V5 byte included in the multiplex signal and a terminating process on BIPPM of the above B3 byte and V5 byte;

a UNEQ/SLM serially terminating process unit for serially conducting a terminating process on UNEQ of C2 byte and V5 byte included in the multiplex signal and serially conducting a terminating process on SLM of the above C2 byte and V5 byte mentioned above; and an FEBE/FERF serially terminating process unit for serially conducting a terminating process on FEBE of G1 byte and V5 byte included in the multiplex signal and a terminating process on FEBEPM of the above G1 byte and V5 byte mentioned above, besides serially conducting a terminating process on FERF of the G1 byte and V5 byte.

In which case, the storage unit 1002 stores result of operations conducted in the J1/J2 byte serially terminating process unit, the B3/V5 byte serially terminating process unit, the UNEQ/SLM serially terminating process unit and the FEBE/FERF serially terminating process unit mentioned above for each channel, besides supplying stored information to the J1/J2 byte serially terminating process unit, the B3/V5 byte serially terminating process unit, the UNEQ/SLM serially terminating process unit and the FEBE/FERF serially terminating process unit.

The POH terminating process apparatus 1000 with the above structure can serially conduct the terminating process on J1 byte and J2 byte to detect a multiframe pattern of the multiplex signal, the terminating process on B3 byte and V5 byte to obtain BIP (BIPPM) from the multiplex signal, the terminating process on C2 byte and V5 byte to obtain FEBE (FEBEPM), and the terminating process on G1 byte and V5 byte to obtain FERF in common to all channels.

According to the POH terminating process apparatus 1000 of this invention, it is unnecessary to equip circuits for conducting the above processes equal in number to corresponding channels. Therefore, a scale and a power consumption of the apparatus can be largely decreased.

A pointer/POH terminating process apparatus according to this invention for conducting a pointer process and a POH terminating process on a signal in which information on a plurality of channels is multiplexed transmitted in the SDH transmission system has serial pointer processing unit for serially conducting the pointer process on the multiplex signal without separating the multiplex signal into channels, and a serial POH terminating process unit for serially conducting the POH terminating process on the above multiplex signal without separating the multiplex signal into channels.

The above pointer/POH terminating process apparatus can serially conduct both of the pointer process and the POH terminating process on the multiplex signal transmitted in the SDH transmission system without separating the multiplex signal into channels.

According to this invention, it is possible to realize the pointer/POH terminating process apparatus in a minimum scale and with a minimum power consumption.

Now, description will be made of an embodiment of this invention referring to the drawings.

(b-1) Description of a whole structure of a pointer processing apparatus

Figure 3:
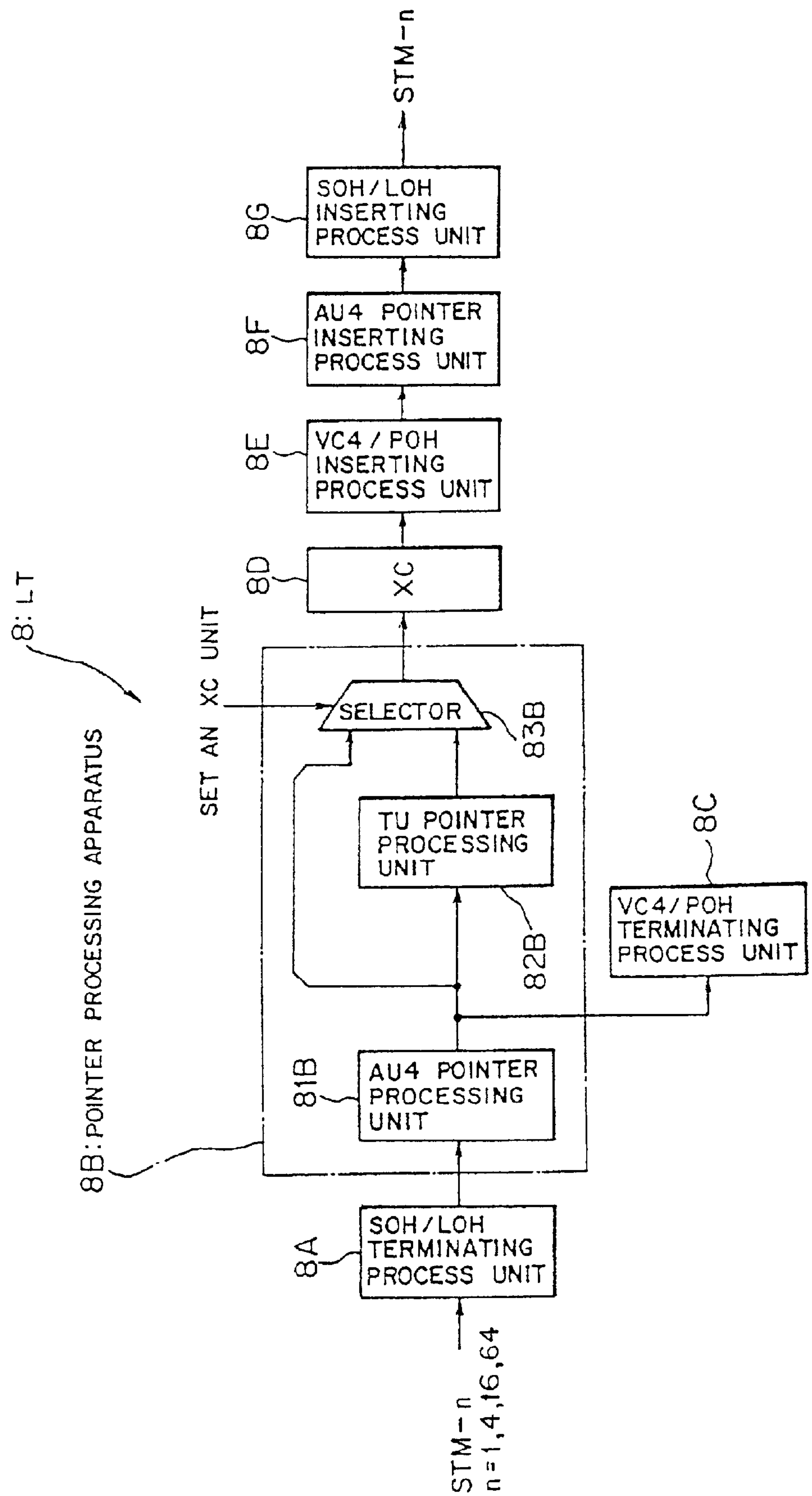
FIG. 3 is a block diagram showing a structure of an essential part of a line terminating apparatus to which a pointer processing apparatus according to an embodiment of this invention is applied.

FIG. 3 is a block diagram showing a structure of an essential part of a line terminating apparatus to which a pointer processing apparatus according to the embodiment of this invention is applied. The line terminating apparatus (LT) 8 shown in FIG. 3, which corresponds to the line terminating apparatus 306 shown in FIG. 66, has a section overhead/line overhead (SOH/LOH) terminating process unit 8A, a pointer processing apparatus 8B, a path overhead (POH) terminating process unit 8C, a cross-connecting (XC) apparatus 8D, a POH inserting process unit 8E, an AU4 pointer inserting process unit 8F and an SOH/LOH inserting process unit 8G.

The SOH/LOH terminating process unit 8A detects an overhead part (SOH/LOH) of received multiplex data (STM-n frame: where n is a degree of multiplexing, n=1, 4, 16 or 64), and conducts a terminating process to remove the overhead part from the STM-n frame. The pointer processing unit 8B conducts the pointer process to terminate/change an AU4 pointer or change a TU pointer of the multiplex data (AU4 frame) having been undergone the terminating process by the SOH/LOH terminating process unit 8A.

To this end, the pointer processing apparatus 8B has, as shown in FIG. 3, an AU4 pointer processing unit 81B, a TU pointer processing unit 82B and a selecting circuit 83B. The AU4 pointer processing unit 81B conducts a terminating process such as to detect the AU pointer from the AU4 frame to remove the AU4 pointer from the AU4 frame to make the AU4 frame be VC4, or a pointer changing process such as to add (insert) an AU4 pointer to the AU4 frame (that is, VC4) terminated once. The TU pointer processing unit 82B changes the TU pointer used to indicate an accommodation position of VC4, for instance.

The selecting circuit 83B selectively outputs the multiplex data having been undergone the AU4 pointer terminating process (that is, whose TU pointer has been changed) inputted through the AU4 pointer processing unit 81B and the TU pointer processing unit 82B or the multiplex data whose AU pointer has been changed inputted from the AU4 pointer processing unit 81B according to a cross-connect setting signal supplied from the outside.

The POH terminating process unit 8C terminates or monitors a POH of the multiplex data fed from the AU4 pointer processing unit 81B of the above pointer processing unit 8. The cross-connecting apparatus 8D cross-connects (TSI: time slot interchanges) the multiplex data (VC4/VC3/VC2/VC12) fed from the pointer processing apparatus 8B in a unit of VC4 or in a unit of VC3/VC2/VC12.

The POH inserting process unit 8E inserts a POH into the VC4 frame fed from the cross-connecting apparatus 8D if the POH has been terminated by the above POH terminating process unit 8C, or outputs (through) the VC4 frame as it is if the POH is not terminated. The AU4 pointer inserting process unit 8F inserts an AU4 pointer into the VC4 frame if the AU4 pointer has been terminated by the AU4 pointer processing unit 81B of the pointer processing unit 8, or outputs the VC4 frame as it is if the AU4 pointer is not terminated.

The SOH/LOH inserting process unit 8G assembles the STM-n frame by inserting SOH/LOH into the VC4 frame (that is, AU4) into which the AU4 pointer has been inserted to generate transmit multiplex data.

Namely, the pointer processing apparatus 8B according to this embodiment can selectively output the multiplex data (VC4) whose AU4 pointer has been terminated or the multiplex data (AU4) into which the AU4 pointer has been inserted (changed) according to a setting from the outside by the above selecting circuit 83B as will be described later in item (C), thereby cross-connecting a signal in a VC4 level and a signal in a level below the VC4 level by one cross-connecting apparatus 8D.

In the case of cross-connecting in a unit of VC4, for example, the AU4 pointer processing unit 81B changes the AU4 pointer, then gives the multiplex data into which the AU4 pointer has been inserted to the cross-connecting apparatus 8D via the selecting circuit 83B. At that time, the POH of the VC4 is not terminated in the POH terminating process unit 8C, but is passed through (can be monitored).

The multiplex data cross-connected by the cross-connecting apparatus 8D is passed through the POH inserting process unit 8E and the AU4 pointer inserting process unit 8F since the AU4 pointer and POH of VC4 have been inserted, then inserted SOH/LOH thereinto by the SOH/LOH inserting process unit 8G to be assembled into an STM-n frame.

In the case of cross-connecting in a unit of VC3/VC2/VC12, the AU4 pointer processing unit 81B and the POH terminating process unit 8C terminate the AU4 pointer and the POH, respectively, the TU pointer processing unit 82B changes the TU pointer and gives the multiplex data (VC3/VC2/VC12) in which the AU4 pointer has been terminated to the cross-connecting apparatus 8D via the selecting circuit 83B.

The multiplex data cross-connected by the cross-connecting apparatus 8D in this case is inserted thereinto POH and an AU4 pointer by the POH inserting process unit 8E and the AU4 pointer inserting process unit 8F, respectively, since the AU4 pointer and the POH of the VC4 have been terminated, then inserted thereinto SOH/LOH by the SOH/LOH inserting process unit 8G to be assembled into an STM-n frame.

Next, the above pointer processing apparatus 8 will be described in detail. The description will be, however, made in the order of the TU pointer processing unit 82B and the AU4 pointer processing unit 81B for the sake of convenience. The description below is in the case where received multiplex data is an STM-1 frame, but the same process is conducted on an STM-n frame (n=4, 16, 64) after the STM-n frame has been separated into STM-1 frames.

(b-2) Description of the TU Pointer Processing Unit

Figure 4:
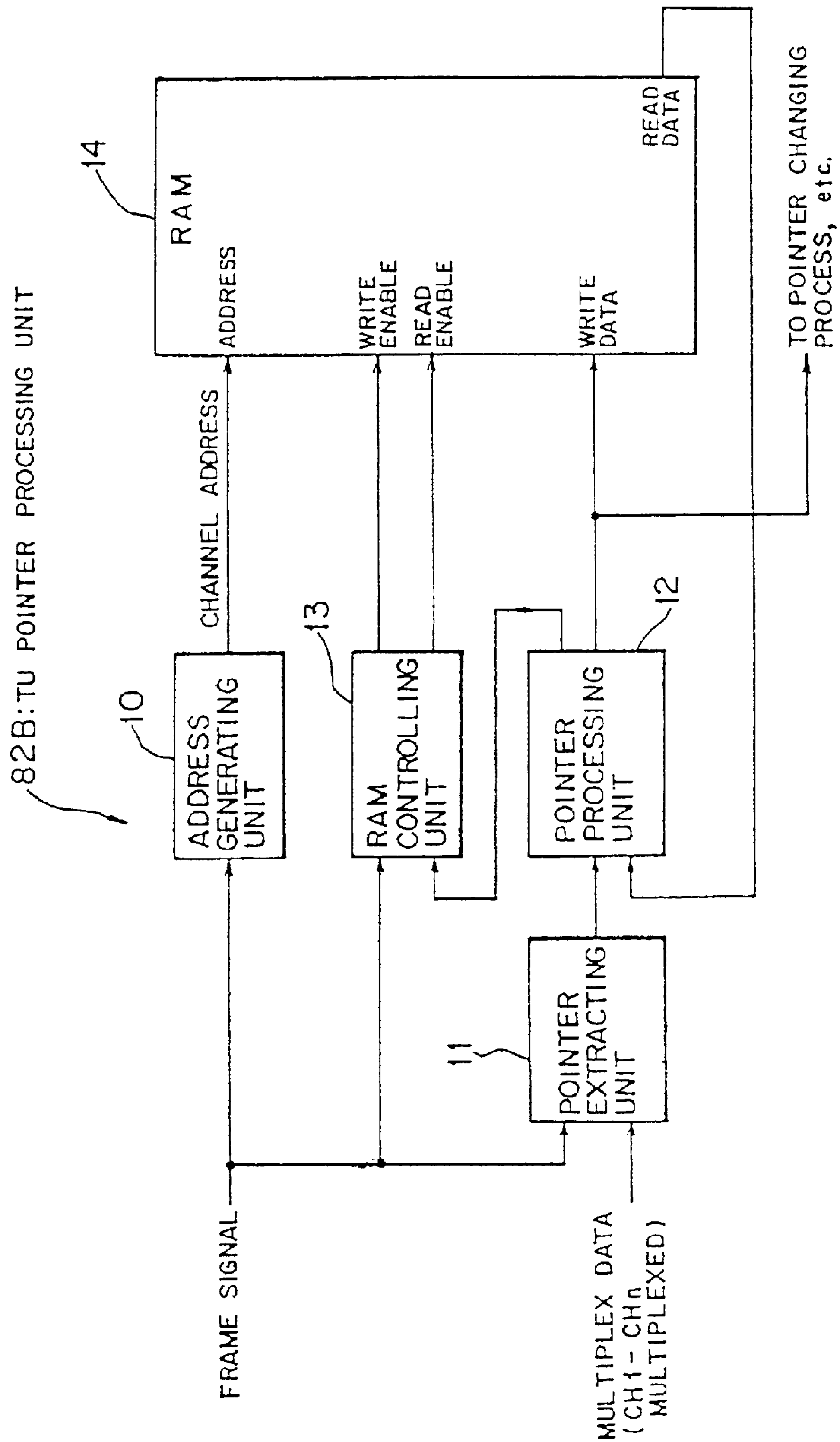
FIG. 4 is a block diagram showing an essential part of a TU pointer processing unit in the pointer processing apparatus according to the embodiment.

FIG. 4 is a block diagram showing a structure of an essential part of the TU pointer processing unit 82B. In FIG. 4, reference numeral 10 denotes an address generating unit, 11 denotes a pointer extracting unit, 12 denotes a pointer processing unit, 13 denotes a RAM (random access memory) controlling unit, and 14 denotes a RAM.

The address generating unit 10 generates an address (channel address) allocated to each channel (multiplex data) in the TU level multiplexed in an STM-1 frame based on a frame signal generated on the basis of detection of a frame synchronization pattern (A1 and A2 bytes) included in SOH of the STM-1 frame. The pointer extracting unit 11 serially extracts pointer bytes (including at least H1/V1 byte and H2/V2 byte) of each channel from the multiplex data. The pointer processing unit 12 receives the multiplex data from the pointer extracted unit 11, serially analyzes the pointer, detects a state of the pointer and changes the pointer, etc., of the multiplex data of each channel in serial.

The pointer processing unit 12 has the following functioning parts as will be described later.

(1) received pointer value holding function (2) normal pointer three consecutive coincidental reception detecting function (3) LOP (Loss Of Pointer) detecting function (4) increment/decrement (INC/DEC) reception result recognizing function (5) alarm state transition detecting function (6) active pointer value holding function (7) SPE leading byte (J1/V5) recognizing function The RAM controlling unit 13 generates a control signal used to control a sequence of an operation to serially write/read a result of each channel obtained by the pointer processing unit 12 into/from the RAM 14. The RAM 14 holds output data of the pointer processing unit 12 in a region indicated by a channel address fed from the address generating unit 10 for each channel.

The RAM 14 holds information groups (information groups necessary for the pointer process obtained from multiplex data) shown below, as will be described later with reference to FIG. 10.

① information group represented by pointer bytes of each channel extracted from multiplex data obtained by the pointer extracting unit 11 (high-order two bits of a received pointer value, for example)

② information group necessary to commence a pointer action by received pointer bytes [an NDF enable (EN) signal and the like]

③ information group as a result of commencement of the pointer action [an INV-V1, AIS detection signal (AIS-V1) and the like)

In the TU pointer processing unit 82B with the above structure according to this embodiment, each of the above information groups ① through ③ is written in the RAM 21 at an address indicated by a RAM address (a channel address) generated by the address generating unit 10 according to a write enable signal (a detection timing of received pointer bytes) generated by the RAM controlling unit 13.

The pointer processing unit 12 reads out the information groups ① through ③ of the preceding frame from the RAM 14 according to a read enable signal generated by the RAM controlling unit 13, and serially conducts the pointer process using the read information groups ① through ③ of each channel.

Namely, the above TU pointer processing unit 82B can serially hold the information groups ① through ③ generated by the pointer extracting unit 11 and the pointer processing unit 12 in common to all channels at an address indicated by an address allocated to each channel in the RAM 14. As a result, if the number of channels that should be undergone the pointer processing (signals in the TU level in the STM-1 frame) is increased, it is possible to process multiplex data by a circuit (one pointer processing unit 12) in common to all channels without separating the multiplex data into data on each channel.

Therefore, it becomes unnecessary to provide circuits used for the pointer process equal in number to plural channels (a maximum of 63 channels) in order to cope with all the channels, which can largely decrease an apparatus scale, a power consumption, the number of distributions between the function (circuit) blocks of this pointer processing apparatus 8B.

Figure 5:
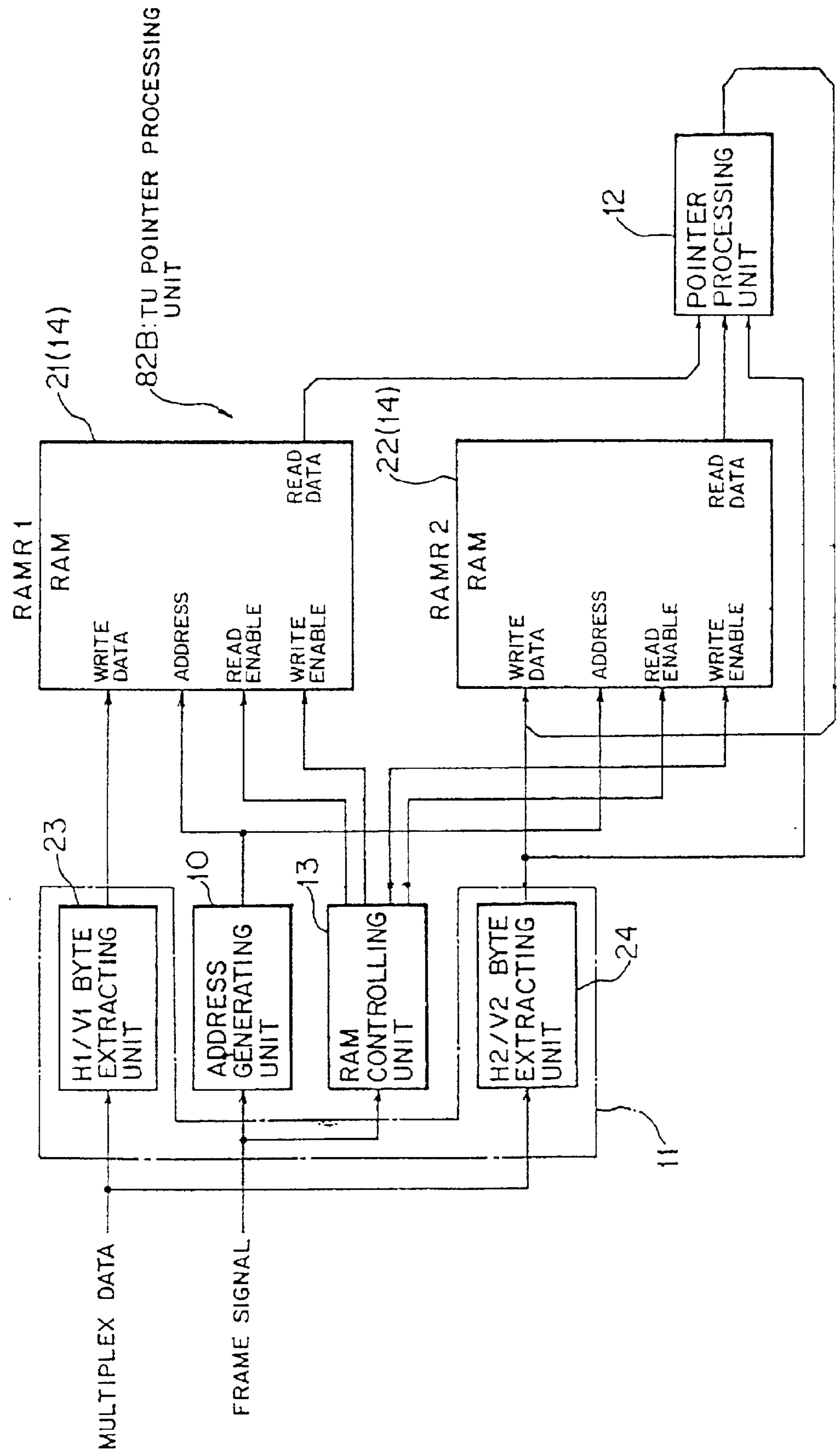
FIG. 5 is a block diagram showing another structure of the essential part of the TU pointer processing unit according to the embodiment.

The above RAM 14 can be, as shown in FIG. 5, for example, divided into a RAM 21 (a first RAM: RAM R1) and a RAM 22 (a second RAM: RAMR2) to separately hold the above information groups ① through ③ which are held by the RAM 14 as follows.

RAM 21 (RAMR1)

① information group represented by H1/V1 byte in the received pointer bytes

RAM 22 (RAMR2)

① information group represented by H2/V2 byte in received pointer bytes

② information group-necessary to commence the above pointer action

③ information group as a result of commencement of the above pointer action.

In this case, it is necessary to obtain the information groups represented by H1/V1 byte and H2/V2 byte. For this, the pointer extracting unit 11 is provided with an H1/V1 byte extracting unit 23 for extracting H1 byte or V1 byte of each channel from multiplex data, and an H2/V2 byte extracting unit 24 for extracting H2 byte or V2 byte of each channel form the multiplex data, whereby the pointer process is serially conducted using the data held in each of the RAMs 21 and 22.

In the above TU pointer processing unit 82B, the information group (pointer byte) extracted from the multiplex data in the H1/V1 byte extracting unit 23 is written in an address (region) of the RAM 21 indicated by a RAM address (channel address) generated by the address generating unit 10 at a detection timing of the H1/V1 byte generated by the RAM controlling unit 13. On the other hand, the information group extracted from the multiplex data by the H2/V2 byte extracting unit 24 and the information group generated by the pointer processing unit 12 are written in the RAM 22 at a detection timing of H2/V2 byte generated by the RAM controlling unit 13.

The pointer processing unit 12 reads out each of the information groups from the RAMs 21 and 22 at a detection timing of the received H2/V2, then conducts the pointer process using the information group of the received H1/V1 byte of each channel read out from the RAM 22, the information group of the received H2/V2 byte of each channel read out from the RAM 22 and a signal generated by the H2/V2 byte extracting unit 24.

Namely, in the above TU pointer processing unit 82B, the RAM 14 shown in FIG. 4 is divided into the RAM 21 and the RAM 22 so that data is written in the RAM 21 at a timing of received H1/V1 byte and read out from the same at a timing of received H2/V2 byte, whereas data is written in and read out from the RAM 22 at a timing of received H2/V2 byte.

Accordingly, the number of times of access to the RAM 22 is decreased, whereby a power consumption of the RAMs 21 and 22 (RAM 14) can be decreased. In the following description, the RAM 14 is sometimes divided into the RAM 21 and the RAM 22 and sometimes not divided, for the sake of convenience. It is, however, possible to divide or not divide the RAM 14, basically.

Figure 6:
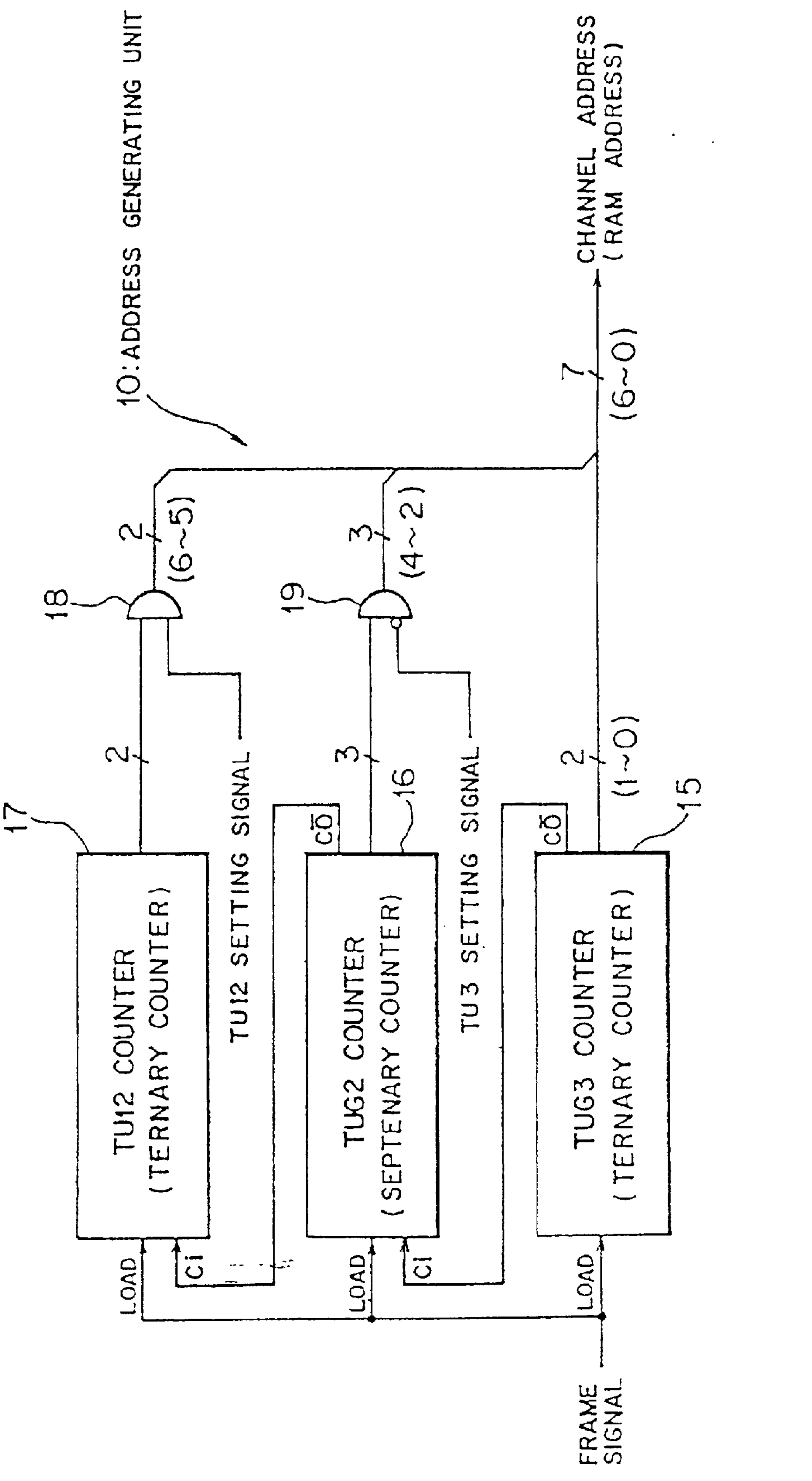
FIG. 6 is a block diagram showing a detailed structure of an address generating unit in the TU pointer-processing unit according to the embodiment.

FIG. 6 is a block diagram showing a detailed structure of the above address generating unit 10. As shown in FIG. 6, the address generating unit 10 has an address counter for TUG3 15, an address counter for TUG2 16, an address counter for TU12 17, an AND gate 18 and an AND gate of one-input inverting type 19.

The address counter for TUG3 (a ternary counter) 15 counts the number (the number of channels) of TUG3 (a maximum of 3 channels are multiplexed) multiplexed in an STM-1 frame. The address counter for TUG2 (a septenary counter) counts the number of channels of TUG2 (a maximum of 7 channels are multiplexed) multiplexed in a TUG3 frame. The address counter for TU12 (a ternary counter) 17 counts the number of channels (a maximum of 3 channels are multiplexed) multiplexed in a TUG2 frame. Each of the address counters 15 through 17 is loaded an initial value by an input of frame signal.

According to this embodiment, a carry-out terminal (CO) of the address counter 15 is connected to a carry-in terminal (C1) of the address counter 16 and a carry-out terminal (CO) of the address counter 16 is connected to a carry-in terminal (C1) of the address counter 17, thereby configuring a 63-ary counter. Outputs of these three address counters 15 through 17 are used as a RAM address (a channel address) for the RAM 14.

The AND gate (a logical product arithmetic element) 18 converts an output of the address counter 17 into "0" when the AND gate 18 is not set to a TU12 mode by a TU12 setting signal which will be described later (i.e., when the TU12 setting signal is in an L level). The AND gate of one-input inverting type 19 converts an output of the address counter 16 into "0" only when the AND gate 19 is set to a TU3 mode by a TU3 setting signal which will be described later (i.e., only when the TU3 setting signal is in an H level).

The address generating unit 10 switches a combination of the counters 15 through 17 (i.e., only the counter 15, the counter 15 and the counter 16, or all the counters 15 through 17) operated according to the TU12 mode setting signal and the TU3 mode setting signal to generate an address for the RAM 14 in combination as shown in FIG. 7, for example, whereby a channel address for TU3/TU2/TU12 is used in common in the RAM 14.

It is therefore possible to flexibly cope with by using one address generating unit 10 no matter which combination frames (VC4/VC3/VC2/VC12) in different signal sizes mixedly exist in the STM-1 frame. Incidentally, as shown in FIG. 7, addresses 00 through 02HEX are addresses common to TU3/TU2/TU12, and the addresses 03 through 14HEX are addresses common to the TU2/TU12.

Figure 8:
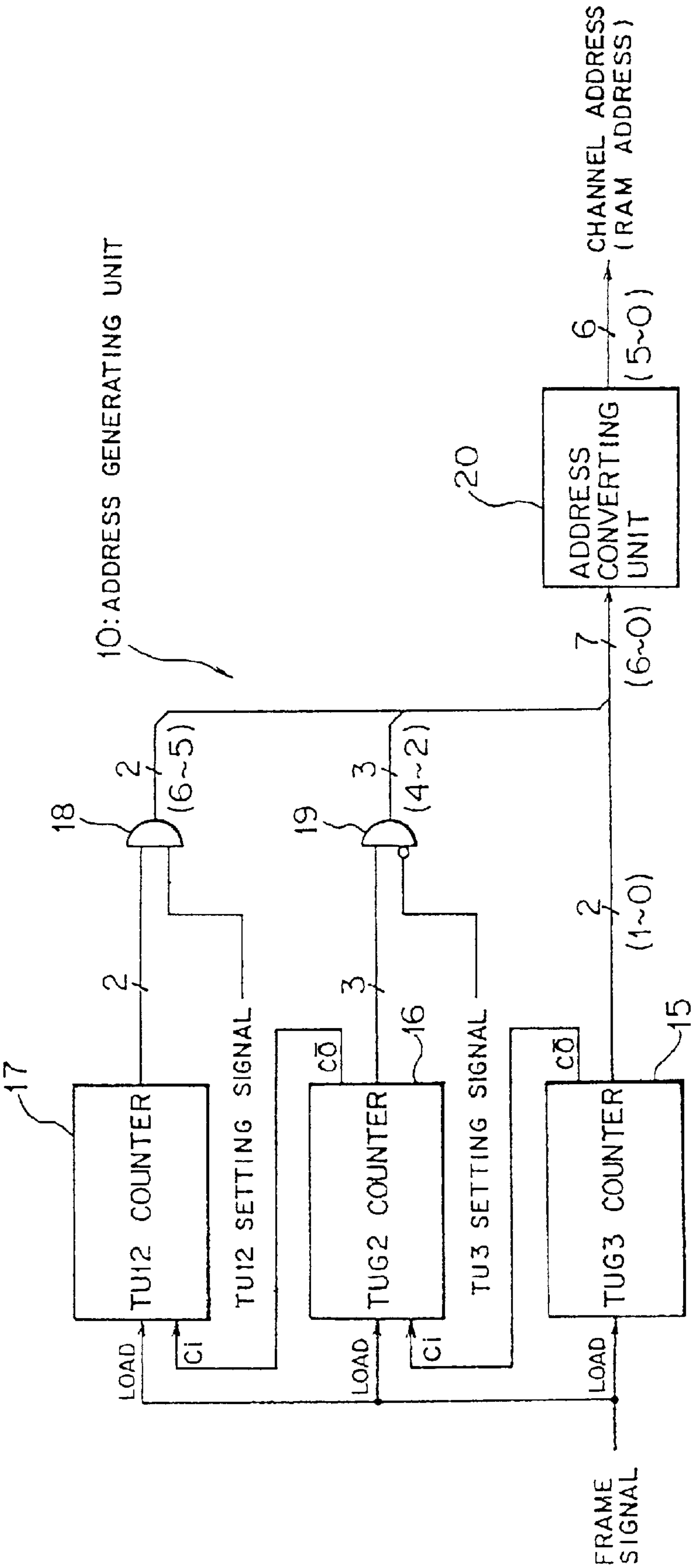
FIG. 8 is a block diagram showing another detailed structure of the address generating unit according to the embodiment.

The above address generating unit 10 may be provided with an address converting unit 20 in addition to the structure shown in FIG. 6, as shown in FIG. 8, for example. Here, the address converting unit 20 conducts a desired adding process on an address output of each of the counters 15 through 17 to generate an address converting signal such as to prevent an idle address from being generated in the RAM 14.

Figure 9:
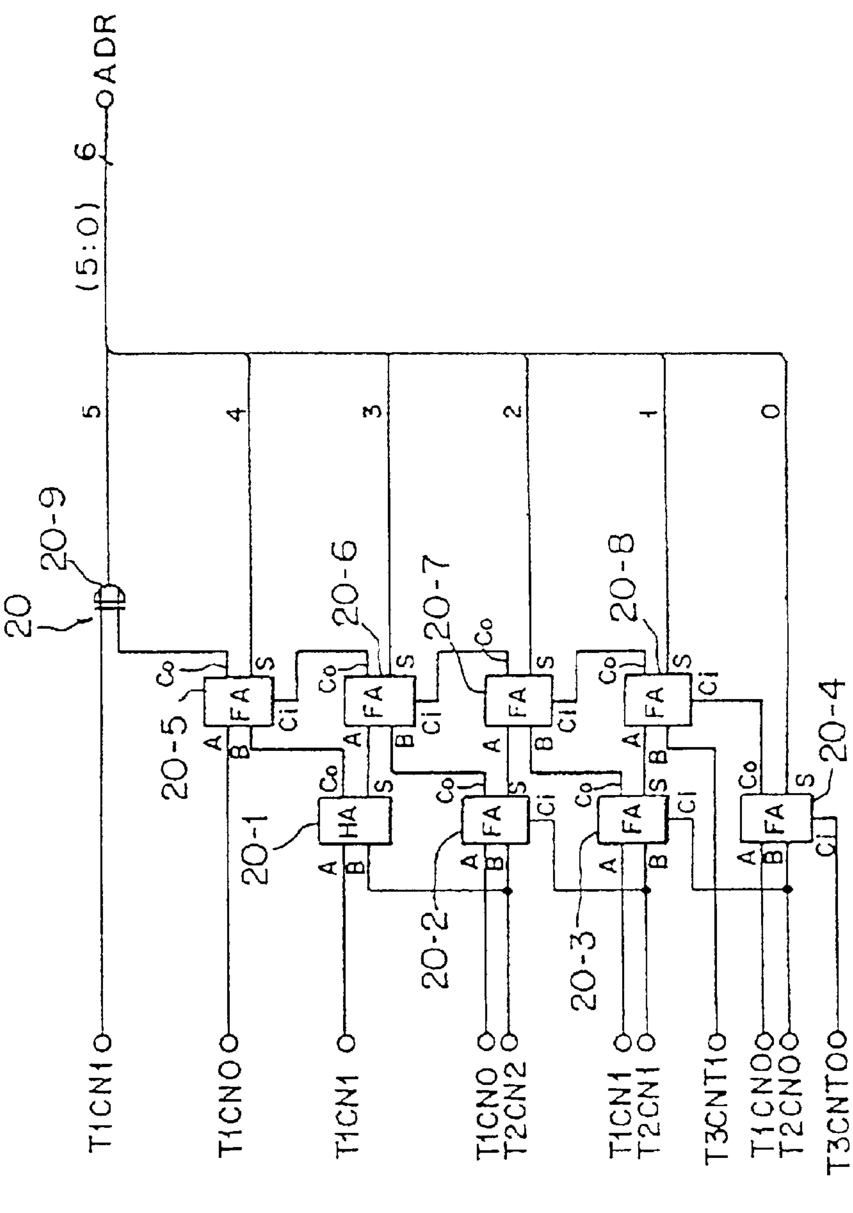
FIG. 9 is a block diagram showing a detailed structure of an address converting unit according to the embodiment.

To this end, the address converting unit 20 is configured as a circuit in combination of a half adder 20-1, a full adders 20-2 through 20-8 and an EXOR gate (an exclusive-OR circuit) 20-9 as shown in FIG. 9 if a maximum of 63 channels of TU12 are multiplexed in the STM-1 level, for example.

An address converting system by the address converting unit 20 is as shown in FIG. 7 (a relation between count value and address) if a maximum of 63 channels of TU12 are multiplexed in the STM-1 level, as above. To satisfy this relation, a bit "1" (T1CN1) of the address counter 17 and a bit "2" (T2CN2) of the address counter 16 are inputted to A and B input terminals of the half adder 20-1, respectively, whereas a bit "0" (TICNO) of the address counter 17, a bit "2" (T2CN2) of the address counter 16 and a bit "1" (T2CN1) of the address counter 16 are inputted to A, B and Ci input terminals of the full adder 20-2, respectively.

A bit "1" (TICN1) of the address counter 17, a bit "1" (T2CN1) of the address counter 16 and a bit "0" (T2CN0) of the address counter 16 are inputted to A, B and Ci input terminals of the full adder 20-3, respectively. A bit "o"

(TLCNO) of the address counter 17, a bit "0" (T2CN0) of the address counter 16 and a bit "0" (T3CN0) of the address counter 15 are inputted to A, B and Ci input terminals of the full adder 20-4, respectively.

A bit "0" (TLCNO) of the address counter 17, a carry output of the half adder 20-1 and a carry output of the full adder 20-6 are inputted to A, B and Ci input terminals of the full adder 20-5, respectively. A sum output of the half adder 20-1, a carry output of the full adder 20-2 and a carry output of the full adder 20-7 are inputted to A, B and Ci input terminals of the full adder 20-6, respectively.

A sum output of the full adder 20-2, a carry output of the full adder 20-3 and a carry output of the full adder 20-8 are inputted to A, B and Ci input terminals of the full adder 20-7, respectively. A sum output of the full adder 20-3, a bit "1" (T3CN1) of the address counter 15 and a carry output of the full adder 20-4 are inputted to A, B and Ci input terminals of the full adder 20-8, respectively.

A bit "1" (T1CN1) of the address counter 15 and a carry output of the full adder 20-5 are inputted to the EXOR gate 20-9. An output of the EXOR gate 20-9 and sum outputs of the full adders 20-5 through 20-8 and 20-4 become an output of the address converting unit 20.

Namely, as shown in FIGS. 7 and 9, since address numbers "0" through "2" become 0–2 address outputs as they are, a bit "0" and a bit "1" of the address counter 15 are inputted to the 0th place and the 1st place of the address converting unit 20, respectively.

When the address number is "3", the address counter 16 indicates "1". In order to output "3", the LSB (the least significant bit "0") of the address counter 16 is inputted to the 0th place and the 1st place of the address converting unit 20. The above 0th place and the 1st place of the data so inputted are added, respectively, whereby the address numbers "0" through "5" are obtained.

Next, when the address number is "6", the address counter 16 indicates "2". In order to output "6" at that time, a bit "1" of the address counter 16 is inputted to the 1st place and the 2nd place of the address converting unit 20. The respective places of the so inputted data are added in the similar manner.

Further, when the address number is "12", the address counter indicates "4". In order to output "12" at that time, the MSB (the most significant bit "2") of the address counter 16 is inputted to the 2nd place and the 3rd place of the address converting unit 20. The respective places of the so inputted data are added.

When the address number is "21" (15HEX), the address counter 17 indicates "1". In order to output "21" at that time, the LSB (bit "0") of the address counter 15 is inputted to the 4th place, the 2nd place and the 0th place of the address converting unit 20. Namely, 15HEX is added.

Next, when the address number is "42" (2AHEX), the address counter 15 indicates "2". In order to output "42" at that time, the MSB (the most significant bit "1") of the address counter 15 is inputted to the 5th place, the 3rd place and the 1st place of the address converting unit 20. Namely, 2AHEX is added.

Through the above operation, the address generating unit 10 in this case obtains address outputs in which all idle addresses are compressed (refer to an address space in FIG. 10), whereby an address line to the RAM 14 is converted from 7 bits to 6 bits. Accordingly, the idle address occurring in the RAM 14 is cut so that a scale of the RAM 14 can be decreased.

Figure 11:
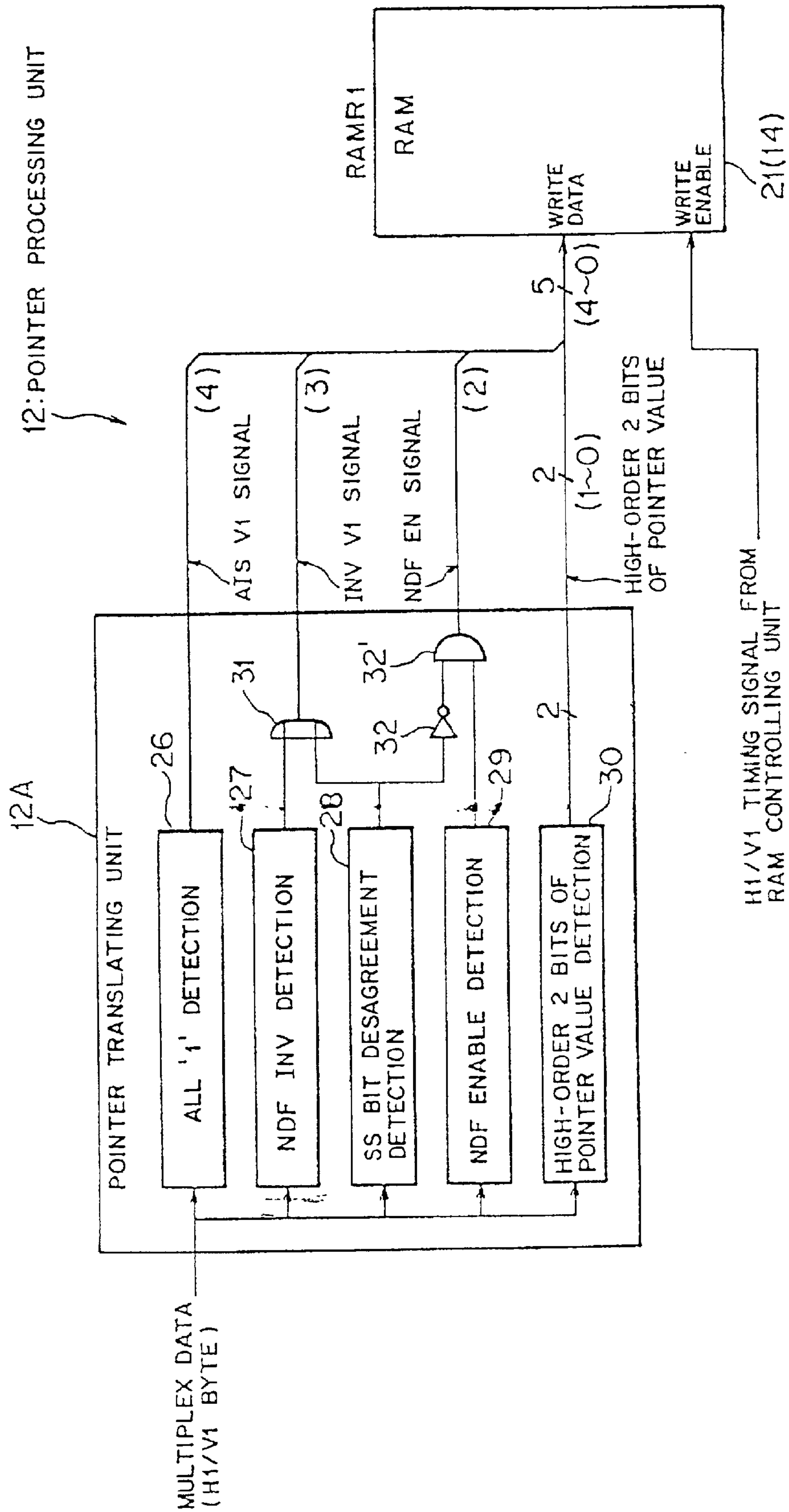
FIG. 11 is a block diagram showing a structure of a first pointer translating unit provided in the pointer processing unit according to the embodiment.

Next, FIG. 11 is a block diagram showing a structure of a pointer translating unit 12A provided in the pointer processing unit 12. The pointer translating unit (a first pointer translating unit) 12A has an alarm state detecting unit 26, an NDF detecting unit, an SS-bit disagreement detecting unit 28, an NDF enable detecting unit 29, a pointer value high-order two bits extracting unit 30, an OR gate (a logical sum circuit) 31, an inverting gate (inverter) 32 and an AND gate (a logical product circuit) 32'.

The alarm state detecting unit 26 detects whether received multiplex data (H1/V1 byte) is all "1" (ALL "1") or not. The NDF detecting unit 27 detects a value of invalid NDF bits (N bits: refer to FIG. 64) from a received H1/V1 byte. The SS-bit disagreement detecting unit 28 detects disagreement between SS bits in the received H1/V1 byte and an SS-bit reception expected value.

The NDF enable detecting unit 29 detects whether the NDF bits are "1001" signifying enable or not from the received H1/V1 byte. The pointer value high-order two bits extracting unit 30 extracts high-order two bits of a pointer value from the received H1/V1 byte.

The pointer translating unit 12A with the above structure detects ALL "1" of the received H1/V1 byte (8 bits) in the alarm state detecting unit 26, then outputs a signal generated in the alarm state detecting unit 26 as an alarm state detection signal (an AIS-V1 signal) of one bit. At that time, the NDF detecting unit 27 detects reception of NDF bits which are neither normal NDF ("0110") nor NDF enable ("1001") from the NDF bits (4 bits) of the received H1/V1.

The value of the SS bits is determined according to a signal size. For this, the SS bit disagreement detecting unit 28 employs that value as a reception expecting value, and detects disagreement of the SS bits of 2 bits of the received H1/V1 byte on the basis of the reception expected value. The NDF enable detecting unit 29 detects NDF enable ("1001") from the NDF bits (4 bits) of the received H1/V1 byte. The pointer value high-order two bits detecting unit 30 extracts high-order two bits of the pointer value from the received H1/V1 byte.

Then, a signal obtained by the OR gate 31 which is a logical sum of a signal generated by the NDF detecting unit 27 and a signal generated by the SS-bit disagreement dtecting unit 28 is outputted as the invalid pointer detection signal (INV-V1 signal) of one bit. On the other hand, a signal obtained by the AND gate 32' which is a logical product of an inverted signal (an output of the inverter 32) of a signal generated by the SS-bit disagreement dtecting unit 28 and a signal generated by the NDF enable detecting unit 29 is outputted as the NDF enable signal (an NDF-EN signal) of one bit.

As a result, the RAM 21 (or the RAM 14) holds data (information) of five bits in total which includes the alarm state detection signal of 1 bit, the invalid pointer detection signal of 1 bit, the NDF enable signal of 1 bit and the pointer value of 2 bits. Incidentally, the data is held according to a write enable signal (a detect timing of the H1/V1 byte) supplied from the RAM controlling unit 13.

Namely, the pointer translating unit (the first pointer translating unit) 12A according to this embodiment compresses the number of bits (8 bits) of the received H1/V1 byte into 5 bits, and holds the information whose number of bits has been compressed in the RAM 21 (or the RAM 14). Accordingly, the number of bits necessary for the RAM 21 (or the RAM 14) is decreased from 8 bits to 5 bits. It is therefore possible to reduce a size of the used RAM 21 (or the RAM 14).

FIG. 12 is a diagram showing an example of contents of data held in the above RAM 21 (or the RAM 14). It is, however, unnecessary to always hold the data in the order shown in FIG. 12.

Figure 13:
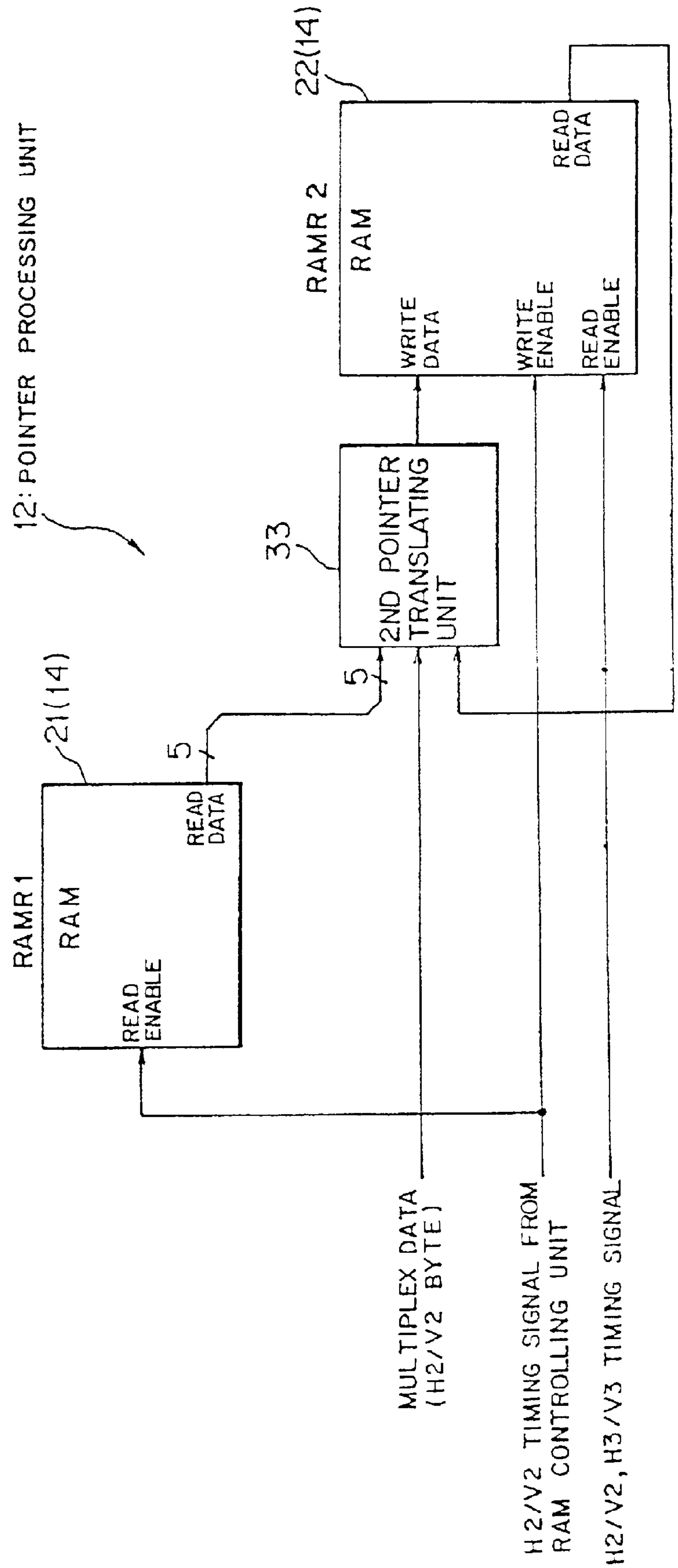
FIG. 13 is a block diagram showing a structure of the TU pointer processing unit, paying an attention to a second pointer translating unit according to the embodiment.

The data held in the RAM 21 (or the RAM 14) by the pointer translating unit 12A as above is read out at an H2/V2 byte timing by a pointer translating unit (a second pointer translating unit) 33 as shown in FIG. 13, for example, then the pointer process is conducted using that data and a value of the H2/V2 byte. A result of the pointer process is held in the above-mentioned RAM 22 (or the RAM 14).

The pointer translating unit 33 generates a pointer process control signal and a pointer process result at a timing of extracting the H2/V2 byte from the multiplex data on the basis of the multiplex data, the bit number compression information generated by the pointer translating unit 12A, the information group represented by the H2/V2 byte of the above received pointer bytes, the information group necessary to commence a pointer action and the information group of a result of commencement of the pointer action, and holds these information groups in the RAM 22.

Figure 14:
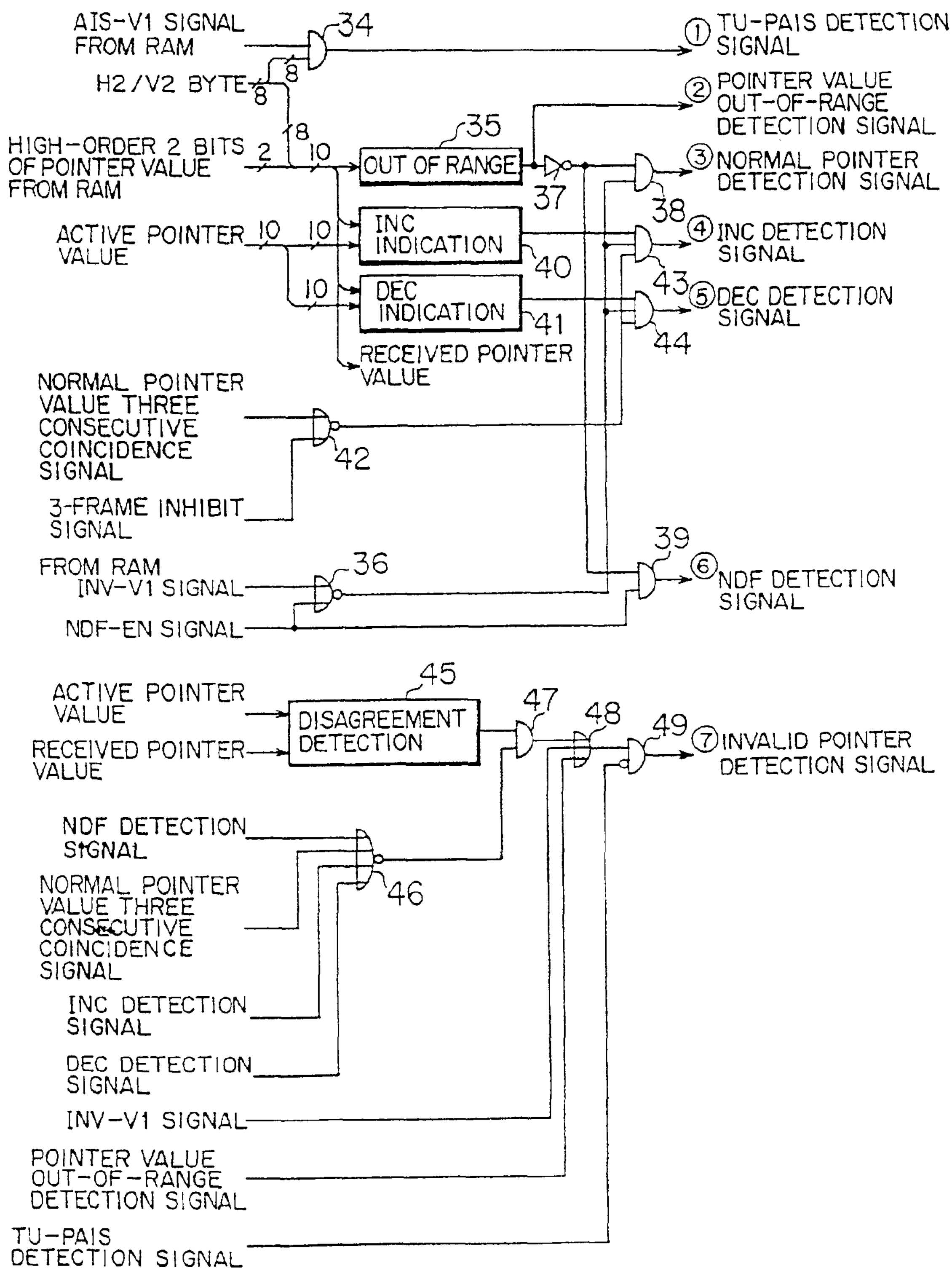
FIG. 14 is a block diagram showing in detail the structure of the second pointer translating unit according to the embodiment.

To this end, the pointer translating unit 33 has, as shown in FIG. 14, for example, a received pointer value out-of-range detecting unit (OUT OF RANGE) 35, an increment (INC) indication detecting unit 40, a decrement (DEC) indication detecting unit 41, a disagreement detecting unit 45, AND gates 34, 38, 39, 43, 44 and 47, an OR gate 48, an inverter 37, NOR gates (non-disjunction circuits) 36, 42 and 46, and an AND gate 49 of a one-input inverting type.

The received pointer value out-of-range detecting unit 35 detects whether a received pointer value exceeds a valid range of a pointer value determined according to a size of each signal [0–764 for TU3 (refer to FIG. 151), 0–427 for TU2 (refer to FIG. 153), and 0–139 for TU12 (refer to FIG. 155)]. The INC indication detecting unit 40 compares the received pointer value and an active pointer value to detect a state where 3 bits or more of the I bits (refer to FIG. 157) are inverted and 2 bits or less of the D bits are inverted (an INC indication state). Incidentally, the active pointer value is a pointer value which is different from the received pointer value, and at which the hardware are actually operating.

The DEC indication detecting unit 41 compares the received pointer value and the active pointer value to detect a state where 3 bit or more of the D bits are inverted and 2 bits or less of the I bits are inverted (a DEC indication state). The disagreement detecting unit 45 detects disagreement between the received pointer value and the active pointer value.

The pointer translating unit 33 with the above structure conducts the pointer process as described below on the basis of each data (refer to FIG. 12) held in the RAM 21, thereby generating a pointer process control signal, and a pointer process result (a TU-PAIS detection signal ①, a pointer value out-of-range detection signal ②, a normal pointer detection signal ③, an INC detection signal ④, a DEC detection signal ⑤, an NDF detection signal ⑥, and an invalid pointer detection signal ⑦).

In concrete, the TU-PAIS detection signal ① is generated by calculating a logical product of the AIS-V1 signal read out from the RAM 21 and the received H2/V2 byte in the AND gate 34.

The pointer value out-of-range detection signal ② is generated by the received pointer value out-of-range detecting unit 35 on the basis of 10 bits obtained by adding 2 bits of the received pointer value read out at the H2/V2 byte timing from the RAM 21 and the received H2/V2 byte. For instance, since a valid range of the pointer value is 0 through 764 in the case of TU3, 0 through 427 in the case of TU2 and 0 through 139 in the case of TU12 as above, the pointer value out-of-range detection signal becomes the H level when a pointer value out of these ranges is received.

The normal pointer detection signal ③ is generated by obtaining a NOR of the INV-V1 signal and the NDF-EN signal read out from the RAM 21 by the NOR gate 36, then obtaining, by the AND gate 38, a logical product of an output signal of the NOR gate 36 and a signal obtained by inverting the above pointer value out-of-range detection signal (an output signal of the received pointer value out-of-range detecting unit 35) by the inverter 37.

The INC detection signal ④ is generated by obtaining, by the AND gate 43, a logical product of a signal generated by the INC indication detecting unit 40, an output signal of the NOR gate 36 and a signal (a NOR of a normal pointer value three consecutive coincidental reception detection signal and a three frames inhibit signal both described later) generated by the NOR gate 42, whereas the DEC detection signal ⑤ is generated by obtaining, by the AND gate 44, a logical product of a signal generated by the DEC indication detecting unit 41, the above output signal of the NOR gate 36 and the above signal generated by the OR gate 42. The NDF detection signal, ⑥ is generated by obtaining a logical product of an inverted signal (an output of the inverter 37) of the above pointer value out-of-range detection signal and the NDF-EN signal read out from the RAM 21 by the AND gate 39.

At that time, the INC indication detecting unit 40 and the DEC indication detecting unit 41 each compares the received pointer value with the active pointer value. The INC indication detecting unit 40 detects inversion of 3 bits or more of the I bits and inversion of two bits or less of the D bits, whereas the DEC indication detecting unit 41 detects inversion of 3 bits or more of the D bits and inversion of 2 bits or less of the I bits.

The invalid pointer detection signal ⑦ is generated by detecting disagreement between the received pointer value and the active pointer value by the disagreement detecting unit 45, obtaining by the AND gate 47 a logical product of a result of the above detection and an output of the NOR gate 46 (a result of NOR of the NDF detection signal ⑥, the normal pointer value three consecutive coincidental reception detection signal described later, the INC detection signal ④, and the DEC detection signal ⑤), obtaining a logical sum of a result of the above logical product, the INV-V1 signal and the pointer value out-of-range detection signal ② by the OR gate 48, then obtaining a logical product of an output of the OR gate 48 and an inverted signal of the TU-PAIS detection signal ① by the NAD gate 49.

Figure 45:
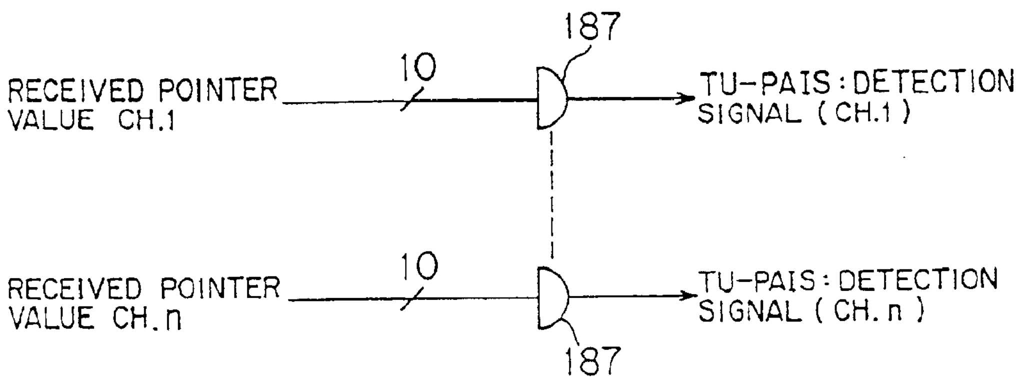
FIGS. 45 through 50, 51(*a*) through 51(*c*), 52(*a*) through 52(*c*), 53 and 54(*a*) through 54(*c*) are diagrams for illustrating effects obtained in the pointer processing apparatus according to the embodiment.

The pointer processing apparatus 8B (the TU pointer processing unit 82B) according to this embodiment can generate various pointer process control signals necessary for the pointer process of each channel and a result of the pointer process in the pointer processing unit 12 (the pointer translating unit 33) in common to all channels. It is thereby unnecessary to provide AND gates (logical product arithmetic elements) 187 each of a 10-bit input for judging whether 10-bit pointer value of the received pointer value is all "1" or not equal in number to channels in the TU level (a maximum of 63 channels in the case of TU12) as shown in FIG. 45, for example, which can further largely reduce the apparatus scale, the power consumption, the number of distributions between function blocks.

Figure 15:
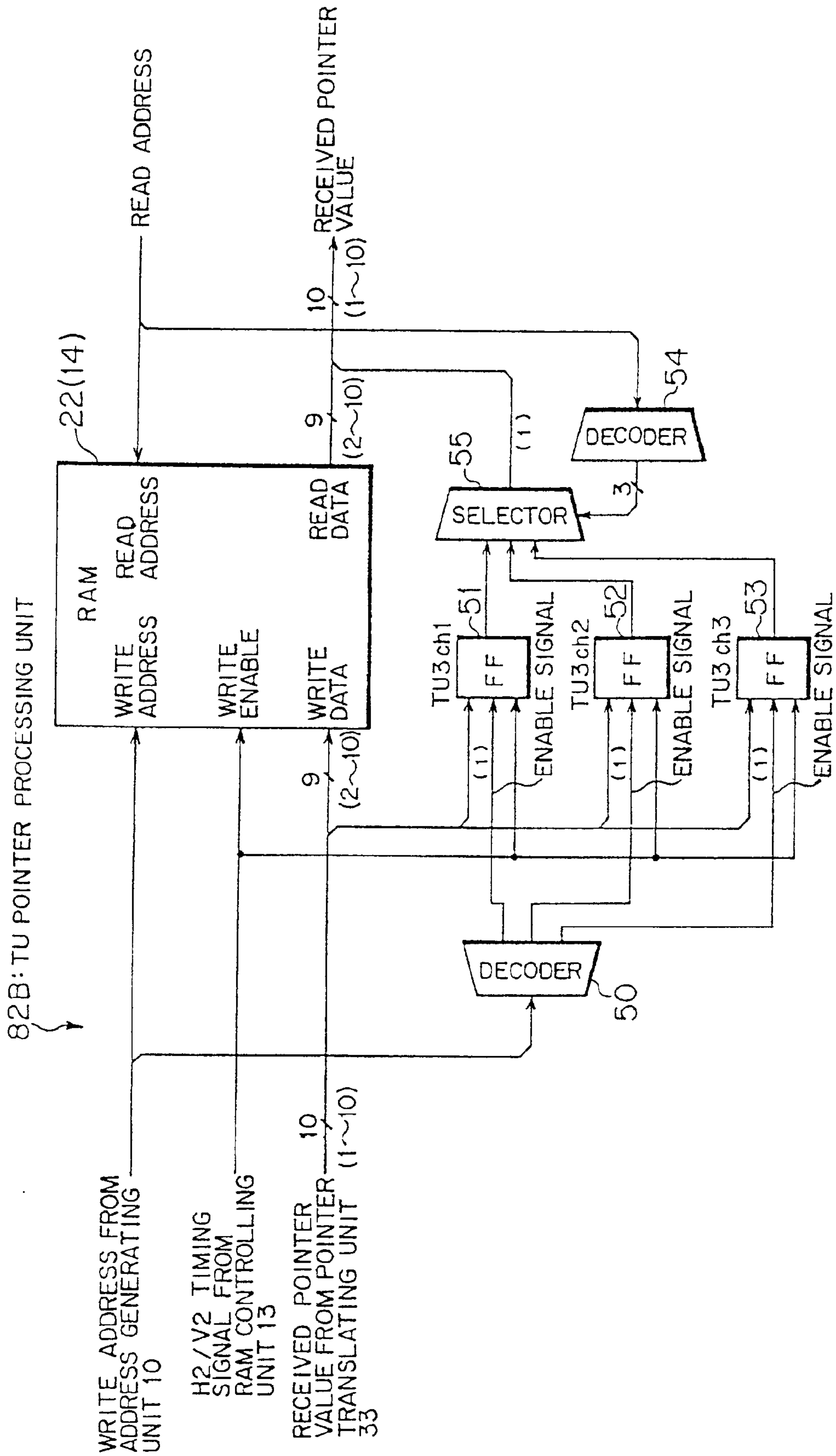
FIG. 15 is a block diagram showing a structure of the TU pointer processing unit, paying an attention to a received pointer value holding function according to the embodiment.

FIG. 15 is a block diagram showing a structure of the TU pointer processing unit, paying an attention to the received pointer value holding function according to this embodiment. As shown in FIG. 15, the TU pointer processing unit 82B has decoding circuits 50 and 54, flip-flop (FF) circuits 51 through 53 and a selecting circuit 55, in addition to the above RAM 22 (or the RAM 14).

The decoding circuit 50 decodes an address value allocated to each channel of TU3 from a write address (a channel address) for the RAM 22 (or the RAM 14) fed from the address generating unit 10 to generate an enable signal for each of the FF circuits 51 through 53. Each of the FF circuit (a latch circuit) 51 through 53 holds the MSB of the received pointer value for one channel of the TU3 (a maximum of 3 channels are accommodated in the STM-1 frame).

The decoding circuit 54 decodes an address value allocated to each channel of TU3 from a read address of the RAM 22 (or the RAM 14). The selecting circuit 55 selects an output of the FF circuit 51, 52 or 53 with the decoded signal fed from the decoding circuit 54 as a select signal. If none of the outputs of the FF circuits 51 through 53 is selected, "0" is outputted.

In the TU pointer processing unit 82B with the above structure, only 9 bits of a pointer value excepting the MSB out of 10 bits of the received pointer value are held in the RAM 22 (or the RAM 14). When a signal size is TU3, the decoding circuit 50 decodes an address value allocated to TU3 from the RAM address, then outputs the decoded signal as an enable signal for each of the FF circuits 51 through 53.

A remaining received pointer value (the MSB) not held in the RAM 22 (or the RAM 14) is held in the corresponding FF circuits 51, 52 or 53.

Writing to the RAM 22 (or the RAM 14) and to each of the FF circuits 51 through 53 is done according to an extracting timing of the H2/V2 byte. When the received pointer value is read out, the decoding circuit 54 decodes an address value allocated to TU3 from a RAM address, then the selecting circuit 55 selects an output signals of the FF circuit 51, 52 or 53 holding the MSB of the pointer value of TU3 using the decoded signal as a select signal. If the RAM address shows a value other than TU3, the MSB is assumed to be "0".

In the above TU pointer processing unit 82B, the received pointer value that should be held in the RAM 22 (or the RAM 14) is 9 bits excepting the MSB since the MSB is always "0" when a pointer value within the pointer value range in the case of TU2/TU12 is received. Excepting that (in the case of TU3), the MSB is not necessarily "0" so that the MSB at that time is held in the FF circuits 51 through 53.

It is therefore possible to further reduce the number of bits necessary for the RAM 22 (or the RAM 14) so as to reduce a size of the RAM 22 (or the RAM 14). When the signal size is TU3, the above MSB is of a value different from a value at the time of TU2/TU12. 1 bit of the MSB at that time is held in the FF circuits 51 through 53 so that information necessary for the pointer process is always ensured. The process is thereby conducted certainly.

Figure 16:
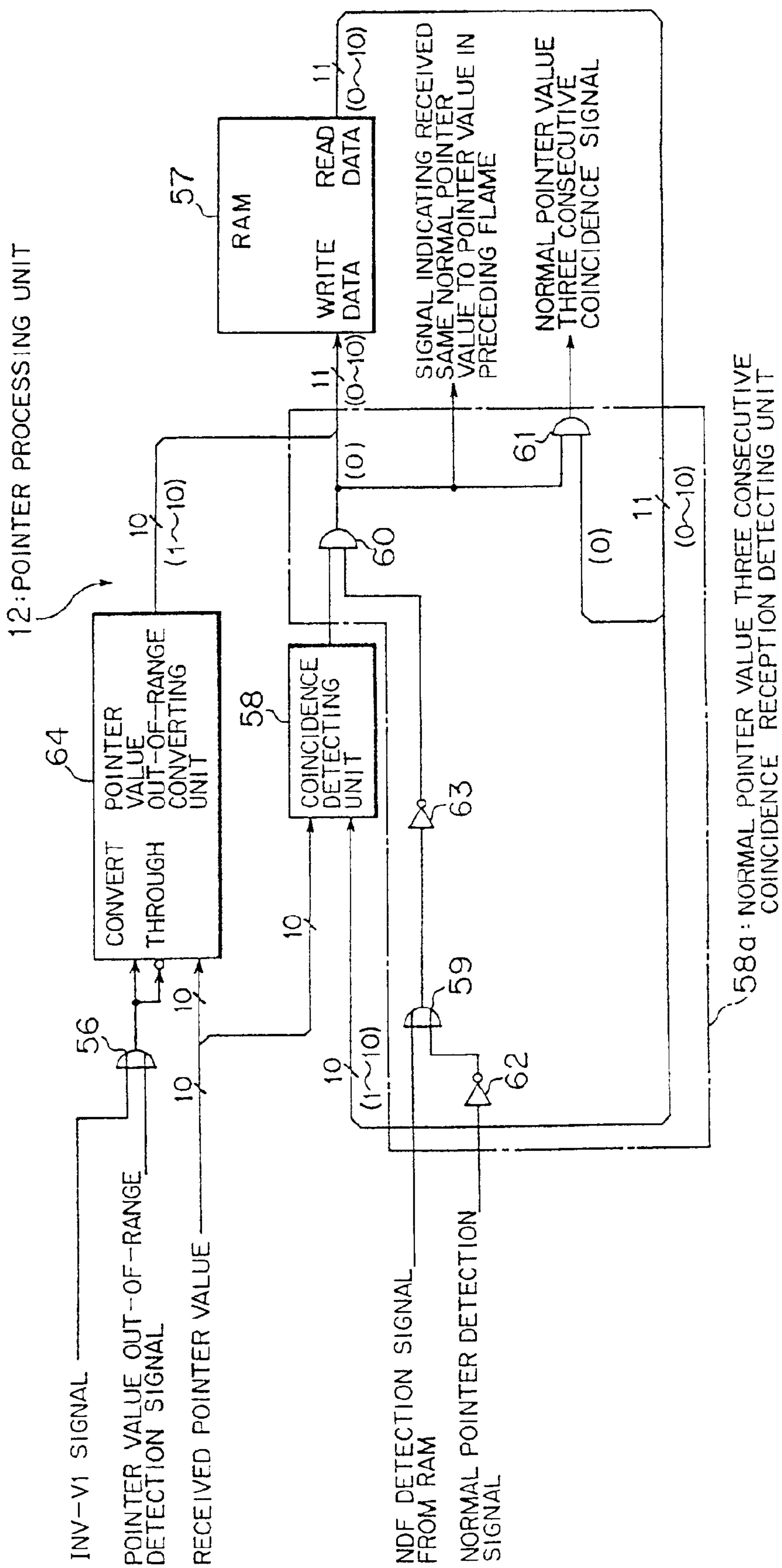
FIG. 16 is a block diagram showing a structure of the pointer processing unit, paying an attention to a normal pointer value three consecutive coincidental reception detecting function according to the embodiment.

FIG. 16 is a block diagram showing a structure of the pointer processing unit 12, paying attention to the normal pointer value three consecutive coincidental reception detecting function. The pointer processing unit 12 shown in FIG. 16 has an OR gate 56, a RAM 57, a coincidence detecting unit 58, a normal pointer value three consecutive coincidental reception detecting unit 58*a* and a pointer value out-of-range converting unit 64.

The OR gate 56 calculates a logical sum of the INV-V1 signal (refer to FIGS. 11 and 12) and the pointer value out-of-range detection signal [refer to ② in FIG. 14] to generate a control signal for the pointer value out-of-range converting unit 64. The RAM 57 holds the received pointer value and the like. The coincidence detecting unit 58 detects coincidence between the received pointer value and the received pointer value of the preceding frame held in the RAM 57 to hold a result of the coincidence detection as one-bit information in the RAM 57.

The normal pointer value three consecutive coincidental reception detecting unit 58*a* detects normal pointer value three consecutive coincidental reception by a logical production of a signal representing a result of the coincidence detection stored in the RAM 57 and a result of the coincidence detection made on the preceding pointer value and a value of the received pointer bytes, which has an OR gate 59, AND gates 60 and 61, and inverters 62 and 63 as shown in FIG. 16, for example.

The pointer value out-of-range converting unit 64 converts a pointer value held in the RAM 57 into a certain value out of the range of the pointer value when receiving a pointer byte representing invalid information, then holds the converted information in the RAM 57. When an output signal of the OR gate 56 is "1" (in the H level) (i.e., when receiving either the INV-V1 signal or the out-of-range detection signal, or the both), for example, the pointer value out-of-range converting unit 64 converts the received pointer value into a signal out of the range of the pointer value. When an output signal of the OR gate 56 is "0" (in the L level), the pointer value out-of-range converting unit 64 passes the received pointer value therethrough to output it to the RAM 57.

When a logical sum of the INV-V1 signal and the pointer value out-of-range detection signal obtained in the OR gate 56 is "1", the pointer processing unit 12 with the above structure converts the received pointer value held in the RAM 57 into a certain value out of the range of the pointer value (765 or more in the case of the TU3, 428 or more in the case of the TU2, 140 or more in the case of TU12), then holds it in the RAM 57.

At that time, the coincidence detecting unit 58 detects coincidence between the received pointer value of the preceding frame held in the RAM 57 and the present received pointer value, the AND gate 60 obtains a logical product of that result and an output of the inverter 63 (a NOR of the NDF detection signal and an inverted signal obtained by inverting the normal pointer detection signal by the inverter 62 obtained by the OR gate 59 and the inverter 63), whereby an identical normal pointer value reception signal showing whether the present received pointer value is a normal pointer value identical to that of the preceding frame (it is known at this point of time whether the normal pointer value is consecutively received two times) is generated and held in the RAM 57.

When the next pointer value is received, a logical product of that received pointer value and the identical normal pointer value reception signal read out from the RAM 57 is obtained by the AND gate 61, and a result of this is generated and outputted as the normal pointer value three consecutive coincidental reception detection signal.

The above pointer processing unit 12 (the pointer processing apparatus 8B) can serially conduct normal pointer value three consecutive coincidental reception detection on each channel only by holding a result of the coincidence detection (one-bit information) on the received pointer value and the received pointer value of the preceding frame in the RAM 57 whereby the number of bits necessary for the RAM 57 can be decreased. Further, it becomes unnecessary to provide normal pointer three consecutive coincidental reception detecting circuits as shown in FIG. 47, for example, equal in number to channels in the STM-1 frame in order to detect normal pointer value three consecutive coincidental reception.

It is therefore possible to largely decrease an apparatus scale, a power consumption, the number of distributions between the function blocks of this pointer processing apparatus 8B.

Figure 47:
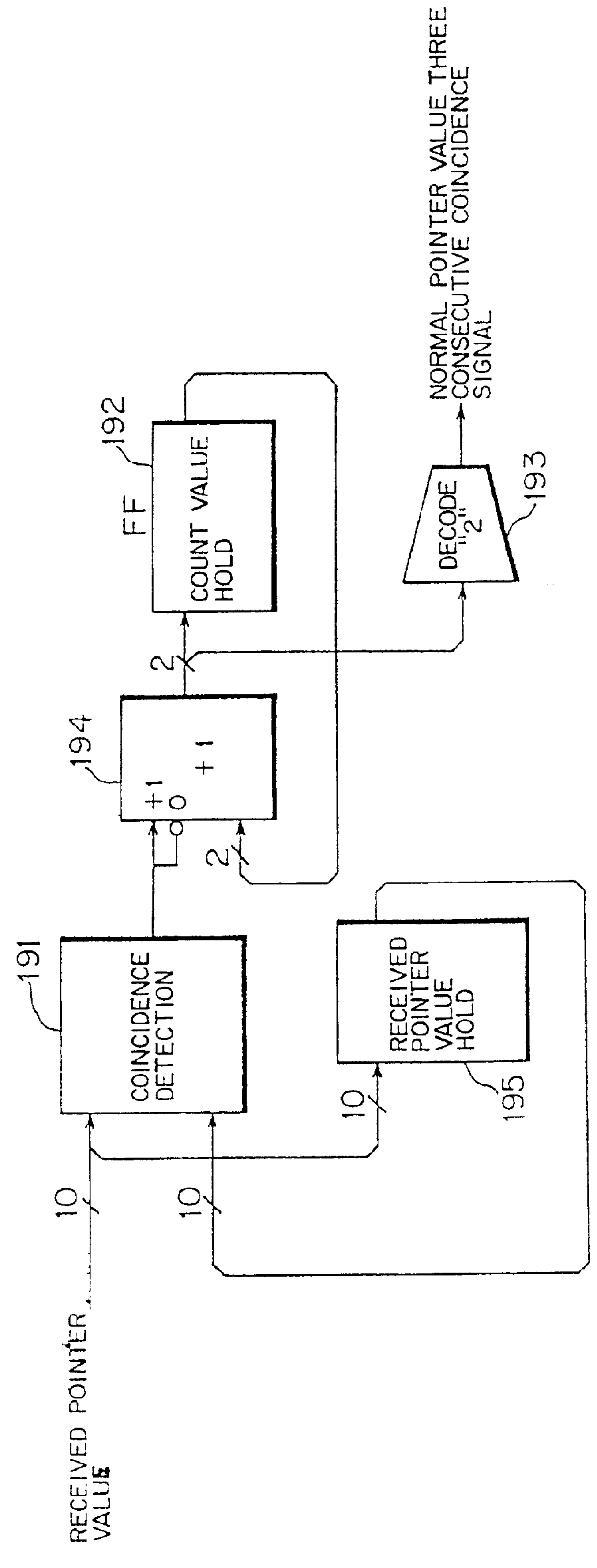

The normal pointer three consecutive coincidental detecting circuit shown in FIG. 47 detects coincidence between the received pointer value and the received pointer value of the preceding frame held in a received pointer holding unit 195 by the coincidence detecting unit 191, resets a count value held in a flip-flop (FF) circuit (i.e., a circuit for holding a result of the count) to +1 (coincidence) or 0 (disagreement) according to a result of the detection, decodes the count value "2" by a decoding circuit 193 when an output of the counter (i.e., a circuit for counting how many times the normal pointer value is consecutively received) 192 becomes "2", and generates and outputs the normal pointer value three consecutive coincidence signal (for one channel).

Figure 17:
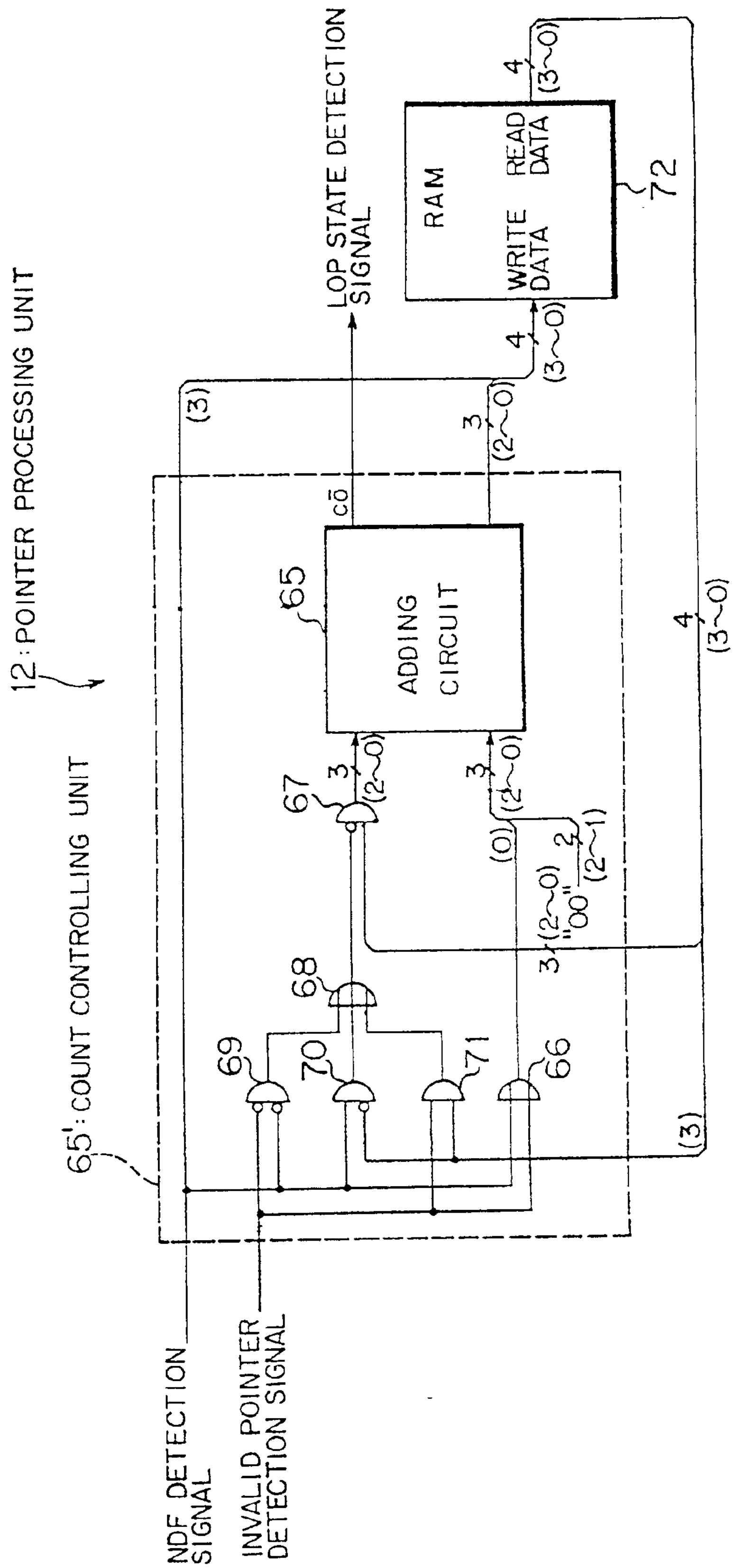
FIG. 17 is a block diagram showing a structure of the pointer processing unit, paying an attention to an LOP detecting function according to the embodiment.

FIG. 17 is a block diagram showing the structure of the pointer processing unit 12, paying an attention to the LOP detecting function. The pointer processing unit 12 shown in FIG. 17 has a count controlling unit 65' and a RAM 72.

The above count controlling unit (the LOP detecting unit) 65' counts the number of times of consecutive reception of the NDF enable or the number of times of consecutive reception of the invalid pointer on the basis of states of the NDF enable detection signal, the invalid pointer detection signal and the NDF enable detection signal of the preceding frame held in the RAM 72 according to a truth table shown in Table 3 below, paying an attention to that the NDF enable signal and the invalid pointer detection signal are not detected at the same time, and generates and outputs the LOP state detection signal according to a result of the count. The RAM 72 holds a result of the count by the count controlling unit 65' and the NDF enable detection signal of the preceding frame.

TABLE 3 truth table for operation of the count controlling unit

| preceding NDF detection signal | invalid pointer detection signal | NDF detection signal | count value (the number of times of consecutive reception) |
|---|---|---|---|
| 0 | 0 | 0 | 0 (clear) |
| 0 | 0 | 1 | 1 |
| 0 | 1 | 0 | preceding count value + 1 |
| 0 | 1 | 1 | this state does not exist |
| 1 | 0 | 0 | 0 (clear) |
| 1 | 0 | 1 | preceding count value + 1 |
| 1 | 1 | 0 | 1 |
| 1 | 1 | 1 | this state does not exist |

In concrete, the above count controlling unit 65' uses an adding circuit (a protective counter) 65 for counting the number of times of consecutive reception of the NDF enable or the number of times of consecutive reception of the invalid pointer, an OR gate 66, AND gates of a one-input inverting type 67 and 70, a three-input OR gate 68, an AND gate of an all-input inverting type 69 and an AND gate 71, which inputs "0" or "1" to one input of the adding circuit 65 from the OR gate 66 and inputs "the preceding count value" held in the RAM 72 or "0" to the other input of the adding circuit 65 from the AND gate 67, thereby realizing an operation according to the truth table shown in Table 3.

In the pointer processing unit 12 with the above structure, the count controlling unit 65' clears a count value of the adding circuit to "0", sets the count value to "1", or set the preceding count value to "+1" on the basis of states of reception of the NDF enable, the invalid pointer detection signal and the NDF enable signal of the preceding frame held in the RAM 72 according to the truth table shown in Table 3, thereby counting the number of times of consecutive reception of the NDF enable or the number of times of consecutive reception of the invalid pointer.

If protective stages of the LOP detection is in 8 stages (times) of NDF enable signal consecutive reception and in 8 stages of invalid pointer consecutive reception, the LOP state detection signal is outputted from the adding circuit 65 when the count value becomes "8".

Namely, the above count controlling unit 65' can detect the LOP state so long as counting either the number of times of NDF enable signal serial reception or the number of times of invalid pointer consecutive reception, in which a counter for counting the number of times of NDF enable consecutive reception and a counter for counting the number of times of invalid pointer consecutive reception are combined.

Figure 46:
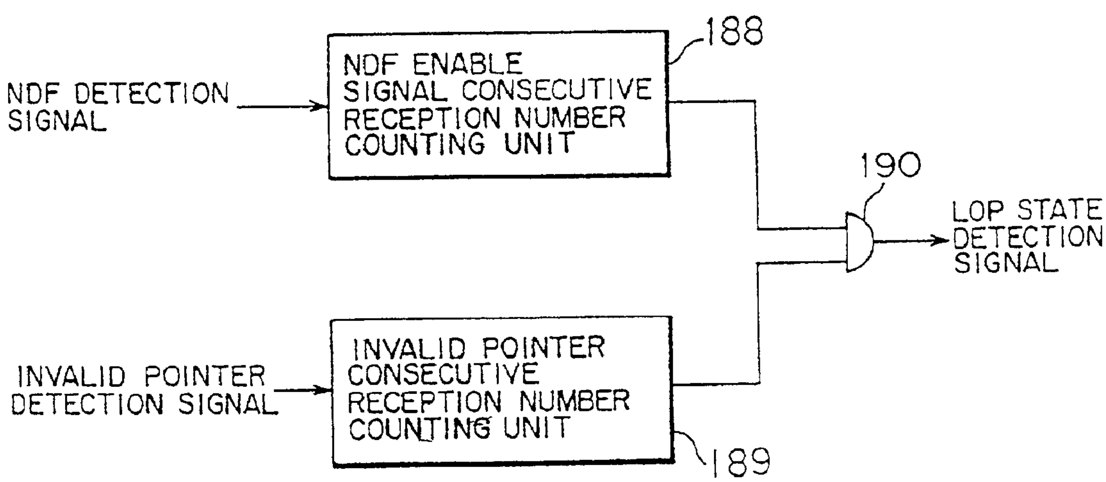

It is therefore unnecessary to provide exclusive circuits each for counting the number of times of NDF enable consecutive reception (NDF enable signal consecutive reception number counting units 188) and exclusive circuits each for counting the number of times of invalid pointer consecutive reception (invalid pointer consecutive reception number counting units 189) equal in number to channels as shown in FIG. 46, for example. This can largely decrease an apparatus scale, a power consumption, the number of distributions between function blocks of this pointer processing apparatus 8B. Incidentally, reference numeral 190 denotes an OR gate in FIG. 46.

Figure 18:
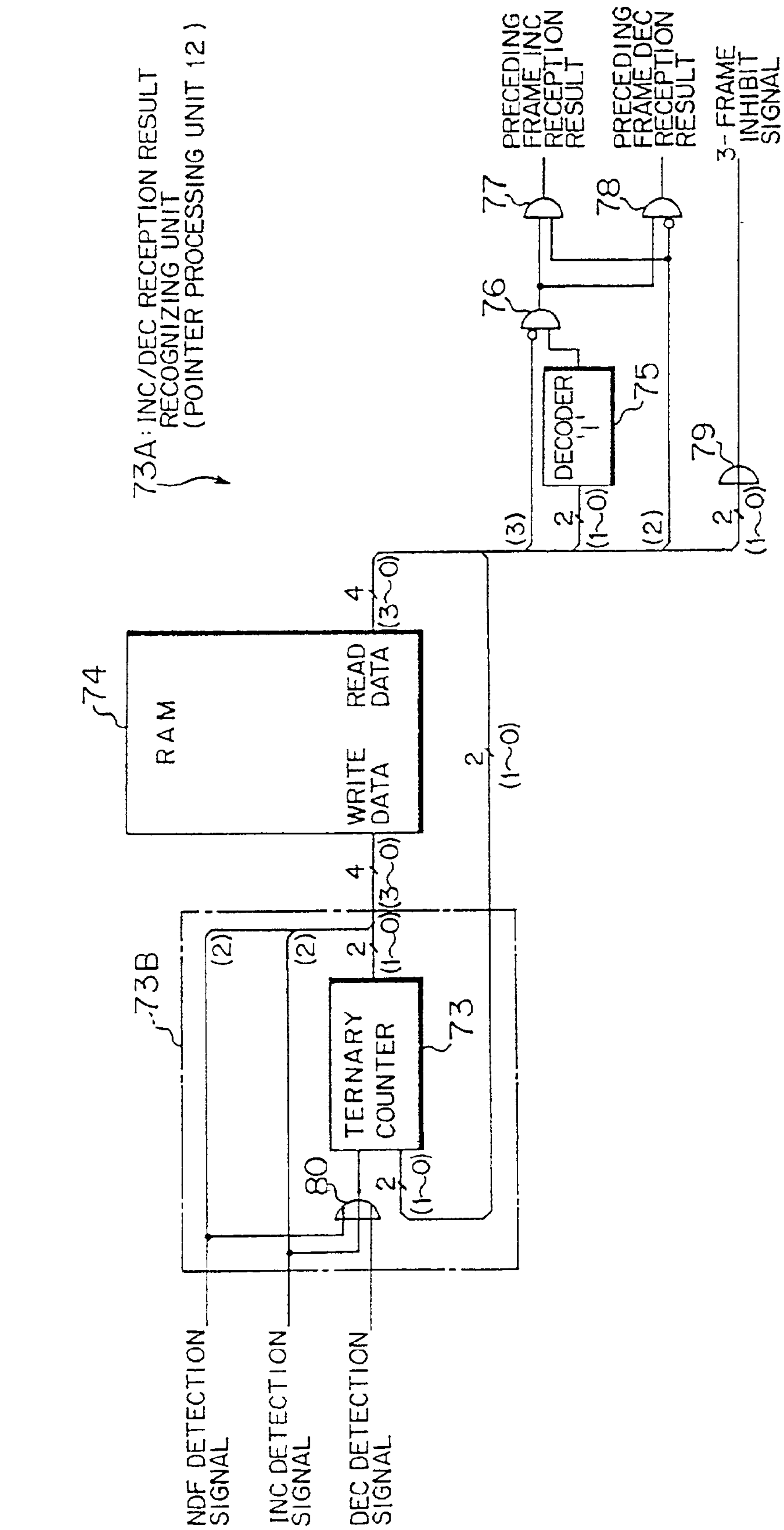
FIG. 18 is a block diagram showing a structure of the pointer processing unit, paying an attention to an INC/DEC reception result recognizing function according to the embodiment.

FIG. 18 is a block diagram showing a structure of the pointer processing unit 12, paying an attention to the INC/DEC reception result recognizing function. The pointer processing unit 12 shown in FIG. 18 has, as an INC/DEC reception result recognizing unit 73A for recognizing a result of INC/DEC reception, a staff control suppressing unit 73B, a RAM 74, a decoding circuit 75, AND gates of a one-input inverting type 76 and 78, an AND gate 77 and an OR gate 79.

The stuff control suppressing unit 73B suppresses a stuff control by the INC/DEC reception during three frames after receiving either the INC/DEC detection signal detected by the INC indication detecting unit 40, the AND gate 43, the DEC indication detecting unit 41 and the AND gate 44 as the INC/DEC detecting unit described hereinbefore with reference to FIG. 14, or the NDF enable signal (the NDF detection signal) detected by the AND gate 39 to prevent memory slip due to INC/DEC consecutive reception, which has a three-input OR gate 80 and a ternary counting unit 73 operating according to a truth table shown in Table 4 below.

TABLE 4 truth table for operation of the divide-by-three counting unit

| NDF detection signal (INC detection signal/ DEC detection signal) | count value of the preceding frame | new count value |
|---|---|---|
| 0 | 0 | 0 |
| 0 | 1 | 2 |
| 0 | 2 | 3 |
| 0 | 3 | 0 |
| 1 | 0 | 1 |

TABLE 4-continued

| truth table for operation of the divide-by-three counting unit | | |
|---|---|---|
| NDF detection signal (INC detection signal/ DEC detection signal) | count value of the preceding frame | new count value |
| 1 | 1 | 1 |
| 1 | 2 | 1 |
| 1 | 3 | 1 |

Figure 19:
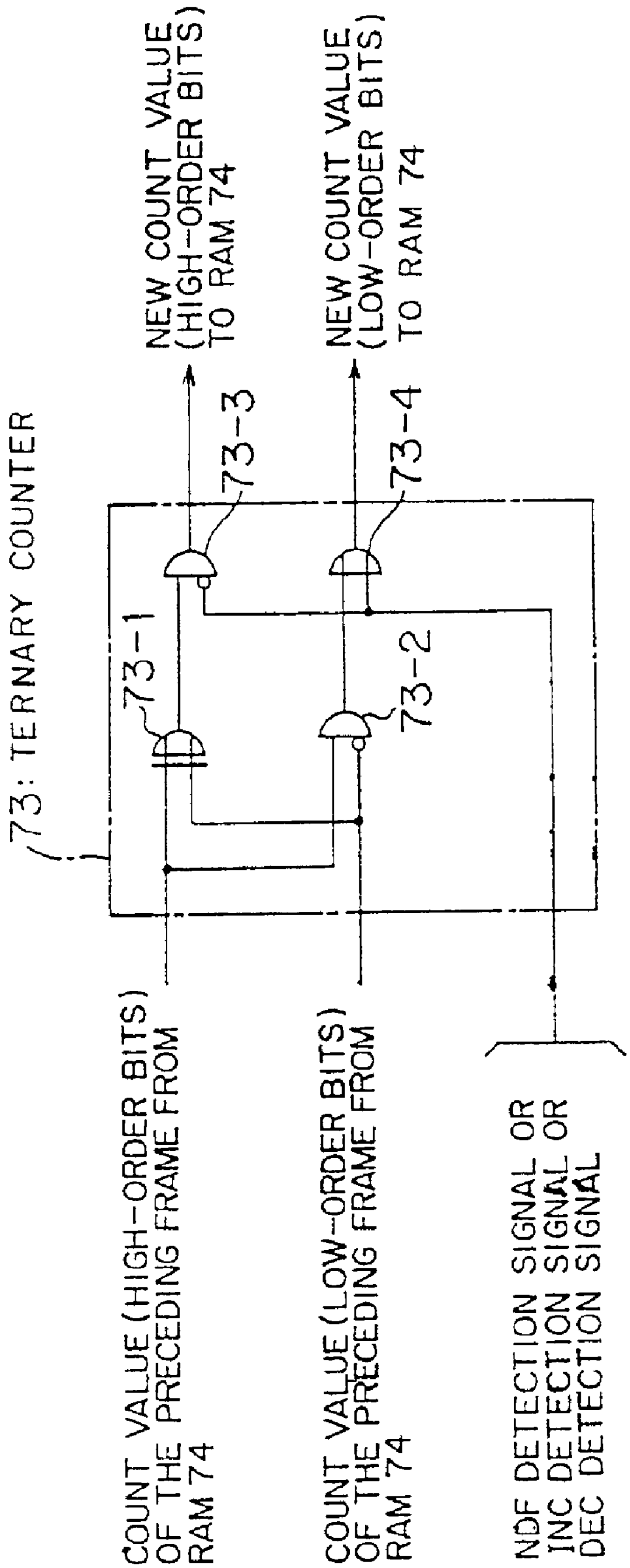
FIG. 19 is a block diagram showing a detailed structure of a ternary counting unit according to the embodiment.

The ternary counting unit 73 is realized with an EXOR 73-1, AND gates of a one-input inverting type 73-2 and 73-3 and an OR gate 73-4 as shown in FIG. 19, for example, so as to operate according to the above truth table shown in Table 4.

The RAM 74 (the RAM for recognizing an INC/DEC reception result) holds a count value of the ternary counting unit 73, the NDF detection signal and the INC (or DEC) detection signal. The decoding circuit 75 decodes "1" of the count value held in the RAM 74.

In the pointer processing unit 12 (the INC/DEC reception result recognizing unit 73A) with the above structure, the ternary counting unit 73 of the staff control suppressing unit 73B operates according to the truth table shown in Table 4, and a count value (a new count value) of the ternary counting unit 73, the NDF detection signal (a reception result) and a detection signal (reception result) of either INC or DEC are held in the RAM 74.

When each of the above reception result data (count values) held in the RAM 74 are read out after that, the decoding circuit 75 decodes "1" for that count value, a signal is generated from a logical product of the decoded result and an inverted signal of the NDF detection signal by the AND gate 76, then a logical product of the generated signal and the INC (or DEC) detection signal is obtained in each of the AND gate 77 and 78, whereby INC reception result and DEC reception result are outputted (recognized). A three frames inhibit signal is generated from a logical sum of the count value read out from the RAM 74 obtained by the OR gate 79.

According to the above pointer processing unit 12 (the pointer processing apparatus 8B), it is possible to recognize an INC/DEC reception result only by holding one reception result of either INC or DEC so that it is unnecessary to hold both of the INC reception result and INC reception result in the RAM 74. It is thereby possible to decrease the number of bits necessary for RAM 74. As a result, not only a size but also a power consumption of the RAM 74 can be decreased.

The above ternary counting unit 73 may be configured as an n-ary (n is a natural number other than 3) counting unit to suppress the stuff control by the INC/DEC reception during n frames after receiving the INC/DEC detection signal or the NDF signal.

Figure 20:
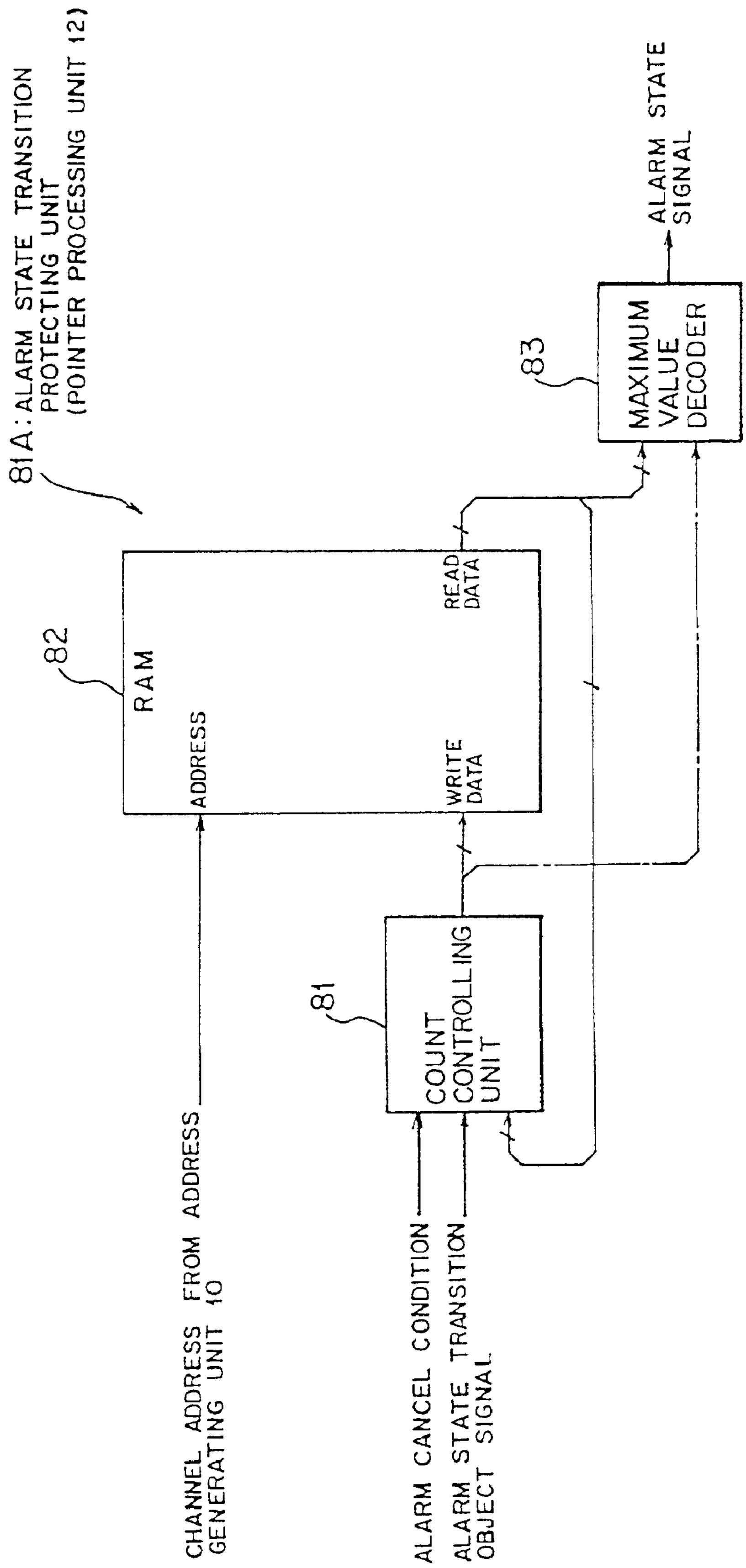
FIG. 20 is a block diagram showing a structure of the pointer processing unit, paying an attention to an alarm state transition detecting function according to the embodiment.

FIG. 20 is a block diagram showing the structure of the pointer processing unit 12, paying an attention to the alarm state transition detecting function. The pointer processing unit 12 shown in FIG. 20 has, as an alarm state transition protecting unit 81A, a count controlling unit 81, a RAM 82 and a decoding circuit 83.

Figure 21:
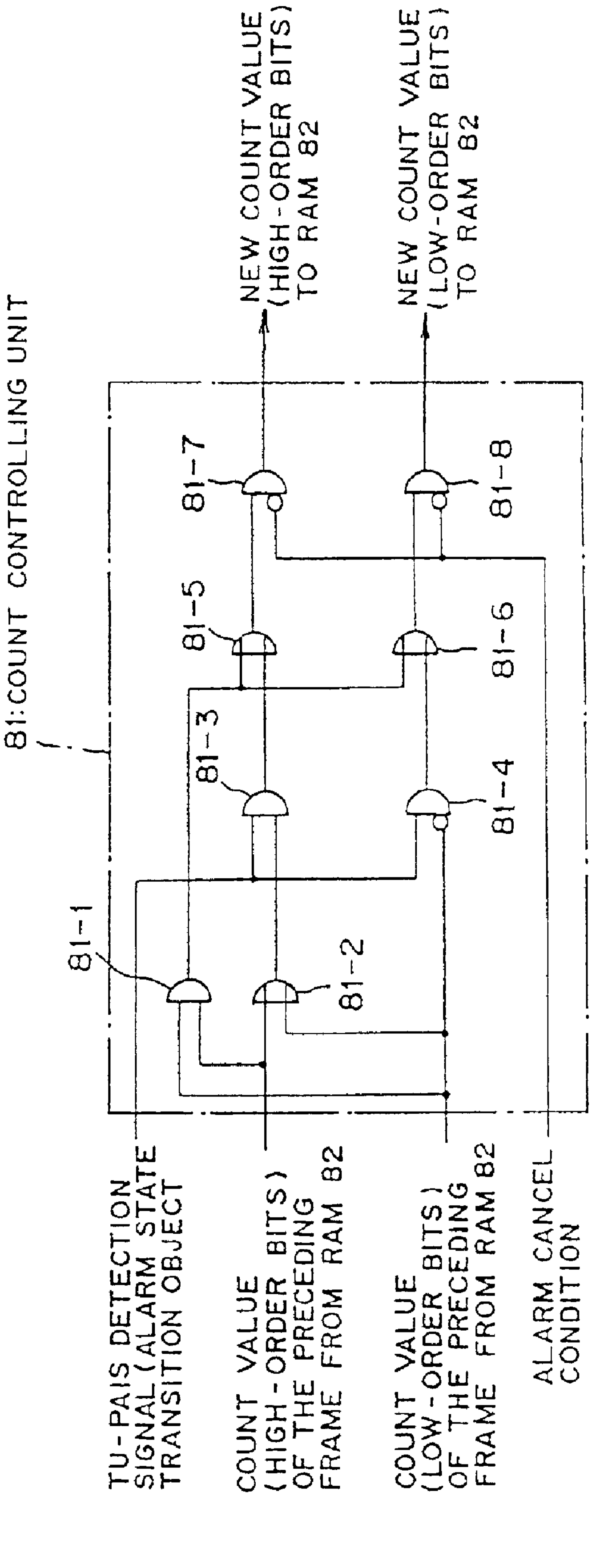
FIG. 21 is a block diagram showing a detailed structure of a count controlling unit according to the embodiment.

The count controlling unit 81 has a function to count protective stages as a protecting circuit in m stages (m is a natural number) for alarm state transition. The count controlling unit 81 has AND gates 81-1 and 81-3, OR gates 81-2, 81-5 and 81-6 and AND gates of a one-input inverting type 81-7 and 81-8 as shown in FIG. 21, for example, so as to operate according to a truth table in Table 5 below.

TABLE 5

| truth table for operation of the count controlling unit for protecting alarm detection | | | |
|---|---|---|---|
| alarm state transition object signal (TU PAIS detection signal | alarm cancel condition signal | count value of the preceding frame | new count value |
| 0 | 0 | 0 | 0 |
| 0 | 1 | 0 | 0 |
| 0 | 0 | 1 | 0 |
| 0 | 1 | 1 | 0 |
| 0 | 0 | 2 | 0 |
| 0 | 1 | 2 | 0 |
| 0 | 0 | 3 | 3 |
| 0 | 1 | 3 | 0 |
| 1 | 0 | 0 | 1 |
| 1 | 0 | 1 | 2 |
| 1 | 0 | 2 | 3 |
| 1 | 0 | 3 | 3 |

The RAM (a RAM for protecting alarm state transition) 82 holds a count value of the count controlling unit 81. The decoding circuit 83 decodes a maximum value of the count value of the count controlling unit 81 read out from the RAM 82.

Namely, the alarm state transition protecting unit 81A (the pointer processing unit 12) shown in FIG. 20 counts up a count of the count controlling unit 81 when receiving an alarm state transition object signal (TU-PAIS signal) as shown in the above Table 5. If not receiving the alarm state transition object signal, the alarm state transition protecting unit 81A resets a count of the count controlling unit 81, transits to an alarm state when a count value of the count controlling unit 81 becomes the maximum (or reaches the protective stages m), holds a count value of the count controlling unit 81 as it was the maximum in the RAM 82 until receiving an alarm cancel condition, thereby recognizing an alarm state of a channel in question from whether a count value reaches the maximum when the count value is read out from the RAM 82.

In the pointer processing unit 12 (the alarm state transition protecting unit 81A) with the above structure, a count value of the count controlling unit 81 is held in the RAM 82 according to a channel address supplied from the address generating unit 10. Whether a count value (or a count value outputted from the count controlling unit 81 as indicated by a dot-dash line in FIG. 20) becomes the maximum or not, that is, whether the count value reaches the number m of the protective stages or not, is judged by the decoding circuit 83, and an alarm state signal is outputted if the count value becomes the maximum.

Figure 22:
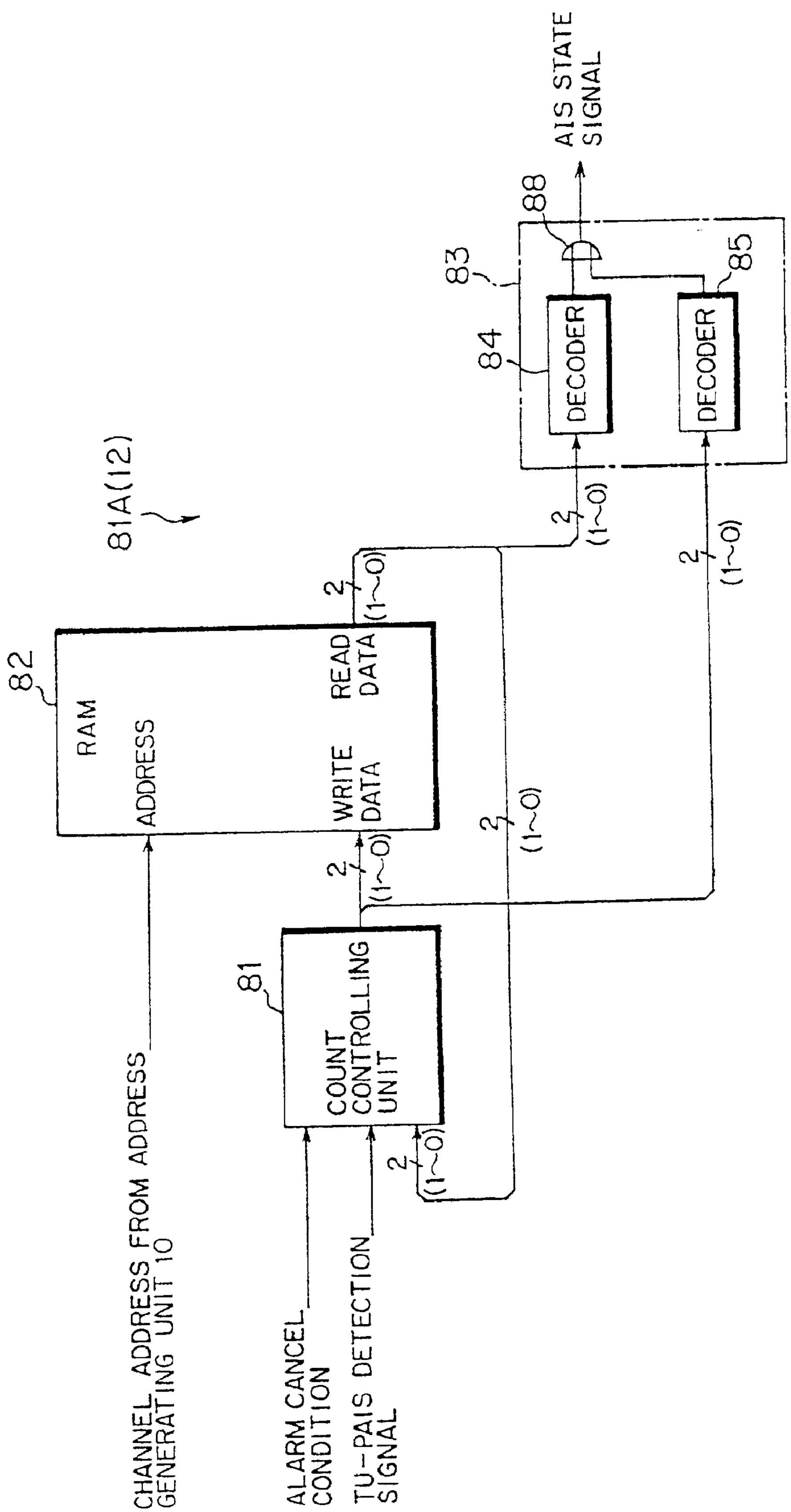
FIG. 22 is a block diagram showing a structure of the pointer processing unit, paying an attention to an AIS state transition detecting function according to the embodiment.

As a concrete example, a case where an AIS state which is a detection state of TU-PAIS is recognized as the above alarm state will be now discussed. The pointer transits to the AIS state when the TU-PAIS detection signal is consecutively received three times as described before with reference to FIG. 158 so that the above protective stages m is m=3. The above decoding circuit 83, therefore, has decoding circuits 84 and 85 each decoding a maximum value "3" and an OR gate 88 for obtaining a logical sum of outputs of the decoding circuits 84 and 85 as shown in FIG. 22, for example.

In the pointer processing unit 12 with the above structure, a count value of the count controlling unit 81 is controlled based on the truth table shown in the above Table 5 according to a result of reception of the alarm cancel condition signal (the normal pointer three consecutive coincidental reception detection signal or the NDF enable detection signal) and the TU-PAIS detection signal, then the count value is serially held in the RAM 82 according to a channel address supplied from the address generating unit 10.

The count value read out from the RAM 82 and an output count value of the count controlling unit 81 are outputted to the corresponding decoding circuits 84 and 85 of the decoding circuit 83, respectively. If the count value is the maximum value "3", the decoding circuits 84 and 85 each decodes "3" as the number of the AIS detection protective stages. Then, the AIS state signal is generated from a logical product in the OR gate 88 so that the AIS state is recognized.

The above pointer processing unit 12 (the pointer processing unit 8B) holds only a count value corresponding to the number of times of reception of the alarm state transition object signal (the TU-PAIS signal) at a corresponding channel address in the RAM 82 so as to serially recognize the alarm state (the AIS state) of plural channels while suppressing the number of bits necessary to the RAM 82 to the minimum.

Figure 48:
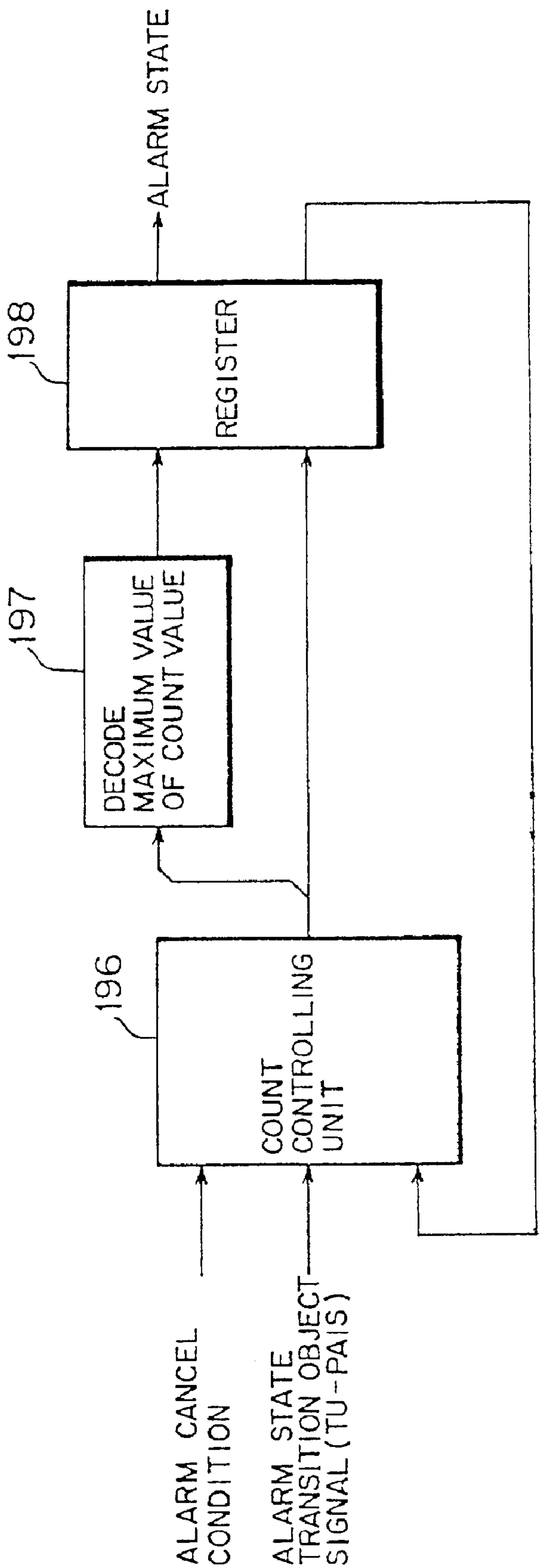

Therefore, it is unnecessary to provide alarm state detection protecting circuits each having a count controlling unit 196 for counting the number of the protective stages, a decoding circuit 197 and a register 198 for holding a count value and an alarm detection result as shown in FIG. 48, for example, equal in number to plural channels (a maximum of 63 channels in the case where signal sizes accommodated in the STM-1 frame are all TU12). Further, it is possible to largely decrease an apparatus scale, a power consumption, the number of distributions between function blocks of this pointer processing unit 8B.

In the above embodiment, the RAM 57 shown in FIG. 16, the RAM 72 shown in FIG. 17, the RAM 74 shown in FIG. 18 and the RAM 82 shown in FIGS. 20 and 22 are different from the RAM 14 shown in FIG. 4 (the RAM 22 shown in FIG. 5). However, it is possible to collectively use the functions of the above RAMs in the same RAM 14 (RAM 22).

For instance, if the above RAMs 57, 72, 74 and 82 are collected in the RAM 22, the RAM 22 holds various data below as shown in FIG. 23.

(1) bit numbers from "0" to "8": received pointer value (9 bits) excepting the MSB described before with reference to FIG. 15;

(2) bit number "9": normal pointer value reception signal identical to that of the preceding frame generated by the AND gate 60 shown in FIG. 16;

(3) bit numbers from "10" to "12": protective counter value (3 bits) for detecting LOP which is an output of the adding circuit 65 for LOP detection shown in FIG. 17;

(4) bit number "13": NDF detection signal which is a result of logical product of the AND gate 39 shown in FIG. 14;

(5) bit numbers "14" and "15": counter value (2 bits) for inhibiting three frames which is an output of the ternary counting unit 73 shown in FIG. 18;

(6) bit numbers "16" and "17": output of the count controlling unit 84 (a protective count value for AIS detection: 2 bits) shown in FIG. 22; and (7) bit number "18": INC detection signal which is a result of logical product of the AND gate 43 shown in FIG. 14.

Incidentally, it is unnecessary to always hold the data in the order shown FIG. 23.

Figure 24:
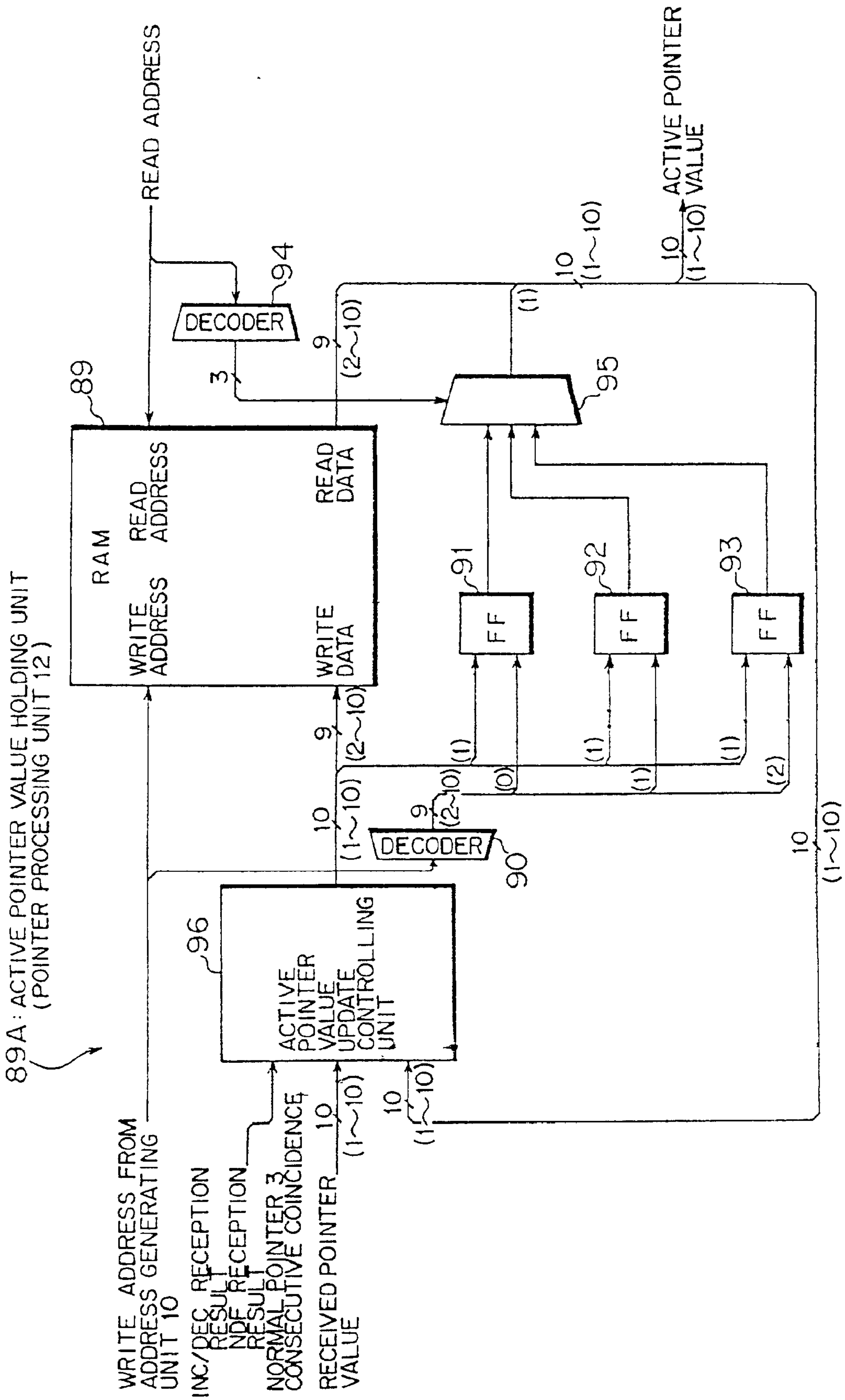
FIG. 24 is a block diagram showing a structure of the pointer processing unit, paying an attention to an active pointer value holding function according to the embodiment.

FIG. 24 is a block diagram showing the structure of the pointer processing unit 12, paying an attention to the active pointer value holding function. The pointer processing unit 12 shown in FIG. 24 has, as an active pointer value holding unit 89A for holding an active pointer value for each channel at which the hardware are actually operating aside from a received pointer value, a RAM 89, decoding circuits 90 and 94, flip-flop (FF) circuits 91 through 93, a selector 95 and an active pointer value update controlling unit 96.

The RAM (RAM for holding an active pointer value) 89 holds 9 bits excepting the MSB of an active pointer value (10 bits: refer to FIG. 157) for each channel. The decoding circuit 90 decodes an address value allocated as an address value for the TU3 on the basis of an address generated by the address generating unit 10 as a write address (a channel address) for the RAM 89.

Each of the FF circuits 91 through 93 holds, as a latch circuit, the MSB (1 bit) of an active pointer value for one channel of TU3 in which a maximum of 3 channels are accommodated in the case of the STM-1 frame. Here, the FF circuit 91 holds the MSB of ch1, the FF circuit 92 holds the MSB of ch2, and the FF circuit 93 holds the MSB of ch3.

The decoding circuit 94 decodes an address value allocated to TU3 on the basis of a read address signal of the RAM 89. The selector 95 selectively outputs data held in each of the FF circuits 91 through 93 with a decoded signal fed from the decoding circuit 94 as a select signal. The selector 95 outputs "0" when no data held in the FF circuits 91 through 93 is selected.

The active pointer value update controlling unit 96 updates an active pointer value held in the RAM 89 when detecting INC/DEC reception, NDF reception or normal pointer value three consecutive coincidence.

The above active pointer value holding unit 89A holds low-order bits excepting the MSB of an active pointer value in the RAM 89, includes the FF circuits 91 through 93 each of which latches 1 bit of the MSB when a signal size of each channel of the multiplex data is TU3, and uses signals obtained by decoding address values allocated to the respective channels of TU3 by the decoding circuits 90 and 94 as control signals used to write and read the FF circuits 91 through 93.

In the pointer processing unit 12 with the above structure, 9 bits in total excepting the MSB of an active pointer value (10 bits) are held in the RAM 89 according to a 5 channel address fed from the address generating unit 10. If a signal size is TU3 at that time, an address value allocated to TU 3 from a channel address is decoded by the decoding circuit 90, then the MSB of the pointer value is held using the decoded signal as an enable signal in the FF circuit 91, 92 or 93 for a corresponding channel.

When an active pointer value held in the RAM 89 is read out, an address value allocated to TU3 is decoded by the decoding circuit 94 on the basis of a channel address (a read address) of the RAM 89, the decoded signal is used as a select signal for the selector 95, and an output of the FF circuit 91, 92 or 93 holding the MSB of the active pointer value of the TU3 is selected by the selector 95 in a manner similar to the above. If the channel address shows a value other than TU3, the MSB is assumed to be "0" as an active pointer value.

At that time, the active pointer value update controlling unit 96 updates an active pointer value held in the RAM 89 each time NDF detection signal reception, INC/DEC reception or normal pointer value three consecutive coincidental reception is detected.

According to the above pointer processing unit 12 (the pointer processing apparatus 8B), all bits of an active pointer value (10 bits) are not held in the RAM 89 but 9 bits excepting the MSB are held in the RAM 89, and the MSB of the active pointer value in the case of TU3 is held in the FF circuit 91, 92 or 93. It is therefore possible to serially generate an active pointer value necessary for the pointer process for each channel without necessity of holding all bits of the active pointer in the RAM 89.

In consequence, the number of bits necessary to the RAM 89 can be decreased, which contributes to a decrease in size and in power consumption of the RAM 89.

The above RAM 89 may be configured as a RAM identical to the RAM 14 shown in FIG. 4 (or the RAM 22 shown in FIG. 5). It is, however, better that the RAM 89 is configured basically as a different RAM since an active pointer value held in the RAM 89 is used when an SPE leading byte is recognized as described later.

Figure 25:
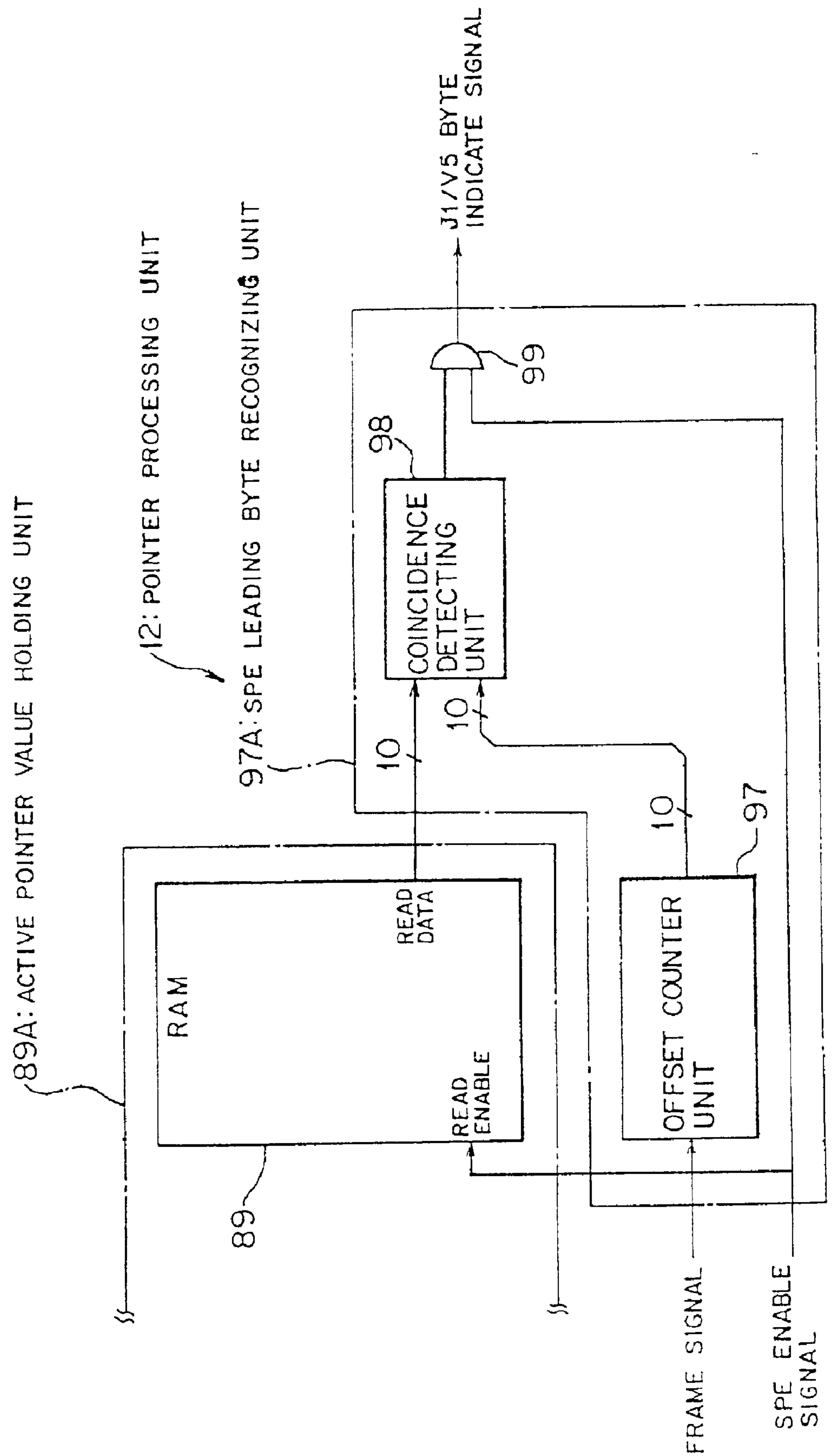
FIG. 25 is a block diagram showing a structure of the pointer processing unit, paying an attention to an SPE leading byte (J1/V5 byte) recognizing function according to the embodiment.

FIG. 25 is a block diagram showing the structure of the pointer processing unit 12, paying an attention to the SPE leading byte (J1/V5 byte) recognizing function. The pointer processing unit 12 shown in FIG. 25 has an SPE leading byte recognizing unit 97A in addition to the active pointer holding unit 89A described before with reference to FIG. 24.

The SPE leading byte recognizing unit 97A recognizes a J1 byte (a leading byte of VC4 and VC3: refer to FIGS. 150 and 152) or a V5 byte (a leading byte of VC2 and VC12: refer to FIGS. 154 and 156) as a leading byte of SPE, which has an offset counting unit 97, a coincidence detecting unit 98 and an AND gate 99 as shown in FIG. 25.

The offset counting unit 97 counts an offset pointer value of SPE described before with reference to FIGS. 149 through 156 with a frame signal as a start to retrieve a leading byte of the SPE. The coincidence detecting unit 98 reads out an active pointer value held as above from the RAM 89 of the active pointer holding unit 89A with an SPE enable signal as a read enable signal, and detects coincidence between the active pointer value and an offset count value in the offset counting unit 97. The AND gate 99 obtains a logical product of the SPE enable signal and a result of the coincidence detection obtained in the coincidence detecting unit 98, thereby generating and outputting an SPE leading byte position (J1/V5 byte) indicate signal.

The SPE leading byte recognizing unit 97A has the offset counting unit 97 for retrieving a leading byte of SPE, reads out the active pointer value from the active pointer value holding unit 89A, and recognizes a leading byte position of the SPE by a logical production of the SPE enable signal and a result of the coincidence detection on the offset count value and the active pointer value.

In the pointer processing unit 12 with the above structure, an active pointer value held in the RAM 89 is read out according to the SPE enable signal. The offset counting unit 97 counts an offset pointer value of SPE with a frame signal as a start. The coincidence detecting unit 89 then detects whether the active pointer value read out from the RAM 89 coincides with a count value of the offset counting unit 97.

Further, the AND gate 99 obtains a logical product of a result of the coincidence detection and the SPE enable signal, and a result of the logical product is generated and outputted as a J1/V5 byte indicate signal. If the J1/V5 byte indicate signal is "1" (in the H level), it means that data in that time slot of the multiplex data is J1/V5 byte.

The above pointer processing apparatus 12 serially recognizes a leading byte (J1/V5 byte) position of VC4/VC3/VC2/VC12 in the multiplex data (STM-1 frame) so as to conduct a process on each channel (a signal in the TU level) by the SPE leading byte recognizing unit 97A (the coincidence detecting unit 98 and the AND gate 99) in common to all channels.

Figure 49:
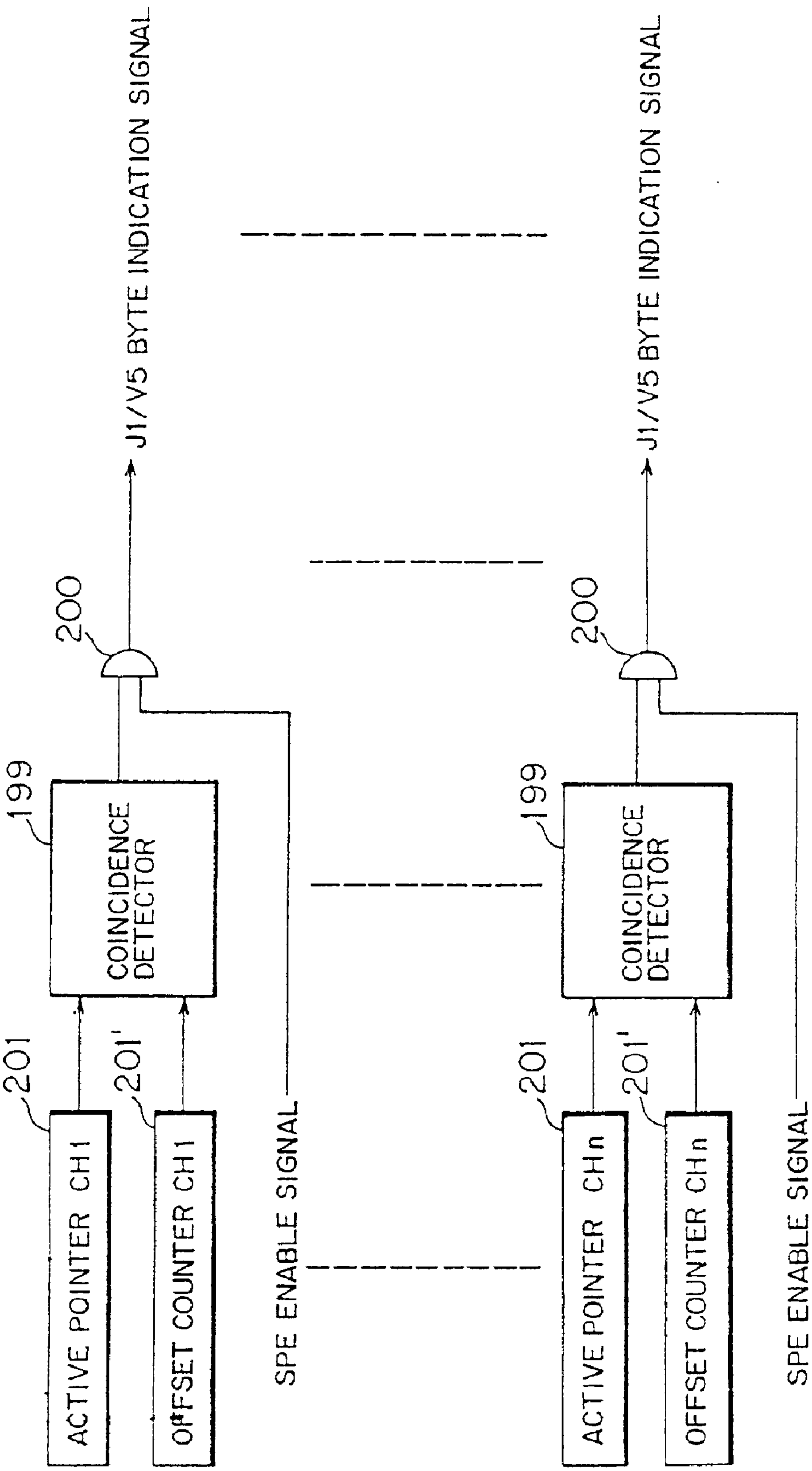

In consequence, it becomes unnecessary to provide coincidence detecting units 199, AND gates 200, active pointer value holding units 201 and offset counting units 201' each equal in number to plural channels (a maximum of 63 channels of TU12 in the STM-1 frame) as shown in FIG. 49, which can largely decrease an apparatus size, a power consumption, the number of distribution between the function blocks of this pointer processing apparatus 8B.

(b-2') Description of a Modification of the TU Pointer Processing Unit

Figure 26:
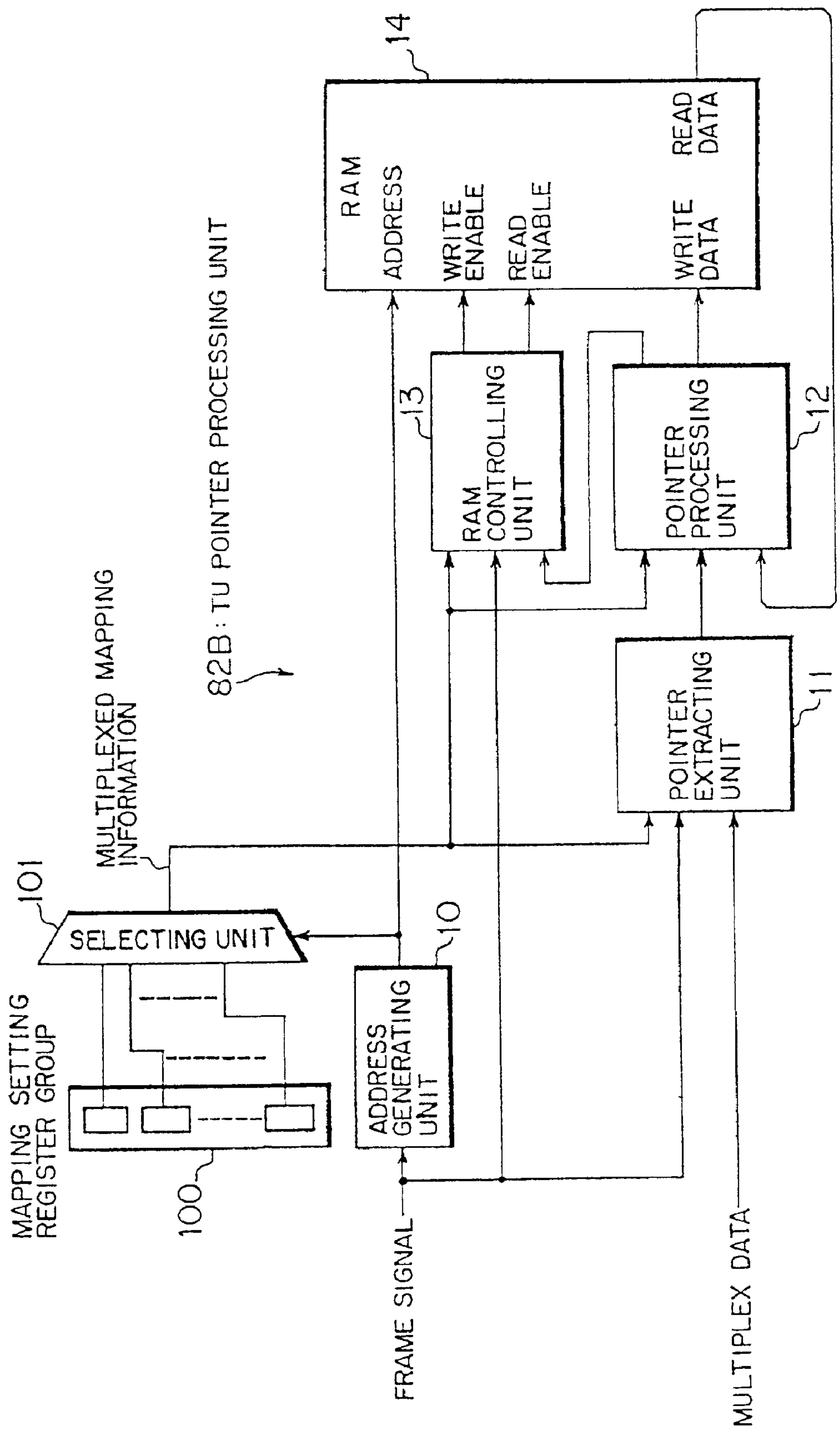
FIG. 26 is a block diagram showing a modification of the TU pointer processing unit according to the embodiment.

FIG. 26 is a block diagram showing a modification of the above TU pointer processing unit 82B. The TU pointer processing unit 82B shown in FIG. 26 has a mapping setting register group 100 and a selecting unit 101 in addition to the structure shown in FIG. 4.

The mapping setting register group 100 sets which signal size among TU3/TU2/TU12 each channel of the multiplex data (the STM-1 frame) is mapped in. The selecting unit (a signal size selecting unit) 101 selects a signal size of a channel in question from the mapping setting register group 100 using an address allocated to each channel by the address generating unit 10, and serially outputs (multiplexes) mapping information. Detailed structures of the mapping setting register group 100 and the selecting unit 101 will be described later with reference to FIG. 30.

The TU pointer processing unit 82B according to this modification recognizes a signal size of each channel of the multiplex data by the mapping setting register group 100 and the selecting unit 101, gives the information to the pointer extracting unit 11, the pointer processing unit 12 and the RAM controlling unit 13, thereby conducting pointer extraction and the pointer process in a common circuit according to the signal size even if frames (channels) in different signal sizes mixedly exist in the multiplex data.

Figure 27:
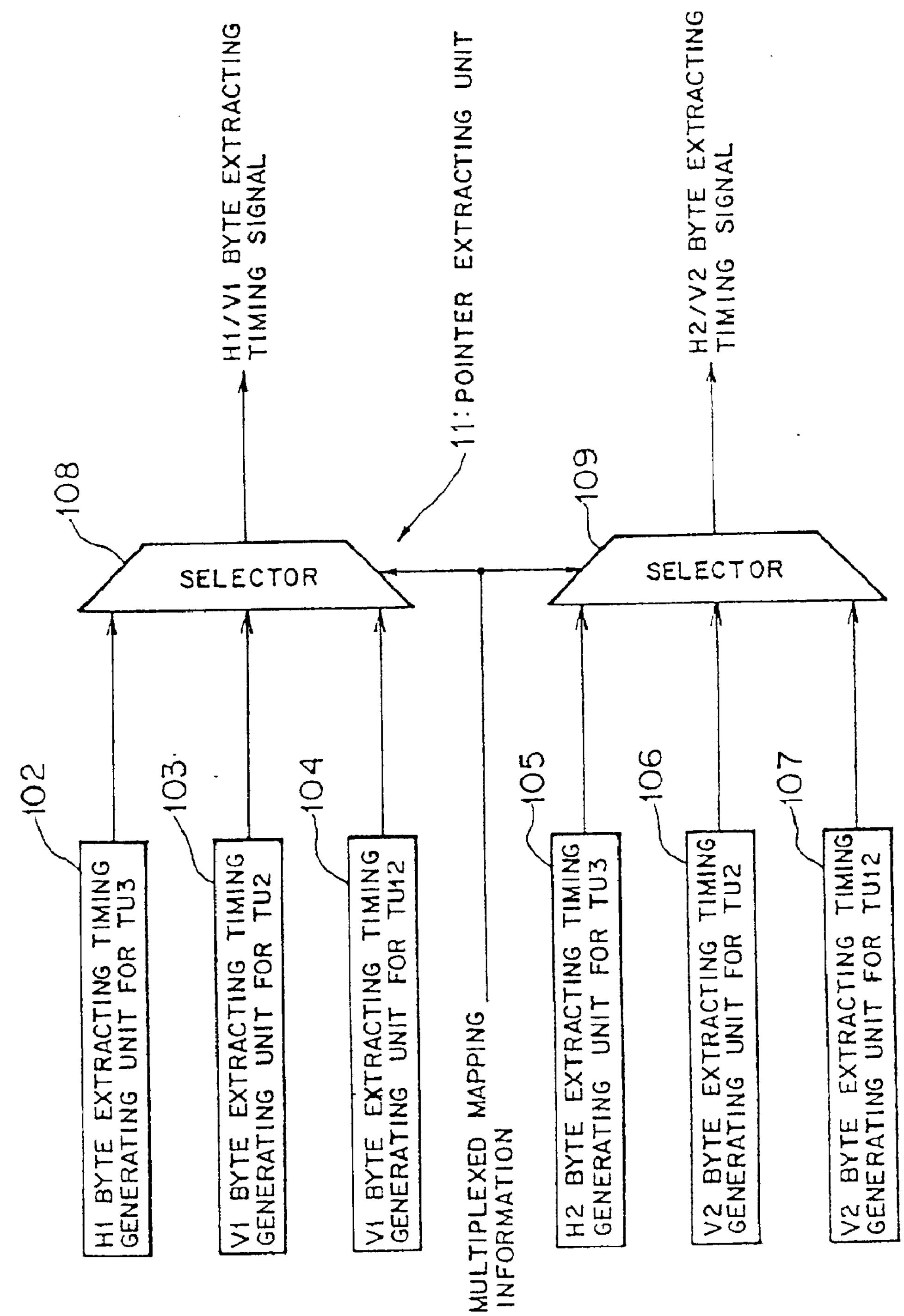
FIG. 27 is a block diagram showing a structure of an essential part of a pointer extracting unit in the modification.

To this end, the pointer extracting unit 11 has, as shown in FIG. 27, for example, an H1 byte extracting timing generating unit for TU3 102, a V1 byte extracting timing generating unit for TU2 103, a V1 byte extracting timing generating unit for TU12 104, an H2 byte extracting timing generating unit for TU3 105, a V2 byte extracting timing generating unit for TU2 106, a V2 byte extracting timing generating unit for TU12 107 and selecting circuits 108 and 109.

The H1 byte extracting timing generating unit 102 generates a timing of extracting the H1 byte of TU3. The V1 byte timing generating unit 103 generates a timing of extracting the V1 byte of TU2. The V1 byte timing generating unit 104 generates a timing of extracting the V1 byte of TU 12.

The H2 byte extracting timing generating unit 105 generates a timing of extracting the H2 byte of TU3. The V2 byte extracting timing generating unit 106 generates a timing of extracting the V2 byte of TU2. The V2 byte extracting timing generating unit 107 generates a timing of extracting the V2 byte of TU12.

The selecting circuit 108 selects an output (an H1 byte extracting timing signal for TU3, a V1 byte extracting timing signal for TU2 or a V1 byte extracting timing signal for TU12) of the timing generating unit 102, 103 or 104 according to the multiplex mapping information fed from the selecting unit 101 and outputs it. The selecting circuit 109 selects an output (an H2 byte extracting timing signal for TU3, a V2 byte extracting timing signal for TU2 or a V2 byte extracting timing signal for TU12) of the timing generating circuit 105, 106 or 107 according to the multiplex mapping information fed from the selecting unit 101 and outputs it in the similar manner.

Since time slots to which the TU3 pointer bytes, the TU2 pointer bytes and the TU12 pointer bytes multiplexed in a VC4 frame are added are different from each other, the above pointer extracting unit 11 receives the multiplex mapping information (a signal size of each channel of the multiplex data) fed from the mapping setting register group 100 and the selecting unit 101 to switch between an H1/V1 byte extracting timing and an H2/V2 byte extracting timing according to the signal size, thereby serially extracting the pointer according to the signal size.

Figure 28:
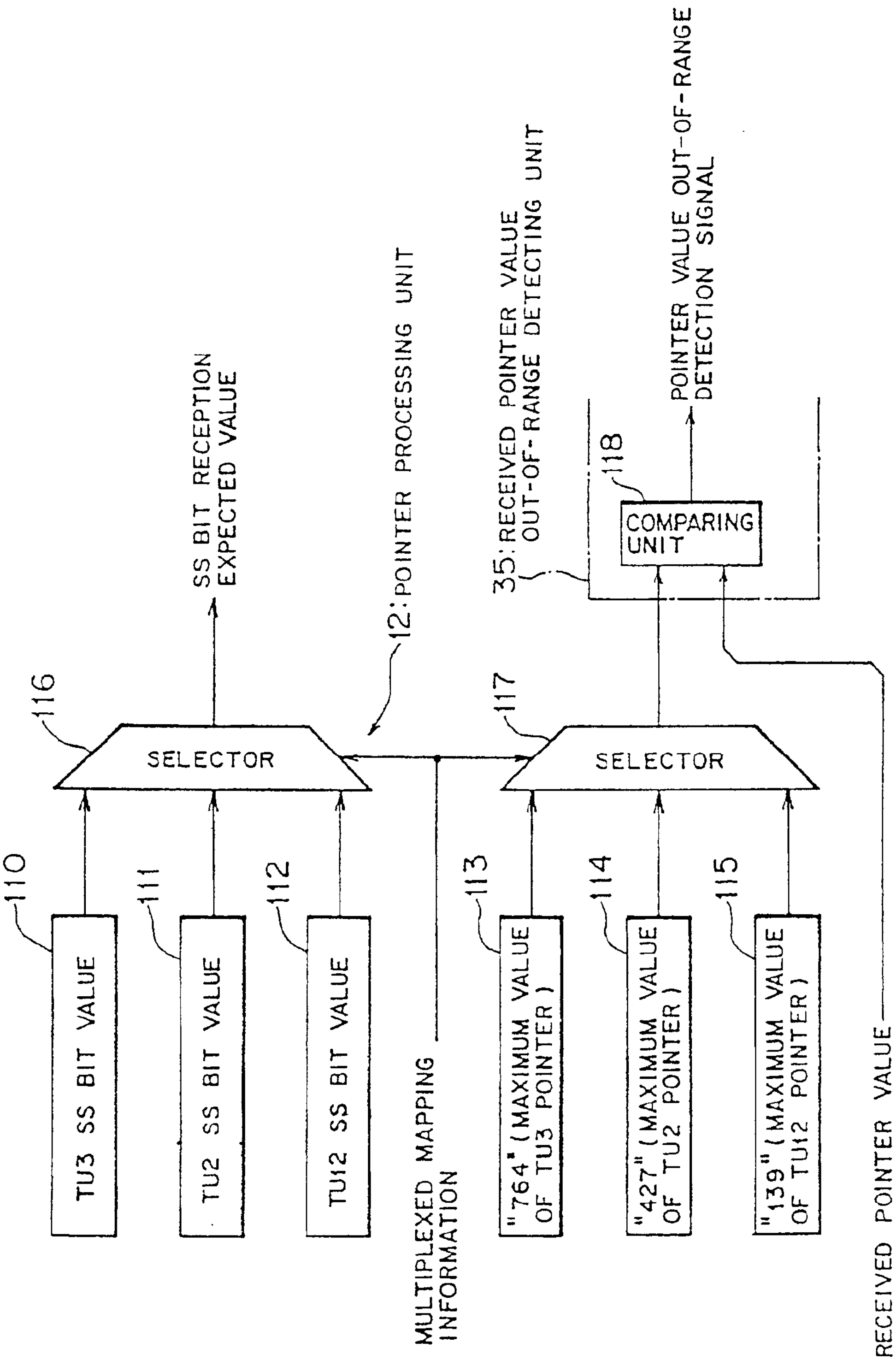
FIG. 28 is a block diagram showing a structure of an essential part of the pointer processing unit in the modification.

In order to cope with a case where channels in different signal sizes mixedly exist, the pointer processing unit 12 according to this modification has, as shown in FIG. 28, for example, an SS-bit value holding unit for TU3 110, an SS-bit value holding unit for TU2 111, an SS-bit value holding unit for TU12 112, a maximum pointer value holding unit for TU3 113, a maximum pointer value holding unit for TU2 114, a maximum pointer value holding unit for TU12 115, selecting circuits 116 and 117, and a comparing unit 118.

The SS-bit value holding unit 110 holds a reception expected value ("10") of the SS bits of TU3. The SS-bit value holding unit ill holds a reception expected value ("00") of the SS bits of TU2. The SS-bit value holding unit 112 holds a reception expected value ("10") of the SS bits of TU12.

The maximum pointer value holding unit 113 holds a maximum value ("764") of the TU3 pointer value. The maximum pointer value holding unit 114 holds a maximum value ("427") of the TU2 pointer value. The maximum pointer value holding unit 115 holds a maximum value ("139") of the TU12 pointer value.

The selecting circuit 116 selects a reception expected value of the SS bits of TU3/TU2/TU12 held in the SS-bit value holding units 110, 111 or 112 according to the multiplex mapping information fed from the mapping setting register group 100 and the selecting unit 101, and outputs it. The selecting circuit 117 selects a maximum value of the pointer value of TU3/TU2/TU12 held in the maximum pointer value holding unit 113, 114 or 115 according to the multiplex mapping information fed from the mapping setting register group 100 and the selecting unit 101, and outputs it in the similar manner.

The comparing unit 118 compares the received pointer value with a pointer value selected by the selecting circuit 117, and outputs "1" as a pointer value out-of-range detection signal when receiving a pointer value larger than the pointer value selected by the selecting circuit 117, or outputs "0" as a normal value excepting the above case.

The above pointer processing unit 12 receives information about a signal size of each channel from the mapping setting register group 100 and the selecting unit 101, and generates a reception expected value of the SS bits according to a signal size if the received pointer value falls in a range of a normal value of the signal size ("764" or less in the case of TU3, "427" or less in the case of TU2 and "139" or less in the case TU12), thereby serially conducting the pointer process according to a signal size as described above.

As a concrete example, since SS bits values determined to respective signal sizes are different as shown in Table 1, the selecting circuit 116 selects an SS bits value corresponding to a signal size according to the multiplex mapping information, and the SS-bit disagreement detecting unit 28 shown in FIG. 11, for example, detects disagreement between the selected SS bits value as a reception expected value and a received SS bits.

Since a valid range of a pointer value for each signal size is determined as shown in Table 2, the received pointer value out-of-range detecting unit 35 shown in FIG. 14 selects a pointer value range according to the mapping set information by the selecting circuit 117 and switches, then detects reception of out-of-range of the pointer value on the basis of the selected pointer value (namely, the comparing unit 118 shown in FIG. 28 is assumed to be included in the received pointer value out-of-range detecting unit 35 in this case).

Figure 29:
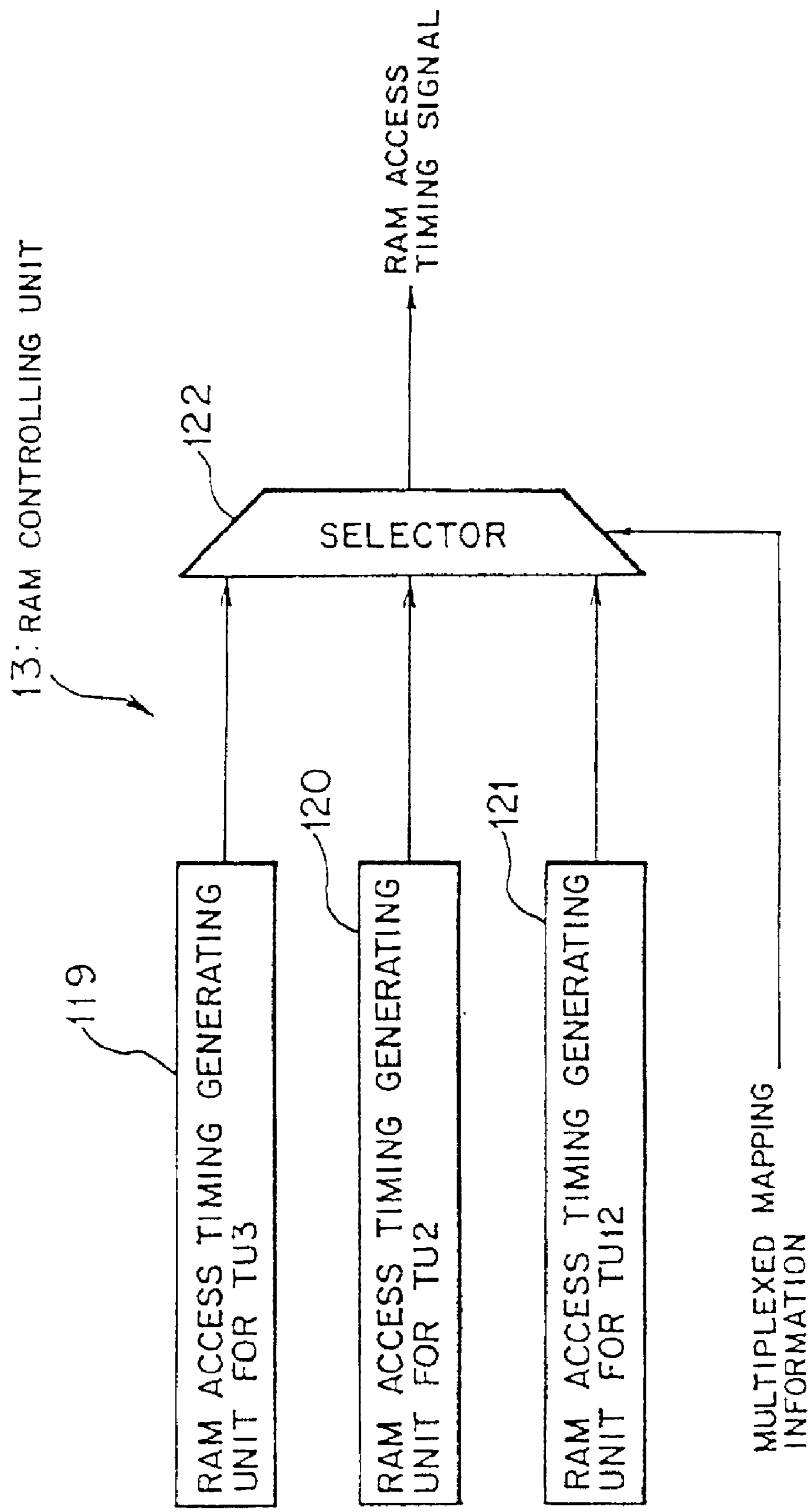
FIG. 29 is a block diagram showing a structure of an essential part of a RAM controlling unit in the modification.

In order to cope with a case where channels in different signal sizes mixedly exist, the RAM controlling unit 13 according to this modification has, as shown in FIG. 29, for example, a RAM access timing generating unit for TU3 119, a RAM access timing generating unit for TU2 120, a RAM access timing generating unit for TU12 121 and a selecting circuit 122.

Each of the RAM access timing generating units 119 through 121 generates an access (write/read) timing to the RAM 14 (or the RAM 21 and the RAM 22). The RAM access timing generating unit 119 generates a RAM access timing for TU3. The RAM access timing generating unit 120 generates a RAM access timing for TU2. The RAM access timing generating unit 121 generates a RAM access timing for TU12.

The selecting circuit 122 selects an output (a RAM access timing signal for TU3/TU2/TU12) of the RAM access timing generating unit 119, 120 or 121 according to a multiplex mapping information signal fed from the mapping setting register, group 100 and the selecting unit 101, and outputs it.

Whereby, the above RAM controlling unit 13 receives information about a signal size of each channel from the mapping setting register group 110 and the selecting unit 101 and generates a RAM access timing signal according to the signal size, thereby controlling write/read of data (information groups) in/from the RAM 14 according to the signal size.

The above TU pointer processing unit 82B (the pointer processing apparatus 8B) selects the mapping setting register group 100 of a channel in question by the selecting unit 101 with a channel address generated by the address generating unit 10 so as to always recognize which signal size of TU3/TU2/TU12 each channel of the multiplex data is mapped in. It is therefore possible to conduct the pointer process in a common circuit even if different signal sizes mixedly exist.

Figure 50:
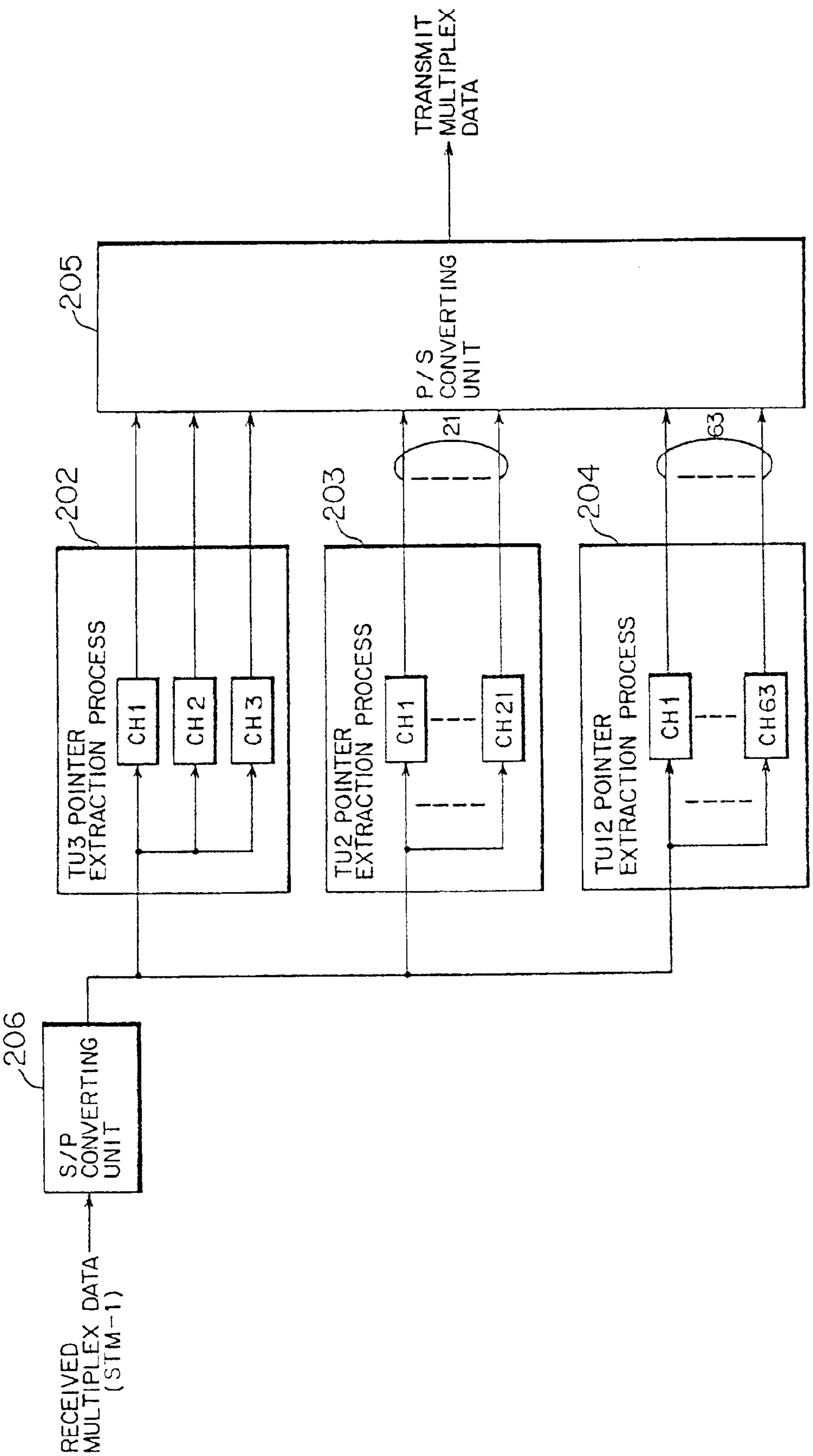

In the case of the pointer process on the STM-1 frame, it becomes unnecessary to provide the pointer extracting/processing circuits 202 through 204 each for conducting the pointer extraction and the pointer process equal in number to a maximum of 87 channels, which are for the pointer extraction/procesing for TU3 (for a maximum of 3 channels), the pointer extraction/processing for TU2 (for a maximum of 21 channels) and the pointer extraction/processing for TU12 (for a maximum of 63 channels), as shown in FIG. 50, for example, so that a process to select data having been undergone the pointer process according to a signal size by a parallel/serial (P/S) converting unit 205, and multiplex and output it, for instance, becomes unnecessary. Incidentally, reference numeral 206 in FIG. 50 denotes a serial/parallel (S/P) converting unit for separating the multiplex data into data in each signal size.

It is therefore possible to largely decrease an apparatus scale, a power consumption, the number of distributions between the function blocks of this pointer processing apparatus 8B.

Figure 30:
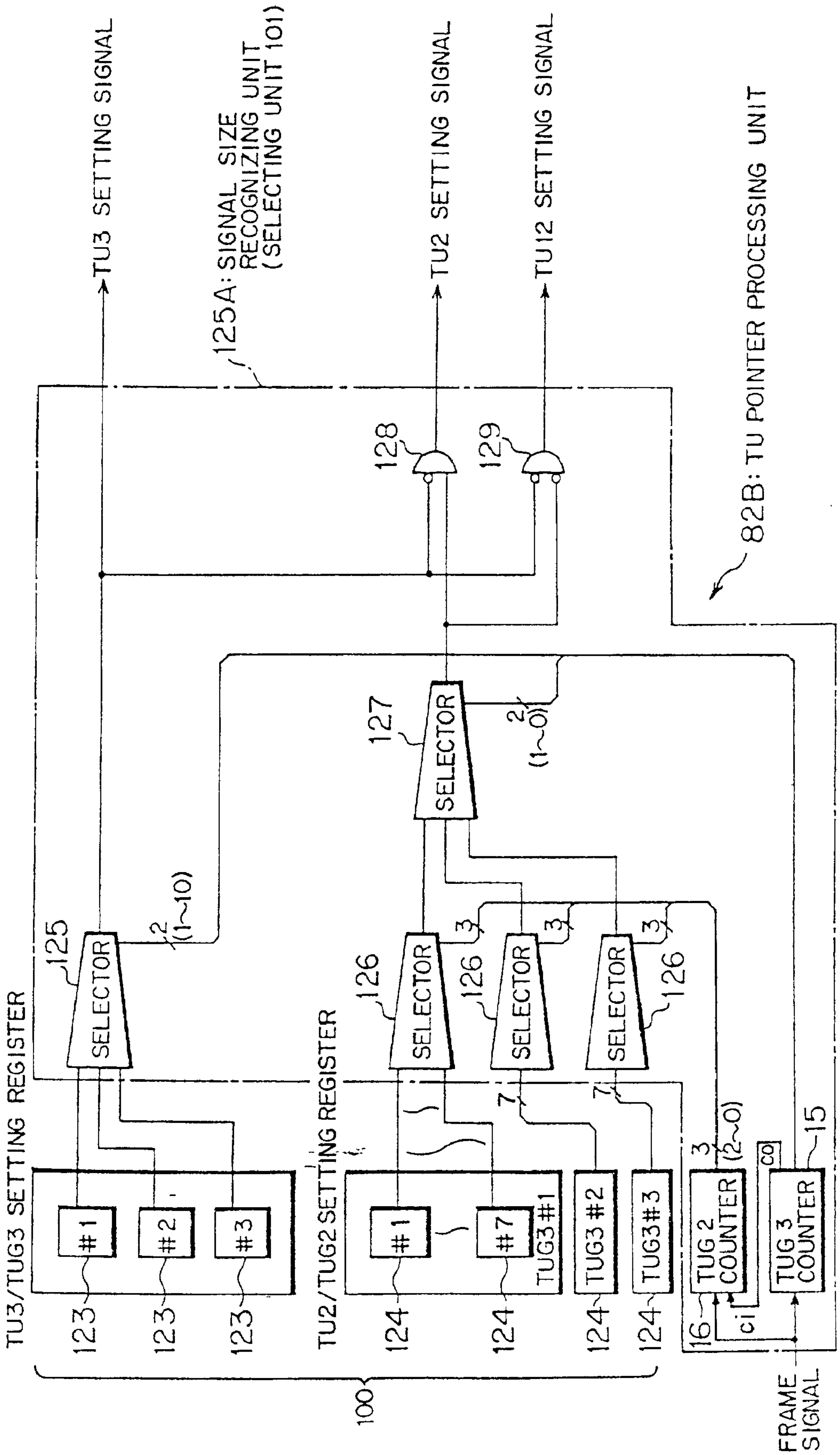
FIG. 30 is a block diagram showing detailed structures of a mapping setting register group and a selector unit in the modification.

FIG. 30 is a block diagram showing detailed structures of the above mapping setting register group 100 and selecting unit 101. As shown in FIG. 30, the mapping setting register group 100 has three (for 3 channels) TU3/TUG3 setting registers (TU3/TUG3 #1 through #3) 123 and seven TU2/TUG2 (TU2/TUG2 #1 through #7) setting registers 124 for each of the TU3/TUG3 setting registers 123 totaling 21 (for 21 channels) if data of the STM-1 frame is processed. The selecting unit 101 has a signal size recognizing unit 125A.

The TU3/TUG3 setting register 123 stores information as to whether TUG3 accommodated (mapped) in the VC4 frame is set to TU3 or TUG3. If a value of the setting register 123 is "1", for example, TU3 is multiplexed in the TUG3 frame. If a value of the setting register 123 is "0", TU2 or TU12 is multiplexed in the TUG3 frame.

The TU2/TUG2 setting register 124 stores information as to whether TUG2 mapped in TUG3 is set to TU2 or TUG2. If a value of this setting register is "1", TU2 is multiplexed in the TUG2 frame. If a value of this setting register is "0", TU12 is multiplexed in the TUG2 frame.

The signal size recognizing unit 125A recognizes a signal size of a channel in question on the basis of a set value stored in each of the setting registers 123 and 124 to generate and output a TU3/TU2/TU12 setting signal for the address generating unit 10, whose function is realized using selecting circuits 125 through 127, an AND gate of a one-input inverting type 128, an AND gate of an all-input inverting type 129, and an address counter for TUG3 15 and an address counter for TUG2 16 similar to those shown in FIG. 6.

The selecting circuit 125 selects information of the TU3/TUG3 setting register 123 corresponding to a channel indicated by a count value of the address counter for TUG3 15 of the address generating unit 10. The selecting circuit 126 selects information of the setting register for TU2/TUG2 124 corresponding to a channel indicated by a count value of the address counter for TUG2 16. The selecting circuit 127 selects information of the setting register for TU2/TUG2 124 corresponding to a channel indicated by a count value of the address counter for TUG3 15.

In the TU pointer processing unit 82B according to this modification with the above structure, a set value (data "#1", "#2" or "#3") of the TU3/TUG3 setting register 123 is selected with a count value of the address counter for TUG3 15 by the selecting circuit 125, and a TU3 setting signal is generated. The TU setting signal represents that a channel in question is TU3 only when the TU setting signal is "1".

Data "#1" through "#7" fed from the seven registers of the TU2/TUG2 setting register 124 (for TUG3#1, TUG3#2 and TUG3#3) are selected with a count value of the TUG2 address counter 16 by the three selecting circuits 126, then any one among these three selected signals is selected according to a count value of the address counter for TUG3 15 by the selecting circuit 127.

After that, a logical product of an inverted signal of the TU3 setting signal and an output signal of the selecting circuit 127 is obtained by the AND gate 128 to generate a TU2 setting signal. Incidentally, the TU2 setting signal represents that a channel in question is TU2 only when being "1".

Further, a logical product of an inverted signal of the TU3 setting signal and an inverted signal of an output signal of the selecting circuit 127 is obtained by the AND gate 129, whereby a TU12 setting signal is generated. Incidentally, the TU12 setting signal represents that a channel in question is TU12 only when being "1". The above signal size recognizing unit 125A judges whether a channel in question is mapped in TU3 or not by the TU3/TUG3 setting register 123. If that channel is not mapped in TU3, the signal size recognizing unit 125A judges which the channel is mapped in TU2 or TU12 by the TU2/TUG2 setting register 124 so as to recognize a signal size of the channel.

Through the above process, it is possible to recognize data in the TU level for a maximum of 63 channels multiplexed in the VC4 frame with set data of the three TU3/TUG3 setting registers 123 and the twenty-one TU2/TUG2 setting registers 124 totaling 24 registers.

Figure 51A:
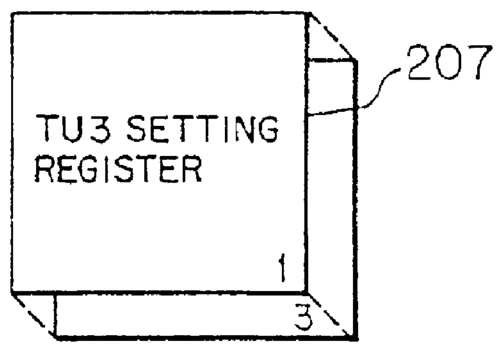
Figure 51B:
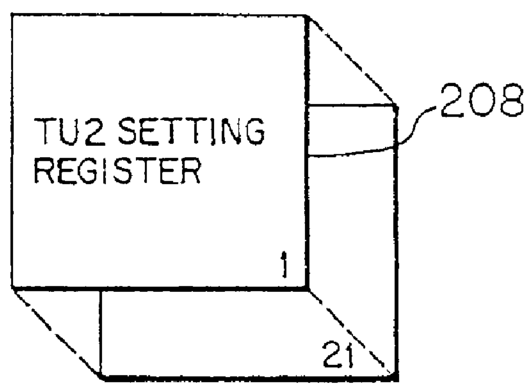
Figure 51C:
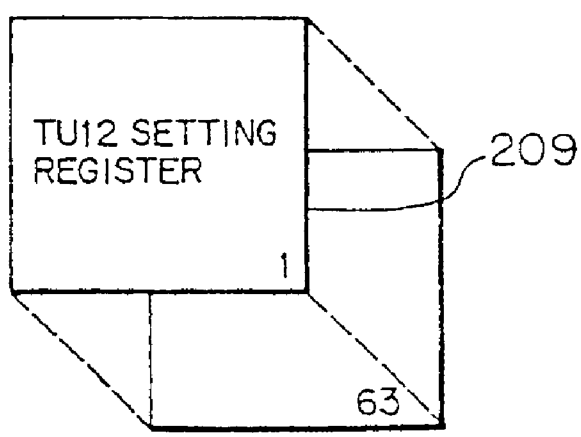

In order to recognize a signal size of a channel multiplexed in the VC4 frame, it is unnecessary to provide TU3 setting registers 207 for 3 channels, TU2 setting registers 208 for 21 channels and TU12 setting registers 209 for 63 channels totaling 87 (3+21+63) registers as shown in FIGS. 51(1) through **51(*c*)**, for example.

In the above TU pointer processing unit 82B, the number of registers is reduced to about one-third. Further, it is possible to decrease an apparatus size, a power consumption, the number of distributions between the function blocks and the like of this pointer processing apparatus 8B.

Figure 31:
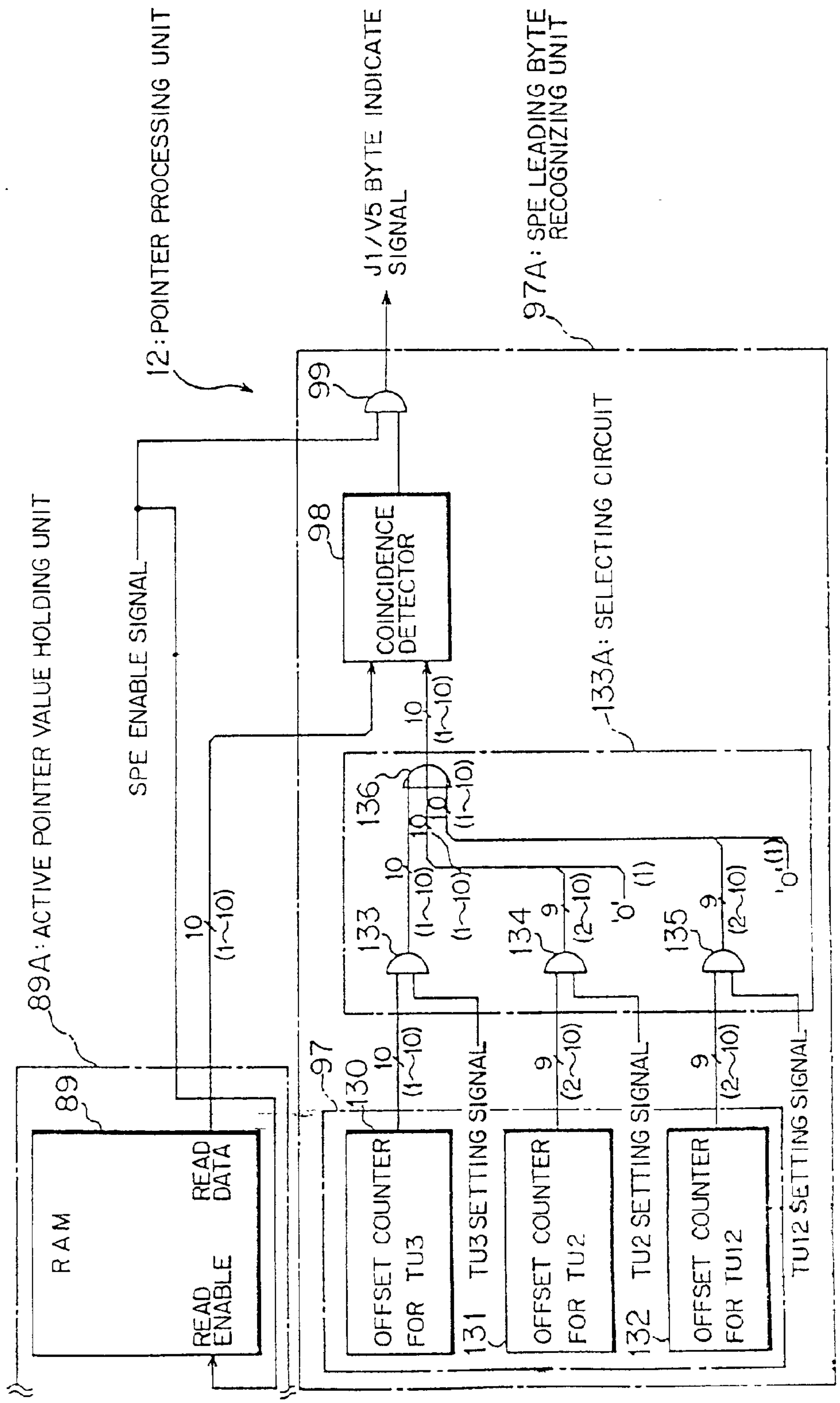
FIG. 31 is a block diagram showing a structure of the pointer processing unit, paying an attention to the SPE leading byte (J1/V5 byte) recognizing function in the modification.

FIG. 31 is a block diagram showing the structure of the pointer processing unit 12, paying an attention to the SPE leading byte (J1/V5 byte) recognizing function according to this modification. The pointer processing unit 12 shown in FIG. 31 has, as the offset counting unit 97 shown in FIG. 25, an offset counter for TU3 130, an offset counter for TU2 131, an offset counter for TU12 132 and a selecting circuit 133A in order to cope with a case where channels in different signal sizes mixedly exist.

The offset counter for TU3 130 counts an offset pointer value of TU3. The offset counter for TU2 131 counts an offset pointer value of TU2. The offset counter for TU12 132 counts an offset pointer value for TU12.

The selecting circuit 133A selects and outputs a count value of the offset counter 130, 131 or 132 according to the TU3 setting signal/TU2 setting signal/TU12 setting signal generated by the signal size recognizing unit 125 as above. Here, the function of the selecting circuit 133A is realized using AND gates 133 through 135 and an OR gate 136.

Namely, the above TU pointer processing unit 82B (the pointer processing apparatus 8B) recognizes a signal size of each channel of the multiplex data by the mapping setting register group 100 and the selecting unit (the signal size selecting unit) 101, and gives the information to the pointer extracting unit 11, the pointer processing unit 12 and the RAM controlling unit 13, thereby conducting the pointer extraction and the pointer process in a common circuit according to the signal size. To this end, the TU pointer processing unit 82B has the offset counters 130 through 132 as offset counters provided for respective signal sizes, selects a count value of the counter 130, 131 or 132 according to mapping set information (a TU3/TU2/TU12 setting signal) supplied from the mapping setting register group 100 to recognize a leading byte position of SPE.

In the pointer processing unit 12 (the SPE leading byte recognizing unit 97A) with the above structure, a logical product of the TU3 setting signal and an output of the offset counter for TU3 130 is obtained by the AND gate 133, a logical product of the TU2 setting signal and an output of the offset counter for TU2 131 is obtained by the AND gate 134, and a logical product of the TU12 setting signal and an output of the offset counter for TU12 132 is obtained by the AND gate 135.

Then, coincidence between each result of the logical products obtained at these three AND gates 133 through 135 (an output of the OR gate 136) and an active pointer value read out from the RAM 89 according to the SPE enable signal is detected by the coincidence detecting unit 98, and a logical product of an output of the coincidence detecting unit 98 and the SPE enable signal is obtained by the AND gate 99, whereby a J1/V5 byte indicate signal is generated and outputted.

Namely, the pointer processing unit 12 switches an offset count value corresponding to a setting signal size according to logical products obtained at the AND gates 133 through 135 and a logical sum obtained at the OR gate 136 constituting the selecting circuit 133A, compares the selected offset count value with an active pointer value, thereby recognizing certainly an SPE leading byte even if channels in different signal sizes mixedly exist.

Figure 52A:
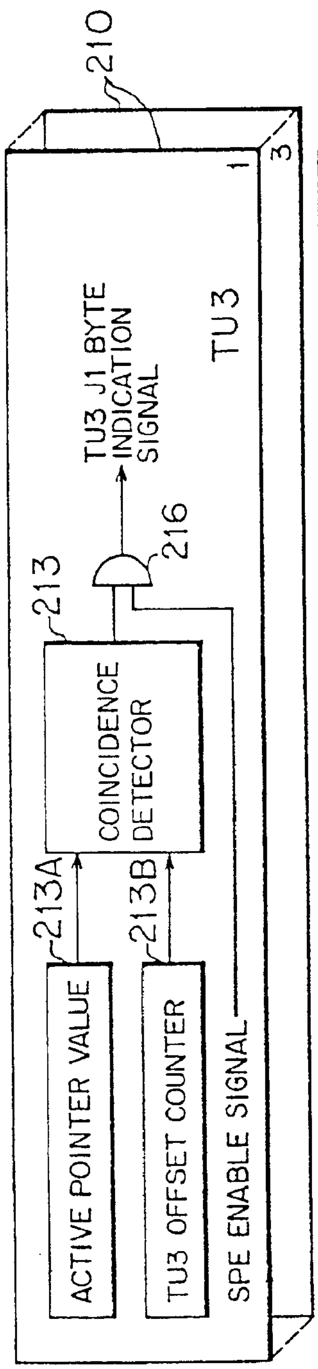
Figure 52B:
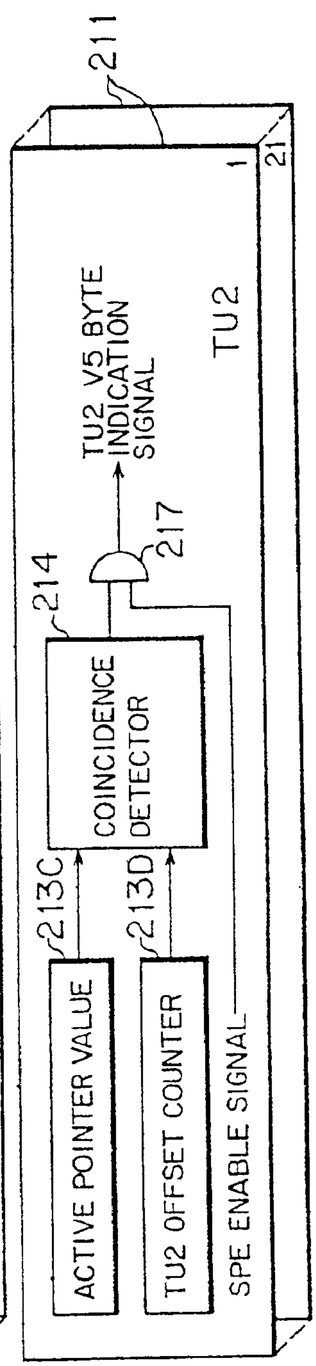
Figure 52C:
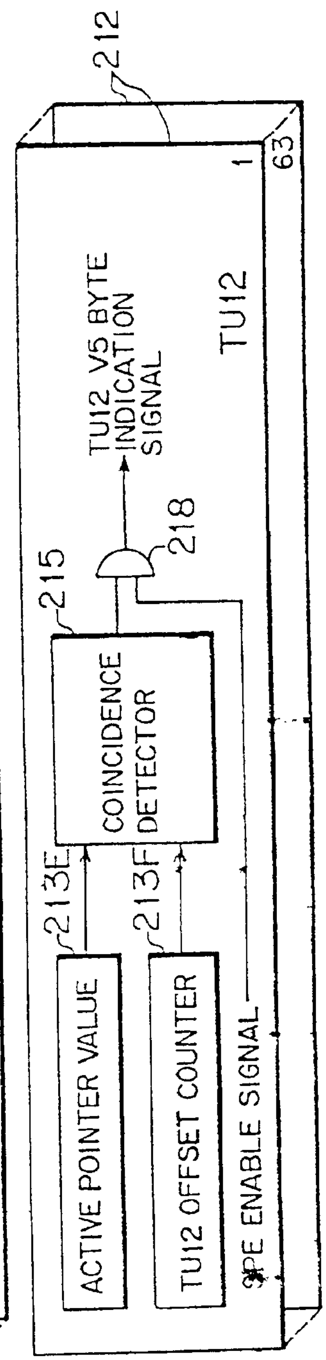

It is therefore unnecessary to provide, for example, SPE leading byte (J1 byte) recognizing circuits for TU3 210 as shown in FIG. 52(*a*), SPE leading byte (V5 byte) recognizing circuits for TU2 211 as shown in FIG. 52(*b*) and SPE leading byte (V5 byte) recognizing circuits for TU12 212 as shown in FIG. 52(*c*) equal in number to respective channels so that an apparatus scale, a power consumption, the number of distributions and the like of this pointer processing apparatus 8B can be largely decreased.

Incidentally, in FIGS. 52(*a*) through 52(*c*), reference numerals 213A, 213C and 213E denote active pointer value holding units for TU3, TU2, and TU12, respectively. Reference numerals 213B, 213D and 213F denote offset counting units for TU3, TU2 and TU12, respectively, 213 through 215 denote coincidence detecting units, and 216 through 218 denote AND gates.

Figure 32:
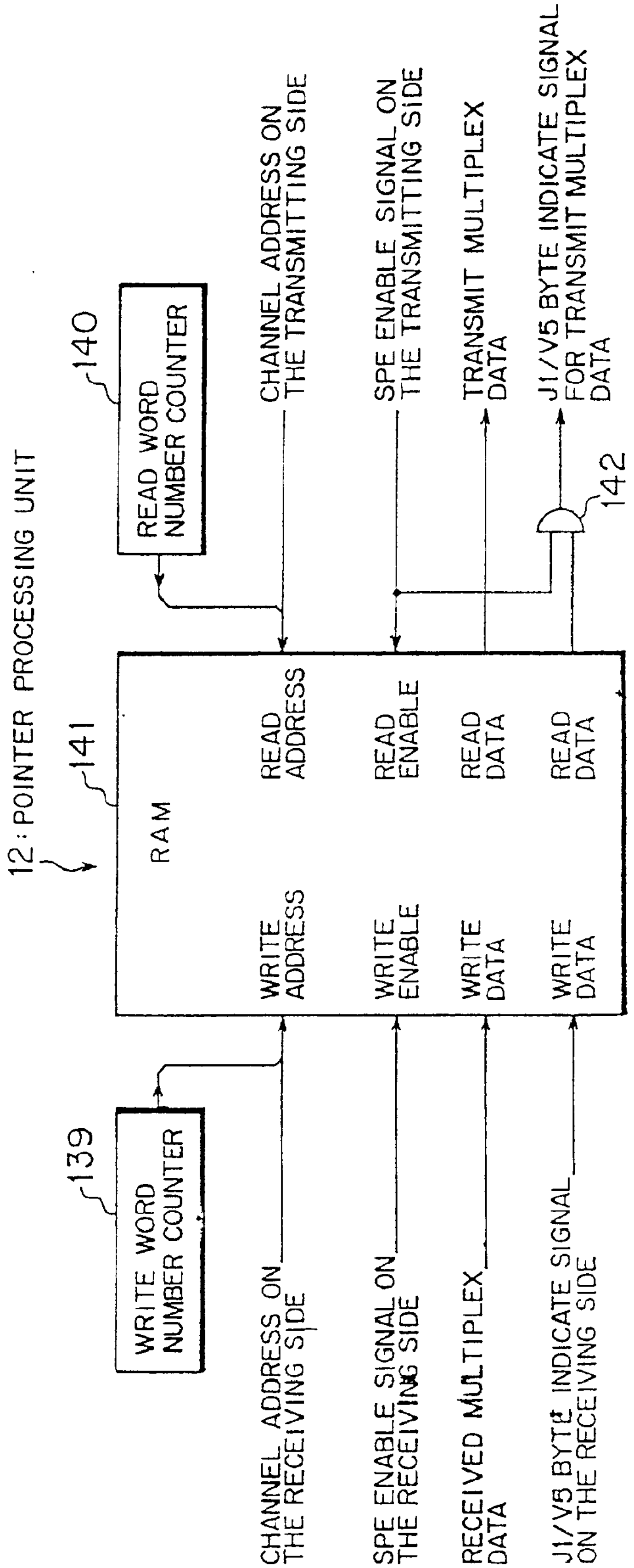
FIG. 32 is a block diagram showing a structure of the pointer processing unit, paying an attention to a pointer changing function in the modification.

FIG. 32 is a block diagram showing the structure of the pointer processing unit 12, paying an attention to the pointer changing function according to this modification. The pointer processing unit 12 shown in FIG. 32 has a write word number counter 139, a read word number counter 140, a RAM 141 for changing a pointer having an ES memory function and an AND gate 142.

The write word number counter 139 indicates the number of rows (words) of the RAM 141 to write data in the RAM 141. The read word number counter 140 indicates the number of words of the RAM 141 to read data from the RAM 141.

The pointer processing unit 12 with the above structure adds a count value of the write word number counter 139 to a channel address on the receiving side to generate a write address for the RAM 141, besides adding a count value of the read word number counter 140 to a channel address on the transmitting side to generate a read address for RAM 141.

A J1/V5 byte indicate signal on the receiving side generated by the SPE leading byte recognizing unit 97A shown in FIG. 31 (or FIG. 25) is successively written serially along with received multiplex data (VC-n: where n is 2, 3, 4, or 12) in a region of the RAM 141 indicated by the above write address as shown in FIG. 33, for example, according to the SPE enable signal on the transmitting side. Incidentally, it is unnecessary to always hold the data in the RAM 141 in the order shown in FIG. 33.

Each of the data written in the RAM 141 is successively read out from the region indicated by the above read address according to the SPE enable signal on the transmitting side (a timing on the reading side), the J1/V5 byte indicate signal in the data is used to obtain a logical product of that J1/V5 byte indicate signal and the SPE enable signal on the transmitting side by the AND gate 142 in common to all channels, whereby a J1/V5 byte indicate signal for transmit multiplex data is generated. By this signal, a leading byte of SPE on the transmitting side can be recognized.

Namely, the above pointer processing unit 12 writes (serially) the SPE data and information bits (J1/V5 byte indicate signal) indicating an SPE leading byte of the inputted multiplex data in the RAM 14, and reads out (serially) the data written in the RAM 141 at a timing on the reading side so as to recognize an SPE leading position from a value of the read information bits indicating the SPE leading byte.

Figure 53:
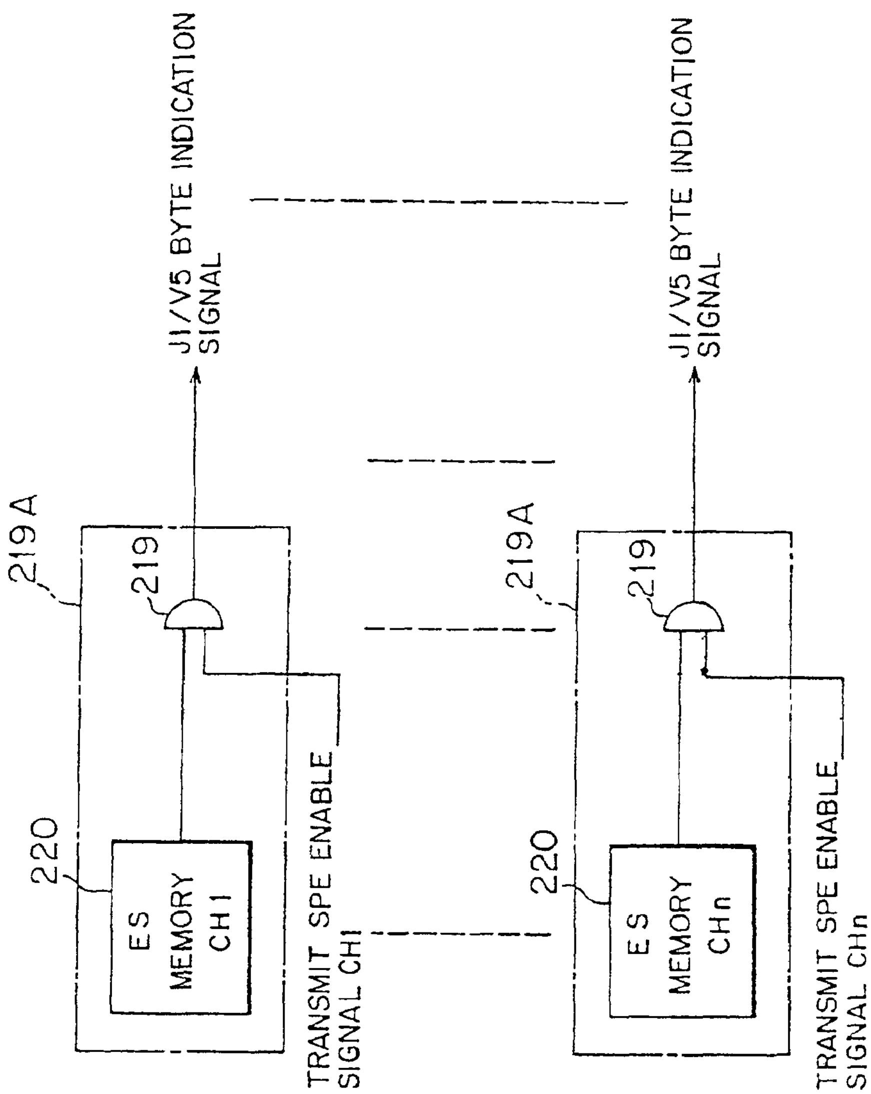

Therefore, it is unnecessary to provide, as shown in FIG. 53, SPE leading byte recognizing circuits 219A each for obtaining a logical product of a J1/V5 byte indicating signal read out from the ES memory 220 and a transmit SPE enable signal by an AND gate 219 to recognize an SPE leading byte used to change a pointer equal in number to channels of the multiplex data that should be processed. It is possible to conduct the process for all channels in a common circuit even if channels in different signal sizes mixedly exist in the mutliplex data so that the apparatus scale, the power consumption, the number of distributions between the function blocks and the like can largely decreased.

Figure 34:
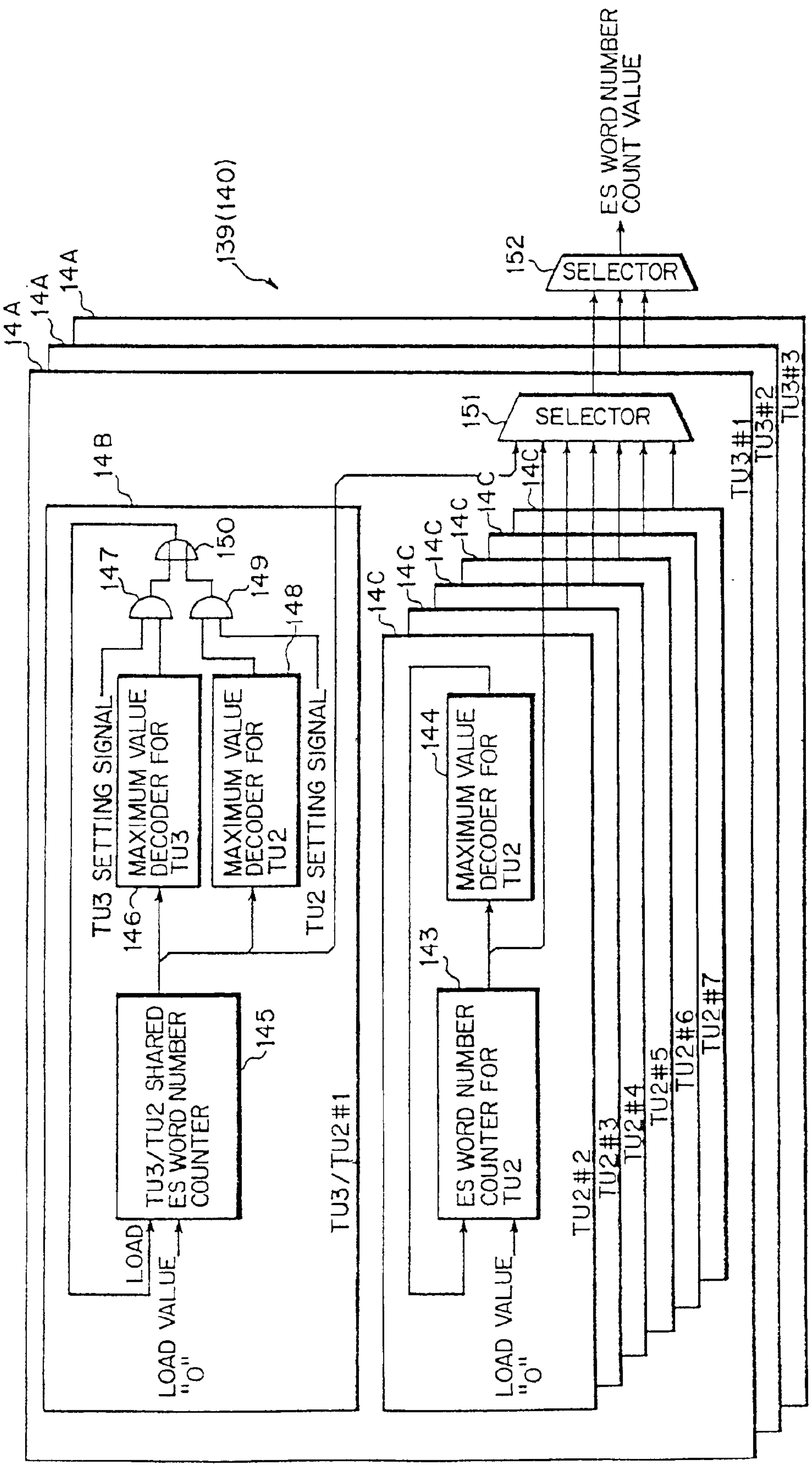
FIG. 34 is a block diagram showing a structure of a write (read) word number counter in the modification.

FIG. 34 is a block diagram showing the structure of the above write ward number counter 139 (or the read word number counter 140). The write word number counter 139 shown in FIG. 34 has three counting units for TU3 (for 3 channels: TU3#1 through TU3#3) 14A and a selecting circuit 152. Each of the counting units for TU3 14A has one TU3/TU2 shared counter unit (TU3/TU2#1) 14B, six counter units for TU2 (TU2#2 through TU2#7) 14C and a selecting circuit 151.

As shown in FIG. 34, in the counter unit 14A for TU3 for one channel, the TU3/TU2 shared counter unit 14B has a TU3/TU2 shared ES word number counter 145, a decoding circuit for TU3 146, a decoding circuit for TU2 148, AND gates 147 and 149, and an OR gate 150. Each of the counter units for TU2 14C has an ES word number counter for TU2 143 and a decoding circuit for TU2 144.

In each of the counter units for TU2 14C, the ES word number counter for TU2 143 counts the number of ES words of TU2, and the decoding circuit for TU2 144 decodes a maximum value of the number of the ES words of TU2. If the number of ES words of TU2 is 12, for example, the decoding circuit for TU2 144 decodes a count value “11” of the ES word number counter for TU2 143. The decoded signal is used as a load signal to load “0” into the ES word number counter for TU2 143, whereby the ES word, number counter for TU2 143 becomes a 12-ary counter for counting from “0” to “11”.

In the TU3/TU2 shared counter unit 14B, the decoding circuit for TU3 146 decodes a maximum value of the number of the ES words of TU3, the decoding circuit for TU2 148 decodes a maximum value of the number of the ES words of TU2, the AND gate 147 obtains a logical product of an output signal of the decoding circuit of TU3 146 and the above TU3 setting signal, the AND gate 149 obtains a logical product of an output signal of the decoding circuit for TU2 148 and the above TU2 setting signal, and the OR gate 150 obtains a logical sum of output signals of the AND gates 147 and 149 and outputs a result of the logical sum as a load signal for the TU3/TU2 shared ES word number counter 145.

The TU3/TU2 shared ES word number counter 145 counts the number of the ES words of TU3 or TU2. An ES word number counting operation for TU3 and an ES word, number counting operation for TU2 of the TU3/TU2 shared ES word number counter 145 is switched by switching an input timing of the load signal fed from the OR gate 150 according to the above TU3 setting signal and the TU2 setting signal.

If the number of the ES words of TU2 is 12 and the number of the ES words of TU3 is 18, for example, the decoding circuit for TU3 146 decodes a count value "17" of the counter 145, while the decoding circuit for TU2 148 decodes a count value "11" of the counter 145. Each of the decoded signals is used to obtain a logical product of that decoded signal and the TU3 setting signal or the TU2 setting signal at the corresponding AND gate 147 or 149. If the TU3 setting signal is "1" (the TU2 setting signal is "0" at that time), a signal obtained by decoding the count value "17" by the decoding circuit for TU3 146 becomes a load signal to load "0" into the counter 145. Whereby, the counter 145 becomes a counter for counting the ES word numbers "18" (from "0" to "17") of TU3 when being set to TU3.

If the TU2 setting signal is "1" (the TU3 setting signal is "0" at that time), a signal obtained by decoding the count value "11" by the decoding circuit for TU2 148 becomes a load signal to load "0" into the counter 145. Whereby, the counter 145 becomes a counter for counting the ES word numbers "11" (from "0" to "11") of TU2 when being set to TU2.

In order to switch the count number between an occasion of setting of TU3 mapping and an occasion of setting of TU2 mapping, the above write word number counter 139 has the decoding circuit for TU3 146 and the decoding circuit for TU2 148 which decode a count value for TU3 and a count value for TU2, respectively. The write word number counter 139 selects an output signal of the decoding circuit 146 or the decoding circuit 148 according to a signal size to employ the output signal as a load signal for the counter 145. In consequence, the write word number counter 139 for the RAM 141 (refer to FIG. 32) is used as a common counter upon TU3 mapping and TU2 mapping.

The selecting circuit 151 selects and outputs one count value among count values for 7 channels which are an output (a count value) of one TU3/TU2 shared counting unit 14B and outputs (count values) of six counter units for TU2. The selecting circuit 151 has a function to always select an output of the TU3/TU2 shared counting unit 14B when being set to TU3. The selecting circuit 152 selects and outputs one among outputs (count values) of the counting units for TU3 14A for 3 channels (the selecting circuits 151).

In the write word number counter 139 (or the read word number counter) with the above structure, if a signal size in the TU level mapped in the VC4 frame is TU3, the TU3 setting signal fed from the signal size recognizing unit 125A (refer to FIG. 30) becomes "1" so that the write word number counter 139 is set to TU3. Accordingly, the counter 145 in the TU3/TU2 shared counting unit 14B operates as a counter for counting the number of the ES words, and each of count values (for 3 channels for TU3#1–TU3#3) of the counters 145 is serially outputted as an ES word number count value through the selectors 151 and 152.

If a signal size in the TU level mapped in the VC4 frame is TU2, the TU2 setting signal fed from the signal size recognizing unit 125A becomes "1" so that the write word number counter 139 is set to TU2. For this, the counter 145 in the TU3/TU2 shared counting unit 14B and the counter 143 in each of the counting units for TU2 14C operate as counters for counting the number of the ES words of TU2, and count values (TU2#1 through TU2#7) for 7 channels of each of the ES word number counting units for TU3 14A (for 3×7=21 channels in total) are serially outputted as ES word number count values through the selectors 151 and 152.

The above pointer processing unit 12 (the pointer processing apparatus BB) has the decoding circuits 144, 146 and 148 for switching a maximum value of the counter 145 according to a signal size (TU3/TU2) in the TU level mapped in the multiplex data (the VC4 frame), thereby counting the number of the ES words by the common write word number counter 139 (or the read word number counter 140) even if different signal sizes, that is, TU3 and TU2, mixedly exist in the multiplex data.

Figure 54:
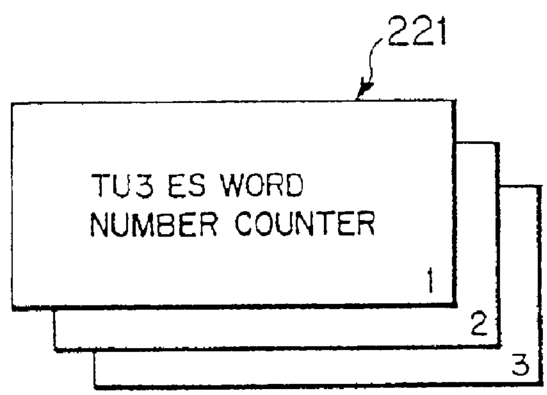
Figure 54:
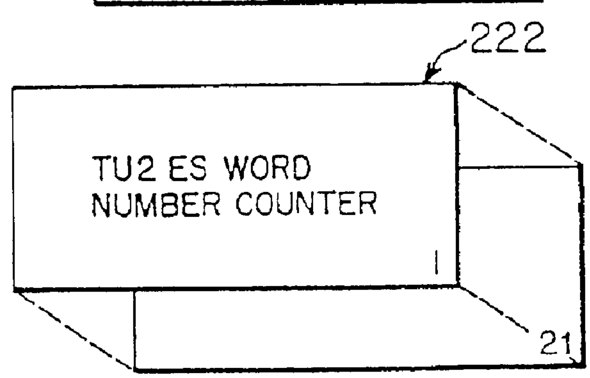
Figure 54:
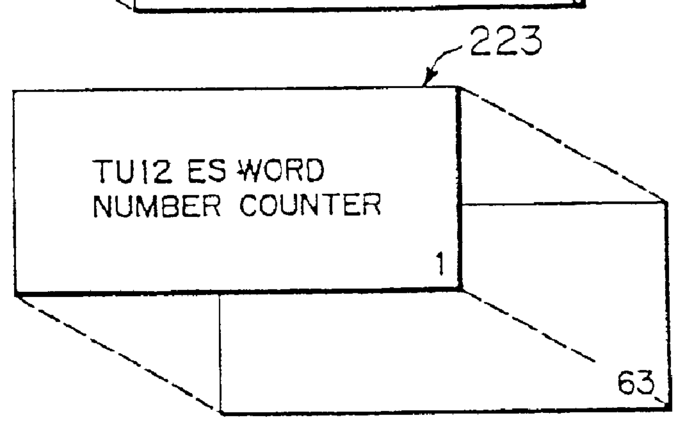

In consequence, it is unnecessary to provide ES word counters for TU3 221 for 3 channels as shown in FIG. 54(*a*) and ES word number counters for TU2 222 for 21 channels as shown in FIG. 54(*b*) so that an apparatus scale, a power consumption and the number of distributions of this pointer processing apparatus 8B can be largely decreased.

Figure 35:
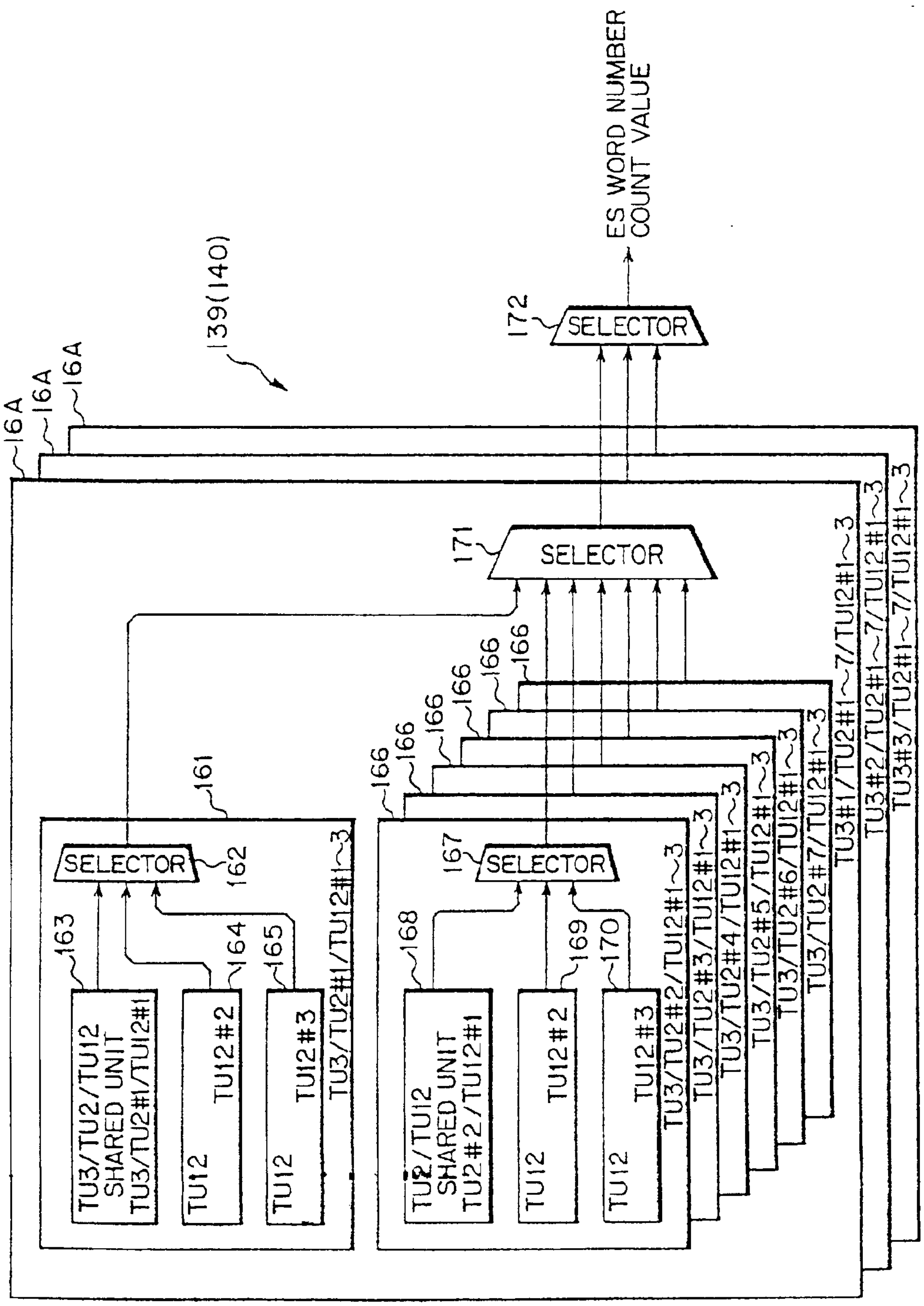
FIG. 35 is a block diagram showing another structure of the write (read) word number counter in the modification.

In order to cope with a case where signals in all TU levels (TU3/TU2/TU12) mixedly exist, the above write word number counter 139 (or the read word number counter 140) has, as shown in FIG. 35, for example, three counting units for TU3 16A (for 3 channels) and a selecting circuit 172. Each of the counting units for TU3 16A has one TU3/TU2/TU12 shared counting unit 161 (TU3/TU2#1), six TU2/TU12 shared counting units 166 (TU2#2 through TU2#7) and a selecting circuit 171.

As shown in FIG. 35, in the counting unit for TU3 16A for one channel, the TU3/TU2/TU12 shared counting unit 161 has a TU3/TU2/TU12 shared unit 163, ES word number counters for TU12 164 and 165, and a selecting circuit 162, whereas each of the TU2/TU12 shared counting units 166 has a TU2/TU12 shared unit 168, ES word number counters for TU12 169 and 170, and a selecting circuit 167.

In the TU3/TU2/TU12 shared counting unit 161, the TU3/TU2/TU12 shared unit 163 counts the number of the ES words of TU2 or TU12. An operation to count the number of the ES words of TU3/TU2/TU12 (a maximum value of the counter) of the TU3/TU2/TU12 shared unit 163 is switched according to the above TU3 setting signal, TU2 setting signal and TU12 setting signal.

Figure 36:
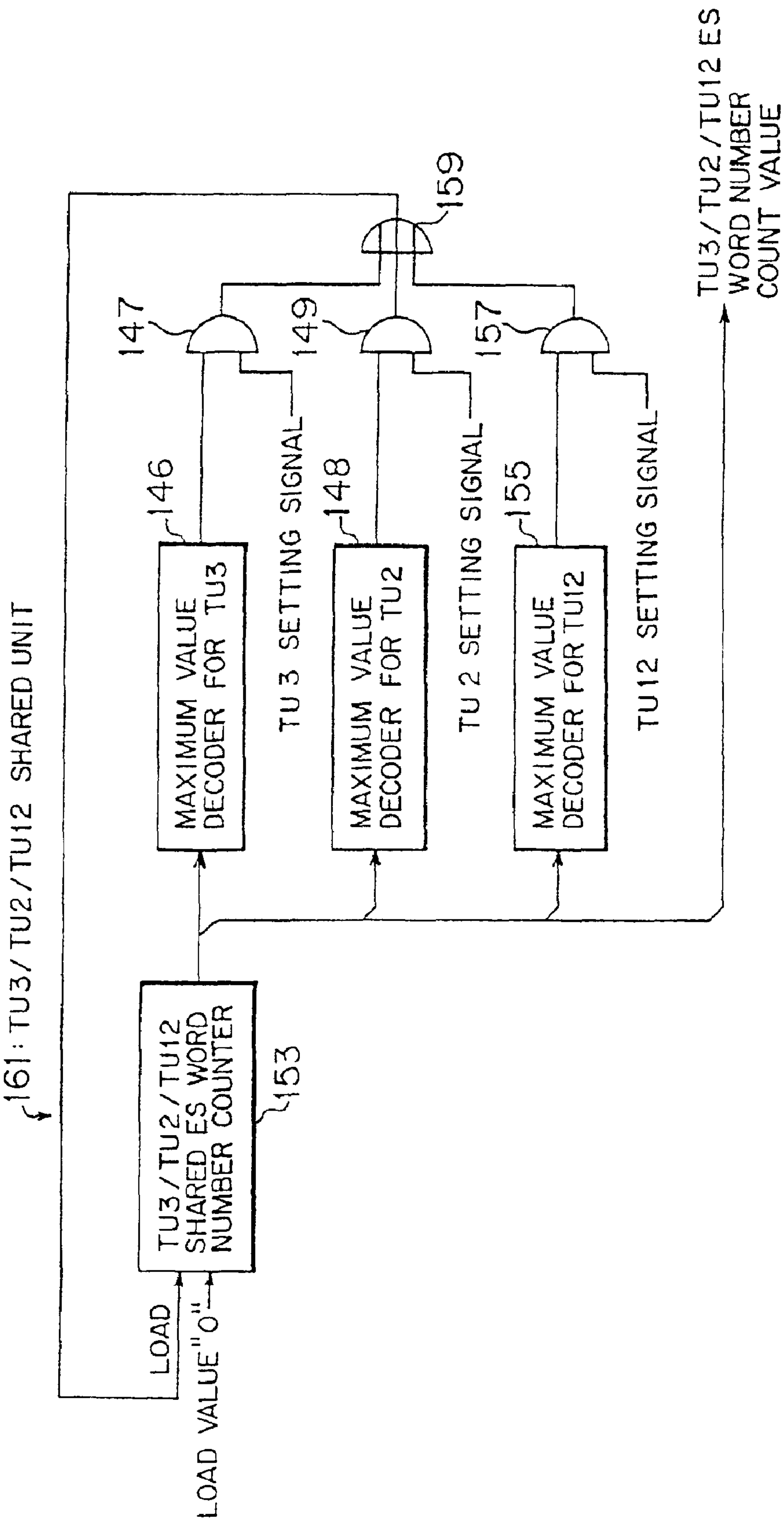
FIG. 36 is a block diagram showing a structure of a TU3/TU2/TU12 shared unit in the write (read) number counter in the modification.

In concrete, the TU3/TU2/TU12 shared unit 163 has, as shown in FIG. 36, for example, a TU3/TU2/TU12 shared ES word number counter 153, a decoding circuit for TU3 146, a decoding circuit for TU2 148, a decoding circuit for TU12 155, AND gates 147, 149 and 157, and an OR gate 159. In a principle similar to that of the counting unit 14B shown in FIG. 34, the TU3/TU2/TU12 shared unit 163 uses decoded signals obtained at the decoding circuits 146, 148 and 155 according to the TU3 setting signal, the TU2 setting signal and the TU12 setting signal, respectively, as load signals for the counter 153, thereby switching among a maximum value of a count value at the time of being set to TU3, a maximum value of a count value at the time of being set to TU2 and a maximum value of a count value at the time of being set to TU12.

Each of the ES word number counters for TU12 164 and 165 counts the number of the ES words of TU12. The selecting circuit 162 selects and outputs one among outputs of the TU3/TU2/TU12 shared unit 163, and the ES word number counters for TU12 164 and 165. The selecting circuit 162 has a function to always select an output of the TU3/TU2/TU12 shared unit 163 when being set to TU3 by the TU3 setting signal or TU2 by the TU2 setting signal.

In each of the TU2/TU12 shared counting units 166, the TU2/TU12 shared unit 168 counts the number of the ES words of TU2 or TU12, whose operation to count the number of the ES words of TU2 and operation to count the number of the ES words of TU12 are switched according to the above TU2 setting signal and the TU12 setting signal.

Figure 37:
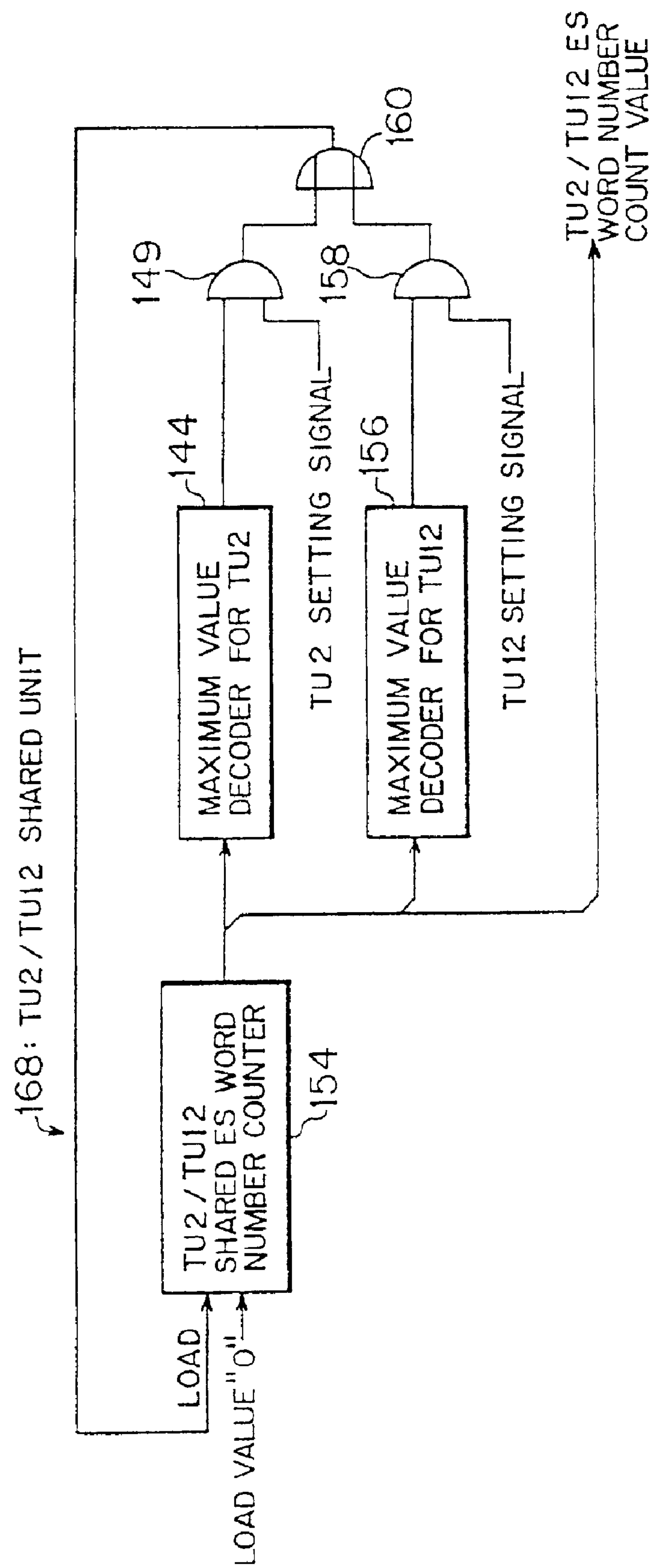
FIG. 37 is a block diagram showing a structure of a TU2/TU12 shared unit in the write (read) number counter in the modification.

To this end, the TU2/TU12 shared unit 168 has, as shown in FIG. 37, for example, a TU2/TU12 shared ES word number counter 154, a decoding circuit for TU2 144, a decoding circuit for TU12 156, AND gates 149 and 158, and an OR gate 160, in concrete. In this case, decoded signals obtained at the decoding circuits 144 and 156 according to the TU2 setting signal and the TU12 setting signal, respectively, are used as load signals for the counter 154, thereby switching a maximum value of a count value at the time of TU2 setting to/from a maximum value of a count value at the time of TU12 setting.

The ES word number counters for TU12 169 and 170 each counts the number of the ES words of TU12, which are similar to the above counters 164 and 165, respective. The selecting circuit 167 selects and outputs one among outputs of the TU2/TU12 shared unit 168 and the ES word number counters for TU12 169 and 170. The selecting circuit 167 has a function to always select an output of the TU2/TU12 shared unit 168 when being set to TU2 by the TU2 setting signal.

Namely, the write word number counter 139 (or the read word number counter 140) shown in FIG. 35 has a structure in which a controlling system for counting the number of the ES words at the time of TU12 setting is further provided to each of the ES word number counter for TU2 143 and the TU3/TU2 shared ES word number counter 145 shown in FIG. 34. If the number of the ES words at the time of TU12 setting is 10, for example, a count value "9" is decoded in each of the decoding circuits for TU12 155 and 156 (refer to FIGS. 36 and 37) when TU12 is set, and the decoded signals become load signals for the respective counters 153 and 154, whereby each of the counters 153 and 154 becomes a counter for counting the number of the ES words "10" (from "0" to "9") of TU12.

The above selecting circuit 171 selects and outputs one among outputs (count values) of the above counters 161 and 166. The selecting circuit 171 has a function to always select an output of the counting unit 161 when being set to TU3 by the TU3 setting signal. The selecting circuit 172 selects and outputs one among outputs of the counting units for TU3 16A for 3 channels.

In the write word number counter 139 (or the read word number counter 140) with the above structure shown in FIG. 35, when a signal size in the TU level mapped in the VC4 frame is TU3, the TU3 setting signal fed from the signal size recognizing unit 125A (refer to FIG. 30) becomes "1" to set the write stage number counter 139 to TU3 so that the counter 153 of the TU3/TU2/TU12 shared unit 163 operates as a counter for counting the number of the ES words of TU3.

Since the selecting circuits 162 and 171 are set to TU3 at that time, an output of the TU3/TU2/TU12 share unit 163 and an output of the counting unit 161 are always selected, and the count value is serially outputted as a count value of the number of the ES words of TU3 through the selecting circuit 172.

When a signal size in the TU level mapped in the VC4 frame is TU2, the write word number counter 139 is set to TU2 by the TU2 setting signal so that the counter 153 in the TU3/TU2/TU12 shared unit 163 and the counter 154 in the TU2/TU12 shared unit 168 in each of the counting units 166 operate counters for counting the number of the ES words of TU2.

Since the selecting circuits 162 and 167 are set to TU2 at that time, an output of the TU3/TU2/TU12 shared unit 163 and an output of the TU2/TU12 shared unit 168 of each of the counting units 166 are always selected, and the count value is serially outputted as an ES word count value of TU2 through the selector 172.

If a signal size in the TU level mapped in the VC4 frame is TU12, the write word number counter 139 is set to TU12 by the TU12 setting signal so that the counter 153 of the TU3/TU2/TU12 shared unit 163 and the counter 154 of the TU2/TU12 shared unit 168 in each of the counting units 166 operate as counters for counting the number of the ES words of TU12.

The selecting circuit 162 (167) then successively selects an output of the TU3/TU2/TU12 shared unit 168 (the TU2/TU12 shared unit 168) and an output of each of the counters 164 and 165 (168 and 169), whereby an ES word number count value of TU12 is serially outputted through the selecting circuits 171 and 172.

The above pointer processing unit 12 (the pointer processing apparatus 8B) has the decoding circuit for TU3 146, the decoding circuit for TU2 148 and the decoding circuit for TU12 156 for decoding a count value for TU3, a count value for TU2 and a count value for TU12, respectively, and selects an output signal of the decoding circuits 146, 148 or 156 according to a signal size to employ the selected signal as a load signal for the counter 153 so that the write word number counter 139 (or the read word number counter 140) is used as a common counter in the event of TU3/TU2/TU12 mapping. In consequence, the pointer processing unit 12 is operable with counters totaling 63 [=(3+3×6)×3} for all combinations of mixture of signals in the TU level $((1+2^7)\times(1+2^7)\times(1+2^7))$.

It is therefore unnecessary to provide, for example, ES word number counters for TU3 221 for 3 channels as shown in FIG. 54(*a*), ES word number counters for TU2 222 for 21 channels as shown in FIG. 54(*b*) and ES word number counter for TU12 223 for 63 channels as shown in FIG. 54(*c*), which can largely decrease an apparatus scale, a power consumption and the number of distributions of this-pointer processing apparatus 8B.

Figure 38:
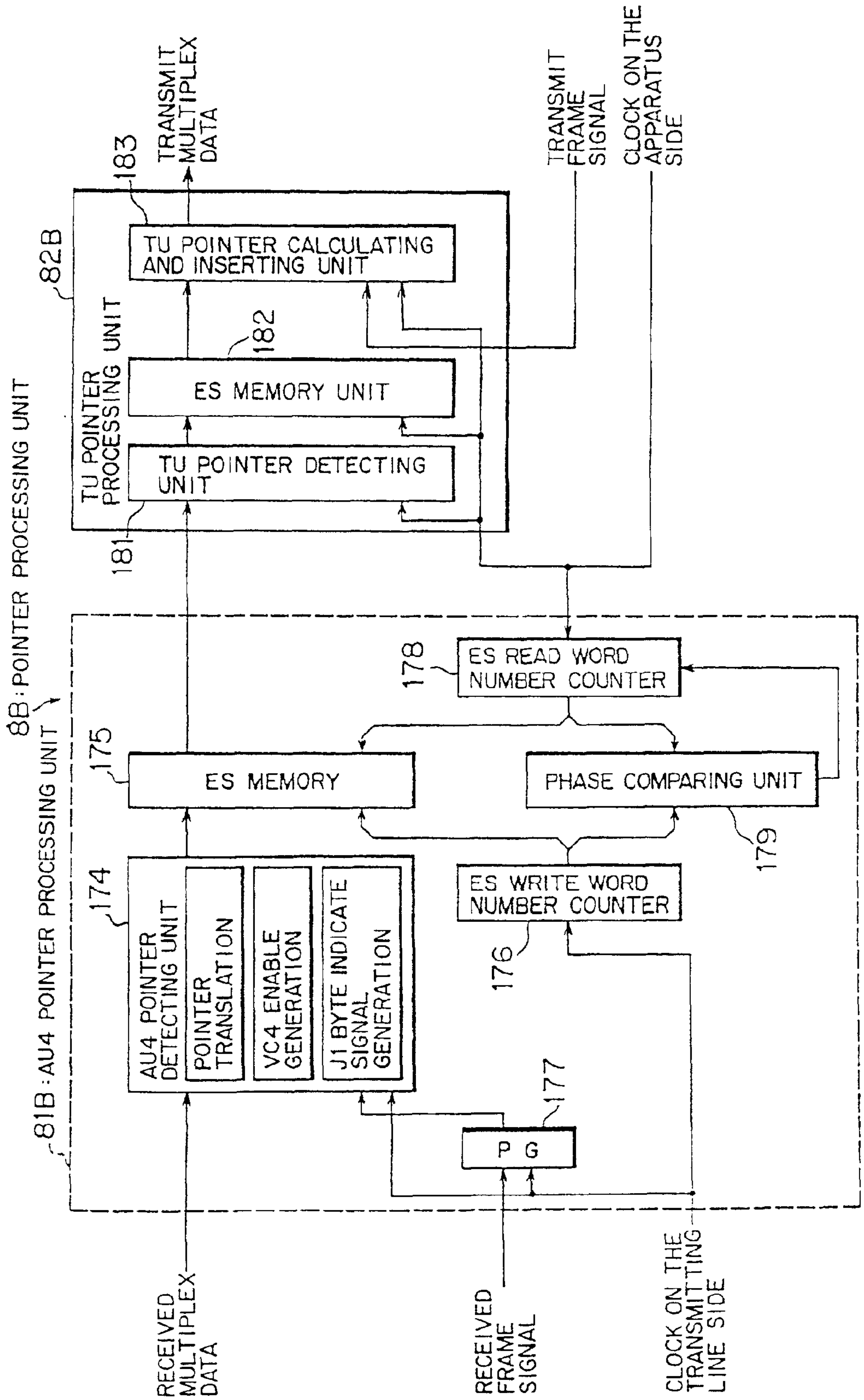
FIG. 38 is a block diagram showing a structure of the pointer processing unit, paying an attention to an AU4 pointer processing unit according to the embodiment.

(b-3) Description of the AU pointer processing unit FIG. 38 is a block diagram showing the structure of the pointer processing apparatus 8B, paying an attention to the AU pointer processing unit 81B shown in FIG. 3. As shown in FIG. 38, the AU pointer processing unit 81B has an AU4 pointer detecting unit 174, an ES memory unit 175, an ES write word number counter 176, a pulse generator (PG) 177, an ES read word number counter 178 and a phase comparing unit 179.

The above AU4 pointer detecting unit 174 detects an AU4 pointer from the received multiplex data in the SDH transmission system according to a timing signal generated by the pulse generator 177 on the basis of a received frame signal and a clock on the transmission line's side so as to conduct a process to translate the AU4 pointer, a process to generate a VC4 enable signal, a process to generate a J1 byte indicate signal indicating a position of an SPE leading byte (J1 byte in POH) of VC4, etc. according to a clock on the transmissionline's side.

The ES memory unit 175 is a storage used to transfer clocks. The received multiplex data (including the VC4 enable signal, the J1 byte indicate signal) fed from the TU4 pointer detecting unit 174 is written in the ES memory unit 175 with a clock on the transmission line's side, and read out from the ES memory unit 175 with a clock on the apparatus's side, whereby the received multiplex data transfers the clock.

The ES write word number counter 176 operates with a clock on the transmission line's side, thereby controlling writing of the received multiplexed data in the ES memory unit 175 with a clock on the transmission line's side. The ES read word number counter 178 operates according to a clock on the apparatus's side, thereby controlling reading the received multiplex data written in the ES memory unit 175 with a clock on the apparatus's side.

The phase comparating unit 179 compares a count value of the ES write word number counter 176 with a count value of the ES read word number counter 178 to detect a phase difference therebetween, and controls a reading operation by the ES read word number counter 178 on the basis of the phase difference, thereby conducting a stuff control (a phase adjusting control) on the received multiplex data.

In the AU pointer processing unit 81B with the above structure, the AU4 pointer detecting unit 174 translates the AU4 pointer, generates the VC4 enable signal and generates the J1 byte indicate signal, then writes data in the VC4 region in the ES memory unit 175. The ES write word number counter 176 operates with a clock on the transmission line's side so that the data is written in the ES memory unit 175 with a clock on the transmission line's side.

On the other hand, the data is read out from the ES memory unit 175 with a clock on the apparatus's side since the ES read word number counter 178 operates with a clock on the apparatus's side. At that time, the phase comparing unit 179 compares a phase of a clock on the apparatus's side (a count value of the counter 178) with a phase of a clock on the transmission line's side (a count value of the counter 176), and gives a result of the comparison (a phase difference) to the ES read word number counter 178, thereby conducting the stuff control and the clock transfer.

The data after the clock transferring process is given to the TU pointer processing unit 180, at which a TU pointer process to change the TU pointer as will be described later is conducted using a clock on the apparatus's side.

In the above AU4 pointer processing unit 81B, a phase difference is detected from count values of the ES write word number counter 176 and the ES read word number counter 178 to conduct the stuff control, whereby the data clock transfers from a clock on the transmission line's side to a clock on the apparatus's side in the ES memory unit 175. If the number of words of the ES memory is determined considering effects of jitter, wander and the like of the clock, it is only necessary to consider one channel of the AU4 pointer.

As having been described with reference FIG. 67, in order to absorb effects of jitter and wander of the clock, a necessary number of words of the ES memory is equal to the number of all-channels if the clock is When a signal size in the TU level mapped in the VC4 frame is TU2, the write word number counter 139 is set to TU2 by the TU2 setting signal so that the counter 153 in the TU3/TU2/TU12 shared unit 163 and the counter 154 in the TU2/TU12 shared unit 168 in each of the counting units 166 operate counters for counting the number of the ES words of TU2.

Since the selecting circuits 162 and 167 are set to TU2 at that time, an output of the TU3/TU2/TU12 shared unit 163 and an output of the TU2/TU12 shared unit 168 of each of the counting units 166 are always selected, and the count value is serially outputted as an ES word count value of TU2 through the selector 172.

If a signal size in the TU level mapped in the VC4 frame is TU12, the write word number counter 139 is set to TU12 by the TU12 setting signal so that the counter 153 of the TU3/TU2/TU12 shared unit 163 and the counter 154 of the TU2/TU12 shared unit 168 in each of the counting units 166 operate as counters for counting the number of the ES words of TU12.

The selecting circuit 162 (167) then successively selects an output of the TU3/TU2/TU12 shared unit 168 (the TU2/TU12 shared unit 168) and an output of each of the counters 164 and 165 (168 and 169), whereby an ES word number count value of TU12 is serially outputted through the selecting circuits 171 and 172.

The above pointer processing unit 12 (the pointer processing apparatus 8B) has the decoding circuit for TU3 146, the decoding circuit for TU2 148 and the decoding circuit for TU12 156 for decoding a count value for TU3, a count value for TU2 and a count value for TU12, respectively, and selects an output signal of the decoding circuits 146, 148 or 156 according to a signal size to employ the selected signal as a load signal for the counter 153 so that the write word number counter 139 (or the read word number counter 140) is used as a common counter in the event of TU3/TU2/TU12 mapping. In consequence, the pointer processing unit 12 is operable with counters totaling 63 $[=(3+3\times6)\times3\}$ for all combinations of mixture of signals in the TU level $((1+2^7)\times(1+2^7)\times(1+2^7))$.

It is therefore unnecessary to provide, for example, ES word number counters for TU3 221 for 3 channels as shown in FIG. 54(*a*), ES word number counters for TU2 222 for 21 channels as shown in FIG. 54(*b*) and ES word number counter for TU12 223 for 63 channels as shown in FIG. 54(*c*), which can largely decrease an apparatus scale, a power consumption and the number of distributions of this pointer processing apparatus 8B.

(b-3) Description of the AU Pointer Processing Unit

FIG. 38 is a block diagram showing the structure of the pointer processing apparatus 8B, paying an attention to the AU pointer processing unit 81B shown in FIG. 3. As shown in FIG. 38, the AU pointer processing unit 81B has an AU4 pointer detecting unit 174, an ES memory unit 175, an ES write word number counter 176, a pulse generator (PG) 177, an ES read word number counter 178 and a phase comparing unit 179.

The above AU4 pointer detecting unit 174 detects an AU4 pointer from the received multiplex data in the SDH transmission system according to a timing signal generated by the pulse generator 177 on the basis of a received frame signal and a clock on the transmission line's side so as to conduct a process to translate the AU4 pointer, a process to generate a VC4 enable signal, a process to generate a J1 byte indicate signal indicating a position of an SPE leading byte (J1 byte in POH) of VC4, etc. according to a clock on the transmissionline's side.

The ES memory unit 175 is a storage used to transfer clocks. The received multiplex data (including the VC4 enable signal, the J1 byte indicate signal) fed from the TU4 pointer detecting unit 174 is written in the ES memory unit 175 with a clock on the transmission line's side, and read out from the ES memory unit 175 with a clock on the apparatus's side, whereby the received multiplex data transfers the clock.

The ES write word number counter 176 operates with a clock on the transmission line's side, thereby controlling writing of the received multiplexed data in the ES memory unit 175 with a clock on the transmission line's side. The ES read word number counter 178 operates according to a clock on the apparatus's side, thereby controlling reading the received multiplex data written in the ES memory unit 175 with a clock on the apparatus's side.

The phase comparating unit 179 compares a count value of the ES write word number counter 176 with a count value of the ES read word number counter 178 to detect a phase difference therebetween, and controls a reading operation by the ES read word number counter 178 on the basis of the phase difference, thereby conducting a stuff control (a phase adjusting control) on the received multiplex data.

In the AU pointer processing unit 81B with the above structure, the AU4 pointer detecting unit 174 translates the AU4 pointer, generates the VC4 enable signal and generates the J1 byte indicate signal, then writes data in the VC4 region in the ES memory unit 175. The ES write word number counter 176 operates with a clock on the transmission line's side so that the data is written in the ES memory unit 175 with a clock on the transmission line's side.

On the other hand, the data is read out from the ES memory unit 175 with a clock on the apparatus's side since the ES read word number counter 178 operates with a clock on the apparatus's side. At that time, the phase comparing unit 179 compares a phase of a clock on the apparatus's side (a count value of the counter 178) with a phase of a clock on the transmission line's side (a count value of the counter 176), and gives a result of the comparison (a phase difference) to the ES read word number counter 178, thereby conducting the stuff control and the clock transfer.

The data after the clock transferring process is given to the TU pointer processing unit 180, at which a TU pointer process to change the TU pointer as will be described later is conducted using a clock on the apparatus's side.

In the above AU4 pointer processing unit 81B, a phase difference is detected from count values of the ES write word number counter 176 and the ES read word number counter 178 to conduct the stuff control, whereby the data clock transfers from a clock on the transmission line's side to a clock on the apparatus's side in the ES memory unit 175. If the number of words of the ES memory is determined considering effects of jitter, wander and the like of the clock, it is only necessary to consider one channel of the AU4 pointer.

As having been described with reference FIG. 67, in order to absorb effects of jitter and wander of the clock, a necessary number of words of the ES memory is equal to the number of all channels if the clock is transferred in the TU pointer processing unit 245'. To the contrary, this embodiment can largely decrease an apparatus scale and a power consumption of this pointer processing apparatus 8B.

In FIG. 38, the TU pointer processing unit 82B, whose structure is simplified for each function, has a TU pointer detecting unit 181 for detecting (extracting) the TU pointer (H1/V1 byte, H2/V2 byte, H3/V3 byte), an ES memory unit 182 for changing the pointer, and a TU pointer calculating and inserting unit 183 for calculating and inserting (a stuff control process) the TU pointer. Incidentally, the data is written in and read out from the ES memory unit 182 with a clock on the apparatus 's side.

Figure 39:
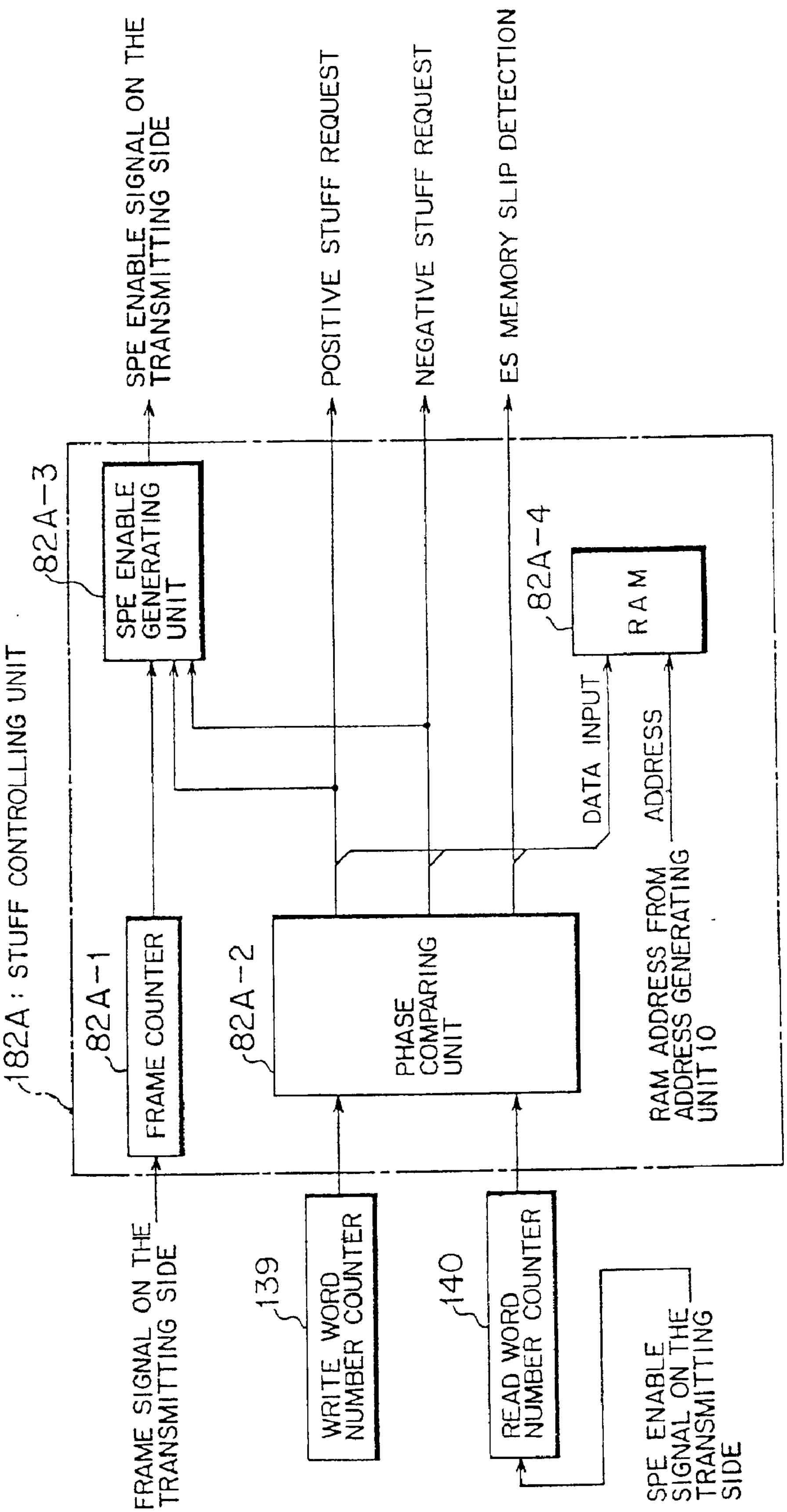
FIG. 39 is a block diagram showing a structure of an ES memory unit in the TU pointer processing unit according to the embodiment.

As shown in FIG. 39, for example, the above ES memory unit 182 has, as a stuff controlling unit 182A having a function similar to the stuff controlling function of the above AU pointer processing unit 81B, a frame counter 82A-1, a phase comparing unit 82A-2, an SPE enable signal generating unit 82A-3 and a RAM 82A-4, in which a phase of a count value on the writing side generated by the write word number counter 139 described before with reference to FIGS. 32 through 37 with a phase of a count value of the reading side generated by the read word number counter 140 is compared by the phase comparing unit 82A-2, whereby a stuff control signal (a negative/positive stuff request signal) is generated according to a phase difference between the count values.

In concrete, the above phase comparing unit 82A-2 subtracts a count value on the reading side from a count value on the writing side. If a result of the subtraction is negative, the phase comparing unit 82A-2 generates a positive stuff request signal. If a result of the subtraction is positive, the phase comparing unit 82A-2 generates a negative stuff request signal. Whereby, a phase of the multiplex data is adjusted in a transmit pointer value holding and updating process as will be described later.

The positive stuff request signal and the negative stuff request signal generated as above are successively written in a region of the RAM 82A-4 indicated by a RAM address (a channel address) generated by the address generating unit 10 (refer to FIG. 4), besides being used as a signal to generate a transmitting-side enable signal in the SPE enable signal generating unit 82A-3. The SPE enable signal generating unit 82A-3 generates a transmitting-side SPE enable signal on the basis of the above positive/negative stuff request signal and an output of the frame counter 82A-1 operated by the transmitting-side frame signal.

The write word number counter 139 and the read word number counter 140 mentioned above are so configured as to be able to cope with a case where different signal sizes mixedly exist as described before with reference to FIGS. 32 through 37. However, if different signal sizes do not mixedly exist, that is, if a signal size of a TU frame to be processed is known in advance, it is sufficient to use a counter for counting the number of words corresponding to the signal size.

Figure 40:
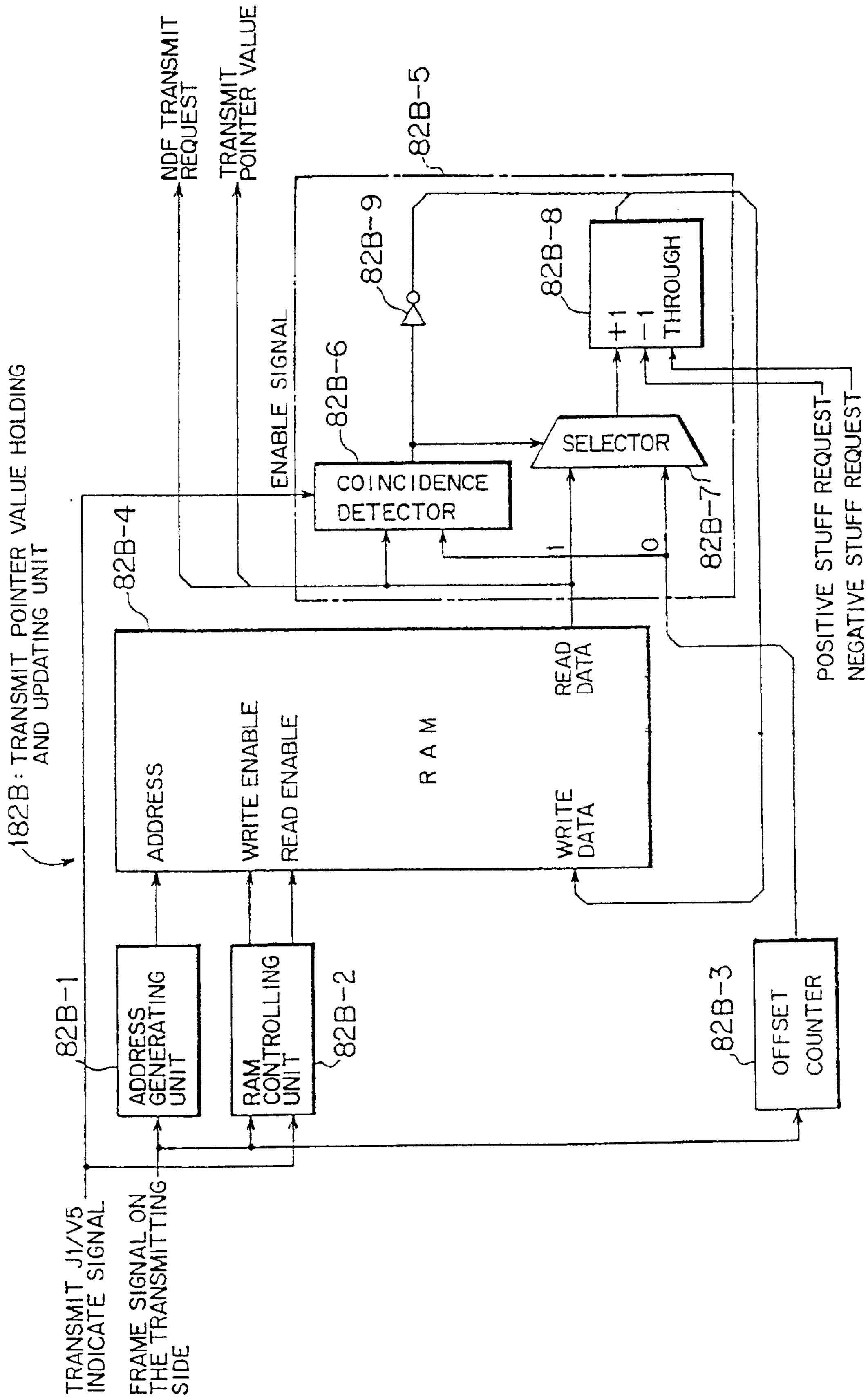
FIG. 40 is a block diagram showing a structure of a TU pointer calculating and inserting unit in the TU pointer processing unit according to the embodiment.
Figure 41:
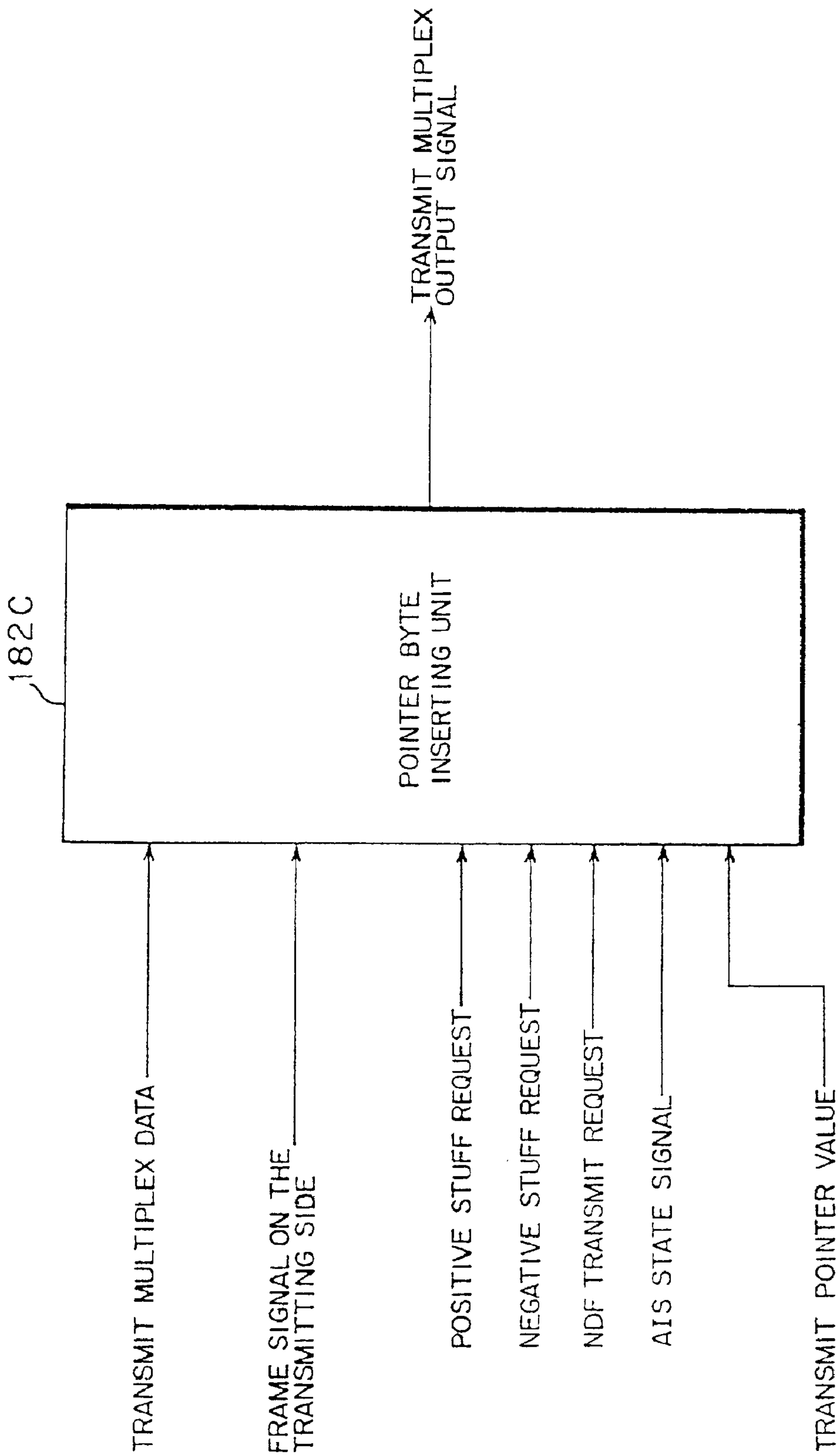
FIG. 41 is a block diagram showing the structure of the TU pointer calculating and inserting unit in the TU pointer processing unit according to the embodiment.

The above TU pointer calculating and inserting unit 183 has a transmit pointer value holding/updating unit 182B configured as shown in FIG. 40 and a pointer byte inserting unit 182C as shown in FIG. 41, as a function to calculate and insert the TU pointer.

The above transmit pointer value holding/updating unit 182B has, as shown in FIG. 40, an address generating unit 82B-1, a RAM controlling unit 82B-2, a pointer value calculating offset counter 82B-3, a RAM for holding a transmit pointer value 82B-4 and a transmit pointer value update controlling unit 82B-5. Further, the transmit pointer value update controlling unit 82B-5 has a coincidence detecting unit 82B-6, a selector 82B-7, an adder-subtractor 82B-8 and an inverting gate 82B-9. Incidentally, the address generating unit 82B-1 and the RAM controlling unit 82B-2 have functions similar to those of the address generating unit 10 and the RAM controlling unit 13 shown in FIG. 4, respectively.

In the transmit pointer value holding/updating unit 182B, a transmit pointer value that should be inserted into transmit multiplex data is successively written by the RAM controlling unit 82B in a region of the RAM 82B-4 indicated by a channel address generated by the address generating unit 82B-1, after that, read out as a transmit pointer value for the pointer byte inserting unit 182C shown in FIG. 41. Upon the reading, the transmit pointer value update controlling unit 82B-5 updates the transmit pointer value (the stuff control) according to the positive/negative stuff request signal fed from the stuff controlling unit 182A described before with reference to FIG. 39.

In concrete, in the transmit pointer value update controlling unit 82B-5, the coincidence detecting unit 82B-6 detects coincidence between a transmit pointer value (read data) read out from the RAM 82B-4 and a count value of the offset counter 82B-3 according to the transmit J1/V5 indicate signal read out from the RAM 141 shown in FIG. 31. If they are in coincidence, the selecting circuit 82B-7 is switched to the RAM 82B-4 to select read data (a transmit pointer value) fed from the RAM 82B-4.

If they are not in coincidence, the selecting circuit 82B-7 is switched to the offset counter 82B-3 to select an offset count value as a transmit pointer value. A result of the detection in the coincidence detecting unit 82B-6 is inverted by the inverting gate 82B-9 to be the NDF detection signal, held in the RAM 82B-4 with the transmit pointer value, then outputted as a NDF transmit request signal to the pointer-byte inserting unit 182C shown in FIG. 41 when being read.

The transmit pointer value selected by the selecting circuit 82B-7 is added "+1" thereto by the adder-subtractor 82B-8 when the positive stuff request signal is received, while being added "–1" thereto by the adder-subtractor 82B-8 when the negative stuff request signal is received, and written as a new transmit pointer value in the RAM 82B-4. If neither the positive nor the negative stuff request signal is received, the adder-subtractor 82B-8 passes an output of the selecting circuit 82B-7 therethrough, not updating the transmit pointer value.

Figure 64:
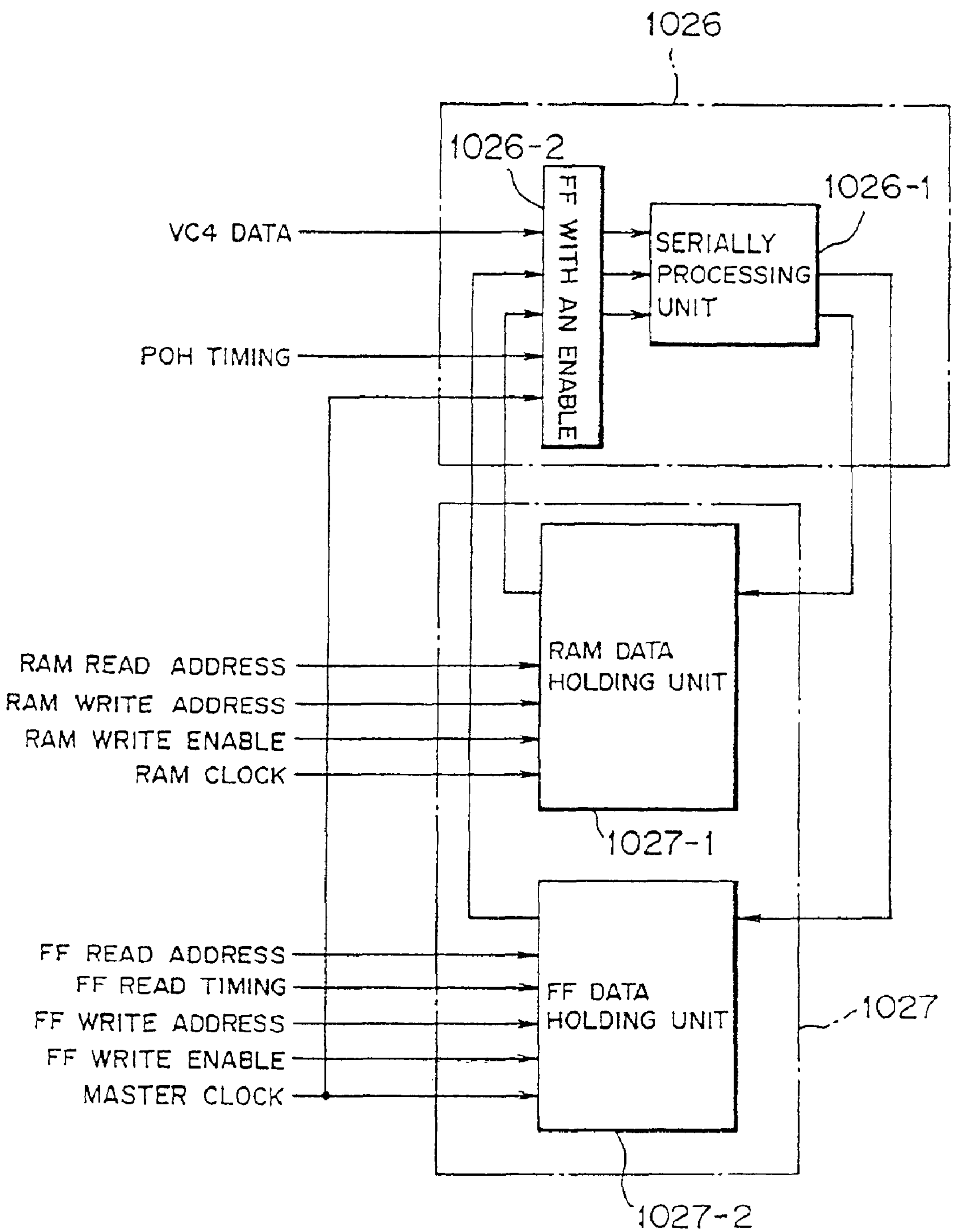

After that, the above transmit pointer value is inserted into the transmit multiplex data read out from the RAM 141 shown in FIG. 32 according to a transmitting-side frame signal on the basis of the positive/negative stuff request signal (refer to FIG. 39) fed from the stuff controlling unit 182A, the NDF transmit request signal (refer to FIG. 40) fed from the transmit pointer updating/holding unit 182B, the AIS state signal (refer to FIG. 22) fed from the alarm state transition protecting-unit 81A, etc., and outputted as a transmit multiplex output signal. Incidentally, the pointer-byte inserting unit 182C conducts the following processes (1) through (5):

(1) when receiving the positive stuff request signal, inverting all I bits (refer to FIG. 64) of the transmit pointer value, inserting the H1/V1 byte and the H2/V2 byte and inserting dummy data into a positive stuff byte region;

(2) when receiving the negative stuff request signal, inverting all D bits (refer to FIG. 64) of the transmit pointer value, inserting the H1/V1 byte and the H2/V2 byte and inserting the SPE signal into a negative stuff byte region (that is, the H3/V3 byte);

(3) when receiving the NDF transmit request signal, inserting the NDF enable indication into the N bits (refer to FIG. 64);

(4) when receiving the AIS state signal (when the AIS state signal is "1"), setting all transmit pointer bytes to 11;

(5) inserting NDF disable indication into the N bits except for the above cases (1) through (4).

(b-3') Description of a Modification of the AU4 Pointer Processing Unit

Figure 42:
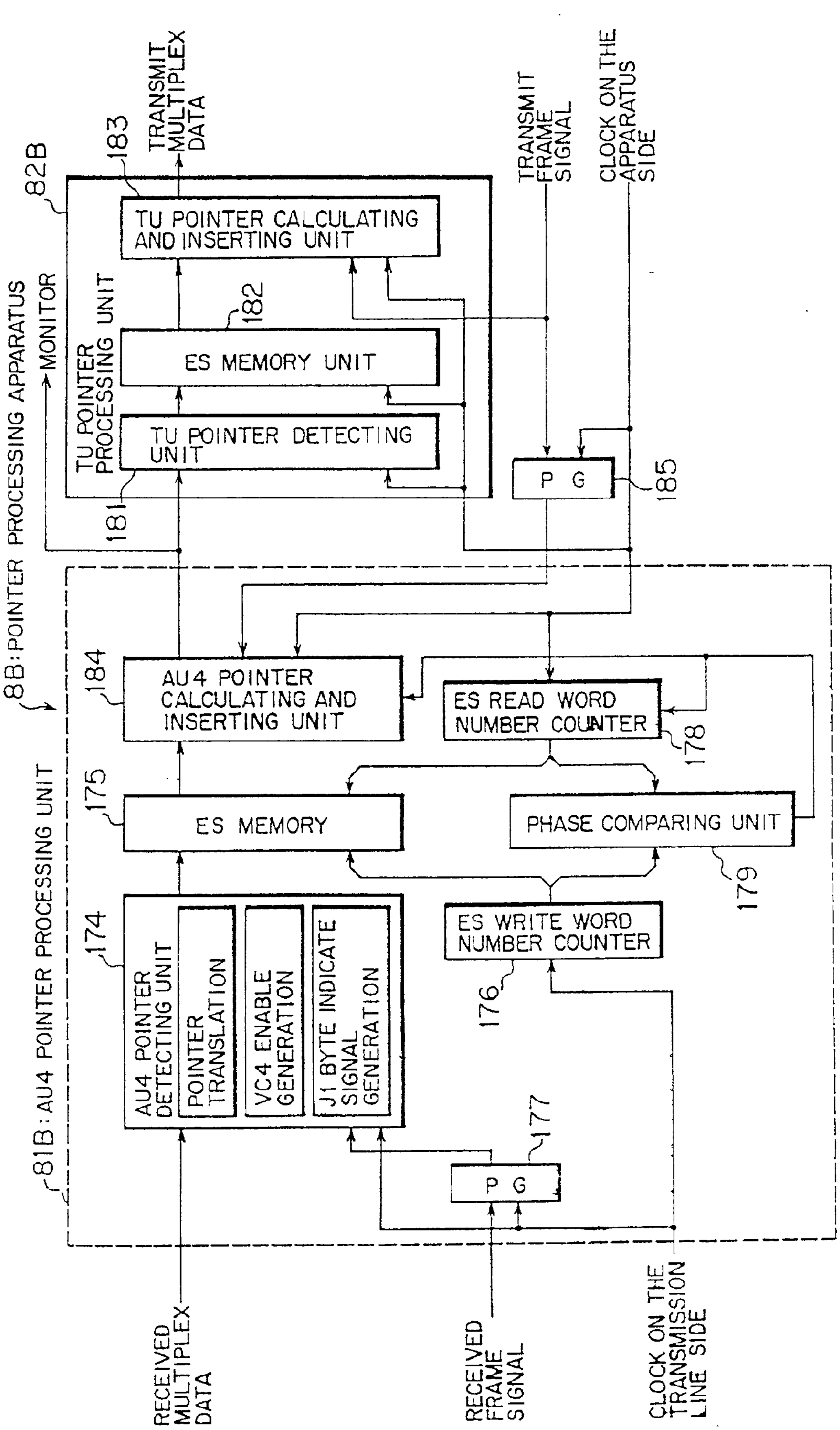
FIG. 42 is a block diagram showing a modification of the pointer processing apparatus, paying an attention to the AU4 pointer processing unit according to the embodiment.

FIG. 42 is a block diagram showing a modification of the above AU4 pointer processing unit BIB. The AU4 pointer processing unit 81B shown in FIG. 42 has an AU4 pointer-calculating/inserting unit 184 for calculating and inserting an AU4 pointer based on a transmit frame signal, in addition to the structure shown in FIG. 38. In FIG. 42, reference numeral 185 denotes a pulse generator (PG) for generating a transmit STM-1 frame on the basis of the transmit frame signal and a clock on the apparatus's side.

In the above AU4 pointer processing unit 81B with the above structure, the ES memory unit 175 conducts the stuff controlling process and the clock transferring process as described before with reference to FIG. 38. Besides, VC4 data is read out from the ES memory unit 175 according to the transmit STM-1 frame generated by the pulse generator 185, the AU4 pointer calculating/inserting unit 184 calculates an AU4 pointer and inserts it into the VC4 data, after that, gives the data into which the AU4 pointer has been inserted to the TU pointer processing unit 82B.

A state of the process in the ES memory unit 175 (a state of whether a stuff pulse is inserted or not, for instance) can be readily verified by monitoring the AU pointer value from the data in which the AU4 pointer has been changed. If any problem occurs in the pointer process, for example, it is therefore possible to quickly specify whether the problem is on the AU pointer processing side or on the TU pointer processing side so as to cope with the problem.

In the pointer processing apparatus 243 described before with reference to FIG. 160, it is difficult to verify a state of the stuff control or the like even if monitoring output data of the AU pointer processing unit 244' since the AU4 pointer is terminated in the AU4 pointer processing unit 244'.

Figure 43:
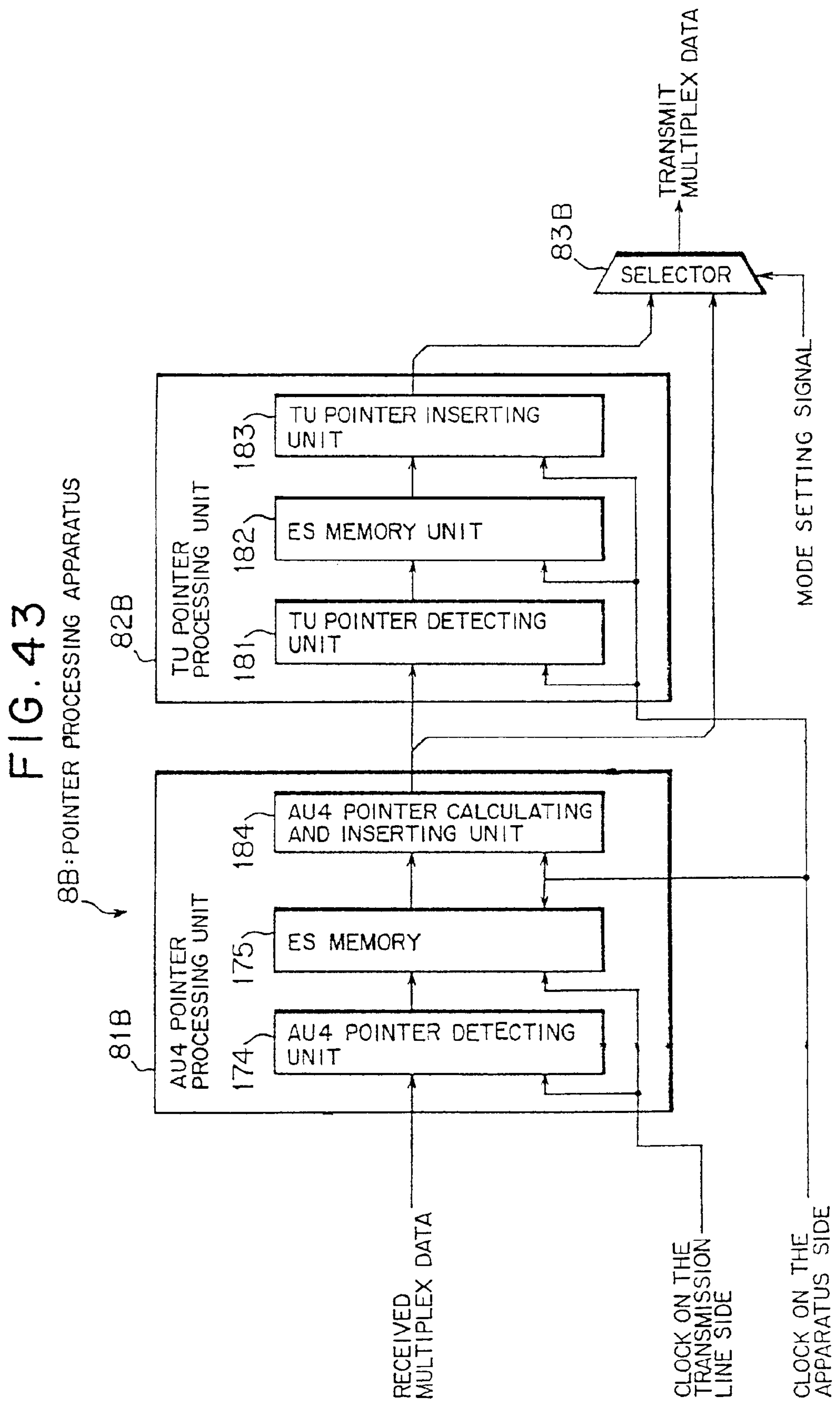
FIG. 43 is a block diagram showing a modification of the pointer processing apparatus, paying an attention to the AU4 pointer processing unit according to the embodiment.
Figure 44:
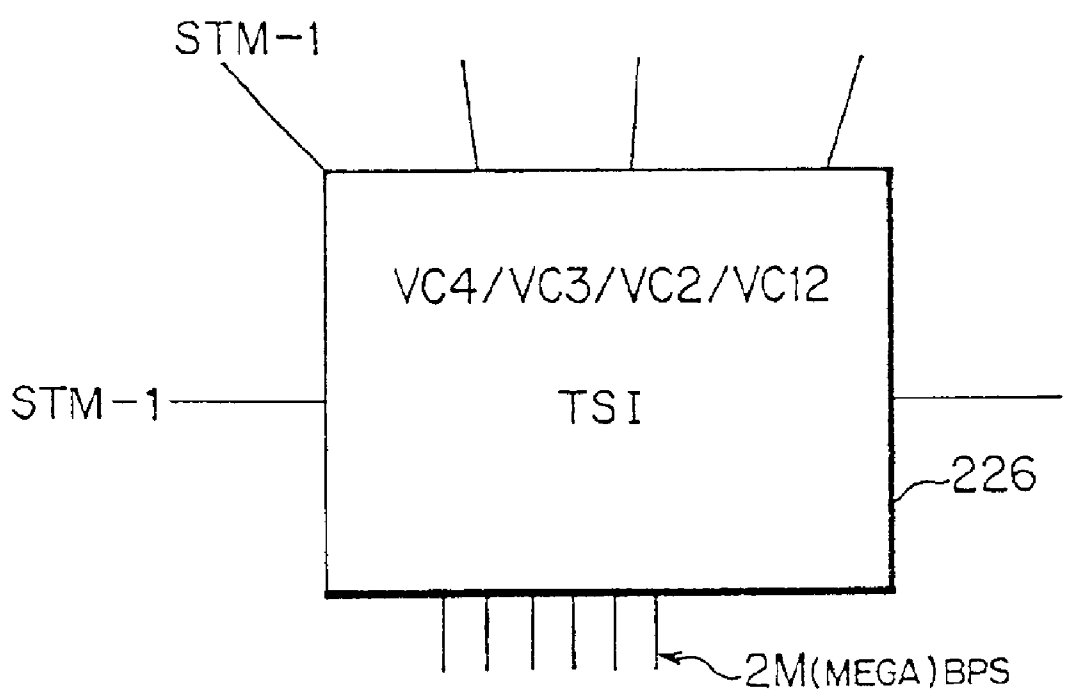
FIG. 44 is a block diagram schematically showing an example of a cross-connecting apparatus according to the embodiment.

According to this embodiment, the pointer processing apparatus 8B having the above AU4 pointer calculating/inserting unit 8B shown in FIG. 3 is provided with a selecting circuit 83B for selecting and outputting an output of the AU4 pointer processing unit 81B', or an output of the pointer processing unit 82B according to a mode setting signal supplied from the outside as shown in FIG. 43. In FIG. 43, there are omitted the pulse generators 177 and 185, the ES write word number counter 176, the ES read word number counter 178 and the phase comparing unit 179 shown in FIG. 42.

In the pointer processing apparatus 8B shown in FIG. 43, data in which the AU4 pointer has been changed by the AU4 pointer processing unit 81B' or data in which the TU pointer has been changed by the TU pointer processing unit 82B is selectively outputted from the selecting circuit 83B according to the mode setting signal.

If a unit of the cross-connecting is VC4, data in which the AU4 pointer has been changed is selected by the mode setting signal and outputted. If a unit of the cross-connecting is VC3/VC2/VC12, data in which the TU pointer has been changed is selected and outputted.

In the cross-connecting apparatus 8D (refer to FIG. 3) placed in a rear stage of this pointer processing apparatus BB, a cross-connecting unit (hardware) 226 can conduct a cross-connecting process in a unit of VC4/VC3/VC2/VC12 correspondingly to data in which the AU4 pointer has been changed and data in which the TU pointer has been changed in common so that even an apparatus scale of the cross-connect apparatus 8D can be decreased.

(b-4) Others

If provided with the AU4 pointer processing unit 81B described in the item (b-3), the above pointer processing unit 8B can adopt ordinary equipments as the TU pointer processing unit 82B. If provided with the TU pointer processing unit 82B described in the item (b-2), the pointer processing unit BB can adopt ordinary equipments as the TU4 pointer processing unit 81B. It is not always necessary that the above pointer processing unit 8B has both of the AU4 pointer processing unit 81B and the TU pointer processing unit 82B, but the pointer processing unit 8B can have only the TU pointer processing unit 82B described in the item (b-2) to be used as an apparatus exclusively used for the TU pointer process.

(b-5) Description of a Whole Structure of a POH Terminating Process Apparatus

Figure 56:
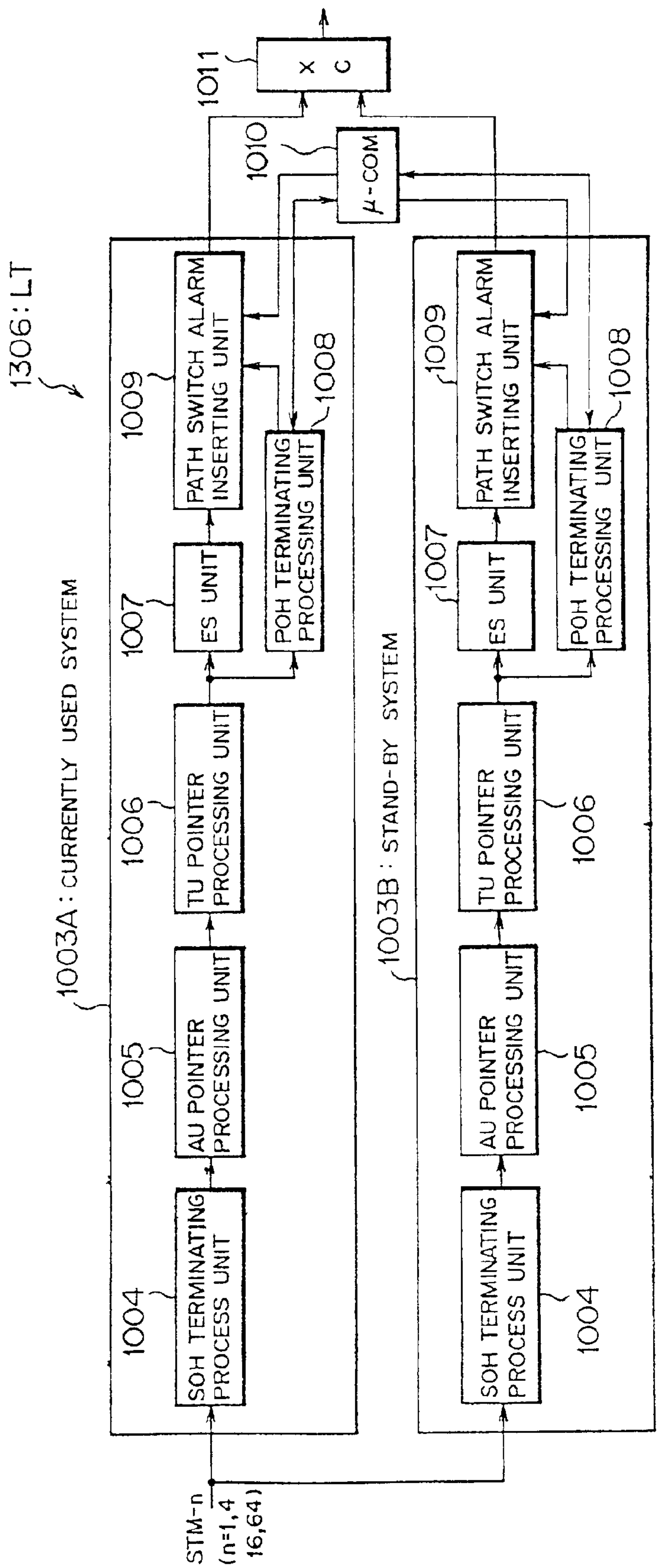
FIG. 56 is a block diagram showing a structure of an essential part of a line terminating apparatus to which a POH terminating process apparatus according to the embodiment of this invention is applied.

FIG. 56 is a block diagram showing an essential part of the line terminating apparatus 306 to which a POH terminating process apparatus according to the embodiment of this invention is applied. As shown in FIG. 56, the line terminating apparatus 306 has a currently used system 1003A and a stand-by system 1003B, each of which has a SOH terminating process unit 1004, an AU pointer processing unit 1005, a TU pointer processing unit 1006, an elastic store (ES) memory unit 1007, a POH terminating process unit (POH terminating process apparatus) 1008 and a path switch alarm inserting unit 1009. The SOH terminating process unit 1004, the AU pointer processing unit 1005, the TU pointer processing unit 1006, the POH terminating process unit 1008 mentioned above correspond to the SOH/LOH terminating process unit 8A, the AU4 pointer processing unit 81B, the TU pointer processing unit 82B, the POH terminating process unit 8C shown in FIG. 3, respectively.

In the line terminating apparatus 306 shown in FIG. 56, when various alarms defined in the SDH transmission system are detected in the POH terminating process unit 1008, alarm information of TIM, UNEQ, SLM among various alarm detection information is sent to the path switch alarm inserting unit 1009, besides BIPPM is notified to a microcomputer ($\mu$-COM) 1010. When receiving the notification, the microcomputer 1010 processes the alarm with software, after that, sets path switch alarm insertion to the path switch alarm inserting unit 1009. More specifically, the microcomputer 1010 sets signals on the TU channels in which each of the alarms of TIM, SLM, UNEQ, BIPPM is detected to ALL "1".

When a failure is detected in the cross-connecting apparatus 1011, the currently used system 1003A is switched to the stand-by system 1003B.

Figure 57:
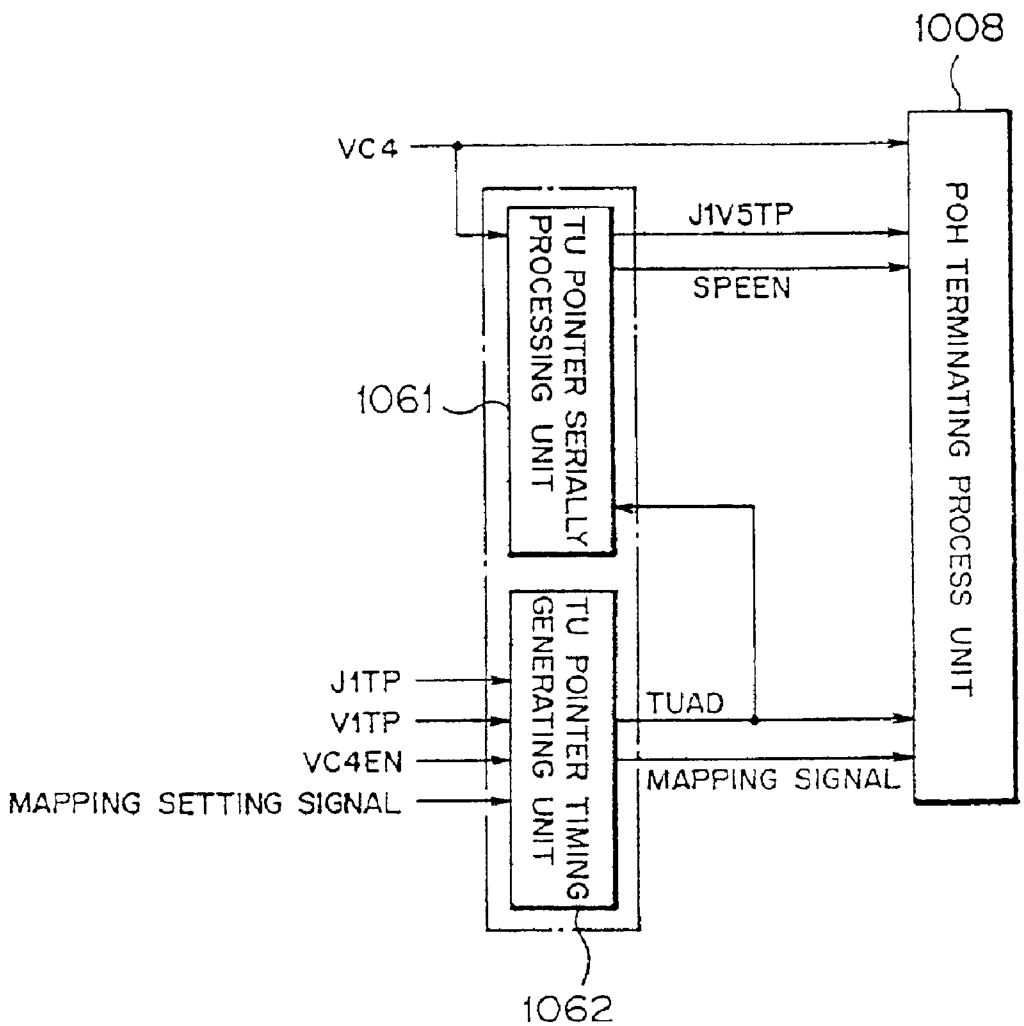
FIG. 57 is a block diagram showing the structure of the line terminating apparatus, paying an attention to a TU pointer processing unit and a POH terminating process unit according to the embodiment.

FIG. 57 is a block diagram showing a structure of the line terminating apparatus 306, paying an attention to the TU pointer processing unit 1006 and the POH terminating process unit 1008. As shown in FIG. 57, the TU pointer processing unit 1006 has a TU pointer serially processing unit 1051 and a TU pointer timing generating unit 1062. As will be described later, a J1/V5 byte timing signal and an SPE enable signal generated by the TU pointer serially processing unit 1061, a TU address signal (TUAD) and a mapping signal generated by the TU pointer timing generating unit 1062, etc. are used in a process conducted by the POH terminating process unit 1008.

Figure 58:
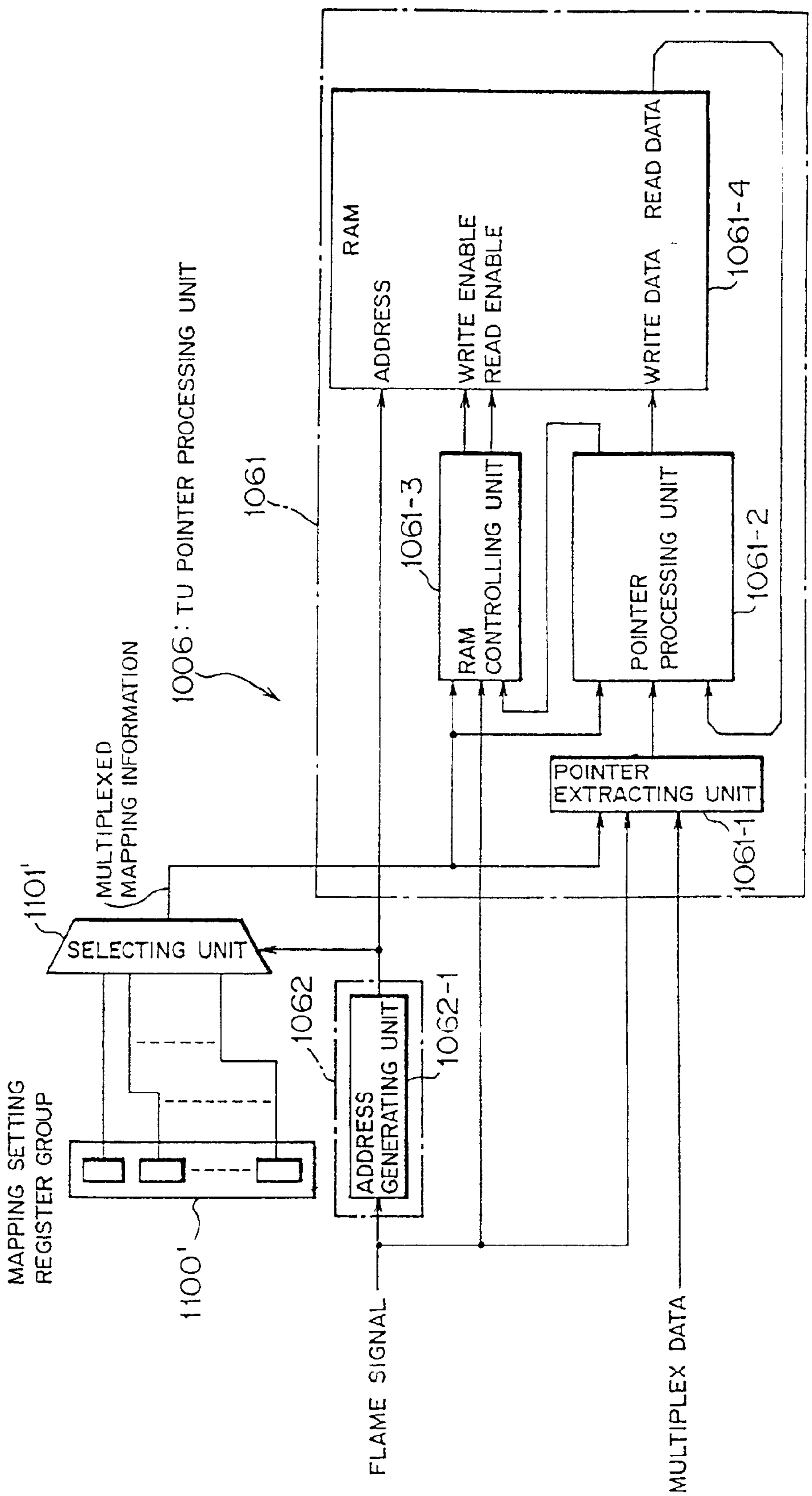
FIG. 58 is a block diagram showing structures of a TU pointer serially processing unit and a TU pointer timing generating unit according to the embodiment.

For this, the TU pointer serially processing unit (serial pointer processing unit) 1061 has a pointer extracting unit 1061-1, a pointer processing unit 1061-2, a RAM (random access memory) controlling unit 1061-3, a RAM 1061-4, whereas-th TU pointer timing generating unit 1062 has an address generating unit 1062-1, as shown in FIG. 58.

In the above TU pointer timing generating unit 1062, the address generating unit (address making unit) 1062-1 generates an address (channel address) allocated to each channel (multiplex data) in the TU level multiplexed in the STM-1 frame (VC4 signal) on the basis of a frame signal generated based on detection of a frame synchronization pattern (A1 and A2 bytes) included in SOH of the STM-1 frame. According to this embodiment, the TU channel address is used in the process conducted in the POH terminating process unit 1008 as address information (TUAD) used to discriminate the TU channel of the VC4 signal.

In the TU pointer serially processing unit 1061, the pointer extracting unit 1061-1 serially extracts pointer bytes (including at least H1/V1 byte and H2/V2 byte) of each channel from multiplex data. The pointer processing unit 1061-2 serially analyzes a pointer, detects a state of the pointer or change the pointer on each channel on the basis of the multiplexed data fed from the pointer extracting unit 1061-1.

The RAM controlling unit 1061-3 generates a control signal to control a sequence of operation of serially writing/reading a result of a process on each channel obtained by the pointer processing unit 1061-2 in/from the RAM 1061-4. The RAM 1061-4 holds output data of the pointer processing unit 1061-2 in a region indicated by a channel address fed from the address generating unit 1062-1 for each channel.

In FIG. 58, reference numeral 1100' denotes a mapping setting register group, and reference numeral 1101' denotes a selecting unit. The mapping setting register group 1100' sets which signal size among TU3/TU2/TU12 each channel of the multiplex data (STM-1 frame) is set to. The selecting unit 1101' selects a signal size of a corresponding channel fed from the mapping setting register group 1100' using an address allocated to each channel by the address generating unit 1062-1, and serially (multiplexes and) outputs mapping information. Detailed structures of the mapping setting register group 1100' and the selecting unit 1101' will be described later with reference to FIG. 61.

In the TU pointer processing unit 1006 with the above structure, an information group generated through the pointer extracting unit 1061-1 and the pointer processing unit 1061-2 is written in at an address of the RAM 1061-4 indicated by a RAM address (channel address) generated by the address generating unit 1062-1 according to a write enable signal (detection timing of received pointer bytes) generated by the RAM controlling unit 1061-3.

The pointer processing unit 1061-2 reads an information group of a preceding frame from the RAM 1061-4 according to a read enable signal generated by the RAM controlling unit 1061-3, and serially conducts a pointer process using the information group of each channel read out.

Figure 59:
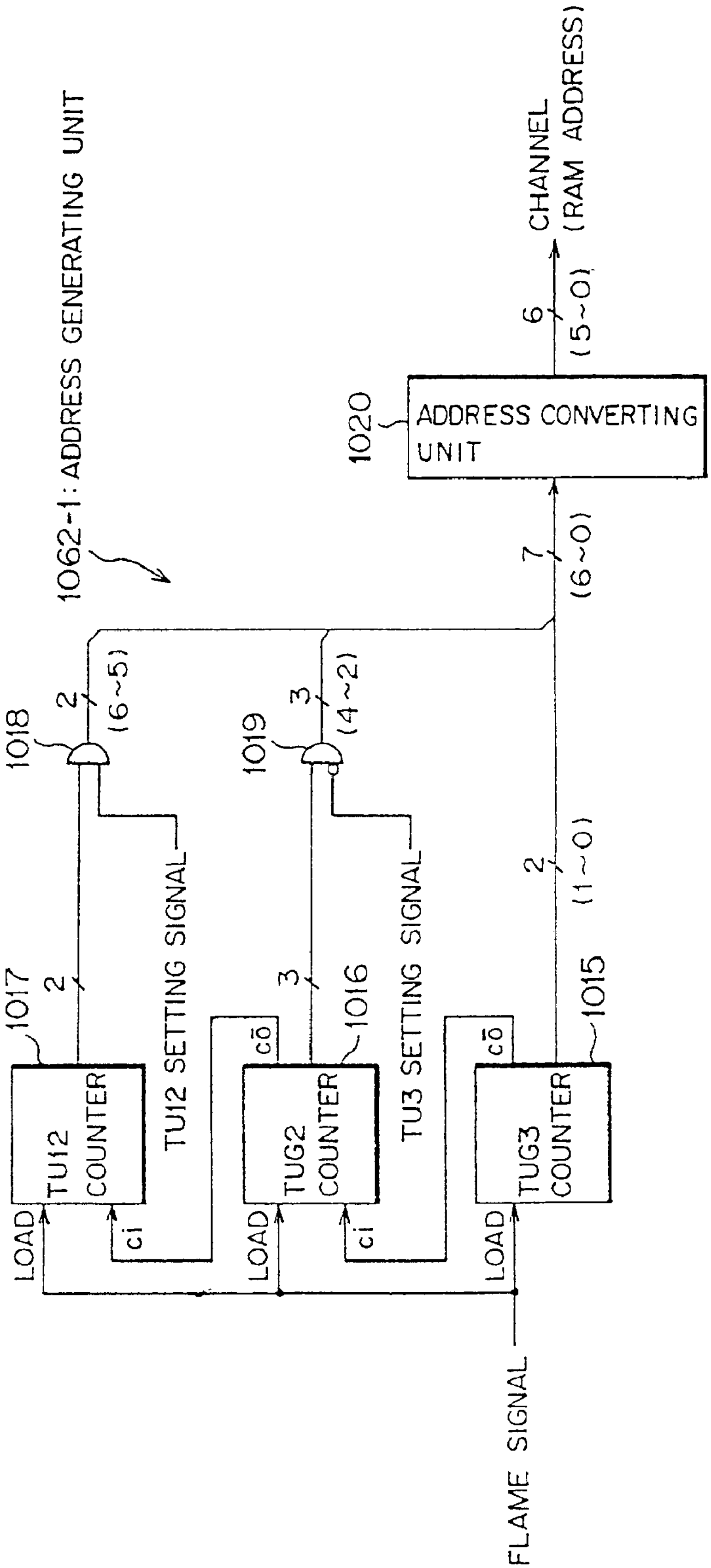
FIG. 59 is a block diagram showing a detailed structure of an address generating unit according to the embodiment.

FIG. 59 is a block diagram showing a detailed structure of the above address generating unit 1062-1. As shown in FIG. 59, the address generating unit 1062-1 has, similarly to the address generating unit 10 shown in FIG. 6, an address counter for TUG3 1015, an address counter for TUG2 1016, an address counter for TU12 1017, an AND circuit (a logical product circuit) 1018, an AND circuit 1019 of one-input inverting type and an address converting unit 1020.

The address counter for TUG3 (a ternary counter) 1015 counts the number of (the number of channels of) TUG3 (a maximum of three channels are multiplexed) multiplexed in the STM-1 frame. The address counter for TUG2 (a septenary counter) 1016 counts the number of channels (a maximum of seven channels are multiplexed) of TUG2 multiplexed in the TUG3 frame. The address counter for TU12 (a ternary counter) 1017 counts the number of channels (a maximum of three channels are multiplexed) of TU12 multiplexed in the TUG2 frame. Each of the address counters 1015 through 1017 loads an initial value by a frame signal.

In this case, a carry-out (CO) of the address counter 1015 is connected to a carry-in (CI) of the address counter 1016, besides a carry-out of the address counter 1016 is connected to a carry-in of the address counter 1017 as shown in FIG. 59, whereby a 63-ary counter is formed. Outputs of the these three address counters 1015 through 1017 are used as a RAM address (channel address) for the RAM 1061-4.

The AND circuit (logical product circuit) 1018 converts an output of the address counter 1017 to "0" when the TU pointer processing unit 1006 is not set to a TU12 mode by a TU12 setting signal, which will described later, (i.e., when the TU12 setting signal is in an L level). The AND circuit 1019 of one-input inverting type converts an output of the address counter to "0" only when the TU pointer processing unit 1006 is set to a TU3 mode by a TU3 setting signal, which will be described later, (i.e., only when the TU3 setting signal is in an H level).

The address converting unit 1020 conducts a desired adding process on an address output from each of the counters 1015 through 1017 to generate an address convert signal such as to prevent an idle address from generating in the RAM 1014.

The address generating unit 1062-1 changes a combination of the counters 1015 through 1017 (only the counter

1015, the counter 1015 and the counter 1016, or all of the counters 1015 through 1017) operated according to a TU2 mode setting signal or a TU3 mode setting signal to generate an address for the RAM 1014 as a combination shown in FIG. 33, for example, thereby using channel addresses in common tor TU3, TU2 and TU12 in the RAM 1061-4.

Even if frames (VC4/VC3/VC2/VC12) in different signal sizes mixedly exist in any combination in the STM-1 frame, it is therefore possible to flexibly cope with it using one address generating unit 1061-4 (refer to FIG. 7) as described before.

The channel addresses generated as above are undergone the address conversion by the address converting unit 1020, whereby address outputs in which all idle addresses are compressed are obtained (refer to the address space in FIG. 10). In consequence, seven bits of an address line to the RAM 61-4 is converted from 7 bits to 6 bits. This output is used as a TU channel address (TUAD) for the above POH terminating process unit 1008.

Namely, the POH terminating process unit 1008 according to this embodiment uses a common TU address serially generated in the address generating unit 1062-1 of the TU pointer processing unit 1006, thereby eliminating necessity of separately generating a TU address signal necessary for a POH-byte serially terminating process according to VC3/VC2/VC12.

It is therefore unnecessary to equip circuits each for generating a TU address equal in number to corresponding channels, and conduct a special process to identify each TU channel. This can largely contribute to a reduction in size of the circuit and saving of the power consumption.

Figure 60:
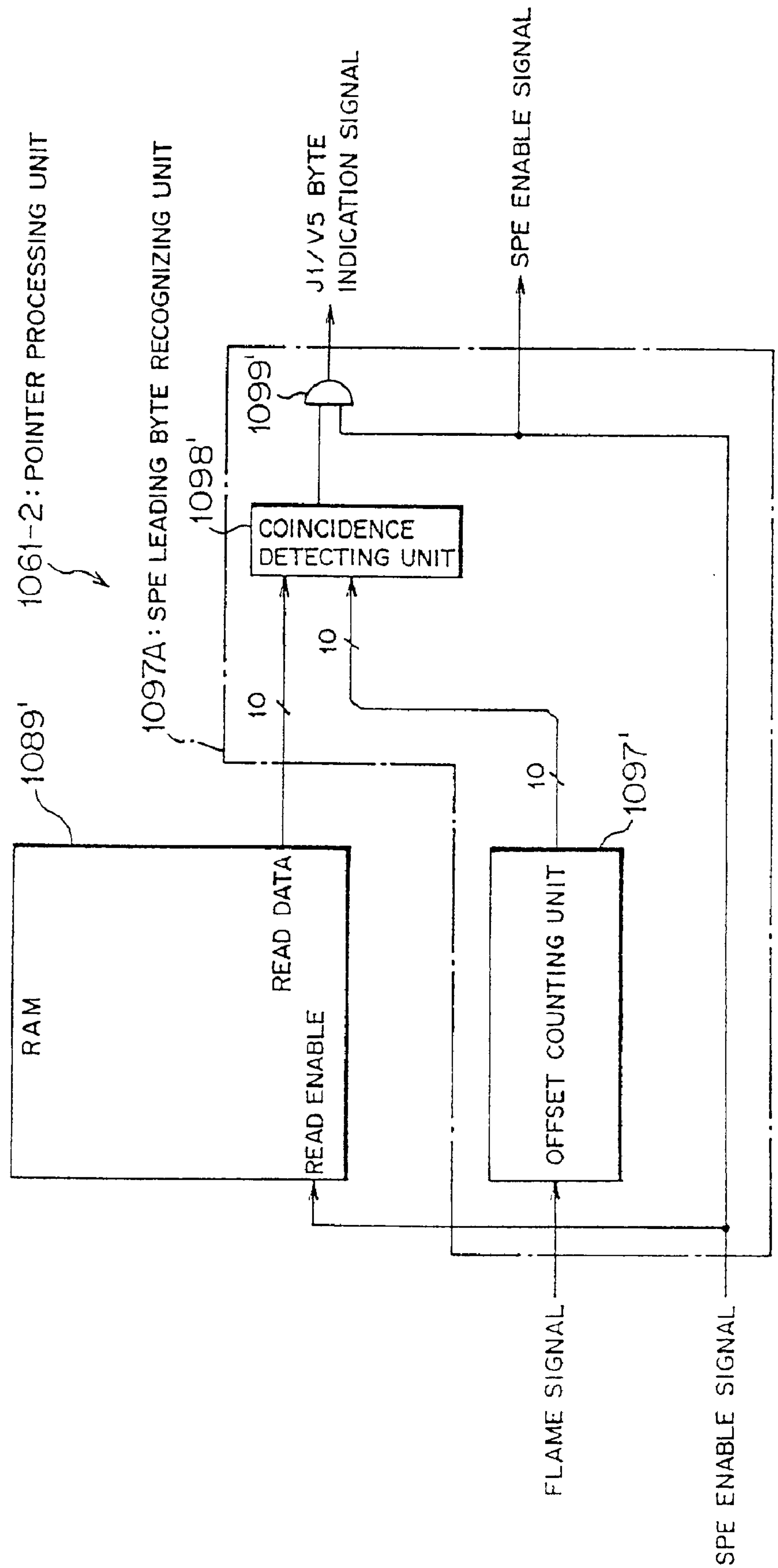
FIG. 60 is a block diagram showing a structure of a pointer processing unit, paying an attention to an SPE leading byte (J1/V5 byte) recognizing function according to the embodiment.

Next, FIG. 60 is a block diagram showing a structure of the pointer processing unit 1061-2, paying an attention to an SPE leading byte (J1/V5 byte) recognizing function. The pointer processing unit 1061-2 shown in FIG. 60 has a RAM 1089' and an SPE leading byte recognizing unit 1097A.

The SPE leading byte recognizing unit 1097A recognizes J1 byte (leading byte of a VC3 signal) or V5 byte (leading byte of a VC2/VC12 signal) as a leading byte of SPE, which has, as shown in FIG. 60, an offset counting unit 1097', a coincidence detecting unit 1098' and an AND circuit 1099'.

The offset counting unit 1097' retrieves a leading byte of SPE by counting the offset pointer value of the SPE, mentioned before with reference to FIGS. 149 through 156, with the frame signal as an opportunity. The coincidence detecting unit 1098' reads an active pointer value from the RAM 1098' according to an SPE enable signal as a read enable signal, and detects coincidence between the active pointer value and an offset counter value of the offset counting unit 1097'. The AND circuit 1099' calculates a logical product of the SPE enable signal and a result of the detection of coincidence obtained by the coincidence detecting unit 1098', thereby generating and outputting an SPE leading byte (J1/V5 byte) position indicate signal.

Namely, the SPE leading byte recognizing unit 1097A has the offset counting unit 1097' for retrieving a leading position of SPE, reads out an active pointer value from the RAM 1089', and recognizes a leading byte position of the SPE by a logical product of an SPE enable signal and a result of detection of coincidence between an offset counter value and the active pointer value.

In the pointer processing unit 1061-2 with the above structure, an active pointer value held in the RAM 1089' is read out according to the SPE enable signal, besides the offset counting unit 1097' starts counting the offset pointer value of SPE with the frame signal as an opportunity. The coincidence detecting unit 1089' detects whether the active pointer value read out from the RAM 1089' coincides with a count value of the offset counting unit 1097'.

The AND circuit 1099' calculates a logical product of a result of the detection of coincidence and the SPE enable signal, and generates and outputs a result of the logical product as a J1/V5 byte indicate signal. Here, when the J1/V5 byte indicate signal is "1" (in the H level), data in that time slot of the multiplex data is the J1/V5 byte. The J1/V5 byte indicate signal and the SPE enable signal mentioned above are used in the process conducted in the above TU pointer processing unit 1006.

Figure 61:
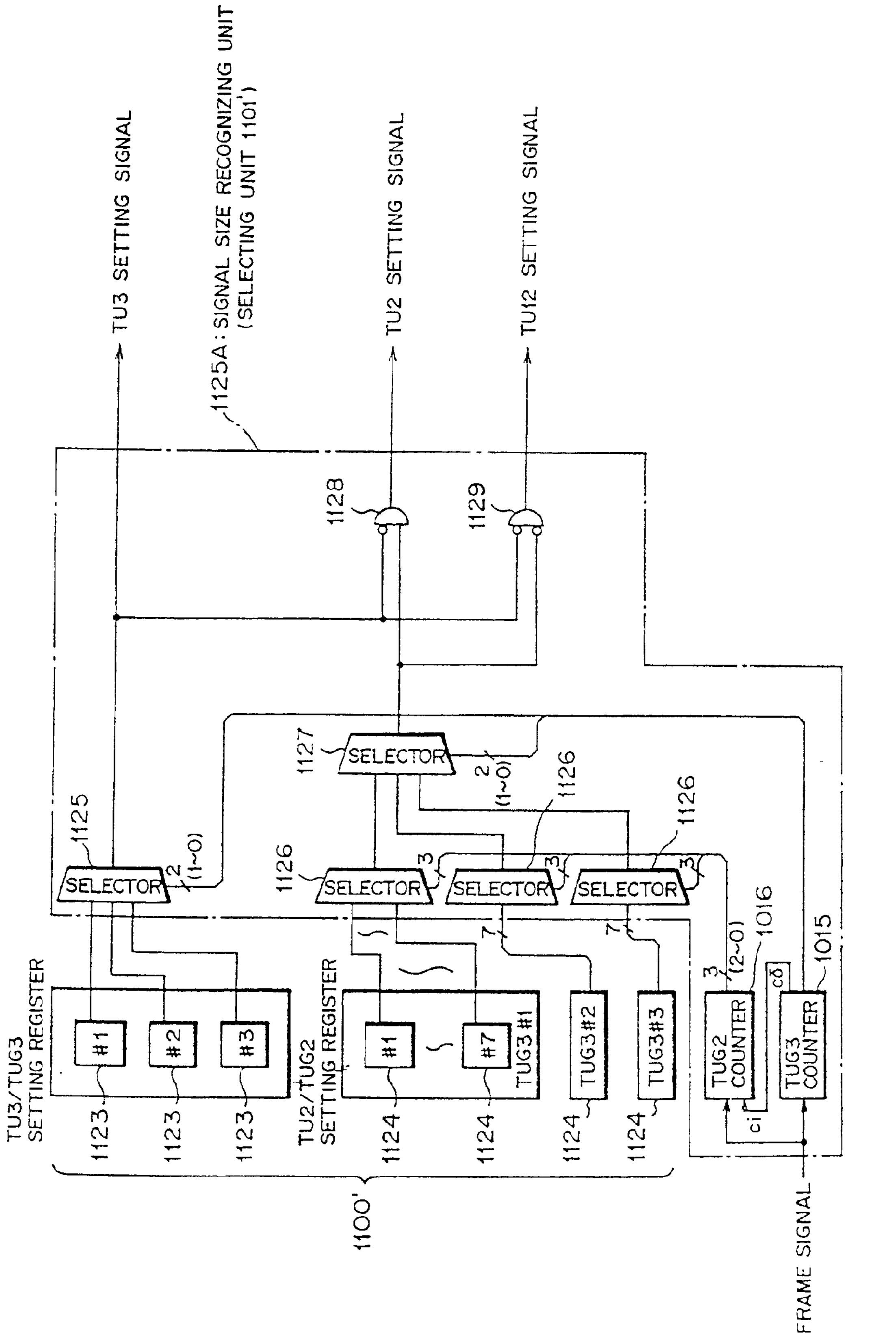
FIG. 61 is a block diagram showing the structure of the TU pointer processing unit, paying an attention to a signal size recognizing function according to the embodiment.

FIG. 61 is a block diagram showing a structure of the TU pointer processing unit 1006, paying an attention to a signal size recognizing function. If it is assumed that the TU pointer processing unit 1006 shown in FIG. 61 processes data of the STM-1 frame, the above mapping setting register group 1100' has three TU3/TUG3 setting registers (TU3/TUG3 #1 through #3) 1123, and seven TU2/TUG2 setting registers (TU2/TUG2 #1 through #7) 1124 for each of the TU3/TUG3 setting registers 1123, totaling 21 registers (for 21 channels). The above selecting unit 1101' has a signal size recognizing unit 1125A.

The TU3/TUG3 setting register 1123 stores information as to whether TUG3 accommodated (mapped) in the VC4 frame is set to TU3 or TUG3. For instance, when a value of the setting register 1123 is "1", it means that TU3 is multiplexed in the TUG3 frame. When a value of the setting register 1123 is "0", it means that TU2 or TU12 is multiplexed in the TUG3 frame.

The TU2/TUG2 setting register 1124 stores information as to whether TUG2 mapped in TUG3 is set to TU2 or TUG2. For instance, when a value of the setting register 1124 is "1", it means that TU2 is multiplexed in the TUG2 frame. When a value of the setting register 1124 is "0", it means that TU12 is multiplexed in the TUG2 frame.

The signal size recognizing unit 1125A recognizes a signal size of a relevant channel on the basis of set values stored in the setting registers 1123 and 1124, and generates and outputs a TU3/TU2/TU12 setting signal for the address generating unit 1010. As shown in FIG. 61, a function of the signal size recognizing unit 1125A is realized with selecting circuits 1125 through 1127, an AND circuit 1128 of one-input inverting type, an AND circuit 1129 of all-inputs inverting type, an address counter for TU3 1015, and an address counter for TUG2 1016, which are similar to those shown in FIG. 59.

The selecting circuit 1125 selects information of the TU3/TUG3 setting register 1123 corresponding to a channel indicated by a count value of the address counter for TUG3 1015 of the address generating unit 1062-1. Each of the selecting circuits 1126 selects information of the TUG2/TUG2 setting register 1124 corresponding to a channel indicated by a count value of the address counter for TUG2 1016. The selecting circuit 1127 selects information of the TU2/TUG2 setting register 1124 corresponding to a channel indicated by a count value of the address counter for TUG3 1015.

In the TU pointer processing unit 1006 with the above structure, the selecting circuit 1125 selects a set value (data #1, #2 or #3) of the TU3/TUG3 setting register 1123 with a count value of the address counter for TUG3 1015 so as to generate a TU3 setting signal. The TU3 setting signal indicates that a relevant channel is TU3 only when being "1".

Each of the three selecting circuits 1126 selects data "#1, #2, . . . or #7" of seven registers of the TU2/TUG2 setting registers 1124 (for TUG3#1, TUG3#2, or TUG3#3) with a count value of the address counter for TUG2 1016, and the selecting circuit 1127 selects one of these three selected signal according to a count value of the address counter 1015 for TUG3.

The AND circuit 1128 obtains a logical product of an inverted signal of the TU3 setting signal and an output signal of the selecting circuit 1127 to generate a TU2 setting signal. Here, the TU2 setting signal indicates that a relevant channel is TU2 only when being "1".

The AND circuit 1129 obtains a logical product of an inverted signal of the TU3 setting signal and an inverted signal of an output signal of the selecting circuit 1127 to generate a TU12 setting signal. Here, the TU12 setting signal indicates that a relevant channel is TU12 only when being "1". Each of the above TU setting signals is used as a mapping setting signal in a process conducted in the POH terminating process unit 1008 as will be-described later.

Figure 62:
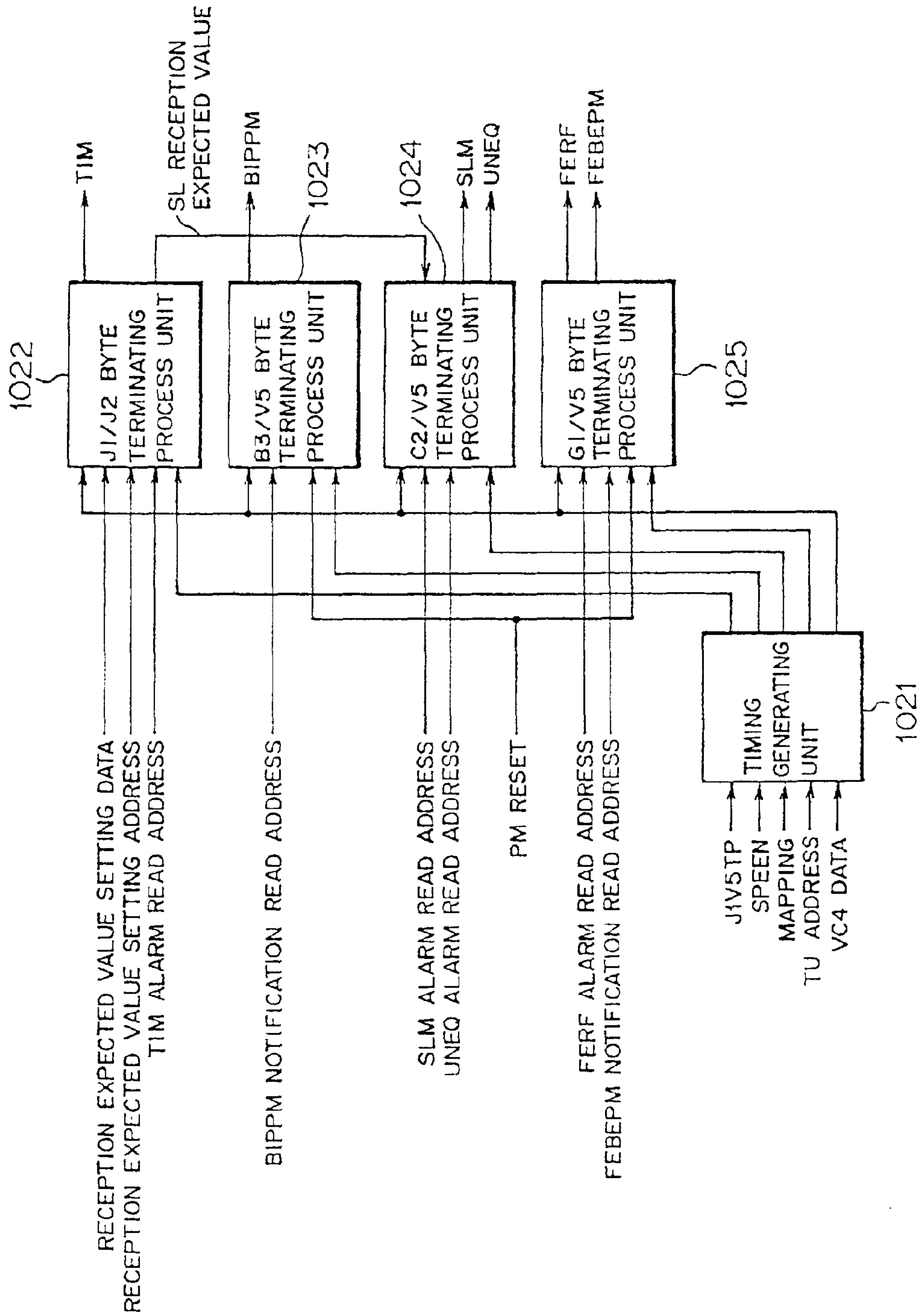
FIG. 62 is a block diagram showing the structure of the POH terminating process unit according to the embodiment.

FIG. 62 is a block diagrams showing a structure of the POH terminating process unit 1008 according to this embodiment. As shown in FIG. 62, the above POH terminating process unit (serial POH terminating process unit) 1008 has a timing generating unit 1021, a J1/J2 byte terminating process unit 1022, a B3/V5 byte terminating process unit 1023, a C2/V5 byte terminating process unit 1024 and a G1/V5 byte terminating process unit 1025.

The timing generating unit (POH timing signal serially generating unit) 1021 receives a J1V5TP signal (J1/V5 byte indicating signal) indicating a leading position of TU data, an SPE enable signal (SPEEN) indicating a position of payload data of the TU data, a mapping signal used to discriminate a TU signal size (TU3/TU2/TU12) and VC4 data in which the TU data is multiplexed from the TU pointer processing unit 1006 to generate various timing signals necessary in processes to terminate POH of TU and adjust a phase.

Namely, the timing generating unit 1021 serially generates a POH timing signal used in a process in each of the terminating process units 1022 through 1025 on the basis of a timing signal indicating a position of J1 byte or V5 byte included in the multiplex signal (VC4 signal) and type information (mapping signal) of the mutliplex signal. The timing generating unit 1021 can serially generate a POH timing signal necessary for each of the terminating process units 1022 through 1025 in common to TU channels.

The J1/J2 byte terminating process unit 1022 serially conducts a terminating process (detection of LOM, CRC, and TIM) on J1 byte and J2 byte included in the multiplex signal. The B3/V5 byte terminating process unit 1023 serially conducts a terminating process on BIP of B3 byte and V5 byte included in the multiplex signal and a terminating process on BIPPM of the above B3 byte and V5 byte.

The C2/V5 byte terminating process unit (UNEQ/SLM serially terminating process unit) 1024 conducts a terminating process on UNEQ of C2 byte and V5 byte included in the multiplex data, and serially conducts a terminating process on SLM of the above C2 byte and V5 byte. The G1/V5 byte terminating process unit (FEBE/FERF serially terminating process unit) serially conducts a terminating process on FEBE of G1 byte and V5 byte included in the multiplex signal and a terminating process on FEBEPM of the above G1 byte and V5 byte, besides serially conducting a terminating process on FERF of the above G1 byte and V5 byte.

Figure 63:
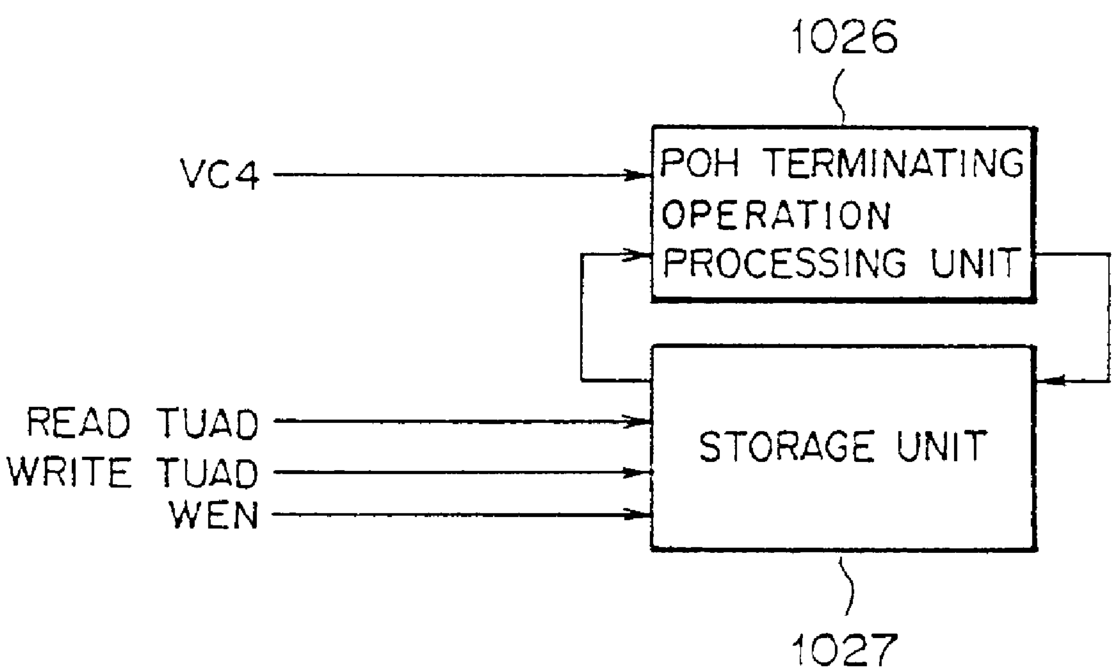
FIGS. 63 and 64 are block diagrams showing a fundamental structure of each of terminating process units according to the embodiment.

Each of the above terminating process units 1022 through 1025 has, basically, a POH terminating operation processing unit 1026 and a storage 1027, as shown in FIG. 63.

The POH terminating operation processing unit 1026 conducts a POH terminating operation process on the multiplex signal (VC4 signal: a maximum of 3 channels in TU3, a maximum of 21 channels in TU2, or a maximum of 63 channels in TU12 are multiplexed) in which channels of TU3/TU2/TU12 are serially multiplexed. According to this embodiment, the POH terminating operation processing unit 1026 is used in common to the above channels.

The storage unit 1027 stores a result of the operation in the POH terminating operation process unit 1026 for each channel. Reading-out and writing-in the storage unit 1027 are flexibly controlled according to a TU channel address signal used to read out, a TU channel address signal used to write in, and a write enable signal (WEN) supplied form the above TU pointer processing unit 1006.

When conducting the POH terminating operation process on a VC4 signal, each of the terminating process units 1022 through 1025 conducts the POH terminating process in the POH terminating operation process unit 1026 using stored information about a corresponding channel stored in the storage unit 1027, and stores a obtained result of the POH terminating operation in a storage area for the corresponding channel in the storage unit 1027. It is therefore possible to serially conduct the POH terminating operation process on the VC4 signal without separating the VC4 signal into signals on respective channels of VC3, VC2 and VC12.

FIG. 64 is a block diagram showing structures of the POH terminating operation process unit 1026 and storage unit 1027. As shown in FIG. 64, the POH terminating operation process unit 1026 has a serially processing unit 1026-1 and a flip-flop (FF) circuit 1026-2 with an enable terminal, whereas the storage unit 1027 has a RAM data holding unit 1027-1 configured with a RAM and an FF data holding unit 1027-2 configured with an FF circuit.

In the POH terminating operation process unit 1026, the serially processing unit 1026-1 serially conducts the terminating process on POH bytes. For instance, the J1/V2 byte terminating process unit 1022 conducts the terminating process on J1 byte and J2 byte, the B3/V5 byte terminating process unit 1023 conducts the terminating process on B3 byte and V5 byte, the C2/V5 byte terminating process unit 1024 conducts the terminating process on C2 byte and V5 byte, and the G1/V5 byte conducts the terminating process on G1 byte and V5 byte.

The FF circuit (latching unit) 1026-2 temporarily stores (holds) data (an operation result) of a corresponding channel read out from the storage unit 1027 and POH byte data used to process VC4 data when the serially processing unit 1026-1 conducts the POH-byte terminating operation-process.

When the FF circuit 1026-2 latches data held in the storage unit 1027 and the POH-byte data used to process VC4 data with a POH timing, data necessary to the serially processing unit 1026-1 is supplied according to the POH timing so that the serially processing unit 1026-1 operates only when necessary. Namely, the FF circuit 1026-2 decreases an operation frequency of the serially processing unit 1026-1 to suppress a power consumption of the same.

In the storage unit 1027, the RAM data holding unit 1027-1 holds data such as alarm protective stage number information about TU channels (0–62 channels) and the like. As shown in FIGS. 65(*a*) through 65(*t*), for example, data of a corresponding TU channel that should be serially processed is read out from the RAM data holding unit 1027-1 with a RAM read address, and the alarm protective stage number information and the like about the TU channel which has been undergone the serial process is written in the RAM data holding unit 1027-1 with a RAM write address and a RAM write enable. According to this embodiment, RAM clock is inputted only when the RAM data holding unit 1027-1 is read and written to decrease an operation frequency of the RAM data holding unit 1027-1, thereby suppressing a power consumption of the same.

The FF data holding unit 1027-2 holds alarm bits for TU channels (0–62 channels) in the FF circuit. As shown in FIGS. 65(*a*) through 65(*t*), the alarm bit of a TU channel that should be serially processed is read out with an FF read address and FF read timing, and the alarm bits of the TU channel having been undergone the serial process is written in with an FF write address and an FF write enable.

Next, details of the timing generating unit 1021, the J1/J2 byte terminating process unit 1022, the B3/V5 byte terminating process unit 1023, the C2/V5 byte terminating process unit 1024 and the G1/V5 byte terminating process unit 1025 mentioned above will be described in respective items.

(b-6) Description of the Timing Generating Unit 1021

Figure 66:
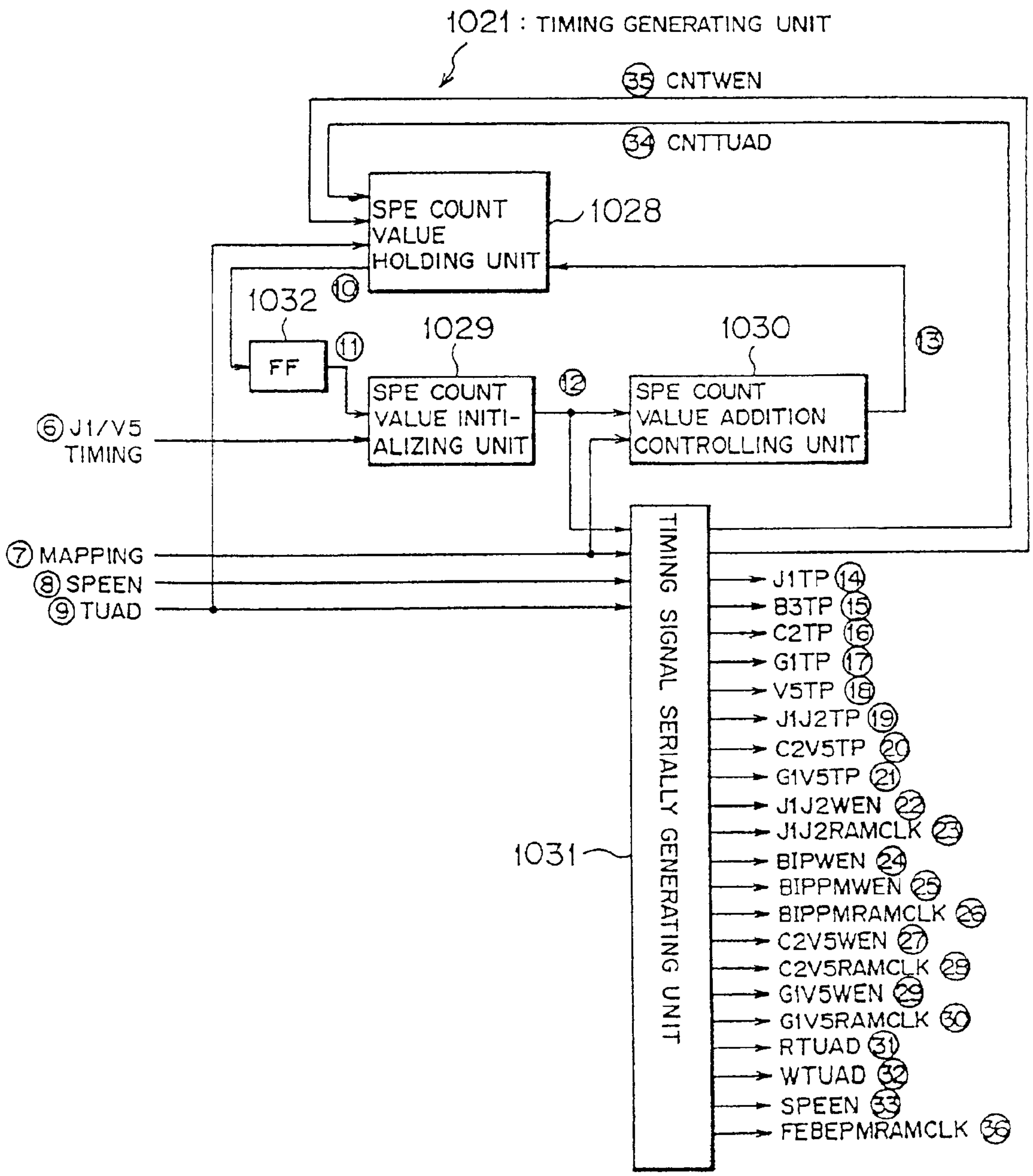
FIG. 66 is a block diagram showing a structure of a timing generating unit according to the embodiment.

FIG. 66 is a block diagram showing a structure of the above timing generating unit 1021. The timing generating unit 1021 shown in FIG. 66 has an SPE count value holding unit (RAM) 1028, an SPE count value initializing unit 1029, an SPE count value addition controlling unit 1030, a timing signal generating process unit 1031 and an FF circuit 1032.

The SPE count value holding unit 1028 holds an SPE count added value obtained in the SPE count value addition controlling unit 1030 for each TU channel. The SPE count value holding unit 1028 is a flexibly writable/readable storage unit which can supply data for each TU channel held therein to the SPE count value initializing unit 1029. The SPE count value initializing unit 1029 receives a J1V5 timing signal indicating a leading position (position of J1/V5 byte) of a VC3/VC2/VC12 signal in VC4 to initialize an SPE count value.

The SPE count value addition controlling unit 1030 conducts an addition control on the SPE count value on the basis of a signal fed from the SPE count value initializing unit 1029. The timing signal generating process unit 1031 receives a signal from the SPE count value initializing unit 1029, a mapping signal (signal indicating a type of a VC signal in the same phase), an SPE enable signal (SPEEN) and a TU address signal (TUAD) to generate various POH timing signals shown below used in a process conducted in each of the terminating process units 1022 through 1025 (refer to FIG. 62).

- J1 timing signal (J1TP): signal indicating a position of J1 byte;
- B3 timing signal (B3TP): signal indicating a position of B3 byte;
- C2 timing signal (C2TP): signal indicating a position of C2 byte;
- G1 timing signal (G1TP): signal indicating a position of G1 byte;
- V5 timing signal (V5TP): signal indicating a position of V5 byte;
- J1J2 timing signal (J1J2TP): signal indicating positions of J1 and J2 bytes:
- C2V5 timing signal (C2V5TP): signal indicating positions of C2 and V5 bytes;
- G1V5 timing signal (G1V5TP): a signal indicating positions of G1 and V5 bytes;
- J1J2 write enable signal (J1J2WEN): signal indicating a timing of writing data in which J1 and J2 bytes have been terminated;
- J1J2RAMCLK signal: operation clock for the RAM in the J1/J1 byte terminating process unit 1022;
- BIPWEN signal: signal indicating a timing of writing a result of a BIP2/BIP8 operation;
- BIPPMWEN signal: signal indicating a timing of writing data having been undergone a BIPPM adding process;
- BIPPMRAMCLK signal: operation clock for a BIPPM holding RAM 1058-1 in the B3/V5 byte terminating process unit described later;
- C2V5WEN signal: signal indicating a timing of writing data having been undergone a UNEQ/SLM terminating process;
- C2V5RAMCLK signal: operation clock for a RAM in the C2/V5 byte terminating process unit 1024 described later;
- G1V5WEN signal: signal indicating a timing of writing data having been undergone an FERF terminating process;
- G1V5RAMCLK signal: operation clock for a RAM in the G1/V5 byte terminating process unit 1025 described later;
- TU address signal for reading: signal directing to read a result of the terminating process conducted one cycle before on a TU channel that should be undergone a POH terminating process;
- TU address signal for writing (WTUAD): signal directing to write data of the TU channel having been undergone the POH terminating process;
- SPE enable signal (SPEEN): signal obtained by delaying a phase of an inputted SPE enable signal;
- SPE count value writing TU address signal (CNTTUAD): signal designating an address at which an SPE count value of a TU channel having been undergone the SPE count value addition control is written;
- SPE count value write enable signal (CNTWEN): signal direct to write a signal having been undergone the SPE count value addition control; and
- FEBEPMRAMCLK: operation clock for an FEBEPM holding RAM 1093-1 in the G1/V5 byte terminating process unit 1025 described later.

The FF circuit 1032 delays a phase of an SPE count value obtained one process before (one cycle before) fed from the SPE count value holding unit 1028 by one clock to adjust an inputting timing to the SPE count value initializing unit 1029.

Figure 67:
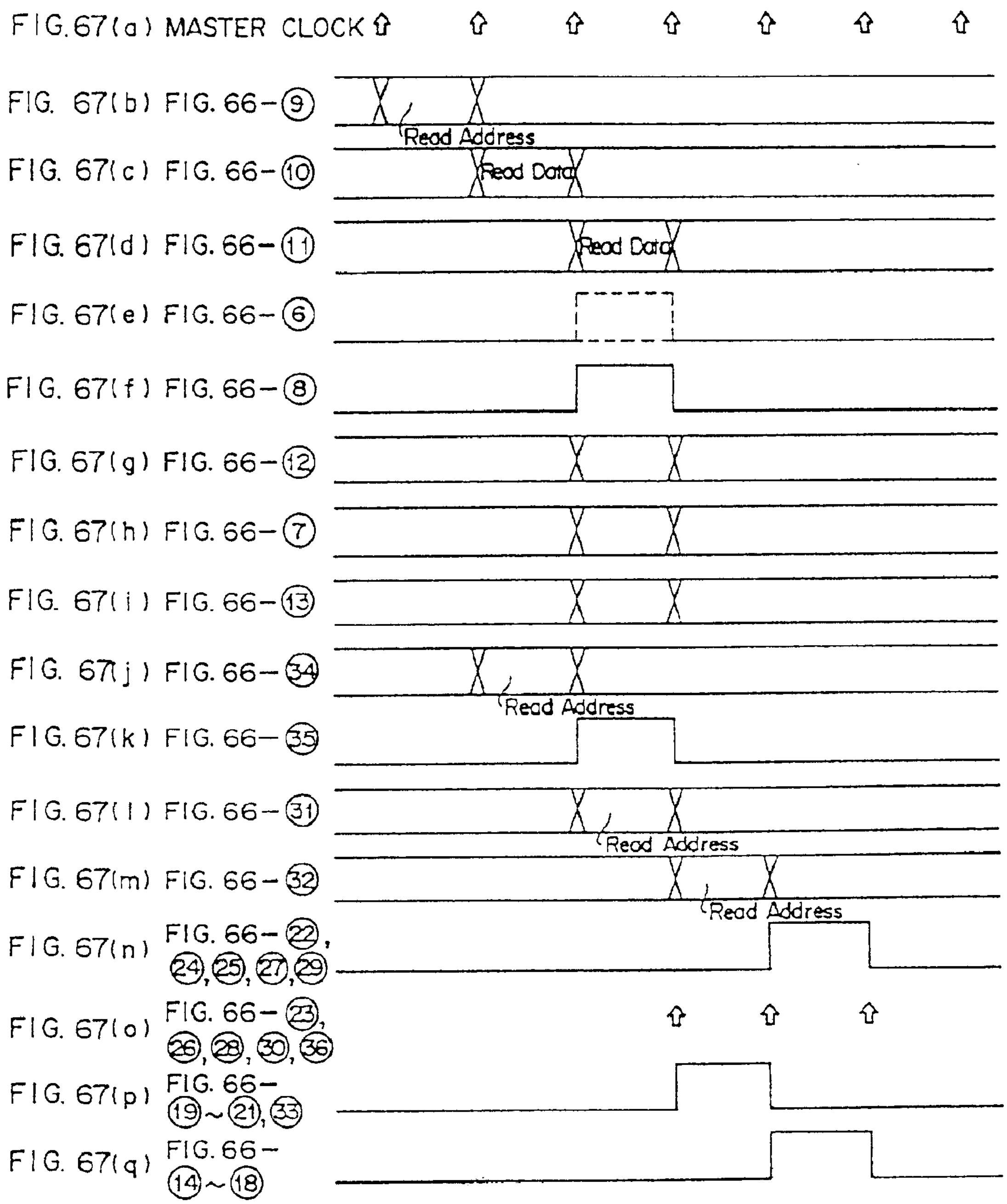
FIGS. 67(*a*) through 67(*q*) are timing charts for illustrating an operation of the timing generating unit according to the embodiment.

In the timing-generating unit 1021 with the above structure, information (SPE count value) about a leading position (J1 byte/V5 byte) of SPE in the multiplex signal is held (read-out/write-in) in the SPE count value holding unit 1028 for each TU channel at a timing shown in FIGS. 67(*a*) through 67(*q*), for example, through the SPE count value initializing unit 1029 and the SPE count value addition controlling unit 1030, and successively updated, whereby various POH timing signals used in the process conducted in each of the terminating units 1022 through 1025 are serially generated in the timing signal generating process unit 1031 in common to all TU channels. It is therefore possible to realize the above serial process in an extremely simple structure.

Figure 68:
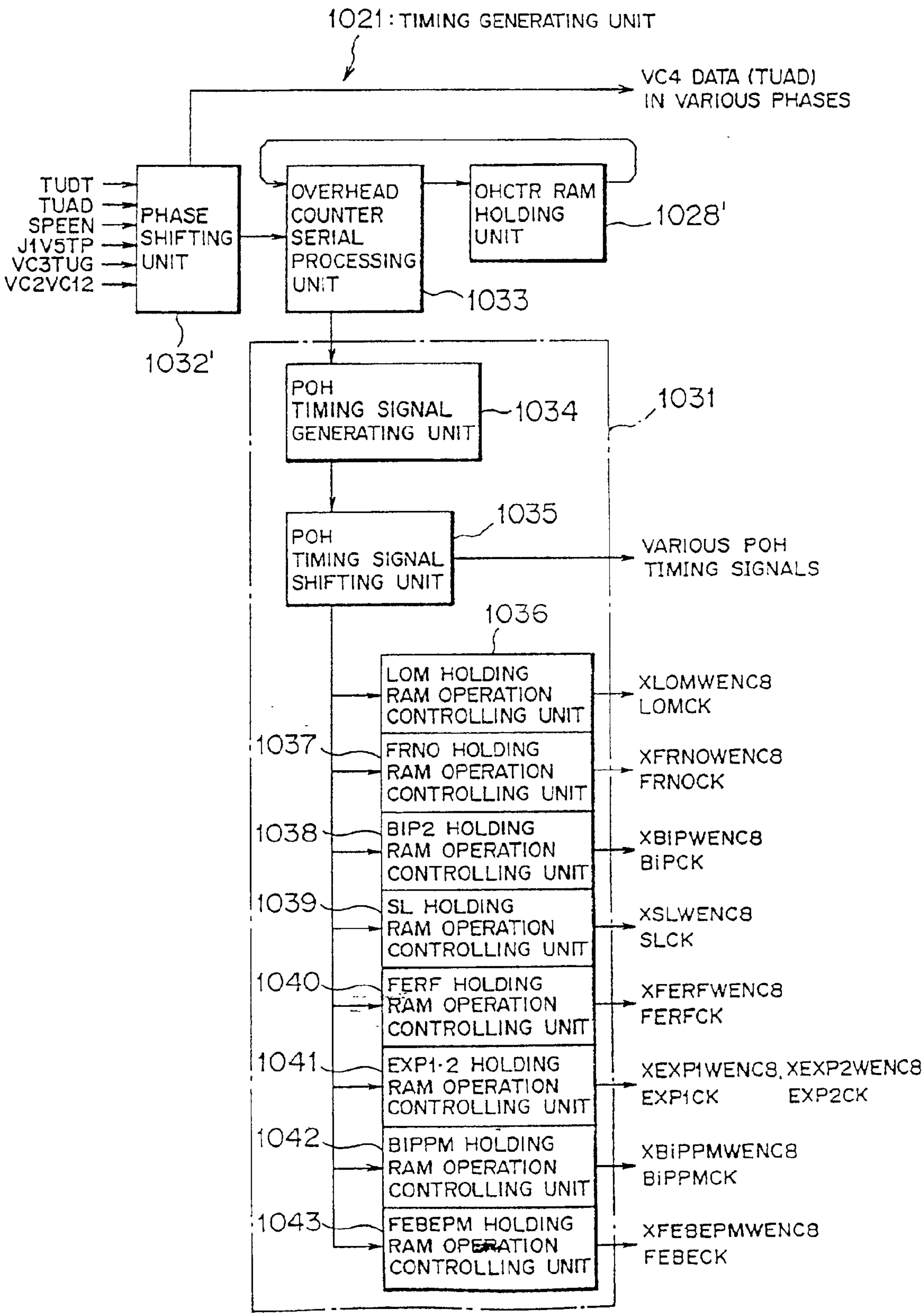
FIG. 68 is a block diagram showing a detailed structure of the timing generating unit according to the embodiment.

In concrete, the above timing generating unit 1021 has, as shown in FIG. 68, an overhead counter (OHCTR) RAM holding unit 1028', a phase shifting unit 1032', an overhead counter serially processing unit 1033. In addition, the timing generating unit 1021 has, as the above timing signal generating process unit 1031, a POH timing signal generating unit 1034, a POH timing signal shifting unit 1035, an LOM holding RAM operation controlling unit 1036, a frame number (FRNO) holding RAM operation controlling unit 1037, a B1P2 holding RAM operation controlling unit 1038, a signal label (SL) holding RAM operation controlling unit 1039, an FERF holding RAM operation controlling unit 1040, a reception expected value (EXP1/2) holding RAM operation controlling unit 1041, a BIPPM holding RAM operation controlling unit 1042, and an FEBEPM holding RAM operation controlling unit 1043.

The above overhead counter serially processing unit 1033 corresponds to a part configured with the SPE count value initializing unit 1029, the SPE count value addition controlling unit 1030 and the FF circuit 1032 shown in FIG. 66. The overhead counter RAM holding unit 1028' holds a count value fed from the overhead counter serially processing unit 1033 in a RAM, which corresponds to the SPE count value holding unit 1028 shown in FIG. 66.

Figure 69:
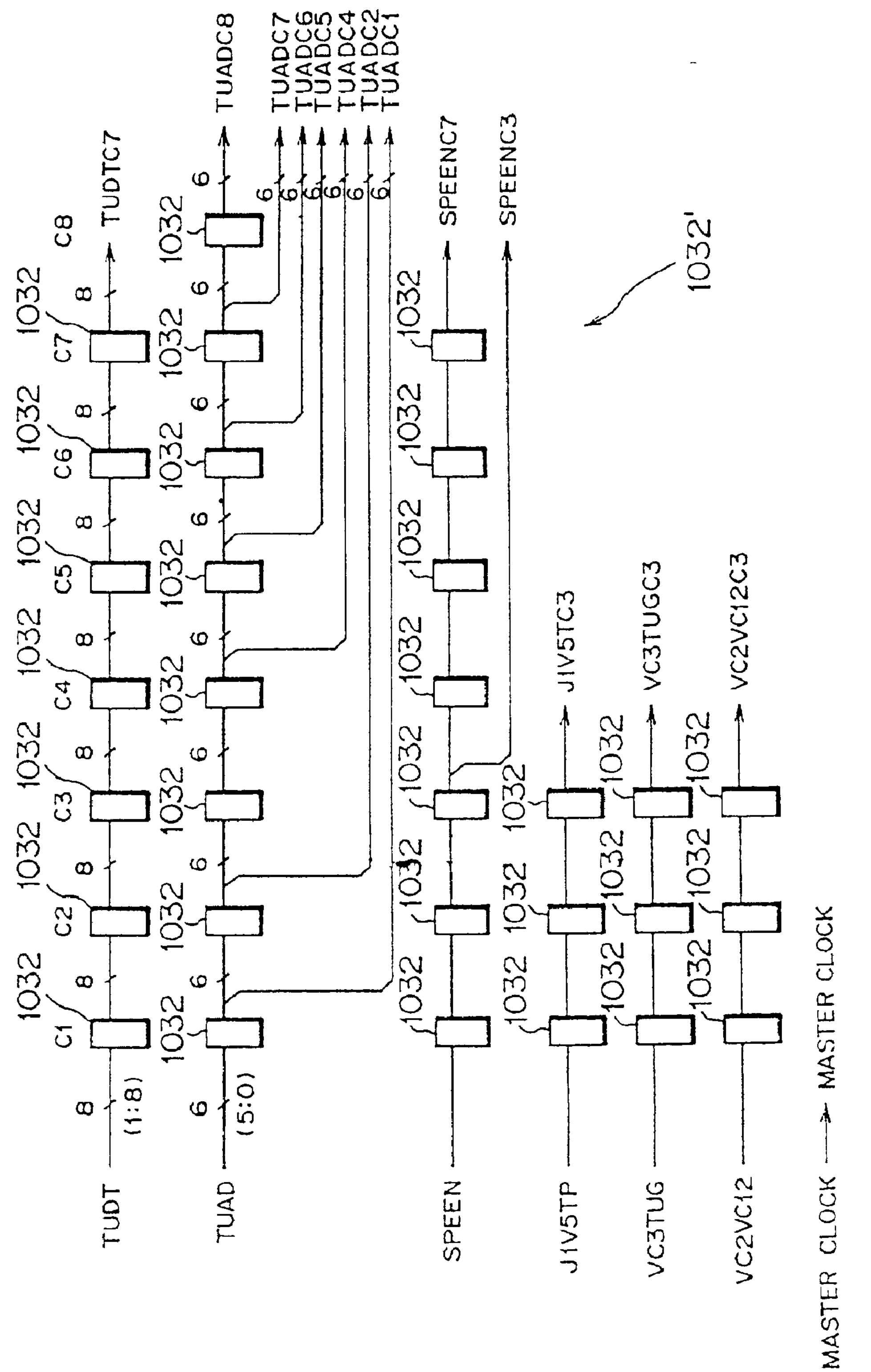
FIG. 69 is a block diagram showing a detailed structure of a phase shifting unit according to the embodiment.

FIG. 69 is a block diagram showing a detailed structure of the above phase shifting unit 1032'. As shown in FIG. 69, the phase shifting unit 1032' delays a phase of each of signals [TUDT (TU data), a TU address signal, an SPE enable signal, a J1V5 timing signal, a mapping signal (VC3TUG/VC2VC12)] inputted from the TU pointer processing unit 1006 by predetermined quantities, respectively. To this end, the phase shifting unit 1032 has FF circuits 1032 each in predetermined stages for delaying phases (C1 through C8) of the above input signals by one clock of a master clock.

In the phase shifting unit 1032' with the above structure, phases of TU data of the VC4 signal, a TU address signal indicating a TU channel, the SPE enable signal indicating a position of payload data of the TU data, the J1V5 timing signal indicating a leading position of the TU data, the mapping signal used to discriminate TU3/TU2/TU12 are shifted by predetermined quantities in the FF circuits 1032 in predetermined stages, respectively, and used in a serial process and the POH serially terminating process in the overhead counter serially processing unit 1033.

At that time, in the phase shifting unit 1032', the FF circuit 1032 in seven stages shifts a phase of the TU data by 7 clocks (C1→C7), thereby generating the TU address signal (TUDTC7) in a phase C7, in concrete. The FF circuit 1032 in 8 stages shifts a phase of the TU address signal by 1 to 8 clocks, thereby generating TU address signals (TUADC1–8) in respective phases C1–C8.

The FF circuit 1032 in 7 stages shifts a phase of the SPE enable signals by 7 clocks, thereby generating an SPE enable signal (SPEENC7) in a phase C7. At the same time, the FF circuit 1032 in the first to third stages shifts a phase of the SPE enable signal by 3 clocks, thereby generating the SPE enable signal (SPEENC3) in a phase C3.

The FF circuits 1032 each in 3 stages shift phases of the J1V5 timing signal and the mapping signals (VC3TUG/VC2VC12) by 3 clocks, thereby generating a J1V5 timing signal (J1V5TPC3) and mapping signals (VC3TUGC3/VC2VC212C3) all in a phase C3.

Figure 70:
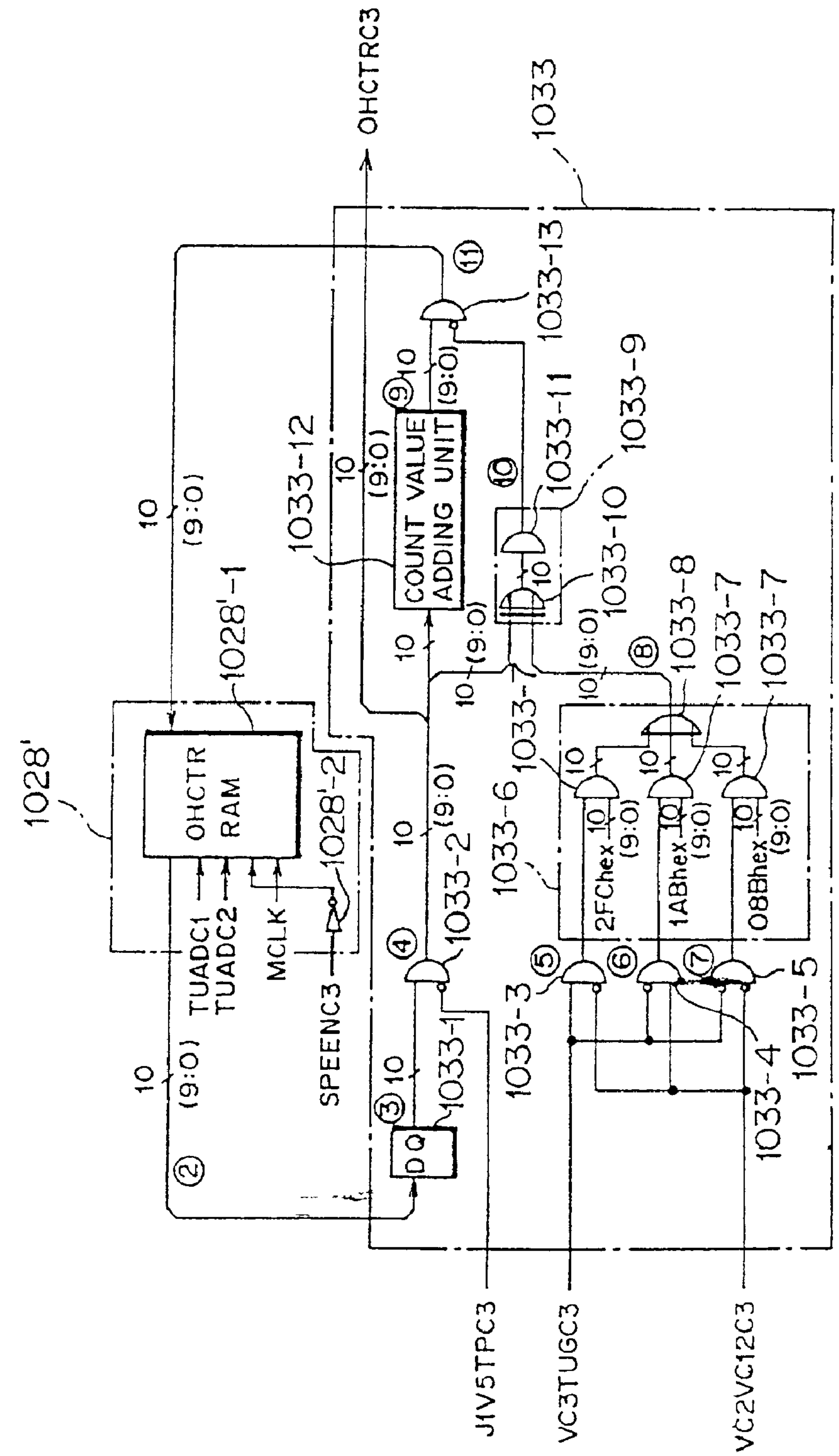
FIG. 70 is a block diagram showing detailed structures of an overhead counter RAM holding unit and an overhead counter serially processing unit according to the embodiment.

FIG. 70 is a block diagram showing detailed structures of the overhead counter RAM holding unit 1028' and the overhead counter serially processing unit 1033 mentioned above. As shown in FIG. 70, the overhead counter RAM holding unit 1028' has an overhead counter RAM 1028'-1 and an inverting element 1028'-2 for inverting polarity of an input signal. The overhead counter serially processing unit 1033 has an FF circuit 1033-1, a zero byte controlling unit (AND circuit of a one-input inverting type) 1033-2, a TU3 detecting unit (AND circuit of a one-input inverting type) 1033-3, a TU2 detecting unit (AND circuit of one-input inverting type) 1033-4, a TU12 detecting unit (AND circuit of an all-inputs inverting type) 1033-5, a maximum value setting unit 1033-6, a maximum value detecting unit 1033-9, a count value adding unit 1033-12, and a count value initialization controlling unit (AND circuit of a one-input inverting type) 1033-13.

In the overhead counter RAM holding unit 1028', the overhead counter RAM 1028'-1 holds information as to which position a processing byte of SPE data is in counted from J1 byte and V5 byte as the 0th byte. The overhead counter RAM 1028'-1 is operated with the TU address signal in the phase C1 (TUADCL) supplied from the above phase shifting unit 1032' as a read address, the TU address signal in the phase C2 (TUADC2) as a write address, a signal obtained by inverting the SPE enable signal in the phase C3 (SPEENC3) by the inverting element 1028'-2 as a write enable and the master clock as a RAM clock.

In the overhead counter serially processing unit 1033, the FF circuit 1033-1 temporarily holds information (count value) read out from the overhead counter RAM 1028'-1. The zero byte controlling unit 1033-2 controls to make a count value be 0 when inputted the J1V5 timing signal (J1VTTPC3) indicating a leading position of the TU data. On the basis of a signal having been controlled (OHCTRC3), various POH timings used in the POH terminating process are generated.

The TU3 detecting unit 1033-3 detects that a TU channel that should be processed is TU3, whose function is realized using an AND circuit (logical product circuit) for obtaining a logical product of the above VC3TUGC3 and an inverted signal of VC2VC12C3. The TU2 detecting unit 1033-4 detects that a TU channel that should be processed is TU2, whose function is realized using an AND circuit for obtaining a logical product of an inverted signal of the above VC3TUGC3 and VC2VC12C3.

The TU12 detecting unit 1033-5 detects that a TU channel that should be processed is TU12, whose function is realizing using an AND circuit for obtaining a logical product of an inverted signal of the above VC3TUGC3 and an inverted signal of VC2VC12C3.

The maximum value setting unit 1033-6 selects a maximum value of a count value according to setting of TU3/TU2/TU12. Here, a maximum value [TU3: 2FC(hex), TU2: 1AB(hex), TU12: 08B(hex)] corresponding to any one which reaches the H level among outputs of the TU3 detecting unit 1033-3, the TU2 detecting unit 1033-4 and the TU12 detecting unit 1033-5 mentioned above is selected and outputted through an AND circuit 1033-7 and an OR circuit (logical sum circuit) 1033-8.

The maximum value detecting unit 1033-9 detects whether a count value having been controlled by the zero byte controlling unit 1033-2 coincides with a maximum value set (selectively outputted) by the maximum value setting unit 1033-6 or not, whose function is realized using an EXOR circuit (exclusive-OR circuit) 1033-10 and an OR circuit 1033-11. When the maximum value detecting unit 1033-9 detects a maximum value, it means that the SPE data is the last byte so that SPE data of the next same TU channel is J1 byte or V5 byte which is the lead of TU data.

The count value adding unit 1033-12 adds 1 to a count value having been controlled by the zero byte controlling unit 1033-2. Since when a maximum value is detected by the maximum value detecting unit 1033-9, SPE data that should be processed next is J1 byte or V5 byte which is the lead of TU data, as mentioned above, the count value initialization controlling unit 1033-13 controls a count value that should be held in the overhead counter RAM 1028'-1 to be 0 indicating J1 byte or V5 byte.

The overhead counter serially processing unit 1033 with the above structure can serially generate an overhead (SPE)

count value (OHCTRC3) necessary when the timing signal generating process unit 1031 generates various POH timing signals.

Figure 71:
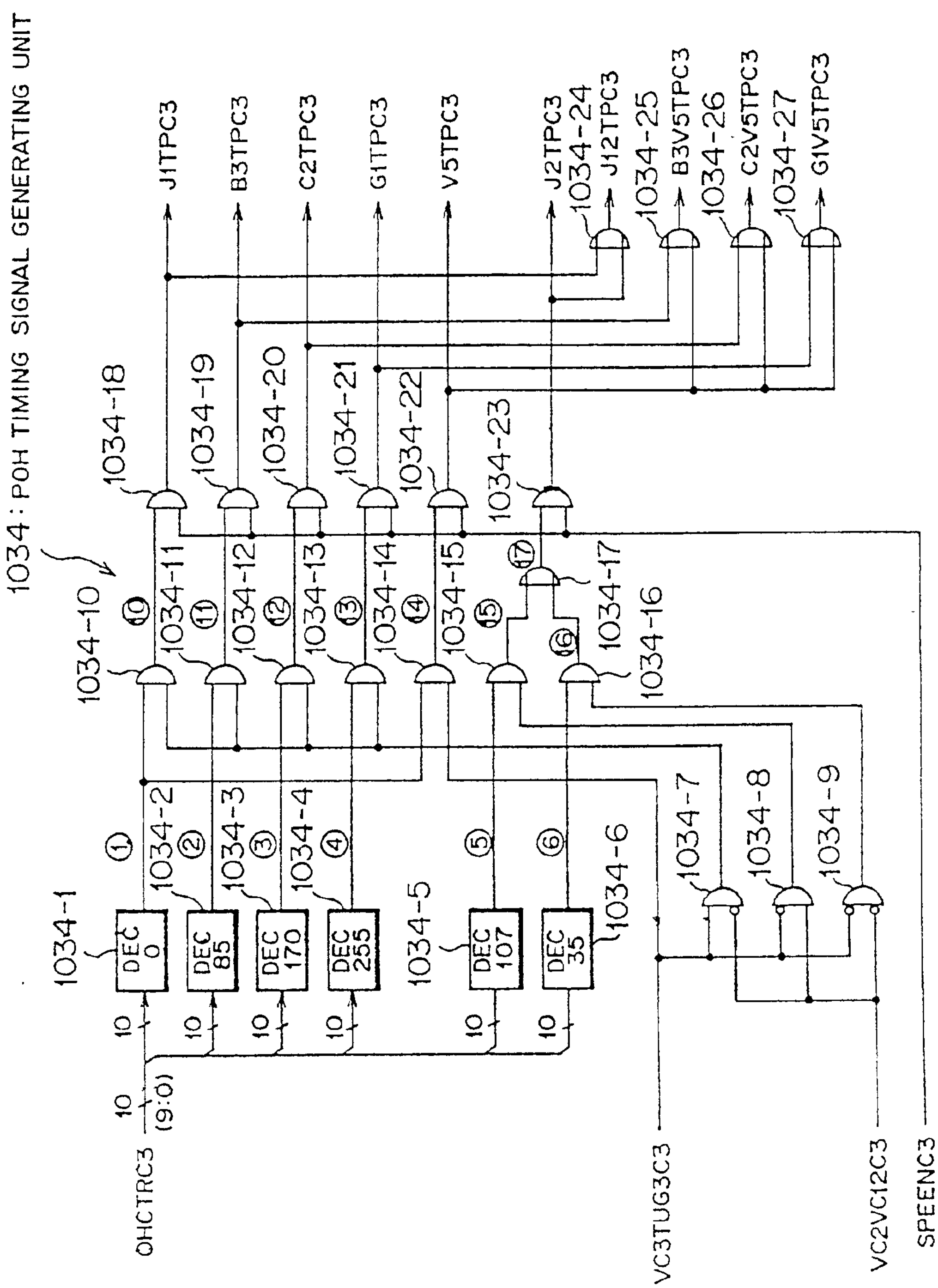
FIG. 71 is a block diagram showing a detailed structure of a POH timing signal generating unit according to the embodiment.

FIG. 71 is a block diagram showing a detailed structure of the POH timing signal generating unit 1034 shown in FIG. 68. The POH timing signal generating unit 1034 shown in FIG. 71 has parts below:

- a decoding circuit (DEC) 1034-1: detecting (decoding) 0 of an SPE count value (OHCTRC3);
- a decoding circuit (DEC) 1034-2: detecting (decoding) 85 of the SPE count value (OHCTRC3);
- a decoding circuit (DEC) 1034-3: detecting (decoding) 170 of the SPE count value (OHCTRC3);
- a decoding circuit (DEC) 1034-4: detecting (decoding) 255 of the SPE count value (OHCTRC3);
- a decoding circuit (DEC) 1034-5: detecting (decoding) 107 of the SPE count value (OHCTRC3);
- a decoding circuit (DEC) 1034-6: detecting (decoding) 35 of the SPE count value (OHCTRC3);
- a TU3 detecting unit (AND circuit of a 1-input inverting type) 1034-7: detecting that a TU channel that should be processed is TU3;
- a TU 2 detecting unit (AND circuit of a 1-input inverting type) 1034-8: detecting that a TU channel that should be processed is TU2;
- a TU 12 detecting unit (AND circuit of an all-inputs inverting type) 1034-9: detecting that a TU channel that should be processed is TU12;
- a J1 condition detecting unit (AND circuit) 1034-10: detecting that a TU channel that should be processed is at the 0th byte of TU3;
- a B3 condition detecting unit (AND circuit) 1034-11: detecting that a TU channel that should be processed is at the 85th byte of TU3;
- a C2 condition detecting unit (AND circuit) 1034-12: detecting that a TU channel that should be processed is at the 170th byte of TU3;
- a G1 condition detecting unit (AND circuit) 1034-13: detecting that a TU channel that should be processed is at the 255th byte of TU3;
- a V5 condition detecting unit (AND circuit of a 1-input inverting type) 1034-14: detecting that a TU channel that should be processed is at the 0th byte of TU2/TU12;
- a TU2J2 condition detecting unit (AND circuit) 1034-15: detecting that a TU channel that should be processed is at the 107th byte of TU2;
- a TU12J2 condition detecting unit (AND circuit) 1034-16: detecting that a TU channel that should be processed is at the 35th byte of TU12;
- a J2 condition detecting unit (OR circuit) 1034-17: detecting that a J2 condition of TU2/TU12 is detected by the TU2J2 condition detecting unit 1034-15 or the TU12J2 condition detecting unit 1034-16 mentioned above;
- a J1 timing signal generating unit (AND circuit) 1034-18: obtaining a logical product of an output signal of the above J1 condition detecting unit 1034-10 and the SPE enable signal to generate a signal indicating a position of J1 byte;
- a B3 timing signal generating unit (AND circuit) 1034-19: obtaining a logical product of an output signal of the above B3 condition detecting unit 1034-11 and the SPE enable signal to generate a signal indicating a position of B3 byte;
- a C2 timing signal generating unit (AND circuit) 1034-20: obtaining a logical product of an output signal of the above C2 condition detecting unit 1034-12 and the SPE enable signal to generate a signal indicating a position of C2 byte;
- a G1 timing signal generating unit (AND circuit) 1034-21: obtaining a logical product of an output signal of the above G1 condition detecting unit 1034-13 and the SPE enable signal to generate a signal indicating a position of G1 byte;
- a V5 timing signal generating unit (AND circuit) 1034-22: obtaining a logical product of an output signal of the above V5 condition detecting unit 1034-14 and the SPE enable signal to generate a signal indicating a position of V5 byte;
- a J2 timing signal generating unit (AND circuit) 1034-23: obtaining a logical product of an output signal of the above J2 condition detecting unit 1034-17 and the SPE enable signal to generate a signal indicating a position of J2 byte;
- a J1J2 timing signal generating unit (OR circuit) 1034-24: generating a signal indicating a position of J1 byte or J2 byte;
- a B3V5 timing signal generating unit (OR circuit) 1034-25: generating a signal indicating a position of B3 byte or V5 byte;
- a C2V5 timing signal generating unit (OR circuit) 1034-26: generating a signal indicating a position of C2 byte or V5 byte; and
- a G1V5 timing signal generating unit (OR circuit) 1034-27: generating a signal indicating a position of G1 byte or V5 byte.

A reason why each of the above timing signal generating units 1034-18 through 1034-23 obtains a logical product of an input signal and the SPE enable signal is to prevent a condition of detecting each byte from being established in a corresponding detecting unit 1034-10, 1034-11, . . . or 1034-17 at a timing that is not of SPE data of TU (that is, preventing a timing signal from being generated at a wrong timing) so as to always generate various timing signals at accurate timings.

The above POH timing signal generating unit 1034 can serially generate various POH timing signals (signals indicating position of J1, B3, C2, G1, V5, J2 bytes, etc.) necessary in the terminating process conducted in each of the terminating process units 1022 through 1025 (refer to FIG. 62) described later.

Figure 72:
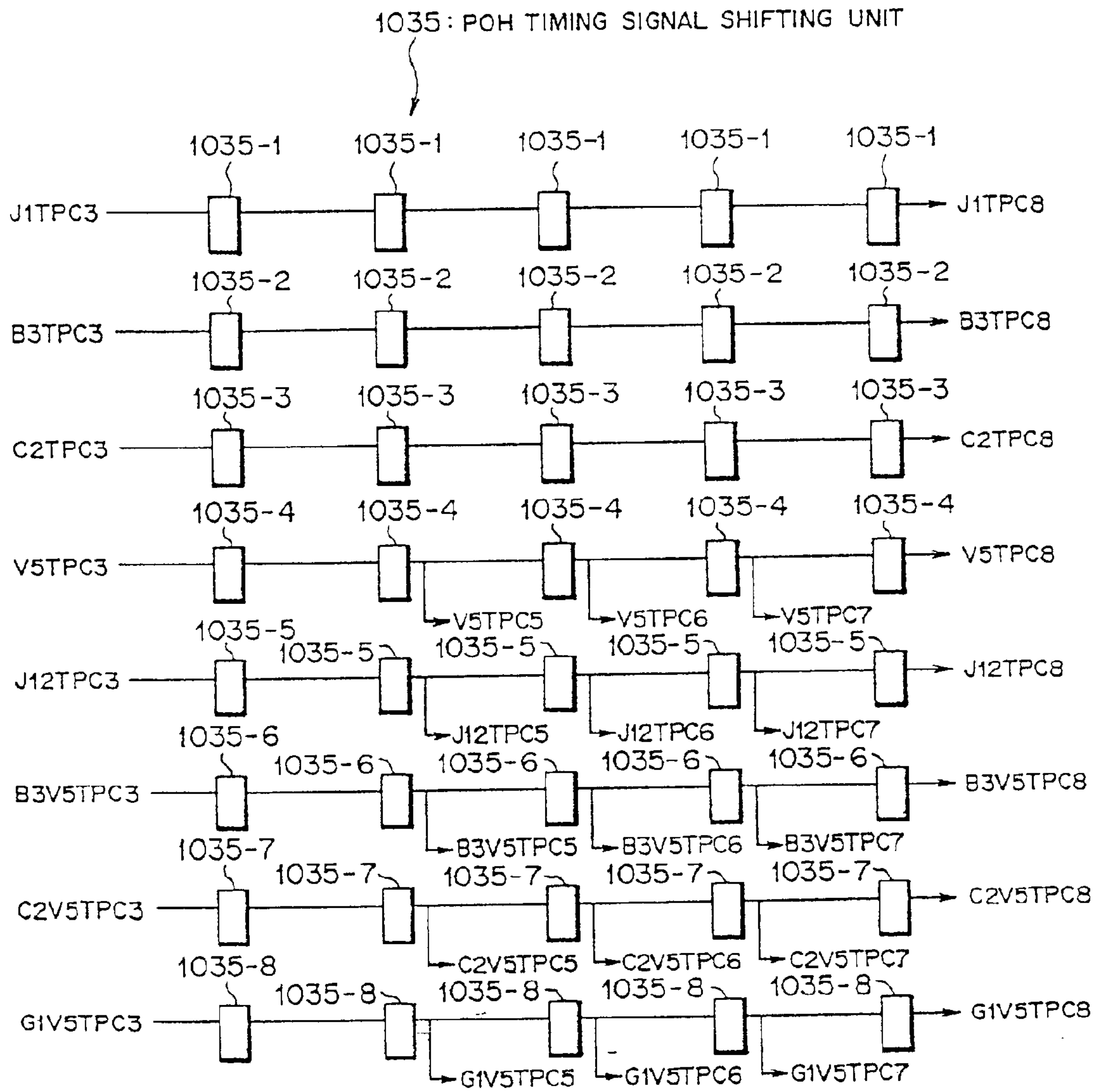
FIG. 72 is a block diagram showing a detailed structure of a POH timing signal shifting unit according to the embodiment.

FIG. 72 is a block diagram showing a detailed structure of the POH timing signal shifting unit 1035 shown in FIG. 68. As shown in FIG. 72, the POH timing signal shifting unit 1035 has FF circuits 1035-1 through 1035-8 for delaying respective input signals by one clock of the master clock to shift phases of various POH timing signals generated in the above POH timing signal generating unit 1034 so that the POH timing signals have phases each suitable for the POH terminating process conducted in each of the terminating process units 1022 through 1025.

For instance, a phase C3 of the J1 timing signal (J1TPC3) is delayed by 5 clocks in the FF circuit 1035-1 in 5 stages so that the J1 timing signal (JITPC3) becomes J1TPC8. A phase C3 of the B3 timing signal (B3TPC3) is delayed by 5 clocks in the FF circuit 1035-2 in 5 stages so that the B3 timing signal (B3TPC3) becomes B3TPC8. A phase C3 of the C2 timing signal (C2TPC3) is delayed by 5 clocks in the FF circuit 1035-3 in 5 stages so that the C2 timing signal (C2TPC3) becomes C2TPC8.

Phases C3 of the V5 timing signal (V5TPC3), the J12 timing signal (J12TPC3), the B3V5 timing signal (B3V5TPC3), the C2V5 timing signal (C2V5TPC3) and the G1V5 timing signal (G1V5TPC3) are delayed by 2 to 5 clocks in the FF circuits 1035-4 through 1035-8, respectively, so that they become V5TPC5–C8, J12TPC3–C8, B3V5TPC3–C8, C2V5TPC3–C8 and G1V5TPC3–C8.

Figure 73:
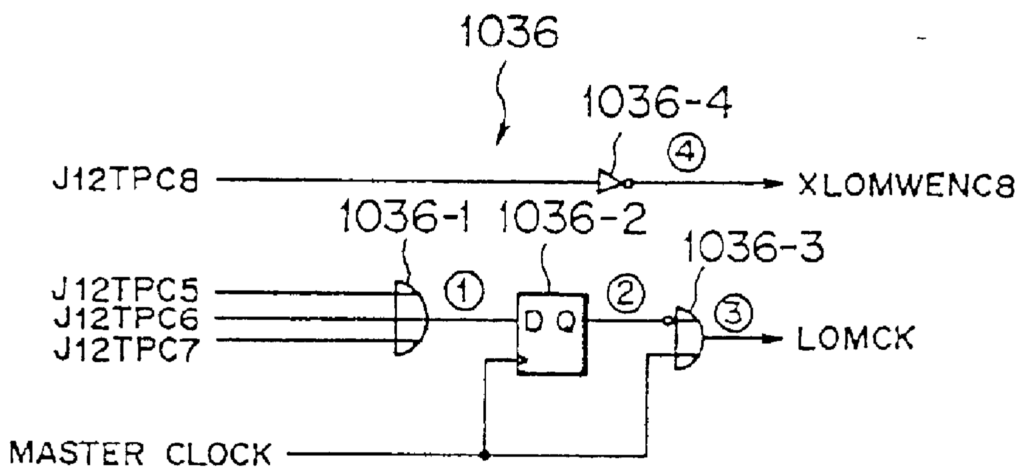
FIG. 73 is a block diagram showing a detailed structure of an LOM holding RAM operation controlling unit according to the embodiment.

FIG. 73 is a block diagram showing a detailed structure of the LOM holding RAM operation controlling unit 1036 shown in FIG. 68. As shown in FIG. 73, the LOM holding RAM operation controlling unit 1036 has an operation mask generating unit (OR circuit) 1036-1, an FF circuit 1036-2, a clock masking unit (OR circuit of a 1-input inverting type) 1036-3 and an inverting element 1036-4.

The operation clock mask generating unit 1036-1 generates a clock mask for capturing a read address for the LOM holding RAM 1050-1 (refer to FIG. 86) in the J1/J2 byte terminating process unit 1022 described later from J12TPC5, a clock mask for capturing a write address for the LOM holding RAM 1050-1 from J12TPC6, and a clock mask for writing data in the LOM holding RAM 1050-1 from J12TPC7 among the J12 timing signals (J12TPC5–C8) generated by shifting their phases by the above POH timing signal shifting unit 1035.

The FF circuit 1036-2 delays an output (clock mask) of the operation clock mask generating unit 1036-1 by one clock. The clock masking unit 1036-3 masks the master clock using the clock mask fed from the FF circuit 1036-2 to generate a clock edge (LOMCK) necessary to read out or write in the LOM holding RAM 1050-1. The inverting element 1036-4 inverts polarity of J12TPC8 to generate a write enable signal (XLOMWEN) in negative polarity for the LOM holding RAM 1050-1.

The above LOM holding RAM operation controlling unit 1036 can operate the LOM holding RAM 1050-1 at optimum timings using the clock edge (LOMCK) and the write enable signal (XLOMWEN) generated as above.

Figure 74:
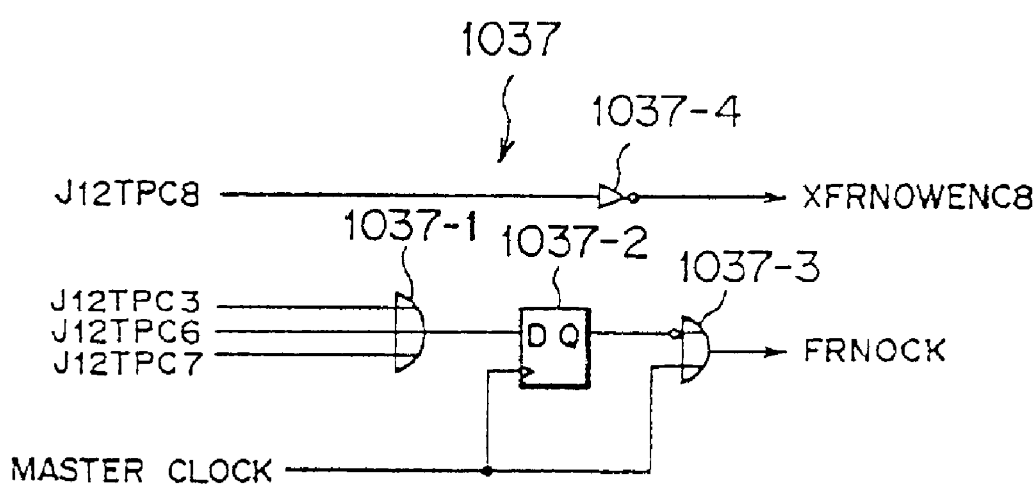
FIG. 74 is a block diagram showing a detailed structure of an FRNO holding RAM operation controlling unit according to the embodiment.

FIG. 74 is a block diagram showing a detailed structure of the FRNO holding RAM operation controlling unit 1037 shown in FIG. 68. As shown in FIG. 74, the FRNO holding RAM operation controlling unit 1037 has, similarly to the above LOM holding RAM operation controlling unit 1036, an operation clock mask generating unit (OR circuit) 1037-1, an FF circuit 1037-2, a clock masking unit (OR circuit of a 1-input inverting type) 1037-3 and an inverting element 1037-4.

The operation clock mask generating unit 1037-1 generates a clock mask for capturing a read address for an FRNO holding RAM 1051-1 (refer to FIG. 87) in the J1/J2 byte terminating process unit 1022 described later from J12TPC3, a clock mask for capturing a write address for the FRNO holding RAM 1051-1 from J12TPC6 and a clock mask for writing data in the FRNO holding RAM 1051-1 from J12TPC7 out of the J12 timing signal (J12TPC3) generated by the above POH timing signal generating unit 1034 and the J12 timing signals (J12TPC5–C8) generated by shifting their phases by the POH timing signal shifting unit 1035.

The FF circuit 1037-2 delays an output (clock mask) of the operation clock mask generating unit 1037-1 by one clock of the master clock. The clock masking unit 1037-3 masks the master clock using the clock mask fed from the FF circuit 1037-2 to generate a clock edge (FRNOCK) necessary to read out or write in the FRNO holding RAM 1051-1. The inverting element 1037-4 inverts polarity of J12TPC8 to generate a write enable signal (XFRNOWEN) in negative polarity for the FRNO holding RAM 1051-1.

The above FRNO holding RAM operation controlling unit 1037 can operate the FRNO holding RAM 1051-1 at optimum timings using the clock edge (FRNOCK), the write enable signal (XFRNOWEN) generated as above.

Figure 75:
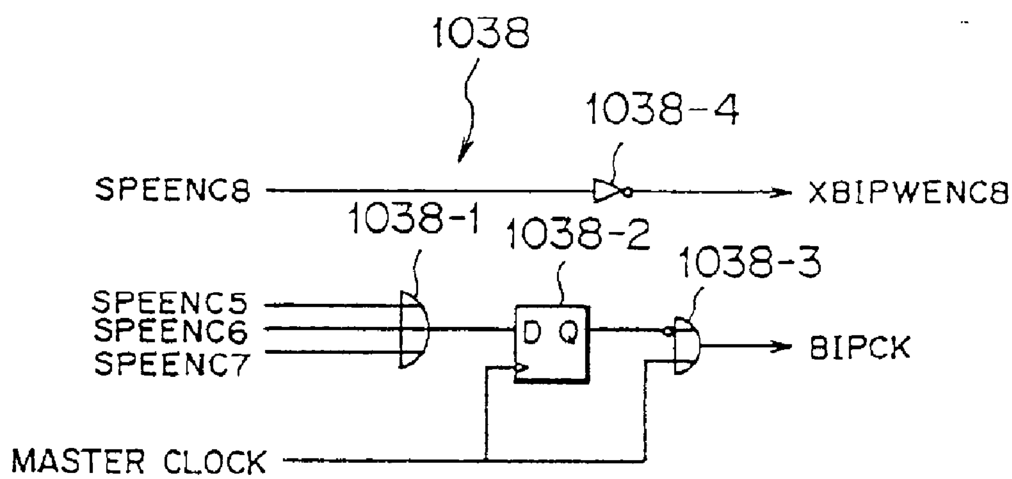
FIG. 75 is a block diagram showing a detailed structure of a BIP2 holding RAM operation controlling unit according to the embodiment.

Next, FIG. 75 is a block diagram showing a detailed structure of the BIP2 holding RAM operation controlling unit 1038 shown in FIG. 68. As shown in FIG. 75, the BIP2 holding RAM operation controlling unit 1038 according to this embodiment has, similarly to the above FRNO holding RAM operation controlling unit 1037, an operation clock mask generating unit (OR circuit) 1038-1, an FF circuit 1038-2, a clock masking unit (OR circuit of a 1-input inverting type) 1038-3 and an inverting element 1038-4.

The operation clock mask generating unit 1038-1 generates a clock mask for capturing a read address for a PIB2 holding RAM 1054-1 (refer to FIG. 110) in the B3/V5 byte terminating process unit 1023, which will be described later, from SPEENC5, a clock mask for capturing a write address for the BIP2 holding RAM 1054-1 from SPEENC6 and a clock mask for writing data in the BIP2 holding RAM 1054-1 from SPEENC7 out of the SPE enable signals (SPEENC5–C8) generated by shifting their phases by the above POH timing signal shifting unit 1035.

The FF circuit 1038-2 delays an output (clock mask) of the operation mask generating unit 1038-1 by one clock of the master clock. The clock masking unit 1038-3 masks the master clock using the clock mask fed from the FF circuit 1038-2 to generate a clock edge (BIPCK) necessary to read out or write in the BIP2 holding RAM 1054-1. The inverting element 1038-4 inverts polarity of SPEENC8 to generate a write enable signal (XBIPWENC8) in negative polarity for the BPI2 holding RAM 1054-1.

Whereby, the above BIP2 holding RAM operation controlling unit 1038 can operate the BIP2 holding RAM 1054-1 at optimum timings using the above clock edge (BIPCK) and the write enable signal (XBIPWENC8).

Figure 76:
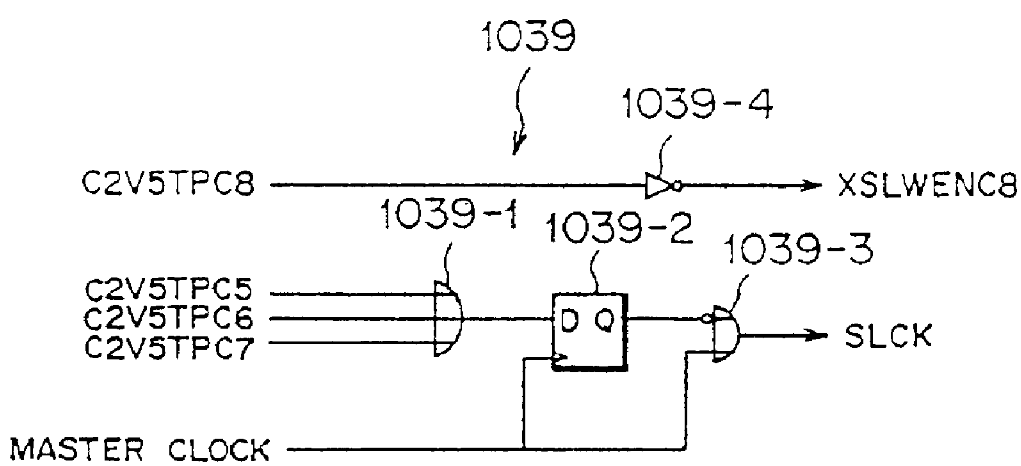
FIG. 76 is a block diagram showing a detailed structure of an SL holding RAM operation controlling unit according to the embodiment.

FIG. 76 is a block diagram showing a detailed structure of the SL holding RAM operation controlling unit 1039 shown in FIG. 68. The SL holding RAM operation controlling unit 1039 according to this embodiment has, similarly to the above BIP2 holding RAM operation controlling unit 1038, an operation clock mask generating unit (OR circuit) 1039-1, an FF circuit 1039-2, a clock masking unit (OR circuit of a 1-input inverting type) 1039-3 and an inverting element 1039-4.

The operation clock mask generating unit 1039-1 generates a clock mask for capturing a read address for an SL holding RAM 1072-1 (refer to FIG. 129) in the V2/V5 byte terminating process unit 1024 from C2V5TPC5, a clock mask for capturing a write address in the SL holding RAM 1072-1 from C2V5TPC6 and a clock mask for writing data in the SL holding RAM 1072-1 from C2V5TPC7 out of the C2V5 timing signals (C2V5TPC5–C8) generated by shifting their phases by the above POH timing signal shifting unit 1035.

The FF circuit 1039-2 delays an output (clock mask) of the operation clock mask generating unit 1039-1 by one clock of the master clock. The clock masking unit 1039-3 masks the master clock using the clock mask fed from the FF circuit 1039-2 to generate a clock edge (SLCK) necessary to read out and write in the SL holding RAM 1072-1. The inverting element 1039-4 inverts polarity of C2V5TPC8 to generate a write enable signal (XSLWENC8) in negative polarity for the SL holding RAM 1072-1.

The above SL holding RAM operation controlling unit 1039 can thereby operate the SL holding RAM 1072-1 at optimum timings using the above clock edge (SLCK) and the write enable signal (XSLWENC8).

Figure 77:
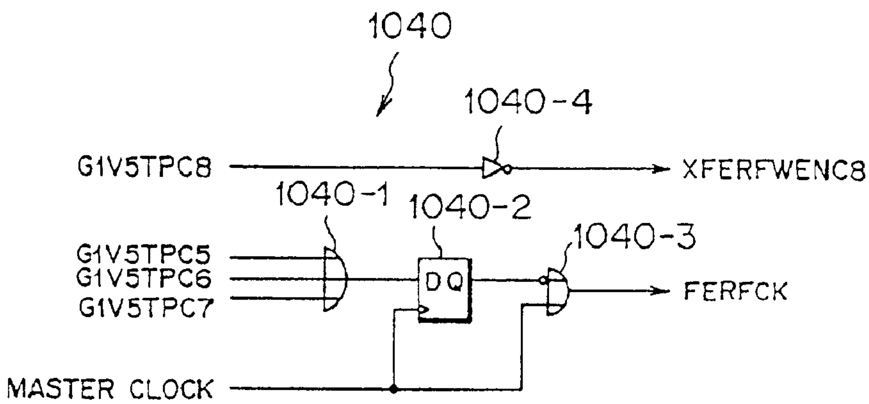
FIG. 77 is a block diagram showing a detailed structure of an FERF holding RAM operation controlling unit according to the embodiment.

FIG. 77 is a block diagram showing a detailed structure of the FERF holding RAM operation controlling unit 1040 shown in FIG. 68. As shown in FIG. 77, the FERF holding RAM operation controlling unit 1040 according to this embodiment has, similarly to the above SL holding RAM operation controlling unit 1039, an operation clock mask generating unit (OR circuit) 1040-1, an FF circuit 1040-2, a clock masking unit (OR circuit of a 1-input inverting type) 1040-3 and an inverting unit 1040-4.

The operation clock mask generating unit 1040-1 generates a clock mask for capturing a read address for an FERF holding RAM 1096-1 (refer to FIG. 141) in the G1/V5 byte terminating process unit 1025 from GIV5TPC5, which will be described later, a clock mask for capturing a write address for the FERF holding RAM 1096-1 from G1V5TPC6 and a clock mask for writing data in the FERF holding RAM 1096-1 from G1V5TPC7 out of the G1V5 timing signals (G1V5TPC5–C8) generated by shifting their phases by the above POH timing signal shifting unit 1035.

The FF circuit 1040-2 delays an output (clock mask) of the operation clock mask generating unit 1040-1 by one clock of the master clock. The clock masking unit 1040-3 masks the master clock using the clock mask fed from the FF circuit 1040-2 to generate a clock edge (FERFCK) necessary to read-out or write-in the FERF holding RAM 1096-1. The inverting element 1040-4 inverts polarity of G1V5TPC8 to generate a write enable signal (XFERFWENC8) in negative polarity for the FERF holding RAM 1096-1.

The above FERF holding RAM operation controlling unit 1040 can thereby generate the clock edge (FERFCK) and the write enable signal (XFRFWENCE8) to operate the FERF holding RAM 1096-1 at optimum timings.

Figure 78:
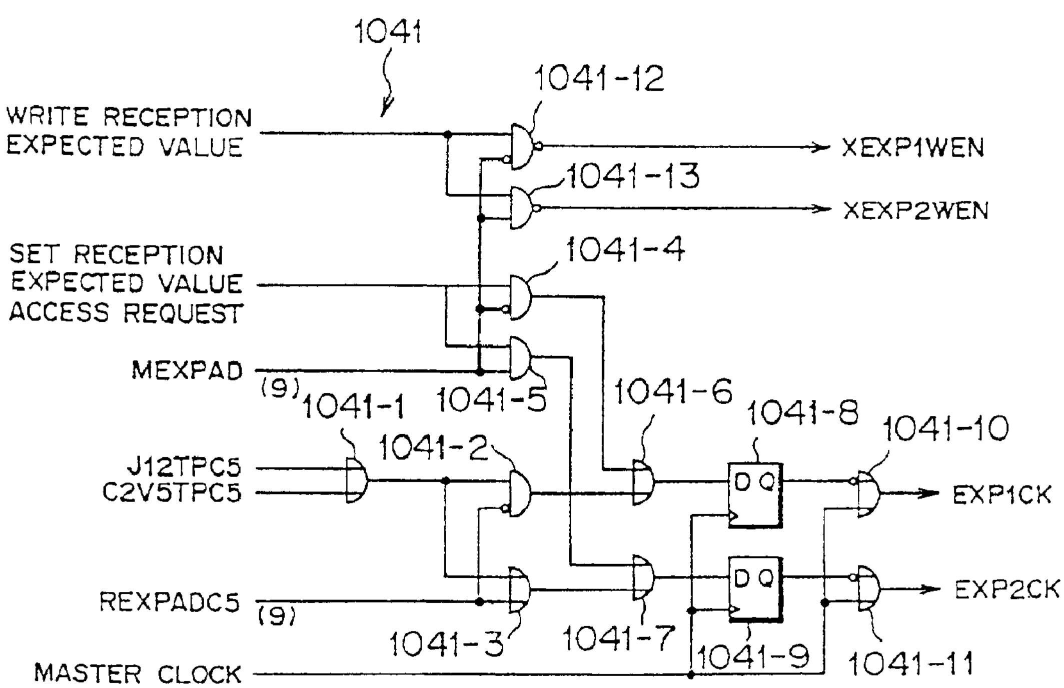
FIG. 78 is a block diagram showing a detailed structure of a reception expected value holding RAM operation controlling unit according to the embodiment.

FIG. 78 is a block diagram showing a detailed structure of the reception expected value holding RAM operation controlling unit 1041 shown in FIG. 68. As shown in FIG. 78, the reception expected value holding RAM operation controlling unit 1041 according to this embodiment has a reception expected value read request detecting unit (OR circuit) 1041-1, an EXP1 expected value reading operation clock mask generating unit (AND circuit of a 1-input inverting type) 1041-2, an EXP2 expected value reading operation clock mask generating unit (AND circuit) 1041-3, an EXP1 expected value setting access operation clock mask generating unit (AND circuit of a 1-input inverting type) 1041-4, an EXPE2 expected value setting access operation clock mask generating unit (AND circuit) 1041-5, an EXP1 clock mask generating unit (OR circuit) 1041-6, an EXP2 clock mask generating unit (OR circuit) 1041-7, FF circuits 1041-8 and 1041-9, an EXP1 clock masking unit (OR circuit of a 1-input inverting type) 1041-10, an EXP2 clock masking unit (OR circuit of a 1-input inverting type) 1041-11, an EXP1 write enable generating unit (AND circuit of a 1-input inverting type) 1041-12 and an EXP2 write enable generating unit (NAND circuit) 1041-13.

The reception expected value read request detecting unit 1041-1 detects timings of reading a reception expected value of path trace data of J1 or J2 byte and a signal label reception expected value of C2 or V5 byte. The EXP1 expected value reading operation clock mask generating unit 1041-2 generates a clock mask for capturing a read address for the EXP2 holding RAM 1048-1 in order to read a reception expected value from the EXP1 holding RAM 1048-1 (refer to FIG. 95) if the most significant bit of the read address of the reception expected value of REXPADC5 (refer to FIG. 95), which will be described later, is "0".

The EXP2 expected value reading operation clock mask generating unit 1041-3 generates a clock mask for capturing a read address for the EXP2 holding RAM 1048-2 in order to read a reception expected value form the EXP2 holding RAM 1048-2 if the most significant bit of the read address of the reception expected value of the above REXPADC5 is "1". The EXP1 expected value setting access operation clock mask generating unit 1041-4 generates a clock mask for the EXP1 holding RAM 1048-1 in order to read-out or write-in the EXP1 holding RAM 1048-1 if the most significant bit of MEXPAD of the read/write address on the software's side is "0" when the software (the microcomputer 1010: refer to FIG. 56) set a reception expected value or read set contents.

The EXP2 expected value setting access operation clock mask generating unit 1041-5 generates a clock mask for the EXP2 holding RAM 1048-2 in order to read-out/write-in the EXP2 holding RAM 1048-2 if the most significant bit of the above MEXPAD is "1" when the software set a reception expected value or read set contents.

The EXP1 clock mask generating unit 1041-6 obtains a logical sum of clock mask signals generated by the EXP1 expected value reading operation clock mask generating unit 1041-2 and the EXP1 expected value setting access operation clock mask generating unit 1041-4 mentioned above. The EXP2 clock mask generating unit 1041-7 obtains a logical sum of clock mask signals generated by the EXP2 expected value reading operation clock mask generating unit 1041-3 and the EXP2 expected value setting access operation clock mask generating unit 1041-5 mentioned above.

The FF circuit 1041-8 delays an output (EXP1 clock mask) of the above EXP1 clock mask generating unit 1041-6 by one clock of the master clock. The FF circuit 1041-9 delays an output (EXP2 clock mask) of the above EXP2 clock mask generating unit 1041-7 by one clock of the master clock.

The EXP1 clock masking unit 1041-10 masks the master clock using an output (EXP1 clock mask) of the FF circuit 1041-8 to generate a clock edge (EXP1CK) necessary to read/write data (EXP1) held in the EXP1 holding RAM 1048-1. The EXP2 clock masking unit 1041-11 masks the master clock using an output (EXP2 clock mask) of the FF circuit 1041-9 to generate a lock edge (EXP2CK) necessary to read/write data (EXP2) held in the EXP2 holding RAM 1048-2.

The EXP1 write enable generating unit 1041-12 generates a write enable (XEXP1WEN) for the EXP1 holding RAM 1048-1 in order to write data in the EXP1 holding RAM 1048-1 if the most significant bit of the above MEXPAD is "0" when the software write a reception expected value. The EXP2 write enable generating unit 1041-13 generates writes enable (XEXP2WEN) for the EXP2 holding RAM 1048-2 in order to write data in the EXP2 holding RAM 1048-2 if the most significant bit of the above MEXPAD is "1" when the software write a reception expected value.

The above reception expected value holding RAM operation controlling unit 1041 can thereby generate the clock edges (EXP1CK and EXP2CK) and the write enables (XEXP1WEN and XEXP2WEN) mentioned above to operate the EXP1 holding RAM 1048-1 and the EXP2 holding RAM 1048-2 at optimum timings.

Figure 79:
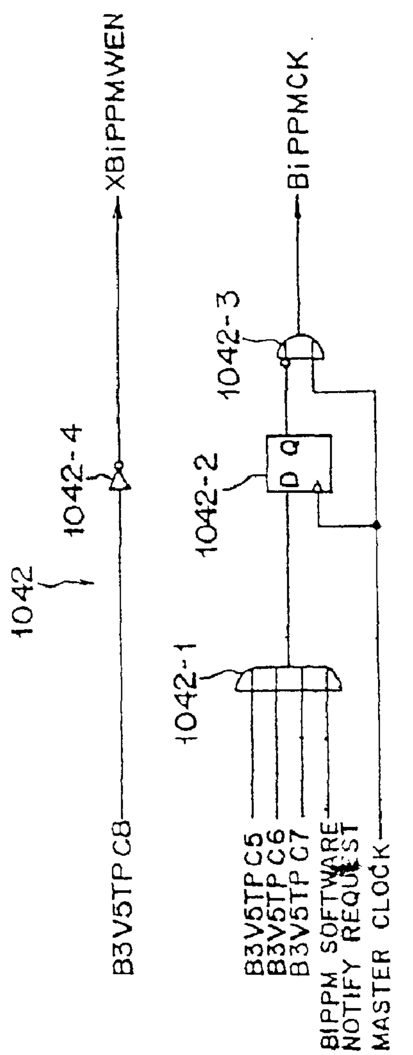
FIG. 79 is a block diagram showing a detailed structure of a BIPPM holding RAM operation controlling unit according to the embodiment.

FIG. 79 is a block diagram showing a detailed structure of the BIPPM holding RAM operation controlling unit 1042 shown in FIG. 68. As shown in FIG. 79, the BIPPM holding RAM operation controlling unit 1042 according to this embodiment has, similarly to the SL holding RAM operation controlling unit 1039 shown in FIG. 77, an operation clock mask generating unit (OR circuit) 1042-1, an FF circuit 1042-2, a clock masking unit (OR circuit of a 1-input inverting type) 1042-3 and an inverting element 1042-4.

The operation clock mask generating unit 1042-1 generates a clock mask for capturing a read address for a BIPPM holding RAM 1058-1 (refer to FIG. 112) in the B3/V5 byte terminating process unit 1023, which will be described later, from B3V5TPC5, a clock mask for capturing a write address for the BIPPM holding RAM 1058-1 from B3V5TPC6 and a clock mask for writing data in the BIPPM holding RAM 1058-1 from B3V5TPC7 out of the B3V6 timing signals (B3V5TPC5–C8) generated by shifting their phases by the POH timing signal shifting unit 1035, besides generating a clock mask for capturing an address to read a count value of BIPPM from a BIPPM software notification request signal fed from the software's side.

The FF circuit 1042-2 delays an output (clock mask) of the operation clock mask generating unit 1042-1 by one clock of the master clock. The clock masking unit 1042-3 masks the master clock using the clock mask fed from the FF circuit 1042-2 to generate a clock edge (B1PPMCK) to read-out and write-in the BIPPM holding RAM 1058-1. The inverting element 1042-2 inverts polarity of B3V5TPC8 to generate a write enable signal (XBIPPMWEN) in negative polarity for the BIPPM holding RAM 1058-1.

The above BIPPM holding RAM operation controlling unit 1042 can thereby operate the BIPPM holding RAM 1058-1 at optimum timings using the clock edge (BIPPMCK) and the write enable signal (XBIPPMWEN) generated as above.

Figure 80:
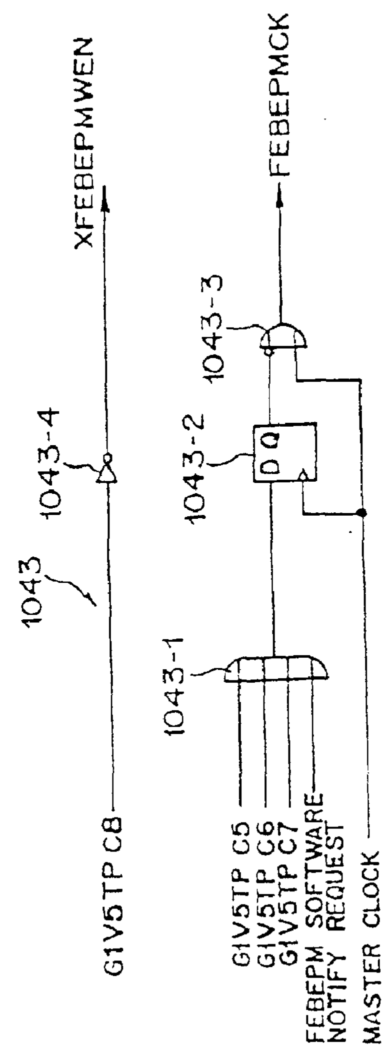
FIG. 80 is a block diagram showing a detailed structure of an FEBEPM holding RAM operation controlling unit according to the embodiment.

FIG. 80 is a block diagram showing a detailed structure of the FEBEPM holding RAM operation controlling unit 1043 shown in FIG. 68. As shown in FIG. 80, the FEBEPM holding RAM operation controlling unit 1043 according to this embodiment has, similarly to the above BIPPM holding RAM operation controlling unit 1042, an operation clock mask generating unit (OR circuit) 1043-1, an FF circuit 1043-2, a clock masking unit (OR circuit of a 1-input inverting type) 1043-3 and an inverting element 1043-4.

The operation clock mask generating unit 1043-1 generates a clock mask for capturing a read address for FEBEPM holding RAM 1093-1 (refer to FIG. 139) in the G1/V5 byte terminating process unit 1025, which will be described later, from G1V5TPC5, a clock mask for capturing a write address for the FEBEPM holding RAM 1093-1 from G1V5TPC6 and a clock mask for writing data in the FEBEPM holding RAM 1093-1 from G1V5TPC7 out of the G1V5 timing signals (G1V5TPC5–C8) generated by shifting their phases by the POH timing signal shifting unit 1035, besides generating a clock mask for capturing a read address for a count value of FEBEPM in response to an FEBEPM software notification request signal fed from the software's side.

The FF circuit 1043-2 delays an output (clock mask) of the operation clock mask generating unit 1043-1 by one clock of the master clock. The clock masking unit 1043-3 masks the master clock using the clock mask fed from the FF circuit 1043-2 to generate a clock edge (FEBEPMCK) necessary to read-out and write-in the FEBEPM holding RAM 1093-1. The inverting element 1043-4 inverts polarity of G1V5TPC8 to generate a write enable signal (XFEBEPMWEN) in negative polarity for the FEBEPM holding RAM 1093-1.

The above FEBEPM holding RAM operation controlling unit 1043 can thereby operate the FEBEPM holding RAM 1093-1 at optimum timings using the clock edge (FEBEPMCK) and the write enable signal (XFEBEPMWEN) generated as above.

Next, an entire operation of the timing generating unit 1021 will be described in brief. Assuming here that TU data (J1 byte of VC3, here), TUAD, SPEEN, J1V5TP, VC3TUG and VC2VC12 are inputted at timings shown in FIGS. 81(*a*) through 81(*h*), for example, to the phase shifting unit 1032', parts of the overhead counter serially operating unit 1033 operate at timings as shown in FIGS. 82(*a*) through 82(*p*).

In the timing signal generating process unit 1031, parts of the POH timing signal generating unit 1034 operate at timings as shown in FIGS. 83(*a*) through 83(*t*), for example, to serially generate various POH timing signals. Parts of the LOM holding RAM operation controlling unit 1036 operate at timings as shown in FIGS. 84(*a*) through 84(*f*), for example, to generate the clock edge (LOMCK) and the write enable signal (XLOMWEN) for controlling write-in/read-out the LOM holding RAM 1050-1. Incidentally, encircled number [FIG. 70-③, FIG. 70-④, and the like] shown in FIGS. 82 through 84 correspond to signals indicated by encircled number in the corresponding drawings, respectively.

According to the POH terminating process unit 1008 of this embodiment, the timing generating unit 1021 can serially generate various POH timing signals necessary in the POH terminating process conducted in each of the terminating process units 1022 through 1025 in common to all TU channels. It is therefore unnecessary to equip circuits for generating POH timing signals equal in number to corresponding channels so that the circuit scale and the power consumption can be largely decreased.

(b-7) Description of the J1/J2 Byte Terminating Process Unit 1022

Figure 85:
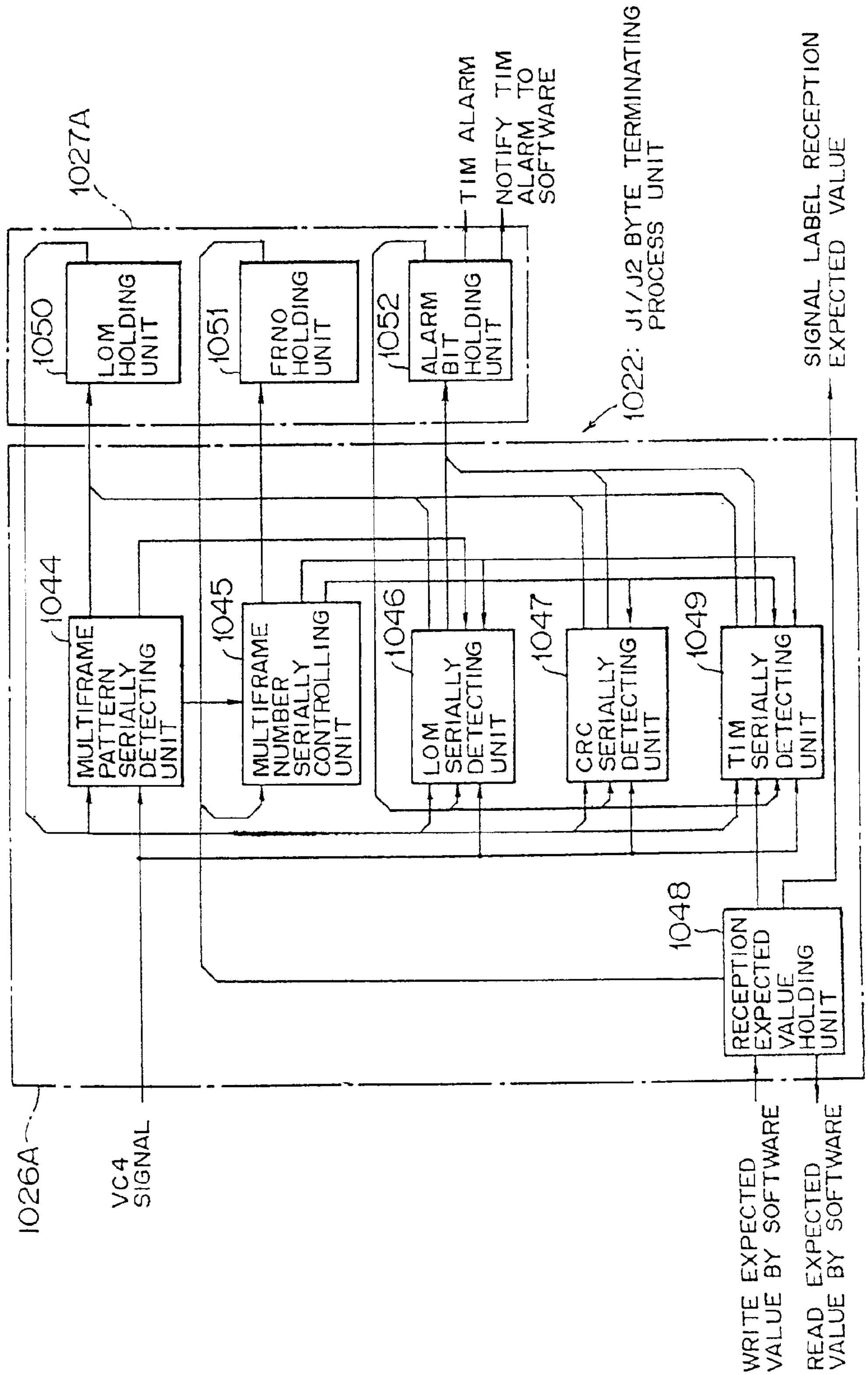
FIG. 85 is a block diagram showing a structure of a J1/J2 byte terminating process unit according to the embodiment.

FIG. 85 is a block diagram showing a detailed structure of the J1/J2 byte terminating process unit 1022 shown in FIG. 62. As shown in FIG. 85, in the J1/J2 byte terminating process unit 1022 according to this embodiment, the POH terminating operation processing unit 1022 shown in FIG. 63 is configured as a J1/J2 byte serially terminating process unit 1026A for serially terminating J1 and/or J2 bytes included in the VC4 signal, whereas the storage unit 1027 shown in FIG. 63 is configured as a storage unit 1027A for storing a result of an operation conducted in the J1/J2 byte serially terminating process unit 1026A for each TU channel and being able to supply stored information to the J1/J2 byte serially terminating process unit 1026A, as shown in FIG. 85.

The above J1/J2 byte serially terminating unit 1026A has a multiframe pattern serially detecting unit 1044, a multiframe number serially controlling unit 1045, an LOM serially detecting unit 1046, a CRC serially detecting unit 1047, a reception expected value holding unit 1048 and a TIM serially detecting unit 1049. The storage unit 1027A has an LOM holding unit 1050, a frame number (FRNO) holding unit 1051, and an alarm bit holding unit 1052.

In the J1/J2 byte serially terminating process unit 1026A, the multiframe pattern serially detecting unit 1044 serially detects multiframe patterns of the J1 and J2 bytes. The multiframe number serially controlling unit (multiframe pattern number serially controlling unit) 1045 serially controls the number of multiframes of the J1 and J2 bytes. The LOM serially detecting unit 1046 serially detects LOM of J1 and J2 bytes.

The CRC serially detecting unit 1047 serially detects CRC of J1 and J2 bytes. The reception expected value holding unit 1048 holds a reception expected value of the path trace signal written-in or read-out from the software's side by the supervisor. The TIM serially detecting unit 1049 serially detects TIM of J1 and J2 bytes on the basis of the reception expected value held in the reception expected value holding unit 1048.

In the storage unit 1027A, the LOM holding unit 1050 holds a result of a process (a result of an operation) conducted in the multiframe pattern serially detecting unit 1044 for each TU channel, besides being able to supply stored information stored one cycle (one frame) before to the multiframe pattern serially detecting unit 1044. The FRNO holding unit 1051 holds a result of a process conducted in the multiframe number serially controlling unit 1045 for each TU channel, besides being able to supply stored information stored one cycle (one frame) before to the multiframe number serially controlling unit 1045 and the reception expected value holding unit 1048.

The alarm bit holding unit 1052 holds results of processes conducted in the LOM serially detecting unit 1046, the CRC serially detecting unit 1047 and the TIM serially detecting unit 1048 for each TU channel, besides being able to supply stored information stored one cycle (one frame) before to the LOM serially detecting unit 1046, the CRC serially detecting unit 1047 and the TIM serially detecting unit 1048.

Namely, the above storage unit 1027A stores results of operations conducted in the multiframe pattern serially detecting unit 1044, the multiframe number serially controlling unit 1045, the LOM serially detecting unit 1046, the CRC serially detecting unit 1047 and the TIM serially detecting unit 1049 for each TU channel, besides supplying stored information to the multiframe pattern serially detecting unit 1044, the multiframe number serially controlling unit 1045, the LOM serially detecting unit 1046, the CRC serially detecting unit 1047, the reception expected value holding unit 1048 and the TIM serially detecting unit 1049.

The J1/J2 byte terminating process unit 1022 serially conducts a terminating process on J1 byte included in VC3-POH 235 and a terminating process on J2 byte included in the VC2-POH 236 and the VC12-POH 237 (included in a mutliplex signal in a lower digital stage than a multiplex signal including J1 byte) in the J1/J2 byte serially terminating process unit 1026A common to all channels to obtain various alarm information such as LOM, CRC, TIM and the like in one J1/J2 byte serially terminating process unit 1026A.

Hereinafter, each of the above parts will be described in detail.

Figure 86:
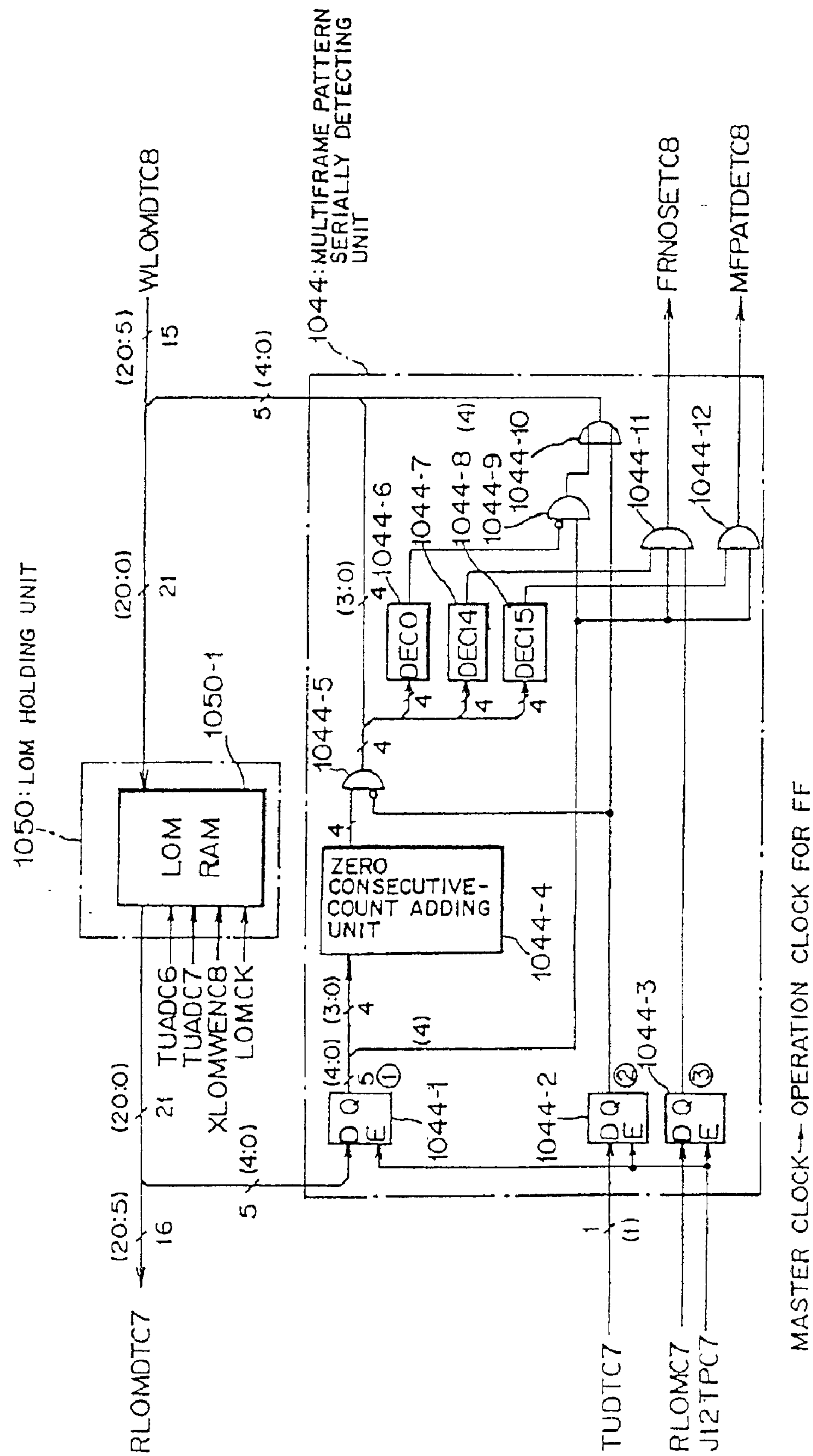
FIG. 86 is a block diagram showing detailed structures of a multiframe pattern serially detecting unit and an LOM holding unit according to the embodiment.

FIG. 86 is a block diagram showing detailed structures of the multiframe pattern serially detecting unit 1044 and the LOM holding unit 1050 mentioned above. As shown in FIG. 86, the multiframe pattern serially detecting unit 1044 has FF circuits each with an enable 1044-1 (corresponding to the FF circuit 1026-2 shown in FIG. 64), 1044-2 and 1044-3, a zero consecutive-count adding unit 1044-4, a zero consecutive-count resetting unit (AND circuit of a 1-input inverting type) 1044-5, decoding circuits (DECs) 1044-6 through 1044-8, a multiframe leading bit detection information resetting unit (AND circuit of a 1-input inverting type) 1044-9, a multiframe leading bit detection information setting unit (OR circuit) 1044-10, a frame number correction detecting unit (AND circuit) 1044-11 and a multiframe pattern detecting unit (AND circuit) 1044-12. The LOM holding unit 1050 has a LOM holding RAM 1050-1.

The LOM holding RAM 1050-1 of the LOM holding unit 1050 holds a result of a process (i.e., information necessary for detection of alarms such as LOM, CRC and TIM indicated by J1 and J2 bytes) conducted in the multiframe pattern serially detecting unit 1044, which operates with the TU address signal (TUADC6) supplied form the phase shifting unit 1032' (refer to FIG. 69) of the timing generating unit 21 as a read address, TUADC7 as a write address and XLOMWENC8 supplied from the LOM holding RAM operation controlling unit 1036 (refer to FIG. 73) of the timing generating unit 1021 as a write enable signal and LOMCK as a RAM clock.

According to this embodiment, the LOM holding RAM 1050-1 holds data of 21 bits as shown below, for example. It is not necessarily that the data is held in the LOM holding RAM 1050-1 in the order shown below:

- bit numbers 3–0: information about the number of times of consecution of "0" of the MSB bit of J1/J2 byte;
- bit number 4: multiframe leading bit detection information;
- bit numbers 7–5: LOM protective stage information;
- bit numbers 14–8: CRC-7 operation result information;
- bit number 15: CRC disagreement detection information obtained one multiframe before;
- bit number 16: CRC disagreement detection information obtained two multiframe before;
- bit number 17: reception expected value disagreement detection information;
- bit numbers 20–18: TIM protective stage number information.

In the multiframe pattern serially detecting unit 1044, the FF circuit 1044-1 holds data of the 4th to 0th bit among read data (RLOMDTC7) fed from the LOM holding RAM 1050-1 with a timing signal (J12TPC7: generated in the POE timing signal shifting unit 1035 shown in FIG. 72) indicating a position of J1/J2 byte generated by the timing generating unit 1021. The FF circuit 1044-2 holds data of the MSB bit of data of J1/J2 byte of the VC4 data (TUDTC7) with the above timing signal (J12PTC7). The FF circuit 1044-3 holds the LOM alarm bit (RLOMC7) which is a result of a process obtained one frame before with the above timing signal.

The zero consecutive count adding unit 1044-4 adds 1 to "0" consecutive count information (a count value) which indicates how many times the MSB bit of the J1/J2 byte is consecutively "0". This information is 4-bit information, whose count value returns to "0" when 1 is added to a count value "15".

A reason of this is that since a multiframe is configured with 16 bytes [trace data bytes of 15 bytes with the CRC byte (1 byte) as the lead: refer to FIG. 162] of J1/J2 byte, in which only the MSB bit of the CRC byte is "1" and the MSB bits of the remaining trace data bytes are all "0", it is sufficient to detect that a row of the MSB bits of J1/J2 byte is "1000 0000 0000 0000".

The zero consecutive-count resetting unit 1044-5 resets the above "0" consecutive number information to "0" when the FF circuit 1044-2 holds data "1" representing that the CRC byte which is the lead of a multiframe is detected. The data (the "0" consecutive number information) having been undergone the above process is written at the 0th to 3rd bits of the LOM holding RAM 1050-1 as above.

The decoding circuit ("0" detecting unit) 1044-6 detects that the "0" consecutive number information having been processed is "0" (that is, decoding "0") to indicate a leading position of the multiframe pattern. The decoding circuit ("14" detecting unit) 1044-7 detects that the "0" consecutive number information having been processed is "14" (that is, decoding "14") to indicate that J1/J2 byte that should be processed is at the 14th byte of the trace data. The decoding circuit ("15" detecting unit) 1044-8 detects that the "0" consecutive number information having been processes is "15" (that is, decoding "15") to indicate that the J1/J2 byte that should be processed is at the 15th byte in the trace data.

The multiframe leading bit information resetting unit 1044-9 resets leading bit detection information of the preceding multiframe pattern when detecting a leading position of the multiframe pattern. The multiframe leading bit detection information setting unit 1044-10 detects a leading bit of the current multiframe when "1" is held in the FF circuit 1044-2 and when the "0" consecutive number information having been processed is not "0" after detection of the leading bit.

The frame number correction detecting unit 1044-11 detects that the multiframe leading bit detection information (output information of the FF circuit 1044-1) and the "0" consecutive number information (output information of the decoding circuit 1044-7) having been processed are "14" when multiframe pattern out-of-synchronization alarm (LOM) is being generated (when RLOMC7 is in the H level), thereby to detect that a row of the MSB bits of the J1/J2 byte is "1000 0000 0000 0000", and generates a frame number correction request signal (FRONOSETC8) in order to process J1/J2 byte in the next frame as the 15th byte of the trace data bytes.

The multiframe pattern detecting unit 1044-12 detects that the multiframe leading bit detection information (output information of the FF circuit 1044-1) and the "0" consecutive number information (output information of the decoding circuit 1044-8) are thereby to detect a row of the MSB bits of the J1/J2 byte is "1000 0000 0000 0000" so as to detect a multiframe pattern (MFPATDETC8).

The multiframe pattern serially detecting unit 1044 with the above structure detects a row of the MSB bits "1000 0000 0000 0000" of the J1/J2 byte while successively reading the "0" consecutive number information and the multiframe leading bit detection information from the LOM holding RAM 1050-1, thereby serially detecting the multiframe pattern of J1/J2 byte (path trace data) in common to all TU channels.

Figure 87:
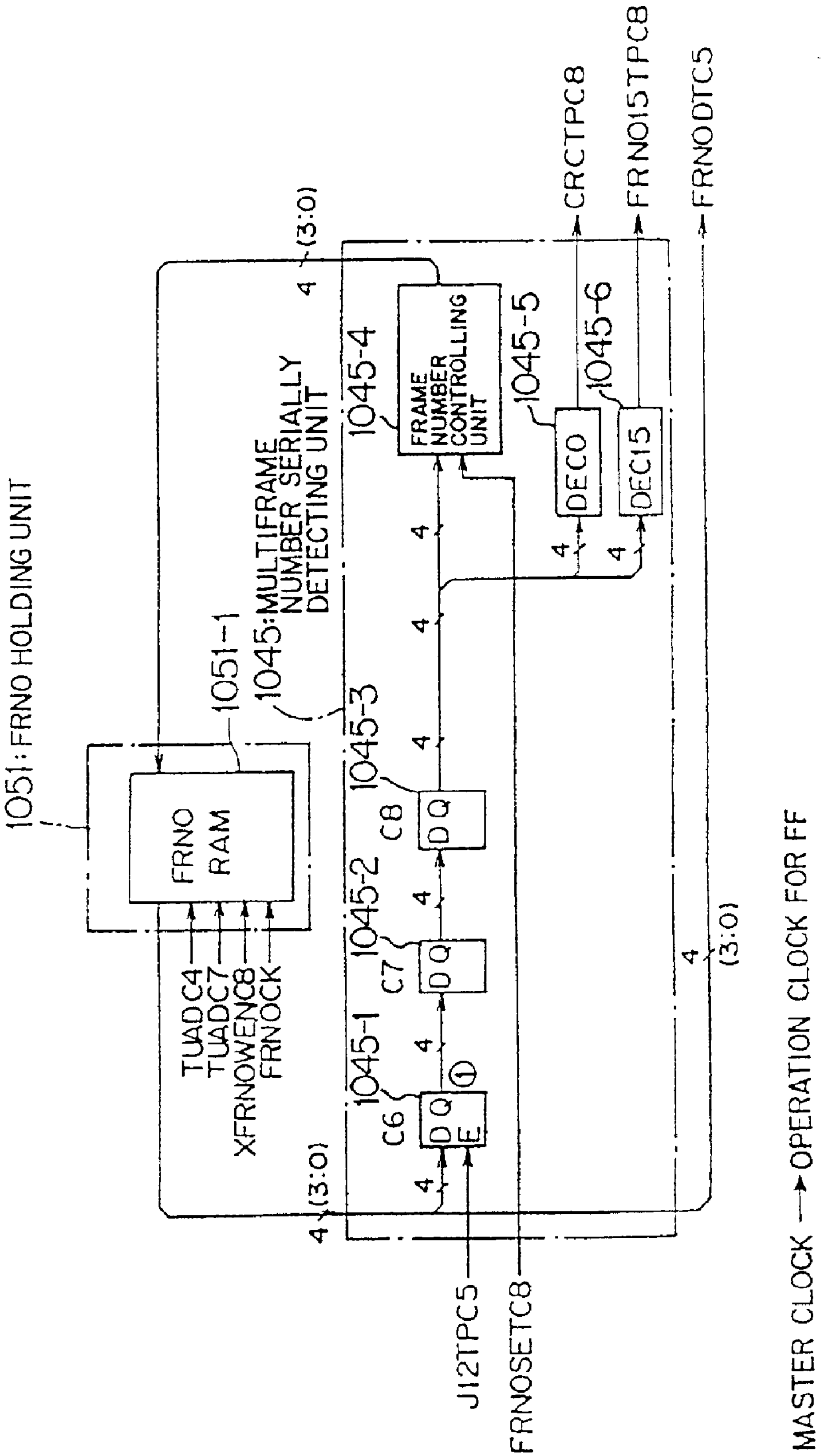
FIG. 87 is a block diagram showing detailed structure of a multiframe number serially controlling unit and an FRNO holding unit according to the embodiment.

FIG. 87 is a block diagram showing detailed structure of the multiframe number serially controlling unit 1045 and the FRNO holding unit 1051 mentioned above. As shown in FIG. 87, the multiframe number serially controlling unit 1045 has an FF circuit with an enable (corresponding to the FF circuit 1026-2 shown in FIG. 64) 1045-1, FF circuits 1045-2 and 1045-3, a frame number controlling unit 1045-4 and decoding circuits (DECs) 1045-5 and 1045-6. The FRNO holding unit 1051 has an FRNO holding RAM 1051-1.

Figures 88, 89:
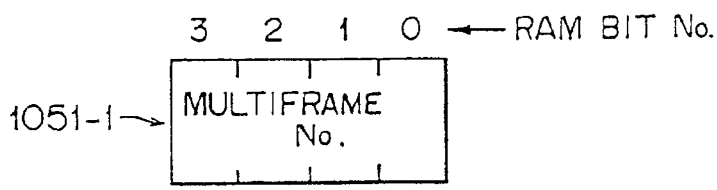
FIG. 88 is a diagram showing an example of a format of an FRNO holding RAM according to the embodiment.
FIG. 89 is a diagram for illustrating operation timings for the FRNO holding RAM according to the embodiment.

The FRNO holding RAM 1051-1 of the FRNO holding unit 1051 holds information indicating which byte of the multiframe J1/J2 byte is (hereinafter, referred as frame number information). According to this embodiment, the FRNO holding RAM 1051-1 can hold frame number information of 4 bits (bit number 3 to 0) as shown in FIG. 88, for example.

The FRNO holding RAM 1051-1 operates with the TU address signal (TUADC4) supplied from the phase shifting unit 1032' (refer to FIG. 69) of the timing generating unit 1021 as a read address, TUADC7 as a write address, XFRNOWENC8 supplied form the FRNO holding RAM operation controlling unit 1037 (refer to FIG. 74) of the timing generating unit 1021 as a write enable and FRNOCK as a RAM clock. Which position the next J1/J2 byte is in is read out from the FRNO holding RAM 1051 at a timing of detecting J1 byte of TU3 or J2 byte of TU2/TU12, and which position the next J1/J2 byte is in is written in the FRNO holding RAM 1051-1 at a timing of detecting J1 byte of TU3 or J2 byte of TU2/TU12.

As a relation between the frame number information and the trace multiframe, "0" of the frame number information indicates a CRC byte, "1" through "15" of the frame number information indicate the 1st to 15th byte of the trace data bytes, respectively, and "0" through "15" of the frame number information are held in the FRNO holding RAM 1051-1 in a relation as shown in FIG. 90, for example.

In the multiframe number serially controlling nit 1045, the FF circuit 1045-1 holds data of 3rd to the 0th bit (the above frame number information) of read data fed from the FRNO holding RAM 1051-1 with a timing signal (J12TPC5: generated by the POH timing signal shifting unit 1035 shown in FIG. 72) indicating a position of J1/J2 byte.

The FF circuit 1045-2 delays a phase of the frame number information held in the FF circuit 1045-1 by one clock of the master clock. The FF circuit 1045-3 further delays the frame number information held in the FF circuit 1045-2 by one clock of the master clock. The frame number controlling unit 1045-4 adds 1 to a count value of the frame number information held in the FF circuit 1045-3.

The frame number controlling unit 1045-4 updates a count value of the frame number information to "15" when the frame number correction request signal (FRNOSETC8) supplied from the multiframe pattern detecting unit 1044-11 of the multiframe pattern serially detecting unit 1044 shown in FIG. 86 is "1".

The decoding circuit ("0" detecting unit) 1045-5 detects that a count value of the frame number information is "0" to generate a signal (CRCTRPC8) representing that J1/J2 byte that should be processed is CRC byte. The decoding circuit ("15" detecting unit) 1045-6 detects that a count value of the frame number information is "15" to generate a signal (FRNO15TPC8) representing that J1/J2 byte that should be processed is at the 15th byte of the trance data bytes, that is, the last byte of the multiframe pattern.

The multiframe number serially controlling unit 1045 with the above structure successively reads out the above frame number information of the preceding frame from the FRNO holding RAM 1051-1 to update the frame number information of the present multiframe, thereby serially controlling the multiframe number in common to all TU channels.

Figure 91:
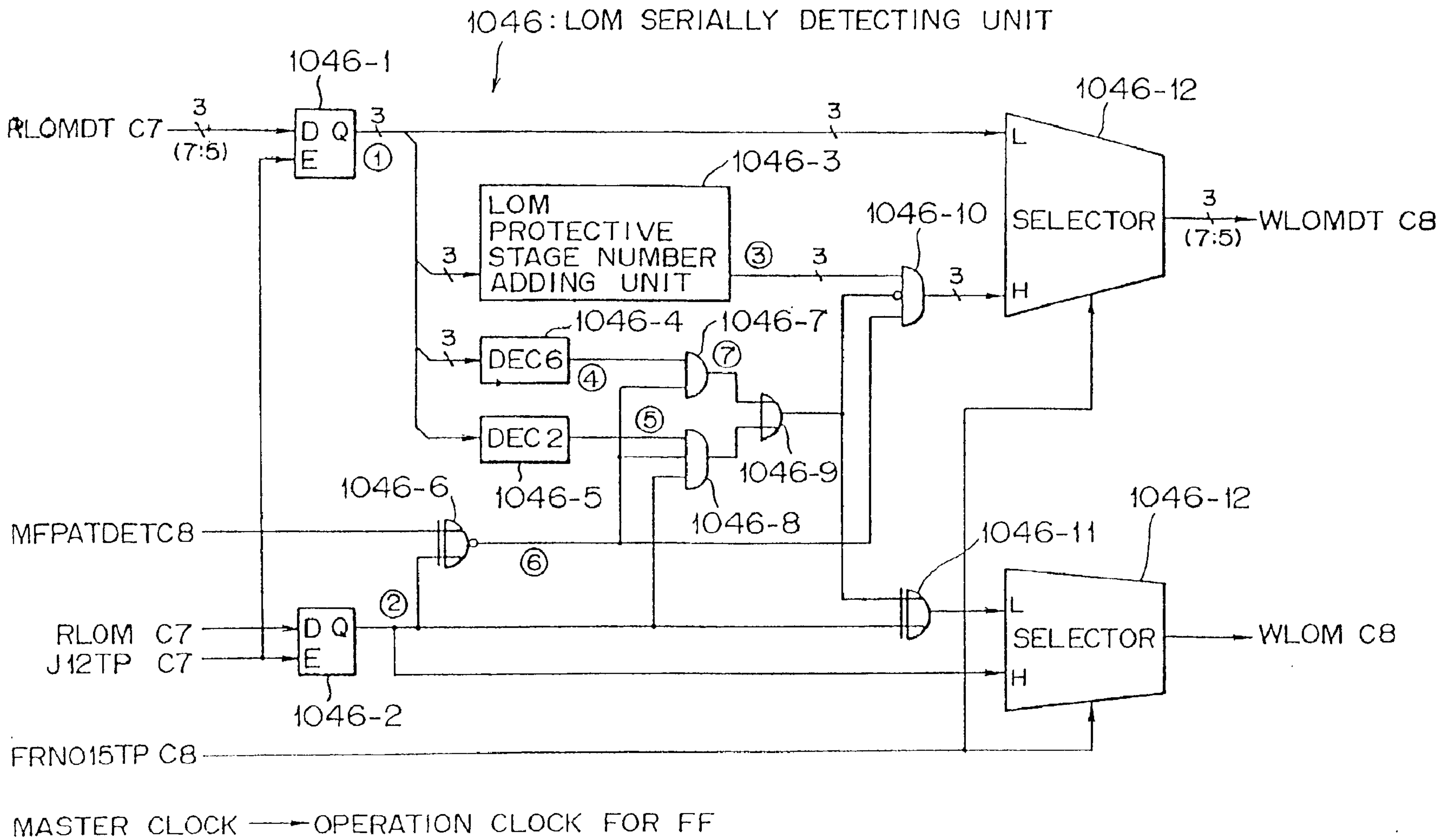
FIG. 91 is a block diagram showing a detailed structure of an LOM serially detecting unit according to the embodiment.

FIG. 91 is a block diagram showing a detailed structure of the LOM serially detecting unit 1046 shown in FIG. 85. As shown in FIG. 91, the LOM serially detecting unit 1046 according to this embodiment has FF circuits 1046-1 and 1046-2 each having an enable, a LOM protective stage number adding unit 1046-3, decoding circuits (DECs) 1046-4 and 1046-5, an addition condition detecting unit (exclusive-NOR circuit) 1046-6, an LOM detection 7-stage detecting unit (AND circuit) 1046-7, an LOM cancel 3-stage detecting unit (AND circuit) 1046-8, a state transition occurrence detecting unit (OR circuit) 1046-9, a LOM protective stage number information resetting unit (AND circuit of 1-input inverting type) 1046-10, a state transitting unit (exclusive-OR circuit) 1046-11 and a bypass controlling unit (selector) 1046-12.

The FF circuit 1046-1 holds data of the 7th to 5th bit (LOM protective stage information) of read data (RLOMDTC7) fed from the LOM holding RAM 1050-1 shown in FIG. 86 with a timing signal (J12TPC7: supplied from the POH timing signal shifting unit 1035 shown in FIG. 72) indicating a position of J1/J2 byte. The FF circuit 1046-2 holds an LOM alarm bit (RLOMC7) which is a result of a process on the preceding frame with the above timing signal (J12TPC7).

The LOM protective stage adding unit 1046-3 adds 1 to a count value of the LOM protective stage information read out from the LOM holding RAM 1050-1. The decoding circuit ("6" detecting unit) 1046-4 detects that a count value of the LOM protective stage information read out is "6". The decoding circuit ("2" detecting unit) detects that a count value of the LOM protective stage information read out is "2".

The addition condition detecting unit 1046-6 detects that the multiframe pattern is detected while LOM occurs (while RLOMC7 is "0"), and that the multiframe pattern is not detected while LOM does not occur (while MFPATDETC8 is "0"). The LOM detection 7-stage detecting unit 1046-7 detects that an addition condition occurs continuously over 7 multiframes when the decoding circuit 1046-4 detects that a non-multiframe pattern state continues over 6 multiframes so as to detect the addition condition, and further the addition condition occurs in the present multiframe, thereby detecting LOM.

The LOM cancel 3-stage detecting unit 1046-8 detects that the addition condition consecutively occurs over 3 multiframes when the decoding circuit 1046-5 consecutively detects the addition condition over 2 multiframes and the addition condition occurs even in the present multiframe, thereby cancelling LOM. The state transition occurrence detecting unit 1046-9 detects that LOM is detected or conditions of cancelling LOM occur in the LOM detection 7-stage detecting unit 1046-7 or the LOM cancel 3-stage detecting unit 1046-8.

The LOM protective stage number information resetting unit 1046-10 resets a count value of the LOM protective stage information to "0" when the above addition condition detecting unit 1046-6 does not detect the addition condition and the state transition occurrence detecting unit 1046-9 detects occurrence of state transition. The state transitting unit 1046-11 inverts polarity of the alarm bit of LOM when the state transition occurrence detecting unit 1046-9 detects occurrence of state transition to transits the state from/to state where LOM is occurring to/from a state where LOM is not occurring.

In order to update LOM at the time of the 15th byte of the trace data of J1/J2 byte, the bypass controlling unit 1046-12 writes a result of a process conducted in the above LOM protective stage number information resetting unit 1046-10 in the LOM holding RAM 1050-1 only when processing the 15th byte, besides writing a result of a process conducted in the state transitting unit 1046-11 in the alarm bit holding unit 1052. At the time of a byte excepting the 15th byte, the bypass controlling unit 1046-12 writes information read out from the LOM holding RAM 1050-1 and the alarm bit holding unit 1052 as it is in the LOM holding RAM 1050-1 and the alarm bit holding unit 1052.

The LOM serially detecting unit 1046 with the above structure successively reads out the LOM protective stage number information and the LOM alarm bit (state information representing that the LOM is occurring or LOM is not occurring) of the preceding frame from the LOM holding RAM 1050-1 and the alarm bit holding unit 1052, respectively, and conducts an LOM updating process on the present multiframe on the basis of the read information so as to serially detect LOM in common to all TU channels.

Figure 92:
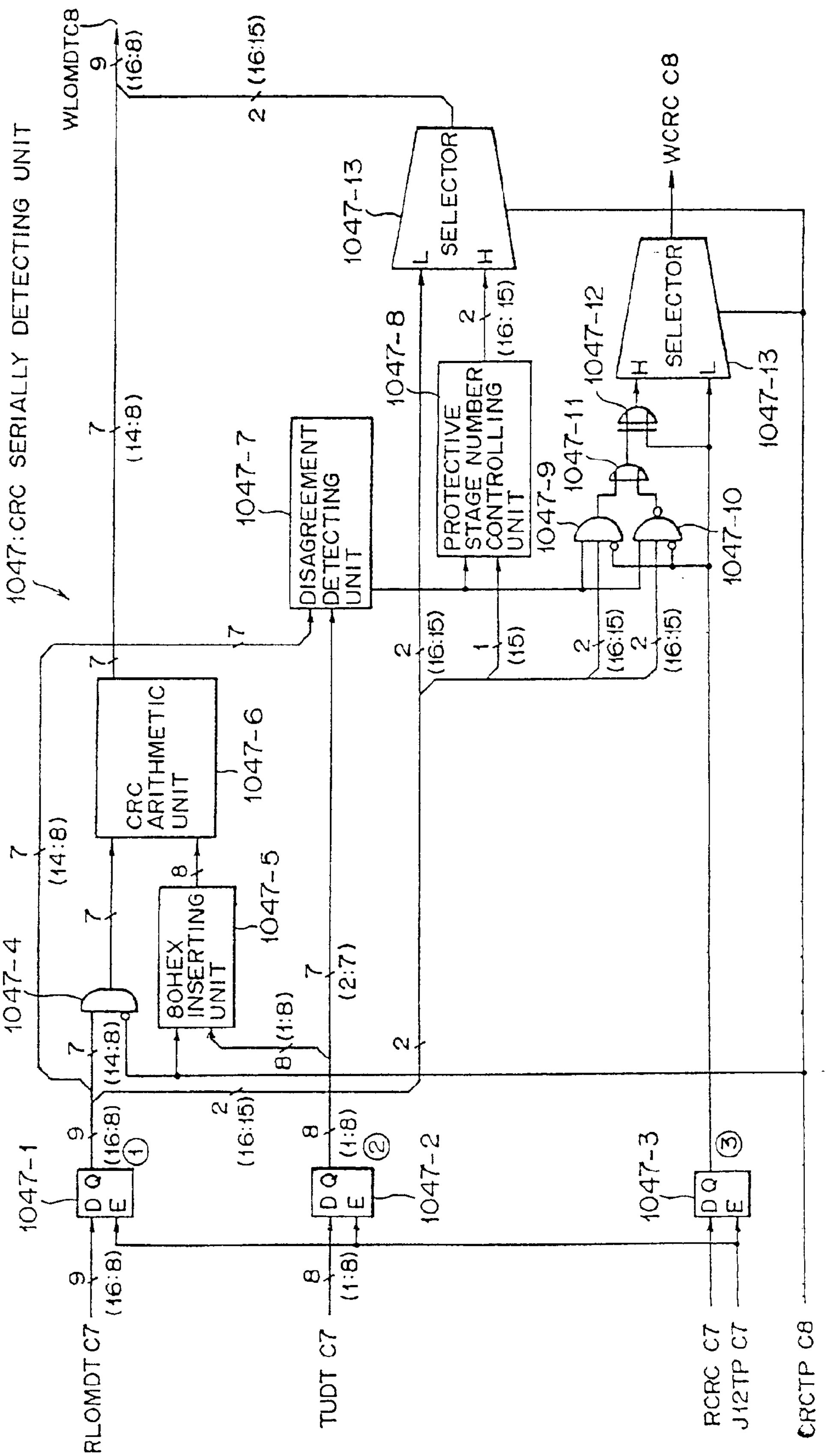
FIG. 92 is a block diagram showing a detailed structure of a CRC serially detecting unit according to the embodiment.

FIG. 92 is a block diagram showing a detailed structure of the CRC serially detecting unit 1047 shown in FIG. 85. As shown in FIG. 92, the CRC serially detecting unit 1047 according to this embodiment has FF circuit 1047-1 through 1047-3 each with an enable, a CRC operation result resetting unit (AND circuit) 1047-4, a CRC data inserting unit (80hex inserting unit) 1047-5, a CRC operating unit 1047-6, a disagreement detecting unit 1047-7, a protective stage number controlling unit 1047-8, a CRC error detection 3-stage detecting unit (AND circuit of a 1-input inverting type) 1047-9, a CRC error cancel 3-stage detecting unit (NOR circuit of a 1-input inverting type) 1047-10, a state transition occurrence detecting unit (OR circuit) 1047-11, a state transitting unit (exclusive-OR circuit) 1047-12 and a bypass controlling unit (selector) 1047-13.

The FF circuit 1047-1 holds data at the 16th to 8th bit (CRC-7 operation result information, CRC disagreement detection information obtained one multiframe before, and CRC disagreement detection information obtained 2 multiframes before) of read data (RLOMDTC7) fed from the LOM holding RAM 1050-1 shown in FIG. 86 with a timing signal (J12TPC7: supplied from the POH timing signal shifting unit 1035 shown in FIG. 72) indicating a position of J1/J2 byte.

The FF circuit 1047-2 holds J1/J2 byte data of TU data (TUDTC7) with the above timing signal (J12TPC7). The FF circuit 1047-3 holds an CRC alarm bit (RCRCC7) which is a result of a process on the preceding frame with the above timing signal (J12TPC7). The CRC operation result resetting unit 1047-4 resets a result of a CRC operation on the preceding multiframe read out from the LOM holding RAM 1050-1 when J1/J2 byte that should be processed is a CRC byte.

The CRC data inserting unit 1047-5 re-writes data of the CRC data to 80hex. With 80hex obtained by re-writing data of CRC bytes by CRC data inserting unit 1047-5, the CRC operating unit 1047-6 conducts a CRC-7 operation on the 1st to 15th byte using a generating polynomial $X^7+X^3+1$. A result of the operation is written in the LOM holding RAM 1050-1.

The disagreement detecting unit 1047-7 detects disagreement between a result of the CRC operation on the preceding multiframe and a CRC value at the 2nd to the 8th bit of the CRC byte. The protective stage number controlling unit 1047-8 controls to make an output signal of the disagreement detecting unit 1047-7 be data at the 15th bit of the LOM holding RAM 1050-1 and shift the data at the 15th bit read out from the LOM holding RAM 1050-1 to the 16th bit.

The CRC error detection 3-stage detecting unit 1047-9 detects that CRC agreement successively occurs over 3 multiframes when it is known from a result of detection made in the disagreement detecting unit 1047-7 that CRC disagreement detection information obtained one frame before and CRC disagreement detection information obtained 2 frames before all represent CRC disagreement detection while a CRC error does not occur. The CRC error cancel 3-stage detecting unit 1047-10 detects that CRC agreement successively occurs over 3 multiframes when it is known from a result of detection made in the disagreement detecting unit 1047-7 that the CRC disagreement detection information obtained one frame before and the CRC disagreement detection information obtained 2 frames before all represent CRC agreement detection while the CRC error occurs so as to cancel the CRC error.

The state transition occurrence detecting unit 1047-11 detects that detection or cancel of the CRC error occurs in the CRC error detection 3-stage detecting unit 1047-9 or the CRC error cancel 3-stage detecting unit 1047-10. The state transitting unit 1047-12 inverts polarity of the alarm bit of the CRC error when the state transition occurrence detecting unit 1047-11 detects occurrence of state transition to transit the state from/to a state where the CRC error is occurring to/from a state where the CRC error is not occurring.

In order to update the CRC error only at the time of the CRC byte of J1/J2 byte, the bypass controlling unit 1047-13 writes a result of a process conducted in the protective stage number controlling unit 1047-8 in the LOM holding RAM 1050-1 only when processing the CRC byte, besides writing a result of a process conducted in the state transitting unit 1047-12 in the alarm bit holding unit 1052. At the time of a byte excepting the CRC byte, the bypass controlling unit 1047-13 writes information read out from the LOM holding RAM 1050-1 and the alarm bit holding unit 1052 in the LOM holding RAM 1050-1 and the alarm bit holding unit 1052 as it is.

The CRC serially detecting unit 1047 with the above structure successively reads out the CRC-7 operation result information obtained one frame before, the CRC disagreement detection information obtained one multiframe before, the CRC disagreement detection information obtained two multiframes before and the CRC alarm bit (state information representing that the CRC error is occurring or not occurring) mentioned above from the LOM holding RAM 1050-1 and the alarm bit holding unit 1052, conducts the CRC operation (updates the CRC error) on the present multiframe on the basis of the above information, thereby serially detecting CRC in common to all TU channels.

Figure 93:
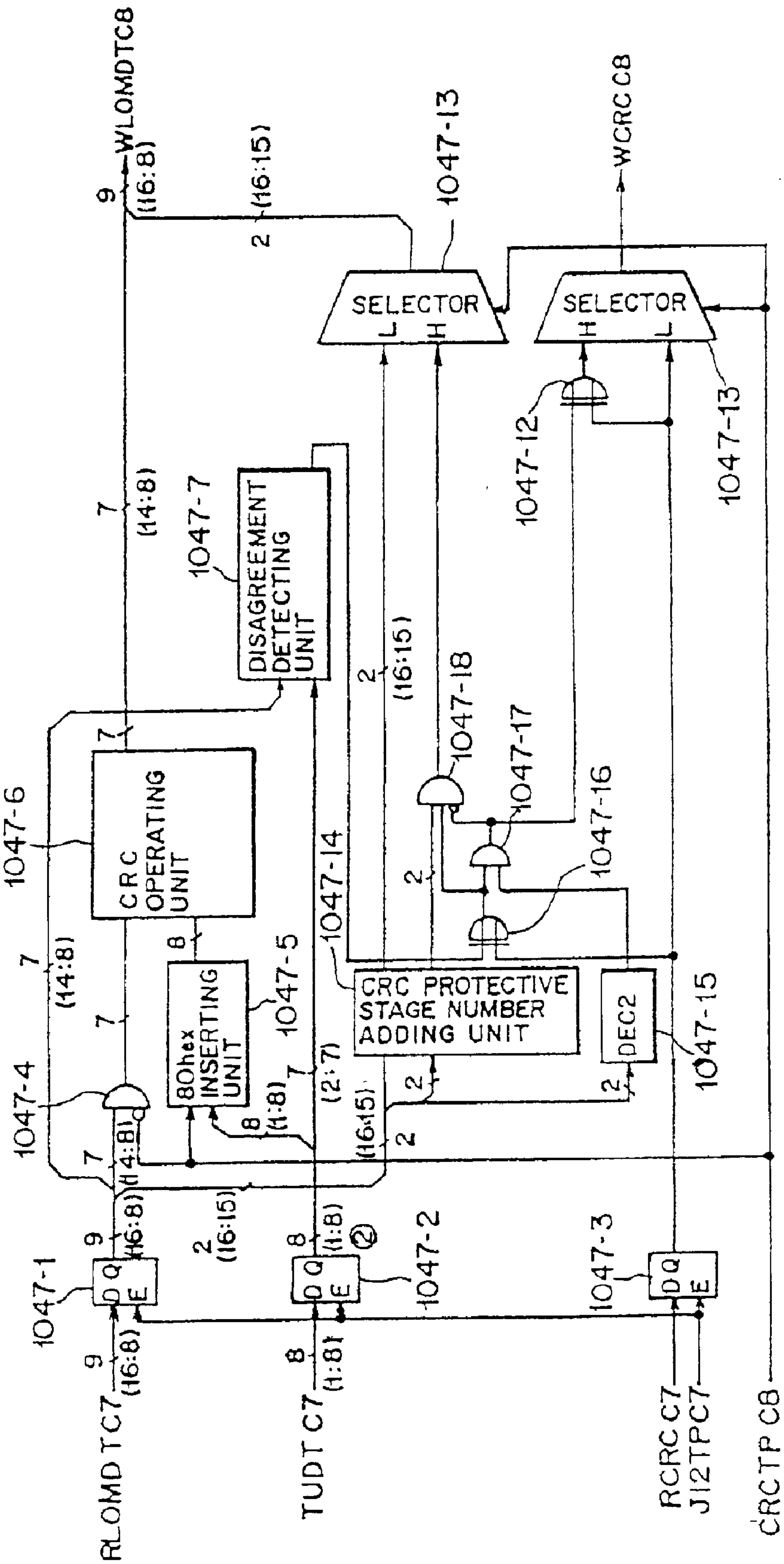
FIG. 93 is a block diagram showing another detailed structure of the CRC serially detecting unit according to the embodiment.

Incidentally, the CRC serially detecting unit 1047 shown in FIG. 92 may have, as shown in FIG. 93, for example, a CRC protective stage number adding unit 1047-14, a decoding circuit 1047-15, an addition condition detecting unit (exclusive-OR circuit) 1047-16, a detection/cancel 3-stage detecting unit (AND circuit) 1047-17 and a protective stage number resetting unit (AND circuit of a 1-input inverting type) 1047-18, instead of the protective stage number controlling unit 1047-8, the CRC error detection 3-stage detecting unit 1047-9, the CRC error cancel 3-stage detecting unit 1047-10 and the state transition occurrence detecting unit 1047-11 mentioned above.

In which case, the CRC disagreement detection information obtained one multiframe before and the CRC disagreement detection information obtained two multiframe before held in the LOM holding RAM 1050-1 are used as CRC protective stage number information representing how many times agreement/disagreement of CRC successively occurs.

The CRC protective stage number adding unit 1047-14 adds 1 to the CRC protective stage number information read out from the LOM holding RAM 1050-1. The decoding circuit ("2" detecting unit) 1047-15 detects that the CRC protective stage number information is "2". The addition condition detecting unit 1047-16 detects that agreement is detected by the disagreement detecting unit 1047-7 while the CRC error occurs, and that disagreement is detected by the disagreement detecting unit 1047-7 while the CRC error does not occur.

The detection/cancel 3-stage detecting unit 1047-17 detects occurrence of CRC error detection/cancel condition. The protective stage number resetting unit 1047-18 resets the CRC protective stage number information.

The above CRC serially detecting unit 1047 can also serially detect CRC, similarly to the CRC serially detecting unit 1047 shown in FIG. 92.

Figure 94:
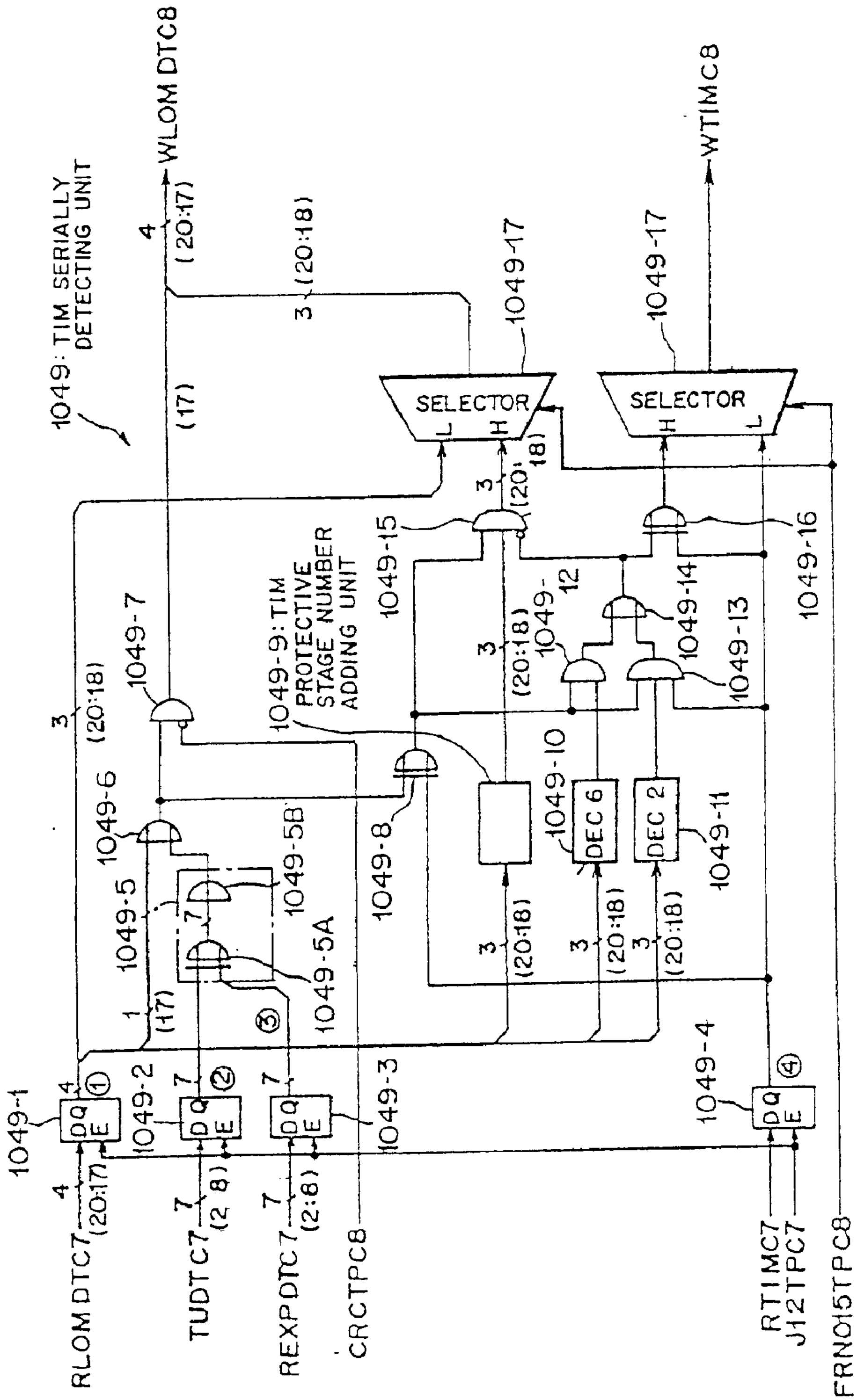
FIG. 94 is a block diagram showing detailed structure of a TIM serially detecting unit according to the embodiment.

FIG. 94 is a block diagram showing a detailed structure of the TIM serially detecting unit 1049 shown in FIG. 85. As shown in FIG. 94, the TIM serially detecting unit 1049 according to this embodiment has FF circuits 1049-1 through 1049-4 each with an enable, a disagreement detecting unit 1049-5, a disagreement detection indicating unit (OR circuit) 1049-6, a disagreement detection indication resetting unit (AND circuit of a 1-input inverting type) 1049-7, an addition condition detecting unit (exclusive-OR circuit) 1049-8, a TIM protective stage number adding unit 1049-9, decoding circuits 1049-10 and 1049-11, a TIM detection 7-stage detecting unit (AND circuit) 1049-12, a TIM cancel 3-stage detecting unit (AND circuit) 1049-13, a state transition occurrence detecting unit (OR circuit) 1049-14, a TIM protective stage number information resetting unit (AND circuit of a 1-input inverting type) 1049-15, a state transitting unit (exclusive-OR circuit) 1049-16 and a bypass controlling unit (selector) 1049-17.

The FF circuit 1049-1 holds data at the 20th to 17th bit (reception expected value disagreement detection information and TIM protective stage number information) of read data (RLOMDTC7) fed from the LOM Holding RAM 1050-1 with a timing signal (J12TPC7: supplied from the POH timing signal shifting unit 1035 shown in FIG. 72) indicating a position of J1/J2 byte. The FF circuit 1049-2 holds J1/J2 byte data of TU data (TUDTC7) with the above timing signal (J12TPC7).

The FF circuit 1049-3 holds a reception expected value (REXPDTC7: 7 bits) of J1/J2 byte that should be processed with the above timing signal (J12TPC7). The FF circuit 1049-4 holds a TIM alarm bit (RTIMC7) which is a result of a process on the preceding frame with the above timing signal (J12TPC7).

The disagreement detecting unit 1049-5 detects disagreement between 7 bits of the above reception expected value and the 2nd to 8th bits of the J1/J2 byte. The disagreement detection indicating unit 1049-6 generates a signal representing that disagreement between received trace data of the present multiframe and the above reception expected value is detected, whose function is realized with an exclusive-OR circuit 1049-5A and an OR circuit 1049-5B.

The disagreement detection indication resetting unit 1049-7 resets disagreement detection indication of CRC byte which is not necessary to be compared with the reception expected value and disagreement detection indication of the preceding multiframe read out from the LOM holding RAM 1050-1 at the time of the CRC byte in a leading position of the multiframe. The addition condition detecting unit 1049-8 detects that received value disagreement is detected while TIM does not occur, which is a TIM detection condition, and that received value agreement is detected while TIM occurs, which is a TIM cancel condition.

The TIM protective stage number adding unit 1049-9 adds 1 to a count value of TIM protective stage number information. The decoding circuit ("6" detecting unit) 1049-10 detects that a count value of the TIM protective stage number information read out is "6". The decoding circuit ("2" detecting circuit) 1049-11 detects that a count value of the TIM protective stage number information read out is "2".

The TIM detection 7-stage detecting unit 1049-12 detects that the addition condition successively occurs over 7 multiframes when the addition condition is successively detected over 6 multiframes by the above decoding circuit 1049-10 and further the addition condition occurs even in the present multiframe so as to detect TIM. The TIM cancel 3-stage detecting unit 1049-13 detects that the addition condition is successively detected over 3 multiframes when the above decoding circuit 1049-11 detects the addition condition over 2 multiframes while TIM occurs and further the addition condition occurs even in the present multiframe so as to cancel TIM.

The condition transition occurrence detecting unit 1049-14 detects that the TIM detection or the cancellation occurs in the above TIM detection 7-stage detecting unit 1049-12 or the TIM cancel 3-stage detecting unit 1049-13. The TIM protective stage number information resetting unit 1049-15 resets a count value of the TIM protective stage number information to "0" when the addition condition is not detected by the addition condition detecting unit 1049-8 or/and the occurrence of state transition is detected by the state transition occurrence detecting unit 1049-14.

The state transitting unit 1049-16 inverts polarity of the alarm bit of TIM when the state transition occurrence detecting unit 1049-14 detects the occurrence of state transition to transit the state from/to a state where TIM is occurring to/from a state where TIM is not occurring. The bypass controlling unit 1049-17 writes a result of a process conducted by the TIM protective stage number information resetting unit 1049-15 in the LOM holding RAM 1050-1 only when processing the lath byte in order to update TIM at the time of the 15th byte of the trace data of J1/J2 byte, besides writing a result of a process conducted by the state transitting unit 1049-16 in the alarm bit holding unit 1052. At the time of a byte expecting the 15th byte, the bypass controlling unit 1049-17 writes information read out from the LOM holding RAM 1050-1 and the alarm bit holding unit 1052 in the LOM holding RAM 1050-1 and the alarm bit holding unit 1052 as it is.

The TIM serially detecting unit 1049 with the above structure successively reads out the TIM protective stage number information and the TIM alarm bit (information about a state where TIM is occurring or not occurring) of the preceding frame from the LOM holding RAM 1050-1 and the alarm bit holding unit 1052, respectively, to update the TIM protective stage number information of the present multiframe, thereby serially detecting TIM in common to all TU channels.

Figure 95:
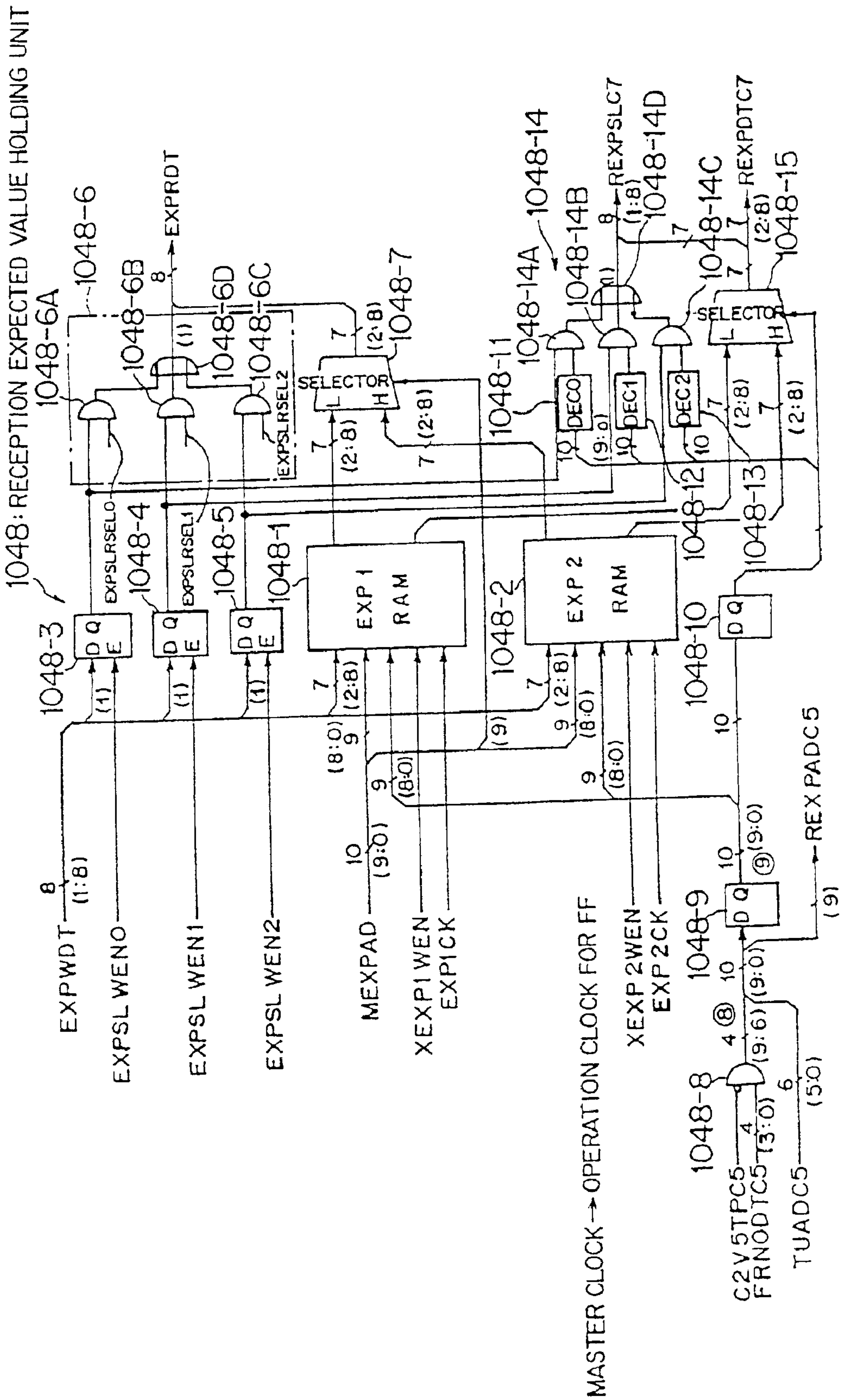
FIG. 95 is a block diagram showing a detailed structure of a reception expected value holding unit according to the embodiment.

FIG. 95 is a block diagram showing a detailed structure of the reception expected value holding unit 1048 shown in FIG. 85. As shown in FIG. 95, the reception expected value holding unit 1048 according to this embodiment has a first reception expected value (EXP1) holding RAM 1048-1, a second reception expected value (EXP2) holding RAM 1048-2, signal label (SL) reception expected value MSB bit holding units (FF circuits) 1048-3 through 1048-5, an MSB bit software notification selecting unit 1048-6, a reception expected value software notification selecting unit (selector) 1048-7, an SL reception expected value read address controlling unit (AND circuit of a 1-input inverting type) 1048-8, FF circuits 1048-9 and 1048-10, decoding circuits 1048-11 through 1048-13, an MSB bit selecting unit 1048-14 and a reception expected value selecting unit (selector) 1048-15.

Figure 96:
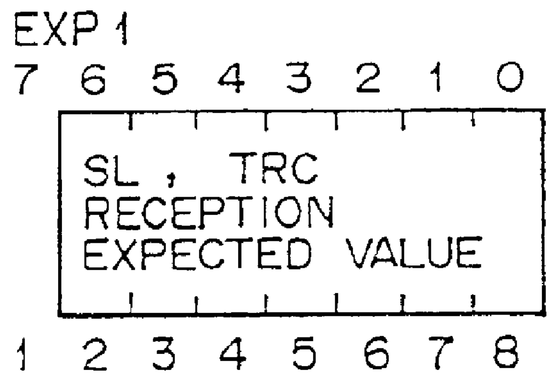
FIG. 96 is a diagram showing an example of a data format of an EXP1 holding RAM according to the embodiment.

The EXP1 holding RAM 1048-1 holds a reception expected value of a signal label of each of TU channels of 0–62ch and a reception expected value at the 1st to 7th byte of each trace data if the received multiplex signal is an STM-1 frame. The EXP1 holding RAM 1048-1 operates with XEXP1WEN supplied from the reception expected value holding RAM operation controlling unit 1041 (refer to FIG. 78) of the timing generating unit 1021 as a write enable and EXP1CK as a RAM clock, wherein an SL reception expected value [EXP1: signal label (SL) and path trace data (TRC)]are successively written by seven bits in a corresponding address (MEXPAD, which will be described later) region, as shown in FIG. 96, for example.

Figure 97:
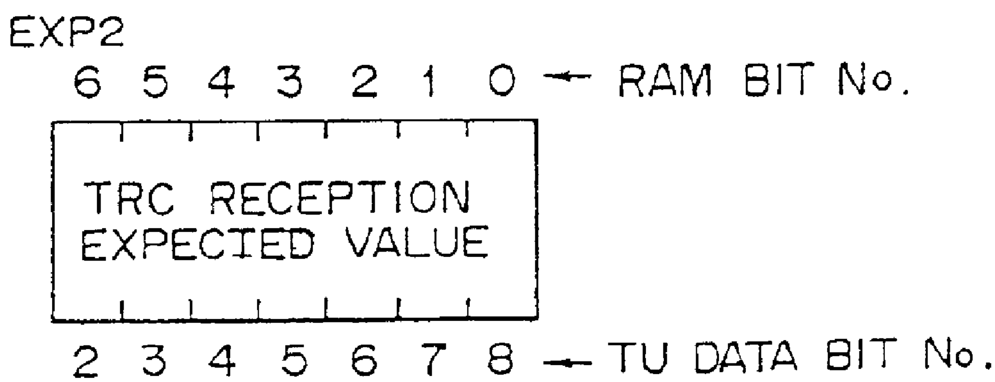
FIG. 97 is a diagram showing an example of a data format of an EXP2 holding RAM according to the embodiment.

The EXP2 holding RAM 1048-2 holds a reception expected value at the 8th to 15th byte of the trace data on each of TU channels of 0–62ch. The EXP2 holding RAM 1048-2 operates with XEXP2WEN supplied also from the above reception expected value holding RAM operation controlling unit 1041 of the timing generating unit 1021 as a write enable and EXP2CK as a RAM clock, wherein 7 bits of an SL reception expected value (EXP2: TEC) are successively written in a corresponding address (MEXPAD) region, as shown in FIG. 97, for example.

A relation among the RAM address (MEXPAD), the frame number and the TU channel mentioned above is as shown in FIG. 100, according to this embodiment.

Figures 98, 99:
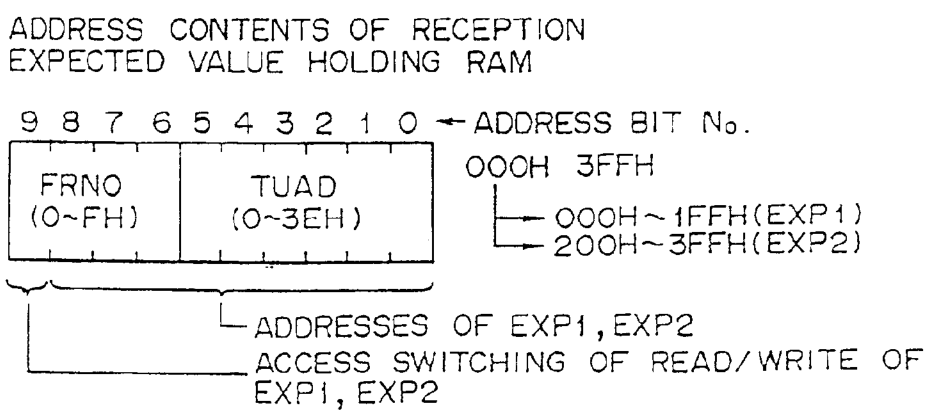
FIG. 98 is a diagram for illustrating operation timings of the reception expected value holding unit according to the embodiment.
FIG. 99 is a diagram showing an example of address contents of the EXP1/EXP2 holding RAMs according to the embodiment.
Figure 101:
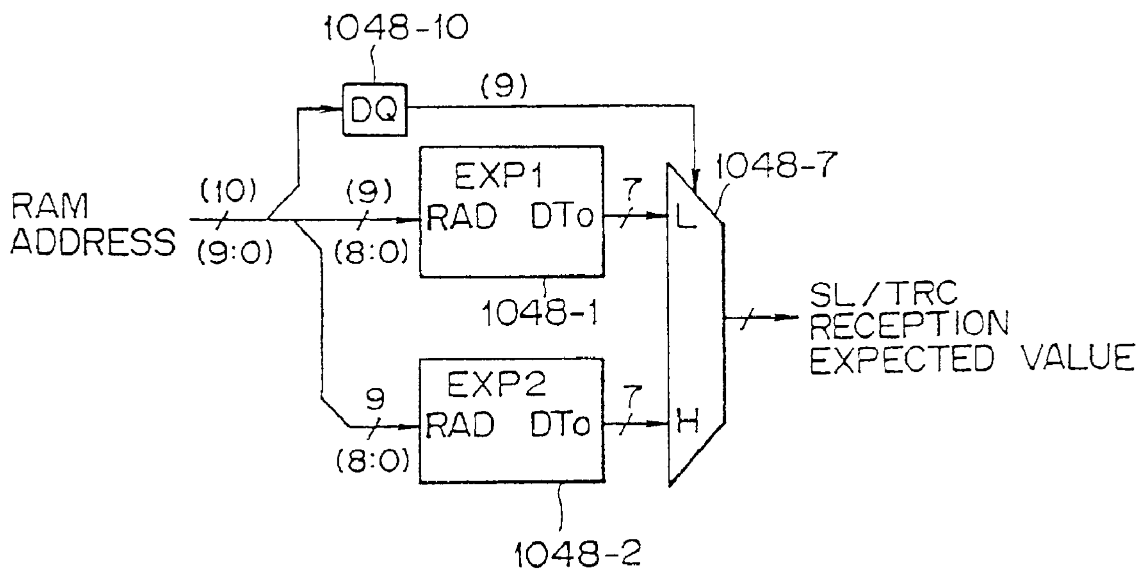
FIG. 101 is a diagram for illustrating a switching control for the EXP1 and EXP2 holding RAMs according to the embodiment.

Generally, there exist addresses only up to the 512th address in a RAM because of its specification. For this, the reception expected value holding unit 1048 of this embodiment is provided with two RAMs for holding the reception expected values in order to obtain 1024 addresses necessary to hold all the reception expected values. According to this embodiment, the MSB bits of address contents (address bits) of the RAMs 1048-1 and 1048-2 are used to control (switch an access) reading-out/writing-in of the RAMs 1048-1 and 1048-2 (as to operation timings of which, refer to FIG. 98), as shown in FIGS. 99 and 101. If there is a RAM having a capacity sufficient to hold all the reception expected values, it is of course that only one RAM is sufficient and there is no necessity of equipping two RAMs as above.

The SL reception expected value MSB bit holding unit 1048-3 holds the MSB bit of an SL reception expected value of a TU channel of 0ch. The SL reception expected value MSB bit holding unit 1048-4 holds the MSB bit of the SL reception expected value of a TU channel of 1ch. The SL reception expected value MSB bit holding unit 1048-5 holds the MSB bit of the SL reception expected value of a TU channel of 2ch.

Namely, in the reception expected value holding unit 1048, the EXP1 holding RAM 1048-1 in a 7-bit structure as above lacks the number of bits since 8 bits are necessary for the SL reception expected value when the input multiplex signal is TU3. For this, each of the above SL reception expected value MSB bit holding units 1048-3 through 1048-5 holds the 8th bit of the reception expected value of TU3. Incidentally, setting of a reception expected value to each of the EXP1 holding RAM 1048-1, the EXP2 holding RAM 1048-2 and the SL reception expected value MSB bit holding units 1048-3 through 1048-5 and reading of set contents from the same are done from the software's side.

The MSB bit software notification selecting unit 1048-6 selects when the software read contents of setting of the SL reception expected values of a TU channel of 0–2ch, whose function is realized with AND circuits 1048-6A through 1048-6C and an OR circuit 1046-6D. The reception expected value software notification selecting unit 1048-7 reads contents of setting of the reception expected values set by the software from the EXP1 holding RAM 1048-1 and the EXP2 holding RAM 1048-2, and selects data appropriately read out from either one of the above RAM 1048-1 or 1048-2 with the MSB of an address signal (MEXPAD) indicating a write/read address fed from the software.

The SL reception expected value read address controlling unit 1048-8 controls to mask frame number information (FRNODTC5) read out from the above FRNO holding unit 1051 (FRNO holding RAM 1051-1: refer to FIG. 87) with a timing signal (C2V5TPC5: supplied from the POH timing signal shifting unit 1035 shown in FIG. 72) indicating C2/V5 byte position to make the frame number information be "0" when reading the SL reception expected value used to conduct an SLM process.

The controlled 4 bits and 6 bits of the TU address signal (TUADC5) make a reception expected value read address (REXPADC5) of 10 bits. When the SL reception expected value is read out under the above control, the high-order 4 bits of the reception expected value read address of 10 bits become "0000", and the SL reception expected value is read out with these 4 bits and 6 bits of TUAD indicating a TU channel that should be processed.

The FF circuit 1048-9 delays a phase of a 10-bit reception expected value read address by one clock of the master clock. The FF circuit 1048-10 further delays a phase of the 10-bit reception expected value read address by one clock of the master clock.

The decoding circuit ("0" detecting unit) 1048-11 detects that the 10-bit reception expected value read address is "0".

The decoding circuit ("1" detecting unit) 1048-12 detects that the 10-bit reception expected value read address is "1". The decoding circuit ("2" detecting unit) 1048-13 detects that the 10-bit reception expected value read address is "2".

The MSB bit selecting unit 1048-14 selects reading of contents of setting of the SL reception expected values of TU channels of 0–2ch, whose function is realized with AND circuits 1048-14A through 1048-14C and an OR circuit 1048-14D. The reception expected value selecting unit 1048-15 reads out the reception expected values from the EXP1 holding RAM 1048-1 and the EXP2 holding RAM 1048-2 with 9 bits of the 10-bit reception expected value read address, and selects the read reception expected value with the MSB bit of the 10-bit reception expected value read address. An output signal of 7 bits of the reception expected value selecting unit 1048-15 becomes a path trace data reception expected value (REXPDTC7), is notified to the above TIM serially detecting unit 1049 as the trace data reception expected value. Further, a signal of 8 bits obtained by adding an output signal of the MSB bit selecting unit 1048-14 to the above 7-bit output signal is notified to the SLM detecting unit 1073 of the C2/V5 byte terminating process unit 1024, which will be described later with reference to FIG. 105, as the SL reception expected value (REXPSLC7).

The reception expected value holding unit 1048 with the above structure according to this embodiment can serially hold and supply various reception expected values necessary in processes conducted in the TIM serially detecting unit 1049 and the C2/V5 byte terminating process unit 1024, and on the software's side for each TU channel.

Figure 102:
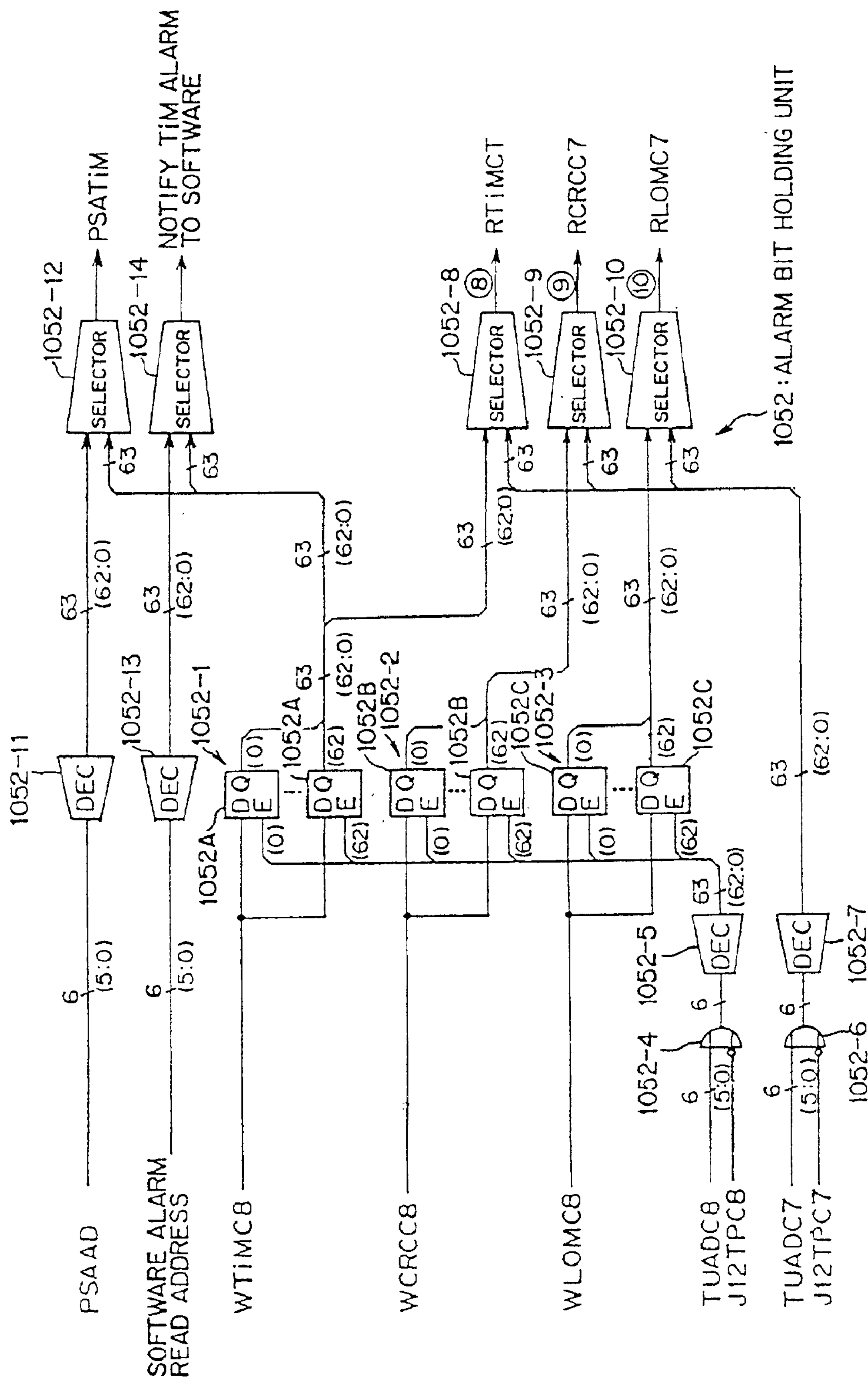
FIG. 102 is a diagram showing a detailed structure of an alarm bit holding unit according to the embodiment.

FIG. 102 is a block diagram showing a detailed structure of the alarm bit holding unit 1052 shown in FIG. 85. As shown in FIG. 102, the alarm bit holding unit 1052 according to this embodiment has a TIM alarm bit holding unit 1052-1, a CRC alarm bit holding unit 1052-2, an LOM alarm bit holding unit 1052-3, an alarm bit write address controlling unit (OR circuit of a 1-input inverting type) 1052-4, a write enable generating unit [decoding circuit (DEC)] 1052-5, an alarm bit read address controlling unit (OR circuit of a 1-input inverting type) 1052-6, a read select generating unit (DEC) 1052-7, a TIM selecting unit (selector) 1052-8, a CRC selecting unit (selector) 1052-9, an LOM selecting unit (selector) 1052-10, a line switch information read select generating unit (DEC) 1052-11, a line switch information selecting unit (selector) 1052-12, a software notification read select generating unit (DEC) 1052-13 and a software notification selecting unit (selector) 1052-14.

The TIM alarm bit holding unit 1052-1 holds TIM alarm bits of TU channels of 0 to 62ch by 63 FF circuits 1052A. The CRC alarm bit holding unit 1052-2 holds CRC alarm bits of TUC channels of 0 to 62ch by 63 FF circuits 1052B. The LOM alarm bit holding unit 1052-3 holds LOM alarm bits by 63 FF circuits 1052C.

The alarm bit write address controlling unit 1052-4 outputs contents of a TU channel (TUADC8) that should be processed when an alarm bit write timing (J12TPC8) is "1", and controls an output signal of its own to be 63 ("111111") when J12TPC8 is "0".

The write enable generating unit 1052-5 generates a write enable signal for each of the alarm bit holding FF circuits 1052A through 1052C each for 0 to 62ch when an output signal of the alarm bit write address controlling unit 1052-4 is 0 to 62, and supplies it to the FF circuits 1052A through 1052C holding alarm bits of WTIMC8, WCRCC8, WLOMC8, which are alarm signals obtained by processing TIM, CRC and LOM, respectively, of the TU channels. When an output signal of the alarm bit write address controlling unit 1052-4 is 63, no write enable is generated since it is not a timing of writing the alarm bits.

The alarm bit read address controlling unit 1052-6 outputs contents of a TU channel (TUADC7) that should be processed when the alarm bit read timing (J12TPC7) is "1", and controls an output signal of its own to be 63 ("111111") when J12TPC7 is "0". The read select generating unit 1052-7 generates a read select signal used to read alarm bits for 0 to 62ch when an output signal of the alarm bit read address controlling unit 1052-6 is 0 to 62. When an output signal of the alarm bit read address controlling unit 1052-6 is 63, no read select signal is generated since it is not a timing of reading the alarm bits.

The TIM selecting unit 1052-8 reads an alarm bit of TIM of a TU channel that should be processed with a read select signal generated by the read select generating unit 1052-7. The CRC selecting unit 1052-9 reads an alarm bit of CRC of a TU channel that should be processed with the read select signal generated by the read select generating unit 1052-7. The LOM selecting unit 1052-10 reads an alarm bit of LOM of a TU channel that should be processed with the read select signal generated by the read select generating unit 1052-7.

The line switch information read select generating unit 1052-11 generates a read select signal for TU channels of 0 to 62ch. The line switch information selecting unit 1052-12 reads an alarm bit of TIM with the read select signal generated by the line switch information read select generating unit 1052-11. The software notification read select generating unit 1052-13 generates a read select signal for TU channels of 0 to 62ch. The software notification selecting unit 1052-14 reads an alarm bit of TIM with the read select signal generated by the software read select generating unit 1052-13, and notifies TIM alarm to the software.

The alarm bit holding unit 1052 with the above structure can hold various alarm information such as TIM, CRC, LOM. etc. in common to TU channels to serially generate TIM alarm.

Figure 103:
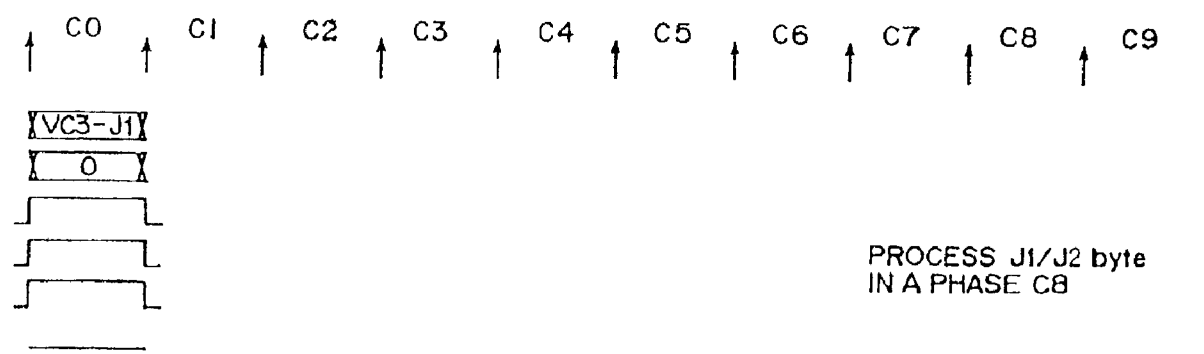
FIGS. 103(*a*) through 103(*h*), 104(*a*) through 104(*l*), 105(*a*) through 105(*n*), 106(*a*) through 106(*k*) and 107(*a*)
Figure 104:
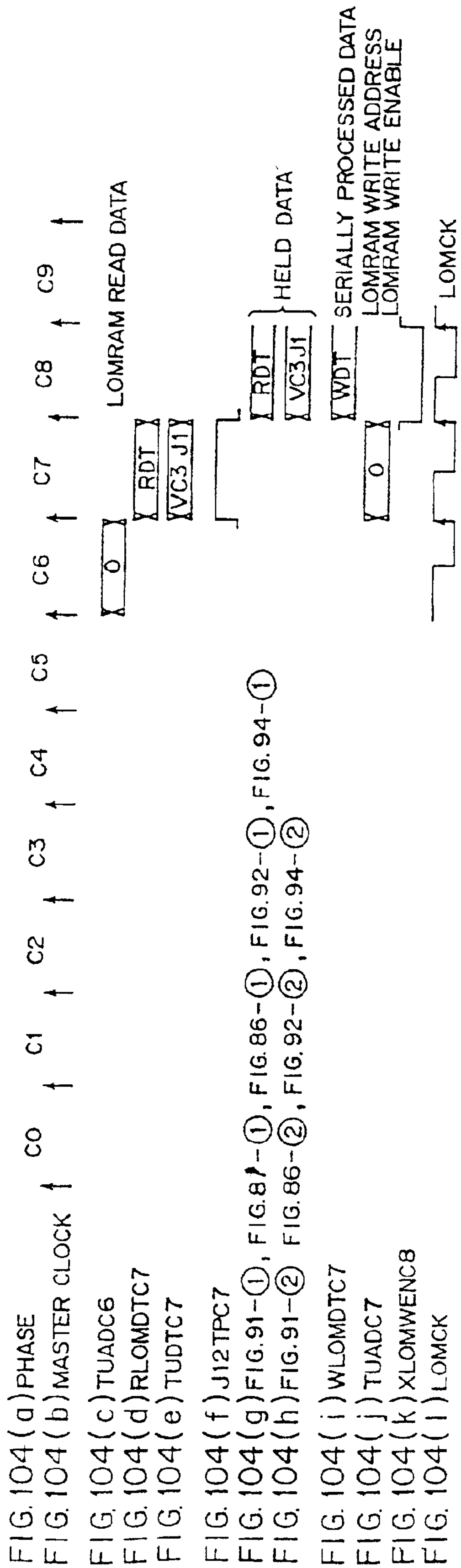

Now, a whole operation of the J1/J2 byte terminating process unit 1022 with the above structure will be described in brief. If TU data (J1 byte of VC3, here) TUAD, SPEEN, J1V5TP, VC3TUG and VC2VC12 are inputted to the phase shifting unit 1032' at timings shown in FIGS. 103(*a*) through 103(*h*), for example, the parts of the multiframe pattern serially detecting unit 1044 and the LOM holdig unit 1050 shown in FIG. 86 operate according to timings shown in FIGS. 104(*a*) through 104(*l*).

Figure 105:
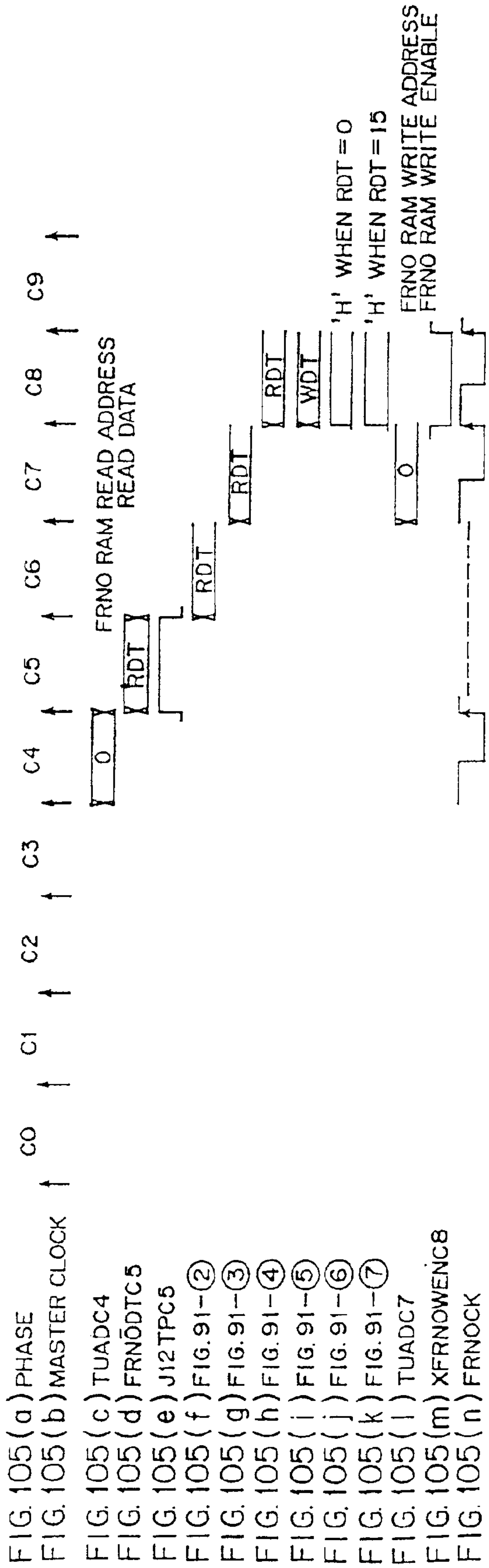
Figure 106:
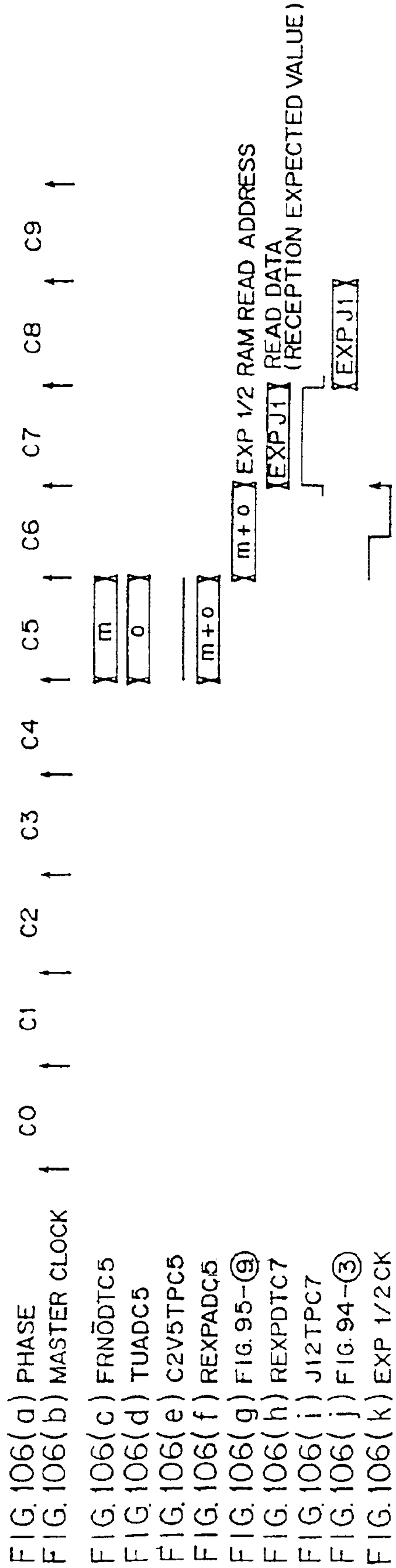

At that time, the parts of the multiframe number serially detecting unit 1045 and the FRNO holding unit 1051 shown in FIG. 87, the LOM serially detecting unit 1046 shown in FIG. 91 and the CRC serially detecting unit 1047 shown in FIG. 92 operate according to timings shown in FIGS. 105(*a*) through 105(*n*), for example, and the TIM serially detecting unit 1049 shown in FIG. 94 and the reception expected value holding unit 1048 shown in FIG. 95 operate according to timings shown in FIGS. 106(*a*) through 106(*k*), whereby a reception expected value of SL necessary in a process conducted in the C2/V5 byte terminating process unit 1024 is generated.

Figure 107:
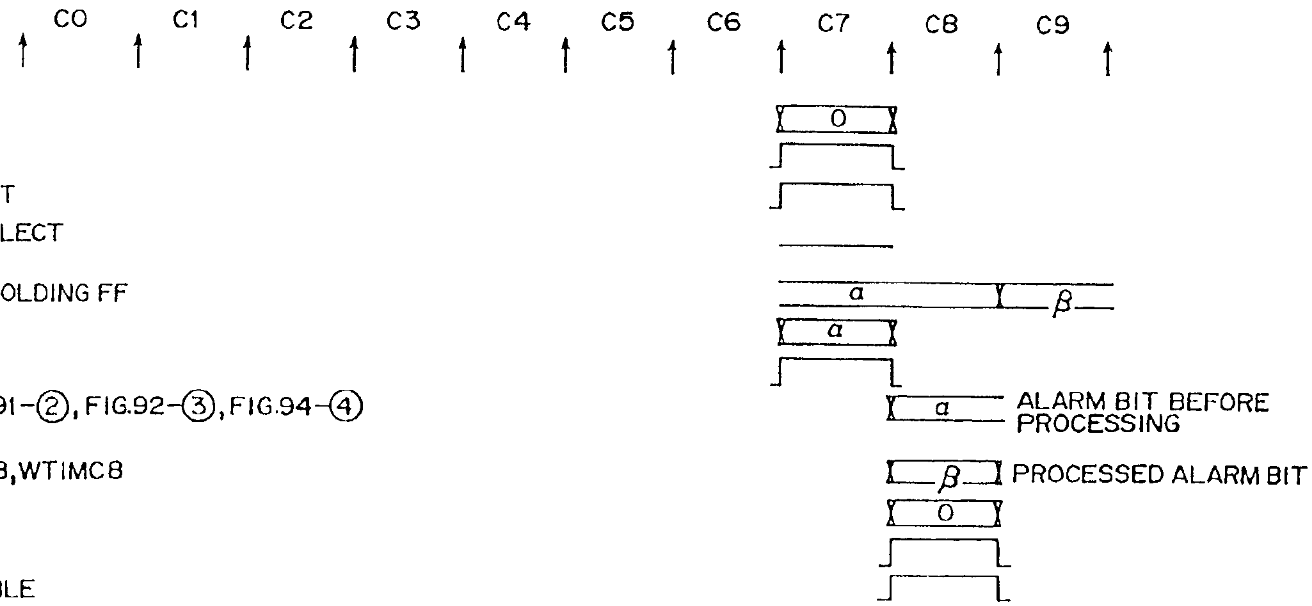

As a result, the parts of the alarm bit holding unit 1052 shown in FIG. 102 operate according to timings shown in FIGS. 107(*a*) through 107(*n*), for example, whereby an alarm bit of TIM is serially generated for each TU channel.

In the POH terminating process unit 1008 according to this embodiment, the J1/J2 byte terminating process unit 1022 common to all TU channels serially conducts a terminating process on J1 byte and a terminating process on J2 byte besides detecting the multiframe pattern of a multiplex signal by one J1/J2 byte terminating process unit 1022 as above, so that it is unnecessary to equip circuits each for conducting the terminating process on J1 byte and circuits each for conducting the terminating process on J2 byte equal in number to corresponding TU channels.

In consequences this embodiment largely contributes to a large reduction in scale and power consumption of the circuit (apparatus) of the POH terminating process unit 1008.

In concrete, the J1/J2 byte terminating process unit 1022 can serially obtain various alarm information such as LOM, CRC, TIM, etc. in common to all TU channels so that it is unnecessary to prepare a circuit for detecting LOM, a circuit for detecting CRC, a circuit for detecting TIM and the like separately. This can largely reduce the apparatus scale and the power consumption.

(b-8) Description of the B3/V5 Byte Terminating Process Unit 1023

FIG. 108 is a block diagram showing a structure of the B3/V5 byte terminating process unit 1023 described before with reference to FIG. 62. As shown in FIG. 108, the B3/V5 byte terminating process unit 1023 has a BIP2 error serially detecting unit 1053, a BIP2 holding unit 1054, a BIP8 error serially detecting unit 1055, a BIPPM count value initialization controlling unit 1056, a BIPPM serially processing unit 1057, a BIPPM holding unit 1058 and a PMRAM address controlling unit 1059.

The BIP2 error serially detecting unit (BIP2 serial operation processing unit) 1053 serially conducts a BIP2 operation on VC2 and VC12 in a multiplex signal on the basis of a BIP2 error obtained one cycle before to detect the BIP2 error. The BIP2 holding unit 1054 holds a result of the BIP2 operation conducted in the BIP2 error serially detecting unit 1053 for each TU channel, besides supplying stored information (a result of the BIP2 operation obtained one cycle before) to the BIP2 error serially detecting unit 1053.

The BIP8 error serially detecting unit (BIP8 serial operation processing unit) 1055 serially conducts a BIP8 operation on VC3 data to detect a BIP8 error. The BIPPM count value initialization controlling unit 1056 controls to initialize a count value of BIPPM according to a PM resetting signal fed from the software's side. The BIPPM serially processing unit 1057 selects an output (BIP2 error or BIP8 error) of the BIP2 error serially detecting unit 1053 or the BIP2 error serially detecting unit 1055, and serially conducts an adding operation on the basis of the selected BIP error signal.

Namely, the BIPPM serially processing unit 1057 has, as shown in FIG. 109, for example, a BIP error selecting unit 1057A for selecting a BIP error signal outputted from the BIP2 error serially detecting unit 1053 or the BIP8 error serially detecting unit 1055, and a BIPPM serially adding unit 1057B for serially conducting an adding operation on BIPPM on the basis of the BIP error signal selected by the BIP error selecting unit 1057A.

The BIPPM holding unit 1058 stores a result (BIPPM) of the operation conducted in the BIPPM serially processing unit 1057 for each TU channel, besides supplying the stored information (BIPPM obtained one cycle before) to the BIPPM serially processing unit 1057. The PMRAM address controlling unit 1059 generates a RAM address for the BIPPM holding unit 1058, and a RAM address for an FEBEPM holding unit 1093 (refer to FIGS. 135 and 139) of the B3/V5 byte terminating process unit 1025, which will be described later, according to a PM resetting signal fed from the software's side.

Namely, in the above B3/V5 byte terminating process unit 1023, the POH terminating operation process unit 1026 shown in FIG. 63 is configured as the B3/V5 byte serially terminating process unit 1026B for serially operating BIP of B3 byte and V5 byte included in the VC4 signal and terminating BIPPM of the B3 byte and V5 byte, besides the storage unit 1027 shown in FIG. 63 is configured as the storage unit 1027B for storing a result of the operation conducted in the B3/V5 byte serially terminating process unit 1026B for each TU channel, while being able to supply stored information to the B3/V5 byte serially terminating process unit 1026B.

Whereby, the above B3/V5 byte terminating process unit 1023 can serially detect a BIP error that should be detected in the POH terminating process for each of TU channels having different signal sizes in common to all the TU channels. To this end, each of the above parts are configured as below, in concrete.

FIG. 110 is a block diagram showing detailed structures of the BIP error serially detecting unit 1053 and the BIP2 holding unit 1054. As shown in FIG. 110, the BIP error serially detecting unit 1053 has FF circuits each with an enable 1053-1 and 1053-2, a BIP2 operation value resetting unit (AND circuit of a 1-input inverting type) 1053-3, an odd-number bit BIP2 operating unit (exclusive-OR circuit) 1053-4, an even-number bit BIP2 operating unit (exclusive-OR circuit) 1053-5, a BIP2 operation comparing unit 1053-6 and a BIP2 error detecting unit (AND circuit) 1053-7, whereas the BIP2 holding unit 1054 has a BIP2 holding RAM 1054-1.

The BIP2 holding RAM 1054-1 of the BIP2 holding unit 1054 holds a result of the BIP2 operation conducted on V5 byte, which operates with the TU address signal (TUADC6) supplied from the phase shifting unit 1032' (refer to FIG. 69) of the timing generating unit 1021 as a read address, the TUADC7 as a write address, the XBIP2WENC8 supplied from the BIP2 holding RAM operation controlling unit 1038 (refer to FIG. 75) of the timing generating unit 1021 as a write enable and the BIP2CK as a RAM clock.

The BIP2 holding RAM 1054-1 holds data of 2 bits, in which a result of the odd-BIP2 operating process is held in a storage region of a bit number "1", and a result of the even-BIP2 operating process in a storage region of a bit number "0".

In the BIP2 error serially detecting unit 1053, the FF circuit 1053-1 holds the 1st bit and the 0th bit of read data fed from the BIP2 holding RAM 1054-1 with a timing signal (SPEENC7) indicating a position of payload data of TU, whereas the FF circuit 1053-2 holds the payload data of VC4 data (TUDTC7) with the above timing signal (SPEENC7). A signal held in the FF circuit 1053-2 is outputted as SPEDTC8.

The BIP2 operation value resetting unit 1053-3 masks a result of the BIP2 operation process read out from the BIP2 holding RAM 1054-1 with a timing signal (V5TPC8) of V5 byte which is in a leading position of a BIP2 operation region to reset an operation value in the preceding BIP2 operation region. The odd-number bit BIP2 operating unit 1053-4 calculates an exclusive-OR (EXOR) of a result of the odd-BIP2 operation process read out from the BIP2 holding RAM 1054-1 and the 1st, 3rd, 5th and 7th bit of the payload held in the FF circuit 1053-2, and writes a result of the calculation in the 1st bit of the BIP2 holding RAM 1054-1.

The even-number bit BIP2 operating unit 1053-5 calculates an exclusive-OR (EXOR) of a result of the odd-BIP2 operation process read out from the BIP2 holding RAM 1054-1 and the 2nd, 4th, 6th and 8th bit of the payload data held in the FF circuit 1053-2, and writes a result of the calculation in the 0th bit of the BIP2 holding RAM 1054-1.

The BIP2 operation comparing unit 1053-6 compares a result of the BIP2 operation process read out from the BIP2 holding RAM 1054-1 with the 1st and 2nd bit of the payload data held in the FF circuit 1053-2, and outputs "1" when the comparison results in disagreement, whose function is realized with an exclusive-OR circuit 1053-6A and an OR gate 1053-6B as shown in FIG. 85.

The BIP2 error detecting unit 1053-7 outputs an output of the BIP2 operation comparing unit 1053-6 as a BIP2 error. However, the above BIP2 operation comparing unit 1053-6 always compares 2 bits with 2 bits so that an invalid result of the comparison is outputted from the BIP2 operation comparing unit 1053-6 at timings other than of V5 byte. For this, the BIP2 error detecting unit 1053-7 extracts a proper result of the comparison of the BIP2 operations according to a timing signal (V5TPC8) of V5 byte.

The BIP2 error serially detecting unit 1053 with the above structure according to this embodiment successively reads out the BIP2 error of the preceding frame from the BIP2 holding RAM 1054-1, conducts the BIP2 operation on the present frame on the basis of the read information to update BIP2 error information, thereby serially detecting the BIP2 error in common to all TU channels.

FIG. 111 is a block diagram showing a detailed structure of the BIP8 error serially detecting unit 1055 shown in FIG. 108. As shown in FIG. 111, the BIP8 error serially detecting unit 1055 according to this embodiment has BIP8 operation value holding units (FF circuits) 1055-1 through 1055-3, BIP8 operation result holding units (FF circuits) 1055-4 through 1055-6, decoding circuits (DECs) 1055-7 through 1055-9, a BIP operation value selecting unit (selector) 1055-10, a BIP8 operation value resetting unit (AND circuit of a 1-input inverting type) 1055-11, a BIP operating unit (exclusive-or circuit) 1055-12, a BIP8 operation value write enable generating unit (AND circuit) 1055-13, a BIP8 operation result write enable generating unit (AND circuit) 1055-14, a BIP8 operation result selecting unit (selector) 1055-15, a BIP8 operation comparing unit 1055-16 and a BIP8 error detecting unit (AND circuit) 1055-17.

The BIP8 operation value holding unit 1055-1 holds a result of a BIP8 operation on each payload data on a TU channel of 0ch. The BIP8 operation value holding unit 1055-2 holds a result of the BIP8 operation on each payload data on a TU channel of 1ch. The BIP8 operation value holding unit 1055-3 holds a result of the BIP8 operation on each payload data on a TU channel of 2ch.

The BIP8 operation result holding unit 1055-4 holds a result of the BIP8 operation on J1 byte of the TU channel of 0ch and J1 byte of the next frame. The BIP8 operation result holding unit 1055-5 holds a result of the BIP8 operation on J1 byte of the TU channel of 1ch and J1 byte of the next frame. The BIP8 operation result holding unit 1055-6 holds a result of the BIP8 operation on J1 byte of the TU channel of 2ch and J1 byte of the next frame.

The decoding circuit ("0" detecting unit) 1055-7 detects that a TU channel (TUADC8) that should be processed is "0". The decoding circuit ("1" detecting unit) 1055-8 detects that a TU channel (TUADC8) that should be processed is "1". The decoding circuit ("2" detecting unit) 1055-9 detects that a TU channel (TUADC8) that should be processed is "2".

The BIP operation value selecting unit 1055-10 elects one among BIP8 operation values fed from the above BIP8 operation value holding units 1055-1 through 1055-3 according to a detection signal fed from the above decoding circuits 1055-7, 1055-8 or 1055-9. The BIP8 operation value resetting unit 1055-11 masks the BIP8 operation value read out from the BIP8 operation value holding unit 1055-1, 1055-2 or 1055-3 at a timing (JLTUPC8) of J1 byte which is in a leading position of a BIP8 operation region to reset a result of the operation in the preceding BIP8 operation region.

The BIP operating unit 1055-12 calculates, bit by bit, an exclusive-OR (EXOR) of the BIP8 operation value reset by the above BIPS operation value resetting unit 1055-11 and SPEDTC8 which is payload data to conduct a BIP8 operation. The BIP8 operation value write enable generating unit 1055-13 generates a signal (write enable signal) used to write the BIP8 operation value having been undergone the BIP8 operation by the BIP operating unit 1055-12 in the corresponding BIP8 operation value holding unit 1055-1, 1055-2 or 1055-3.

The BIP8 operation result write enable generating unit 1055-14 generates a signal (write enable signal) used to write the BIP8 operation values held in the BIP8 operation value holding unit 1055-1 through 1055-3 in the BIP8 operation result holding units 1055-4 through 1055-6, respectively, at a timing (JITUPC8) of J1 byte indicating a leading position of the BIP8 operation region.

The BIP8 operation result selecting unit 1055-15 selects a result of the BIP8 operation according to a detection signal fed from the decoding circuits 1055-7, 1055-8 or 1055-9. The BIP8 operation comparing unit 1055-16 detects disagreement between a result of the BIP8 operation selected by the BIP8 operation result selecting unit 1055-15 and the payload data, whose function is realized with an exclusive-OR circuit 1055-16A and an OR circuit 1055-16B.

The BIP8 error detecting unit 1055-17 outputs an output of the BIP8 operation comparing unit 1055-16 as the BIP8 error (BIP8ERRC8). However, since the above BIP8 operation comparing unit 1055-16 always compares 8 bits, the BIP2 operation comparing unit 1055-16 outputs an invalid result of the comparison at a timing of excepting B3 byte. For this, the BIP8 error detecting unit 1055-17 extracts and outputs only a proper result of the BIP8 operation with a timing signal (B3TPC8) of B3 byte.

The BIP8 error serially detecting unit 1055 with the above structure according to this embodiment can accurately detect and output BIP8 error information at any time.

FIG. 112 is a block diagram showing detailed structures of the BIPPM serially processing unit 1057 and the BIPPM holding unit 1058 shown in FIG. 108. As shown in FIG. 112, the BIPPM serially processing unit 1057 has an FF circuit with an enable 1057-1, an error count value initialization controlling unit (AND circuit of a 1-input inverting type) 1057-2, a BIP error detecting unit (OR circuit) 1057-3 and a BIPPM adding unit 1057-4, whereas the BIPPM holding unit 1058 has a BIPPM holding RAM 1058-1.

The BIPPM holding RAM 1058-1 of the BIPPM holding unit 1058 holds a BIP error count value and a BIPPM count value that should be notified to the software, which operates with an address signal (RPMADC6) as a read address on a counting plane, an address signal (WPMADC7) as a write address on the counting plane, a timing signal (XBIPPMWENC8) supplied form the BIP holding RAM operation controlling unit 1042 (refer to FIG. 79) of the timing generating unit 1021 as a write enable, an address signal (BIPPMRAD) as a read address on a notification plane and a clock (BIPPMCK) supplied form the BIP holding RAM operation controlling unit 1042 as a RAM clock. Incidentally, the above address signals (RPMADC6, WPMADC7 and BIPPMRAD) are supplied from the PMRAM address controlling unit 1059.

In the above BIPPM holding RAM 1058-1, as shown in FIG. 114, for example, a PM count value of BIP2/8 is read out at a detecting timing of B3 byte of TU3 or V5 byte of TU2/TU12, and the PM count value of BIP2/8 is notified to the software in response to a read request ($\mu$-COM Read) from the software's side, besides an updated value of the PM count value of BIP2/8 is written at a detecting timing of B3 byte of TU3 or V5 byte of TU2/TU12.

In BIPPM, in order to count the number of BIP errors occurring between PM resetting signals and notify a counted value to the software until the next PM resetting signal, it is necessary to count the errors and notify the count value between the PM resetting signals. For this, it is necessary to hold a count value of errors and hold the count value to be notified.

Therefore, the BIPPM holding RAM 1058-1 of this embodiment has, as shown in FIG. 116, for example, a low-order plane [address 0 (00HEX) to 63 (3FHEX)] and a high-order plane [address 64 (40HEX) to 127 (7FHEX)] are assigned as the counting plane used to count BIP errors and the notification plane (PM results holding plane) used to notify a count value of BIP, respectively.

Roles of the above planes as the counting plane and the notification plane are exchanged with each other whenever the PM resetting signal is inputted. According to this embodiment, the planes are exchanged with each other by switching polarity of the MSB bit (PM) of a RAM address as shown in FIGS. 115 and 117, for example.

The BIPPM holding RAM 1058-1 holds data of 13 bits, as shown in FIG. 113, for example, wherein a BIP error count value is held at a bit number 12 through 0 on the counting plane, while a BIPPM count value is held at a bit number 12 through 0 on the notification plane.

The BIPPM serially processing unit 1057 with the above structure according to this embodiment can successively read out BIPPM of the preceding frame from the BIPPM holding RAM 1058-1 to update BIPPM of the present frame on the basis of information read out, serially detect BIPPM in common to all TU channel, hold the BIPPM in the BIPPM holding RAM 1058-1, and notify the BIPPM to the software's side.

FIG. 118 is a block diagram showing a detailed structure of the PMRAM address controlling unit 1059 shown in FIG. 108. As shown in FIG. 118, the PMRAM address controlling unit 1059 according to this embodiment has a counting plane holding unit (FF circuit with an enable) 1059-1, an inverting element 1059-2 and FF circuits 1059-3 through 1059-6.

The counting plane holding unit 1059-1 generates a signal (PM count address signal) representing either the high-order plane or the low-order plane of the above BIPPM holding RAM 1058-1 is used as the counting plane. The counting plane holding unit 1059-1 captures a signal obtained by inverting polarity of an output signal of its own each time a PM resetting signal is inputted, thereby exchanging the roles of the low-order plane and the high-order plane with each other.

For example, when the PM resetting signal is inputted to the counting plane holding unit 1059-1 while an output signal of the counting plane holding unit 1059-1 is "0" and the low-order plane is used as the counting plane while the high-order plane is used as the notification plane, "1" obtained by inverting polarity of an output signal of the counting plane holding unit 1059-1 by the inverting element 1059-2 is captured in the counting plane holding unit 1059-1. As a result, an output signal of the counting plane holding unit 1059-1 becomes "1" after the PM is reset, whereby the planes are exchanged so that the low-order plane is used as the notification plane, whereas the high-order plane is used as the counting plane.

The FF circuit 1059-3 delays a phase of a PM count address signal generated by the counting plane holding unit 1059-1 by one clock of the master clock. An output (RPMADC6) of the FF circuit 1059-3 is used as a read address on the counting plane of the BIPPM Holding RAM 1058-1 and an FEBEPM holding RAM 1093 (refer to FIGS. 135 and 139) which will be described later.

The FF circuit 1059-4 delays a phase of a PM count address signal fed form the above FF circuit 1059-3 by one clock of the master clock. An output (RPMADC7) of the FF circuit 1059-4 is used as a write address on the counting plane of the BIPPM Holding RAM 1058-1 and the FEBEPM holding RAM 1093.

The FF circuit 1059-5 delays a phase of a BIPPM notification address [a signal of 7 bits obtained by adding an address signal (MBIPPMRAD: 6 bits) indicating a TU channel used to read BIPPM supplied from the software's side to an output signal (1 bit) of the inverting element 1059-2] by one clock of the master clock. An output (BIPPM notification address) of the FF circuit 1059-5 is used as a read address on the notification plane of the BIPPM holding RAM 1058-1.

The FF circuit 1059-6 delays a phase of an FEBEPM notify address [a signal of 7 bits obtained by adding an address signal (FEBEPMRAD: 6 bits) indicating a TU channel used to read FEBEPM supplied from the software's side to an output signal (1 bit) of the inverting element 1059-2] by one clock of the master clock. An output (FEBEPM notify address) of the FF circuit 1059-6 is used as a read address on the notification plane of the FBEPM holding RAM 1093.

The PMRAM address controlling unit 1059 with the above structure according to this embodiment exchanges the counting plane and the notification plane of each of the BIPPM holding RAM 1058-1 and the FEBEPM holding RAM 1093 at an optimum timing, thereby notifying accurate BIPPM and FEBEPM to the software's side at any time.

FIG. 119 is a block diagram showing a detailed structure of the BIPPM count value initialization controlling unit 1056 shown in FIG. 108. As shown in FIG. 119, the BIPPM count value initialization controlling unit 1056 has FF circuits 1056-1, 1056-2 and 1056-8, a timing controlling unit (OR circuit of a 1-input inverting type) 1056-3, a read/write signal generating unit [deocding circuit (DEC)] 1056-4, a write enable generating unit (OR circuit) 1056-5, a BIPPM count value initialization request signal holding unit (FF circuit) 1056-6 and a BIPPM count value initialization request signal selecting unit (selector) 1056-7.

The FF circuits 1056-1 and 1056-2 each delays a phase of a PM resetting signal by one clock of the master clock. By delaying a phase of the PM resetting signal in the FF circuits 1056-1 and 1056-2 as above, a timing of a control on switching the planes with the PM resetting signal conducted in the above PMRAM address controlling unit 1059 and a timing of a control on initialization of a BIPPM count value conducted in the BIPPM count value initialization controlling unit 1056 are adjusted.

The timing controlling unit 1056-3 controls a timing of a BIPPM count value initialization request signal. For example, the timing controlling unit 1056-3 outputs contents of a TU channel (TUADC7) that should be processed when a signal indicating a timing of conducting a BIPPM process is "1", while controlling an output signal of its own to be 63 ("111111" in binary coded representation) when the above timing signal (B3V5TPC7) is "0".

The read/write signal generating unit 1056-4 generates a select signal (supplied to the BIPPM count value initialization request signal selecting unit 1056-7) used to read a BIPPM count value initialization request signal for any channel among 0 to 62ch when an output signal of the timing controlling unit 1056-3 is a corresponding value among 0 to 62 and a write enable signal for the BIPPM count value initialization request signal holding unit 1056-6. When an output signal of the timing controlling unit 1056-3 is 63, it is not a timing of conducting a process of BIPPM so that the read select signal and the write enable signal are not generated.

The write enable generating unit 1056-5 makes all write enable signals for 0 to 62ch be "1" when the PM resetting signal is inputted through the FF circuit 1056-2, while outputting an output signal of the read/write signal generating unit 1056-4 as it is when no PM resetting signal is inputted. The BIPPM count value initialization request signal holding unit 1056-6 holds BIPPM count value initialization request signals for TU channels of 0 to 62ch, whose function is realized with 63 FF circuits 1056-6A.

In the BIPPM count value initialization request signal holding unit 1056-6, write enables for all channels becomes "1" by the PM resetting signal fed from the FF circuit 1056-2, for example, so that data of the FF circuits 1056-6A for all channels becomes "1." Namely, "1" is simultaneously written in the FF circuits 1056-6A for all channels by the PM resetting signal.

When a timing signal (B3V5TPC7) of B3/V5 is inputted after the PM resetting, a write enable signal for a channel whose BIPPM count value should be processed becomes "1" through processes conducted in the timing controlling unit 1056-3, the read/write signal generating unit 1056-4 and the write enable generating unit 1056-5. Since the PM resetting signal is not inputted at this time, input data of the FF circuits 1056-6A becomes "0" so that "0" is written in the FF circuit 1056-6A for a channel that should be processed. In consequence, the BIPPM count value initialization request signal is cancelled by the first B3V5 timing signal (B3V5TPC7).

Namely, only at the first B3V5 timing after the PM resetting, the BIP error count value read out from the counting plane is initialized.

The BIPPM count value initialization request signal selecting unit 1056-7 selectively reads the BIPPM count value initialization request signal for 0 to 62ch according to an output signal of the read/write signal generating unit 1056-4. The FF circuit 1056-8 delays a phase of an output signal of the BIPPM count value initialization request signal selecting unit 1056-7 by one clock of the master clock to adjust the phase of the output signal of the BIPPM count value initialization request signal selecting unit 1056-7 to a phase in which a resetting process is conducted in the BIPPM serially processing unit 1057.

The BIPPM count value initialization controlling unit 1056 with the above structure according to this embodiment can generate a resetting signal (BIPPMCTRRSTC8) used to initialize the BIPPM count value at an optimum timing at any time on the basis of the PM resetting signal, the TU address signal and the B3V5 timing signal, and supply it to the BIPPM serially processing unit 1057, thereby accurately operating the BIPPM serially processing unit 1057 at any time.

Now, a whole operation of the B3/V5 byte terminating process unit 1023 with the above structure will be described in brief. If TU data (V5 byte), TUAD, SPEEN, J1V5TP are inputted as shown in FIGS. 120(*a*) through 120(*f*), for example, the parts of the BIP2 error serially detecting unit 1053 and the BIP2 holding unit 1054 shown in FIG. 110 operate according to timings shown in FIGS. 121(*a*) through 121(*o*).

At this time, the parts of the PMRAM address controlling unit 1059 shown in FIG. 118 and the BIPPM count value initialization controlling unit 1056 shown in FIG. 119 operate according to timings shown in FIGS. 123(*a*) through 123(*q*) [or FIGS. 124(*a*) through 124(*o*)], for example, so that the parts of the BIPPM serially processing unit 1057 and the BIPM holding unit 1058 shown in FIG. 112 operate according to timings shown in FIGS. 122(*a*) through 122(*n*), for example, whereby the BIPPM process for each TU channel is serially conducted.

The POH terminating process unit 1008 according to this embodiment can serially conduct the BIP terminating (operating) process on B3 byte and the BIP terminating process on V5 byte in the B3/V5 byte terminating process unit 1023 in common to all channels. Therefore, it is unnecessary to equip circuits for the BIP terminating processes on B3 byte and V5 byte equal in number to corresponding channels. This can largely decrease a scale and a power consumption of the apparatus.

In concrete, the B3/V5 byte terminating process unit 1023 detects the BIP errors (BIP8 error and BIP2 error) that should be detected in the POH terminating process for each channel generally having different signal sizes, in common to all channels. It is therefore unnecessary to equip, for example, circuits for detecting BIP8 errors and circuits for detecting BIP2 errors equal in number to corresponding channels. This can further largely decrease a scale and a power consumption of the apparatus.

Figure 125:
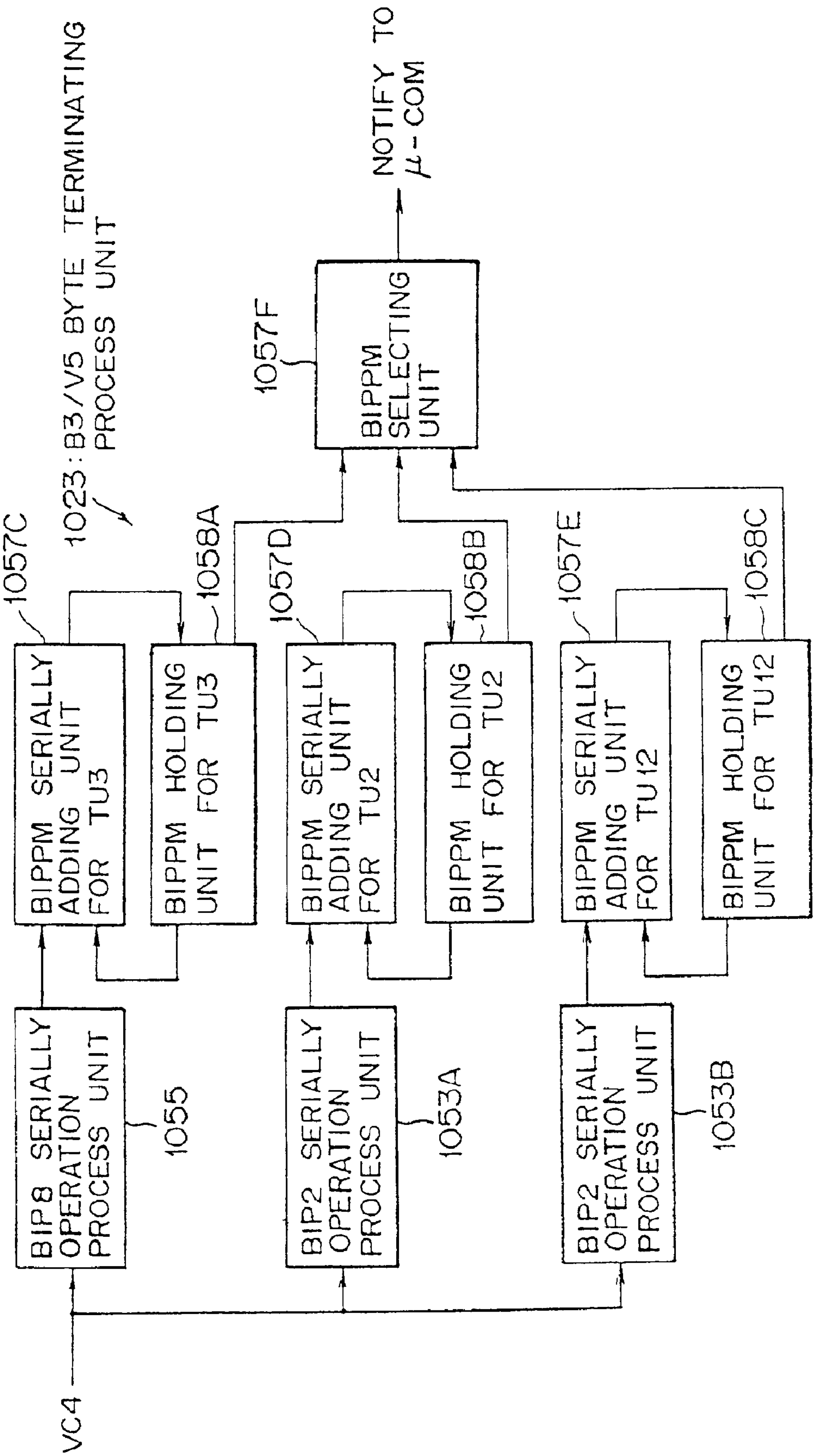

The above B3/V5 byte terminating process unit 1023 (refer to FIG. 109) may have, as shown in FIG. 125, for example, BIP2 serially operating process units 1053A and 1053B, a BIP8 serially operating process unit 1055, a BIPPM serially adding unit for TU3 (first BIPPM serially adding units) 1057C, BIPPM serially adding units for TU2/TU12 (second BIPPM serially adding unit) 1057D and 1057E, a BIPPM holding units (first storage units) 1058A, BIPPM holding unit for TU2/TU12 (second storage units) 1058B and 1058C and a BIPPM selecting unit 1057F to obtain BIP error signals (BIPPMs) through a BIP8 serially terminating process and a BIP2 serially terminating process, one by one, and selectively output each of the BIPPMs.

The B3/V5 byte terminating process unit 1023 shown in FIG. 125 can serially obtain BIPPMs in a simple structure. This is very effective if there is particularly no need to use the BIPPM holding units 1058A through 1058C in common to all signal sizes, contributing to versatility and flexibility in configuring the apparatus.

(b-9) Description of the C2/V5 Byte Terminating Process Unit 1024

Figure 126:
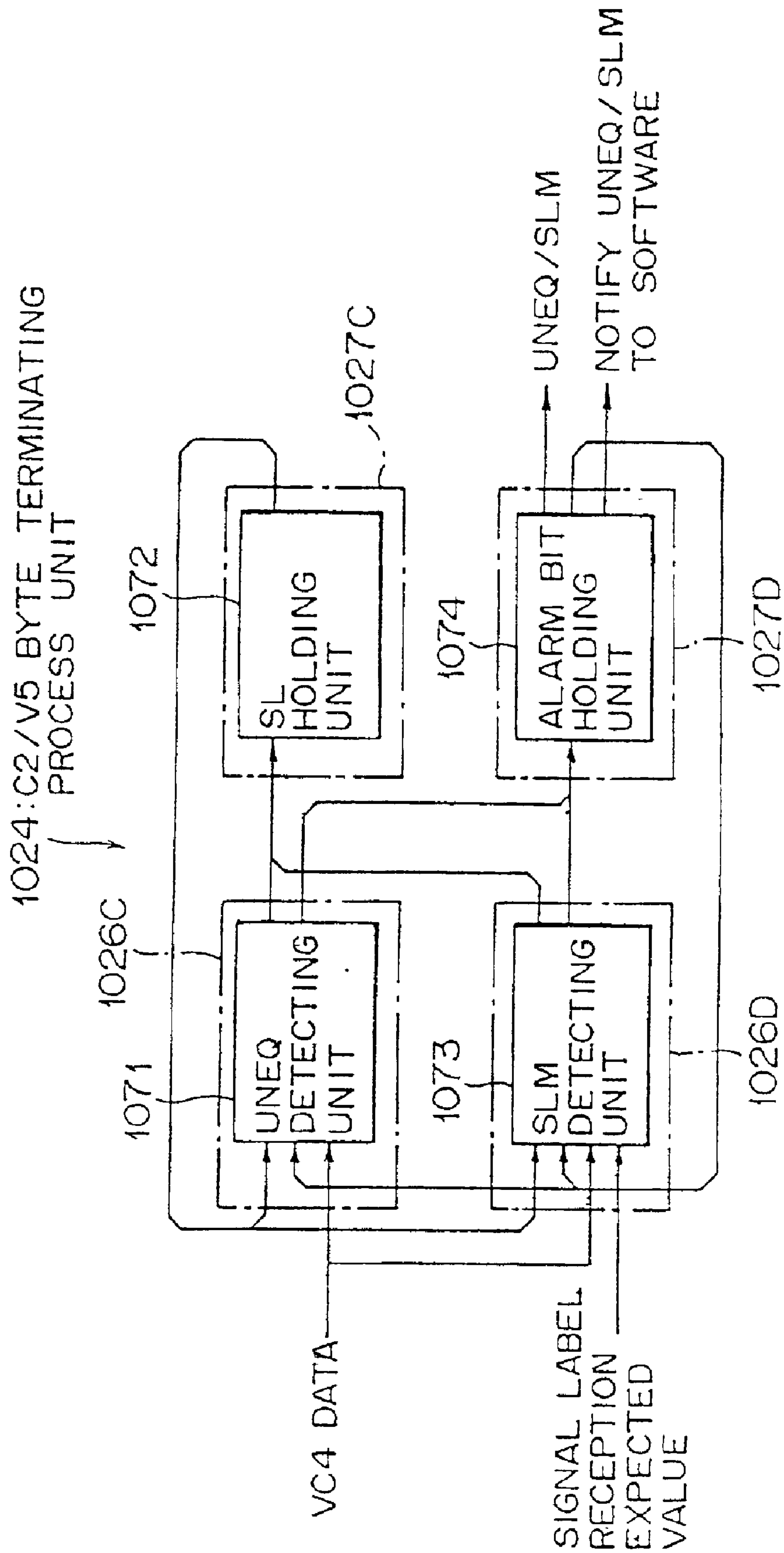

FIG. 126 is a block diagram showing a structure of the C2/V5 byte terminating process unit 1024 described before with reference to FIG. 62. As shown in FIG. 126, the C2/V5 byte terminating process unit 1024 has a UNEQ detecting unit 1071, an SL holding unit 1072, an SLM detecting unit 1073 and an alarm bit holding unit 1074.

The UNEQ detecting unit 1071 serially detects UNEQ indication of C2 byte and V5 byte (signal labels: SL) included in the multiplex signal (VC4 data). The SL holding unit (UNEQ data holding unit) 1072 stores a result of detection obtained in the UNEQ detecting unit 1071 for each channel, besides supplying stored information to the UNEQ detecting unit 1071.

The SLM detecting unit 1073 serially detects that mismatch (SLM) is detected from C2/V5 byte included in the VC4 data. The alarm bit holding unit (SLM data holding unit) 1074 holds a result of each detection obtained in the SLM detecting unit 1073 for each channel, besides supplying stored information to the SLM detecting unit 1073.

In the C2/V5 byte terminating process unit 1024, the POH terminating operation processing unit 1026 shown in FIG. 63 is configured as a UNEQ serially terminating process unit 1062C for serially conducting a terminating process on UNEQ of C2/V5 byte included in VC4 data and an SLM serially terminating process unit 1026D for serially conducting a terminating process on SLM of C2 byte/V5 byte mentioned above, and the storage unit 1027 shown in FIG. 63 is configured as a storage unit 1027C for storing a result of an operation conducted in the UNEQ serially terminating process unit 1026C for each channel, besides supplying stored information to the UNEQ serially terminating process unit 1026C, and a storage unit 1027D for storing a result of an operation conducted in the SLM serially terminating process unit 1026D for each channel, besides supplying stored information to the SLM serially terminating process unit 1026D.

The above C2/V5 byte terminating process unit 1024 can thereby serially detect UNEQ indication and SLM that should be detected in the POH terminating process for each of TU channels generally having different signal sizes, in common to all channels.

Figure 127:
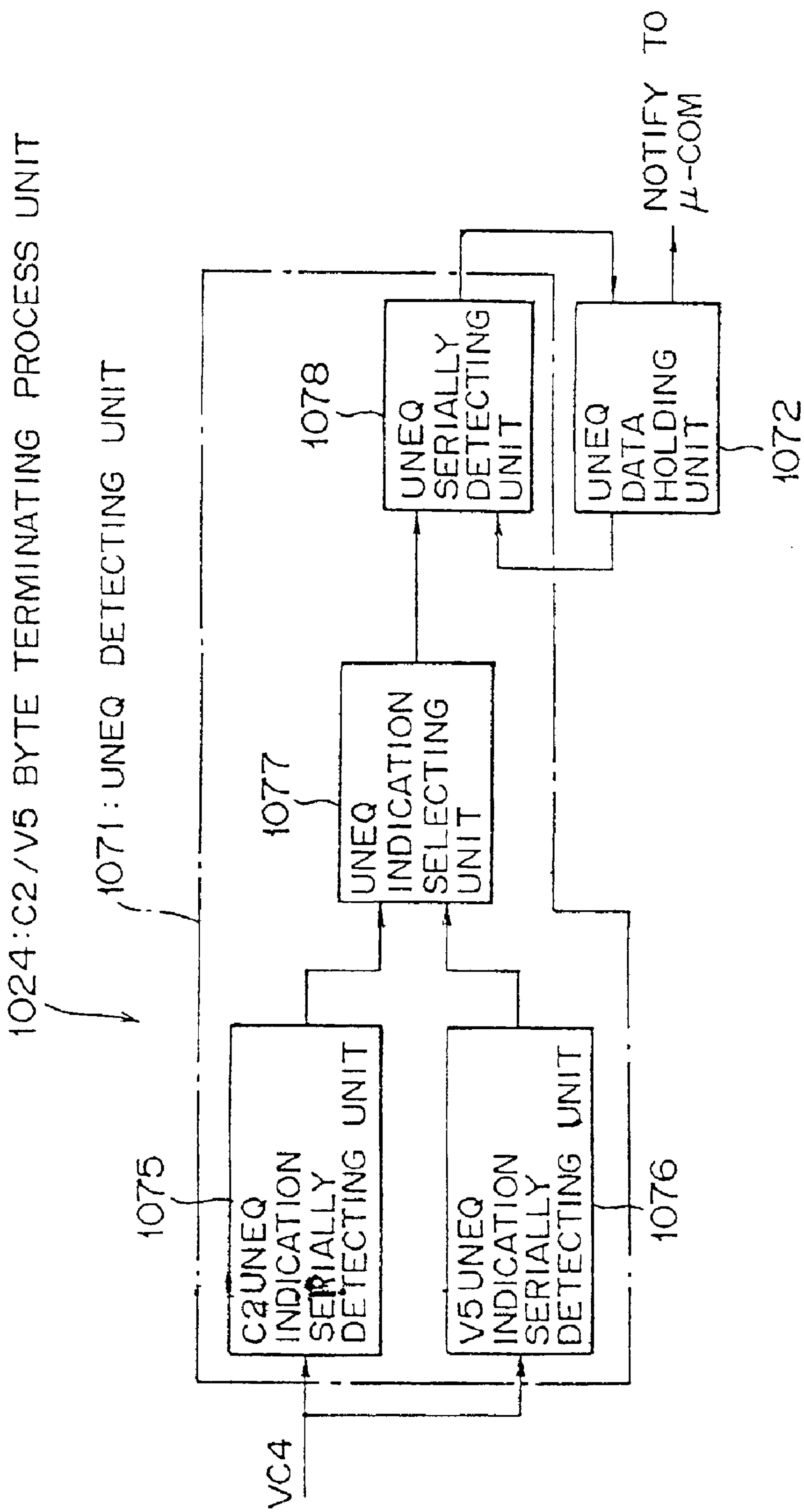

In concrete, the above UNEQ detecting unit 1071 has, as shown in FIG. 127, for example, a C2UNEQ indication serially detecting unit 1075 for serially detecting whether C2 byte is of UNEQ indication or not, a V5UNEQ indication serially detecting unit 1076 for serially detecting whether V5 byte is of UNEQ indication or not, a UNEQ indication selecting unit 1077 for selecting a UNEQ indication detect signal outputted from the detecting unit 1075 or 1076, and a UNEQ serially detecting unit 1078 for serially detecting UNEQ of C2/V5 byte on the basis of the UNEQ indication detect signal selected by the UNEQ indication selecting unit 1077.

Figure 128:
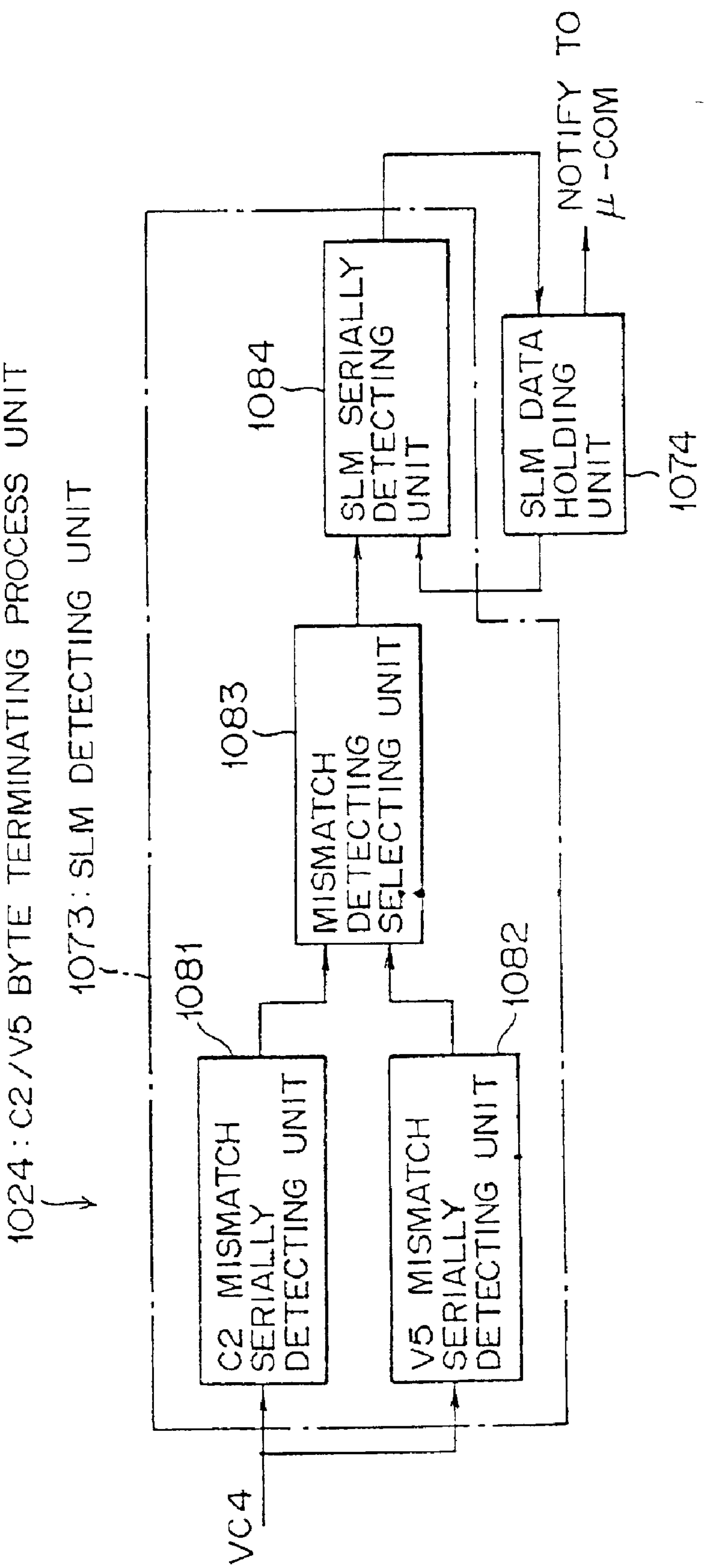

On the other hand, the above SLM detecting unit 1073 has, as shown in FIG. 128, for example, a C2 mismatch serially detecting unit 1081 for serially detecting that mismatch is detected in C2 byte, a V5 mismatch serially detecting unit 1082 for serially detecting that mismatch is detected in V5 byte, a mismatch selecting unit 1083 for selecting a mismatch detect signal outputted from the detecting unit 1081 or 1082, and an SLM serially detecting unit 1084 for serially detecting SLM of C2/V5 byte on the basis of the mismatch detect signal selected by the mismatch selecting unit 1083.

Next, detailed description will be made of the UNEQ detecting unit 1071, the SL holding unit 1072, the SLM detecting unit 1073 and the alarm bit holding unit 1074 mentioned above.

FIG. 129 is a block diagram showing detailed structures of the UNEQ detecting unit 1071 and the SL holding unit 1072. As shown in FIG. 129, the UNEQ detecting unit 1071 has FF circuit 1071-1 through 1071-3 each with an enable, a UNEQ protective stage number adding unit 1071-4, decoding circuits (DECs) 1071-5 through 1071-7, a cancel stage number selecting unit (selector) 1071-8, an SL region controlling unit (AND circuit) 1071-9, a UNEQ indication detecting unit (NOR circuit) 1071-10, an addition condition detecting unit (exclusive-OR circuit) 1071-11, a UNEQ detection 4-stage detecting unit (AND circuit of a 1-input inverting type) 1071-12, a UNEQ cancel stage number detecting unit (AND circuit) 1071-13, a state transition occurrence detecting unit (OR circuit) 1071-14, a UNEQ protective stage number information resetting unit (AND circuit of a 1-input inverting type) 1071-15 and a state transitting unit (exclusive-OR circuit) 1071-16, whereas the SL holding unit 1072 has an SL holding RAM 1072-1.

The SL holding RAM 1072-1 of the SL holding unit 1072 holds protective stage number information of UNEQ and SLM, which operates with a TU address signal (TUADC6) supplied from the phase shifting unit 1932' (refer to FIG. 69) of the timing generating unit 1021 as a read address, TUADC7 as a write address, XSLWENC8 supplied from the SL holding RAM operation controlling unit 1039 (refer to FIG. 76) of the timing generating unit 1021 as a write enable and SLCK as a RAM clock.

The SL holding RAM 1072-1 according to this embodiment holds data of 6 bits, wherein UNEQ protective stage number information is stored in a storage region of a bit number 2 to 0, while SLM protective stage number information is stored in a storage region of a bit number 5 to 3.

In the UNEQ detecting unit 1071, the FF circuit 1071-1 holds data (UNEQ protective stage number information) of the 2nd to 0th bit of read data of the SL holding RAM 1072-1 at a timing signal (C2V5TPC7) indicating a position of C2/V5 byte. The FF circuit 1071-2 holds data of C2/V5 byte of VC4 data (TUDTC7) at the above timing signal (C2V5TPC7). The FF circuit 1071-3 holds a UNEQ alarm bit which is a result of a process on the preceding frame at the above timing signal (C2V5TPC7).

The UNEQ protective stage number adding unit 1071-4 adds 1 to a count value of the UNEQ protective stage number information read out from the SL holding RAM 1072-1. The decoding circuit ("3" detecting unit) 1071-5 detects that a count value of the UNEQ protective stage number information read out is "3". The decoding circuit ("4" detecting unit) 1071-6 detects that a count value of the UNEQ protective stage number information read out is "4". The decoding circuit ("5" detecting unit) 1071-7 detects that a count value of the UNEQ protective stage number information read out is "5".

The cancel stage number selecting unit 1071-8 selects an output signal of the decoding circuit 1071-7 at a timing signal of C2 byte used to detect UNEQ in TU3 since the number of stages adopted to cancel UNEQ in TU3 is different from that in TU2/12 such that 6 stages are used in TU3 whereas 5 stages are used in TU2/TU12. Since an SL region of C2 byte is different from that of V5 byte such that all 8 bits of C2 byte are a signal label in TU3 whereas the 5th to 7th bit of V5 byte are the signal label in TU2/TU12, the SL region controlling unit 1071-9 does not control when data held in the FF circuit 1071-2 is C2 byte, but controls to mask the 1st to 4th bit and 8th bit to replace each of them with "0" when data held in the FF circuit 1071-2 is V5 byte.

The UNEQ indication detecting unit 1071-10 detects that 8 bits of a signal having been controlled by the SL region controlling unit 1071-9 are all "0". The addition condition detecting unit 1071-11 detects that UNEQ indication is not detected while UNEQ occurs or UNEQ indication is detected while UNEQ does not occur. The UNEQ detection 4-stage detecting unit 1071-12 recognizes that an addition condition is detected consecutively over 4 frames when the addition condition is consecutively detected over 3 frames by the decoding circuit 1071-5 while UNEQ is not detected and further the addition condition is detected even in the present frame, so as to detect UNEQ.

The UNEQ cancel stage number detecting unit 1071-13 recognizes that the addition condition is consecutively detected over 5 frames or 6 frames when the addition condition is detected consecutively over 4 or 5 frames from an output signal of the decoding circuit 1071-6 or 1071-7 selected by the cancel stage number selecting unit 1071-8 and further the addition condition is detected in the present frame, so as to cancel UNEQ.

The state transition occurrence detecting unit 1071-14 detects that conditions for detecting or cancelling UNEQ occur. The UNEQ protective stage number information resetting unit 1071-15 resets a count value of the UNEQ protective stage number information to "0" when the addition condition is not detected in the addition condition detecting unit 1017-11 and when state transition is detected in the state transition occurrence detecting unit 1071-14, whose output signal (count value) is written in the SL holding RAM 1072-1.

The state transitting unit 1071-16 inverts polarity of a UNEQ alarm bit when the state transition occurrence detecting unit 1071-14 detects occurrence of state transition to generate a signal (WUNEQC8) indicating state transition from/to a state where UNEQ is occurring to/from a state where UNEQ is not occurring. This signal (WUNEQC8) is written in the alarm bit holding unit 1074.

The UNEQ detecting unit 1071 according to this embodiment successively reads out UNEQ of the preceding frame from the SL holding RAM 1072-1 to update UNEQ of the present frame on the basis of information read out, thereby serially detecting UNEQ and notifying the UNEQ to the software's side in common to all TU channels.

FIG. 130 is a block diagram showing a detailed structure of the SLM detecting unit 1073 shown in FIG. 126. As shown in FIG. 130, the SLM detecting unit 1073 according to this embodiment has FF circuits 1073-1 through 1073-4 each with an enable, an SLM protective stage number adding unit 1073-5, decoding circuits (DECs) 1073-6 and 1073-7, an SL region controlling unit (AND circuit) 1073-8, a disagreement detecting unit 1073-9, an addition condition detecting unit (exclusive-OR circuit) 1073-10, an SLM detection 7-stage detecting unit (AND circuit) 1073-11, an SLM cancel 3-stage detecting unit (AND circuit) 1073-12, a state transition occurrence detecting unit (OR circuit) 1073-13, an SLM protective stage number information resetting unit (OR circuit) 1073-14 and a state transitting unit (exclusive-OR circuit) 1073-15.

The FF circuit 1073-1 holds data (SLM protective stage number information: RSLDTC7) at the 5th to 3rd bits of read data fed from the SL holding RAM 1072-1 with a timing signal (C2V5TPC7) indicating a position of C2/V5 byte. The FF circuit 1073-2 holds data of C2/V5 bytes of VC4 data (TUDTC7) with the above timing signal (C2V5TPC7).

The FF circuit 1073-3 holds a reception expected value (REXPSLC7) of a signal label read out from the above-mentioned reception expected value holding unit 1048 (refer to FIGS. 85 and 95) with the above timing signal (C2V5TPC7). The FF circuit 1073-4 holds data (RSLMC7) of a result of an SLM detecting process on the preceding frame with the above timing signal (C2V5TPC7).

The SLM protective stage number adding unit 1073-5 adds 1 to a count value of the SLM protective stage number information read out from the SL holding RAM 1072-1. The decoding circuit ("6" detecting unit) 1073-6 detects that a count value of the SLM protective stage number information read out is "6". The decoding circuit ("2" detecting unit) 1073-7 detects that a count value of the SLM protective stage number information read out is "2".

The SL region controlling unit 1073-8 does not control when data held in the FF circuit 1073-3 is C2 byte since a region of SL in TU3 is different from a region of SL in TU2/TU12 such that all 8 bits of C2 byte are a signal label in TU3 whereas the 5th to 7th bits of V5 byte are a signal label in TU2/TU12. When the data held in the FF circuit 1073-3 is V5 byte, the SL region controlling unit 1073-8 controls to mask the 1st to the 4th bit and the 8th bit to replace each of them with "0".

The disagreement detecting unit 1073-9 detects disagreement between received data of 8 bits having been masked by the SL region controlling unit 1073-8 and an SL reception expected value. The addition condition detecting unit 1073-10 detects an addition condition when the received value of SL coincides with the reception expected value while SLM occurs and when the received value of SL does not coincide with the reception expected value while SLM does not occur.

The SLM detection 7-stage detecting unit 1073-11 recognizes that the addition condition is consecutively detected over 7 frames when the addition condition is consecutively detected over 6 frames by the decoding circuit 1073-6 while SLM is not detected and further the addition condition is detected even in the present frame, so as to detect SLM. The SLM cancel 3-stage detecting unit 1073-12 recognizes that the addition condition is consecutively detected over 3 frames when the addition condition is consecutively detected over 2 frame by the decoding circuit 1073-7 while SLM is detected, and further the addition condition is detected even in the present frame, so as to cancel SLM.

The state transition occurrence detecting unit 1073-13 detects that a condition for detecting or cancelling SLM occurs. The SLM protective stage number information resetting unit 1073-14 resets a count value of the SLM protective stage number information to "0" when the addition condition is not detected by the addition condition detecting unit 1073-10 and when occurrence of state transition is detected by the state transition occurrence detecting unit 1073-13. The state transitting unit 1073-15 inverts polarity of an SLM alarm bit when occurrence of state transition is detected by the state transition occurrence detecting unit 1073-13 to transit the state from/to a state where SLM is occurring to/from a state where SLM is not occurring, whose output signal (WSLMC8) is written in the alarm bit holding unit 1074.

The above alarm bit holding unit 1074 has, as shown in FIG. 131, for example, a UNEQ alarm bit holding unit 1074-1, an SLM alarm bit holding unit 1074-2, an alarm bit write address controlling unit (OR circuit of a 1-input inverting type) 1074-3, a write enable generating unit [decoding circuit (DEC)] 1074-4, an alarm bit read address controlling unit (OR circuit of a 1-input inverting type) 1074-5, a read select generating unit [decoding circuit (DEC)] 1074-6, a UNEQ selecting unit (selector) 1074-7, an SLM selecting unit (selector) 1074-8, a line switching information read select generating unit [decoding circuit (DEC9] 1074-9, a UNEQ line switching information selecting unit (selector) 1074-10, an SLM line switching information selecting unit (selector) 1074-11, a software notification read select generating unit (selector) 1074-12, a UNEQ software notification selecting unit (selector) 1074-13 and an SLM software selecting unit (selector) 1074-14.

The UNEQ alarm bit holding unit 1074-1 holds UNEQ alarm bits for TU channels of 0 to 62ch in 63 FF circuits 1074-1A. The SLM alarm bit holding unit 1074-2 holds SLM alarm bits for TU channels of 0 to 62ch in 63 FF circuits 1074-2A.

The alarm bit write address controlling unit 1074-3 outputs contents of a TU channel (TUADC8) that should be processed when a timing signal (C2V5TPC8) indicating a timing of writing an alarm bit is "1", while controlling an output signal of its own to be 63 ("111111") when the above timing signal (C2V5TPC8) is "0".

The write enable generating unit 1074-4 generates a write enable signal for the FF circuits 1074-1A and 1074-2A for holding alarm bits for 0 to 62ch when an output signal of the above alarm bit write address controlling unit 1074-3 is any value among 0 to 62 so as to write the alarm signals (WUNEQC8, WSLMC8) having been under gone the UNEQ and SLM processes in the respective FF circuits 1074-1A and 1074-2A holding alarm bits for TU channels having been processed. When an output signal of the alarm bit write address controlling unit 1074-3 is 63, it is not a timing of writing the alarm bit so that no write enable signal is generated.

The alarm bit read address controlling unit 1074-5 outputs contents of a TU channel (TUADC7) that should be processed when a timing signal (C2V5TPC7) indicating a timing of reading the alarm bit is "1", while controlling an output signal of its own to be 63 "111111") when the above timing signal (C2V5TPC7) is "0".

The read select generating unit 1074-6 generates read select signals used to read the alarm bits for 0 to 62ch when an output signal of the above alarm bit read address controlling unit 1074-5 is 0 to 62. When an output signal of the alarm bit read address controlling unit 1074-5 is 63, it is not a timing of reading the alarm bit so that no read select signal is generated.

The UNEQ selecting unit 1074-7 reads an alarm bit of UNEQ of a TU channel that should be processed with the read select signal generated by the read select generating unit 1074-6. The SLM selecting unit 1074-8 reads an alarm bit of SLM of a TU channel that should be processed with the read select signal generated by the read select generating unit 1074-6.

The line switching information read select generating unit 1074-9 generates read select signals for TU channels of 0 to 62ch. The UNEQ line switching information selecting unit 1074-10 reads UNEQ alarm with the read select signal generated by the line switching information read select generating unit 1074-9. The SLM line switching information selecting unit 1074-11 reads SLM alarm with the read select signal generated by the line switching information read select generating unit 1074-9.

The software notification read select generating unit 1074-12 generates read select signals for TU channels of 0 to 62ch. The UNEQ software notification selecting unit 1074-13 reads UNEQ alarm with the read select signal generated by the software notification read select generating unit 1074-12, and notifies the UNEQ alarm to the software's side. The SLM software notification selecting unit 1074-14 reads SLM alarm with the read select signal generated by the software notification read select generating unit 1074-12, and notifies the SLM alarm to the software's side.

The SLM detecting unit 1073 with the above structure according to this embodiment successively reads an SLM alarm bit of the preceding frame from the above alarm bit holding unit 1074 to update SLM alarm of the present frame on the basis of information read out, thereby serially detecting SLM and notifying the SLM to the software's side in common to all TU channels.

Next, a whole operation of the B3/V5 byte terminating process unit 1023 with the above structure will be described in brief. If TU data (C2 byte), TUAD ("0"), SPEEN and J1V5TP are inputted at timings shown in FIGS. 132(*a*) through 132(*f*), for example, the parts of the UNEQ detecting unit 10741 and the SL holding unit 1072 shown in FIG. 104, the SLM detecting unit 1073 shown in FIG. 130 and the alarm bit holding unit 1074 shown in FIG. 131 operate according to timings shown in FIGS. 132(*g*) through 132(*z*) and 132(*a*), whereby a UNEQ terminating process (UNEQ indication detection and UNEQ software notification) and an SLM terminating process (SLM detection and SLM software notification) are serially conducted on each TU channel.

As above, the POH terminating process unit 1008 according to this embodiment can serially conduct the UNEQ terminating process on C2 byte and the UNEQ terminating process on V5 byte in the C2/V5 byte terminating process unit 1024 (UNEQ serially terminating process unit) in common to all channels. It is therefore unnecessary to equip circuits for the UNEQ terminating processes on C2 byte and V5 byte equal in number to corresponding channels. This can largely decrease a scale and a power consumption of the apparatus.

In concrete, the C2/V5 byte terminating process unit 1024 indicates UNEQ, which should be done in the POH terminating process for each of channels generally having different signal sizes, in the UNEQ detecting unit 1071 in common to all channels. It is therefore unnecessary to equip circuits for indicating UNEQ equal in number to corresponding channels. This can largely decrease a scale and a power consumption of the apparatus.

The POH terminating process unit 1008 according to this embodiment can serially conduct the SLM terminating process on C2 byte and the SLM terminating process on V5 byte in the C2/V5 byte terminating process unit 1024 (SLM serially terminating process unit) in common to all channels. This can further decrease a scale and a power consumption of the apparatus.

In concrete, the C2/V5 byte terminating process unit 1024 detects SLY, which should be done in the POH terminating process on each of channels generally having different signal sizes, in common to all channels. It is therefore unnecessary to equip circuits for detecting SLM equal in number to corresponding channels. This can largely decrease a scale and a power consumption of the apparatus.

The above C2/V5 byte terminating process unit 1024 (refer to FIG. 127) may have, as shown in FIG. 133, a C2UNEQ indication serially detecting unit 1075A, V5UNEQ indication serially detecting units 1076A and 1076B, a UNEQ serially detecting unit for TU3 (first UNEQ serially detecting unit) 1078A, UNEQ serially detecting units for TU2/TU12 (second UNEQ serially detecting units) 1078B and 1078C, a UNEQ data holding unit for TU3 (first storage unit) 1072A, UNEQ data holding units for TU2/TU12 (second storage units) 1072B and 1072C, and a UNEQ data selecting unit 1077A to serially conduct a UNEQ indicating process on C2 byte and a UNEQ indicating process on V5 byte, one by one, and selectively output each UNEQ indication.

Whereby, the C2/V5 byte terminating process unit 1024 shown in FIG. 133 too can serially indicate UNEQ in a simple structure. This is effective if it is particularly unnecessary to use the UNEQ data holding units 1072A through 1072C for holding UNEQ indication in common to all signal sizes, which largely contributes to flexibility and versatility in configuring the apparatus.

The above C2/V5 byte terminating process unit 1024 (refer to FIG. 128) may have, as shown in FIG. 134, a C2 mismatch serially detecting unit 1081A, V5 mismatch serially detecting units 1082A and 1082B, an SLM serially detecting unit for TU3 (first SLM serially detecting unit) 1084A, SLM serially detecting units for TU2/TU12 (second SLM serially detecting units) 1084B and 1084C, an SLM data holding unit for TU3 (first storage unit) 1074A, SLM data holding units for TU2/TU12 (second storage units) 1074B and 1074C and an SLM data selecting unit 1083A to serially conduct an SLM detecting process on C2 byte and an SLM detecting process on V5 byte, one by one, and selectively output each SLM data.

Whereby, the C2/V5 byte terminating process unit 1024 shown in FIG. 134 can serially detect SLM in a simple structure. This is very effective if there is particularly no need to use the SLM data holding units 1074A through 1074C for holding SLM data in common to all signal sizes, which largely contributes to flexibility and versatility in configuring the apparatus.

(b-10) Description of the G1/V5 Byte Terminating Process Unit 1025

FIG. 135 is a block diagram showing a structure of the G1/V5 byte terminating process unit 1025 described before with reference to FIG. 62. As shown in FIG. 136, the G1/V5 byte terminating process unit 1025 according to this embodiment has an FEBE detecting unit 1091, an FEBEPM serially processing unit 1092, an FEBEPM holding unit 1093, an FEBEPM count value initialization controlling unit 1094, an EFRF serially processing unit 1095, an FERF holding unit 1096 and an alarm bit holding unit 1097.

The FEBE detecting unit 1091 serially detects FEBE of G1 byte and/or V5 byte included in the multiplex signal (VC4 data). The FEBEPM serially processing unit 1092 serially conducts an adding operation on a count value of FEBEPM on the basis of an FEBE detect signal fed from the FEBE detecting unit 1091.

The FEBEPM holding unit 1093 stores a result (count value) of addition conducted in the FEBEPM serially processing unit 1092 for each channel, besides supplying stored information of its own to the FEBEPM serially processing unit 1092. The FEBEPM count value initialization controlling unit 1094 initializes a result of the addition conducted in the FEBEPM serially processing unit 1092 according to a PM resetting signal.

The FERF serially processing unit 1095 serially conducts a terminating process on FERF of G1 byte and V5 byte included in VC4 data. The FERF holding unit (FERF data holding unit) 1096 stores (holds) a result (FERF) of each process conducted in the FERF serially processing unit 1095 for each channel, besides supplying stored information of its own to the FERF serially processing unit 1095. The alarm bit holding unit (FERF data holding unit) 1097 stores (holds) a result (FERF alarm bit) of each process conducted in the FERF serially processing unit 1095 for each channel, besides supplying stored information of its own to the FERF serially processing unit 1095.

Namely, in the G1/V5 byte terminating process unit 1025, the POH terminating operation processing unit 1026 shown in FIG. 63 is configured as an FEBE serially terminating process unit 1026E for serially conducting a terminating process on FEBE and FEBEPM of G1 byte and V5 byte included in VC4 data and an FERF serially terminating process unit 1026F for serially conducting a terminating process on FERF of the G1 byte and V5 byte mentioned above, whereas the storage unit 1027 shown in FIG. 63 is configured as a storage unit 1027E for storing a result of an operation conducted in the FEBE serially terminating process unit 1026E for each channel besides supplying stored information to the FEBE serially terminating process unit 1026E, and a storage unit 1027F for storing a result of an operation conducted in the FERF serially terminating process unit 1026F for each channel besides supplying stored information to the FERF serially terminating process unit 1026F.

The above G1/V5 byte terminating process unit 1025 can serially detect FEBE, FEBEPM and FERF, which should be detected in the POH terminating process for each channel generally having different signal sizes, in common to all channels.

In concrete, the above FEBE detecting unit 1091 has, as shown in FIG. 136, for example, a G1FEBE serially detecting unit 1098 for serially detecting FEBE of G1 byte, a V5FEBE serially detecting unit 1099 for serially detecting FEBE of V5 byte, an FEBE selecting unit 1100 for selecting an FEBE detect signal outputted from the detecting unit 1098 or 1099, whereas the FEBEPM serially processing unit 92 has an FEBEPM serially adding unit 1101 for serially conducting an adding operation on FEBEPM on the basis of the FEBE detect signal selected by the FEBE selecting unit 1100.

The above FERF serially processing unit 1095 has, as shown in FIG. 137, for example, a G1FERF indication serially detecting unit 1102 for serially detecting that G1 byte indicates FERF, a V5FERF indication serially detecting unit 1103 for serially detecting that V5 byte indicates FERF, an FERF indication detection selecting unit 1104 for selecting an FERF indication detect signal outputted from the detecting unit 1102 or 1103, and an FERF serially detecting unit 1106 for serially detecting FERF of the above G1 byte or V5 byte on the basis of the FERF indication detect signal selected by the FERF indication detection selecting unit 1104.

Next, detailed description will be made of the FEBE detecting unit 1091, the FEBEPM serially processing unit 1092, the FEBEPM holding unit 1093, the FEBEPM count value initialization controlling unit 1094, the FERF serially processing unit 1095, the FERF holding unit 1096 and the alarm bit holding unit 1097 mentioned above.

FIG. 138 is a block diagram showing a detailed structure of the FEBE detecting unit 1091. As shown in FIG. 138, the FEBE detecting unit 1091 according to this embodiment has an FF circuit 1091-1 with an enable, a G1 byte FEBE detecting unit 1091-2 and a selector 1091-3 as the FEBE selecting unit 1100 shown in FIG. 136.

The FF circuit 1091-1 holds data at the 1st to 4th bit of G1/V5 byte of VC4 data (TUDTC7) with a timing signal (G1V5TPC7) indicating a timing of G1/V5 byte. The G1 byte FEBE detecting unit 1091-2 detects that contents of the high-order 4 bits of the G1/V5 byte data held in the FF circuit 1091-1 is 1 to 8.

The selector 1091-3 selects FEBE of G1 byte or FEBE of V5 byte with a timing signal (V5TPIC8). An output signal (FEBE) of the selector 1091-3 is used in a performance monitoring (PM) process. As a region of FEBE, contents of the high-order 4 bits are the FEBE code (refer to FIG. 169) in G1 byte, and FEBE is detected when the contents of the code is 1 to 8. In V5 byte, the 3rd bit is the FEBE code (refer to FIG. 171) in V5 byte, and FEBE is detected when the contents of the code is "1".

In the FEBE detecting unit 1091 with the above structure, if TU data (G1 byte), TUAD ("0"), SPEEN and J1V5TP are inputted at timings shown in FIGS. 145(*a*) through 145(*f*), the parts of the FEBE detecting unit 1091 operate at timings shown in FIG. 145(*g*) through 145(*m*), and selectively output FEBE of G1 byte [refer to FIG. 145(*j*)] or FEBE of V5 byte [refer to FIG. 145(*k*)] to serially supply FEBE to the FEBEPM serially processing unit 1092 in common to all channels.

FIG. 139 is a block diagram showing detailed structures of the FEBEPM serially processing unit 1092 and the FEBEPM holding unit 1093 mentioned above. As shown in FIG. 139, the FEBEPM serially processing unit 1092 has an FF circuit 1092-1 with an enable, an FEBE count value initialization controlling unit (AND circuit of a 1-input inverting type) 1092-2 and an FEBEPM adding unit 1092-3, whereas the FEBEPM holding unit 1093 has an FEBEPM holding RAM 1093-1.

The FEBEPM holding RAM 1093-1 of the FEBEPM holding unit 1093 holds an FEBE error count value and an FEBEPM count value that should be notified to the software. As to FEBEPM, similarly to BIPPM, in order to count the number of FEBEs having occurred between PM resetting signals and notify the counted value to the software until the next PM resetting signal, it is necessary to count the number of errors and notify the counted value between the PM resetting signal. For this, it is necessary to hold a count value of errors and a count value to be notified.

For this, the FEBEPM holding RAM 1093-1 according to this embodiment has two planes, that is, an low-order plane [address 0 (00HEX) to 63 (3FHEX)] and a high-order plane [address 64 (40HEX) to 127 (7FHEX)], roles of which are assigned to a counting plane used to count FEBEs and a notification plane (plane for holding a result of PM) used to notify a count value of FEBEPM. In this case, these planes are exchanged with each other by switching polarity of the MSB bit (PM) of a RAM address.

The FEBEPM holding RAM 1093-1 operates with RPMADC6 as a read address on the counting plane, WPMADC7 as a write address on the counting plane, XFEBEPMWENC8 (refer to FIG. 80) as a write enable, FEBEPMRAD as a read address on the notification plane and FEBEPMCK (refer to FIG. 80) as a RAM clock.

According to this embodiment, the FEBEPM holding RAM 1093-1 holds data of 13 bits, holding an FEBE count value on the counting plane while holding an FEBEPM count value on the notification plane.

In the FEBEPM serially processing unit 1092, the FF circuit 1092-1 reads a count value of FEBE from the counting plane of the FEBEPM holding RAM 1093-1 with a timing signal (G1V5TPC7) indicating a timing of G1/V5 byte to hold data at the 12th to 0th bits. The FEBE count value initialization controlling unit 1092-2 resets an FEBE count value read out when the first FEBEPM serial process is conducted after PM resetting.

The FEBEPM adding unit 1092-3 adds 1 to an EFBE count value having been controlled by the FEBE count value initialization controlling unit 1092-2 while FEBE is detected, an output signal of which is written in the counting plane of the FEBEPM holding RAM 1093-1. While FEBE is not detected, the adding process is not conducted in the FEBEPM adding unit 1092-3 so that the FEBE count value having been controlled by the FEBE count value initialization controlling unit 1092-2 is outputted as it is.

In the FEBEPM serially processing unit 1092 with the above structure, if TU data (G1 byte), TUAD ("0"), SPEEN and J1V5TP are inputted at timings shown in FIGS. 145(*a*) through 145(*f*), for example, similarly to the above FEBE detecting unit 1091, the parts of the FEBEPM serially processing unit 1092 operate according to timings shown in FIGS. 145(*n*) through 145(*x*).

Namely, the FEBEPM serially processing unit 1092 successively reads out FEBEPM (count value) of the preceding frame from the above FEBEPPM holding unit 1093 to update FEBEPM of the present frame on the basis of information read out, and serially conducts a terminating process on FEBE and notifies FEBERPM to the software in common to all TU channels.

FIG. 140 is a block diagram showing a detailed structure of the FEBE count value initialization controlling unit 1094. As shown in FIG. 140, the FEBE count value initialization controlling unit 1094 according to this embodiment has FF circuits 1094-1, 1094-2 and 1094-8, a timing controlling unit (OR circuit of a 1-input inverting type) 1094-3, a read/write signal generating unit [decoding circuit (DEC)] 1094-4, a write enable generating unit (OR circuit) 1094-5, an FEBEPM count value initialization request signal holding unit 1094-6 and an FEBEPM count value initialization request signal selecting unit (selector) 1094-7.

The FF circuit 1094-1 delays a phase of a PM resetting signal (FEBEPM count value initialization request signal) by one clock of the master clock. The FF circuit 1094-2 further delays the phase of the PM resetting signal having been delayed by the FF circuit 1094-1 by one clock of the master clock.

The timing controlling unit 1094-3 controls a timing for the FEBEPM count value initialization request signal. For instance, the timing controlling unit 1094-3 outputs contents of a TU channel (TUADC7) that should be processed when a timing signal (G1V5TPC7) indicating a timing of processing FEBEPM is "1", while controlling an output signal of its own to be 63 ("111111") when the above timing signal (G1V5TPC7) is "0".

The read/write signal generating unit 1094-4 generates a select signal used to read an FEBEPM count value initialization request signal for a channel among 0 to 62ch and a write enable signal, when the timing controlling unit 1094-3 is a corresponding value among 0 to 62. When an output signal of the timing controlling unit 1094-3 is 63, it is not a timing to process FEBEPM so that the select signal used to read and the write enable signal mentioned above are not generated.

The write enable generating unit 1094-5 makes all write enable signals for 0 to 62ch be "1" when the PM resetting signal which is an output signal of the FF circuit 1094-2 is inputted (that is, when the PM resetting signal is "1"). When no PM resetting signal is inputted, the write enable generating unit 1094-5 outputs an output signal of the read/write signal generating unit 1094-4 as it is.

The FEBEPM count value initialization request signal holding unit 1094-6 holds FEBEPM count value initialization request signals for TU channels of 0 to 62ch in 63 FF circuits 1094-6A, in which write enable signals for all channels become "1" by the PM resetting signal fed from the FF circuit 1094-2 so that input data to the FF circuits 1094-6A for all channels simultaneously become "1", whereby the FEBEPM count value initialization request signals are set to all channels, simultaneously.

When a timing signal (G1V5TPC7) of G1/V5 byte is inputted after a PM resetting, a write enable signal for a channel whose FEBEPM count value is processed through the processes by the timing controlling unit 1094-3, the read/write signal generating unit 1094-4 and a write enable generating unit 1094-4 becomes "1". At this time, no PM resetting signal is inputted so that input data from the FF circuit 1094-2 becomes "0", whereby "0" is written in the FF circuits 1094-6A.

Namely, in the FEBEPM count value initialization request signal holding unit 1094-6, the FEBEPM count value initialization request signal is cancelled at a timing of the first G1/V5 byte after the PM resetting so that an FEBE count value read out from the counting plane of the FEBEPM holding RAM 1093-1 can be initialized only at the first G1/V5 timing after the PM resetting.

The FEBEPM count value initialization request signal selecting unit 1094-7 reads the FEBEPM count value initialization request signals for 0 to 62ch held in the FF circuits 1094-6A with an output signal of the read/write signal regenerating unit 1094-4. The FF circuit 1094-8 delays a phase of an output signal of the FBEPM count value initialization request signal selecting unit 1094-8 by one clock of the master clock to adjust the phase of the output signal of the FEBEPM count value initialization request signal selecting unit 1094-7- to a phase suitable for the resetting process.

In the FEBEPM count value initialization controlling unit 1094 with the above structure, if TU data (G1 byte), TUAD ("0"), SPEEN and J1V5TP are inputted at timings shown in FIGS. 145(*a*) through 145(*f*), the parts of the FEBEPM count value initialization controlling unit 1094 operate according to timings shown in FIGS. 146(*a*) through 146(*q*) to generate a resetting signal (FEBEPMCTRRSTC8) used to initialize the FEBEPM count value at an optimum timing on the basis of the PM resetting signal, the TU address signal and the G1/B5 timing signal at any time, and supply the generated resetting signal (FEBEPMCTRRSTC8) to the FEBEPM serially processing unit 1092, whereby the FEBEPM serially processing unit 1092 can be accurately operated at all times.

As above, the POH terminating process unit 1008 according to this embodiment can serially conduct a terminating process on FEBE and FEBEPM of G1 byte and a terminating process on FEBE and FEBEPM of V5 byte in the G1/V5 byte terminating process unit 1025 in common to all channels. This can further decrease a scale and a power consumption of the apparatus.

In concrete, the G1/V5 byte terminating process unit 1025 conducts the terminating process on FEBE and FEBEPM, which should be done in the POH terminating process for each of channels generally having different signal sizes, in the FEBE detecting unit 1091 and the FEBEPM serially processing unit 1092 in common to all channels. For this, it becomes unnecessary to equip circuits for the terminating processes on FEBE and FEBEPM equal in number to corresponding channels. This can largely decrease a scale and a power consumption of the apparatus.

FIG. 141 is a block diagram showing detailed structures of the FERF serially processing unit 1095 and the FERF holding unit 1096. As shown in FIG. 141, the FERF serially processing unit 1095 has FF circuits 1095-1 through 1095-3 each with an enable, an FERF protective stage number adding unit 1095-4, a decoding circuit (DEC) 1095-5, an FERF selecting unit (selector) 1095-6, an addition condition detecting unit (exclusive-OR circuit) 1095-7, an FERF detection cancel 10-stage detecting unit (AND circuit) 1095-8, an FERF protective stage number information resetting unit (AND circuit of a 1-input inverting type) 1095-9 and a state transitting unit (exclusive-OR circuit) 1095-10, whereas the FERF holding unit 1096 has an FERF holding RAM 1096-1.

The FERF holding RAM 1096-1 of the FERF holding unit 1096 holds protective stage number information of FERF, which operates with a TU address signal (TUADC6) as a read address, TUADC7 as a write address, XFERFWENC8 (generated by the FERF holding RAM operation controlling unit 1040 shown in FIG. 77) as a write enable and FERFCK (refer to FIG. 77) as a RAM clock. According to this embodiment, the FERF holding RAM 1096-1 holds data (FERF protective stage information) of 4 bits.

In the FERF serially processing unit 1095, the FF circuit 1095-1 holds read data (FERF protective stage information) fed from the FERF holding RAM 1096-1 with a timing signal (G1V5TPC7) indicating a position of G1/V5 byte. The FF circuit 1095-2 holds the 5th bit and 8th bit of G1/V5 byte data of VC4 data (TUDTC7) with the above timing signal (G1V5TPC7). The FF circuit 1095-3 holds a result (FERF alarm bit: FERFC7) of a process on FERF of the preceding frame supplied from the alarm bit holding unit 1097 with the above timing signal (G1V5TPC7).

The FERF protective stage number adding unit 1095-4 adds 1 to a count value of the FERF protective stage number information read out from the FERF holding RAM 1096-1. The decoding circuit ("9" detecting unit) 1095-5 detects that a count value of the FERF protective stage number information read out is "9". The FERF selecting unit 1095-6 selects an FERF bit at the time of a process on TU3 or an FERF bit at the time of of a process on TU2/TU12.

Here, the 5th bit of G1 byte is an FERF bit in TU3 (refer to FIG. 169), whereas the least significant bit (the 8th bit) of V5 byte is an FERF bit in TU2/TU12 (refer to FIG. 171). When FERF is detected in V5 byte, a timing signal (V5TPC8) of V5 byte is used to select the 8th bit as the FERF bit.

The addition condition detecting unit 1095-7 detects that the FERF bit is "0" while FERF occurs, and that the FERF bit is "1" while FERF does not occur. The FERF detection cancel 10-stage detecting unit 1095-8 detects that an addition condition is consecutively detected over 9 frames in the above decoding circuit 1095-5, further detects that the addition condition is detected in the present frame, thereby recognizing that the addition condition is consecutively detected over 10 frames so as to detect or cancel FERF.

The FERF protective stage number information resetting unit 1095-9 resets a count value of the FERF protective stage number information to "0" when the addition condition is not detected by the addition condition detecting unit 1095-7, and when conditions for detecting or cancelling is detected in the FERF detection cancel 10-stage detecting unit 1095-8. The state transitting unit 1095-10 inverts polarity of the FERF alarm bit when occurrence of state transition is detected to transit the state from/to a state where FERF is occurring to/from a state where FERF is not occurring.

In the FERF serially processing unit 1095 with the above structure according to this embodiment, if TU data (G1 byte), TUAD ("0"), SPEEN and J1V5TP are inputted at timings shown in FIGS. 147(*a*) through 147(*f*), the parts of the FERF serially processing unit 1095 operate according to timings shown in FIGS. 147(*g*) through 147(*s*).

Namely, the FERF serially processing unit 1095 successively reads out results (FERF protective stage number information and FERF alarm bit) of processes on the preceding frame from the FERF holding unit 1096 (FERF holding RAM 1096-1) and the alarm bit holding unit 1097 to update FERF of the present frame on the basis of the information read out, thereby serially conducting a terminating process on FERF in common to all channels.

FIG. 142 is a block diagram showing a detailed structure of the above alarm bit holding unit 1097. As shown in FIG. 142, the alarm bit holding unit 1097 according to this embodiment has an FERF alarm bit holding unit 1097-1, an alarm bit write address controlling unit (OR circuit of a 1-input inverting type) 1097-2, a write enable generating unit (decoding circuit (DEC)] 1097-3, an alarm bit read address controlling unit (OR-circuit of a 1-input inverting type) 1097-4, a read select generating unit (decoding circuit (DEC)] 1097-5, an FERF selecting unit (selector) 1097-6, a software notification read select generating unit (decoding circuit (DEC)] 1097-7 and an FERF software notification selecting unit (selector) 1097-8.

The FERF alarm bit holding unit 1097-1 holds FERF alarm bits for TU channels from 0 to 62ch by 63 FF circuits 1097-1A. The alarm bit write address controlling unit 1097-2 outputs contents of a TU channel (TUADCB) that should be processed when a timing signal (G1V5TPC8) indicating a timing of writing the alarm bit is "1", while controlling an output signal of its own to be 63 ("1111111") when the above timing signal (G1V5TPC8) is "0".

The write enable generating unit 1097-3 generates a write enable signal for any one of the FF circuits 1097-1A for 0 to 62ch when an output signal of the alarm bit write address controlling unit 1097-2 is a corresponding value among 0 to 62 to write the alarm signal (WFERFC8) having been undergone an FERF process in the FF circuit 1097-1A for a TU channel having been processed. When an output signal of the alarm bit write address controlling unit 1097-2 is 63, no write enable signal is generated since it is not a timing of writing the alarm bit.

The alarm bit read address controlling unit 1097-4 outputs contents of a TU channel (TUADC7) that should be processed when a timing signal (G1V5TPC7) used to read the alarm bit is "1", while controlling an output signal of its own to be 63 ("111111") when the above timing signal (G1V5TPC7) is "0".

The read select generating unit 1097-5 generates a read select signal used to read the alarm bit for any channel-among 0 to 62ch when an output signal of the alarm bit read address controlling unit 1097-4 is a corresponding value among 0 to 62. When an output signal of the alarm bit read address controlling unit 1097-4 is 63, no read select signal is generated since it is not a timing to read the alarm bit.

The FERF selecting unit 1097-6 reads an alarm bit of FERF of a TU channel that should be processed with the read select signal generated by the read select generating unit 1097-5. The software notification read select generating unit 1097-7 generates a read select signal used to select an alarm bit for any one of TU channels from 0 to 62ch. The FERF software notification selecting unit 1097-8 reads an FERF alarm bit with the read select signal generated by the software notification read select generating unit 1097-7 to notify the FERF alarm to the software.

The alarm bit holding unit 1097 with the above structure according to this embodiment holds FERF alarm bits in common to all channels and selectively output them, thereby serially notifying FERF alarm to the software.

As above, the POH terminating process unit 1008 according to this embodiment can serially conduct a terminating process on FERF of G1 byte and a terminating process on FERF of V5 byte in the G1/V5 byte terminating process unit 1025 in common to all channels. This can largely decrease a scale and a power consumption of the apparatus.

In concrete, the G1/V5 byte terminating process unit 1025 conducts the terminating process on FERF, which should be conducted in the POH terminating process for each of channels generally having different signal sizes, in the FERF serially processing unit 1095 in common to all channels so that there is no necessity of equipping circuits for the FERF terminating process equal in number to corresponding channels. This can further largely decrease a scale and a power consumption of the apparatus.

The above G1/V5 byte terminating process unit 1025 (refer to FIG. 136) may have, as shown in FIG. 143, for example, a G1FEBE serially detecting unit 1098A, V5FEBE serially detecting units 1099A and 1099B, an FEBEPM serially adding unit for TU3 (first FEBEPM serially adding unit) 1101A, FEBEPM serially adding units for TU2/TU12 (second FEBEPM serially adding units) 101B and 1101C, an FEBEPM holding unit for TU3 (first storage unit) 1093A, FEBEPM holding units for TU2/TU12 (second storage units) 1093B and 1093C and an FEBE selecting unit 1077A to serially conduct a terminating process on FEBE and FEBEPM of G1 byte and a terminating process on FEBE and FEBEPM of V5 byte separately, and selectively output each FEBEPM to the software's side.

Whereby, the G1/V5 byte terminating process unit 1025 shown in FIG. 143 can serially conduct the terminating processes on FEBE and FEBEPM in a simple structure. The above structure is very effective if there is particularly no necessity of using the FEBEPM holding units 1093A through 1093C holding FEBEPM in common to all signal sizes, which largely contributes to flexibility and versatility in configuring the apparatus.

The above G1/V5 byte terminating process unit 1025 (refer to FIG. 137) may have, as shown in FIG. 144, for example, a G1FERF indication serially detecting unit 1102A, V5FERF indication serially detecting units 1103A and 1103B, an FERF serially detecting unit for TU3 (first FERF serially detecting unit) 1106A, FERF serially detecting units for TU2/TU12 (second FERF serially detecting units) 1106B and 1106C, an FERF data holding unit for TU3 (first storage unit) 1096A, FERF data holding units for TU2/TU12 (second storage units) 1096B and 1096C and an FERF data selecting unit 1104A to serially conduct the terminating process on FERF of G1 byte and the terminating process on FERF of V5 byte, one by one, and selectively output each FERF data to the software's side.

Whereby, the G1/V5 byte terminating process unit 1025 shown in FIG. 144 can serially conduct the FERF terminating process in a simple structure. The above structure is very effective if there is particularly no need to use the FERF data holding units 1096A through 1096C in common to all signal sizes, which largely contributes to flexibility and versatility in configuring the apparatus.

The POH terminating process unit 1008 according to this embodiment can serially conduct the POH terminating process without separating the multiplex signal transmitted in the SDH transmission system into signals on respective channels so that it becomes unnecessary to equip circuits for the POH terminating process equal in number to channels multiplexed in the multiplex signal. This can largely decrease a scale (of the circuit) and a power consumption of the apparatus.

(b-11) Others

Having been described the above embodiment by way of an example where the TU pointer processing unit 1006 and the POH terminating process unit 1008 are provided to the line terminating apparatus 306 to configure a pointer/POH terminating process apparatus. However, this invention is not limited to this example. It is alternatively possible to equip only the POH terminating process unit to the line terminating apparatus 306 to configure an apparatus exclusively used for the POH terminating process.

What is claimed is:

1. A POH terminating process apparatus in an SDH transmission system for conducting a POH terminating process on a multiplex signal in which information on a plurality of channels is multiplexed transmitted in the SDH transmission system comprising:

a POH terminating operation processing unit common to all channels for conducting a POH terminating operation process on the multiplex signal; and a storage unit flexibly readable and writable for storing a result of an operation conducted in said POH terminating operation processing unit for each channel;

said POH terminating process apparatus conducting the POH terminating operation process in said POH terminating operation processing unit using stored information about a corresponding channel stored in said storage unit when conducting the POH terminating operation process on said multiplex signal, and storing an obtained result of said POH terminating operation in a storage area for the corresponding channel of said storage unit so as to conduct the POH terminating operation process on said multiplex signal without separating said multiplex signal into channels.

2. The POH terminating process apparatus in an SDH transmission system according to claim 1 further comprising a latching unit for temporarily storing the stored information about the corresponding channel read out from said storage unit and POH byte data in said multiplex signal that should be processed when said POH terminating operation process unit conducts the POH terminating operation process.

3. The POH terminating process apparatus in an SDH transmission system according to claim 1, wherein said POH terminating operation process unit is configured as a J1/J2 byte serially terminating process unit for serially conducting a terminating process on J1 byte and J2 byte included in said multiplex signal; and wherein said storage unit stores a result of an operation conducted in said J1/J2 byte serially terminating process unit for each channel besides supplying stored information to said J1/J2 byte serially terminating process unit.

4. The POH terminating process apparatus in an SDH transmission system according to claim 3, wherein said J1/J2 byte serially terminating process unit comprises:

a multiframe pattern serially detecting unit for serially detecting a multiframe pattern of said J1 byte and J2 byte;

a multiframe pattern number serially controlling unit for serially controlling the number of multiframes of said J1 byte and J2 byte;

an LOM serially detecting unit for serially detecting LOM of said J1 byte and J2 byte;

a CRC serially detecting unit for serially detecting CRC of said J1 byte and J2 byte; and a TIM serially detecting unit for serially detecting TIM of said J1 byte and J2 byte;

wherein said storage unit stores results of operations conducted in said multiframe pattern serially detecting unit, said multiframe pattern number serially controlling unit, said LOM serially detecting unit, said CRC serially detecting unit and said TIM serially detecting unit for each channel, besides supplying stored information to said multiframe pattern serially detecting unit, said multiframe pattern number serially controlling unit, said LOM serially detecting unit, said CRC serially detecting unit and said TIM serially detecting unit.

5. The POH terminating process apparatus in an SDH transmission system according to claim 1, wherein said POH terminating operation process unit is configured as a B3/V5 byte serially terminating process unit for serially conducting a terminating process on BIP of B3 byte and V5 byte included in said multiplex signal and a terminating process on BIPPM of said B3 byte and V5 byte; and wherein said storage unit stores a result of an operation conducted in said B3/V5 byte serially terminating process unit for each channel, besides supplying stored information to said B3/V5 byte serially terminating process unit.

6. The POH terminating process apparatus in an SDH transmission system according to claim 5, wherein said B3/V5 byte serially terminating process unit comprises:

a BIP operation serially processing unit for serially conducting a BIP8 operation on said multiplex signal;

a BIP2 operation serially processing unit for serially conducting a BIP2 operation on said multiplex signal;

a BIP error selecting unit for selecting a BIP error signal outputted from said BIP8 operation serially processing unit or said BIP2 operation serially processing unit; and a BIPPM serially adding unit for serially conducting an adding operation on BIPPM on the basis of the BIP error signal selected by said BIP error selecting unit; and wherein said storage unit stores a result of the operation conducted in said BIPPM serially adding unit for each channel, besides supplying stored information to said BIPPM serially adding unit.

7. The POH terminating process apparatus in an SDH transmission system according to claim 5, wherein said B3/V5 byte serially terminating process unit comprises:

a BIP8 operation serially processing unit for serially conducting a BIP8 operation on said multiplex signal;

a first BIPPM serially adding unit for serially conducting an adding operation on BIPPM on the basis of a BIP error signal fed from said BIP8 operation serially processing unit;

a BIP2 operation serially processing unit for serially conducting a BIP2 operation on said multiplex signal;

a second BIPPM serially adding unit for serially conducting an adding operation on BIPPM on the basis of a BIP error signal fed from said BIP2 operation processing unit; and a BIPPM selecting unit for selecting BIPPM outputted from said first BIPPM serially adding unit or said second BIPPM serially adding unit; and wherein said storage unit has a first storage unit for storing a result of the operation conducted in said first BIPPM serially adding unit for each channel besides supplying stored information to said first BIPPM serially adding unit, and a second storage unit for storing a result of the operation conducted in said second BIPPM serially adding unit for each channel besides supplying stored information to said second BIPPM serially adding unit.

8. The POH terminating process apparatus in an SDH transmission system according to claim 1, wherein said POH terminating operation process unit is configured as a UNEQ serially terminating process unit for serially conducting a terminating process on UNEQ of C2 byte and V5 byte included in said multiplex signal; and wherein said storage unit stores a result of an operation conducted in said UNEQ serially terminating process unit for each channel besides supplying stored information to said UNEQ serially terminating process unit.

9. The POH terminating process apparatus in an SDH transmission system according to claim 8, wherein said UNEQ serially terminating process unit comprises:

a C2UNEQ indication serially detecting unit for serially detecting whether said C2 byte indicates UNEQ;

a V5UNEQ indication serially detecting unit for serially detecting whether said V5 byte indicates UNEQ;

a UNEQ indication selecting unit for selecting a UNEQ indication detect signal outputted from said C2UNEQ indication serially detecting unit or said V5UNEQ indication serially detecting unit; and a UNEQ serially detecting unit for serially indicating UNEQ of said C2 byte and V5 byte on the basis of the UNEQ indication detect signal selected by said UNEQ indication selecting unit; and wherein said storage unit stores a result of detection conducted in said UNEQ serially detecting unit for each channel besides supplying stored information to said UNEQ serially detecting unit.

10. The POH terminating process apparatus in an SDH transmission system according to claim 8, wherein said UNEQ serially terminating process unit comprises:

a C2UNEQ indication serially detecting unit for serially detecting whether said C2 byte indicates UNEQ;

a first UNEQ serially detecting unit for serially indicating UNEQ of C2 byte on the basis of a UNEQ indication detect signal fed from said C2UNEQ indication serially detecting unit;

a V5UNEQ indication serially detecting unit for serially detecting whether said V5 byte indicates UNEQ;

a second UNEQ serially detecting unit for serially indicating UNEQ of V5 byte on the basis of a UNEQ indication detect signal fed from said V5UNEQ indication serially detecting unit; and a UNEQ indication selecting unit for selecting UNEQ indication outputted from said first UNEQ serially detecting unit or said second UNEQ serially detecting unit; and wherein said storage unit has a first storage unit for storing a result of detection conducted in said first UNEQ serially detecting unit for each channel besides supplying stored information to said first UNEQ serially detecting unit, and a second storage unit for storing a result of detection conducted in said second UNEQ serially detecting unit for each channel besides supplying stored information to said second UNEQ serially detecting unit.

11. The POH terminating process apparatus in an SDH transmission system according to claim 1, wherein said POH terminating operation processing unit is configured as an SLM serially terminating process unit for serially conducting a terminating process on SLM of C2 byte and V5 byte included in said multiplex signal; and wherein said storage unit stores a result of an operation conducted in said SLM serially terminating process unit for each channel, besides supplying stored information to said SLM serially terminating process unit.

12. The POH terminating process apparatus in an SDH transmission system according to claim 11, wherein said SLM serially terminating process unit comprises:

a C2 mismatch serially detecting unit for serially detecting that mismatch is detected in said C2 byte;

a V5 mismatch serially detecting unit for serially detecting that mismatch is detected in said V5 byte;

a mismatch detection selecting unit for selecting a mismatch detect signal outputted from said C2 mismatch serially detecting unit or said V5 mismatch serially detecting unit; and an SLM serially detecting unit for serially detecting SLM of said C2 byte and V5 byte on the basis of the mismatch detect signal selected by said mismatch detection detecting unit; and wherein said storage unit stores a result of detection conducted in said SLM serially detecting unit besides supplying stored information to said SLM serially detecting unit.

13. The POH terminating process apparatus in an SDH transmission system according to claim 11, wherein said SLM serially terminating process unit comprises:

a C2 mismatch serially detecting unit for serially detecting that mismatch is detected in said C2 byte;

a first SLM serially detecting unit for serially detecting SLM of said C2 byte on the basis of a mismatch detect signal fed from said C2 mismatch serially detecting unit;

a V5 mismatch serially detecting unit for serially detecting that mismatch is detected in said V5 byte;

a second SLM serially detecting unit for serially detecting SLM of said V5 byte on the basis of a mismatch detect signal fed from said V5 mismatch serially detecting unit; and an SLM selecting unit for selecting SLM outputted from said first SLM serially detecting unit or said second SLM serially detecting unit; and wherein said storage unit has a first storage unit for storing a result of detection conducted in said first SLM serially detecting unit for each channel besides supplying stored information to said first SLM serially detecting unit, and a second storage unit for storing a result of detection conducted in said second SLM serially detecting unit besides supplying stored information to said second SLM detecting unit.

14. The POH terminating process apparatus in an SDH transmission system according to claim 1, wherein said POH terminating operation process unit is configured as an FEBE serially terminating process unit for serially conducting a terminating process on FEBE of G1 byte and V5 byte included in said multiplex signal and a terminating process on FEBEPM of said G1 byte and V5 byte; and wherein said storage unit stores a result of an operation conducted in said FEBE serially terminating process unit for each channel besides supplying stored information to said FEBE serially terminating process unit.

15. The POH terminating process apparatus in an SDH transmission system according to claim 14, wherein said FEBE serially terminating process unit comprises:

a G1FEBE serially detecting unit for serially detecting FEBE of said G1 byte;

a V5FEBE serially detecting unit for serially detecting FEBE of said V5 byte;

an FEBE selecting unit for selecting an FEBE detect signal outputted from said G1FEBE serially detecting unit or said V5FEBE serially detecting unit; and an FEBEPM serially adding unit for serially conducting an adding operation on FEBEPM on the basis of the FEBE detect signal selected by said FEBE selecting unit; and wherein said storage unit stores a result of addition conducted in said FEBEPM serially adding unit for each channel besides supplying stored information to said FEBEPM serially adding unit.

16. The POH terminating process apparatus in an SDH transmission system according to claim 14, wherein said FEBE serially terminating process unit comprises:

a G1FEBE serially detecting unit for serially detecting FEBE of said G1 byte;

a first FEBEPM serially adding unit for serially conduction an adding operation on FEBEPM on the basis of an FEBE detect signal fed from said G1FEBE serially detecting unit;

a V5FEBE serially detecting unit for serially detecting FEBE of said V5 byte;

a second FEBEPM serially adding unit for serially conducting an adding operation on FEBEPM on the basis of an FEBE detect signal fed from said V5FEBE serially detecting unit; and an FEBEPM selecting unit for selecting FEBEPM outputted from said first FEBEPM serially adding unit or said second FEBEPM serially adding unit; and wherein said storage unit stores a result of addition conducted in said FEBEPM serially adding unit for each channel besides supplying stored information to said FEBEPM serially adding unit.

17. The POH terminating process apparatus in an SDH transmission system according to claim 1, wherein said POH terminating operation processing unit is configured as an FERF serially terminating process unit for serially conducting a terminating process on FERF of G1 byte and V5 byte included in said multiplex signal; and wherein said storage unit stores a result of an operation conducted in said FERF serially terminating process unit for each channel, besides supplying stored information to said FERF serially terminating process unit.

18. The POH terminating process apparatus in an SDH transmission system according to claim 17, wherein said FERF serially terminating process unit comprises:

a G1FERF indication serially detecting unit for serially detecting that said G1 byte indicates FERF;

a V5FERF indication serially detecting unit for serially detecting that said V5 byte indicates FERF;

an FERF indication detection selecting unit for selecting an FERF indication detect signal outputted from said G1FERF indication serially detecting unit or said V5FERF indication serially detecting unit; and an FERF serially detecting unit for serially detecting FERF of said G1 byte and V5 byte on the basis of the FERF indication detect signal selected by said FERF indication detection selecting unit; and wherein said storage unit stores a result of detection conducted in said FERF serially detecting unit for each channel, besides supplying stored information to said FERF serially detecting unit.

19. The POH terminating process apparatus in an SDH transmission system according to claim 17, wherein said FERF serially terminating process unit comprises:

a G1FERF indication serially detecting unit for serially detecting that said G1 byte indicates FERF;

a first FERF serially detecting unit for serially detecting FERF of said G1 byte on the basis of an FERF indication detect signal fed from said G1FERF indication serially detecting unit;

a V5FERF indication serially detecting unit for serially detecting that said V5 byte indicates FERF;

a second FERF serially detecting unit for serially detecting FERF of said V5 byte on the basis of an FERF indication detect signal fed from said V5FERF indication serially detecting unit; and an FERF indication selecting unit for selecting FERF indication outputted from said first FERF serially detecting unit or said second FERF serially detecting unit; and wherein said storage unit has a first storage unit for storing a result of detection conducted in said first FERF serially detecting unit for each channel besides supplying stored information to said first FERF serially detecting unit, and a second storage unit for storing a result of detection conducted in said second FERF serially detecting unit besides supplying stored information to said second FERF serially detecting unit.

20. The POH terminating process apparatus in an SDH transmission system according to claim 1 further comprising a POH timing signal serially generating unit for serially generating a POH timing signal used for a process conducted in said POH terminating operation processing unit on the basis of a timing signal indicating positions of J1 byte and V5 byte of said multiplex signal and type information of said multiplex signal.

21. The POH terminating process apparatus in an SDH transmission system according to claim 20, wherein said POH timing signal serially generating unit comprises;

a count value initializing unit for initializing an SPE count value by receiving the timing signal indicating positions of said J1 byte and V5 byte of said multiplex signal;

a count value addition controlling unit for controlling addition of said SPE count value on the basis of a signal fed from said count value initializing unit;

a storage unit flexibly writable and readable for storing an SPE count added value obtained in said count value addition controlling unit for each channel, besides supplying held data of each channel to said count value initializing unit; and a POH timing signal generating unit for generating the POH timing signal used for a process conducted in said POH terminating operation process unit on the basis of the signal fed from said count value initializing unit and type information of said multiplex signal.

22. The POH terminating process apparatus in an SDH transmission system according to claim 1 further comprising an address generating unit for generating address information used to discriminate each channel of said multiplex signal.

23. A POH terminating process apparatus in an SDH transmission system for conducting a POH terminating process on a signal in which information on a plurality of channels is multiplexed transmitted in the SDH transmission system comprising:

a POH terminating operation processing unit common to all channels for conducting a POH terminating operation process on a multiplex signal; and a storage unit flexibly readable and writable for storing a result of an operation conducted in said POH terminating operation processing unit;

wherein said POH terminating operation process unit comprises:

a J1/J2 byte serially terminating process unit for serially conducting a terminating process on J1 byte and J2 byte included in said multiplex signal;

a B3/V5 byte serially terminating process unit for serially conducting a terminating process on BIP of B1 byte and V5 byte included in said multiplex signal and a terminating process on BIPPM of said B1 byte and V5 byte;

a UNEQ/SLM serially terminating process unit for serially conducting a terminating process on UNEQ of C2 byte and V5 byte included in said multiplex signal and serially-conducting a terminating process on SLM of said C2 byte and V5 byte; and an FEBE/FERF serially terminating process unit for serially conducting a terminating process on FEBE of G1 byte and V5 byte included in said multiplex signal and serially conducting a terminating process on FEBEPM of said G1 byte and V5 byte besides serially conducting a terminating process on FERF on said G1 byte and V5 byte; and wherein said storage unit stores result of operations conducted in said J1/J2 byte serially terminating process unit, said B3/V5 byte serially terminating process unit, said UNEQ/SLM serially terminating process unit and said FEBE/FERF serially terminating process unit for each channel, besides supplying stored information to said J1/J2 byte serially terminating process unit, said B3/V5 byte serially terminating process unit, said UNEQ/SLM serially terminating process unit and said FEBE/FERF serially terminating process unit.

24. A POH terminating process method used in an SDH transmission system comprising the steps of:

conducting a POH terminating operation process in a POH terminating operation process unit common to all channels using stored information about a result of the POH terminating process operation with respect to a corresponding channel stored in a storage unit flexibly readable and writable when a POH terminating process is conducted on a signal in which information on a plurality of channels is multiplexed transmitted in the SDH transmission system; and storing an obtained result of the POH terminating operation in a storage area for the corresponding channel, thereby conducting the POH terminating operation process without separating said multiplex signal into channels.

* * * * *